US006658578B1

(12) United States Patent
Laurenti et al.

(10) Patent No.: US 6,658,578 B1
(45) Date of Patent: Dec. 2, 2003

(54) MICROPROCESSORS

(75) Inventors: Gilbert Laurenti, Saint Paul de Vence (FR); Jean-Pierre Giacalone, Vence (FR); Emmanuel Ego, Antibes (FR); Anne Lombardot, Grasse (FR); Francois Theodorou, Cagnes-sur-Mer (FR); Gael Clave, Antibes (FR); Yves Masse, Biot (FR); Karim Djafarian, Vence (FR); Armelle Laine, Antibes (FR); Jean-Louis Tardieux, Cagnes-sur-Mer (FR); Eric Ponsot, Vence (FR); Herve Catan, Saint Laurent du Var (FR); Vincent Gillet, Le Rouret (FR); Mark Buser, Pittsburgh, PA (US); Jean-Marc Bachot, Placassier (FR); Eric Badi, Saint Laurent du Var (FR); N. M. Ganesh, Santa Clara, CA (US); Walter A. Jackson, Pittsburgh, PA (US); Jack Rosenzweig, Pittsburgh, PA (US); Shigeshi Abiko, Tokyo To KIta Ku (JP); Douglas E. Deao, Brookshire, TX (US); Frederic Nidegger, Nice (FR); Marc Couvrat, Saint Laurent du Var (FR); Alain Boyadjian, Vallauris (FR); Laurent Ichard, Juan les Pins (FR); David Russell, Bucks (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/410,977

(22) Filed: Oct. 1, 1999

(30) Foreign Application Priority Data

Oct. 6, 1998 (EP) ............................................ 98402455

(51) Int. Cl.[7] .................................................. G06F 1/32
(52) U.S. Cl. ....................................... 713/324; 712/244
(58) Field of Search ............................ 713/324; 712/35, 712/36, 32, 42, 244

(56) References Cited

U.S. PATENT DOCUMENTS 5,392,437 A * 2/1995 Matter et al. ............... 713/324

(List continued on next page.)

FOREIGN PATENT DOCUMENTS

| | | |
|---|---|---|
| EP | 0 840 208 A2 | 5/1998 |
| WO | WO 98 35301 A | 8/1998 |

*Primary Examiner*—William M. Treat
(74) *Attorney, Agent, or Firm*—Gerald E. Laws; W. James Brady, III; Frederick J. Telecky, Jr.

(57) ABSTRACT

A processor (100) is provided that is a programmable fixed point digital signal processor (DSP) with variable instruction length, offering both high code density and easy programming. Architecture and instruction set are optimized for low power consumption and high efficiency execution of DSP algorithms, such as for wireless telephones, as well as pure control tasks. The processor includes an instruction buffer unit (106), a program flow control unit (108), an address/data flow unit (110), a data computation unit (112), and multiple interconnecting busses. Dual multiply-accumulate blocks improve processing performance. A memory interface unit (104) provides parallel access to data and instruction memories. The instruction buffer is operable to buffer single and compound instructions pending execution thereof. A decode mechanism is configured to decode instructions from the instruction buffer. The use of compound instructions enables effective use of the bandwidth available within the processor. A soft dual memory instruction can be compiled from separate first and second programmed memory instructions. Instructions can be conditionally executed or repeatedly executed. Bit field processing and various addressing modes, such as circular buffer addressing, further support execution of DSP algorithms. The processor includes a multistage execution pipeline with pipeline protection features. Various functional modules can be separately powered down to conserve power. The processor includes emulation and code debugging facilities with support for cache analysis.

22 Claims, 93 Drawing Sheets

U.S. PATENT DOCUMENTS

| | | | | | |
|---|---|---|---|---|---|
| 5,452,401 | A | | 9/1995 | Lin | |
| 5,515,530 | A | | 5/1996 | Eskandari | |
| 5,713,028 | A | * | 1/1998 | Takahashi et al. | 713/324 |
| 5,732,234 | A | | 3/1998 | Vassiliadis et al. | |
| 5,784,628 | A | * | 7/1998 | Reneris | 713/324 |
| 5,842,028 | A | | 11/1998 | Vajapey | |
| 5,996,078 | A | * | 11/1999 | Christensen et al. | 713/300 |

* cited by examiner

: FUNCTIONAL VIEW OF THE DU

AUTO-INCREMENT FOR MEMORY BLOCK ADDRESSING IN RPT LOOP

```
MV @START, CFP
RPT #8
MAC_MAC DR0, DR1, *P2+, *P3+, *Mcoef+
```

DUAL MAC CONNECTION TO B BUS AND MEMORY BUSES

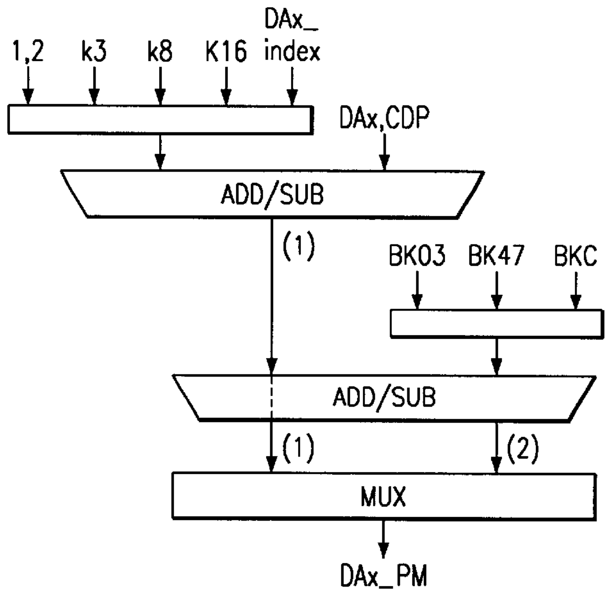

PMU_X DAx POST MODIFY

AR[0-3] → BUFFER SIZE BK03
AR[4-7] → BUFFER SIZE BK47

SELECT (1)/(2) TO KEEP ARx INDEX WITHIN BUFFER RANGE

WRITE BACK TO REGISTER FILE DAx_PM

*FIG. 40A*

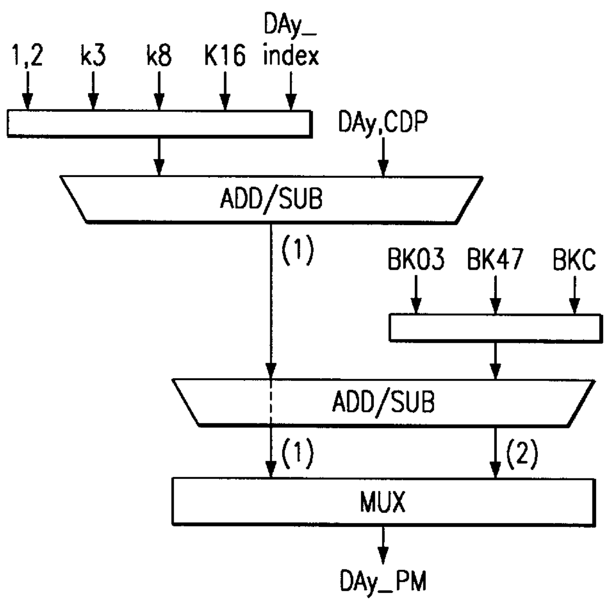

PMU_Y ARy POST MODIFY

AR[0-3] → BUFFER SIZE BK03
AR[4-7] → BUFFER SIZE BK47

SELECT (1)/(2) TO KEEP ARy INDEX WITHIN BUFFER RANGE

WRITE BACK TO REGISTER FILE DAy_PM

*FIG. 40B*

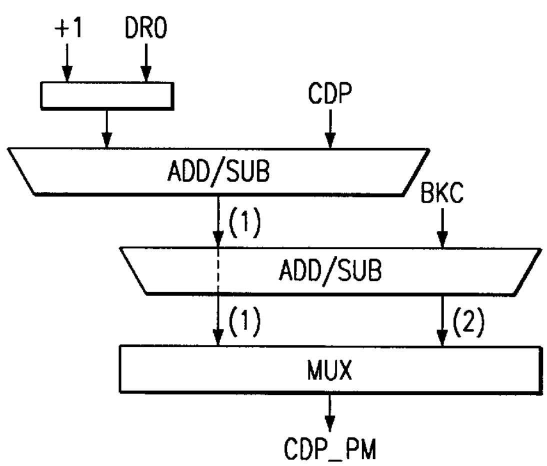

PMU_C CDP (COEFFICIENTS POINTER) POST MODIFY

BKC → DEDICATED BUFFER SIZE REGISTER TO CDP

SELECT (1)/(2) TO KEEP CDP INDEX WITHIN BUFFER RANGE

WRITE BACK TO REGISTER FILE CDP_PM

*FIG. 40C*

| | | | | | | | | |
|---|---|---|---|---|---|---|---|---|
| PREFETCH | PC | PC | nPC | nPC+4 | | | | |
| FETCH | +2 | | | nPC | | | | |
| DECODE | C.I.D. | | M0 | M1 | B0 | | | |
| ADDRESS | | | | | | | | |
| ACCESS | | | | | | | | |
| READ OP | | | | | | | | |
| EXE | | | | | | | | |

– NO RESTRICTION ON DELAYED SLOTS. (CAN HAVE 24//24 AND 24//24)
96-BIT ARE ALWAYS AVAILABLE INSIDE IBQ (64+32-BIT)

| | | | | | | | | |
|---|---|---|---|---|---|---|---|---|
| PREFETCH | PC | nPC | nPC+4 | | | | | |
| FETCH | +2 | | nPC | | | | | |
| DECODE | C.I.D. | M0 | M1 | B0 | | | | |
| ADDRESS | | | | | | | | |
| ACCESS | | | | | | | | |
| READ OP | | | | | | | | |
| EXE | | | | | | | | |

– RESTRICTION ON DELAYED SLOTS.
CAN GUARANTEE ALWAYS 64-BIT (32-BIT + 32-BIT)

DELAY SLOT

UNUSED SLOT

C.I.D: DELAYED CONTROL INSTRUCTION

FIG. 74
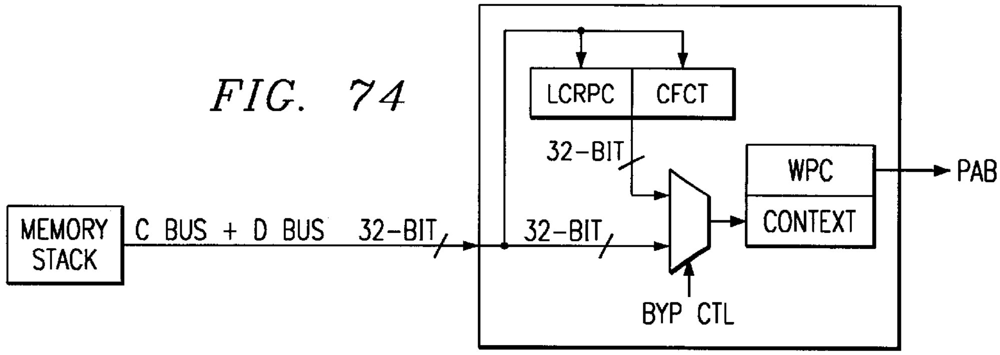
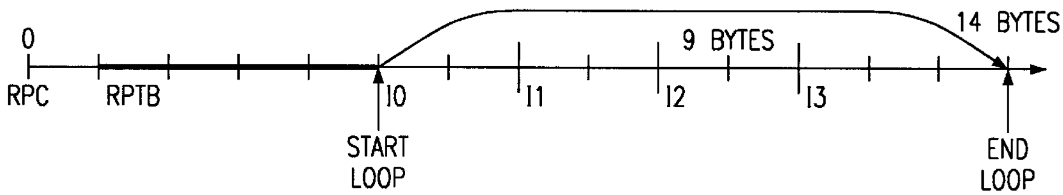
FIG. 75
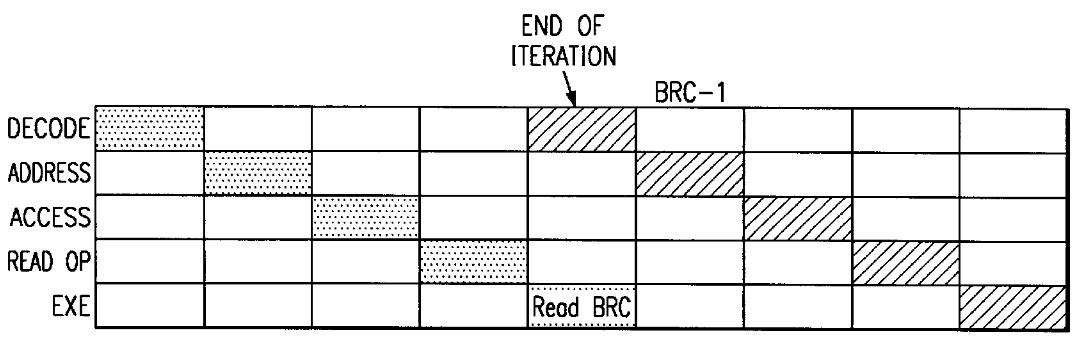
FIG. 76
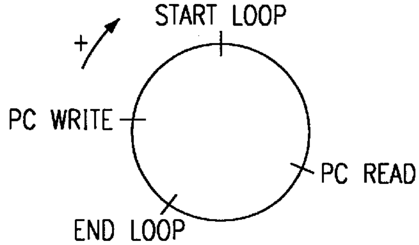
FIG. 77

1/jmp address is >= end of loop

```
START: RPTB
       I0
       I1
       JMP LABEL
       NOP
       NOP
END LOOP
LABEL: I2
```

2/ jmp address is < start of loop

```
LABEL: I2
START: RPTB
       I0
       I1
       JMP LABEL
       NOP
       NOP
END LOOP
```

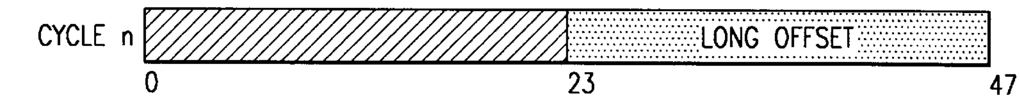
FIG. 86
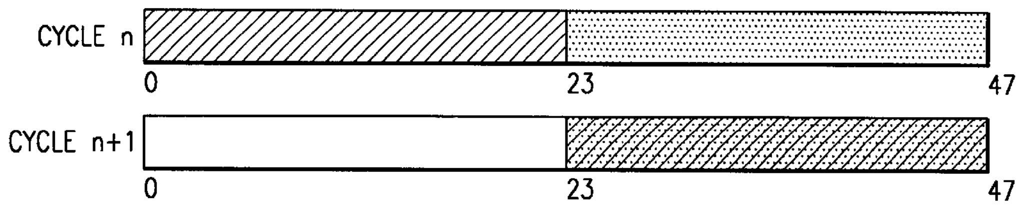
FIG. 87
FIG. 88
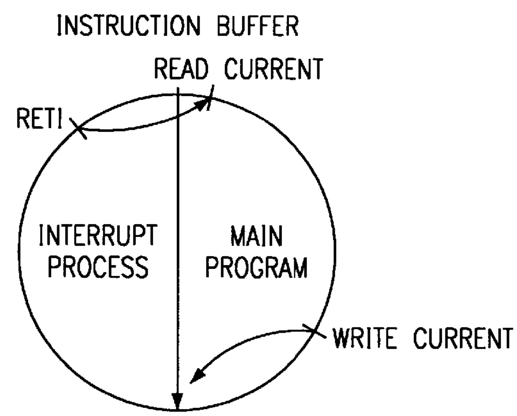
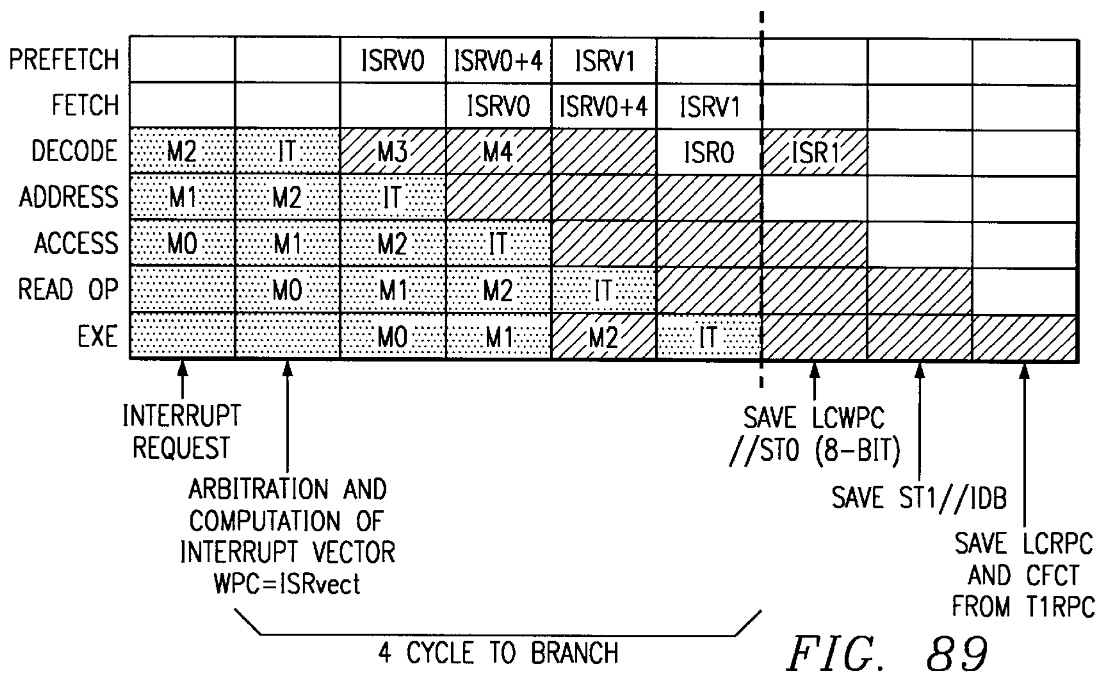
FIG. 89

@R1: PREVIOUS TARGET COMING FROM PREVIOUS INTERRUPT
@R0: PREVIOUS RETURN ADDRESS FROM SUBROUTINE
@C0: FUNCTION CALL ADDRESS
@ISR1: INSTRUCTION OF ISR1

@R1: PREVIOUS TARGET COMING FROM PREVIOUS INTERRUPT
@R0: PREVIOUS RETURN ADDRESS FROM SUBROUTINE
@C0: FUNCTION CALL ADDRESS
@ISR1: INSTRUCTION OF ISR1

| LEVEL | RPTB1 | RPTB2 | LOC1 | LOC2 | CODE |
|---|---|---|---|---|---|
| 0 | 0 | 0 | 0 | 0 | 0 |
| 1 | 0 | 0 | 0 | 0 | 1 |
| 1 | 1 | 0 | 0 | 0 | 2 |
| 1 | 1 | 0 | 1 | 0 | 3 |
| 2 | 0 | 0 | 0 | 0 | 4 |
| 2 | 0 | 1 | 0 | 0 | 5 |
| 2 | 0 | 1 | 0 | 1 | 6 |
| 2 | 1 | 1 | 0 | 0 | 7 |
| 2 | 1 | 1 | 0 | 1 | 8 |
| 2 | 1 | 1 | 1 | 1 | 9 |

| | | | | | | | | | |
|---|---|---|---|---|---|---|---|---|---|
| PREFETCH | | | | | nPC | +4 | +4 | +4 | +4 |
| FETCH | | | | | | nPC | +2 | +2 | +2 |
| DECODE | | I0 | CALL | | | | | | C0 |
| ADDRESS | | | I0 | CALL | CALL | CALL | CALL | CALL | |
| ACCESS | | | | I0 | I0 | I0 | I0 | I0 | CALL |
| READ | | | | I1 | I1 | I1 | I1 | I1 | I0 |
| EXE | | | | I2 | I2 | I2 | I2 | I2 | I1 |

CONFLICT ON DATA FLOW
>>> NO IMPACT ON PROGRAM FLOW

| | | | | | | | | | |
|---|---|---|---|---|---|---|---|---|---|
| PREFETCH | | | | | PC | PC | PC | PC | +4 |
| FETCH | | | | | | – | – | – | +2 |
| DECODE | I0 | I1 | I2 | I3 | I4 | I5 | I6 | I7 | I7 |
| ADDRESS | | I0 | I1 | I2 | I3 | I4 | I5 | I6 | I7 |
| ACCESS | | | I0 | I1 | I2 | I3 | I4 | I5 | I6 |
| READ | | | | I0 | I1 | I2 | I3 | I4 | I5 |
| EXE | | | | | I0 | I1 | I2 | I3 | I4 |

CONFLICT ON PROGRAM FLOW
>>> NO IMPACT ON DATA FLOW

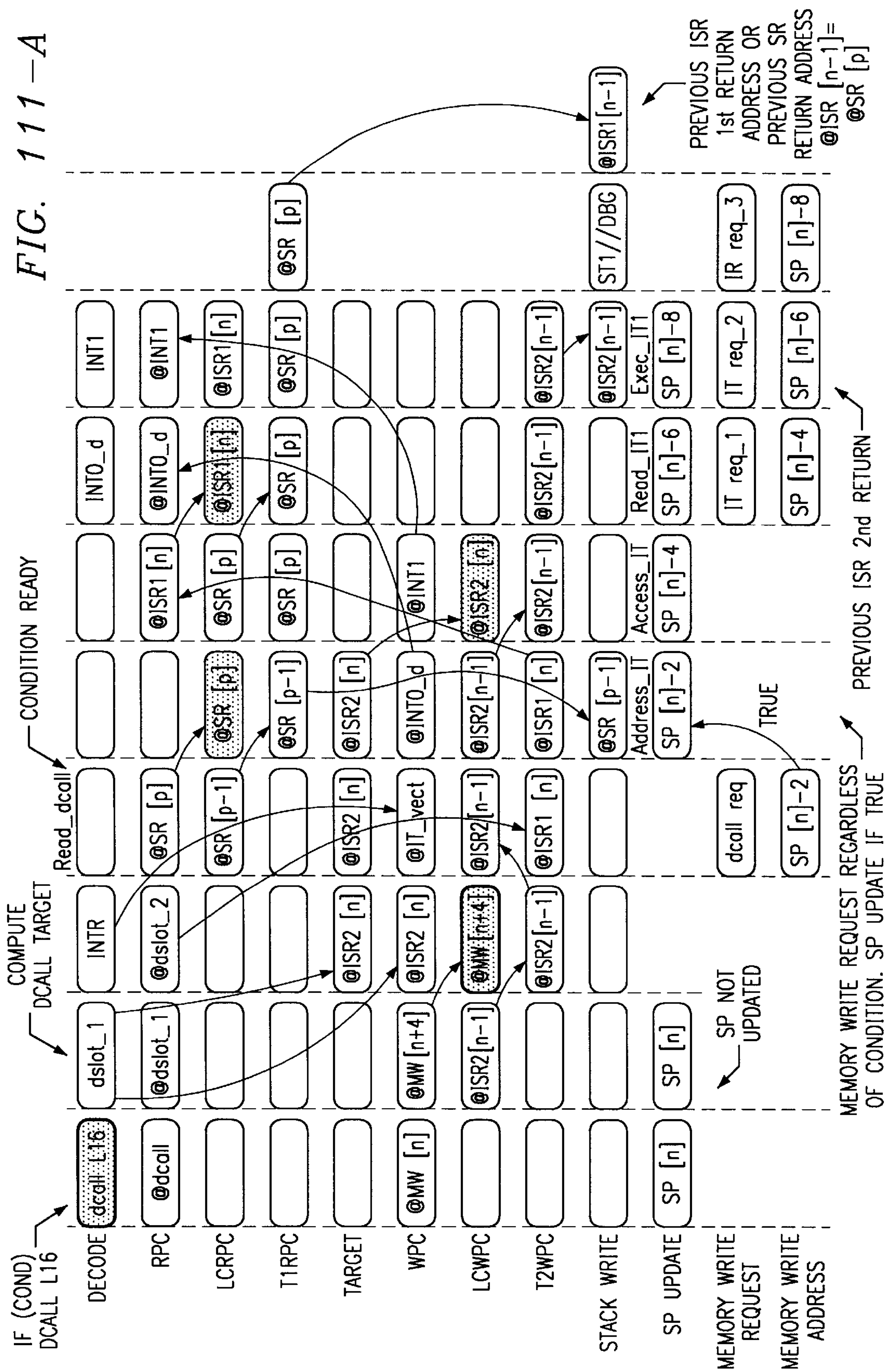
FIG. 111−A

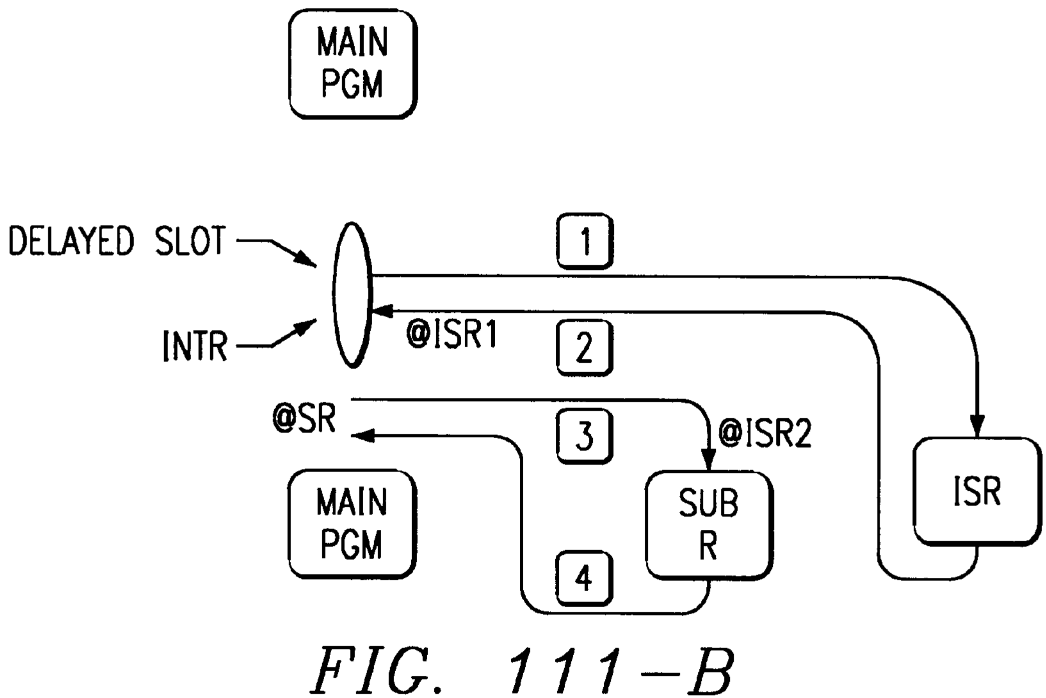
FIG. 111-B
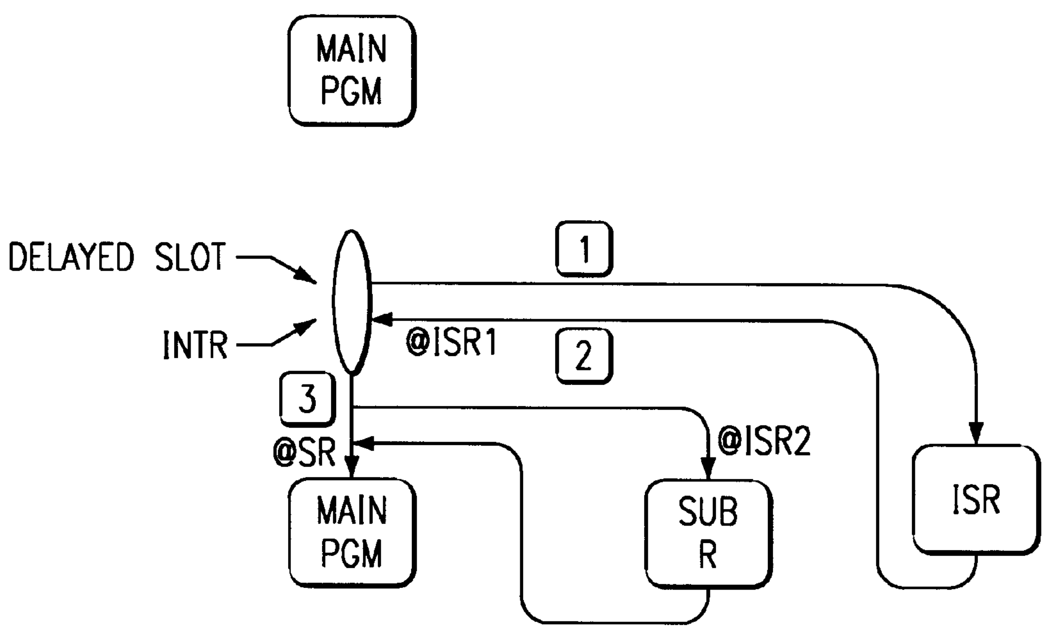
FIG. 112-B

FIG. 112-A
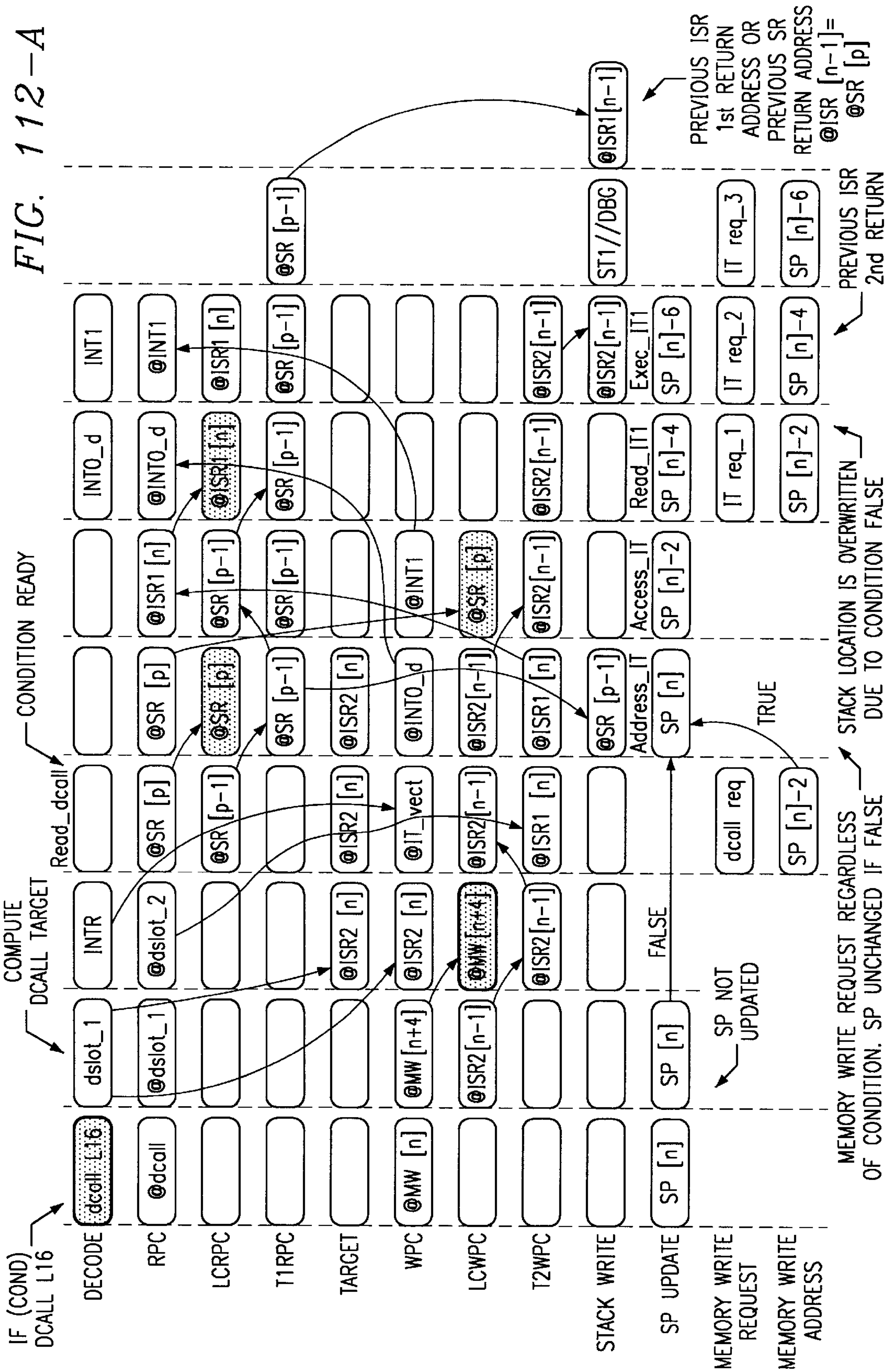

FIG. 134
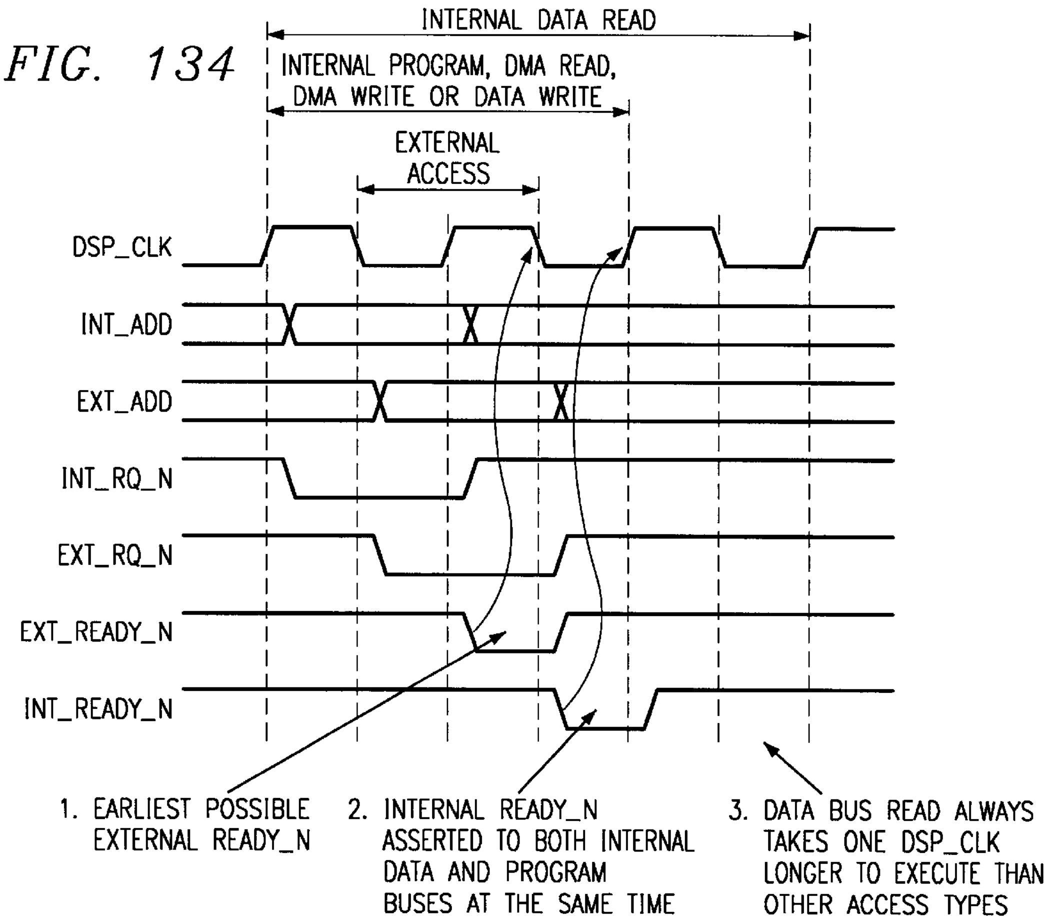
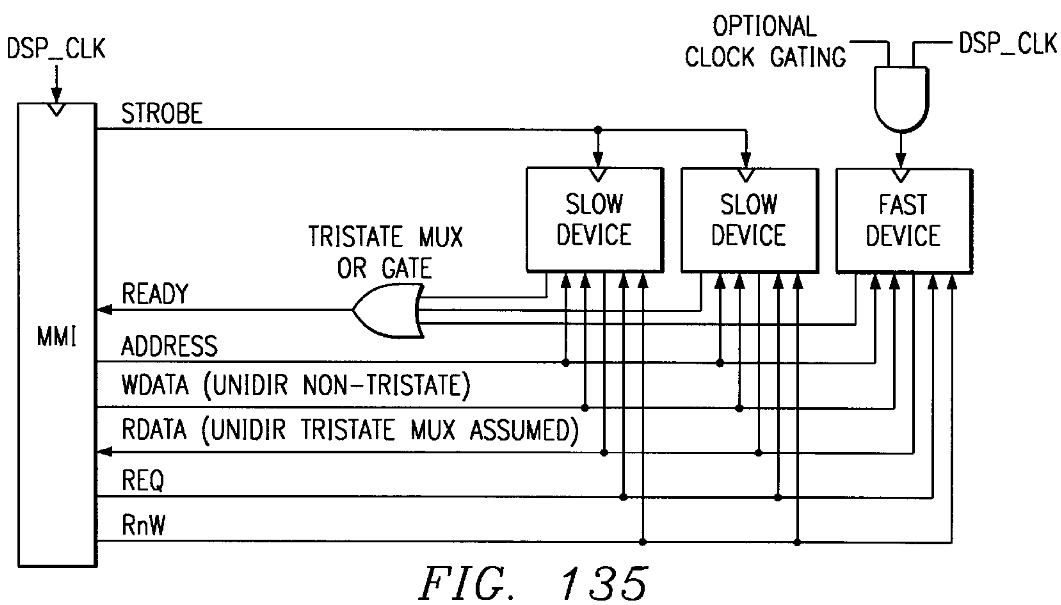
FIG. 135

FIG. 148
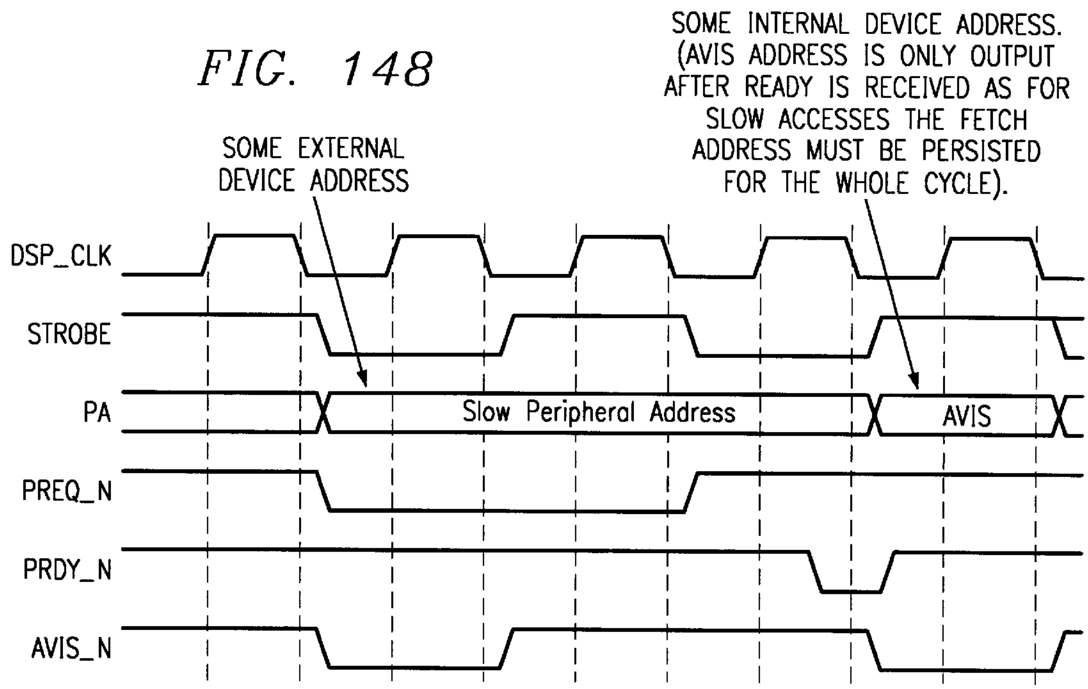
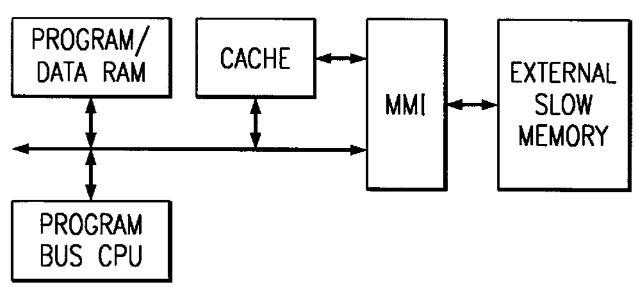
FIG. 149
FIG. 150
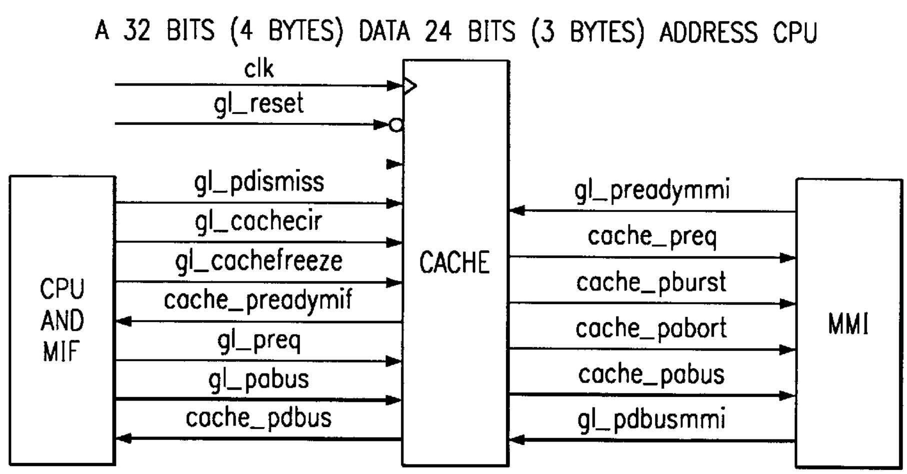

FIG. 153
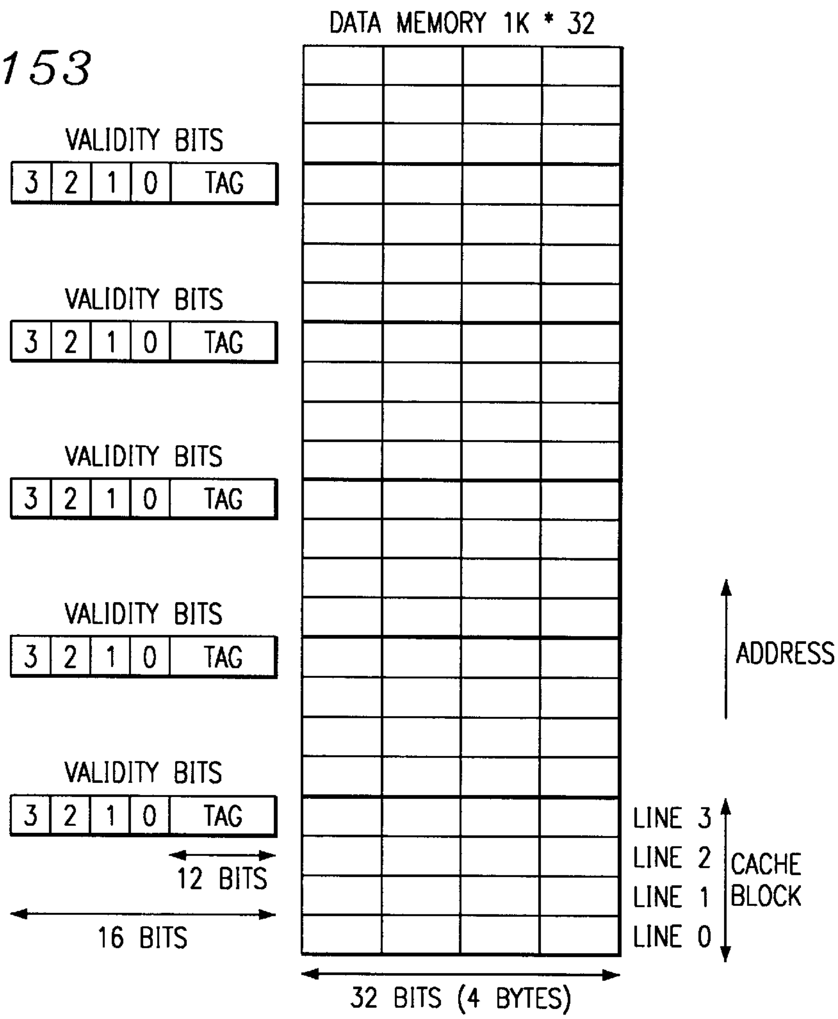
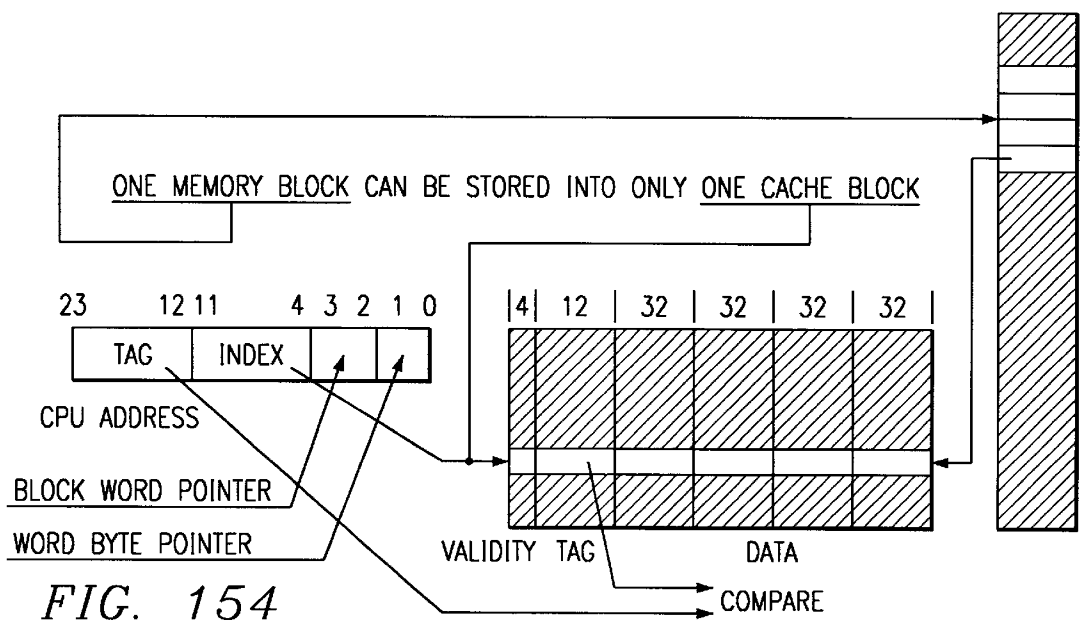
FIG. 154

MICROPROCESSORS

This application claims priority under 35 USC §119(e)(1) Application S.N. 98402455.4, filed in Europe on Oct. 6, 1998.

BACKGROUND OF THE INVENTION

The present invention relates to processors, and to the parallel execution of instructions in such processors.

It is known to provide for parallel execution of instructions in microprocessors using multiple instruction execution units. Several different architectures are known to provide for such parallel execution. Providing parallel execution increases the overall processing speed. Typically, multiple instructions are provided in parallel in an instruction buffer and these are then decoded in parallel and are dispatched to the execution units. Microprocessors are general purpose processors which require high instruction throughputs in order to execute software running thereon, which can have a wide range of processing requirements depending on the particular software applications involved. Moreover, in order to support parallelism, complex operating systems have been necessary to control the scheduling of the instructions for parallel execution.

Many different types of processors are known, of which microprocessors are but one example. For example, Digital Signal Processors (DSPs) are widely used, in particular for specific applications. DSPs are typically configured to optimize the performance of the applications concerned and to achieve this they employ more specialized execution units and instruction sets.

The present invention is directed to improving the performance of processors such as for example, but not exclusively, digital signal processors.

In modern processor design, it is desirable to reduce power consumption, both for ecological and economic grounds. Particularly, but not exclusively, in mobile processing applications, for example mobile telecommunications applications, it is desirable to keep power consumption as low as possible without sacrificing performance more than is necessary.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided a processor that is a programmable fixed point digital signal processor (DSP) with variable instruction length, offering both high code density and easy programming. Architecture and instruction set are optimized for low power consumption and high efficiency execution of DSP algorithms, such as for wireless telephones, as well as pure control tasks. The processor includes an instruction buffer unit, a program flow control unit, an address/data flow unit, a data computation unit, and multiple interconnecting buses. Dual multiply-accumulate blocks improve processing performance. A memory interface unit provides parallel access to data and instruction memories. The instruction buffer is operable to buffer single and compound instructions pending execution thereof. A decode mechanism is configured to decode instructions from the instruction buffer. The use of compound instructions enables effective use of the bandwidth available within the processor. A soft dual memory instruction can be compiled from separate first and second programmed memory instructions. Instructions can be conditionally executed or repeatedly executed. Bit field processing and various addressing modes, such as circular buffer addressing, further support execution of DSP algorithms. The processor includes a multistage execution pipeline with pipeline protection features. Various functional modules can be separately powered down to conserve power. The processor includes emulation and code debugging facilities with support for cache analysis.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which:

FIGS. 40A–C are block diagrams of Linear/circular post modification (PMU_X, PMU_Y, PMU_C);

FIG. 74 illustrates how to optimize performance wherein a bypass is implemented around LCRPC register;

FIG. 75 illustrates The End address of the loop will be computed by the ADDRESS pipeline;

FIG. 76 is a timing diagram illustrating BRC access during a loop;

FIG. 77 illustrates a Local Repeat Block;

FIG. 86 illustrates a Long Offset Instruction;

FIG. 87 illustrates the case of 24-bit long offset with 32-bit instruction format, the 24-bit long offset is read sequentially;

FIG. 88 illustrates an interrupt can be handled as a non delayed call function on the instruction buffer point of view;

FIG. 89 is a timing diagram illustrating an Interrupt in a regular flow;

FIG. 111 is a timing diagram illustrating an interrupt during delayed slot speculative flow of "if (cond) dcall L16", when the condition is true;

FIG. 112 is a timing diagram illustrating an interrupt during delayed slot speculative flow of "if (cond) dcall L16", when the condition is false;

FIG. 118 illustrates the two cases of single write/double read address overlap where the operand fetch involves the bypass path and the direct memory path;

FIG. 119 illustrates the two cases of double write/double read where memory locations overlap due to the 'address LSB toggle' scheme implemented in memory wrappers;

FIG. 120 is a stick chart illustrating dual access memory without bypass;

FIG. 121 is a stick chart illustrating dual access memory with bypass;

FIG. 122 is a stick chart illustrating single access memory without bypass;

FIG. 123 is a stick chart illustrating single access memory with bypass;

FIG. 124 is a stick chart illustrating slow access memory without bypass;

FIG. 125 is a stick chart illustrating slow access memory with bypass;

FIG. 126 is a timing diagram of the pipeline illustrating a current instruction reading a CPU resource updated by the previous one;

FIG. 127 is a timing diagram of the pipeline illustrating a current instruction reading a CPU resource updated by the previous one;

FIG. 128 is a timing diagram of the pipeline illustrating a current instruction scheduling a CPU resource update conflicting with an update scheduled by an earlier instruction;

FIG. 129 is a timing diagram of the pipeline illustrating two parallel instruction updating the same resource in the same cycle;

Figure 1:
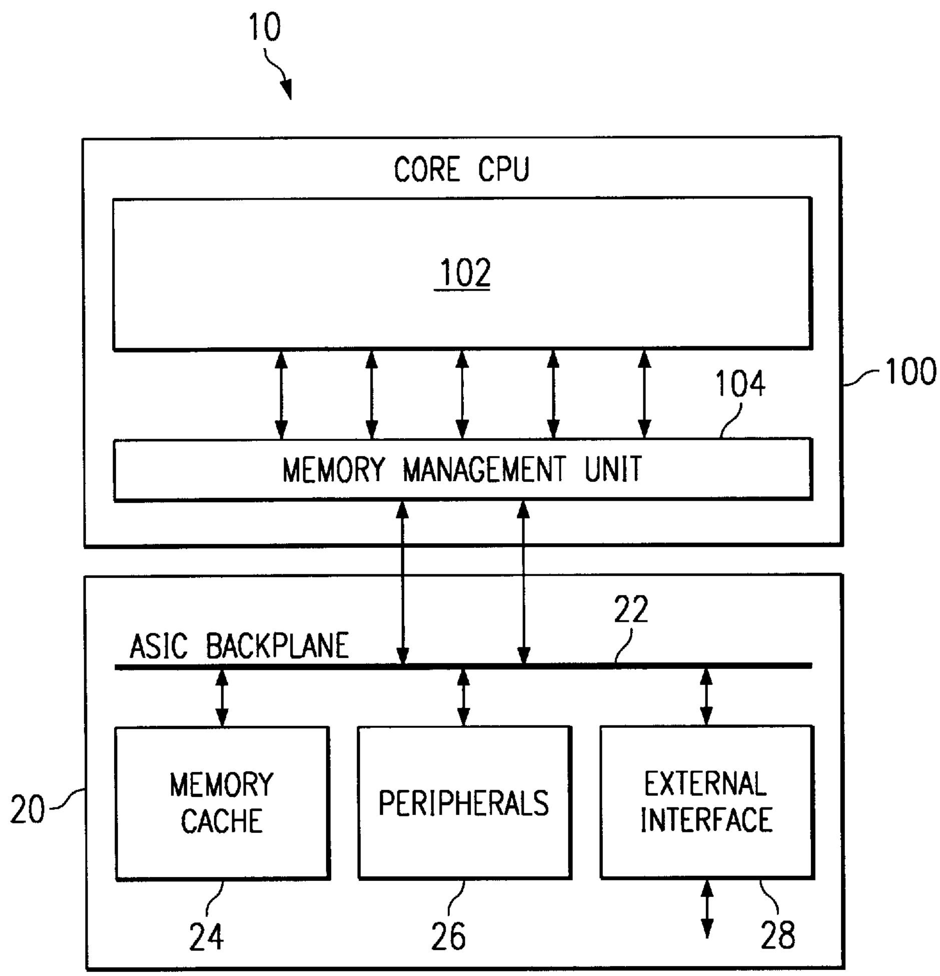
FIG. 1 is a schematic block diagram of a processor in accordance with an embodiment of the invention.
Figure 131:
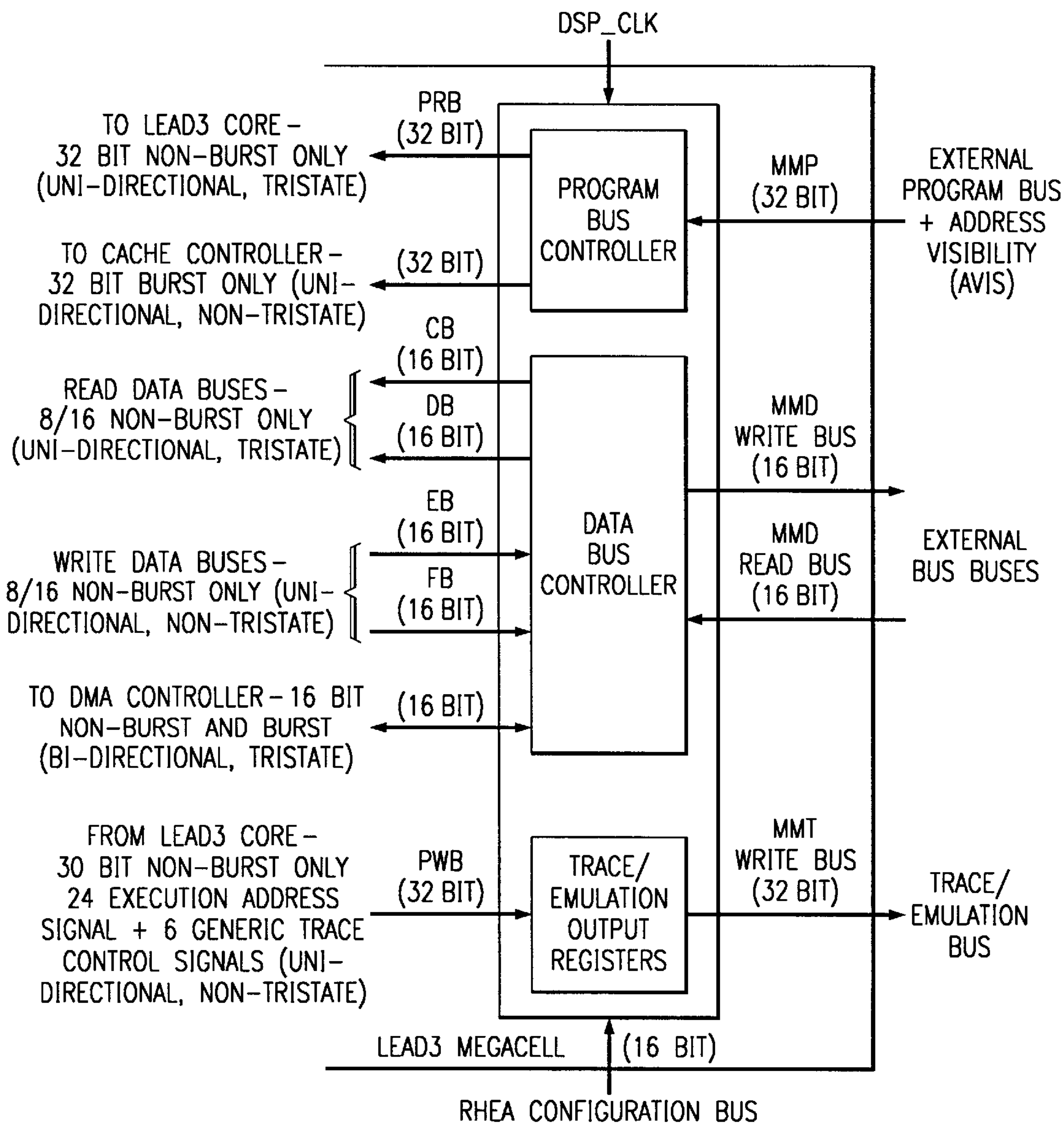
Figure 130:
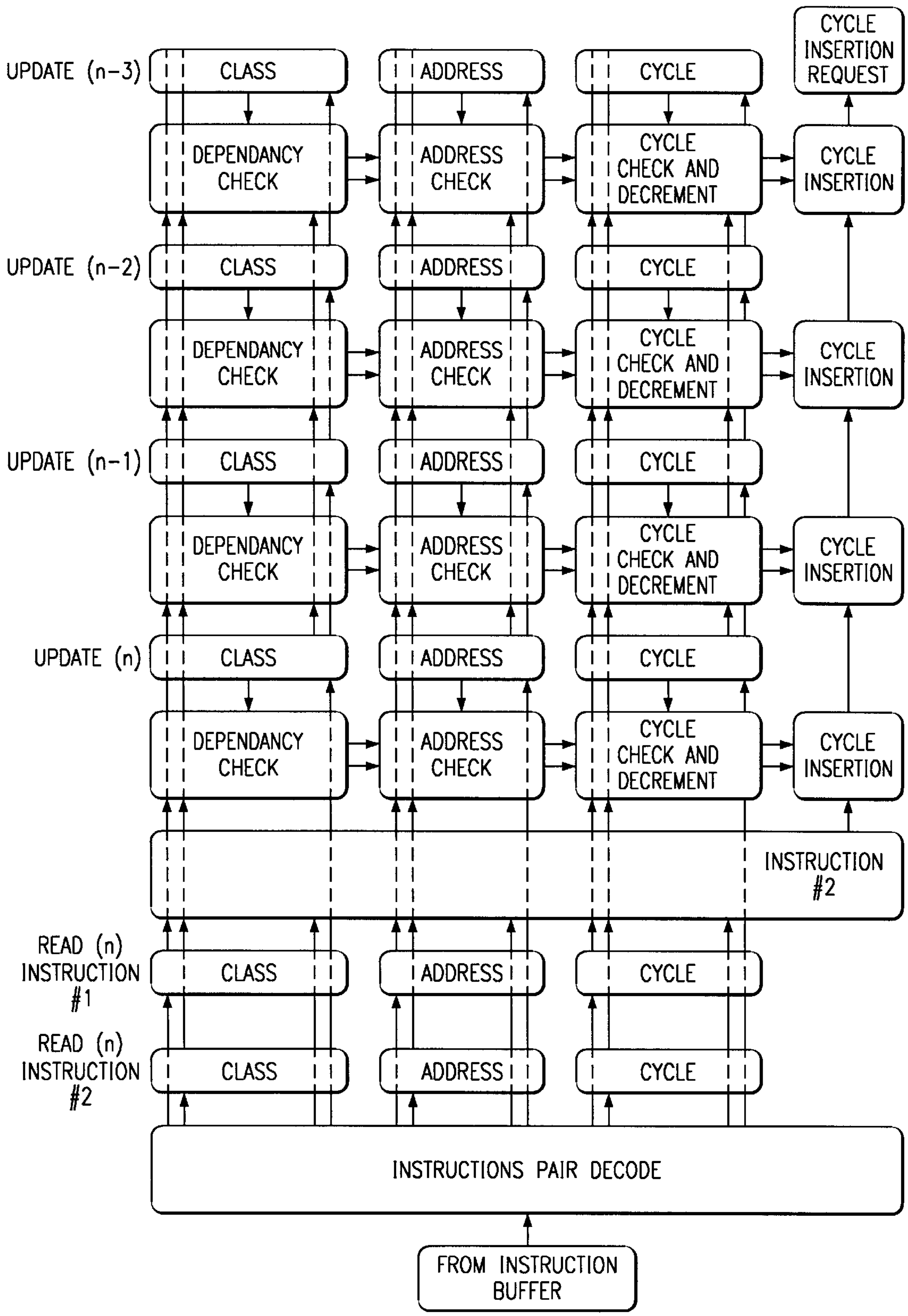
Figure 132:
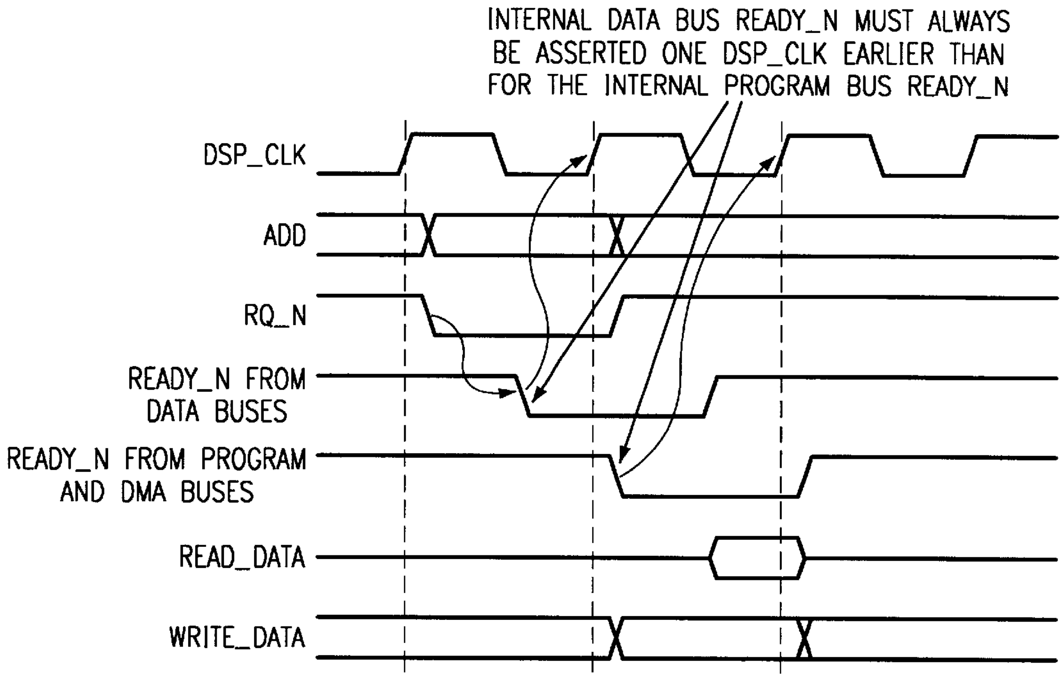
Figure 133:
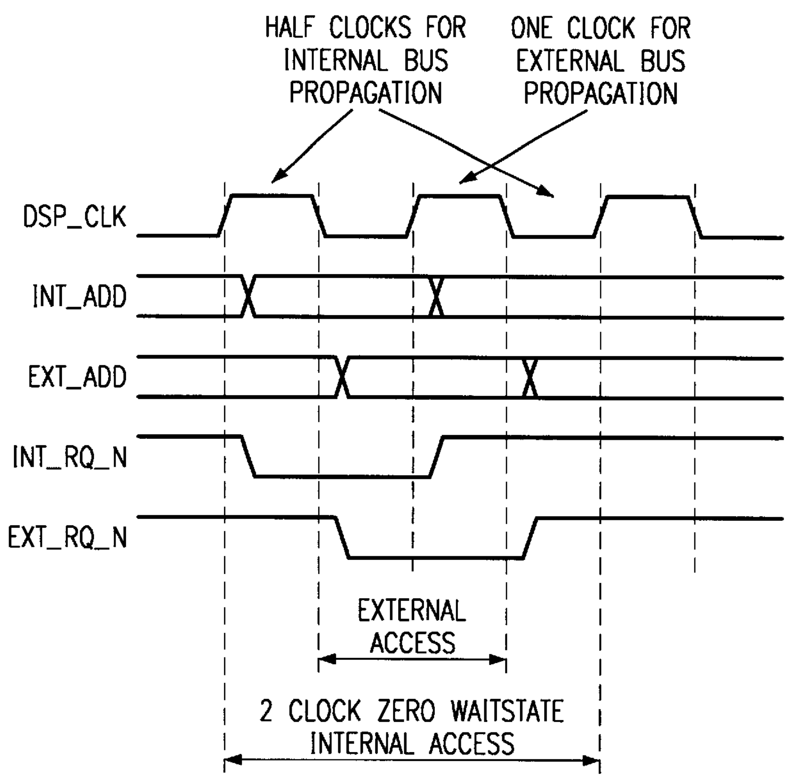
Figure 136:
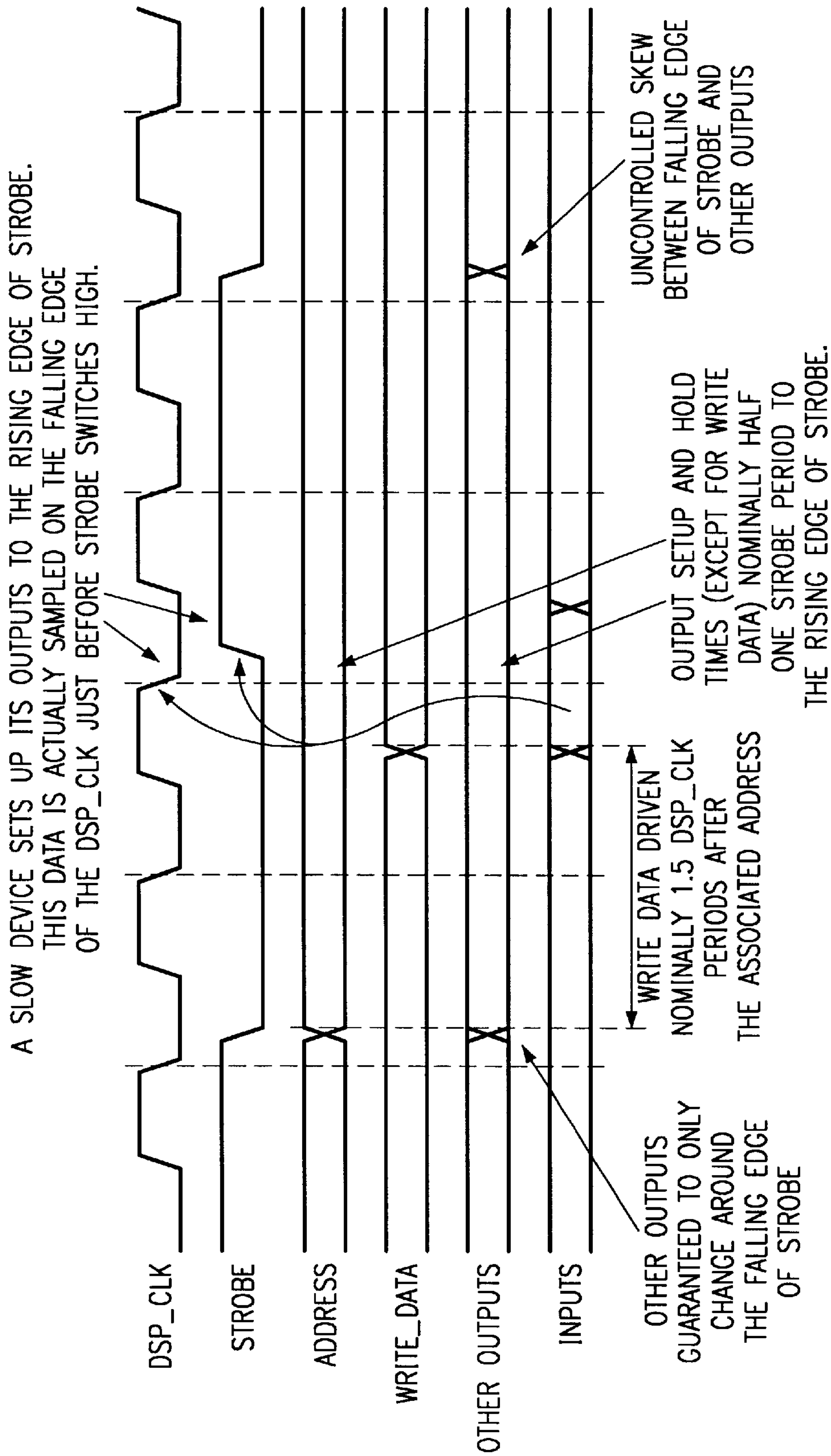
Figure 137:
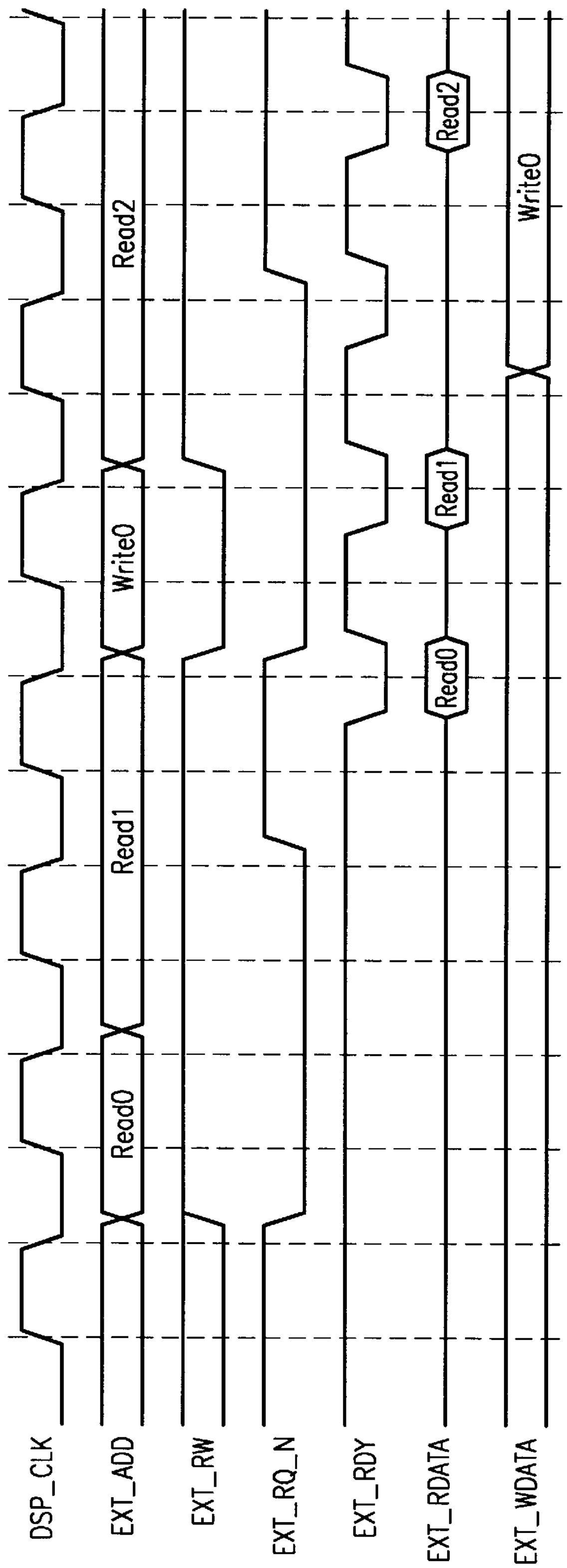
Figure 139:
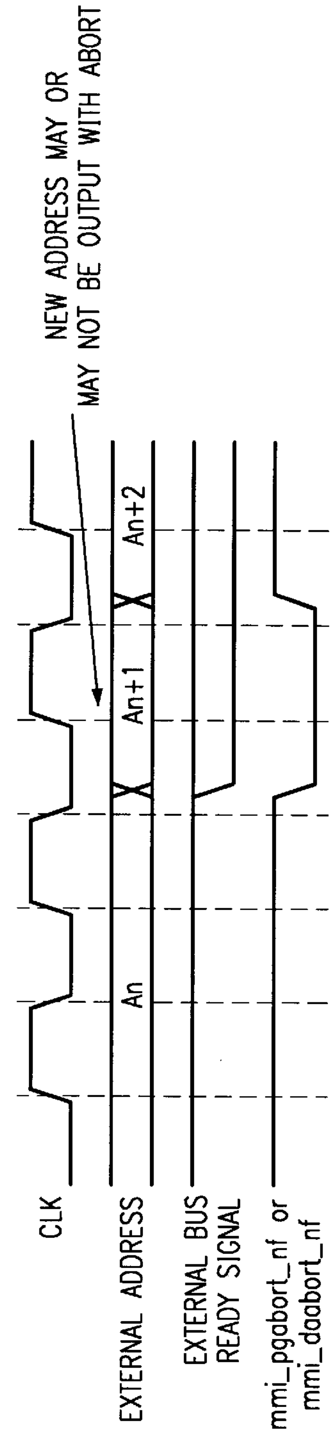
Figure 138:
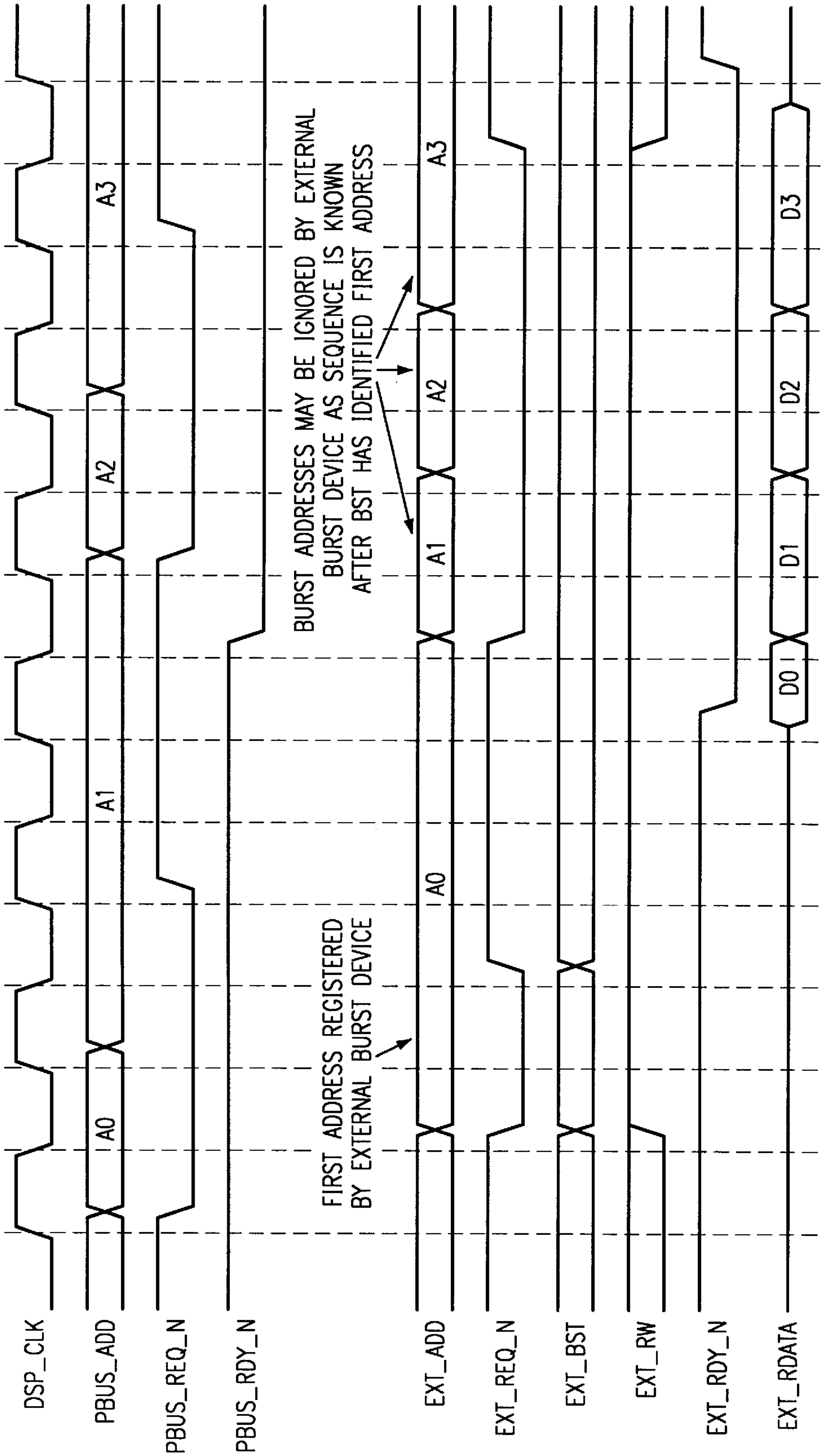
Figure 140:
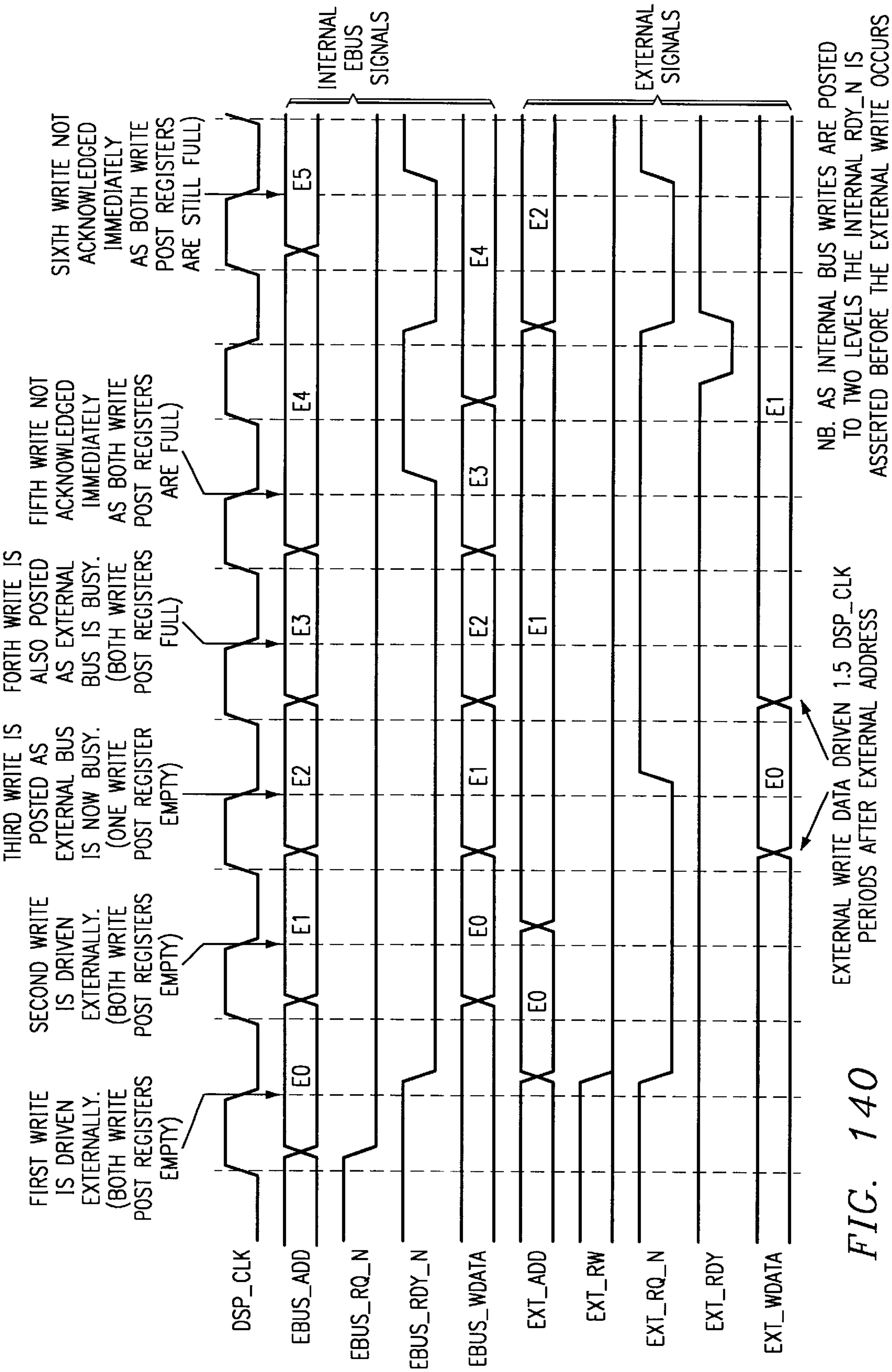
Figure 141:
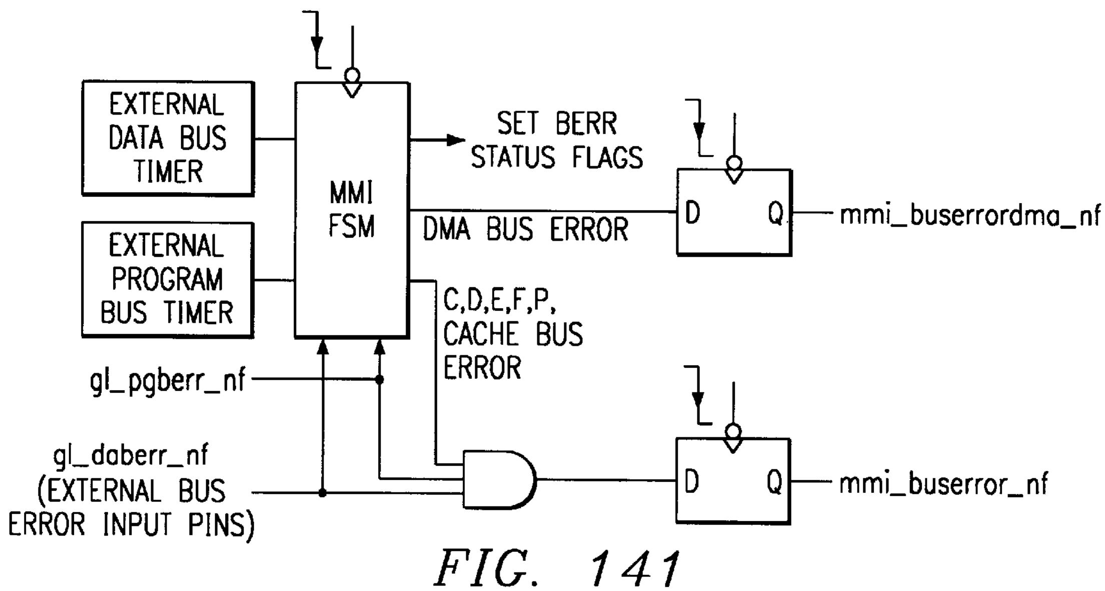
Figure 142:
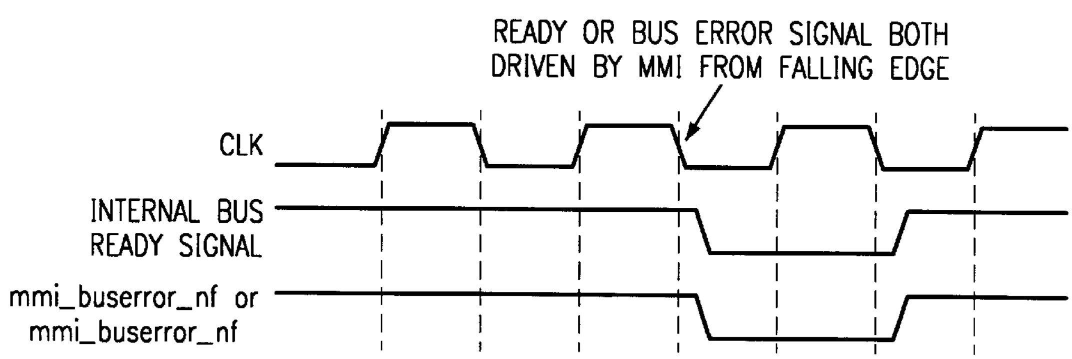
Figure 143:
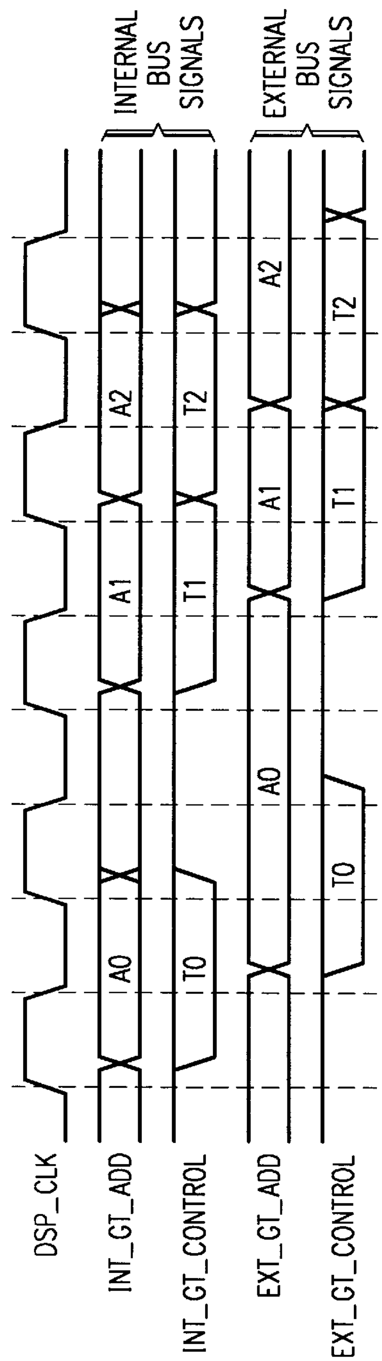
Figure 144:
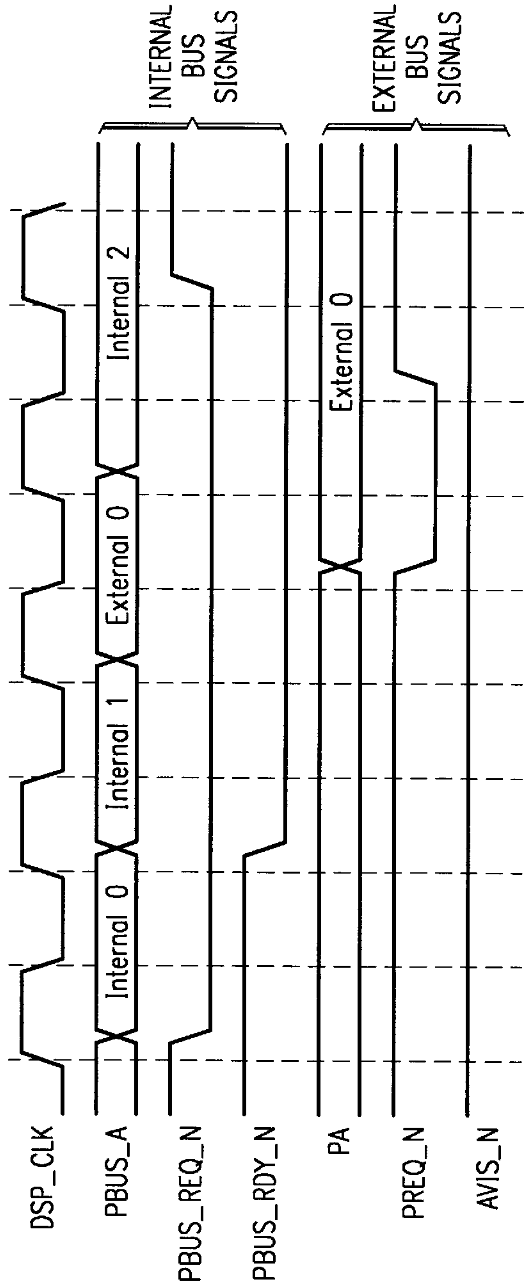
Figure 145:
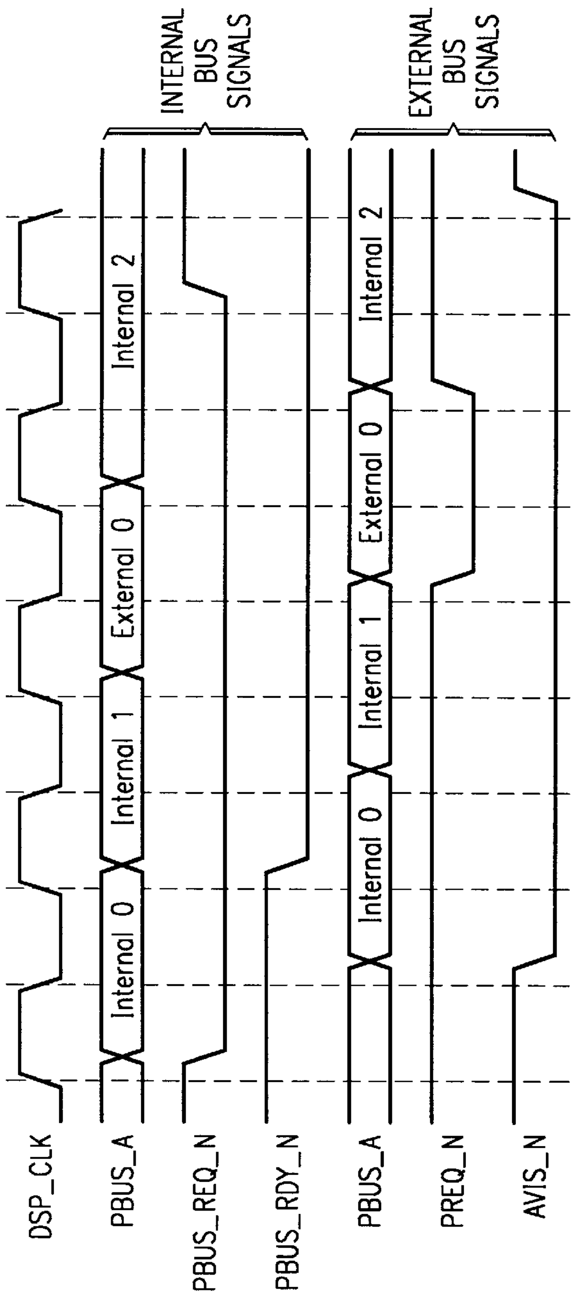
Figure 146:
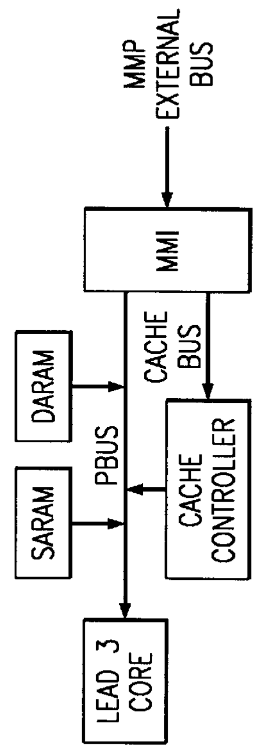
Figure 147:
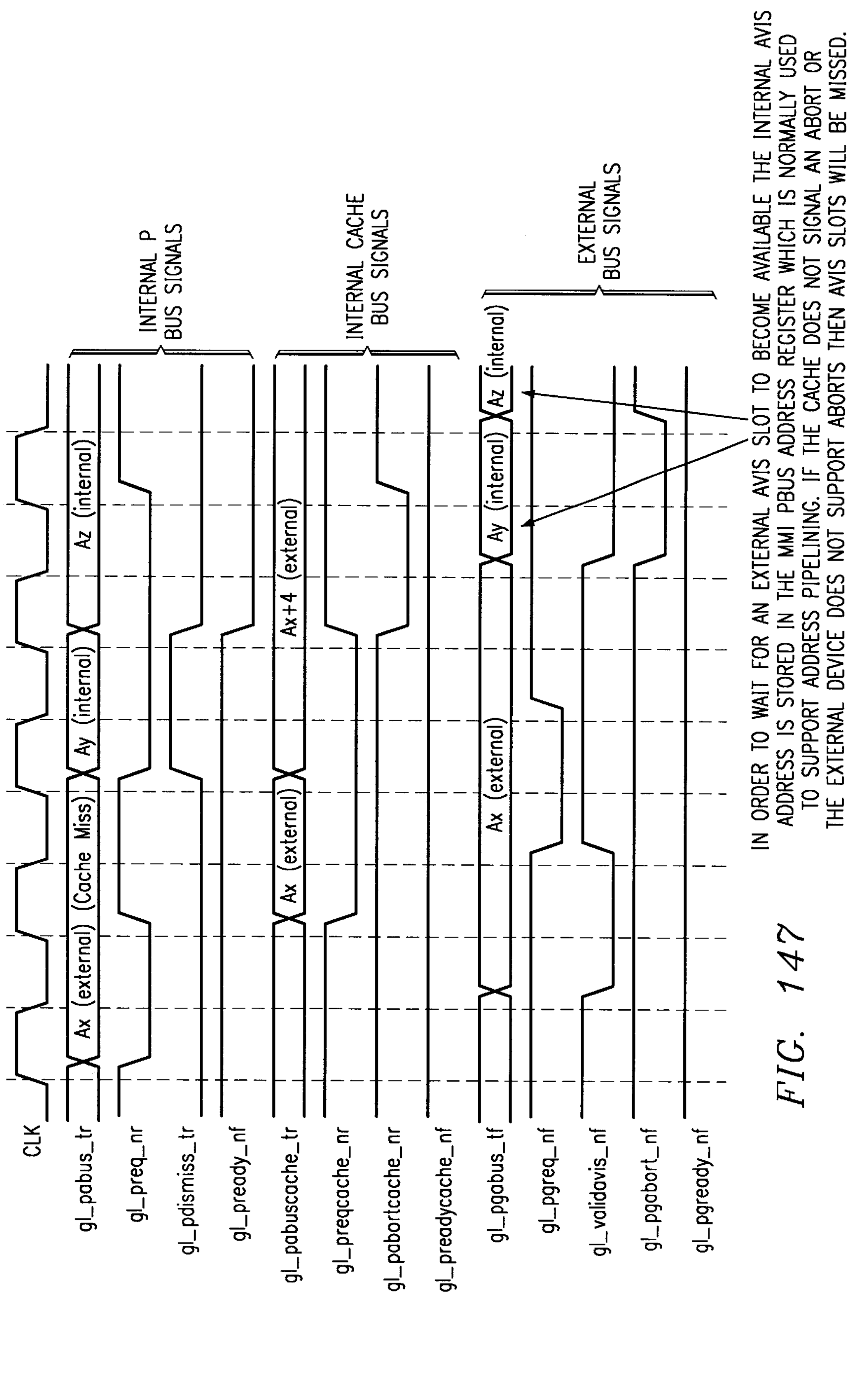
Figure 151:
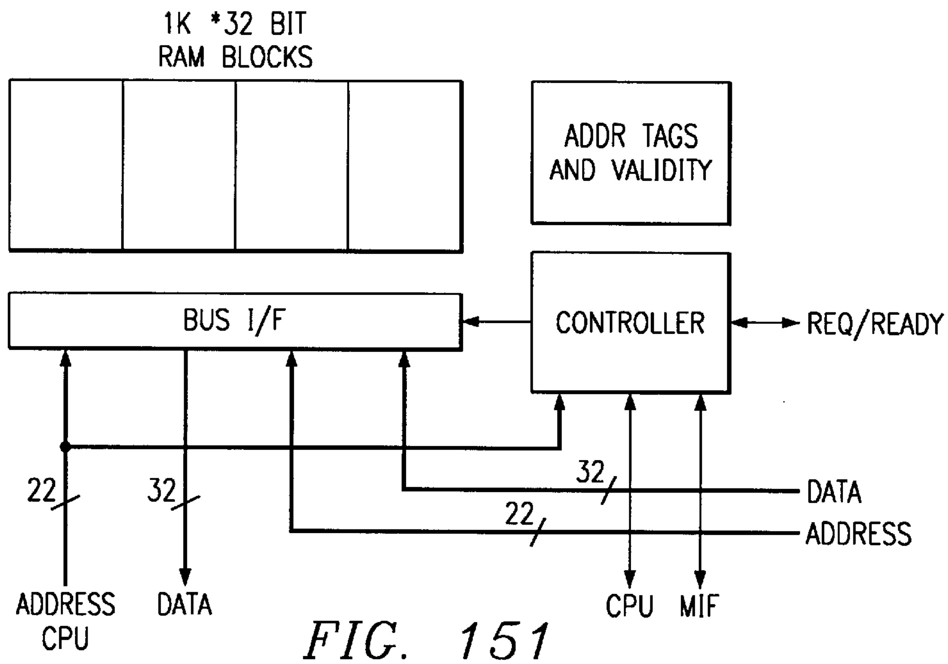
Figure 152:
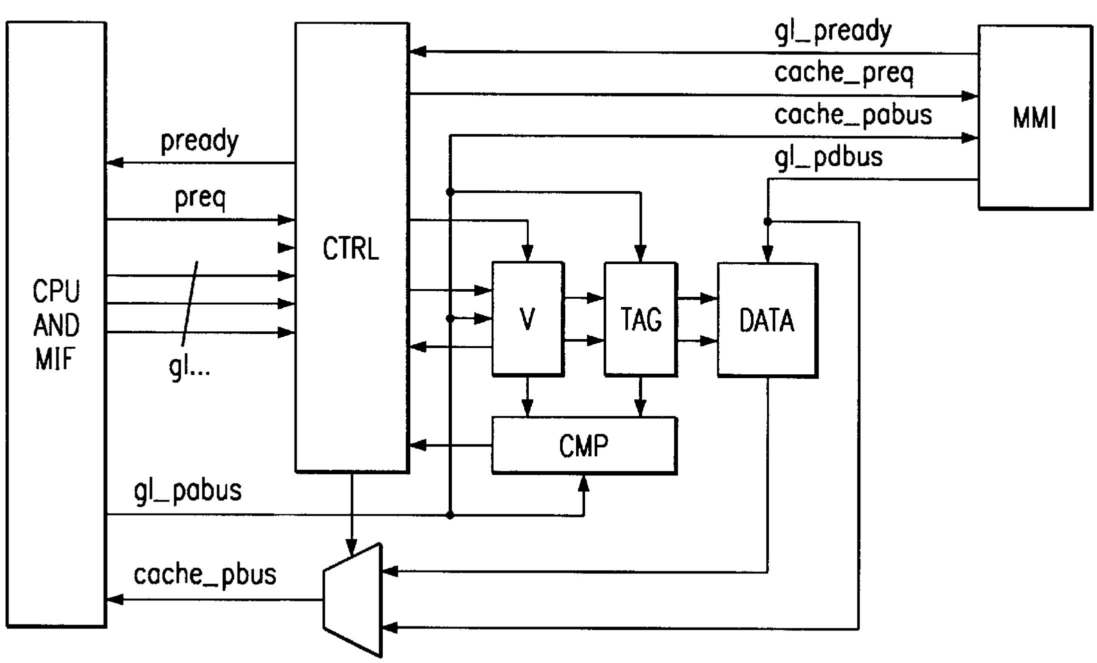
Figure 155:
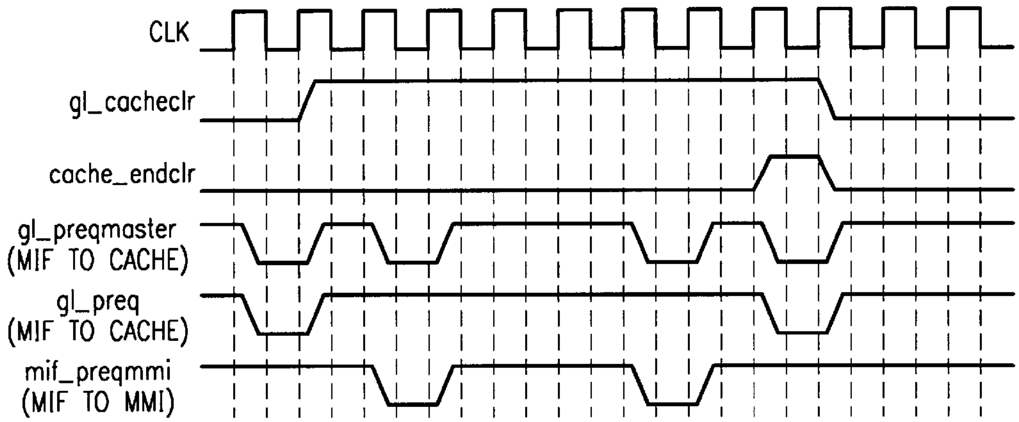
Figure 156:
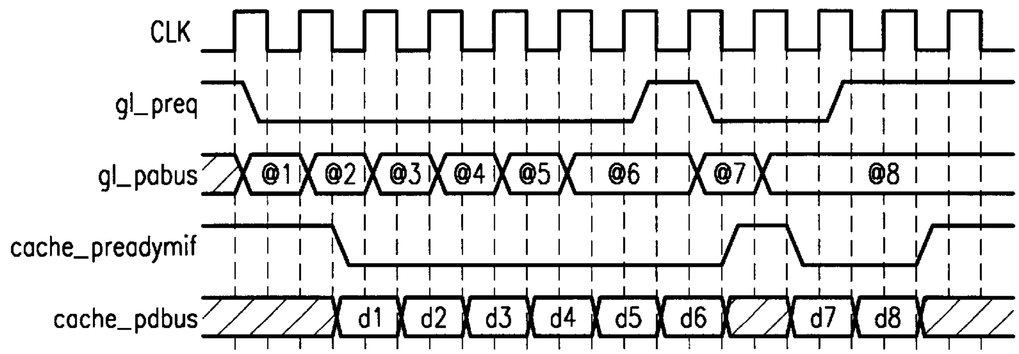
Figure 157:
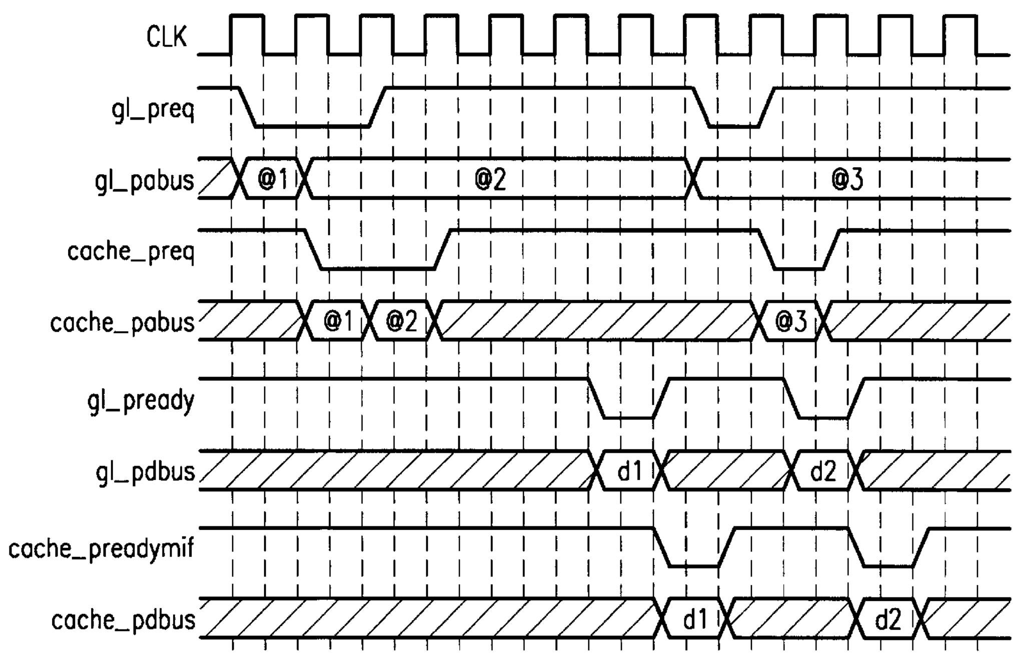
Figure 158:
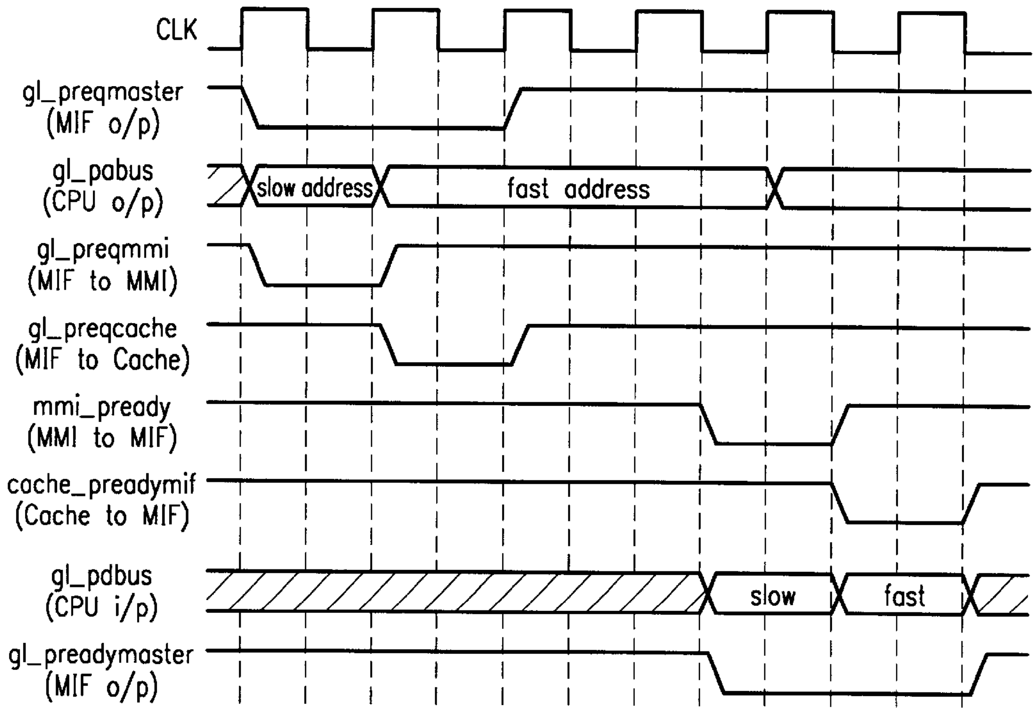
Figure 159:
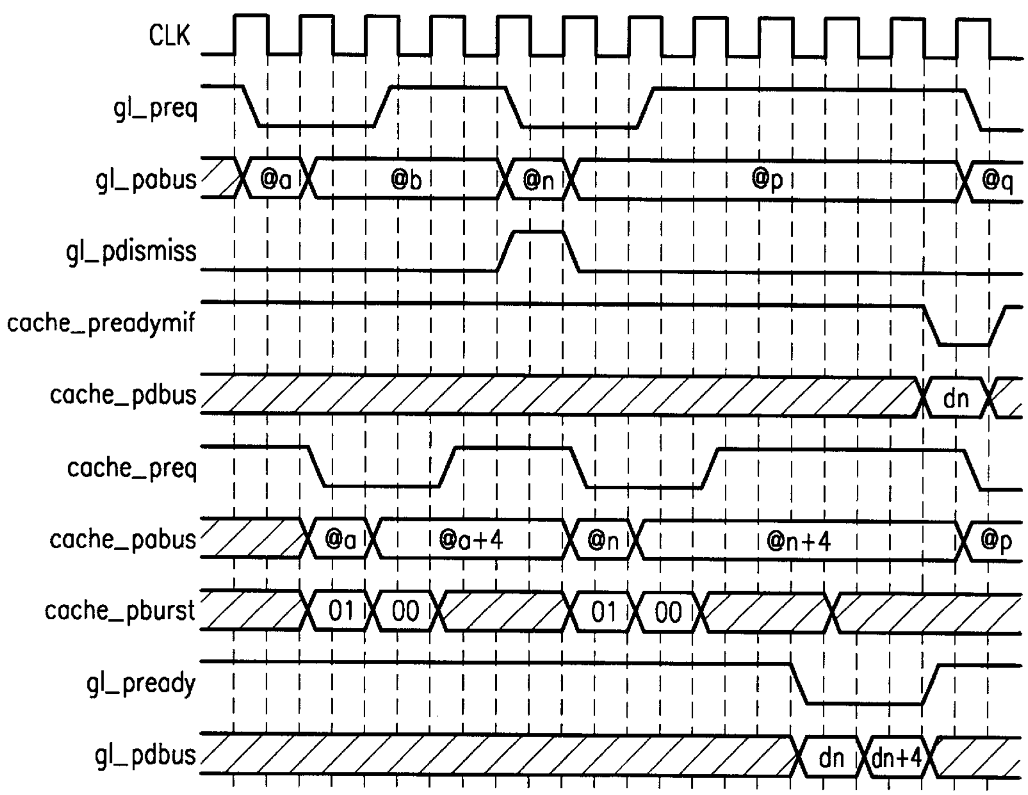
Figure 160:
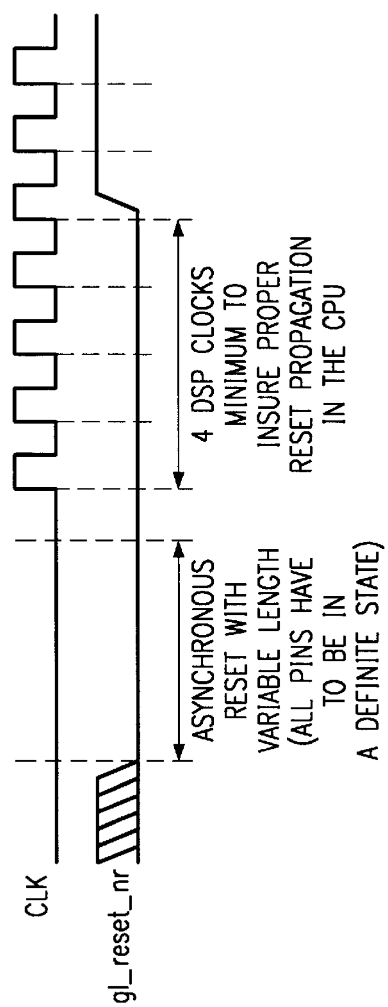
Figure 161:
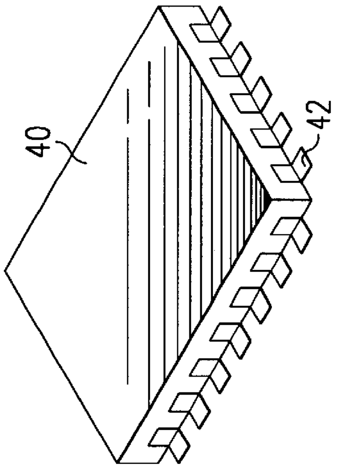
Figure 162:
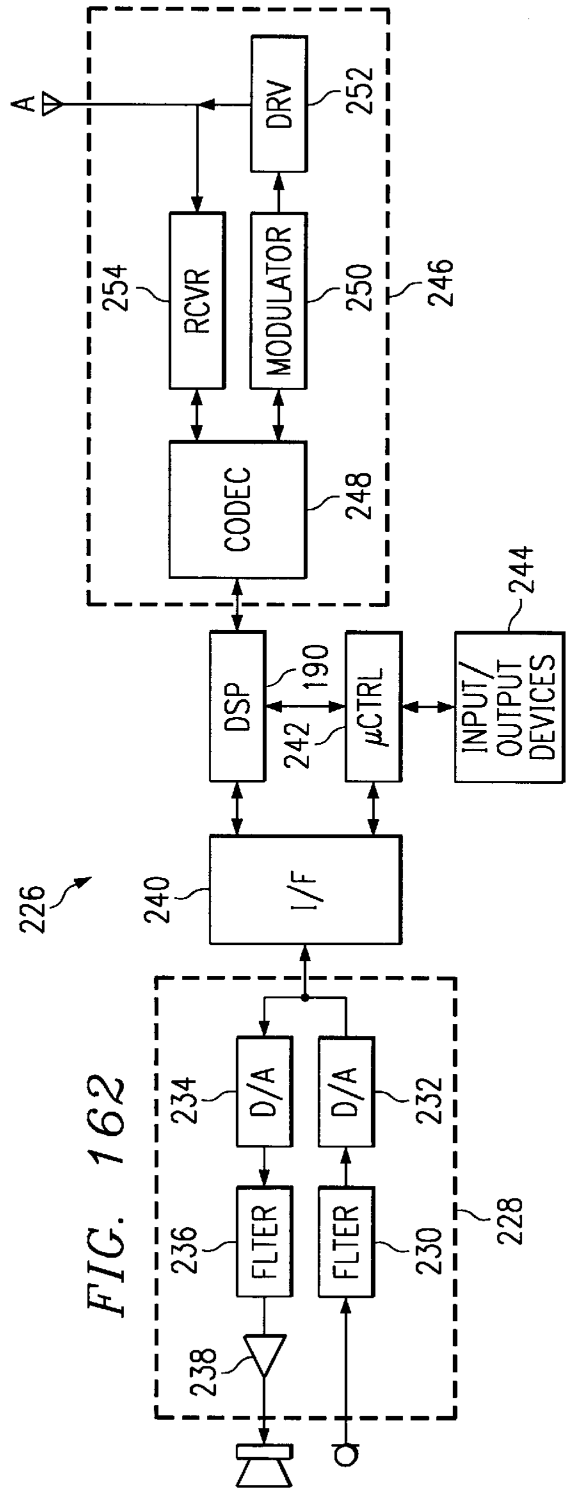

FIG. 130 is block diagram of the Pipeline protection circuitry;

FIG. 131 is a block diagram illustrating a memory interface for processor 100;

FIG. 132 is a timing diagram that illustrates a summary of internal program and data bus timings with zero waitstate;

FIG. 133 is a timing diagram illustrating external access position within internal fetch;

FIG. 134 is a timing diagram illustrating MMI External Bus Zero Waitstate Handshaked Accesses;

FIG. 135 is a block diagram illustrating the MMI External Bus Configuration;

FIG. 136 is a timing diagram illustrating Strobe Timing;

FIG. 137 is a timing diagram illustrating External pipelined Accesses;

FIG. 138 is a timing diagram illustrating a 3-1-1-1 External Burst Program Read sync to DSP_CLK with address pipelining disabled;

FIG. 139 is a timing diagram illustrating Abort Signaling to External Buses;

FIG. 140 is a timing diagram illustrating Slow External writes with write posting from Ebus sync to DSP_CLK with READY;

FIG. 141 is a block diagram illustrating circuitry for Bus Error Operation (emulation bus error not shown);

FIG. 142 is a timing diagram illustrating how a bus timer elapsing or an external bus error will be acknowledged in the same cycle as the bus error is signaled;

FIG. 143 shows the Generic Trace timing;

FIG. 144 is a timing diagram illustrating a Zero Waitstate Pbus fetches with Cache and AVIS disabled;

FIG. 145 is a timing diagram illustrating a Zero Waitstate Pbus fetches with Cache disabled and AVIS enabled;

FIG. 146 is a block diagram of the Pbus Topology;

FIG. 147 is a timing diagram illustrating AVIS with the Cache Controller enabled and aborts supported;

FIG. 148 is a timing diagram illustrating AVIS Output Inserted into Slow External Device Access;

FIG. 149 is a block diagram of a digital system with a cache according to aspects of the present invention;

FIG. 150 is a block diagram illustrating Cache Interfaces, according to aspects of the present invention;

FIG. 151 is a block diagram of the Cache;

FIG. 152 is a block diagram of a Direct Mapped Cache with word by word fetching;

FIG. 153 is a diagram illustrating Cache Memory Structure which shows the memory structure for a direct mapped memory;

FIG. 154 is a block diagram illustrating an embodiment of a Direct Mapped Cache Organization;

FIG. 155 is a timing diagram illustrating a Cache clear sequence;

FIG. 156 is a timing diagram illustrating the CPU—Cache Interface when a Cache Hit occurs;

FIG. 157 is a timing diagram illustrating the CPU—Cache—MMI Interface when a Cache Miss occurs;

FIG. 158 is a timing diagram illustrating a Serialization Error;

FIG. 159 is a timing diagram illustrating the Cache—MMI Interface Dismiss Mechanism;

FIG. 160 is a timing diagram illustrating Reset Timing;

FIG. 161 is a schematic representation of an integrated circuit incorporating the processor of FIG. 1; and FIG. 162 is a schematic representation of a telecommunications device incorporating the processor of FIG. 1.

DESCRIPTION OF THE PREFERRED EMBODIMENTS

Although the invention finds particular application to Digital Signal Processors (DSPs), implemented for example in an Application Specific Integrated Circuit (ASIC), it also finds application to other forms of processors.

Referring to FIG. 1, digital system 10 includes a processor 100 and a processor backplane 20. In a particular example of the invention, the digital system is a Digital Signal Processor System (DSP) 10 implemented in an Application Specific Integrated Circuit (ASIC). The basic architecture of an example of a processor according to the invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

Several example systems which can benefit from aspects of the present invention are described in U.S. Pat. No. 5,072,418, which is incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such. U.S. Pat. No. 5,329,471 issued to Gary Swoboda, et al, describes in detail how to test and emulate a DSP and is incorporated herein by reference.

As shown in FIG. 1, processor 100 forms a central processing unit (CPU) with a processing core 102 and a memory interface unit 104 for interfacing the processing core 102 with memory units external to the processor core 102. Processor backplane 20 comprises a backplane bus 22, to which the memory management unit 104 of the processor is connected. Also connected to the backplane bus 22 is an instruction cache memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Processor 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 2:
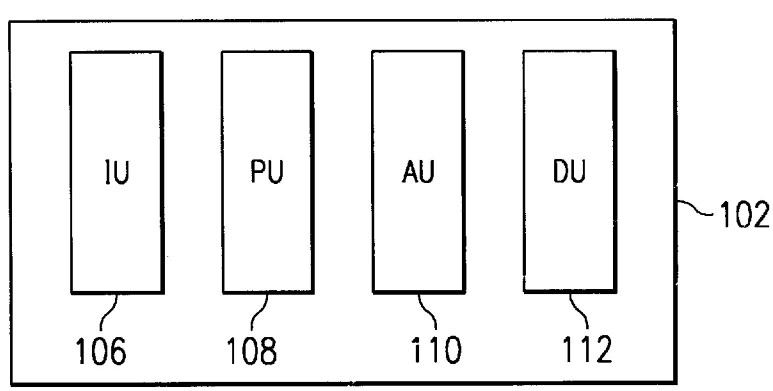
FIG. 2 is a schematic diagram of a core of the processor of FIG. 1.

FIG. 2 illustrates the basic structure of an embodiment of the processing core 102. As illustrated, this embodiment of the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) for executing instructions decoded from the Instruction Buffer Unit (I Unit) 106 and for controlling and monitoring program flow.

Figure 3:
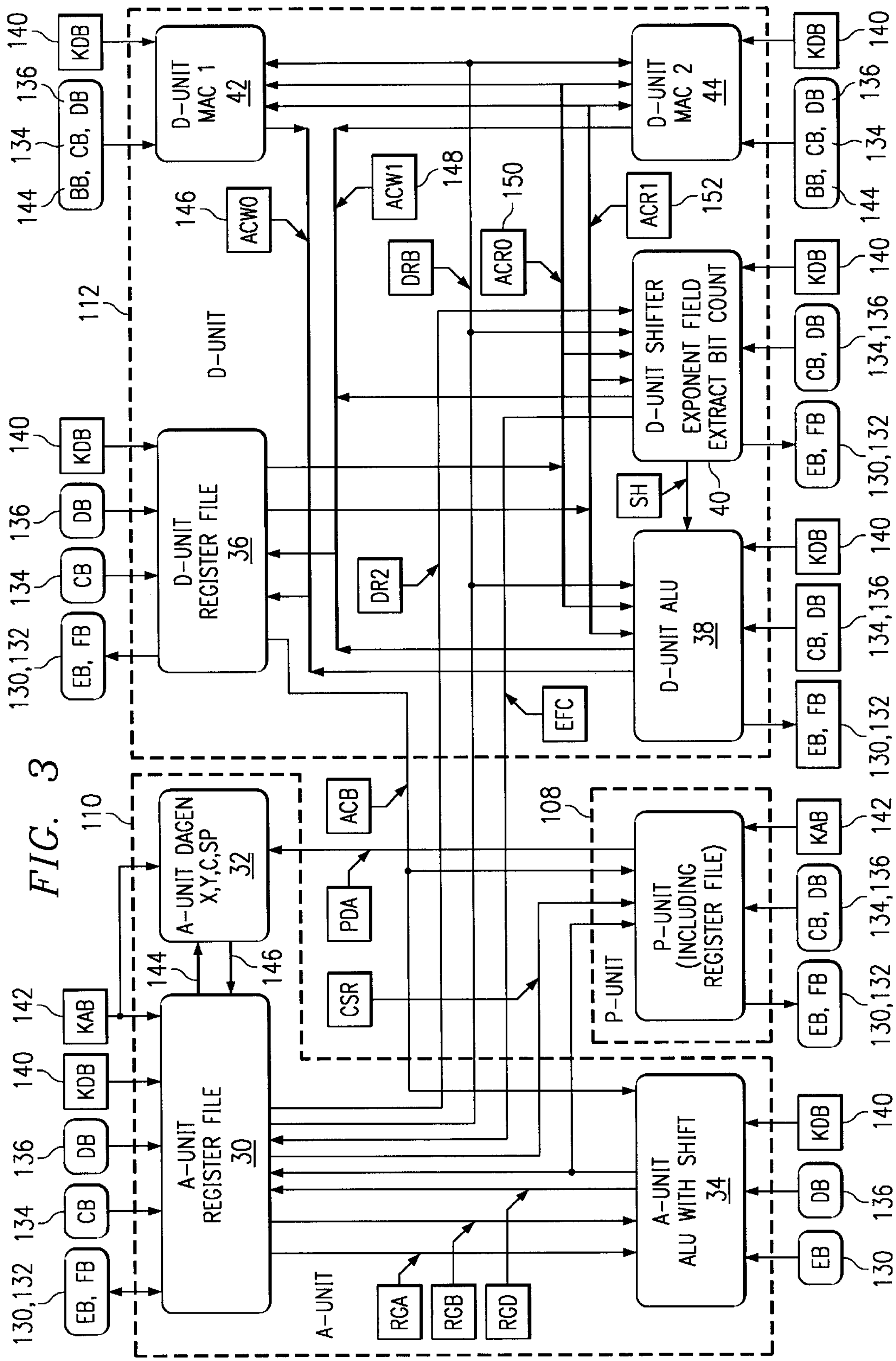
FIG. 3 is a more detailed schematic block diagram of various execution units of the core of the processor.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142.

Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation subunit (DAGEN) 32 and an Arithmetic and Logic Unit (ALU) 34. The A Unit register file 30 includes various registers, among which are 16 bit pointer registers (AR0–AR7) and data registers (DR0—DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB,DB) 130,136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to buses (EB,FB,CB,DB and KDB) 130, 132, 134, 136 and 140, and the MAC units 42 and 44 are coupled to the buses (CB,DB, KDB) 134, 136, 140 and Data Read bus (BB) 144. The D Unit register file 36 includes 40-bit accumulators (AC0, . . . , AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are also coupled to subunits of the A Unit 108 via various buses labeled EFC, DRB, DR2 and ACB.

Figure 4:
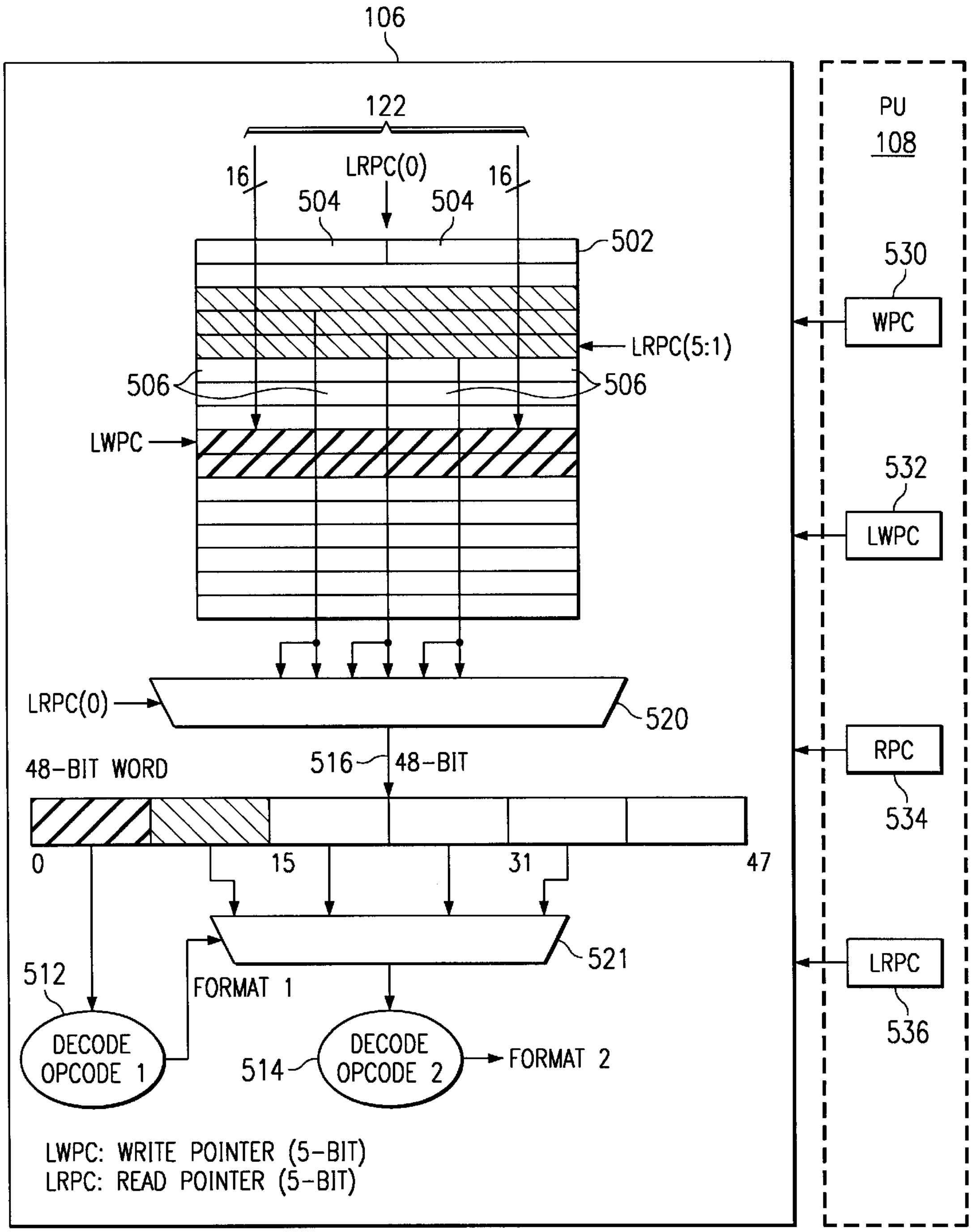
FIG. 4 is a schematic diagram of an instruction buffer queue and an instruction decoder of the processor.

Referring now to FIG. 4, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexors 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexors 520 and 521.

Figure 5:
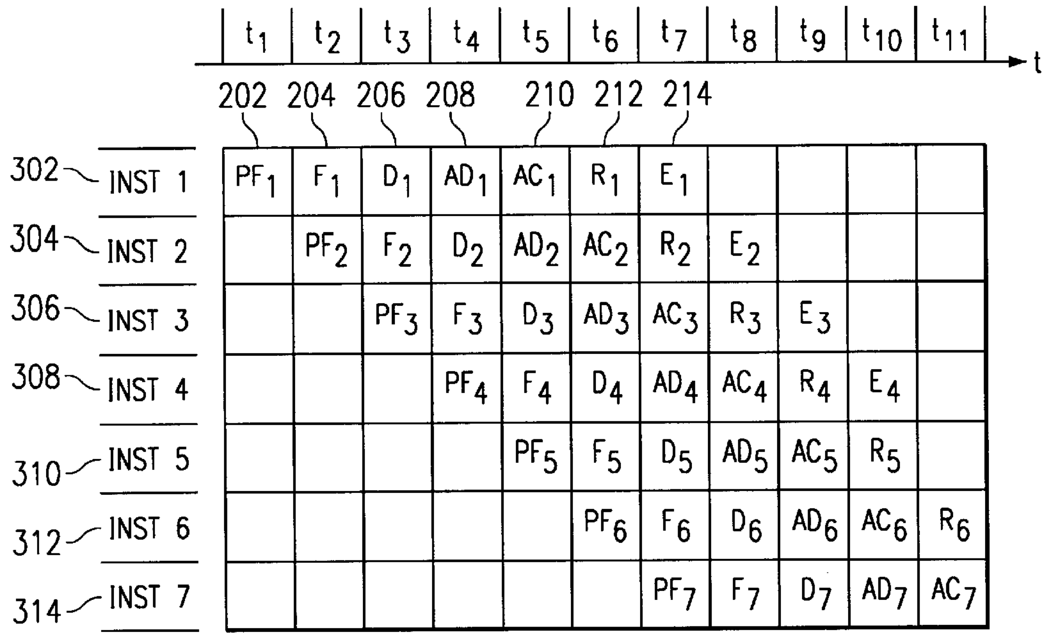
FIG. 5 show the basic principle of operation for a pipeline processor.

Processor core 102 executes instructions through a 7 stage pipeline, the respective stages of which will now be described with reference to Table 1 and to FIG. 5. The processor instructions are executed through a 7 stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 1 the processor pipeline description for a single cycle instruction with no memory wait states

| | |
|---|---|
| PRE-FETCH P0 | Address program memory via the program address bus PAB. |

TABLE 1-continued

| the processor pipeline description for a single cycle instruction with no memory wait states | |
|---|---|
| FETCH P1 | Read program memory through the program bus PB.<br>Fill instruction buffer queue with the 4 bytes fetched in program memory. |
| DECODE P2 | Read instruction buffer queue (6 bytes)<br>Decode instruction pair or single instruction.<br>Dispatch instructions on Program Flow Unit (PU), Address Data Flow Unit (AU), and Data Computation Unit (DU). |
| ADDRESS P3 | Data address computation performed in the 3 address generators located in AU:<br>- Pre-computation of address to be generated in :<br>- direct SP/DP relative addressing mode.<br>- indirect addressing mode via pointer registe rs.<br>- Post-computation on pointer registers in :<br>- indirect addressing mode via pointer registe rs.<br><br>Program address computation for PC relative branching instructions : goto, call, switch. |
| ACCESS P4 | Read memory operand address generation on BAB, CAB, DAB buses.<br><br>Read memory operand on CB bus (Ymem operand). |
| READ P5 | Read memory operand address on DB (Smem, Xmem operand), on CB and DB buses (Lmem operand), on BB (coeff operand)<br><br>Write memory operand address generation on EAB and FAB buses. |
| EXEC P6 | Execute phase of data processing instructions executed in A unit and D unit.<br>Write on FB bus (Ymem operand).<br><br>Write Memory operand on EB (Smem, Xmem operand), on EB and FB buses (Lmem operand). |

The first stage of the pipeline is a PRE-FETCH (P0) stage 202, during which stage a next program memory location is addressed by asserting an address on the address bus (PAB) 118 of a memory interface 104.

In the next stage, FETCH (P1) stage 204, the program memory is read and the I Unit 106 is filled via the PB bus 122 from the memory interface unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in A Unit 110 or P Unit 108 respectively.

In an ACCESS (P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This significantly improves the C compiler performance since no NOP's instructions have to be inserted to meet latency requirements. It makes also the code translation from a prior generation processor to a latter generation processor much easier.

A pipeline protection basic rule is as follows:

If a write access has been initiated before the on going read access but not yet completed and if both accesses share the same resource then extra cycles are inserted to allow the write completion and execute next instruction with the updated operands.

For an emulation standpoint single step code execution must behave exactly as free running code execution.

Figure 6:
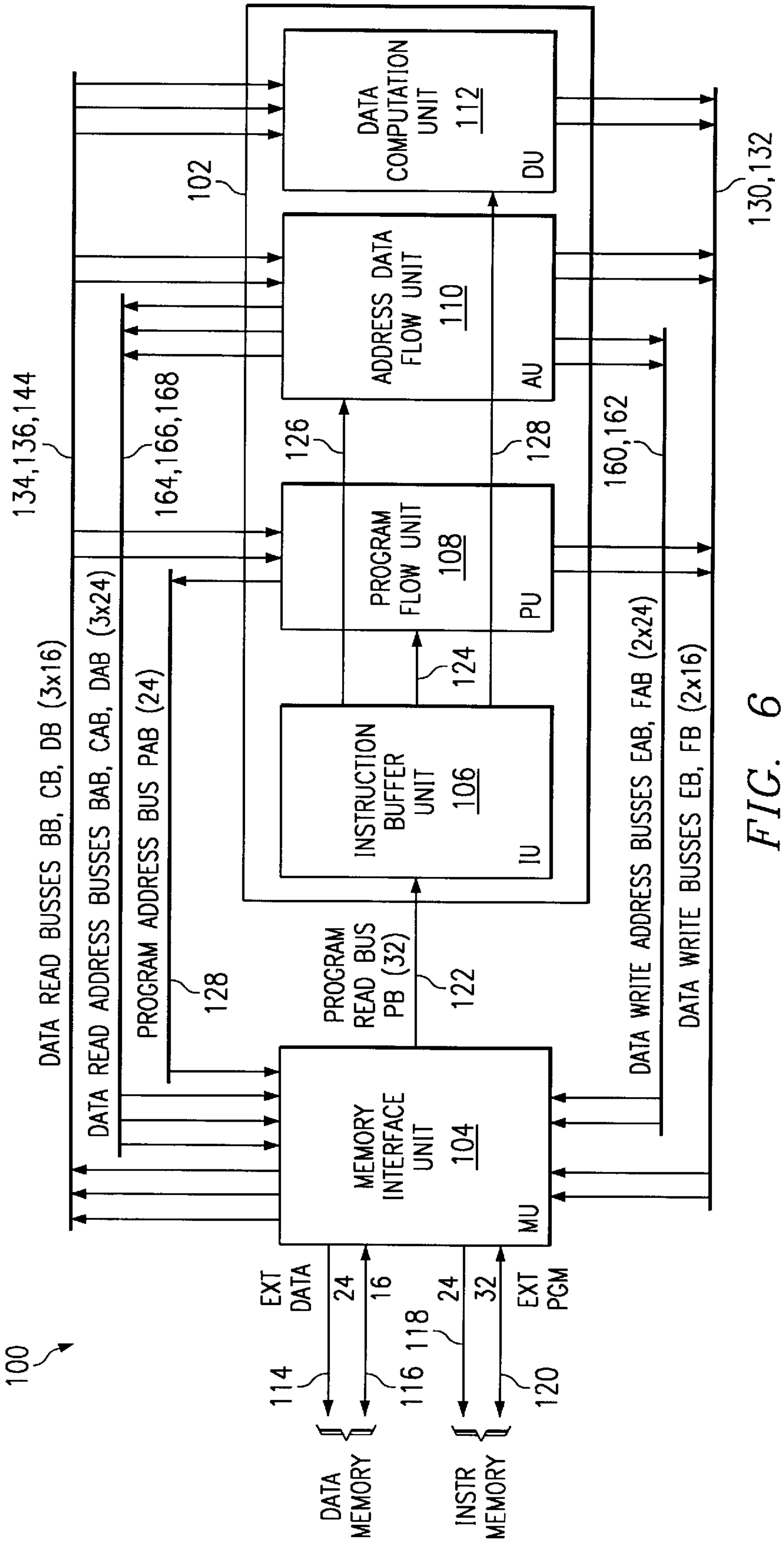
FIG. 6 is a schematic representation of the core of the processor for explaining the operation of the pipeline of the processor.

The basic principle of operation for a pipeline processor will now be described with reference to FIG. 5. As can be seen from FIG. 5, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 5 for a seven stage pipeline a total of 7 instructions may be processed simultaneously. For all 7 instructions 302–314, FIG. 6 shows them all under process in time period $T_7$. Such a structure adds a form of parallelism to the processing of instructions.

As shown in FIG. 6, the present embodiment of the invention includes a memory interface unit 104 which is coupled to external memory units via a 24 bit address bus 114 and a bi-directional 16 bit data bus 116. Additionally, the memory interface unit 104 is coupled to program storage memory (not shown) via a 24 bit address bus 118 and a 32 bit bi-directional data bus 120. The memory interface unit 104 is also coupled to the I Unit 106 of the machine processor core 102 via a 32 bit program read bus (PB) 122. The P Unit 108, A Unit 110 and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 144, 134, 136.

Processor 100 is organized around a unified program/data space. A program pointer is internally 24 bit and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability. Software can define up to 3 main data pages, as follows:

| MDP | Direct access | Indirect access | CDP |
|---|---|---|---|
| MDP05 | — | Indirect access | AR[0–5] |
| MDP67 | — | Indirect access | AR[6–7] |

A stack is maintained and always resides on main data page 0. CPU memory mapped registers are visible from all the pages. These will be described in more detail later.

FIG. 6 represents the passing of instructions from the I Unit 106 to the P Unit 108 at 124, for forwarding branch instructions for example. Additionally, FIG. 6 represents the passing of data from the I Unit 106 to the A Unit 110 and the D Unit 112 at 126 and 128 respectively.

Various aspects of processor 100 are summarized in Table 2.

TABLE 2

| Summary | |
|---|---|
| Very Low Power progammable processor | |
| Parallel execution of instructions, 8-bit to 32-bit instruction format | |
| Seven stage pipeline (including pre-fetch) | |
| Instruction buffer unit highlight | 32 × 16 buffer size |
| | Parallel Instruction dispatching |
| | Local Loop |
| Data computation unit highlight | Four 40 bits generic (accumulator) registers |
| | Single cycle 17 × 17 Multiplication-Accumulation (MAC) |
| | 40 bits ALU, "32 + 8" or "(2 × 16) + 8" |
| | Special processing hardware for Viterbi functions |
| | Barrel shifter |
| Program flow unit highlight | 32 bits/cycle program fetch bandwidth |
| | 24 bit program address |
| | Hardware loop controllers (zero overhead loops |
| | Interruptible repeat loop function |
| | Bit field test for conditional jump |
| | Reduced overhead for program flow control |
| Data flow unit highlight | Three address generators, with new addressing modes |
| | Three 7 bit main data page registers |
| | Two Index registers |
| | Eight 16 bit pointers |
| | Dedicated 16 bit coefficients pointer |
| | Four 16 bit generic registers |
| | Three independent circular buffers |
| | Pointers & registers swap |
| | 16 bits ALU with shift |

TABLE 2-continued

| Summary | |
|---|---|
| Memory Interface highlight | Three 16 bit operands per cycle<br>32 bit program fetch per cycle<br>Easy interface with cache memories |
| C compiler<br>Algebraic assembler | |

1. Detailed Description

The following sections describe an embodiment of a digital system 10 and processor 100 in more detail. Section titles are included in order to help organize information contained herein. The section titles are not to be considered as limiting the scope of the various aspects of the present invention.

1.1 Parallelism Features

Data Computation Unit

According to aspects of the present invention, processor 100 architecture features enables execution of two instructions in parallel within the same cycle of execution. There are 2 types of parallelism:

'Built-in' parallelism within a single instruction.

Some instructions perform 2 different operations in parallel. The 'comma' is used to separate the 2 operations. This type of parallelism is also called 'implied' parallelism.

Example

Repeat(CSR), CSR+=#4 ;This instruction triggers a repeat single mechanism (the repeat counter register is initialized with CSR register content). And in parallel, CSR content is incremented by 4 in the A-unit ALU. This is a single processor instruction.

'User-defined' parallelism between 2 instructions.

Two instructions may be paralleled by the User, the C Complier or the assembler optimizer. The 'II' separator is used to separate the 2 instructions to be executed in parallel by the processor device.

Example

AC1=(*AR1–)*(*AR2+) ;This 1st instruction performs a Multiplication in the D-unit.

II DR1=DR1^AR2 ;This 2nd instruction performs a logical operations in the A-unit ALU.

Implied parallelism can be combined with user-defined parallelism. Parenthesis separators can be used to determine boundaries of the 2 processor instructions.

Example (AC2=*AR3+*AC1, ;This is the 1st instruction,

DR3=(*AR3+)) ;which contains parallelism.

II AR1=#5 ;This is the 2nd instruction.

1.2 Instructions and CPU Resources

Each instruction is defined by:

Several destination operands (most often only 1).

Several source operands (eventually only 1).

Several operators (most often 1).

Several communication buses (CPU internal and external buses).

Example

AC1=AC1+DR1*@ variable

;This instruction has 1 destination operand: the D-unit accumulator AC1.

;This instruction has 3 source operands: the D-unit accumulator AC1, the A-unit data ;register DR1, and the memory operand @ variable. The instruction set description ;specifies that this instruction uses a single processor operator: the D-unit MAC. We ;will see that this instruction uses several communication buses.

For each instruction, the source or destination operands can be:

A-Unit registers:

ARx, DRx, STx, (S)SP, CDP, BKxx, BOFxx, MDPxx, DP, PDP, CSR.

D-Unit registers: ACx, TRNx.

P-Unit Control registers:

BRCx, BRS1, RPTC, REA, RSA, IMR, IFR, PMST, DBIER, IVPD, IVPH.

Constant operands passed by the instruction.

Memory operands:

Smem, dbl(Lmem,) Xmem, Ymem, coeff.

Memory Mapped Registers and I/O memory operand are also attached to this category of operands. We will see that Baddr, pair(Baddr) bit address operands can functionally be attached to this category of operands.

Processor 100 includes three main independent computation units controlled by the Instruction Buffer Unit (I-Unit), as discussed earlier: Program Flow Unit (P-Unit), Address Data Flow Unit (A-Unit), and the Data Computation unit (D-Unit). However, instructions use dedicated operative resources within each unit. 12 independent operative resources can be defined across these units. Parallelism rules will enable usage of two independent operators in parallel within the same cycle.

Within the A-unit, there are five independent operators:

The A-Unit load path: It is used to load A-unit registers with memory operands and constants.

Example

BK03=#5

DR1=@variable

The A-Unit store path: It is used to store A-unit register contents to the memory. Following instruction example uses this operator to store 2 A-unit register to the memory.

@variable=pair(AR0)

The A-Unit Swap operator: It is used to execute the swap( ) instruction. Following instruction example uses this operator to permute the contents of 2 A-unit registers.

swap(DR0, DR2)

The A-Unit ALU operator: It is used to make generic computation within the A-unit. Following instruction example uses this operator to add 2 A-unit register contents.

AR1=AR1+DR1

A-Unit DAGEN X, Y, C, SP operators: They are used to address the memory operands through BAB, CAB, DAB, EAB and FAB buses Within the D-unit, there are four independent operators:

The D-Unit load path: It is used to load D-unit registers with memory operands and constants.

Example

AC1=#5

TRN0=@variable

The D-Unit store path: It is used to store D-unit register contents to the memory. Following instruction example uses this operator to store a D-unit accumulator low and high parts to the memory.

AR1=lo(AC0), *AR2(DR0)=hi(AC0)

The D-Unit Swap operator: It is used to execute the swap( ) instruction. Following instruction example uses this operator to permute the contents of 2 D-unit registers.

swap(AC0, AC2)

The D-Unit ALU, Shifter, DMAC operators:

They are used to make generic computation within the D-unit. These operators are considered as a single operator. the processor device does not allow parallelism between the ALU, the shifter and the DMAC. Following instruction example uses one of these operators (ALU) to add 2 D-unit register contents

AC1=AC1+AC0

Within the D-unit, the following function operator is also defined:

The D-Unit shift and store path: It is used to store shifted, rounded and saturated D-unit register contents to the memory.

Example

@variable=hi(saturate(rnd(AC1<<#1)))

Within the P-unit there are three independent operators:

The P-Unit load path: It is used to load P-unit registers with memory operands and constants.

Example

BRC1=#5

BRC0=@variable

The P-Unit store path: It is used to store P-unit register contents to the memory.

Example

@variable=BRC1

The P-Unit operators: It is used manage control flow instructions. Following instruction example uses this operator to trigger a repeat single mechanism:

repeat(#4)

Refer to the instruction set description section for more details on instruction/operator relationships.

1.3 Processor CPU Buses

As shown in FIG. 3, processor 100's architecture is built around one 32-bit program bus (PB), five 16-bit data buses (BB, CB, DB, EB, FB) and six 24-bit address buses (PAB, BAB, CAB, DAB, EAB, FAB). Processor 100 program and data spaces share a 16 Mbyte addressable space. As described in Table 3, with appropriate on-chip memory, this bus structure enables efficient program execution with A 32-bit program read per cycle, Three 16-bit data read per cycle, Two 16-bit data write per cycle.

This set of buses can be divided into categories, as follows:

Memory buses.

Constant buses.

D-Unit buses.

A-Unit buses.

Cross Unit buses.

TABLE 3

| | Processor Communication buses | | |
|---|---|---|---|
| | Bus name | Width | Definition |
| Memory buses | BB | 16 | Coefficient read bus |
| | CB, DB | 16 | Memory read bus. |
| | EB, FB | 16 | Memory write bus |
| | PB | 32 | Program bus |
| Constant buses from Instruction Buffer Unit | KPB | 16 | Constant bus used in the address phase of the pipeline, by the P-Unit to generate program addresses. |
| (I-Unit) | KAB | 16 | Constant but used in the address phase of the pipeline, by the A-Unit to generate data memory addresses. |
| | KDB | 16 | Constant bus used in execute phase, by the A-Unit of the D-Unit for generic computations. |
| D-Unit Internal buses | ACR0, ACR1 | 40 | D-Unit accumulator read buses. |
| | ACW0, ACW1 | 40 | D-Unit accumulator write buses. |
| | SH | 40 | D-Unit Shifter bus to D-Unit ALU. |
| D to A-Unit buses | ACB | 24 | Accumulator Read bus to the A-Unit. |
| | EFC | 16 | D-Unit Shifter bus to DRx Register-File for dedicated operations like (exp(), field_extract/expand(), count()). |
| D to P-Unit bus | ACB | 24 | Accumulator Read bus to the P-Unit. |
| A-unit internal buses | RGA | 16 | 1st DAx register read bus to A-unit ALU. |
| | RGB | 16 | 2nd DAx register read bus to A-unit ALU. |
| | RGD | 16 | DAx register write bus from A-unit ALU. |

TABLE 3-continued

Processor Communication buses

| | Bus name | Width | Definition |
|---|---|---|---|
| A to D-Unit buses | DRB | 16 | Bus exporting DRx and ARx register contents to the D-Unit operators. |
| | DR2 | 16 | Dedicated bus exporting DR2 register content to the D-Unit Shifter for dedicated instructions. |
| A to P-Unit buses | CSR | 16 | A-Unit DAx register read bus to P-Unit. |
| | RGD | 16 | A-Unit ALU bus to P-Unit. |

Table 4 summarizes the operation of each type of data bus and associated address bus.

TABLE 4

Processor bus structure description

| Bus name | Width | Bus transaction |
|---|---|---|
| PAB | 24 | The program address bus carries a 24 bit program byte address computed by the program flow unit (PF). |
| PB | 32 | The program bus carries a packet of 4 bytes of program code. This packet feeds the instruction buffer unit (IU) where they are stored and used for instruction decoding. |
| CAB, DAB | 24 | Each of these 2 data address bus carries a 24-bit data byte address used to read a memory operand. The addresses are generated by 2 address generator units located in the address data flow unit (AU): DAGEN X, DAGEN Y. |
| CB, DB | 16 | Each of these 2 data read bus carries a 16-bit operand read from memory. In one cycle, 2 operands can be read. These 2 buses connect the memory to PU, AU and DU: altogether, these 2 buses can provide a 32-bit memory read throughput to PU, AU, and DU. |
| BAB | 24 | This coefficient data address bus carries a 24-bit data byte address used to read a memory operand. The address is generated by 1 address generator unit located in AU: DAGEN C. |
| BB | 16 | This data read bus carries a 16-bit operand read from memory. This bus connects the memory to the dual MAC operator of the Data Computation Unit (DU). Specific instructions use this bus to provide, in one cycle, a 48-bit memory read throughput to the DU: the operand fetched via BB, must be in a different memory bank than what is fetched via CB and DB). |
| EAB, FAB | 24 | Each of these 2 data address bus caries a 24-bit data byte address used to write an operand to the memory. The addresses are generated by 2 address generator units located in AU: DAGEN X, DAGEN Y. |
| EB, FB | 16 | Each of these 2 data write bus carries a 16-but operand being written to the memory. In one cycle, 2 operands can be written to memory. These 2 buses connect PU, AU and DU to the data memeory: altogether, these 2 buses can provide a 32-bit memory write throughput from PU, AU, and DU. |

On top of these main internal buses the processor architecture supports also:

DMA transfer through buses connecting internal memory to external memories or peripherals Peripherals access through the backplane bus 22 interface Program Cache Interface Table 5 summarizes the buses usage versus type of access.

TABLE 5

Bus Usage

| ACCESS TYPE | PAB | BAB | CAB | DAB | EAB | FAB | PB | BB | CB | DB | EB | FB |
|---|---|---|---|---|---|---|---|---|---|---|---|---|
| Instructions buffer load | X | | | | | | X | | | | | |
| Program Read | | | | X | | | | | | X | | |
| Data single Read | | | | | | | | | | | | |
| MMR read/mmap() | | | | | | | | | | | | |
| Peripheral read/readport() | | | | | | | | | | | | |
| Program Write | | | | | X | | | | | | X | |
| Data single write | | | | | | | | | | | | |
| MMR write/mmap() | | | | | | | | | | | | |
| Peripheral write/writeport() | | | | | | | | | | | | |

TABLE 5-continued

| | Bus Usage | | | | | | | | | | | |
|---|---|---|---|---|---|---|---|---|---|---|---|---|
| ACCESS TYPE | PAB | BAB | CAB | DAB | EAB | FAB | PB | BB | CB | DB | EB | FB |
| Program long Read | | | | X | | | | | X | X | | |
| Data long Read | | | | | | | | | | | | |
| Registers pair load | | | | | | | | | | | | |
| Program long Write | | | | | X | | | | | | X | X |
| Data long/Registers pair Write | | | | | | | | | | | | |
| Data dual Read | | | X | X | | | | | X | X | | |
| Data dual Write | | | | | X | X | | | | | X | X |
| Data single Read/Data single Write | | | | X | X | | | | | X | X | |
| Data long Read/Data long Write | | | | X | X | | | | X | X | X | X |
| Dual Read/Coeff Read | | X | X | X | | | | X | X | X | | |

The block diagram in FIG. 3 and Table 6 shows the naming convention for CPU operators and internal buses. For each instruction a list of CPU resources (buses & operators) is defined which are involved during execution. Attached to each instruction is a bit pattern where a bit at one means that the associated resource is required for execution. The assembler will use these patterns for parallel instructions check in order to insure that the execution of the instructions pair doesn't generate any bus conflict or operator overloading. Note that only the data flow is described since address generation unit resources requirements can be directly determined from the algebraic syntax.

TABLE 6

| Naming Conventions for Parallel Instruction Check | | |
|---|---|---|
| Bus name | Pipeline | Bus definition |
| RGA | exec | DAx operand #1 from A unit Register file |
| RGB | exec | DAx operand #2 from A unit Register file |
| RGD | exec | ALU16 result returned to A unit Register file & P unit (BRC0 = DAx) |
| KAB | address | Constant from Instruction decode |
| KDB | exec | Constant from instruction decode |
| ACR0 | exec | ACx operand #1 from D unit register file |
| ACR1 | exec | ACx operand #2 from D unit register file |
| ACW0 | exec | D unit ALU, MAC, SHIFT result returned to D unit register file |
| ACW1 | exec | D unit ALU, MAC, SHIFT result returned to D unit register file |
| SH | exec | Shifter to ALU dedicated path |
| DRS | exec | DRx operand from A unit Register file to support computed shift |
| DAB | exec | DAx operand from A unit Register file to ALU & MAC operators |
| EFC | exec | Exp/Bit count/Field extract operator result to be merged with ACB |
| ACB | exec | HI(ACx), LO(ACx) operand/EFC result to ALU16<br>ACx[23:0] field to P unit to support computed branch |
| PDA | exec | BRC0, BRC1. RPTC operand to ALU16 (i.e.: DAx = BRC0) |
| CSR | static | Computed single repeat register from A unit to RPTC in P unit |

1.4 Memory Overview

Figure 7:
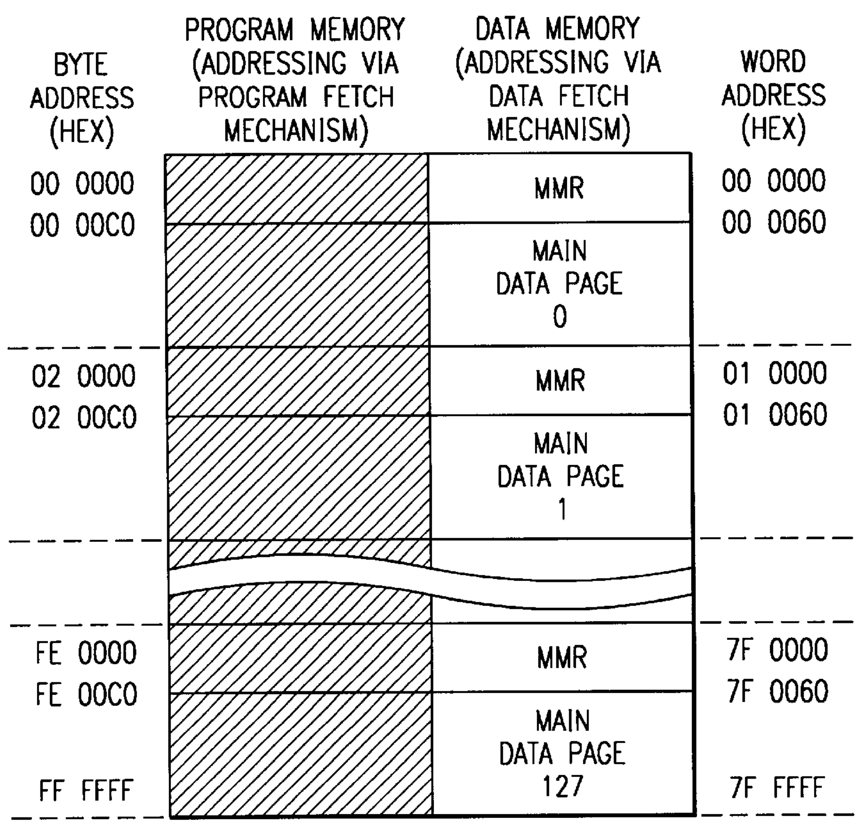
FIG. 7 shows the unified structure of Program and Data memory spaces of the processor.

FIG. 7 shows the unified structure of Program and Data memory spaces of the processor.

Program memory space (accessed with the program fetch mechanism via PAB bus) is a linear 16 Mbyte byte addressable memory space.

Data memory space (accessed with the data addressing mechanism via BAB, CAB, DAB, EAB and FAB buses) is a 8 Mword word addressable segmented memory space.

1.4.1 I/O Memory

In addition to the 16 Mbytes (8 Mwords) of unified program and data memory spaces, the processor offers a 64 Kword address space used to memory mapped the peripheral registers or the ASIC hardware, the processor instructions set provides efficient means to access this I/O memory space with instructions performing data memory accesses (see readport( ), writeport( ) instruction qualifiers detailed in a later section.

1.4.2 Unified Program and Data Memories

As previously quoted, the processor architecture is organized around a unified program and data space of 16 Mbytes (8 Mwords). The program byte and bit organization is identical to the data byte and bit organization. However program space and data space have different addressing granularity.

1.4.3 Program Space Addressing Granularity

The program space has a byte addressing granularity: this means that all program address labels will represent a 24-bit byte address. These 24-bit program address label can only be defined in sections of a program where at least one processor instruction is assembled.

Table 7 shows that for following assembly code example:

Main__routine:

call#sub__routine

The program address labels ‘sub__routine’ and ‘Main__routine’ will represent 24 bit byte addresses.

When the call( ) instruction is executed, the program counter, register (PC) is updated with the full 24-bit address ‘sub__routine’.

And the processor’s Program Flow unit (PU) make a Program fetch to the 32-bit aligned memory address which is immediately lower equal to ‘sub__routine’ label.

AR1=#array__address

AC1=*AR1 ;load

The data address labels ‘array__address’ will represent a 23-bit word address.

When MDP05 load instruction is executed, the main data page pointer MDP05 is updated with the 7 highest bits of ‘array__address’.

TABLE 7

Program space addressing

| | | | |
|---|---|---|---|
| Memory interface with the processor | Addressing bus width [23:0] | | |
| Program address labels : Example : ‘sub_routine’ | Sub_routine [23:0] | | |
| Program Counter register Example : ‘call sub_routine’ | PC[23:2] | PC[1:0] | |
| | Sub_routine [23:2] | Sub_routine [1:0] | |
| Program fetch address on PAB bus Example : ‘call sub_routine’ | PAB[23:2] | PAB[1] | PAB[0] |
| | Subroutine [23:2] | 0 | 0 |

1.4.4 Data Space Addressing Granularity

The data space has a word addressing granularity. This means that all data address labels will represent a 23-bit word address. These 23-bit data address labels can only be defined in sections of program where no processor instruction are assembled Table 8 shows that for following assembly code example:

Main__routine: ;with ‘array__address’ linked

MPD05=#(array__address<<−16) ;in a data section.

When AR1 load instruction is executed, the address register AR1 is updated with the 16 lowest bits of ‘array__address’.

When AC1 load instruction is executed, the processor’s Data Address Flow unit (AU) make a data fetch to the 16-bit aligned memory address obtained by concatenating MDP05 to AR1.

TABLE 8

Data space addressing

| | | | |
|---|---|---|---|
| Memory interface with the processor | Addressing bus width [23:0] | | |
| Data address labels : Example : ‘array_address’ | array_address [22:0] | | 0 |
| Initialization of MDP05 and AR1 : | MDP05[6:0] | AR1[15:0] | |
| MPD05 = #(array_address <<- 16) AR1 = #array_address | array_address [22:16] | array_address [15:0] | |
| Data fetch address on DAB bus Example : AC1 = *AR1 | DAB[23:17] | DAB[16:1] | DAB[0] |
| | MDP05[6:0] | AR1[15:0] | 0 |

1.5 Program Memory 1.5.1 Program Flow

Program space memory locations store instructions or constants. Instructions are of variable length (1 to 4 bytes).

Program address bus is 24 bit wide, capable of addressing 16 Mbytes of program. The program code is fetched by packets of 4 bytes per clock cycles regardless of the instruction boundary.

The instruction buffer unit generates program fetch address on 32 bit boundary. This means that depending on target alignment there is one to three extra bytes fetched on program discontinuities like branches. This program fetch scheme has been selected as a silicon area/performance trade-off.

In order to manage the multi-format instructions the instruction byte address is always associated to the byte which stores the opcode. Table 9 shows how the instructions are stored into memory, the shaded byte locations contain the instruction opcode and are defined as instruction address. Assuming that program execution branches to the address @0b, then the instruction buffer unit will fetch @0b to @0e then @0f to @12 and so on until next program discontinuity.

1.5.2 Instruction Organization in Program Memory

An instruction byte address corresponds to the byte address where the op-code of the instruction is stored. Table 9 shows how the following sequence of instructions are stored in memory, the shaded byte locations contain the instruction op-code and these locations define the instruction addresses. For instruction Ix, the successive bytes are noted Ix_b0, Ix_b1, Ix_b2, . . . And the bit position y in instruction Ix is noted i_y.

P24 (absolute address) instead of relative goto. Branch address update has to be performed as byte access to get rid of program code alignment constraint.

1.5.3 Program Request/Ready Protocol

The program request is active low and only active in the first cycle that the address is valid on the program bus regardless of the access time to return data to the instruction buffer.

The program ready signal is active low and only active in the same cycle the data is returned to the instruction buffer.

1.5.4 Program Fetch/Memory Bank Switching

Figure 8:
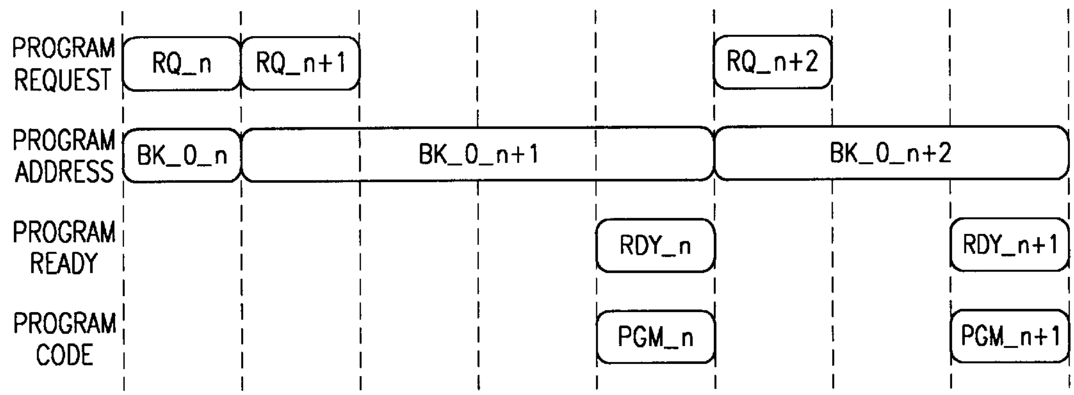
FIG. 8 is a timing diagram illustrating program code fetched from the same memory bank.
Figure 9:
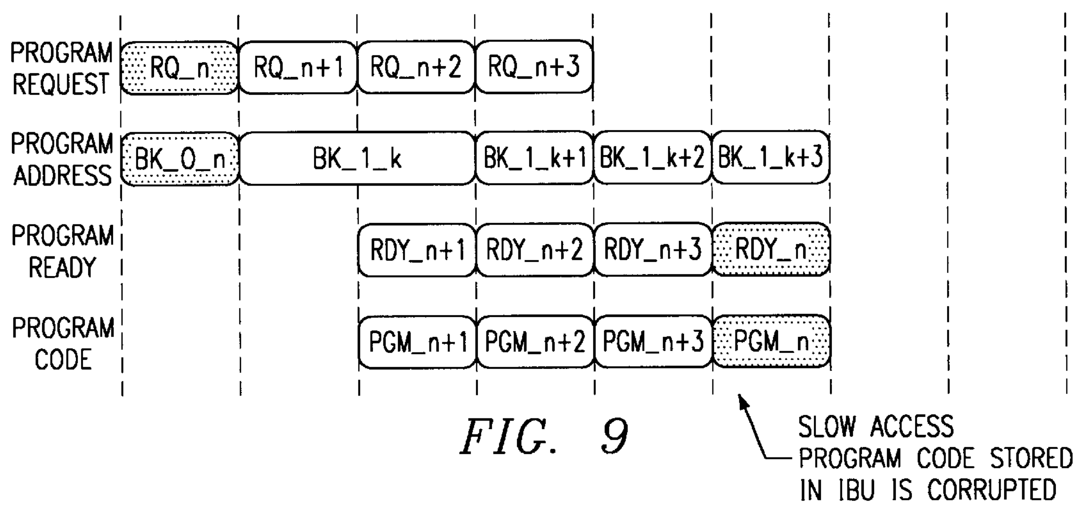
FIG. 9 is a timing diagram illustrating program code fetched from two memory banks.

FIG. 8 is a timing diagram illustrating program code fetched from the same memory bank FIG. 9 is a timing diagram illustrating program code fetched from two memory banks. The diagram shows a potential issue of corrupting the content of the instruction buffer when the program fetch sequence switches from a 'slow memory bank' to a 'fast memory bank'. Slow access time may result from access arbitration if a low priority is assigned to the program request.

Memory bank 0→Address BK_0_n → Slow access (i.e.: memory array size, ext, conflicts)

Memory bank 1→Address BK_1_k → Fast access (i.e.: Dual access RAM)

TABLE 9

Example of instruction organization in program memory

| Program Address | Instruction |
|---|---|
| 01h | 24 bit instruction I0 |
| 04h | 16 bit instruction I1 |
| 06h | 32 bit instruction I2 |
| 0ah | 8 bit instruction I3 |
| 0bh | 24 bit instruction I4 |

| Address | Byte 0<br>bit 7 bit 0 | Byte 1<br>bit 7 bit 0 | Byte 2<br>bit 7 bit 0 | Byte 3<br>bit 7 bit 0 |
|---|---|---|---|---|
| 00-03 | | I0_b0<br>i_23 i_16 | I0_b1<br>i_15 i_8 | I0_b2<br>i_7 i_0 |
| 04-07 | I1_b0<br>i_15 i_8 | I1_b1<br>i_7 i_0 | I2_b0<br>i_31 i_24 | I2_b1<br>i_23 i_16 |
| 08-0b | I2_b2<br>i_15 i_8 | I2_b3<br>i_7 i_0 | I3_b0<br>i_7 i_0 | I4_b0<br>i_23 i_16 |
| 0c-0f | I4_b1<br>i_15 i_8 | I4_b2<br>i_7 i_0 | | |

Program byte and bit organization has been aligned to data flow. This is transparent for the programmer if external code is installed on internal RAM as a block of bytes. On some specific cases the user may want to install generic code and have the capability to update a few parameters according to context by using data flow instructions. These parameters are usually either data constants or branch addresses. In order to support such feature, it's recommended to use goto In order to avoid instruction buffer corruption each program memory instance interface has to monitor the global program request and the global ready line. In case the memory instance is selected from the program address, the request is processed only if there is no on going transactions on the other instances (Internal memories, MMI, Cache, API . . . ). If there is a mismatch between program requests count (modulo) and returned ready count (modulo) the request remains pending until match.

Figure 10:
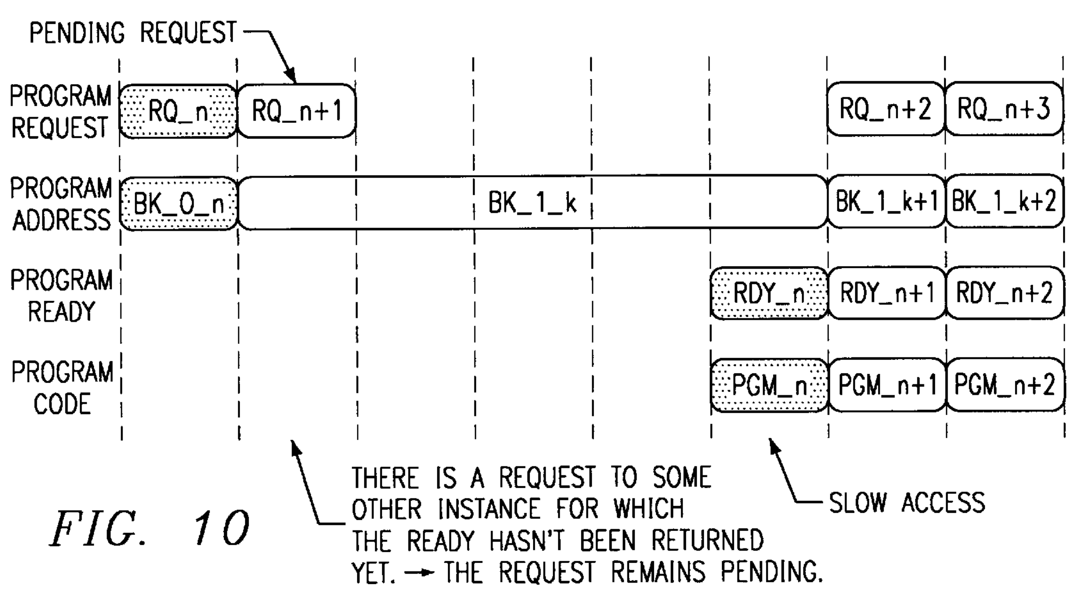
FIG. 10 is a timing diagram illustrating the program request/ready pipeline management implemented in program memories wrappers to support properly a program fetch sequence which switches from a 'slow memory bank' to a 'fast memory bank'.

FIG. 10 is a timing diagram illustrating the program request/ready pipeline management implemented in program memories wrappers to support properly a program fetch sequence which switches from a 'slow memory bank' to a 'fast memory bank'. Even if this distributed protocol looks redundant for an hardware implementation standpoint compared to a global scheme it will improves timing robustness and ease the processor derivatives design since the protocol is built in 'program memory wrappers'. All the program memory interfaces must be implemented the same way Slow access time may result from access arbitration if a low priority is assigned to the program request.

Memory bank 0→Address BK_0_n → Slow access (i.e.: memory array size, ext, conflicts)

Memory bank 1→Address BK_1_k → Fast access (i.e.: Dual access RAM)

1.5.5 Data Memory Overview

Figure 11:
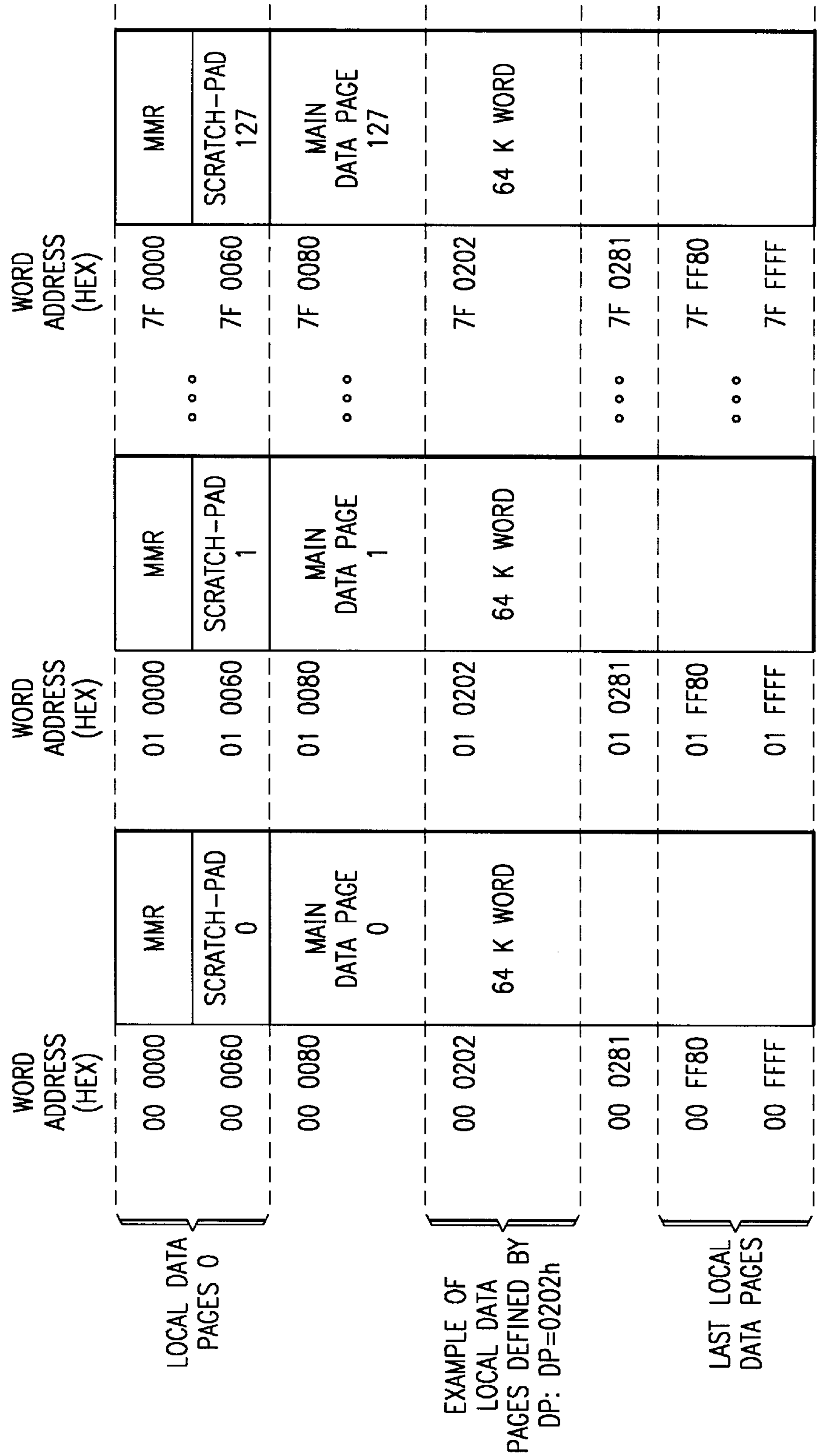
FIG. 11 shows how the 8 Mwords of data memory is segmented into 128 main data pages of 64 Kwords.

FIG. 11 shows how the 8 Mwords of data memory is segmented into 128 main data pages of 64 Kwords, In each 64 Kword main data pages:

Local data pages of 128 words can be defined with DP register.

The CPU registers are memory mapped in local data page 0.

The physical memory locations start at address 060h.

1.5.6 DATA Memory Configurability

The architecture provides the flexibility to re-define the Data memory mapping for each derivative (see mega-cell specification).

the processor CPU core addresses 8 Mwords of data, the processor instruction set handles the following data types:

bytes: 8-bit data, words: 16-bit data, long words: 32-bit data.

However, the processor Address Data Flow unit (AU) interfaces with the data memory with word addressing capability.

1.5.7 Byte Data Types

Since the data memory is word addressable, the processor does not provide any byte addressing capability for data memory operand access. As Table 10 and Table 11 show it, only dedicated instructions enable select ion of a high or low byte part of addressed memory words.

TABLE 10

Byte memory read

| Byte load instructions | Memory word read address | Byte selected by instruction | Read memory location |
|---|---|---|---|
| dst = uns(high_byte(Smem)) | Smem | high | Smem[15:8] |
| dst = uns(low_byte(Smem)) | Smem | low | Smem[7:0] |
| ACx = high_byte(Smem)<< SHIFTW | Smem | high | Smem[15:8] |
| ACx = low_byte(Smem)<< SHIFTW | Smem | low | Smem[7:0] |

TABLE 11

Byte memory write

| Byte store instructions | Memory Word write address | Byte selected by instruction | Written memory location |
|---|---|---|---|
| high_byte(Smem) = src | Smem | high | Smem[15:8] |
| low_byte(Smem) = src | Smem | low | Smem[7:0] |

1.5.8 Long Word Data Types

On the processor device, when accessing long words in memory, the effective address is the address of the most significant word (MSW) of the 32-bit data. The address of the least significant word (LSW) of the 32-bit data is:

At the next address if the effective address is even.

Or at the previous address if the effective address is odd.

Following example shows the 2 overflows for a double store performed at addresses 01000h and 01001h (word address):

The most significant word (MSW) is stored at a lower address than the least significant word (LSW) when the storage address is even (say 01000h word address):

| | |
|---|---|
| 1000h | MSW |
| 1001h | LSW |

The most significant word is stored at a higher address than the least significant word when the storage address is odd (say 01001h word address):

| | |
|---|---|
| 1000h | LSW |
| 1001h | MSW |

1.5.9 Data Type Organization in Data Memory

Table 12 shows how bytes, words and long words may be stored in memory. The byte operand bits (respectively word's and long word's) are designated by B_x (respectively W_x, L_x).

The shaded byte location is empty,

At addresses 04h and 0ah 2 long word have been stored as described in section 1.5.8.

TABLE 12

Example of data organization in data memory

| Address | Byte 0<br>bit 7 bit 0 | Byte 1<br>bit 7 bit 0 | Byte 2<br>bit 7 bit 0 | Byte 3<br>bit 7 bit 0 |
|---|---|---|---|---|
| 00-03 | | Byte<br>B_7 B_0 | Word<br>W_15 W_8 | Word<br>W_7 W_0 |
| 04-07 | Long Word<br>L_31 L_24 | Long Word<br>L_23 L_16 | Long Word<br>L_15 L_8 | Long Word<br>L_7 L_0 |
| 08-0b | Long Word<br>L_15 L_8 | Long Word<br>L_7 L_0 | Long Word<br>L_31 L_24 | Long Word<br>L_23 L_16 |
| 0c-0f | Word<br>W_15 W_8 | Word<br>W_7 W_0 | Byte<br>B_7 B_0 | Byte<br>B_7 B_0 |

1.5.10 Segmented Data Memory Addressing

The processor data memory space (8 Mword) is segmented into 128 pages of 64 Kwords. As this will be described in a later section, this means that for all data addresses (23-bit word addresses):

The higher 7 bits of the data address represent the main data page where it resides, The lower 16-bits represent the word address within that page.

Three 7-bit dedicated main data page pointers (MDP, MDP05, MDP67) are used to select one of the 128 main data pages of the data space.

The data stack and the system stack need to be allocated within page 0

Within each processor's main data pages, a local data page of 128 words can be selected through the 16-bit local data page register DP. As this will be detailed in section XXX, this register can be used to access single data memory operands in direct mode.

Since DP is a 16-bit wide register, the processor has as many as 64 K local data pages.

1.5.11 Scratch-pad within Local Data Pages 0

As explained in earlier, at the beginning of each main data pages, within the local pages 0, the processor CPU registers are memory mapped between word address 0h and 05Fh.

The remaining parts of the local data pages 0 (word address 060h to 07Fh) is memory. These memory sections are called scratch-pad.

It is important to notice that scratch-pads of different main data pages are physically different memory locations.

1.5.12 Memory Mapped Registers the processor's core CPU registers are memory mapped in the 8 Mwords of memory, the processor instructions set provides efficient means to access any MMR register through instructions performing data memory accesses (see mmap( ) instruction qualifier detailed in a later section).

The Memory mapped registers (MMR) reside at the beginning of each main data pages between word addresses 0h and 05Fh.

Therefore, the MMRs' occupy only part of the local data pages 0 (DP=0h).

It is important to point out that the memory mapping of the CPU registers is compatible with earlier generation processor devices'.

Between word addresses 0h and 01Fh, the processor's MMRs corresponds to an earlier generation processor's Between word addresses 020h and 05Fh, other processor CPU registers are mapped. These MMR registers can be accessed in all processor operating modes.

However, an earlier generation processor PMST register is a system configuration register is not mapped on any the processor MMR register. No PMST access should be performed on software modules being ported from an earlier generation processor to the processor.

The memory mapping of the CPU registers are given in Table 13. The CPU registers are described in a later section. In the first part of the table, the corresponding an earlier generation processor Memory Mapped registers are given. Notice that addresses are given as word addresses.

TABLE 13 processor core CPU Memory Mapped Registers
(mapped in each of the 128 Main Data Pages)

| earlier MMR Register | processor MMR Register | Word Address (Hex) | processor Description (earlier processor description) | Bit Field |
|---|---|---|---|---|
| IMR | IMR0_L | 00 | Interrupt mask register IMR0 | [15-00] |
| IFR | IFR0_L | 01 | Interrupt flag register IFR0 | [15-00] |
| — | — | 02—05 | Reserved for test | |
| ST0 | ST0_L | 06 | Status register ST0 | [15-00] |
| ST1 | ST1_L | 07 | Status register ST1 | [15-00] |
| AL | AC0_L | 08 | Accumulator AC0 | [15-00] |
| AH | AC0_H | 09 | | [31-16] |
| AG | AC0_G | 0A | | [39-32] |
| BL | AC1_L | OB | Accumulator AC1 | [15-00] |
| BH | AC1_H | 0C | | [31-16] |
| BG | AC1_G | 0D | | [39-32] |
| TREG | DR3_L | 0E | Data register DR3 | [15-00] |
| TRN | TRN0_L | 0F | Transition register TRN0 | [15-00] |
| AR0 | AR0_L | 10 | Address register AR0 | [15-00] |
| AR1 | AR1_L | 11 | Address register AR1 | [15-00] |
| AR2 | AR2_L | 12 | Address register AR2 | [15-00] |
| AR3 | AR3_L | 13 | Address register AR3 | [15-00] |
| AR4 | AR4_L | 14 | Address register AR4 | [15-00] |
| AR5 | AR5_L | 15 | Address register AR5 | [15-00] |
| AR6 | AR6_L | 16 | Address register AR6 | [15-00] |
| AR7 | AR7_L | 17 | Address register AR7 | [15-00] |
| SP | SP_L | 18 | Data stack pointer SP | [15-00] |
| BK | BK03_L | 19 | Circular buffer size register BK03 | [15-00] |
| BRC | BRC0_L | 1A | Block repeat counter register BRC0 | [15-00] |
| RSA | RSA0_L | 1B | Block repeat start address register RSA0 | [15-00] |
| REA | REA0_L | 1C | Block repeat end address register REA0 | [15-00] |
| PMST | — | 1D | Processor mode status register PMST | [15-00] |
| XPC | — | 1E | Program Counter extension register | [07-00] |
| — | — | 1F | Reserved | |
| | DR0_L | 20 | Data register DR0 | [15-00] |
| | DR1_L | 21 | Data register DR1 | [15-00] |
| | DR2_L | 22 | Data register DR2 | [15-00] |
| | DR3_L | 23 | Data register DR3 | [15-00] |
| | AC2_L | 24 | Accumulator AC2 | [39-32] |
| | AC2_H | 25 | | [31-16] |
| | AC2_G | 26 | | [15-00] |
| | CDP_L | 27 | Coefficient data pointer CDP | [15-00] |
| | AC3_L | 28 | Accumulator AC3 | [39-32] |
| | AC3_H | 29 | | [31-16] |
| | AC3_G | 2A | | [15-00] |
| | MDP_L | 2B | Main data page register MDP | [06-00] |
| | MDP05_L | 2C | Main data page register MDP05 | [06-00] |
| | MDP67_L | 2D | Main data page register MDP67 | [06-00] |
| | DP_L | 2E | Local data page register DP | [15-00] |
| | PDP_L | 2F | Peripheral data page register PDP | [15-00] |
| | BK47_L | 30 | Circular buffer size register BK47 | [15-00] |
| | BKC_L | 31 | Circular buffer size register BKC | [15-00] |
| | BOF01_L | 32 | Circular buffer offset register BOF01 | [15-00] |
| | BOF23_L | 33 | Circular buffer offset register BOF23 | [15-00] |
| | BOF45_L | 34 | Circular buffer offset register BOF45 | [15-00] |
| | BOF67_L | 35 | Circular buffer offset register BOF67 | [15-00] |
| | BOFC_L | 36 | Circular buffer offset register BOFC | [15-00] |
| | ST3_L | 37 | System control register ST3 | [15-00] |
| | TRN1_L | 38 | Transition register TRN1 | [15-00] |
| | BRC1_L | 39 | Block repeat counter register BRC1 | [15-00] |
| | BRS1_L | 3A | Block repeat save register BRS1 | [15-00] |
| | CSR_L | 3B | Computed single repeat register CSR | [15-00] |
| | RSA0_H | 3C | Repeat start address register RSA0 | [23-16] |
| | RSA0_L | 3D | | [15-00] |
| | REA0_L | 3E | Repeat end address register REA0 | [23-16] |
| | REA0_H | 3F | | [15-00] |
| | RSA1_H | 40 | Repeat start address register RSA1 | [23-16] |
| | RSA1_L | 41 | | [15-00] |
| | REA1_H | 42 | Repeat end address register REA1 | [23-16] |
| | REA1_L | 43 | | [15-00] |
| | RPTC_L | 44 | Single repeat counter register RPTC | [15-00] |
| | IMR1_L | 45 | Interrupt mask register IMR1 | [07-00] |
| | IFR1_L | 46 | Interrupt flag register IFR1 | [07-00] |
| | DBIER0_L | 47 | Debug interrupt register DBIER0 | [15-00] |
| | DBIER1_L | 48 | Debug interrupt register DBIER1 | [07-00] |
| | IVPD_L | 49 | Interrupt vector pointer for DSP IVPD | [15-00] |
| | IVPH_L | 4A | Interrupt vector pointer for HOST IVPH | [15-00] |

TABLE 13-continued

| processor core CPU Memory Mapped Registers (mapped in each of the 128 Main Data Pages) | | | | |
|---|---|---|---|---|
| earlier MMR Register | processor MMR Register | Word Address (Hex) | processor Description (earlier processor description) | Bit Field |
| | SSP_L | 4B | System stack pointer SSP | [15-00] |
| | ST2_L | 4C | Pointer configuration register ST2 | [08-00] |
| — | 4D–5F | Reserved | | |

1.5.13 Data Memory access Conflicts

Figure 12:
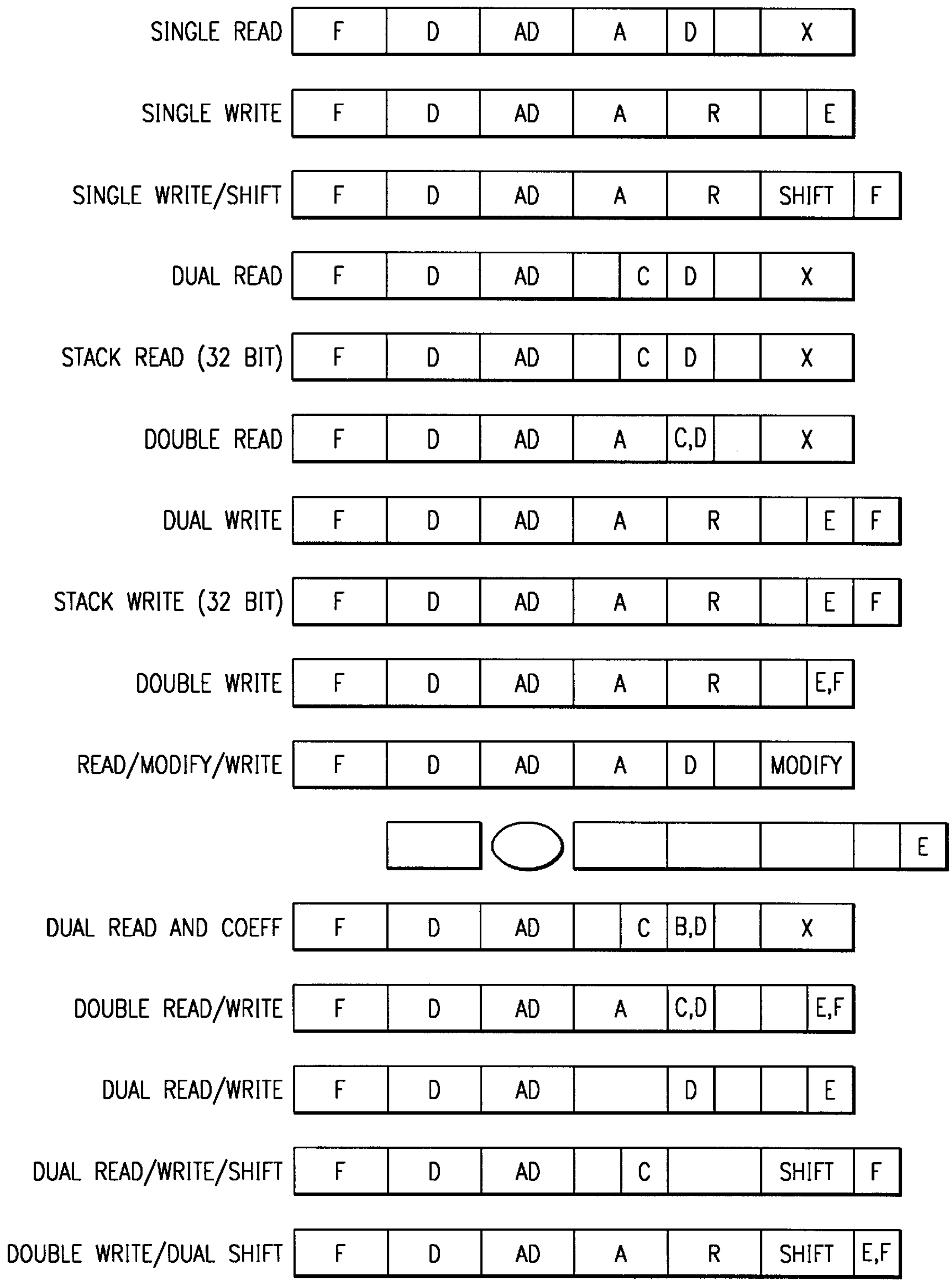
FIG. 12 shows in which pipeline stage the memory access takes place for each class of instructions.

FIG. 12 shows in which pipeline stage the memory access takes place for each class of instructions.

Figure 13A:
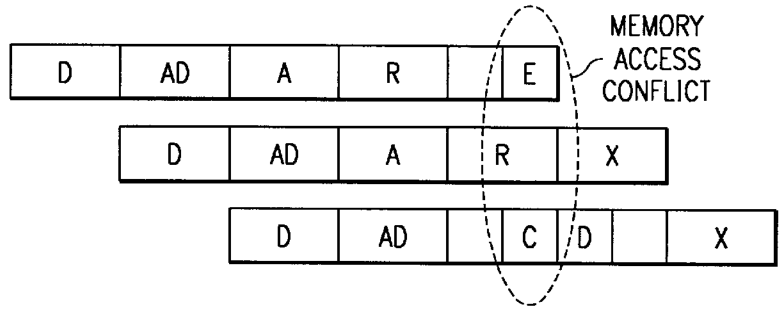
FIG. 13A illustrates single write versus dual access with a memory conflict.

FIG. 13A illustrates single write versus dual access with a memory conflict.

Figure 13B:
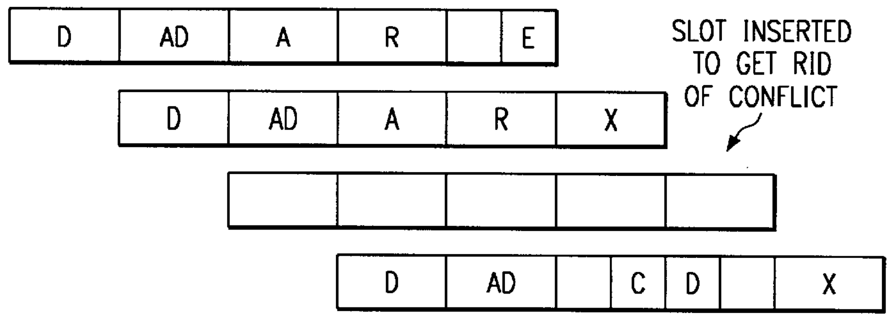
FIG. 13B illustrates the case of conflicting memory requests to same physical bank (C & E in FIG. 13A) which is overcome by an extra pipeline slot inserted in order to move the C access on the next cycle.

FIG. 13B illustrates the case of conflicting memory requests to same physical bank (C & E on above example) which is overcome by an extra pipeline slot inserted in order to move the C access on the next cycle.

Figure 14A:
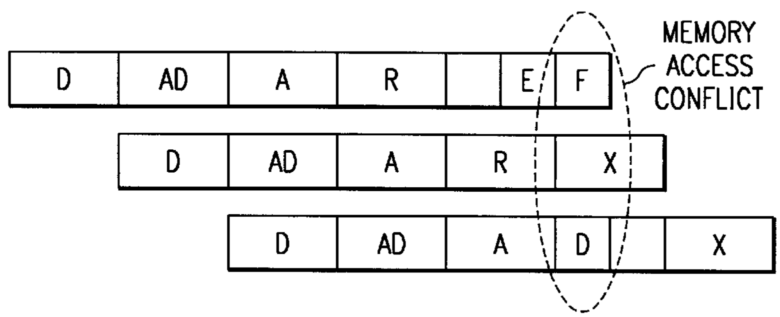
FIG. 14A illustrates dual write versus single read with a memory conflict.

FIG. 14A illustrates dual write versus single read with a memory conflict.

Figure 14B:
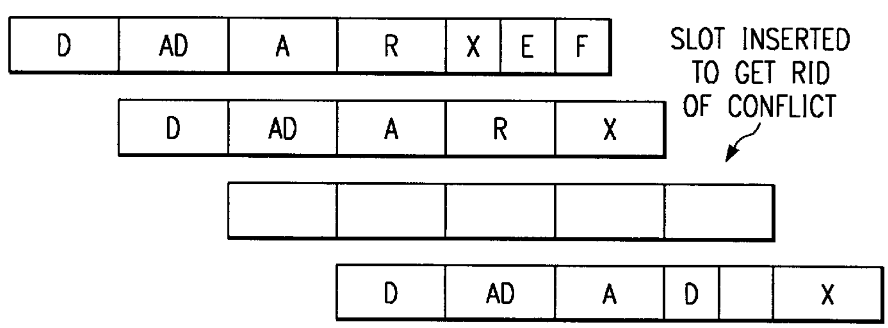
FIG. 14B shows how an extra slot is inserted in the sequence of FIG. 14A in order to move the D access to next cycle.

As in previous context in case of conflicting memory requests to same physical bank (D & F on above example) an extra slot is inserted in order to move the D access to next cycle, as shown in FIG. 14B.

The pipeline schemes illustrated above correspond to generic cases where the read memory location is within the same memory bank as the memory write location but at the different address. In case of same address the processor architecture provides a by-pass mechanism which avoid cycle insertion. See pipeline protection section for more details.

1.5.14 Slow/Fast operand execution flow

The memory interface protocol supports a READY line which allows to manage memory requests conflicts or adapt the instruction execution flow to the memory access time performance. The memory requests arbitration is performed at memory level (RSS) since it is dependent on memory instances granularity.

Each READY line associated to a memory request is monitored at CPU level. In case of not READY, it will generate a pipeline stall.

The memory access position is defined by the memory protocol associated to request type (i.e.: within request cycle like C, next to request cycle like D) and always referenced from the request regardless of pipeline stage taking out the “not ready” cycles.

Operand shadow registers are always loaded on the cycle right after the READY line is asserted regardless of the pipeline state. This allows to free up the selected memory bank and the data bus supporting the transaction as soon as the access is completed independently of the instruction execution progress.

DMA and emulation accesses take advantage of the memory bandwidth optimization described on above protocol.

Figure 15:
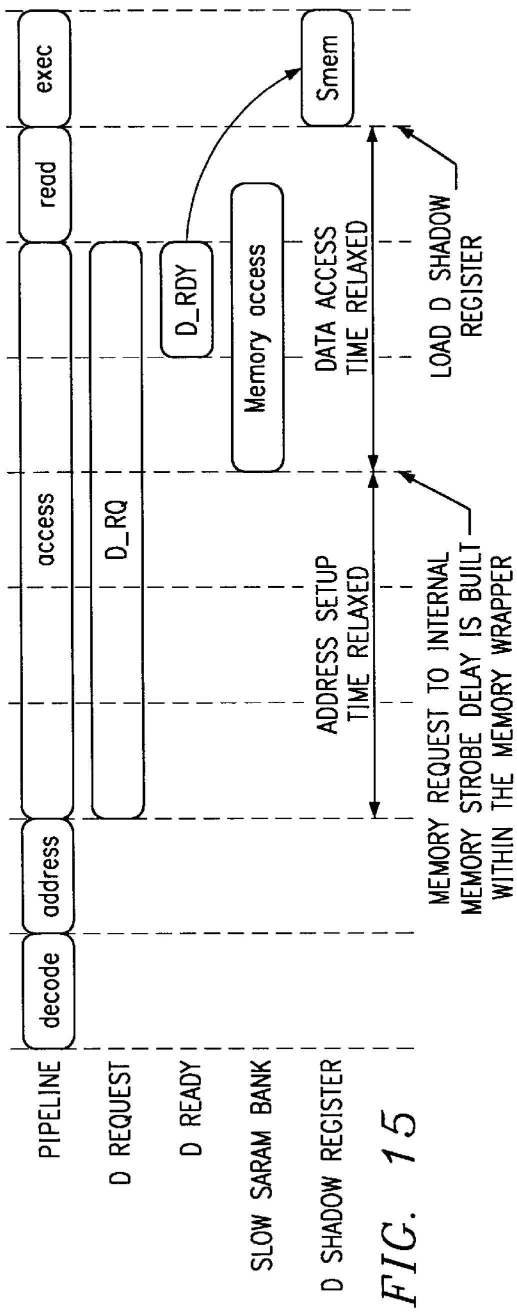
FIG. 15 is a timing diagram illustrating a slow memory/Read access.

FIG. 15 is a timing diagram illustrating a slow memory/Read access.

Figure 16:
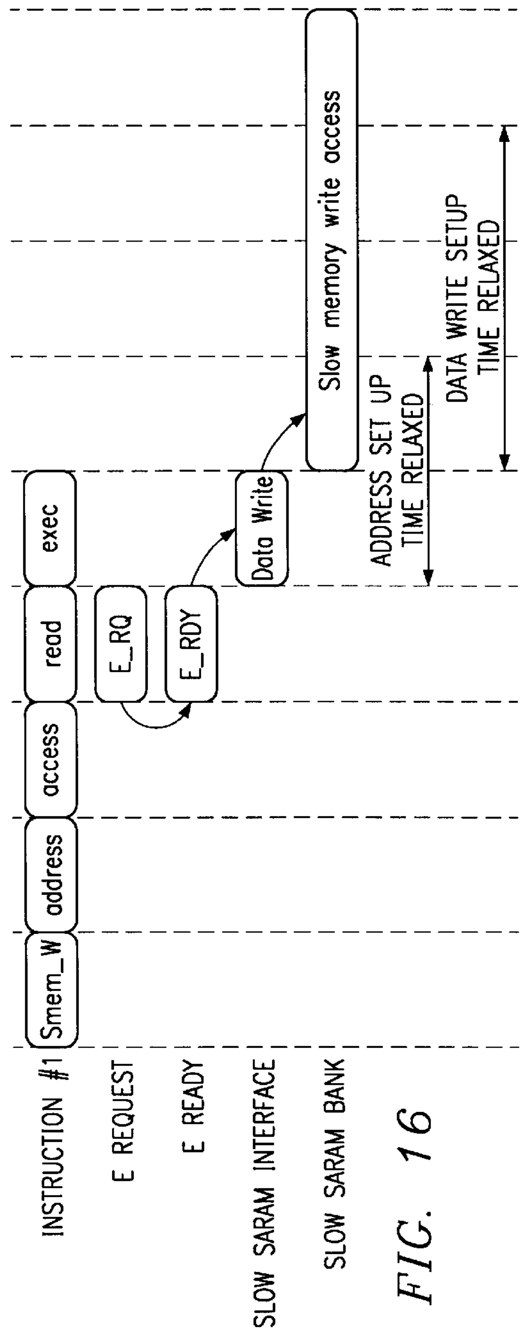
FIG. 16 is a timing diagram illustrating Slow memory/Write access.

FIG. 16 is a timing diagram illustrating Slow memory/Write access.

Figure 17:
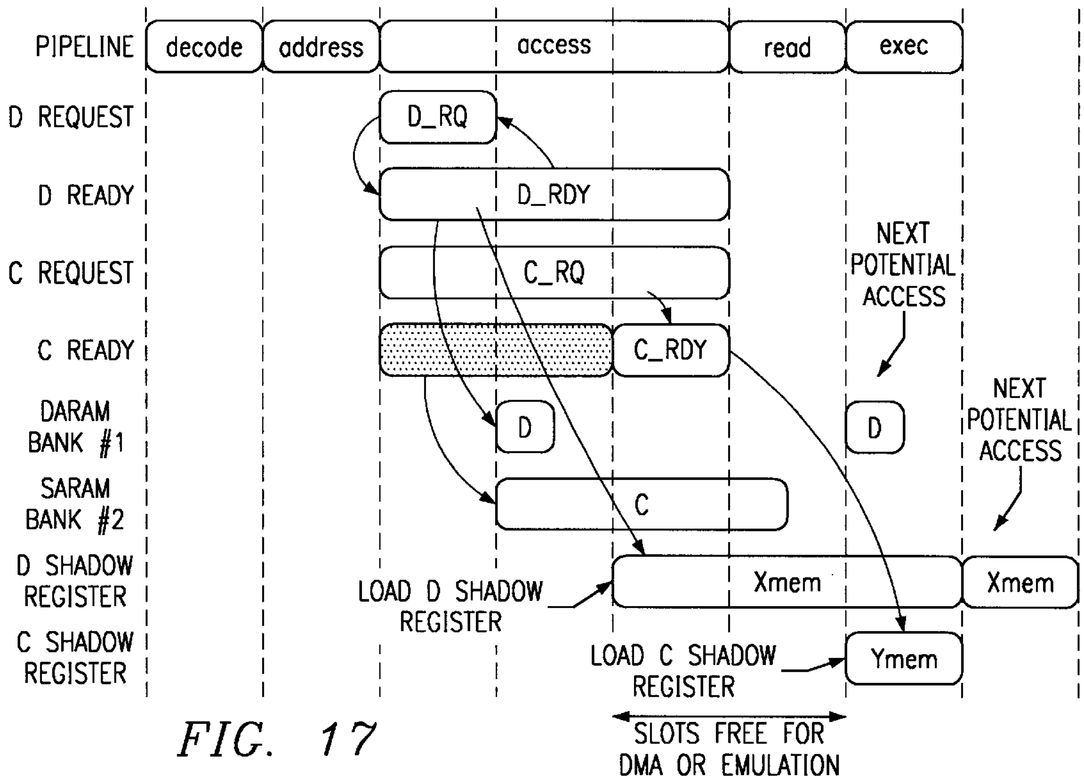
FIG. 17 is a timing diagram illustrating Dual instruction in which Xmem←fast operand, and Ymem←slow operand.

FIG. 17 is a timing diagram illustrating Dual instruction: Xmem←fast operand, Ymem←slow operand.

Figure 18:
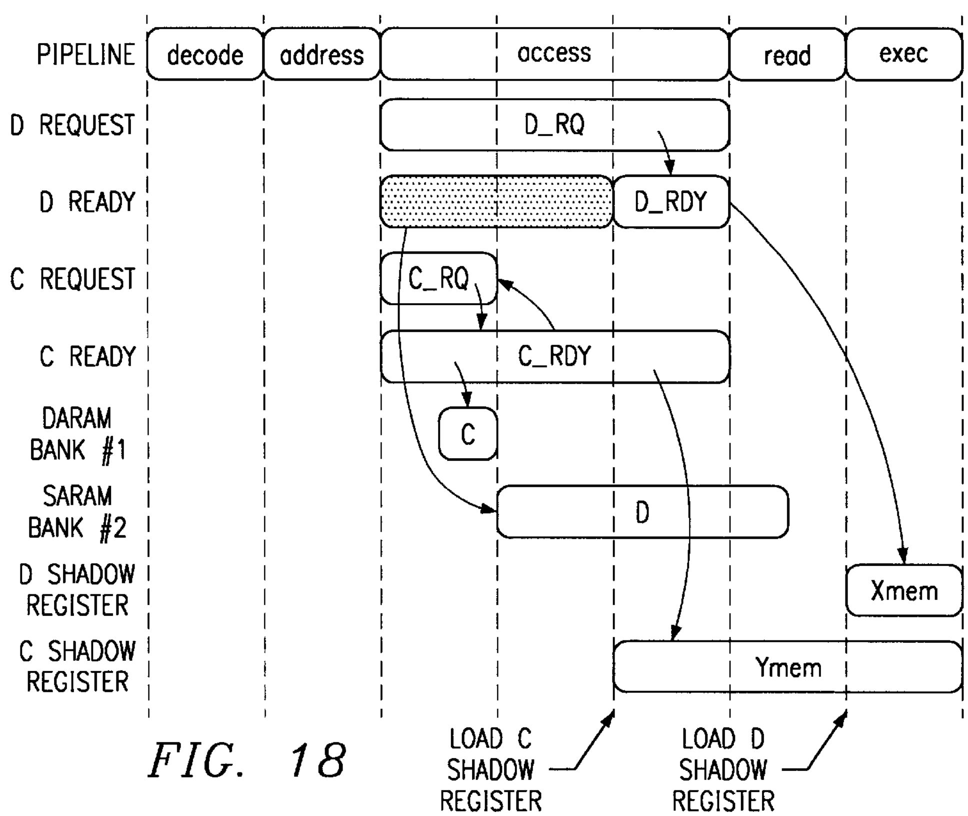
FIG. 18 is a timing diagram illustrating Dual instruction in which Xmem←slow operand, and Ymem←fast operand.

FIG. 18 is a timing diagram illustrating Dual instruction: Xmem←slow operand, Ymem←fast operand.

Figure 19:
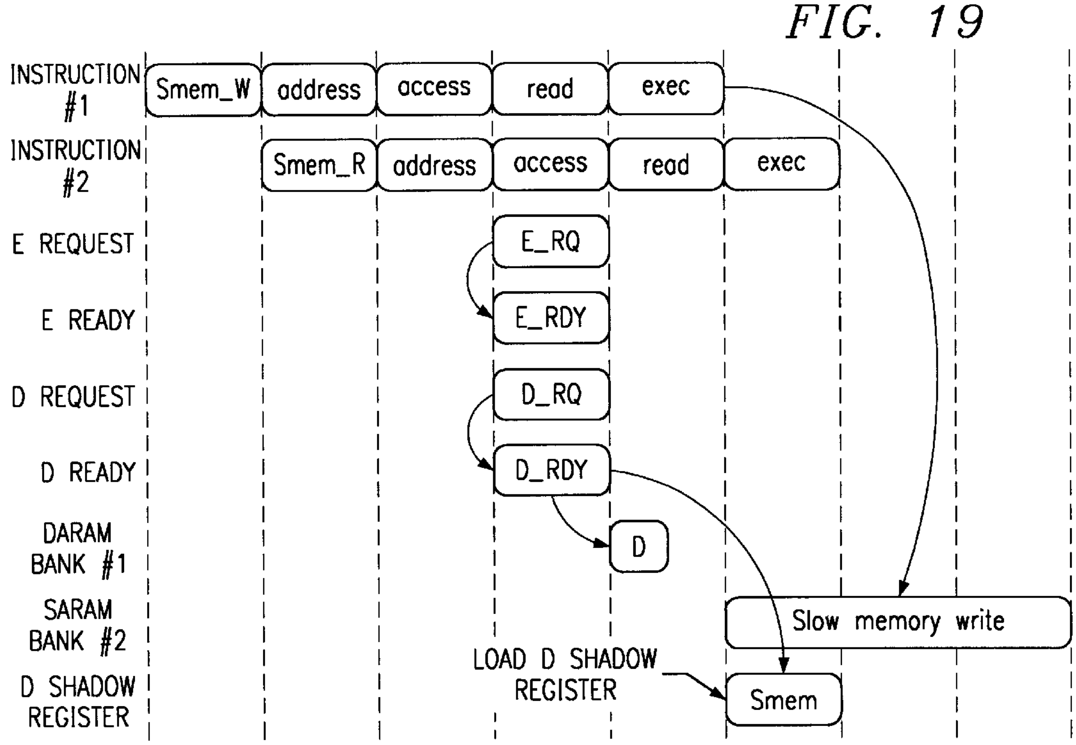
FIG. 19 is a timing diagram illustrating Slow Smem Write/Fast Smem read.

FIG. 19 is a timing diagram illustrating Slow Smem Write/Fast Smem read.

Figure 20:
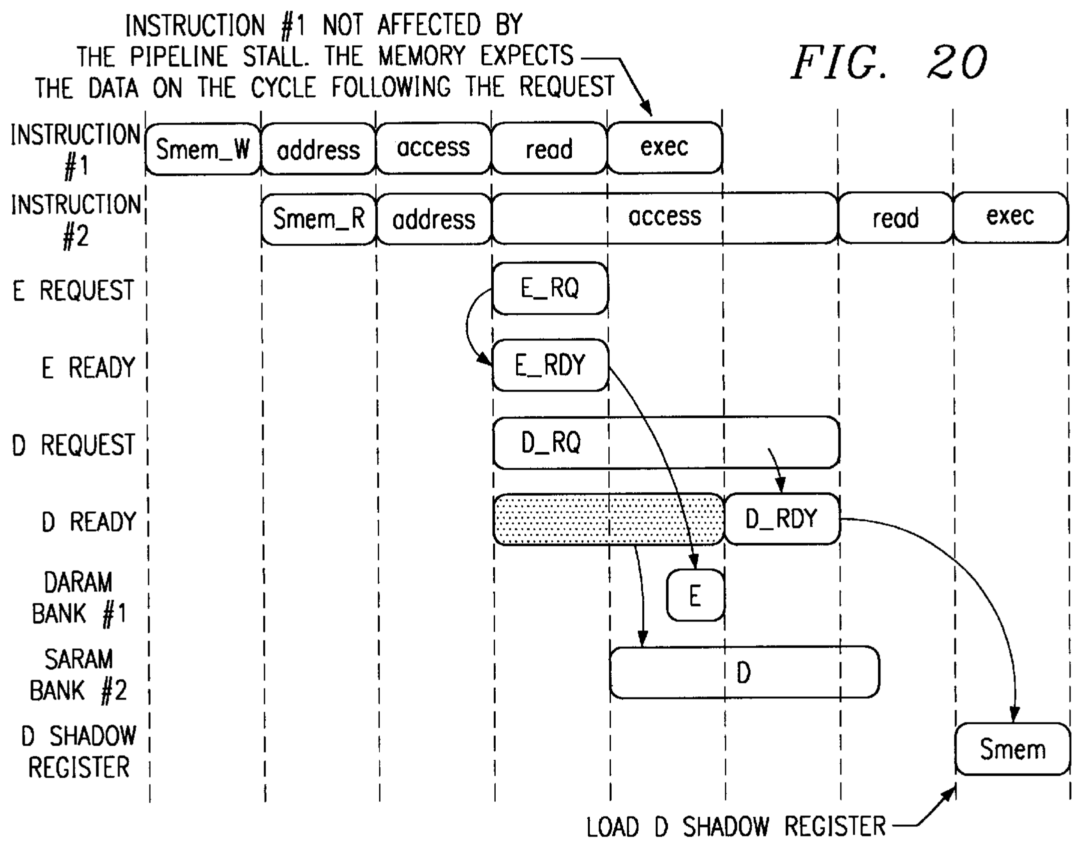
FIG. 20 is a timing diagram illustrating Fast Smem Write/Slow Smem read.

FIG. 20 is a timing diagram illustrating Fast Smem Write/Slow Smem read.

Figure 21:
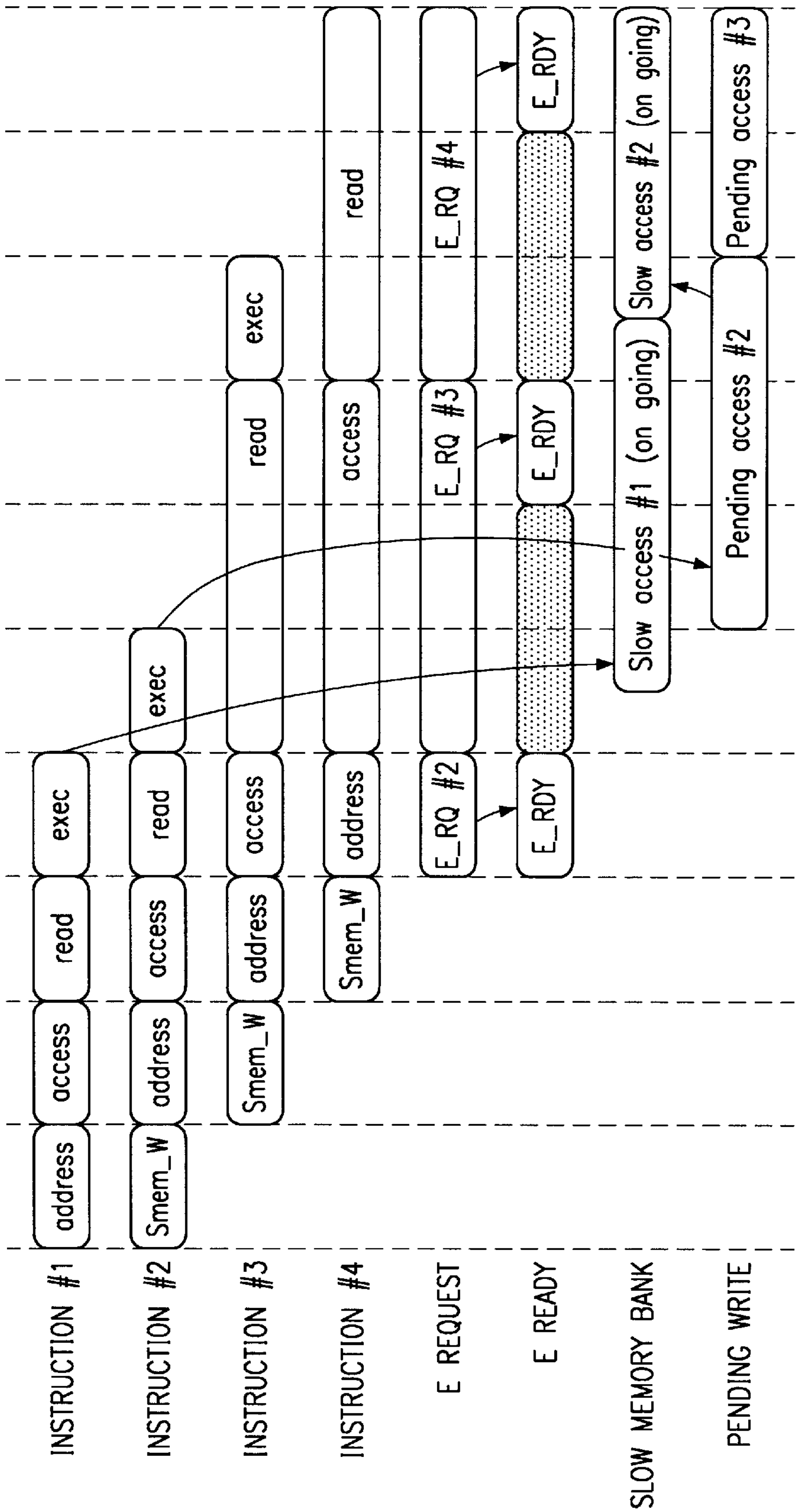
FIG. 21 is a timing diagram illustrating Slow memory write sequence in which a previously posted cycle is in progress an the Write queue is full.

FIG. 21 is a timing diagram illustrating Slow memory write sequence (Previous posted in progress & Write queue full).

Figure 22:
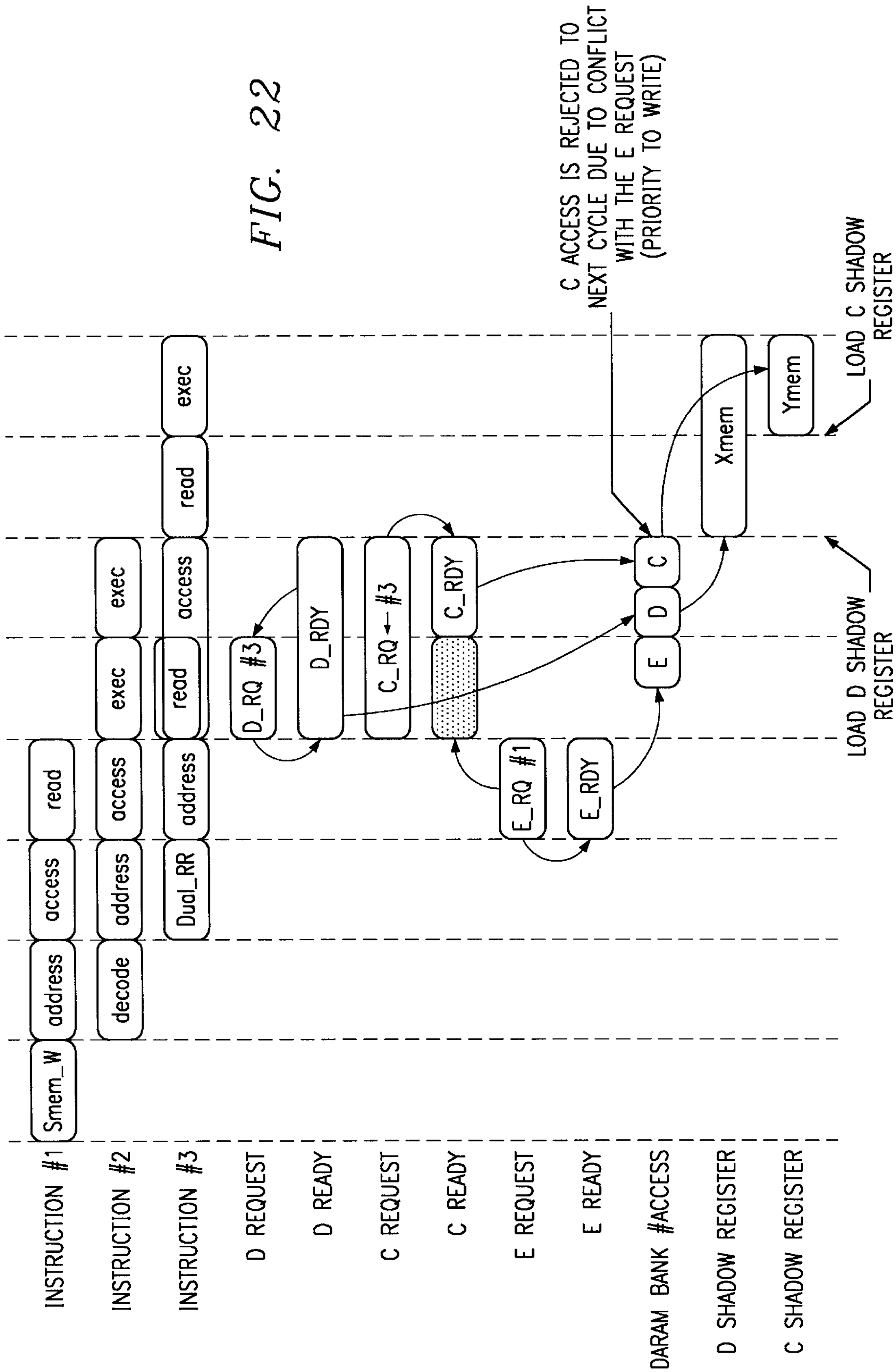
FIG. 22 is a timing diagram illustrating Single write/Dual read conflict in same DARAM bank.

FIG. 22 is a timing diagram illustrating Single write/Dual read conflict in same DRAM bank.

Figure 23:
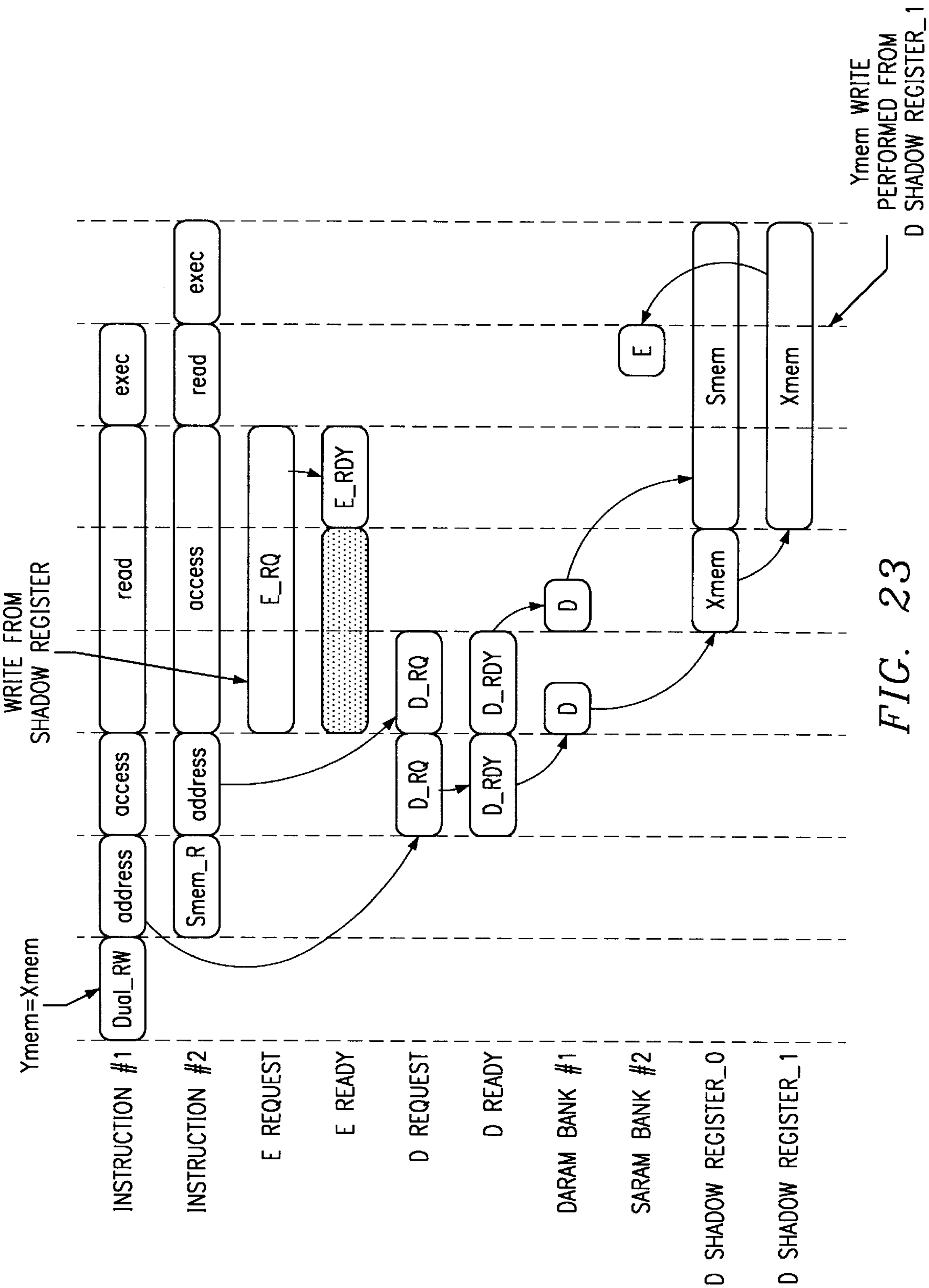
FIG. 23 is a timing diagram illustrating Fast to slow memory move.

FIG. 23 is a timing diagram illustrating Fast to slow memory move.

Figure 24:
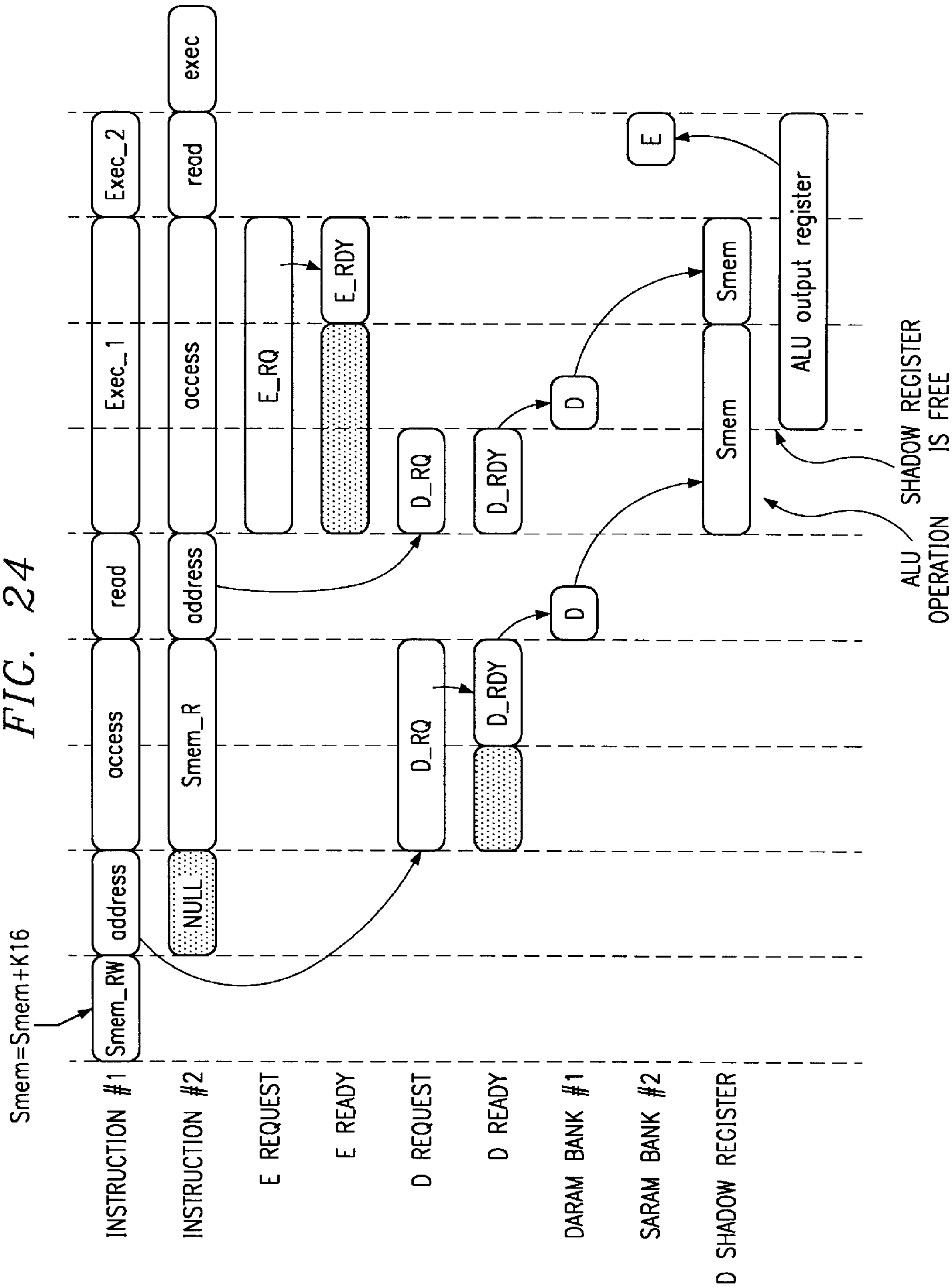
FIG. 24 is a timing diagram illustrating Read/Modify/write.

FIG. 24 is a timing diagram illustrating Read/Modify/write.

1.5.15 Test & Set instruction/Lock

The processor instruction set supports an atomic instruction which allows to manage semaphores stored within a shared memory like an APIRAM to handle communication with an HOST processor.

The algebraic syntax is:

TC1=bit(Smem,k4), bit(Smem,k4)=#1

TC2=bit(Smem,k4), bit(Smem,k4)=#1

TC1=bit(Smem,k4), bit(Smem,k4)=#0

TC2=bit(Smem,k4), bit(Smem,k4)=#0

The instruction is atomic, that means no interrupt can be taken in between $1^{st}$ execution cycle and $2^{nd}$ execution cycle.

Figure 25:
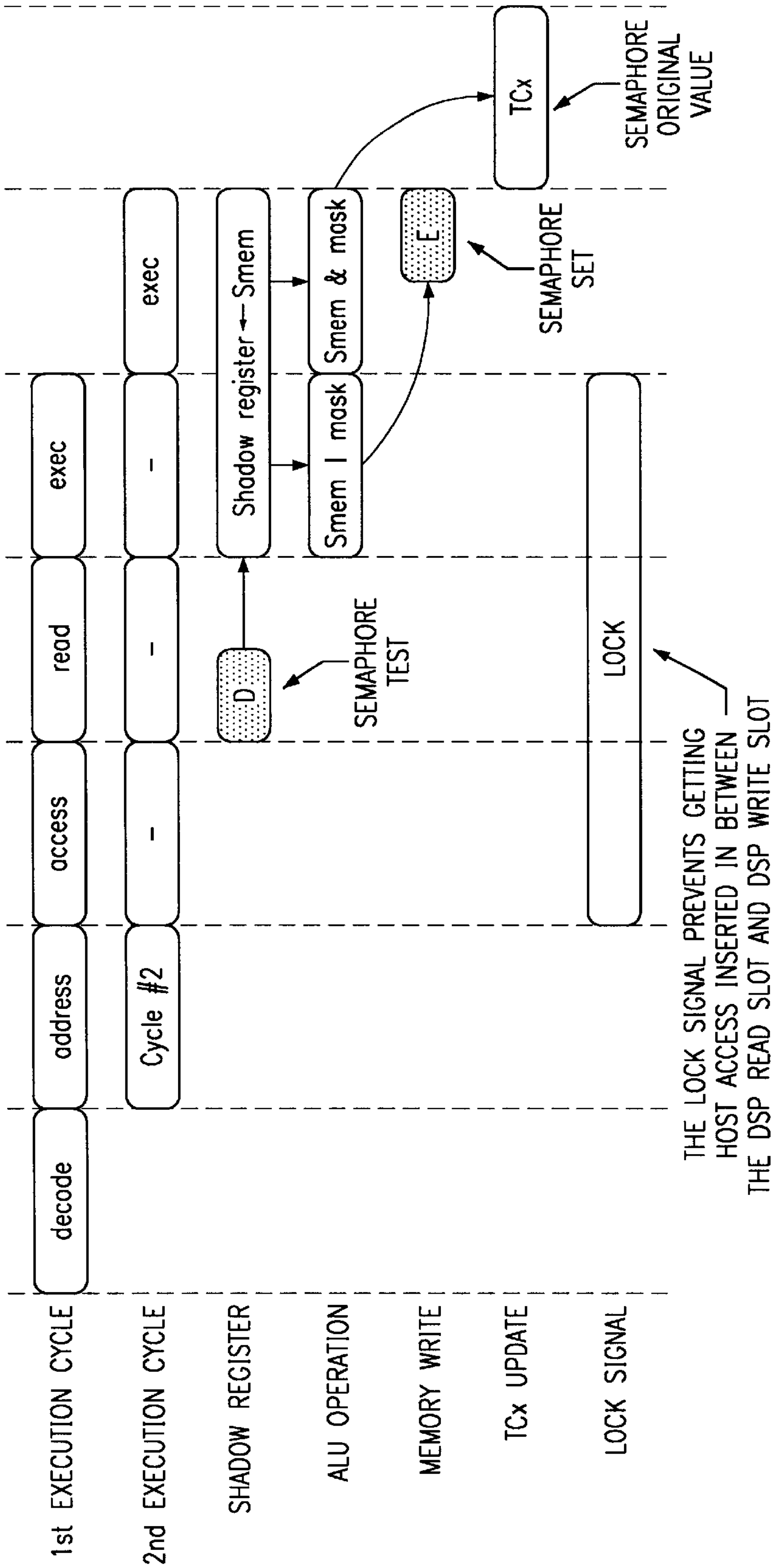
FIG. 25 is a timing diagram which shows the execution flow of the 'Test & Set' instruction.

FIG. 25 is a timing diagram which shows the execution flow of the ‘Test & Set’ instruction. The CPU generates a ‘lock’ signal which is exported at the edge of core boundary. This signal defines the memory read/write sequence window where no Host access can be allowed. Any Host access in between the DSP read slot and the DSP write slot would corrupt the application semaphores management. This lock signal has to be used within the arbitration logic of any shared memory, it can be seen as a ‘dynamic DSP mode only’.

1.5.16 Emulation

The emulation honors the lock, that means no DT-DMA request can be processed when the lock signal is active even if free memory slots are available for debug. This applies to both ‘polite’ & ‘intrusive’ modes.

Central Processing Unit

The central processing unit (CPU) will now be described in more detail. In this document section, we will use the following algebraic assembler syntax notation of the processor operations:

addition operation is noted: +
subtraction operation is noted: −
multiplication operation is noted: *
arithmetical shift operation is noted: <<
logical AND operation is noted: &
logical OR operation is noted: |
logical XOR operation is noted: ^
logical shift operation is noted: <<<
logical rotate to the right operation is noted: \\
logical rotate to the left operation is noted: //

2. D Unit

Figure 26:
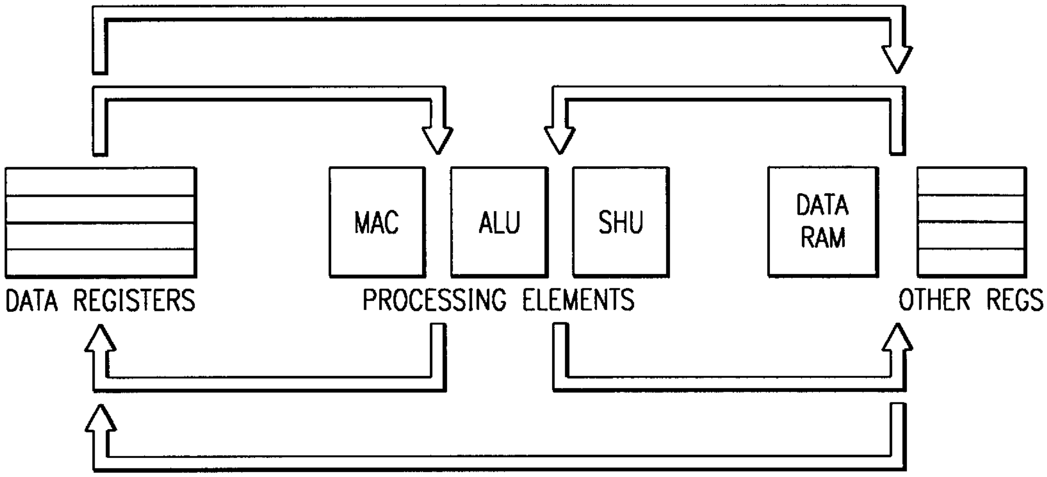
FIG. 26 is a block diagram of the D Unit showing various functional transfer paths.

FIG. 26 is a block diagram of the D Unit showing various functional transfer paths. This section describes the data types, the arithmetic operation and functional elements that build the Data Processing Unit of the processor Core. In a global view, this unit can be seen as a set of functional blocks communicating with the data RAM and with general-purpose data registers. These registers have also LOAD/STORE capabilities in a direct way with the memory and other internal registers. The main processing elements consist of a Multiplier-Accumulator block (MAC), an Arithmetic and Logic block (ALU) and a Shifter Unit (SHU).

In order to allow the most efficient parallelism, data exchange (the arrows in FIG. 26) are handled while computations are on going. Channels to and from the memory and other registers are limited to two data read and two written per cycle. The following chapters will describe in details how the data flow can overlap the computations and many other features, including the connection of external co-processors to enhance the overall processing performance.

2.1.1 Data Types and Arithmetic Operations on These Types

This section reviews the format of data words that the operators can handle and all arithmetic supported, including rounding and saturation or overflow modes.

2.1.1.1 Data Types

Figure 27:
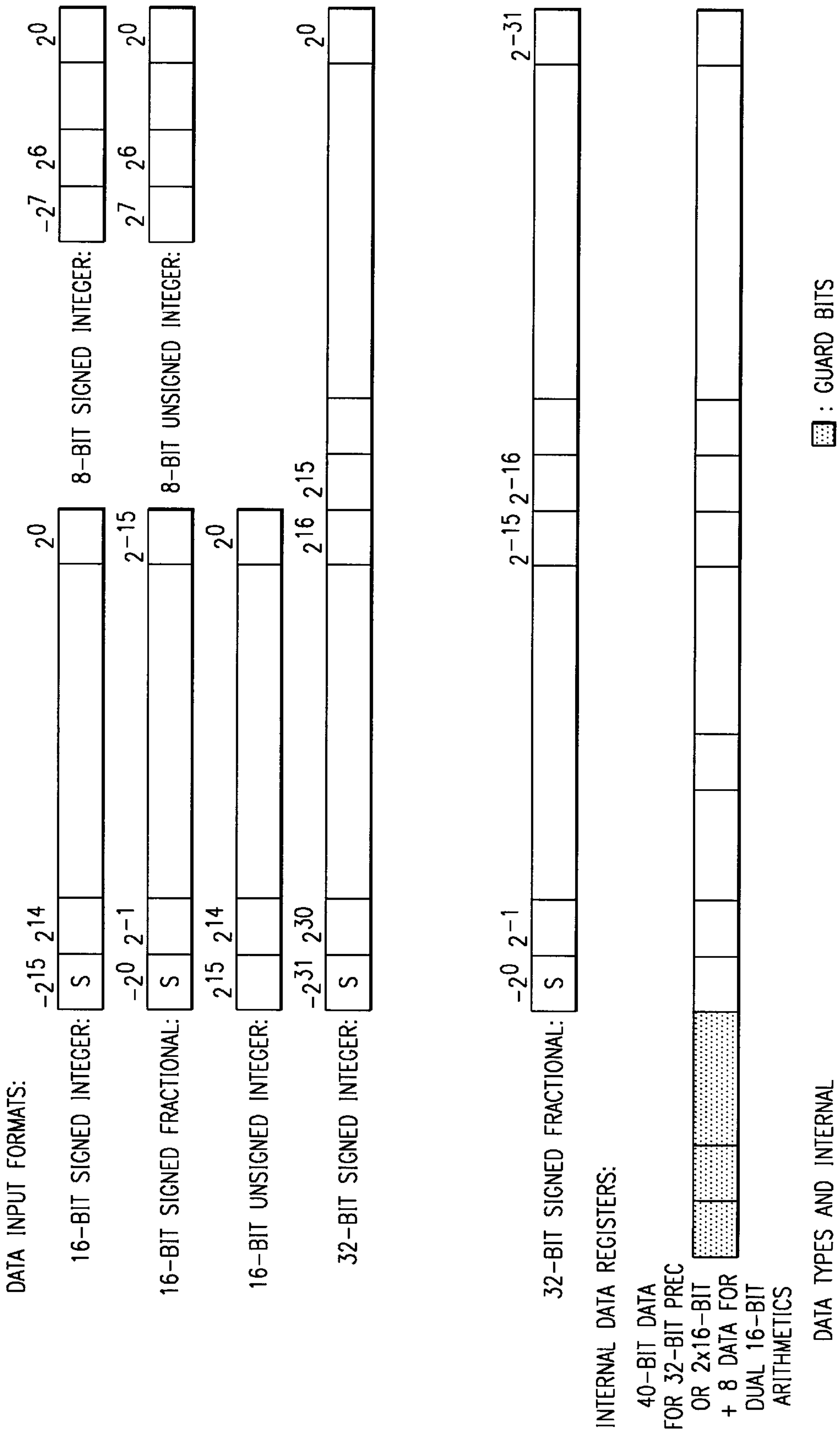
FIG. 27 describes the formats for all the various data types of the processor of FIG. 1.

FIG. 27 describes the formats for all the various data types of processor 100. The DU supports both 32 and 16 bit arithmetic with proper handling of overflow exception cases and Boolean variables. Numbers representations include signed and unsigned types for all arithmetic. Signed or unsigned modes are handled by a sign extension control flag called SXMD or by the instruction directly. Moreover, signed values can be represented in fractional mode (FRACT). Internal Data Registers will include 8 guard bits for full precision 32-bit computations. Dual 16-bit mode operations will also be supported on the ALU, on signed operands. In this case, the guard bits are attached to second operation and contain resulting sign extension.

2.1.1.2 Arithmetic Operations and Exceptions Handling

In this part, arithmetic operations performed on above types are reviewed and exceptions are detailed. These exceptions consist of overflow with corresponding saturation and rounding. Control for fractional mode is also described.

Sign extension occurs each time the format of operators or registers is bigger than operands. Sign extension is controlled by the SXMD flag (when on, sign extension is performed, otherwise, 0 extension is performed) or by the instruction itself (e.g., load instructions with <<uns>> keyword). This applies to 8, 16 and 32-bit data representation.

The sign status bit, which is updated as a result of a load or an operation within the D Unit, is reported according to M40 flag. When at zero, the sign bit is copied from bit 31 of the result. When at one, bit 39 is copied.

The sign of the input operands of the operators are determined as follows:

for arithmetic shifts, arithmetic ALU operations and loads:
  for input operands like: Smem/K16/DAx (16 bits):
    SI=(!UNS) AND (input bit 15) AND SXMD
  for input operands like: Lmem (32 bits):
    SI=(input bit 31) AND SXMD
  for input operands like: ACx (40 bits):
    SI=( ( ( (M40 OR FAMILY) AND (input bit 39) OR !(M40 OR FAMILY) AND (input bit 31)) AND !OPMEM ) OR
    (!UNS AND (input bit 39) AND OPMEM) ) AND SXMD
for logical shift and logical ALU operations:
  for all inputs:
    SI=0
for DUAL arithmetic shift and arithmetic ALU operations:
  SI1=(input bit 15) AND SXMD
  SI2=(input bit 31) AND SXMD
for MAC:
  SI=!UNS AND (input bit 15)

Limiting signed data in 40-bit format or in dual 16-bit representation from internal registers is called saturation and is controlled by the SATD flag or by specific instructions. The saturation range is controlled by a Saturation Mode flag called M40. Saturation limits the 40-bit value in the range of $-2^{31}$ to $2^{31}-1$ and the dual 16-bit value in the range of $-2^{15}$ to $2^{15}-1$ for each 16-bit part of the result if the M40 flag is off. If it is on, values are saturated in the range of $-2^{39}$ to $2^{39}-1$ or $-2^{15}$ to $2^{15}-1$ for the dual representation.

In order to go from the 40-bit representation to the 16-bit one, rounding has to occur to keep accuracy during computations. Rounding is managed via the instruction set, through a dedicated bit field, and via a flag called RDM. The combination of results in following modes:

When rounding (rnd) is on:
RDM=0:
  generates Round to+infinity
  40-bit data value→addition of $2^{15}$. The 16 LSBs are cleared
RDM=1
  generates Round to the nearest
  40-bit data value→this is a true analysis of the 16 LSBs to detect if they are in the range of:
    $2^{15}-1$ to 0 (value lower than 0.5) where no rounding occurs,
    $2^{15}+1$ to $2^{16}-1$ (value greater than 0.5) where rounding occurs
    by addition of $2^{15}$ to the 40-bit value.
    $2^{15}$ (value equals 0.5) where rounding occurs if the 16-bit
  high part of the 40-bit value is odd, by adding $2^{15}$.

The 16 LSBs are cleared in all modes, regardless of saturation. When rounding is off, nothing is done.

Load operations follow sign extension rules. They also provide 2 zero as follows:

if result[31:0]==0, then zero32=1 else zero32=0, if result[39:0]==0, then zero40=1 else zero40=0.

2.1.2 Multiplication

Multiplication operation is also linked with multiply-and-accumulate. These arithmetic functions work with 16-bit signed or unsigned data (as operands for the multiply) and with a 40-bit value from internal registers (as accumulator). The result is stored in one of the 40-bit Accumulators. Multiply or multiply-and-accumulate is under control of FRACT, SATD and Round modes. It is also affected by the GSM mode which generates a saturation to "00 7FFF FFFF" (hexa) of the product part when multiply operands are both equal to $-2^{15}$ and that FRACT and SATD modes are on.

For sign handling purpose, the multiply operands are actually coded on 17 bits (so sign is doubled for 16-bit signed data). These operands are always considered signed unless controlled by the instruction. When the source of these values is an internal register then full signed 17-bit accurate computation is usable.

Operations available on multiply-and-accumulate scheme are:

MPY→multiply operation,

MAC→multiply and add to accumulator content,

MAS→subtract multiply result from the accumulator content.

Table 14 shows all possible combinations and corresponding operations. The multiply and the "multiply-and-accumulate" operations return status bits which are Zero and Overflow detection.

-continued

| | |
|---|---|
| Z39 | zero detection on range bits 39:0 |
| FAMILYlead mode on | |

Overflow is set when 32-bit or 40-bit numbers representations limits are exceeded, so the overflow definitions are as follows:

```
        OV40 = C39 XNOR S39
        OV32 = (S39:31 != 0) AND (S39:31 != 1)
    if M40 = 1:
        OV = OV40
    if M40 = 0:
        OV = OV32
```

The saturation can then be computed as follows:

```
if M40 = 1:
    if OV40:
        bits:    39              38 . . . 0
        out:     !S39            S39 . . . S39
if M40 = 0:
    if OV32 AND !OV40:
        bits:    39 . . . 31     30 . . . 0
        out:     S39 . . . S39   !S39 . . . !S39
    if OV40:
        bits:    39 . . . 31     30 . . . 0
        out:     !S39 . . . !S39 S39 . . . S39
```

TABLE 14

MPY, MAC, and MAS operations

| FRACT | GSM | SATD | RND | MPY | MAC | MAS |
|---|---|---|---|---|---|---|
| on | off | off | off | x*(2*y) | x*(2*y) + a | a − x*(2*y) |
| off | off | off | off | x*y | x*y + a | a − x*y |
| on | on | off | off | x*(2*y) | x*(2*y) + a | a − x*(2*y) |
| off | on | off | off | x*y | x*y + a | a − x*y |
| on | off | on | off | satM40(x*(2*y)) | satM40(x*(2*y) + a) | satM40(a − x*(2*y)) |
| off | off | on | off | satM40(x*y) | satM40(x*y + a) | satM40(a − x*y) |
| on | on | on | off | satM40(x*(2*y)) | satM40(x*(2*y) + a) | satM40(a − x*(2*y)) |
| | | | | x = y = 215:231 − 1 | satM40(231 − 1 + a) | satM40(a − 231 + 1) |
| off | on | on | off | satM40(x*y) | satM40(x*y + a) | satM40(a − x*y) |
| on | off | off | on | rndRDM(x*(2*y)) | rndRDM(x*(2*y) + a) | rndRDM(a − x*(2*y)) |
| off | off | off | on | rndRDM(x*y) | rndRDM(x*y + a) | rndRDM(a − x*y) |
| on | on | off | on | rndRDM(x*(2*y)) | rndRDM(x*(2*y) + a) | rndRDM(a − x*(2*y)) |
| off | on | off | on | rndRDM(x*y) | rndRDM(x*y + a) | rndRDM(a − x*y) |
| on | off | on | on | satM40(rndRDM(x*(2*y))) | satM40(rndRDM(x*(2*y) + a)) | satM40(rndRDM(a − x*(2*y))) |
| off | off | on | on | satM40(rndRDM(x*y)) | satM40(rndRDM(x*y + a)) | satM40(rndRDM(a − x*y)) |
| on | on | on | on | satM40(rndRDM(x*(2*y))) | satM40(rndRDM(x*(2*y) + a)) | satM40(rndRDM(a − x*(2*y))) |
| | | | | x = y = 215:231 − 1 | satM40(rndRDM(231 − 1 + a)) | satM40(rndRDM(a − 231 + 1)) |
| off | on | on | on | satM40(rndRDM(x*y)) | satM40(rndRDM(x*y + a)) | satM40(rndRDM(a − x*y)) |

rndRDM() : rounding under control of RDM flag
satM40() : saturation under control of M40 flag For the following paragraphs, the syntax used is:

| | |
|---|---|
| Cx | output carry of bit x |
| Sx | output sum of bit x |
| Sx:y | output sum of range bits |
| OV40 | overflow on 40 bits |
| OV32 | overflow on 32 bits |
| OV | output overflow bit |
| Z31 | zero detection on range bits 31:0 |

GSM saturation:

if (SATD AND FRCT AND GSM AND inputs=1 8000) THEN out=00 7FFF FFFF

These saturation results can be modified if rounding is on:

if rnd: bits 15:0=0

Zero flags are set as follows:

Z32=Z31 AND !(OV AND SAT)*Z40=Z39 AND !(OV AND SAT)

When saturating to: 80 0000 0000, Z32 is 1.

2.1.3 Addition/Subtraction

Table 15 provide definitions which are also valid for operations like 'absolute value" or "negation" on a variable as well as for dual "add-subtract" or addition or subtraction with CARRY status bit.

Addition and subtraction operations results range is controlled by the SATD flag. Overflow and Zero detection as well as Carry status bits are generated. Generic rules for saturation apply for 32-bit and dual 16-bit formats. Table 15 below shows applicable cases.

TABLE 15

| Definitions | | |
|---|---|---|
| SAT | ADD | SUB |
| off | 40-bit x + y<br>Dual 16-bit: (xh + yh) ∥ (xl + yl) | 40-bit x − y<br>Dual 16-bit (xh − yh) ∥ (xl − yl) |
| on | 40-bit satM40(x + y)<br>Dual 16-bit: sat16(xh + yh) ∥ sat 16(xl + yl) | 40-bit satM40(x + y)<br>Dual 16-bit: sat16(xh − yh) ∥ sat16(xl − yl) |

For the following paragraphs, the syntax used is:

| | |
|---|---|
| Cx | output carry of bit x |
| Sx | output sum of bit x |
| Sx:y | output sum of range bits |
| OV40 | overflow on 40 bits |
| OV32 | overflow on 32 bits |
| OV16 | overflow on 16 bits |
| OV | output overflow bit |
| Z31 | zero detection on range bits 31:0 |
| Z39 | zero detection on range bits 39:0 |
| FAMILYlead mode on | |

Overflow detection is as follows:

```
    OV40 = C39 XOR C38
    OV32 = (S39:31 != 0) AND (S39:31 != 1)
    OV16 = C15 XOR C14
if M40 = 1:
    OV = OV40
if M40 = 0:
    OV = OV32 OR OV40
if DUAL mode on:
    OV = ((OV16 OR OV32 OR OV40) AND !FAMILY) OR
         ((OV32 OR OV40) AND FAMILY)
```

The saturation can then be computed as follows:

```
NORMAL mode:    if M40 = 1:
        if OV40:
            bits:     39              38 . . . 0
            out:      !S39            S39 . . . S39
    if M40 = 0:
        if OV32 AND !OV40:
            bits:     39 . . . 31     30 . . . 0
            out:      S39 . . . S39   !S39 . . . !S39
        if OV40:
            bits:     39 . . . 31     30 . . . 0
            out:      !S39 . . . !S39 S39 . . . S39
```

If the keyword SATURATE is used, saturation is executed as if M40=0.

DUAL mode:

```
if FAMILY = 0:
    if OV16:
        bits:     15              14 . . . 0
        out:      !S15            S15 . . . S15
    if OV32 AND !OV40:
        bits:     39 . . . 31     30 . . . 16
        out:      S39 . . . S39   !S39 . . . !S39
```

-continued

```
    if OV40:
        bits:     39 . . . 31     30 . . . 16
        out:      !S39 . . . !S39 S39 . . . S39
if FAMILY = 1: no saturation is performed.
```

These saturation results can be modified if rounding is on (for both modes):

if rnd AND !FAMILY: bits 15:0=0 (in FAMILY mode and rnd is on, LSBs are not cleared)

For NORMAL or DUAL modes, zero flags are as in MAC.

For shifts using an internal register (16-bit DRS register), the limitation of the shift range is:

$$-32 \leqq \text{range} \leqq 31$$

(clamping is done to −32 if value in the register≦−32, to 31 if value in the register≧31).

An overflow is reported only in the case of an arithmetic shift, neither for logical shift nor when the output is a memory.

In FAMILY mode, for shifts using an internal register (6 LSBits DRS register), the limitation of the range is:

$$-16 \leqq \text{range} \leqq 31$$

If: −32≦value in the register≦−17, then 16 is added to this value to retrieve the range above.

No overflow is reported.

2.1.4 Arithmetic Shift

Arithmetic shift operations include right and left directions with hardware support up to 31. When left shift occurs, zeros are forced in the least significant bit positions. Sign extension of operands to be shifted is controlled as per 2.2.1. When right shift is performed, sign extension is controlled via SXMD flag (sign or 0 is shifted in). When M40 is 0, before any shift operation, zero is copied in the guard bits (39–32) if SXMD is 0, otherwise, if SXMD is 1, bit 31 of the input operand is extended in the guard bits. Shift operation is then performed on 40 bits, bit 39 is the shifted in bit. When M40 is 1, bit 39 (or zero), according to SXMD, is the shifted in bit.

Saturation is controlled by the SATD flag and follows the generic rules as far as the result is concerned.

Overflow detection is performed as described below.

A parallel check is performed on actual shift: shifts are applied on 40-bit words so the data to be shifted is analyzed as a 40-bit internal entity and search for sign bit position is performed. For left shifts, leading sign position is calculated starting from bit position 39 (=sign position 1) or bit position 31 when the destination is a memory (store instructions). Then the range defined above is subtracted to this sign position. If the result is greater than 8 (if M40 flag is off) or 0 (if M40 is on), no overflow is detected and the shift is considered as a valid one; otherwise, overflow is detected.

Figure 28:
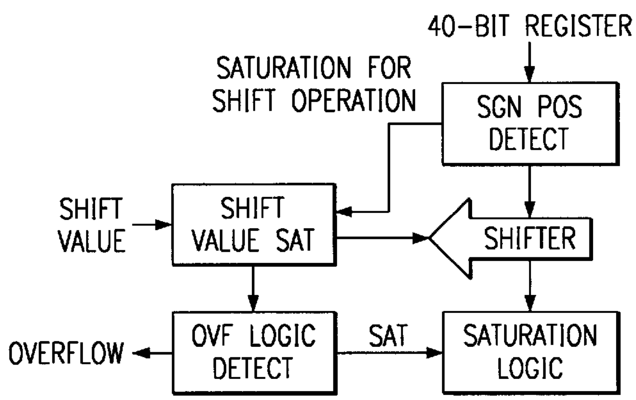
FIG. 28 shows a functional diagram of the shift saturation and overflow control.

FIG. 28, shows a functional diagram of the shift saturation and overflow control. Saturation occurs if SATD flag is on and the value forced as the result depends on the status of M40 (the sign is the one, which is caught by the leading sign bit detection). A Carry bit containing the bit shifted out of the 40-bit window is generated according to the instruction.

an earlier family processor compatible mode: when FAMILY compatibility flag is on, no saturation and no overflow detection is performed if the output shifter is an accumulator: arithmetical shifts are performed on 40 bits (regardless M40).

Below are the equations that summarize this functionality:

The syntax used is:

| | |
|---|---|
| Cx | output carry of bit x |
| Sx | output sum of bit x |
| Sx:y | output sum of range bits |
| OVs40 | overflow after shift on 40 bits |
| OVr40 | overflow after rounding on 40 bits |
| OV40 | overflow on 40 bits |
| OVr32 | overflow after rounding on 32 bits |
| OVru32 | overflow after rounding on 32 bits unsigned word |
| OVu32 | overflow on 32 bits unsigned word |
| OV32 | overflow on 32 bits |
| OV | output overflow bit |
| FAMILYlead mode on | |
| UNS | unsigned mode on |
| SATURATE | saturate keyword |
| OPMEM | operation on memory regardless of the address (the output name is not an explicit accumulator) |
| SI | sign of the input operand before the shift |

Overflow detection is as follows:

```
    OVr40 = C39 XOR C38
    OVs40 = (sign_position(input) - shift #) <= 0
    OV40 = (OVs40 OR OVr40) AND (SATURATE OR !OPMEM)
    OVr32 = (SI, S39:31 != 0) AND (SI, S39:31 != 1) AND !C39
    OV32 = (OVs40 OR OVr32) AND !FAMILY AND
    (SATURATE OR !OPMEM)
OR
        OVr32 AND FAMILY AND SATURATE
        OVru32 = (SI, S39:32 != 0) OR C39
        OVu32 = (OVs40 OR OVru32) AND !FAMILY AND
        (SATURATE OR !OPMEM)
OR
        OVru32 AND FAMILY AND SATURATE
if M40 = 1:
    OV = OV40
if M40 = 0:
    OV = OV32 OR OVu32
```

If the destination is a memory, there is no overflow report but saturation can still be computed.

The saturation can then be computed as follows:

SIGNED operands (no uns keyword):

```
If M40 = 1;
    if OV40:
        bits:      39            38 . . . 0
        out:       SI            !SI . . . !SI
if M40 = 0:
    if OV32:
        bits:      39 . . . 31   30 . . . 0
        out:       SI . . . SI   !SI . . . !SI
```

If the keyword SATURATE is used, saturation is executed as if M40=0, regardless of SATD.

UNSIGNED operands (uns keyword) with SATURATE, regardless of SATD:

```
if OVu32:
    Out:    00 FFFF FFFF
```

UNSIGNED operands without SATURATE:

saturation is done like signed operands (depending of SATD).

These saturation results can be modified if rounding is on:

if rnd: bits 15:0=0

Zero flags are set as follows:

Z32=Z31 AND (!(OV AND SAT AND !FAMILY) OR FAMILY)*

Z40=Z39 AND (!(OV AND SAT AND !FAMILY) OR FAMILY)

* When saturating to: 80 0000 0000, Z32 is 1.

One instruction of the <<DUAL>> class supports dual shift by 1 to the right. In this case, shift window is split at bit position 15, so that 2 independent shifts occur. The lower part is not affected by right shift of the upper part. Sign extension rules apply as described earlier.

When the destination is a memory, there is no update of the zero and overflow bits, unless the memory address is an Accumulator: in that case, zero flags are updated.

When the ALU is working with the shifter, the output overflow bit is a OR between: the overflow of the shift value, the overflow of the output shifter and the overflow of the output of the ALU.

2.1.5 Logical Operations on the Boolean Type

Operands carrying Boolean values on an 8, 16 or 32-bit format are zero extended for computations.

Operations that are defined on Boolean variables are of two kinds:

For Logical Bitwise Operations, the operation is performed on the full 40 bits representation.

The shift of logical vectors of bits depends again on the M40 flag status. When M40 equals 0, the guard bits are cleared on the input operand. The Carry or TC2 bits contain the bit shifted out of the 32-bit window. For rotation to the right, shifted in value is applied on bit position #31. When M40 flag is on, the shift occurs using the full 40-bit input operand. Shifted in value is applied on bit position #39 when rotating to the right. Carry or TC2 bits contain the bit shifted out.

There is neither overflow report nor saturation on computation (the shift value can be saturated as described earlier).

There is no Carry update if the shifter output is going to the ALU.

If the shifter output is going to the ALU and the FAMILY mode is on, computation is done on 40 bits.

an earlier family processor compatible mode: when FAMILY compatibility flag is on logical shifts and rotations are performed on 32 bits (regardless M40).

2.2 The MAC unit

The multiply and accumulate unit performs its task in one cycle. Multiply input operands use a 17-bit signed representation while the accumulation is on 40 bits. Arithmetic modes, exceptions and status flags are handled as described earlier. Saturation mode selection can be also defined dynamically in the instruction.

2.2.1 Instruction Set

The MAC Unit will execute some basic operations as described below:

- MPY/MPYSU: multiply input operands (both signed or unsigned/one signed the other unsigned),
- MAC: multiply input operands and add with accumulator content,
- MAS: multiply input operands and subtract from accumulator content.

2.2.2 Input Operands

Possible sources of operands are defined below:

from memory:
- 2 16-bit data from RAM,
- 1 16-bit data from "coefficient" RAM, from internal Data registers:
- 2 17-bit data from high part (bits 32 to 16) of register,
- 1 40-bit data for accumulation, from instruction decode:
- 1 16-bit "immediate" value, from other 16-bit registers:
- 1 16-bit data.

Shifting operations by 16 towards LSBs involved in MAC instructions are all performed in the MAC Unit: sign propagation is always done and uses the bit 39.

Destination of result is always one of the internal Data Registers. Table 16 shows the allowed combinations of inputs (x, y ports). Accumulator "a" is always coming from internal Data registers. It can be shifted by 16 positions to the LSBs before use.

TABLE 16

| | Allowed Inputs | | | | |
|---|---|---|---|---|---|
| | Y | | | | |
| X | 16 bit dat (RAM) | 16 bit dat (reg) | 17 bit dat (reg) | 16 bit dat (CFP) | 16 bit dat (imm.) |
| 16-bit data (RAM) | OK | — | OK | OK | — |
| 16-bit data (reg) | OK | — | OK | — | OK |
| 17-bit data (reg) | — | — | OK | — | OK |
| 16-bit data (CFP) | — | — | — | — | — |
| 16-bit data (immediate) | — | — | — | — | — |

2.2.3 Memory Source for Operands

Figure 29:
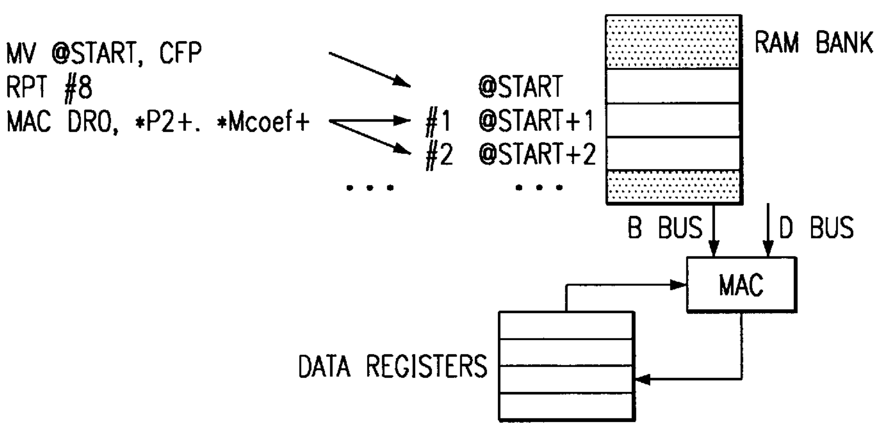
FIG. 29 shows the coefficient and data delivery by the B and D buses.

Data coming from memory are transferred via D and C buses. In order to allow automatic addressing of coefficients without sacrificing a pointer, a third dedicated bus called B bus is provided. Coefficient and data delivery will combine B and D buses as shown in FIG. 29. The B bus will be associated with a given bank of the memory organization. This bank will be used as "dynamic" storage area for coefficients.

Access to the B bus will be supported in parallel with a Single, Dual or Long access to other part of the memory space and only with a Single access to the associated memory bank. Addressing mode to deliver the B value will use a base address (16 bits) stored in a special pointer (Mcoef—memory coefficient register) and an incrementer to scan the table. The instruction in this mode is used to increment the table pointer, either for "repeat" (see FIG. 29) or "repeat block" loop contexts. As such, the buffer length in the coefficients block length is defined by the loop depth. The key advantage of this approach is local buffering of reusable data coming either from program/datarom space or computed on-the fly, without sacrificing a generic address pointer.

2.2.4 Dual MAC Operations Support

Figure 30:
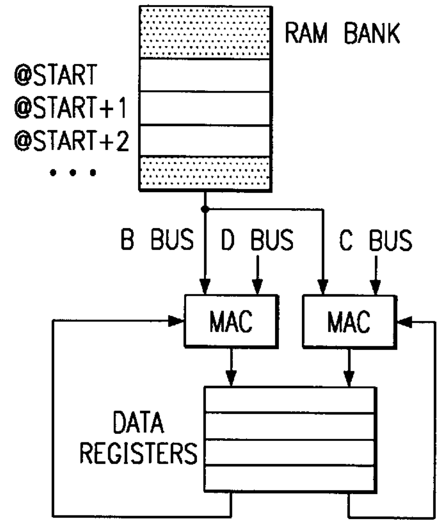
FIG. 30 shows the "coefficient" bus and its associated memory bank shared by the two operators.

In order to support increasing demand of computation power and keep the capability to get the lowest cost (area and power) if needed, the MAC Unit will be able to support dual multiply-and-accumulate operations in a configurable way. This is based on several features:

- it will be possible to plug-in a second MAC hardware with same connectivity to the operands sources and destinations as the main one,
- the plugged-in operator will be stopped when only one MAC per cycle is needed during the algorithm execution,
- Parallel execution will be controlled by the instruction unit, using a special "DUAL" instruction class,
- in terms of throughput, the most efficient usage of the dual MAC execution requires a sustained delivery of 3 operands per cycle, as well as two accumulators contents, for DSP algorithms. As it was chosen not to break the whole buses architecture while offering the increase in computation power, the B bus system described in item 3.3 above will give the best flexibility to match this throughput requirement. Thus, the "coefficient" bus and its associated memory bank will be shared by the two operators as described in FIG. 30.

The instruction that will control this execution will offer dual addressing on the D and C buses as well as all possible combinations for the pair of operations among MPY, MPYSU, MAC and MAS operations and signed or unsigned operations. Destinations (Accumulators) in the Data Registers can be set separately per operation but accumulators sources and destinations are equal. Rounding is common to both operations. CFP pointer update mechanism will include increment or not of the previous value and modulo operation. Finally, Table 17, on next page, shows application of the scheme depicted in FIG. 30 to different algorithms and RAM storage organization.

TABLE 17

| Algorithm | Coeff RAM content | Main RAM content |
|---|---|---|
| FIR : s(0:p-1)<br>$s(i)=S^{n-1}c(j).x(i-j)$<br>i=0 | c(j) | D : x(i-j)<br>C : x(i+1-j) |
| Matrix Multiply :<br>p(0:n-1,0:n-1)<br>n-1 | b(k,j) | D : a(i,k)<br>C : a(i+1,k) |

TABLE 17-continued

| Algorithm | Coeff RAM content | Main RAM content |
|---|---|---|
| ρ(i.i=Sa(i.k*b(k.i) | | |
| k=0 | | |
| IIR : s(0:p-1) | s(i-j-1) | D : c(j) |
| n-1 | | C : c(j+1) |
| s(i)=Sc(j).s(i-j-1) | | |
| i=0 | | |
| AutoCorrel.:x(0:159) | x(j-i) | D : x(j) |
| s(0:8) | | C : x(j+1) |
| s(i)=$S^{159}$x(j).x(j-i) | | |
| FFT : 128 points | W(j) | D : Re(x(j)) |
| | (complex) | C : Im(x(j)) |

For exceptions and status bits handling, the Dual-Mac configuration will generate a double set of flags, one per accumulator destination.

2.2.5 MAC Unit Block Diagram

Figure 31:
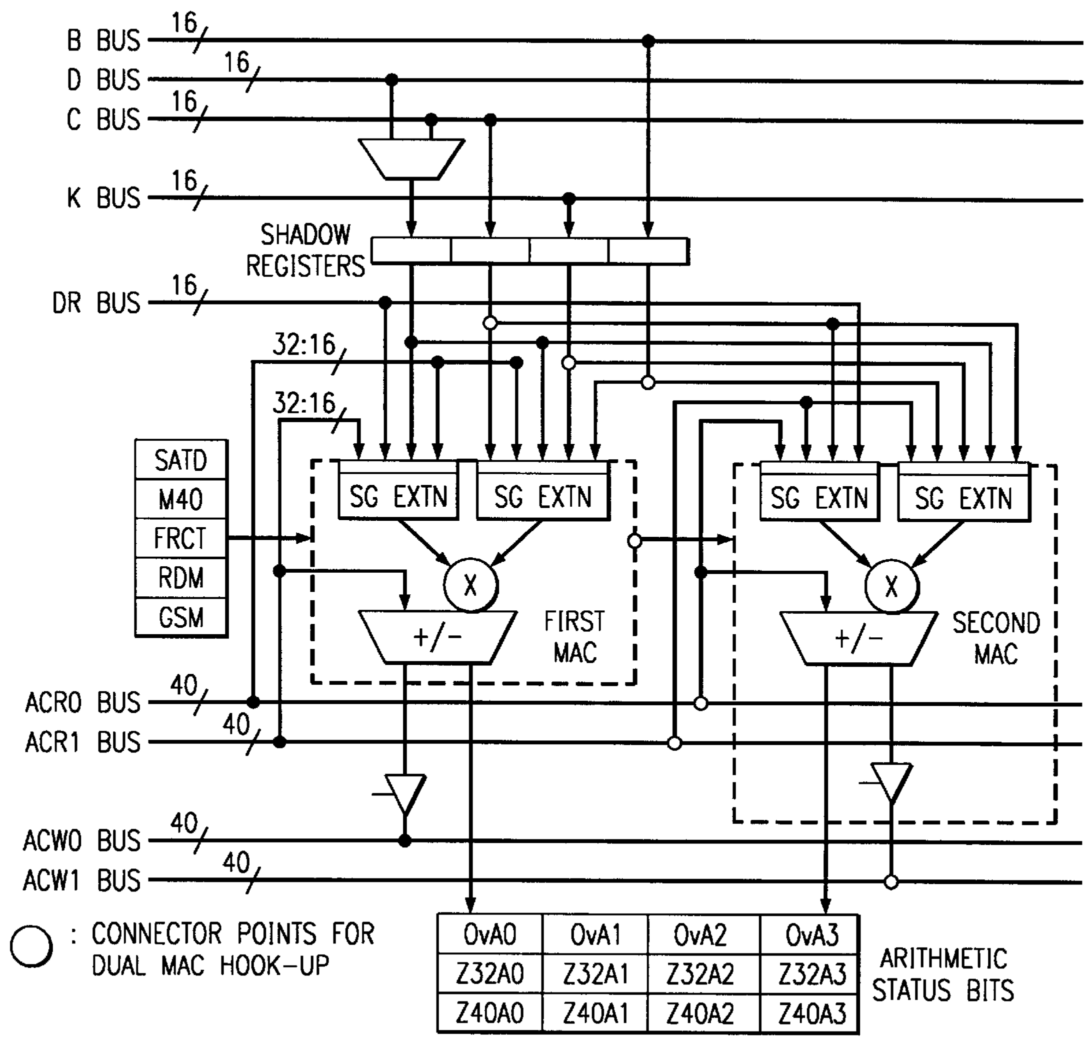
FIG. 31 gives a global view of the MAC unit which includes selection elements for sources and sign extension.

As a summary of all items above, FIG. 31 gives a global view of the MAC unit. It includes selection elements for sources and sign extension. A Dual-MAC configuration is shown (in light gray area), highlighting hook-up points for the second operator. ACR0, ACR1, ACW0 and ACW1 are read and write buses of the Data Registers area. DR carries values from the general-purpose registers area (A Unit).

2.3 The Arithmetic and Logic Unit (ALU)

The ALU processes data on 40-bit and dual 16-bit representations, for arithmetic operations, and on 40 bits for logical ones. Arithmetic modes, exceptions and status flags are handled

2.3.1 Instruction Set

The ALU executes some basic operations as described below:

| | |
|---|---|
| Logical operations | AND: bitwise "and" on input operands |
| | OR: bitwise "or" on input operands |
| | XOR: bitwise "xor" on input operands |
| | NOT: bitwise "complement to 1" on input operands |
| Arithmetic operations | ADD: addition of input operands with or without carry |
| | SUB: subtraction of input operands with or without borrow (=!carry) |
| | ADSC: add or subtract of input operands according to TC1, TC2 bit values |
| | NEG: two's complement on input operand |
| | ABS: Absolute value computation on input operand |
| | MIN: lowest of the two input operands |
| | MAX: greatest of the two input operands |
| | SATURATE: saturate the input operand |
| | RND: round the input operand. |
| | CMPR: compare (==, !=, <=, >) input operands |
| | BIT/CBIT: bit manipulations |
| Viterbi operations | MAXD/MIND: compare and select the greatest/lowest of the two input operands taken as dual 16-bit, give also the differences (high and low) |
| | MAXDDBL/MINDDBL: compare and select the greatest/lowest of the two 32 bits input operands, give also the differences (high and low) |
| DUAL operations (20 bits) | DADD: double add, as described above |
| | DSUB: double subtract, as described above |
| | DADS: add and subtract |
| | DSAD: subtract and add |

2.3.2 Input Operands

Possible sources of operands are defined below:

from memory: 2 16-bit data from RAM, from internal Data registers: 2 40-bit data, from instruction decode: 1 17-bit (16 bits+sign) "constant" value, from the shifter unit: 1 40-bit value, from other 16-bit registers: 1 16-bit data.

Some instructions have 2 memory operands (Xmem and Ymem) shifted by a constant value (#16 towards MSBs) before handling by an Arithmetic operation: 2 dedicated paths with hardware for overflow and saturation functions are available before ALU inputs. In case of double load instructions of long word (Lmem) with a 16 bits implicit shift value, one part is done in the register file, the other one in the ALU.

Detailed functionality of these paths is:

Sign extension according to SXMD status bit and uns( ) keyword

Shift by #16 towards MSB

Overflow detection and saturation according to SATD status bit

Some instructions have one 16 bits operand (Constant, Smem, Xmem or DR) shifted by a constant value before handling by an Arithmetic operation (addition or subtraction): in this case, the 16 bits operand uses 1 of the 2 previously dedicated paths before the ALU input.

Other instructions have one unsigned 16 bits constant shifted by a constant value (#16 towards MSBs) before handling by a Logical operation: in this case, the unsigned 16 bits operand is just 0-extended and logically shifted by a MUX before the ALU input without managing the carry bit (as all logical instructions combining the shifter with the ALU).

For SUBC instruction, Smem input is shifted by 15 towards MSBs.

Memory operands can be processed on the MSB (bits 31 to 16) part of the 40-bit ALU input ports or seen as a 32-bit data word. Data coming from memory are carried on D and C buses. Combinations of memory data and 16-bit register are dedicated to Viterbi instructions. In this case, the arithmetic mode is dual 16-bit and the value coming from the 16-bit register is duplicated on both ports of the ALU (second 16-bit operand).

Destination of result is either the internal Data registers (40-bit accumulators) or memory, using bits 31 to 16 of the ALU output port. Viterbi MAXD/MIND/MAXDDBL/MINDDBL operations update two accumulators. Table 18 shows the allowed combinations on input ports.

TABLE 18

Allowed Combinations on Input Ports

| | Y | | | | |
|---|---|---|---|---|---|
| X | 16 bit dat (RAM) | 16 bit dat (reg) | 40 bit dat (reg) | 16 bit dat (imm.) | s h f t |
| 16-bit data (RAM) | OK | — | OK | OK | — |
| 16-bit data (reg) | OK* | — | — | — | — |
| 40-bit data (reg) | — | — | OK | OK | OK |
| 16-bit data (immediate) | — | — | — | — | — |
| shifter | — | — | — | — | — |

*For Viterbi, 16-bit register is duplicated in LSB part of X port

Status bits generated depend on arithmetic or logic operations and include CARRY, TC1, TC2 and for each Accumulator OV and ZERO bits.

When rounding (rnd) is performed, the carry is not updated, (FAMILY mode on or off).

When the destination is a memory, there is no update of the zero and overflow bits.

One exception to this rule: the instruction Smem=Smem+K16 updates the overflow bit of Accumulator 0.

When the ALU is used with the shifter, the OV status bit is updated so that overflow flag is the OR of the overflow flags of the shifter and the ALU.

CMPR, BIT and CBIT instructions update TCx bits.

For CMPR, the type of the input operands (signed or unsigned) is passed with the instruction.

CMPR, MIN and MAX are sensitive to M40 flag. When this flag is off, comparison is performed on 32 bits while it is done on 40 bits when the flag is on. When FAMILY compatibility flag is on, comparisons should always be performed on 40 bits. See table 19 below:

TABLE 19

| M40 | UNS | OUTPUT SIGN |
|---|---|---|
| 0 | 0 | S = (OV32 AND !S31) OR (!OV32 AND S31) |
| 0 | 1 | S = !C31 |
| 1 | 0 | S = (OV40 AND !S39) OR (!OV40 AND S39) |
| 1 | 1 | S = !C39 |

When FAMILY=1, the sign is determined as if M40=1.

2.3.3 Dual Operations

Figure 32:
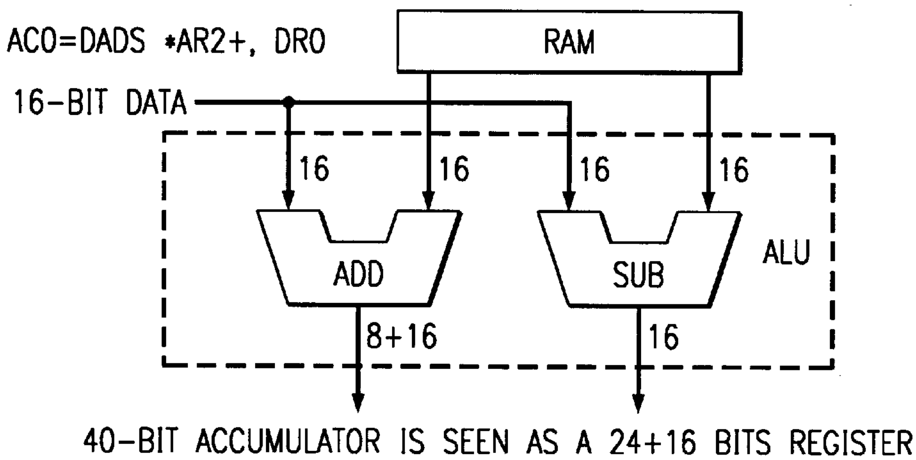
FIG. 32 is a block diagram illustrating a dual 16 bit ALU configuration.

FIG. 32 is a block diagram illustrating a dual 16 bit ALU configuration. In order to support operations on dual 16-bit format, the ALU can be split in two sub-units with input operands on 16 bits for the low part, and 24 bits for the high part (the 16 bits input operands are sign extended to 24 bits according to SXMD). This is controlled by the instruction set. Combination of operations include:

ADD || ADD,

SUB || SUB,

ADD || SUB,

SUB || ADD.

In this embodiment, sources of operands are limited to the following combinations:

X port: 16-bit data (duplicated on each 16-bit slot) or 40-bit data from accumulators Y port: Memory (2×16-bit "long" access with sign extension).

Destination of these operations is always an internal Data Register (Accumulator). Overflow status flags will be ORed together. The Carry bit is taken from the high part of dual operation, and saturation is performed using the 16-bit data format. This means that only one set of status bits is reported for two computations, so specific software handling should be applied to determine which of the two computations set the status content.

2.3.4 Viterbi Operations

Figure 33:
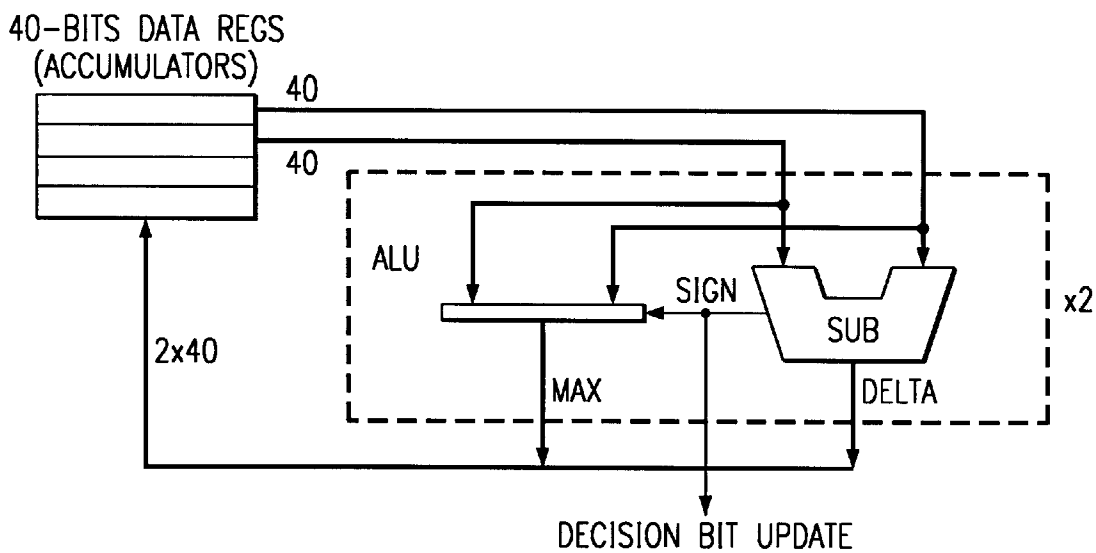
FIG. 33 shows a functional representation of the MAXD operation.

Viterbi operations uses DUAL mode described above and a special comparison instruction that computes both the maximum/minimum of two values and their difference. These instructions (MAXD/MIND) operate in dual 16-bit mode on internal Data Registers only. FIG. 33 shows a functional representation of the MAXD operation. Destination of the result is the accumulator register set and it is carried out on two buses of 40 bits (one for the maximum/minimum value and one for the difference). When used in dual 16-bit format, the scheme described above is applied on high and low parts of input buses, separately. The resulting maximum/minimum and difference outputs carry the high and low computations. Decision bit update mechanism uses two 16-bit registers called TRN0 and TRN1. The indicators of maximum/minimum value (decision bits) are stored in TRN0 register for the high part of the computation and in TRN1 for the low part. Updating the target register consists of shifting it by one position to the LSBs and inserts the decision bit in the MSB.

2.3.5 ALU Block Diagram

Figure 34:
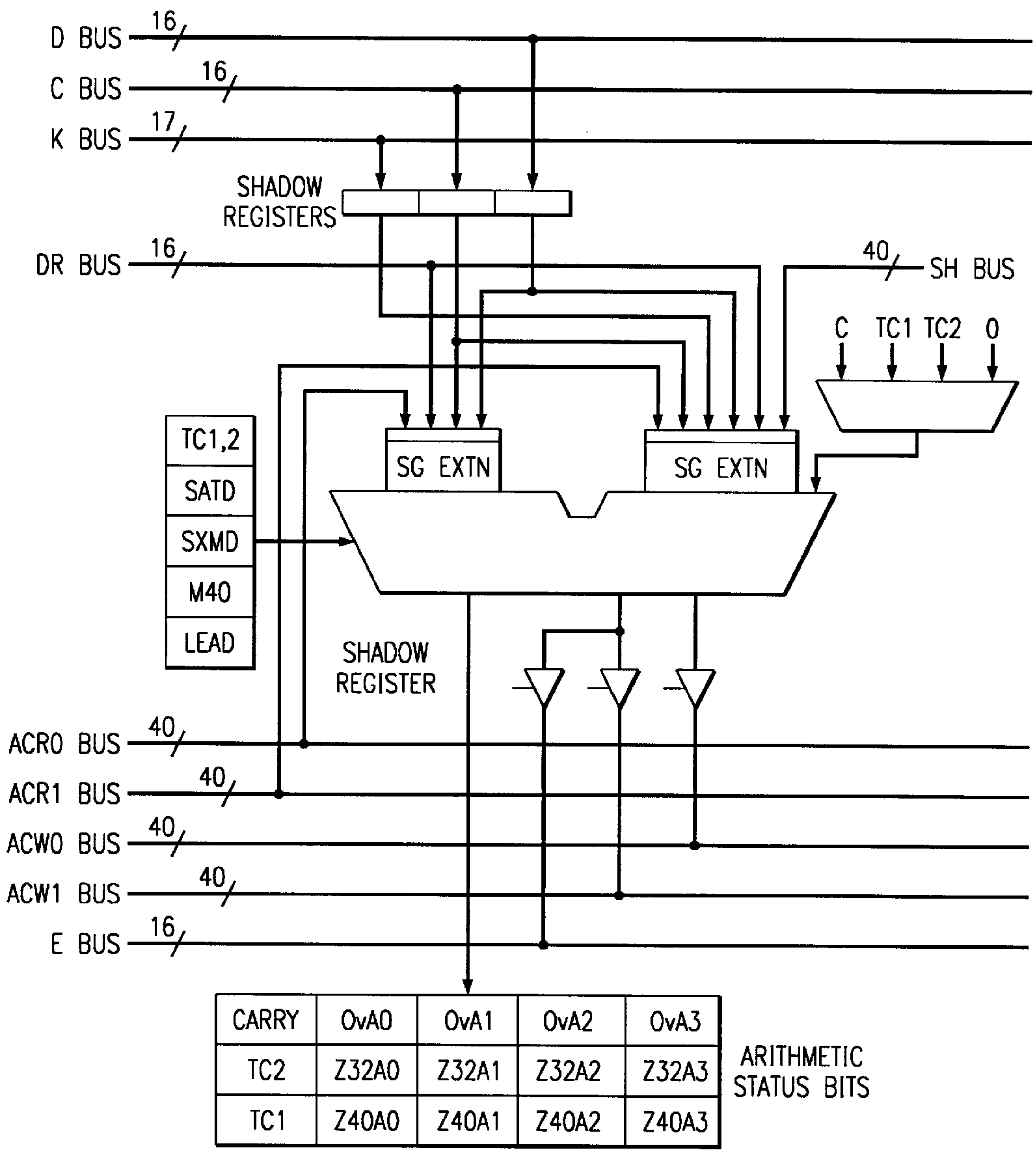
FIG. 34 gives a global view of the ALU unit.

As a summary of all items above, FIG. 34 gives a global view of the ALU unit. It includes selection elements for sources and sign extension. ACR0, ACR1 and ACW0. ACW1 are read and write buses of the Data Registers (Accumulators) area. DR carries values from the A unit registers area and SH carries the local shifter output.

2.4 The Shifter Unit:

The Shifter unit processes Data as 40 bits. Shifting direction can be left or right. The shifter is used on the store path from internal Data Registers (Accumulators) to memory. Around it exist functions to control rounding and saturation before storage or to perform normalization. Arithmetic and Logic modes, exceptions and status flags are handled as described elsewhere.

2.4.1 Instruction Set

The Shifter Unit executes some basic operations as described below:

Shift operations

SHFTL: left shift (towards MSBs) input operand,

SHFTR: right shift (towards LSBs) input operand,

ROL: a bit rotation to the left of input operand,

ROR: a bit rotation to the right of input operand

SHFTC: conditional shift according to significant bits number

DSHFT: dual shift by 1 toward LSBS.

Logical and Arithmetical Shifts by 1 (toward LSBs or MSBs) operations could be executed using dedicated instructions which avoid shift value decode. Execution of these dedicated instructions is equivalent to generic shift instructions.

Arithmetical Shift by 15 (toward MSBs) without shift value decode is performed in case of conditional subtract instruction performed using ALU Unit.

Arithmetic operations

RNDSAT: rounding and then saturation

EXP: sign position detection on input operand,

EXP_NORM: sign pos. detect and shift to the MSBs,

COUNT: count number of ones,

FLDXTRC: field extraction of bits,

FLDXPND: field expand to add bits.

2.4.2 Input Operands

Possible sources of operands are defined below:

from memory: 1 16-bit data from RAM, from internal Data registers: 2 40-bit data, from other 16-bit registers: 1 16-bit data.

Memory operands can be processed on the LSB (bits 15 to 0) part of the 40-bit input port of the shifter or be seen as a 32-bit data word. Data coming from memory are carried on D and C buses. For 32-bit data format, the D bus carries word bits 31 to 16 and the C bus carries bits 15 to 0 (this is the same as in the ALU).

Destination of results is either a 40-bit Accumulator, a 16-bit data register from the A unit (EXP, EXP_NORM) or the data memory (16-bit format).

The status bits updated by this operator are CARRY or TC2 bits (during a shift operation). CARRY or TC2 bits can also be used as shift input.

2.4.3 DUAL Shift

A DUAL shift by 1 towards LSB is defined in another section.

2.4.4 The EXP, COUNT and RNDSAT Functions

EXP computes the sign position of a data stored in an Accumulator (40-bit). This position is analyzed on the 32-bit data representation (so ranging from 0 to 31). Search for sign sequence starts at bit position 39 (corresponding to sign position 0) down to bit position 0 (sign position 39). An offset of 8 is subtracted to the search result in order to align on the 32-bit representation. Final shift range can also be used within the same cycle as a left shift control parameter (EXPSFTL). The destination of the EXP function is a DR register (16-bit Data register). In case of EXPSFTL, the returned value is the 2's-complement of the range applied to the shifter, if the initial Accumulator content is equal to zero then no shift occurs and the DR register is loaded with 0×8000.

COUNT computes the number of bits at high level on an AND operation between ACx/ACy, and updates TCx according to the count result.

The RNDSAT instruction controls rounding and saturation computation on the output of the shifter or on an Accumulator content having the memory as destination. Rounding and saturation follow rules as described earlier Saturation is performed on 32-bit only, no overflow is reported and the CARRY is not updated.

2.4.5 The FLDXTRC and FLDXPND functions

Field extraction (FLDXTRC) and expansion (FLDXPND) functions allow to manipulate fields of bits within a word. Field extract consist of getting, through a constant mask on 16 bits, bits from an accumulator and compact them into an unsigned value stored in an accumulator or a generic register from the A unit.

Field expand is the reverse. Starting from the field stored in an accumulator and the 16-bit constant mask, put the bits of the bit field in locations of the destination (another accumulator or a generic register), according to position of bits at 1 in the mask.

2.4.6 Shifter Unit Block Diagram

Figure 35:
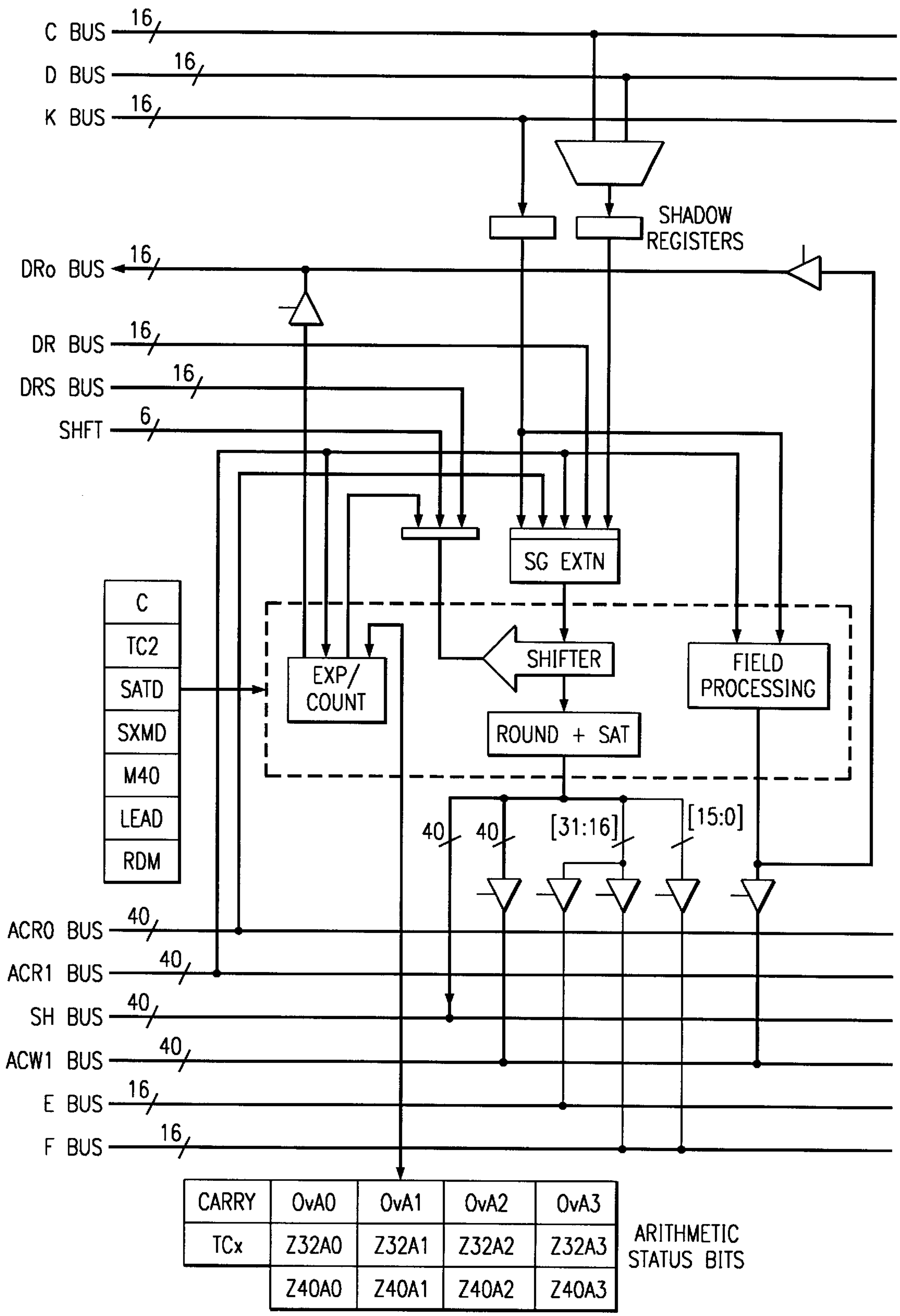
FIG. 35 gives a global view of the Shifter Unit.

As a summary of all items above, FIG. 35 gives a global view of the Shifter Unit. It includes selection elements for sources and sign extension. ACR0–1 and ACW1 are read and write buses from and to the Accumulators. DR and DRo buses are read and write buses to 16-bit registers area. The E bus is one of the write buses to memory. The SH bus carries the shifter output to the ALU.

2.5 The Data Registers

There are 4 40-bit Data registers available for local storage of results from the Units described on previous chapters, called Accumulators.

These registers support read and write bandwidth according to Units needs. They also have links to memory for direct moves in parallel of computations. In terms of formats, they support 40-bit and dual 16-bit internal representations.

2.5.1 Read Operations Destinations for units operations: 2 40-bit buses (ACR0, ACR1)

for memory write operations: 4 16-bit buses (D, C, E, F)

for 16-b regs wr. & CALL/GOTO: 1 24-bit bus (DRo)

Registers to memory write operations can be performed on 32 bits. Hence, low and high 16 bits part of Accumulators can be stored in memory in one cycle, depending of the destination address (the LSB is toggled following the rule below):

if the destination address is odd, the 16 MSBs are read from that address and the 16 LSBs are read from the address−1.

if the destination address is even, the 16 MSBs are read from that address and the 16 LSBs are read from the address+1.

The guard bits area can also be stored using one of the 16-bit write buses to memory (the 8 MSBs are then forced to 0).

Dual operations are also supported within the Accumulators register bank and two accumulators high or low parts can be stored in memory at a time, using the write buses.

Storage to the 16-bit registers area is supported through a 24-bit bus: the 16 LSBs of the Accumulator are put on the DRo bus. This bus will be used as a general return path from the D Unit to the A unit (including operations results that use a DR as destination). This creates a limitation in the available instruction parallelism.

For a CALL/GOTO instruction, the 24 LSBs of the Accumulator are put on the DRo bus.

2.5.2 Write Operations Sources from units results: 2 40-bit buses (ACW0, ACW1)

from memory: 4 16-bit buses (D, C, E, F)

from decode stage: 1 16-bit bus (K)

Same remarks apply here for memory source, as 32-bit or dual write to the registers bank is supported. The guard bits area can also be written, in that case, the 8 MSBs are lost.

The byte format is also supported: 8 MSBs or LSBs are put in the Accumulator at position 7 to 0, bits 39 to 8 are equal to bit 7 or 0, depending of the sign extension.

When a write operation is performed, either from memory of from computation, in one of the registers (implicit or MMR), zero, sign and status bits are updated (zero and sign bits only when from memory), according to rules defined elsewhere in this document. If a 16 bits shift is performed before the write, the overflow bit has to be updated also. There is one set of these bits per Accumulator.

Accumulator to Accumulator moves (ACx→ACy) are also performed in this unit.

Load instructions of 16-bit operand (Smem, Xmem or Constant) with a 16 bits implicit shift value use a dedicated register path with hardware for overflow and saturation functions. In case of double load instructions of long word (Lmem) with a 16 bits implicit shift value, one part is done in the register file, the other one in the ALU. Functionality of this register path is:

1. Sign extension according to SXMD status bit and uns( ) keyword
2. Shift by #16 towards MSB if instruction requires it
3. Overflow detection and saturation according to SATD status bit There are also 2 16-bit registers: TRN0 and TRN1 used for min/max diff operations.

2.5.3 Data Registers Connections Diagram

Figure 36:
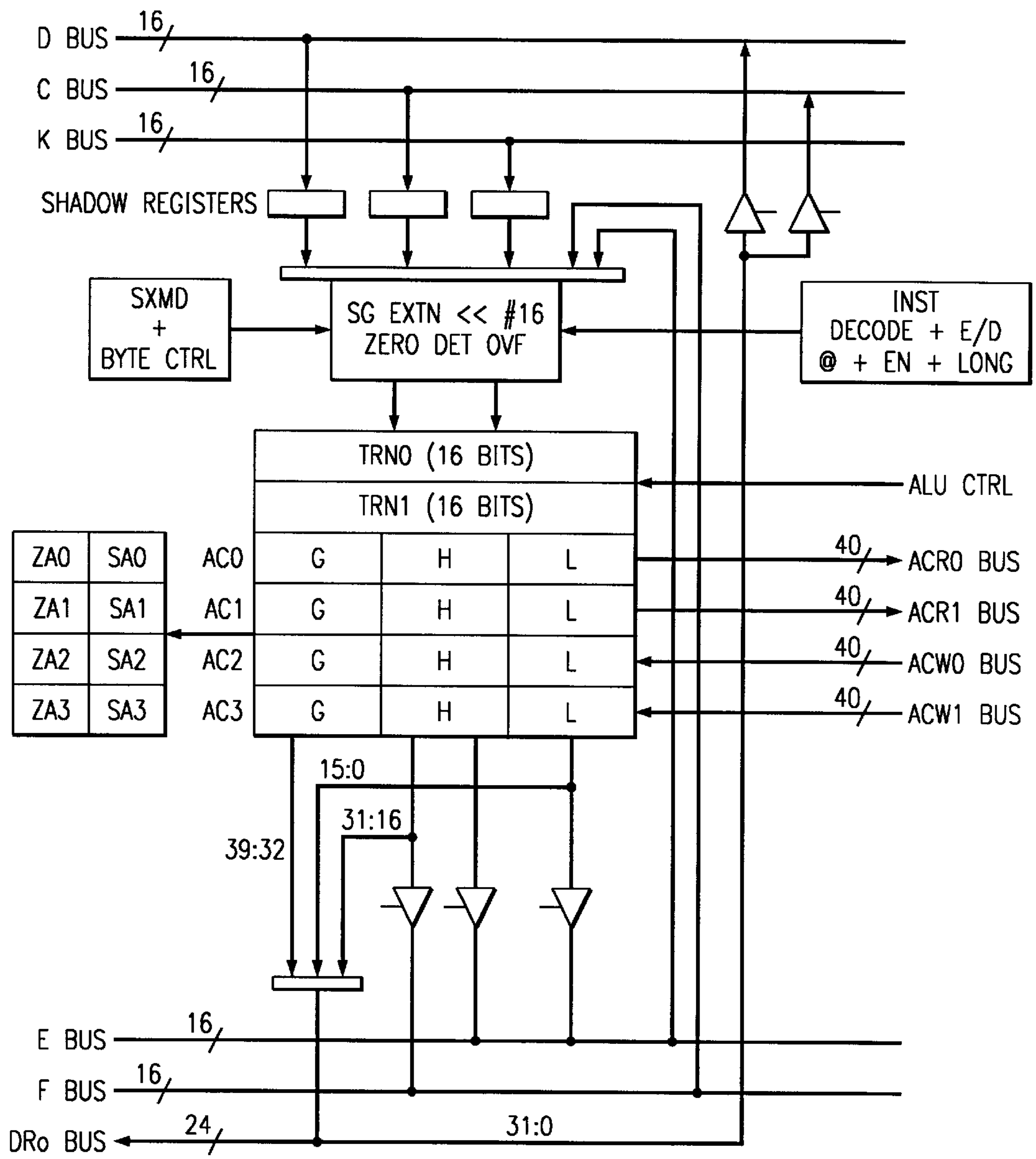
FIG. 36 is a block diagram which gives a global view of the accumulator bank organization.

Each read or write port dedicated to the operating units (buses ACR0-1 and ACW0-1) have their own 2-bit addresses. For moves to and from memory or to the A unit, two 2-bit address fields are shared by all accesses. Writing from memory is performed at the end of the EXECUTION phase of the pipeline. FIG. 36 is a block diagram which gives a global view of the accumulator bank organization.

2.5.4 Zero and Sign Bits

Zero flag is set as follows:

if FAMILY=0:
  if M40=0:
    zero=Z31
  if M40=1:
    zero=Z39
if FAMILY=1:
  zero=Z39 with Z31/Z39: zeros on 32/40 bits from the different DU sub-modules.

From an Accumulator, Sign flag is set as follows:

if FAMILY=0:
  if M40=0:
    sign=bit 31
  if M40=1:
    sign=bit 39
if FAMILY=1:
  sign=bit 39

2.6 Status bits and Control Flags

As a summary of previous chapters, the list below shows all flags that controls arithmetic operations:

SXMD: Sign extension flag

SATD: Saturation control flag (force saturation when ON)

M40: 40/32 bit mode flag

FRCT: Fractional mode flag

RDM: Unbiased rounding mode flag

GSM: GSM saturation control flag

FAMILY: an earlier family processor compatibility mode

Status bits used both as input for operations and as results of arithmetic and logic operations are listed below. Overflow and zero detection as well as sign are associated with each Accumulator register. When shifter is operating as a source of the ALU, the Carry bit is generated by the ALU only. Overflow and zero flags are generated according to rules in chapters II, III and IV (especially dual mode—4.3):

OVA0-3: overflow detection from ALU, MAC or shifter operations

CARRY: result of ALU (out of bit 39) or shifter operations

TC1-2: test bits for ALU or shifter operations

ZA0-3: zero detection from ALU, MAC, shifter or LOAD in register operations

SA0-3: sign of ALU, MAC, shifter or LOAD in register operations

3. A Unit 3.1 A Unit Main Blocks

Figure 37:
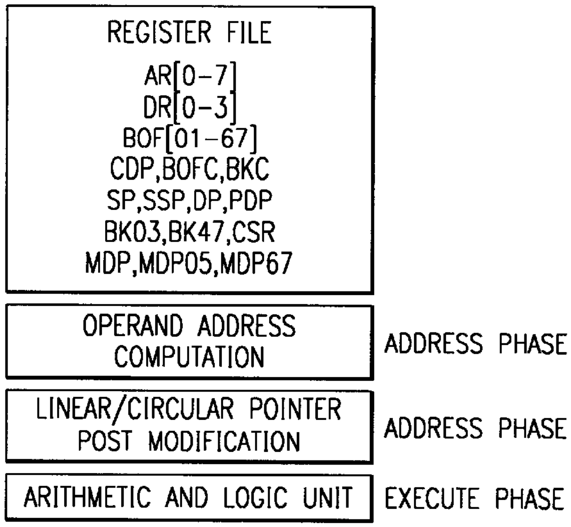
FIG. 37 is a block diagram illustrating the main functional units of the A unit.

FIG. 37 is a block diagram illustrating the main functional units of the A unit.

Figure 38:
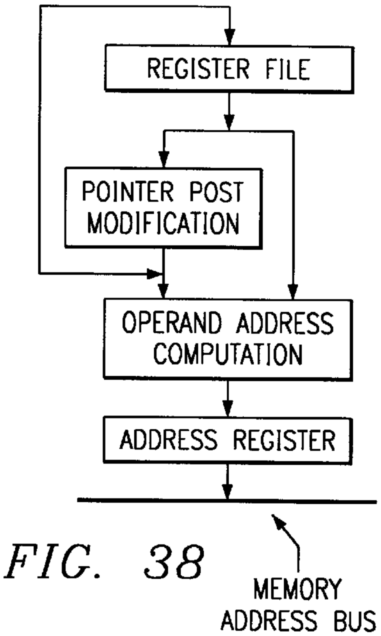
FIG. 38 is a block diagram illustrating Address generation.

FIG. 38 is a block diagram illustrating Address generation

Figure 39:
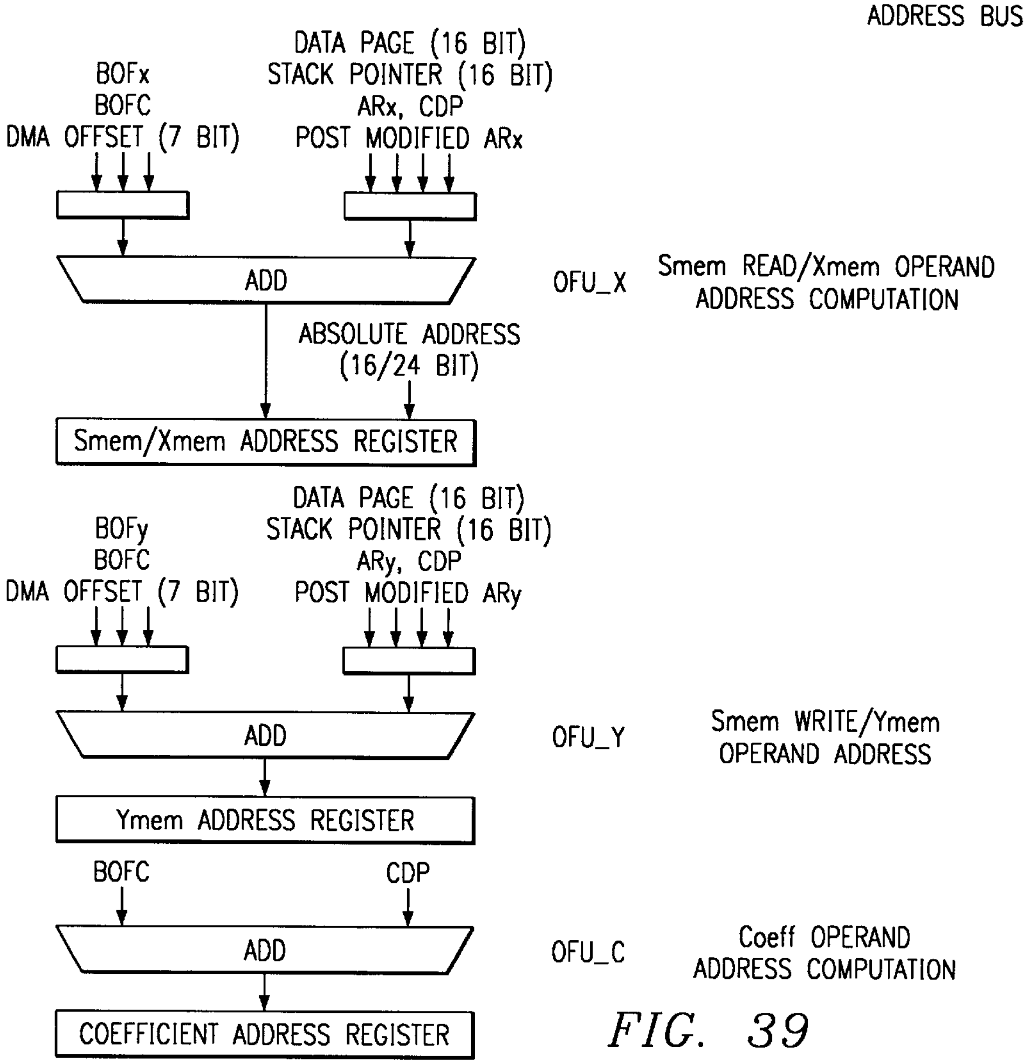
FIG. 39 is a block diagram of Offset computation.

FIG. 39 is a block diagram of Offset computation (OFU_X, OFU_Y, OFU_C)

FIGS. 40A–C are block diagrams of Linear/circular post modification (PMU_X, PMU_Y, PMU_C)

Figure 41:
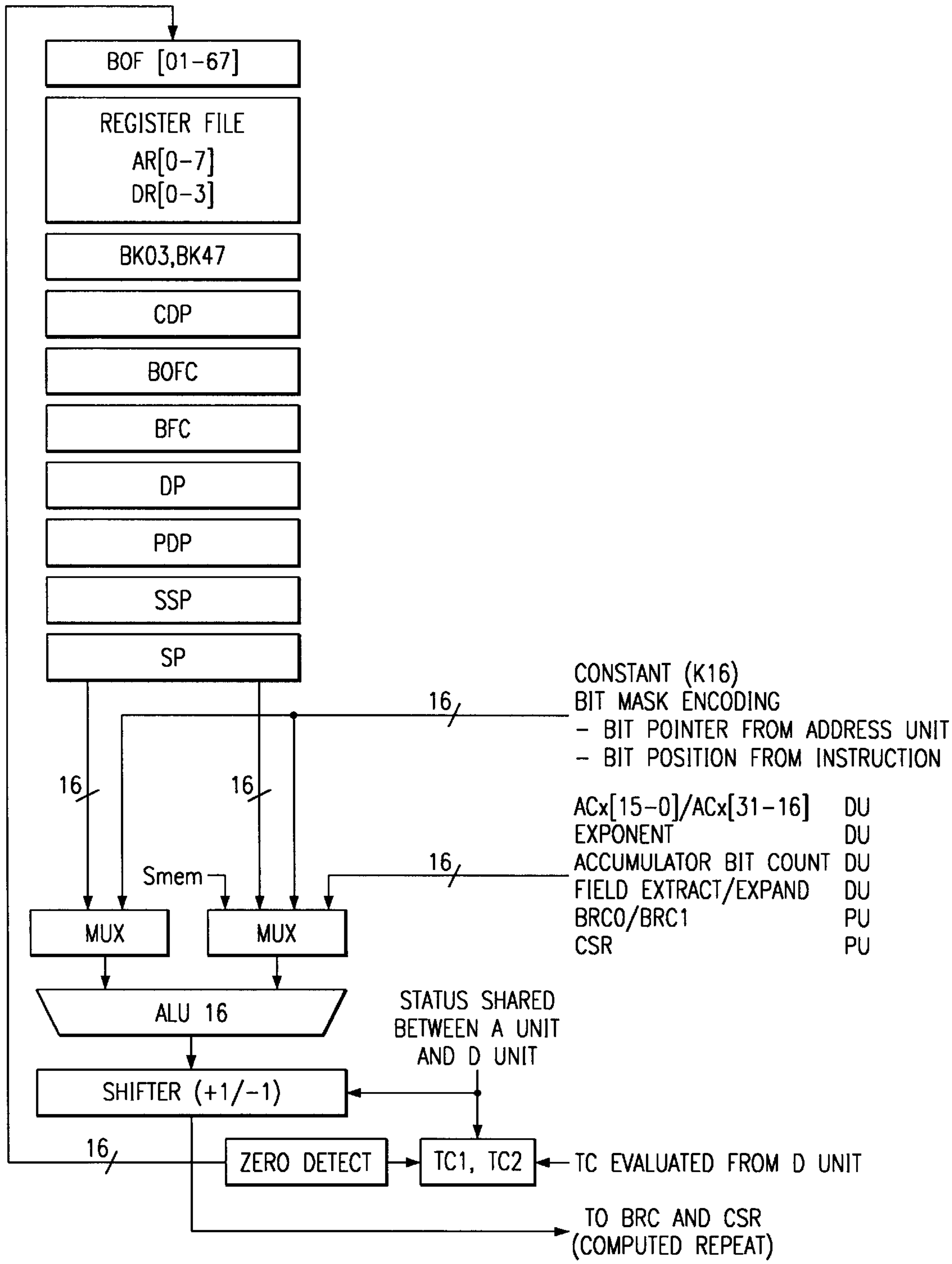
FIG. 41 is a block diagram of the Arithmetic and logic unit (ALU)

FIG. 41 is a block diagram of the Arithmetic and logic unit (ALU)

The A unit supports 16 bit operations and 8 bit load/store. Most of the address computation is performed by the DAGEN thanks to powerful modifiers. All the pointers registers and associated offset registers are implemented as 16 bit registers. The 16 bit address is then concatenated to the main data page to build a 24 bit memory address.

The A unit supports an overflow detection but no overflow is reported as a status bit register for conditional execution like for the accumulators in the D unit.

A saturation is performed when the status register bit SATA is set.

Figure 42:
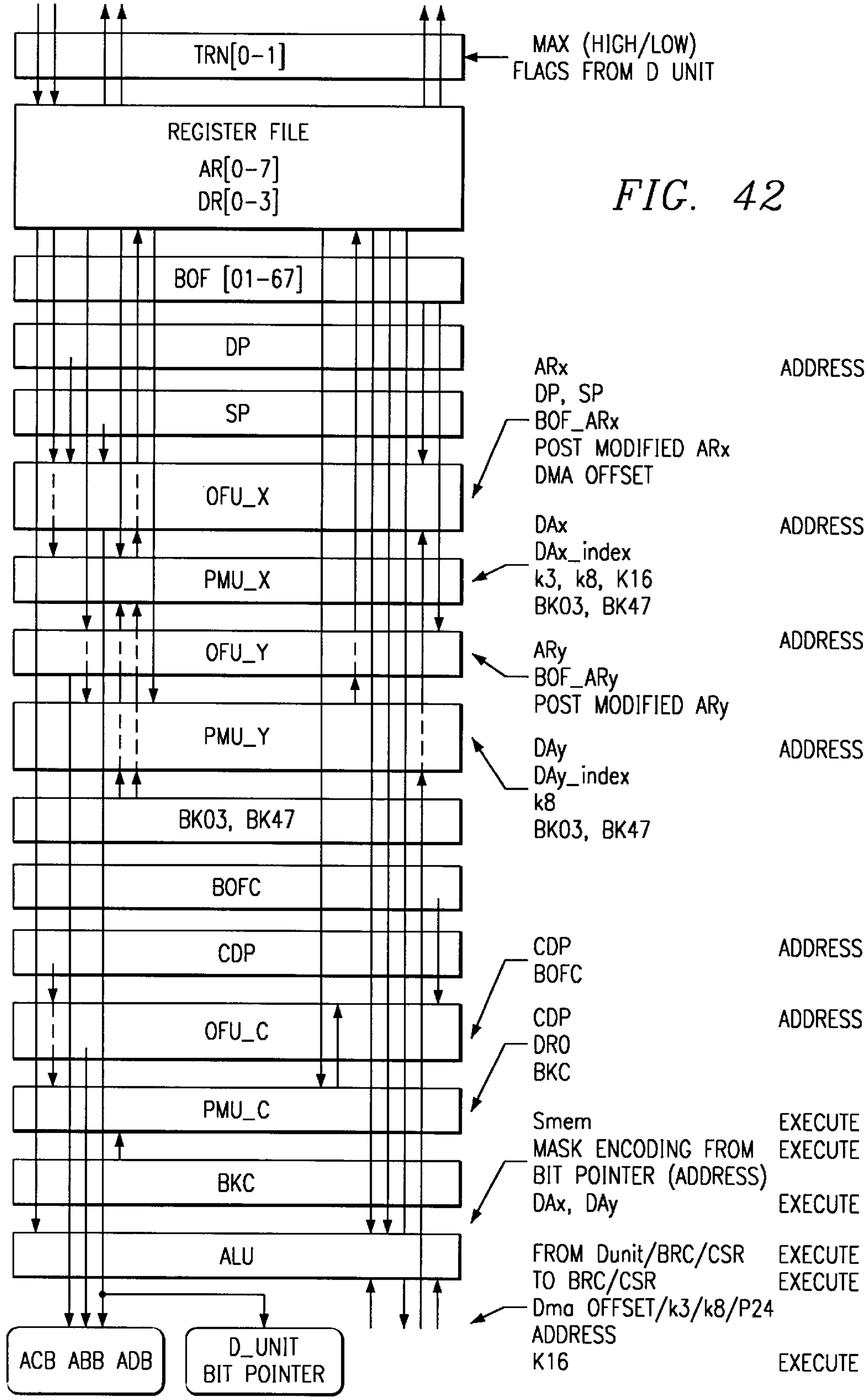
FIG. 42 is a block diagram illustrating bus organization.

FIG. 42 is a block diagram illustrating bus organization

Table 20 summarizes DAGEN resources dispatch versus Instruction Class

TABLE 20

| DAGEN mode | DAGEN paths used | active requests |
|---|---|---|
| DAG_X | X | — |
| DAG_Y | Y | — |
| P_MOD_Y | Y | — |
| Smem_R | X | dreq |
| | [Coeff] | [breq] |
| Smem_W | Y | ereq |
| Lmem_R | X | dreq, doubler |
| Lmem_W | Y | ereq, doublew |
| Smem_RW | X | dreq, ereq |
| Smem_WF | Y | freq |
| Lmem_WF | Y | freq, doublew |
| Smem_RDW | X | dreq |
| | Y | ereq |
| Smem_RWD | X | dreq |
| | Y | ereq |

TABLE 20-continued

| DAGEN mode | DAGEN paths used | active requests |
|---|---|---|
| Lmem_RDW | X | dreq, doubler |
| | Y | ereq. doublew |
| Lmem_RWD | X | dreq, doubler |
| | Y | ereq, doublew |
| Dual_WW | X | freq |
| | Y | ereq |
| Dual_RR | X | dreq |
| | Y | creq |
| | [Coeff] | [breq] |
| Dual_RW | X | dreq |
| | Y | ereq |
| Dual_RWF | X | creq, doubler |
| | Y | freq, doublew |
| Delay | X | dreq |
| | Y | ereq |
| | [Coeff] | [breq] |
| Stack_R | Stack | dreq |
| Stack_W | Stack | ereq |
| Stack_RR, Stack_RR_C | Stack | dreq, creq |
| Stack_WW, Stack_WW_C | Stack | ereq, freq |
| Smem_R_Stack_W | Stack | ereq |
| | X | dreq |
| Stack_R_Smem_W | Stack | dreq |
| | Y | ereq |
| Smem_R_Stack_WW | Stack | ereq, freq |
| | X | dreq |
| Stack_RR_Smem_W | Stack | dreq, creq |
| | Y | ereq |
| Lmem_R_Stack_WW | Stack | ereq, freq |
| | X | dreq, doubler |
| Stack_RR_Lmem_W | Stack | dreq, creq |
| | Y | ereq, doublew |
| NO DAG | — | — |

4. CPU registers

4.1 Status Registers (ST0, ST1)

The processor has 4 status and control registers which contain various conditions and modes of the processor:

Status register 0: ST0

Status register 1: ST1

Status register 2: ST2

Status register 3: ST3

These registers are memory mapped and can be saved from data memory for subroutine or interrupt service routines ISR. The various bits of these registers can be set and reset through following examples of instructions (for more detail see instruction set description):

Bit(STx, k4)=#0

Bit(STx, k4)=#1

@MMR=k16 || mmap( ); with MMR being an ST0, 1, 2, or 3 Memory Map address In regards of compatibility, an earlier family processor and the processor ST0/1 status registers do not have fully compatible bit mappings: this is explained due to new processor features. This implies that an earlier family processor translated code which accesses to these status registers through other means than above instructions may not operate correctly.

4.1.1 Status Register ST0

Table 21 summarizes the bit assignments for status register ST0.

TABLE 21

ST0 bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| ACOV3 | ACOV2 | ACOV1 | ACOV0 | C | TC2 | TC1 | DP15 | DP14 | DP13 | DP12 | DP11 | DP10 | DP09 | DP08 | DP07 |

| | |
|---|---|
| DP[15-7] | Data page pointer. This 9 bit field is the image of the DP[15:07] local data page register. This bit field is kept for compatibility for an earlier family processor code that is ported on the processor device.<br>In enhanced mode (when FAMILY status bit is set to 0), the local data page register should not be manipulated from the ST0 register but directly from the DP register.<br>DP[14-7] is set to 0h at reset. |
| ACOV0 | Overflow flag bit for accumulator AC0 : Overflow detection depends on M40 status bit (see ST1):<br>M40 = 0 → overflow is detected at bit position 31<br>M40 = 1 → overflow is detected at bit position 39<br>The ACOVx flag is set when an overflow occurs at execution of arithmetical operations (+, −, <<, *) in the D unit ALU, the D unit shifter or the D unit MAC. Once an overflow occurs the ACOVx remains set until either:<br>A reset is performed.<br>A conditional goto(), call(), return(), execute() or repeat() instructions is executed using the condition [!]overflow(ACx).<br>The following instruction clears ACOVx: bit(ST0,k4) = #0.<br>ACOVx is cleared at reset<br>When M40 is set to 0, an earlier family processor ccmpatibility is ensured. |
| ACOV1 | Overflow flag bit for accumulator AC1 : See above ACOV0. |
| ACOV2 | Overflow flag bit for accumulator AC2: See above ACOV0. |
| ACOV3 | Overflow flag bit for accumulator AC3: See above ACOV0. |
| C | Carry bit : The carry bit is set if the result of an addition performed in the D unit ALU generates a carry or is cleared if the result of a subtraction in the D unit ALU generates a borrow. The carry detection depends on M40 status bit:<br>M40 = 0 → the carry is detected at position 32<br>M40 = 1 → the carry is detected at position 40 |

-continued

| |
|---|
| The C bit is affected by all the arithmetic operations including : |
| dst = min(src, dst) when the destination register is an accumulator. |
| dst = max(src, dst) when the destination register is an accumulator. |
| ACy = \|ACx\| |
| ACy = −ACx. |
| subc( Smem, ACx, ACy) |

However, when following instructions are executed, if the result of the addition (subtraction) generates a carry (respectively a borrow), the Carry status bit is set (respectively reset), otherwise it is not affected:

ACy=ACx+(Smem<<#16)

ACy=ACx−(Smem<<#16)

The Carry bit may also be updated by shifting operations:

For logical shift instructions the Carry bit is always updated.

For arithmetic shift instructions, the software programmer has the flexibility to update Carry or not.

For rotate instructions, the software programmer has the flexibility to update Carry or not.

C is set at reset.

When M40 is set to 0, an earlier family processor compatibility is ensured.

TC1, TC2 Test/control flag bit: All the test instructions which affect the test/control flag provide the flexibility to get test result either in TC1 or TC2 status bit. The TCx bit is affected by instructions like (for more details see specific instruction definition):

ACx=sftc(ACx,TCx)

DRx=count(ACx,ACy,TCx)

TCy=[!]TCx op uns(src RELOP dst) {==,<=,>,!=} with op being & or I dst=[TC2,C]\\src \\[TC2,C]

dst=[TC2,C]//src//[TC2, C]

TCx=bit(Smem,k4)

TCx=bit(Smem,k4), bit(Smem, k4)=#0

TCx=bit(Smem,k4), bit(Smem, k4)=#1

TCx=bit(Smem,k4), cbit(Smem, k4)

TCx=bit(Smem,src)

TCx=bit(src,Baddr)

TCx=(Smem==K16)

TCx=Smem & k16 dst=dst<<<#1 shift output→TC2 dst=dst>>>#1 shift output→TC2

TC1, TC2 or any Boolean expression of TC1 and TC2 can then be used as a trigger in any conditional instruction: conditional goto( ), call( ), return( ), execute( ) and repeat( ) instructions TC1, TC2 are set at reset.

an earlier family processor compatibility is ensured and TC2 maps an earlier family processor TC bit.

4.1.2 Status Register ST1

Table 22 summarizes the bit assignments of status register ST1.

TABLE 22

ST1 bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| DBGM | EALLOW | ABORTI | XCNA | XCND | INTM | ARMS | CPL | FAMILY | SATA | GSM | RDM | FRCT | M40 | SATD | SXMD |

SXMD Sign extension in D unit : SXMD impacts load in accumulators, +, −, < operations performed in the D unit ALU and in the D unit Shifter.

SXMD = 1 → input operands are sign extended to 40 bits.

SXMD = 0 → input operands are zero extended to 40 bits.

For |, &, ^, \\, //, <<<operations performed in the D unit ALU and in the D unit Shifter:

Regardless of SXMD value, input operands are always zero extended to 40 bits.

For operations performed in the D unit MAC:

Regardless of SXMD value, 16 bit input operands are always sign extended to 17 bits.

Some arithmetical instructions handle unsigned operands regardless of the state of the SXMD mode. The algebraic assembler syntax requires to qualify these operands by the uns() keyword.

SXMD is set at reset.

an earlier family processor compatibility is ensured and SXMD maps an earlier family processor SXM bit.

SATD Saturation (not) activated in D unit. The Overflow detection performed on ACx accumulator registers (see ACOVx definition in section Error! Reference source not found.), permits to support saturation on signed 32 bit computation and signed 40 bit computation.

SATD = 0 → No saturation is performed

SATD = 1 → Upon a detected overflow, a saturation is performed on ACx accumulator registers. Since overflow detection depends on M40 bit, 2 sets of saturation value exist:

M40 = 0 → ACx saturate to 00 7FFF FFFFH or FF 8000 0000H

M40 = 1 → ACx saturate to 7F FFFF FFFFH or 80 0000 0000H

SATD is cleared at reset.

When M40 is set to 0, an earlier family processor compatibility is ensured and SATD maps an earlier family processor OVM bit.

-continued

| | |
|---|---|
| M40 | 40 bit / 32 bit computation in D unit : M40 status bit defines the significant bit-width of the 40-bit computation performed in the D-unit ALU, the D-unit Shifter and the D-unit MAC: |

M40 = 1 → the accumulators significant bit-width are bits 39 to 0 : therefore each time an operation is performed within the D-unit:
Accumulator sign bit position is extracted at bit position 39.
Accumulator's equality versus zero is determined by comparing bits 39 to 0 versus 0.
Arithmetic overflow detection is performed at bit position 39.
Carry status bit is extracted at bit position 40.
<<, <<<, \\, // operations in the D unit shifter operator, are performed on 40 bits.
M40 = 0 → the accumulators significant bit-width are bit 31 to 0 : therefore each time an operation is performed within the D-unit:
Accumulator sign bit position is extracted at bit position 31.
Accumulator's equality versus zero is determined by comparing bits 31 to 0 versus 0.
Arithmetic overflow detection is performed at bit position 31.
Carry status bit is extracted at bit position 32.
<<, <<<, \\// operations in the D unit shifter operator, are performed on 32 bits.
Note that for <<<, \\, // operations, accumulator guard bits are cleared ; and for << operations, accumulator guard bits are filled with the shift result sign according to SXMD status bit Note that for each accumulator ACx, accumulator sign and accumulator's equality versus zero are determined at each operations updating accumulators.

The determined sign (Sx) and zero (Zx) are stored in system status bits (hidden to the user).
Sx and Zx bits are then used in the conditional operations when a condition is testing an accumulator versus 0. (see conditional goto(), call(), return(), execute() and repeat() instructions).

M40 is cleared at reset an earlier family processor compatibility is ensured. when M40 is set to 0 and FAMILY status bit is set to 1, in compatible mode:

Accumulator sign bit position is extracted at bit position 39.
Accumulator's equality versus zero is determined by comparing bits 39 to 0 versus 0.
<< operation is performed in the D unit shifter as if M40 = 1.

| | |
|---|---|
| FRCT | Fractional mode : When the FRCT bit is set the multiplier output is left shifted by one bit to compensate for an extra sign bit resulting from the multiplication of 2 signed operands in the D unit MACs operators. |
| | FRCT is cleared at reset. |
| RDM | Rounding mode : This status bit permit to select between two rounding modes. A rounding is performed on operands qualified by the rnd() key word in specific instructions executed in the D-unit operators (multiplication instructions, accumulator move instructions and accumulator store instructions) |

When RDM = 0, $2^{15}$ is added to the 40 bit operand and then the LSB field [15:0] is cleared to generate the final result in 16 / 24 bit representation where only the fields [31:16] or [39:16] are meaningful.
When RDM = 1, Rounding to the nearest is performed : the rounding operation depends on LSB field range. Final result is in 16 / 24 bit representation where only the fields [31:16] or [39:16] are meaningful.

If (0 =< LSB field [15:0] < $2^{15}$)
LSB field [15:0] is cleared.

If ($2^{15}$ < LSB field [15:0] < $2^{16}$)
$2^{15}$ is added to the 40 bit operand and then the LSB field [15:0] is cleared.

If(LSB field [15:0] == $2^{15}$)
If the MSB field [31:16] is an odd value, then $2^{15}$ is added to the 40 bit operand and then the LSB field [15:0] is cleared.

RDM is cleared at reset.

an earlier family processor compatibility is ensured when RDM is set to 0 and FAMILY status bit is set to 1. In compatible mode, following instructions do not clear accumulators LSB[15:0] after rounding operation:

ACy = saturate(rnd(ACx))
ACy = rnd(ACx)
lms(Xmem, Ymem, ACx, ACy)

| | |
|---|---|
| GSM | GSM saturation mode. |
| | When GSM saturation mode, FRCT mode and SATD mode are set to 1, all multiplication instruction where both multiply operands are equal to $-2^{15}$ saturate to 0x00.7FFF.FFFF value. For Multiply and accumulate (subtract) instructions, this saturation is performed after the multiplication and before the addition (respectively subtraction). |
| | GSM is cleared at reset. |
| | GSM maps an earlier family processor SMUL bit and an earlier family processor compatibility is ensured. |
| SATA | Saturation (not) activated in A unit. An Overflow detection is performed on address and data registers (ARx and DRx) in order to support saturation on signed 16 bit computation. however, the overflow is not reported within any status bit. |
| | The overflow is detected at bit position 15 and only on +, −, << arithmetical operations performed in the A unit ALU. |

SATA = 1 → Upon a detected overflow a saturation occurs:
ARx and DRx saturate to 7FFFH or 8000H.
SATA = 0 → No saturation occurs The SATA bit cleared at reset.

-continued

FAMILY an earlier family processor compatible mode : This status bit enables the processor to execute software modules resulting from a translation of an earlier family processor assembly code to the processor assembly code.
When FAMILY = 0, the processor device is supposed to execute native processor code: the processor is said to operate in enhanced mode. In this mode, all processor features are available to the software programmer.
When FAMILY = 1 the processor device is supposed to execute an earlier family processor translated code: the processor is said to operate in compatible mode. In this mode, a hardware support is enabled in order to have an earlier family processor translated code executed accurately on the processor.
The FAMILY status bit is cleared at reset.

CPL Compiler mode : This status bit selects either the data page pointer (DP) or the data stack pointer (SP) for direct memory accesses (dma) (see memory addressing modes).
When CPL = 0 → Direct addressing mode is relative to DP: the processor is said to operate in application mode.
When CPL = 1 → Direct addressing mode is relative to SP : the processor is said to operate in compiler mode.
CPL is cleared at reset.

ARMS ARx modifiers switch : This status bits permits to select between two sets of modifiers for indirect memory accesses (see memory addressing modes).
When ARMS = 0, A set of modifiers enabling efficient execution of DSP intensive applications are available for indirect memory accesses : the processor is said to operate in DSP mode.
When ARMS = 1, A set of modifiers enabling optimized code size of Control code are available for indirect memory accesses : the processor is said to operate in Control mode.
ARMS is cleared at reset.

INTM interrupt mode:
INTM = 0 → All unmasked interrupts are enabled
INTM = 1 → All maskable interrupts are disabled.
INTM is set at reset or when a maskable interrupt trap is taken : intr() instruction or external interrupt. INTM is cleared on return from interrupt by the execution of the return instruction.
INTM has no effect on non maskable interrupts (reset and NMI)

XCNA Conditional execution control Address Read only
XCNA & XCND bit save the conditional execution context in order to allow to take an interrupt in between the 'if (cond) execute' statement and the conditional instruction (or pair of instructions).

| | | |
|---|---|---|
| instruction (n−1) | \|\| | if (cond) execute (AD_Unit) |
| instruction (n) | \|\| | instruction (n+1) |

XCNA = 1 Enables the next instruction address slot update. By default the XCNA bit is set.
XCNA = 0 Disables the next instruction address stot update. The XCNA bit is cleared in case of 'execute(AD_Unit)' statement and if the evaluated condition is false.
XCNA can't be written by the user software. Write is only allowed in interrupt context restore. There is no pipeline protection for read access. XCNA is always read as '0' by the user software.
Emulation has R/W access trough DT-DMA.
XCNA is set at reset.

XCND Conditional execution control Data Read only
XCNA & XCND bit save the conditional execution context in order to allow to take an interrupt in between the 'if (cond) execute' statement and the conditional instruction (or pair of instructions).

| | | |
|---|---|---|
| instruction (n-1) | \|\| | if (cond) execute (AD_Unit) |
| instruction (n) | \|\| | instruction (n+1) |

XCND = 1 Enables the next instruction execution stot update. By default the XCND bit is set.
XCND = 0 Disables the next instruction execution slot update. The XCND bit is cleared in case of 'execute(AD_Unit)' or 'execute(D_Unit)' statement and if the evaluated condition is false.
XCND can't be written by the user software. Write is only allowed in interrupt context restore. There is no pipeline protection for read access. XCND is always read as '0' by the user software.
Emulation has R/W access trough DT-DMA.
XCND is set at reset.

ABORTI Emulation control ←EMULATION feature
ABORTI = 1 Indicates that an interrupt service routine (ISR) is not be returned from. This signal is exported to an emulation support module. This clears the IDS (interrupt during debug) and HPI (high priority interrupt) bits in the debug status register and resets the Debug Frame Counter. This causes the emulation software to disregard any and all outstanding debug states entered from high priority interrupts since the processor was stopped by an emulation event.
ABORTI = 0 Default operating mode
ABORTI is cleared at reset.

-continued

| | |
|---|---|
| EALLOW | Emulation access enable bit ←EMULATION feature<br>EALLOW = 1 Non CPU emulation registers write access enabled.<br>EALLOW = 0 Non CPU emulation registers write access disabled<br>EALLOW bit is cleared at reset.<br>The current state of EALLOW is automatically saved during an interrupt / trap operation.<br>The EALLOW bit is automatically cleared by the interrupt or trap. At the very start of an interrupt service routine (ISR), access to the non-CPU emulation registers is disabled. The user can re-enable access using the instruction : bit(ST1 ,EALLOW) = #1.<br>The [d]return_int instruction restores the previous state of the EALLOW bit saved on the stack.<br>The emulation module can override the EALLOW bit (clear only). The clear from The emulation module can occur on any pipeline slot. In case of conflict the emulator access get the highest priority. The CPU has the visibility on emulator override from EALLOW bit read. |
| DBGM | Debug enable mask bit ←EMULATION feature<br>DBGM = 1 Blocks debug events from time critical portions of the code execution. Debug access is disabled.<br>DBGM = 0 Debug access is enabled.<br>The current state of DBGM is automatically saved during an interrupt/trap operation.<br>The DBGM bit is automatically set by the interrupt or trap. At the very start of an interrupt service routine (ISR), the debug events are blocked. The user can re-enable debug access using the instruction : bit(ST1 ,DBGM) = #0.<br>The [d]return_int instruction restores the previous state of the DBGM bit saved on the stack.<br>The pipeline protection scheme requires that DBGM can be set/clear only by the dedicated instruction bit(ST1,k4) = #1, bit(ST1,k4) = #0. ST1 access as memory mapped register or bit(Smem,k4) = #0, bit(Smem,k4) = #1, cbit(Smem,k4) have no effect on DBGM status bit.<br>Emulation has R/W access to DBGM through DT-DMA<br>DBGM is set at reset.<br>DBGM is ignored in STOP mode emulation from software policy. estop_0() and estop_1() instructions will cause the device to halt regardless of DBGM state. |

4.1.3 Compatibility with an Earlier Family Processor

The processor status registers bit organization has been reworked due to new features and rational modes grouping. This implies that the translator has to re-map the set, clear and test status register bit instructions according to the processor spec. It has also to track copy of status register into register or memory in case a bit manipulation is performed on the copy. We may assume that indirect access to status register is used only for move.

4.2 Pointer Configuration Register (ST2) Linear/Circular Addressing

Table 23 summarizes the bit assignments of status register ST2.

This register is a pointer configuration register. Within this register, for each pointer register AR0, 1, 2, 3, 4, 5, 6, 7and CDP, 1 bit defines if this pointer register is used to make:

Linear addressing,

Or circular addressing.

TABLE 23

| bit assignments for ST2 | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| — | — | — | — | — | — | — | CDPLC | AR7LC | AR6LC | AR5LC | AR4LC | AR3LC | AR2LC | AR1LC | AR0LC |

| | |
|---|---|
| AR0LC | AR0 configured in Linear or Circular addressing:<br>AR0LC = 0 → Linear configuration is enabled.<br>AR0LC = 1 → Circular configuration is enabled<br>AR0LC is cleared at reset |
| AR1LC | AR1 configured in Linear or Circular addressing: (see above AR0LC). |
| AR2LC | AR2 configured in Linear or Circular addressing: (see above AR0LC). |
| AR3LC | AR3 configured in Linear or Circular addressing: (see above AR0LC). |
| AR4LC | AR4 configured in Linear or Circular addressing: (see above AR0LC). |
| AR5LC | AR5 configured in Linear or Circular addressing: (see above AR0LC). |
| AR6LC | AR6 configured in Linear or Circular addressing: (see above AR0LC). |
| AR7LC | AR7 configured in Linear or Circular addressing: (see above AR0LC). |
| CDPLC | CDP configured in Linear or Circular addressing: (see above AR0LC). |

4.3 System Control Register (ST3)

Table 24 summarizes the bit assignments of status register ST3.

TABLE 24

Bit assignments for ST3

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CAFRZ | CAEN | CACLR | AVIS | MPNMC | | | | | CBERR | XF | HINT | HOMY | HOMX | HOMR | HOMP |

| | |
|---|---|
| HOMP Host only access mode | Peripherals<br>HOMP = 1 By setting this bit the DSP requires the peripherals to be owned by the host processor. This request is exported to the external bus bridge and the operating mode will switch from SAM (shared) to HOM (host only) based on the arbitration protocol (i.e. on going transactions completion . . .). The external bus bridge returns the state of the active operating mode. The DSP can pull the HOMP bit to check the active operating mode.<br>HOMP = 0 By clearing this bit the DSP requires the peripherals to be shared by the DSP and the host processor. This request is exported to the external bus bridge and the operating mode will switch from HOM (host only) to SAM (shared) based on the arbitration protocol (i.e. on going transactions completion . . .). The external bus bridge returns the state of the active operating mode. The DSP can pull the HOMP bit to check the active operating mode.<br>HOMP is set at reset.<br>bit(ST3,k4) = #0 [1] instruction reads the ST3 register; performs the logical operation with mask derived from k4 in ALU16, then writes back to ST3 register.<br>TCx = bit(@ST3,k4) \|\| mmap() instruction evaluates TCx from the status returned by the external bus bridge. |
| HOMR | Shared access mode API RAM<br>HOMR = 1 By setting this bit the DSP requires the API RAM to be owned by the host processor. This request is exported to the API module and the operating mode will switch from SAM (shared) to HOM (host only) based on the arbitration protocol (i.e. on going transactions completion . . .). The API module returns the state of the active operating mode. The DSP can pull the HOMR bit to check the active operating mode.<br>HOMR = 0 By clearing this bit the DSP requires the API RAM to be shared by the DSP and the host processor. This request is exported to the API module and the operating mode will switch from HOM (host only) to SAM (shared) based on the arbitration protocol (i.e. on-going transactions completion . . .). The API module returns the state of the active operating mode. The DSP can pull the HOMR bit to check the active operating mode.<br>HOMR is set at reset.<br>bit(ST3,k4) = #0 [1] instruction reads the ST3 register, performs the logical operation with mask derived from k4 in ALU16, then writes back to ST3 register.<br>TCx = bit(@ST3,k4) \|\| mmap() instruction evaluates TCx from the status returned by the external bus bridge. |
| HOMX | Host only access mode provision for future system support<br>This system control bit is managed through the same scheme as HOMP & HOMR. This a provision for an operating mode control defined out of the CPU boundary.<br>HOMX is set at reset |
| HOMY | Host only access mode provision for future system support<br>This system control bit is managed through the same scheme as HOMP & HOMR. This a provision for an operating mode control defined out of the CPU boundary.<br>HOMY is set at reset. |
| HINT | Host interrupt<br>The DSP can set and clear by software the HINT bit in order to send an interrupt request to an Host processor. The interrupt pulse is managed by software. The request pulse is active low : a software clear / set sequence is required, there is no acknowledge path from the Host.<br>This interrupt request signal is directly exported at the megacell boundary. The interrupt pending flag is implemented in the User gates as part of the DSP / HOST interface.<br>HINT is set at reset. |
| XF | External Flag<br>XF if a general purpose external output flag bit which can be manipulated by software and exported to the CPU boundary.<br>XF is cleared at reset. |
| CBERR | CPU bus error<br>CBERR is set when an internal 'bus error' is detected. This error event is then merged with errors tracked in other modules like MMI, external bus, DMA in order to set the bus error interrupt flag IBERR into the IFR1 register. See the 'Bus error' chapter for more details.<br>The interrupt subroutine has to clear the CBERR flag before return to the main program.<br>CBERR is a clear-only flag. The user code can't set the CBERR bit.<br>CBERR is cleared at reset. |

-continued

| | |
|---|---|
| MPINMC | Microprocessor / microcomputer mode<br>MP/NMC enables / disables the on chip ROM to be addressable in program memory space. (See pipeline protection note)<br>MP / NMC = 0 The on chip ROM is enabled and addressable<br>MP / NMC = 1 The on chip ROM is not available.<br>MP / NMC is set to the value corresponding to the logic level on the MP/NMC pin when sampled at reset. This pin is not sampled again until the next reset. The 'reset' instruction doesn't affect this bit. This bit can be also set and cleared by software. |
| AVIS | Address visibility mode<br>AVIS = 0 The external address lines do not change with the internal program address. Control and data lines are not affected and the address bus is driven with the last address on the bus. (See pipeline protection note)<br>AVIS = 1 This mode allows the internal program address to appear at the megacell boundary so that the internal program address can be traced. In case of Cache access on top fetch from internal memory, the internal program bus can be traced. The user can for debug purposes disable by software the Cache from the CAEN bit.<br>The AVIS status register bit is exported to the MMI module.<br>AVIS is cleared at reset. |
| CACLR | Cache clear<br>CACLR = 1 All the Cache blocks are invalid. The amount of cycles required to clear the Cache is dependent on the memory architecture. When the Cache is flushed the contents of the prefetch queue in the instructions buffer unit is automatically flushed. (See pipeline protection note)<br>CACLR = 0 The CACLR bit is cleared by the Cache hardware upon completion of Cache clear process. The software can pull the CACLR flag to check Cache clear procedure completion.<br>If an interrupt is taken within the Cache clear sequence, it's latency and duration will be affected due to execution from external memory. It is recommended to install critical ISR's on internal RAM.<br>CACLR is cleared at reset. |
| CAEN | Cache enable<br>CAEN = 1 Program fetches will either occur from the Cache, from the internal memory or from the direct path to external memory, via the MMI depending on the program address decode. (See pipeline protection note)<br>CAEN = 0 The Cache controller will never receive a program request, hence all program requests will be handled either by the internal memory or the external memory via the MMI depending on address decode.<br>The CAEN signal is not sent to the Cache module. bur to the memory interface (MIF) where it is used as a gating mechanism for the master program request signal from the IBU to provide individual program requests to the Cache, MMI, API, SRAM and DRAM.<br>When the Cache is disabled by clearing the CAEN bit, the contents of the pre-fetch queue in the instructions buffer unit is automatically flushed.<br>CAEN is cleared at reset. |
| CAFRZ | Cache freeze<br>CAFRZ = 1 The Cache freeze provides a mechanism whereby the Cache can be locked, so that it's contents are not updated on a cache miss, but it's contents are still available for Cache hits. This means that a block within a frozen Cache is never chosen as a victim of the replacement algorithm. It's contents remain undisturbed until the CAFRZ bit is cleared. (See pipeline protection note)<br>CAFRZ = 0 Cache default operating mode.<br>CAFRZ is cleared at reset. |
| ST3[10:7] | Unused status register bit.<br>Can't be written and are always read as '0' |

4.3.1 Pipeline Protection Note

The above ST3 mode control bit updates will be protected from the hardware provided they are manipulated by the instructions: bit(ST3,k4)=#0, bit(ST3,k4)=#1

Table 25 summarizes the function of status register ST3.

TABLE 25

Summary of ST3 register application/emulation access

| ST3 bit | | Application SET | Application CLEAR | Emulation SET | Emulation CLEAR | Comment |
|---|---|---|---|---|---|---|
| 15 | CAFRZ | yes | yes | yes | yes | |
| 14 | CAEN | yes | yes | yes | yes | |
| 13 | CACLR | yes | yes | yes | yes | Clear from Cache hardware has the highest priority |
| 12 | AVIS | yes | yes | yes | yes | |

TABLE 25-continued

| Summary of ST3 register application/emulation access | | | | | | |
|---|---|---|---|---|---|---|
| ST3 bit | | Application SET | Application CLEAR | Emulation SET | Emulation CLEAR | Comment |
| 11 | MPNMC | yes | yes | yes | yes | |
| 10 | — | no | no | no | no | Not implemented |
| 9 | — | no | no | no | no | Not implemented |
| 8 | — | no | no | no | no | Not implemented |
| 7 | — | no | no | no | no | Not implemented |
| 6 | CBERR | no | yes | no | yes | |
| 5 | XF | yes | yes | yes | yes | |
| 4 | HINT | yes | yes | yes | yes | |
| 3 | HOMY | yes | yes | yes | yes | |
| 2 | HOMX | yes | yes | yes | yes | |
| 1 | HOMR | yes | yes | yes | yes | |
| 0 | HOMP | yes | yes | yes | yes | |

4.4 Main Data Page Registers (MDP, MDP05, MDP67)

Table 26 summarizes the bit assignments of the MDP register.

TABLE 26

| MDP Register | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| | | | | | | | | — | MDP22 | MDP21 | MDP20 | MDP19 | MDP18 | MDP17 | MDP16 |

MDP[22–16] Main Data page pointer (direct memory access/indirect from CDP)

This 7 bit field extends the 16 bit Smem word address. In case of stack access or peripheral access through readport( ),writeport( ) qualification the main page register is masked and the MSB field of the address exported to memory is forced to page 0.

Table 27 summarizes the bit assignments of the MDP05 register.

TABLE 27

| MDP05 Register | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| | | | | | | | | — | MDP05—22 | MDP05—21 | MDP05—20 | MDP05—19 | MDP05—18 | MDP05—17 | MDP05—16 |

MDP05[22–16] Main Data page pointer (indirect AR[0–5])

This 7 bit field extends the 16 bit Smem/Xmem/Ymem word address. In case of stack access or peripheral access through readport( ), writeport( ) qualification the main page register is masked and the MSB field of the address exported to memory is forced to page 0.

Table 28 summarizes the bit assignments of the MDP67 register.

TABLE 28

| MDP67 Register | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| | | | | | | | | — | MDP67—22 | MDP67—21 | MDP67—20 | MDP67—19 | MDP67—18 | MDP67—17 | MDP67—16 |

MDP67[22–16] Main Data page pointer (indirect AR[6–7])

This 7 bit field extends the 16 bit Smem/Xmem/Ymem word address. In case of stack access or peripheral access through readport( ), writeport( ) qualification the main page register is masked and the MSB field of the address exported to memory is forced to page 0.

Double MAC Instructions/Coefficient

The coefficients pointed by CDP mainly used in dual MAC execution flow must reside within main data page pointed by MDP.

In order to make the distinction versus generic Smem pointer the algebraic syntax requires to refer coefficient pointer as:

coef(*CDP)

coef(*CDP+)

coef(*CDP−)

coef(*CDP+DR0)

4.5 Peripheral Data Page Register (PDP)

Table 29A summarizes the bit assignments of the PDP register

TABLE 29A bit assignments of the PDP Register

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| — | — | — | — | — | — | — | PDP15 | PDP14 | PDP13 | PDP12 | PDP11 | PDP10 | PDP09 | PDP08 | PDP07 |

PDP[15–7] Peripheral Local Page Pointer.

The peripheral data page PDP[15–8] is selected instead of DP[15–0] when a direct memory access instruction is qualified by the readport( ) or writeport( ) tag regardless of the compiler mode bit (CPL). This scheme provide the flexibility to handle independently memory variables and peripherals interfacing. The peripheral frame is always aligned on 128 words boundary.

4.6 Coefficient Data Pointer Register (CDP)

the processor CPU includes one 16-bit coefficient data pointer register (CDP). The primary function of this register is to be combined with the 7-bit main data page register MDP in order to generate 23-bit word addresses for the data space. The content of this register is modified within A unit's Data Address Generation Unit DAGEN.

This 9nth pointer can be used in all instructions making single data memory accesses as described in another section.

However, this pointer is more advantageously used in dual MAC instructions since it provides three independent 16-bit memory operand to the D-unit dual MAC operator.

4.7 Local Data Page Register (DP)

The 16-bit local data page register (DP) contains the start address of a 128 word data memory page within the main data page selected by the 7-bit main data page pointer MDP. This register is used to access the single data memory operands in direct mode (when CPL status bit cleared).

4.8 Accumulator Registers (AC0–AC3)

the processor CPU includes four 40-bit accumulators. Each accumulator can be partitioned into low word, high word and guard;

4.9 Address Registers (AR0–AR7)

the processor CPU includes height 16 bit address registers. The primary function of the address registers is to generate a 24 bit addresses for data space. As address source the AR[0–7] are modified by the DAGEN according to the modifier attached to the memory instruction. These registers can also be used as general purpose registers or counters. Basic arithmetic, logic and shift operations can be performed on these resources. The operation takes place in DRAM and can performed in parallel with an address modification.

4.10 General Purpose Data Registers (DR0–DR3)

the processor CPU includes four 16 bit general purpose data registers. The user can take advantage of these resources in different contexts:

- Extend the number of pointers by re-naming via the swap( ) instruction
- Hold one of the multiplicands for multiply and multiply accumulate instructions.
- Define an implicit shift.
- Store the result of an exp( ) instruction for normalization via the norm( ) instruction.
- Store an accumulator bit count via the count( ) instruction.
- Implement switch/case statements via the field_extract( ) and switch( ) instructions.
- Save a memory operand in parallel with execution in D unit for later reuse.
- Support the shared operand of VITERBI butterflies on dual operations like add_sub or sub_add

4.11 Registers Re-naming

The processor architecture supports a pointers swapping mechanism which consist to re-map the pointers by software via the 16 bit swap( ) instruction execution. This feature allows for instance in critical routines to compute pointers for next iteration along the fetch of the operands for the current iteration.

This feature is extended to generic registers (DRx) and accumulators (ACx) for similar purpose. For instance a swap between DRx and ARx may allow to implement an algorithm which requires more than height pointers. Re-naming can affect either a single register, a registers pair or a register block.

The pointers ARx & index (offset) DRx re-mapping are effective at the end of the ADDRESS cycle in order to be effective for the memory address computation of the next instruction without any latency cycles constraint.

The accumulators ACx re-mapping are effective at the end of the EXEC cycle in order to be effective for the next data computation.

The ARx (DRx) swap can be made conditional by executing in parallel the instruction:

"if (cond) execute (AD_unit)"

In case of ACx conditional swap, since the registers move takes place in the EXEC cycle, the programmer can optimize the condition latency by executing in parallel the instruction:

"if (cond) execute (D_unit)"

In case of circular buffer addressing the buffer offset registers and the buffer size registers are not affected by the swap( ) instruction.

Figure 43:
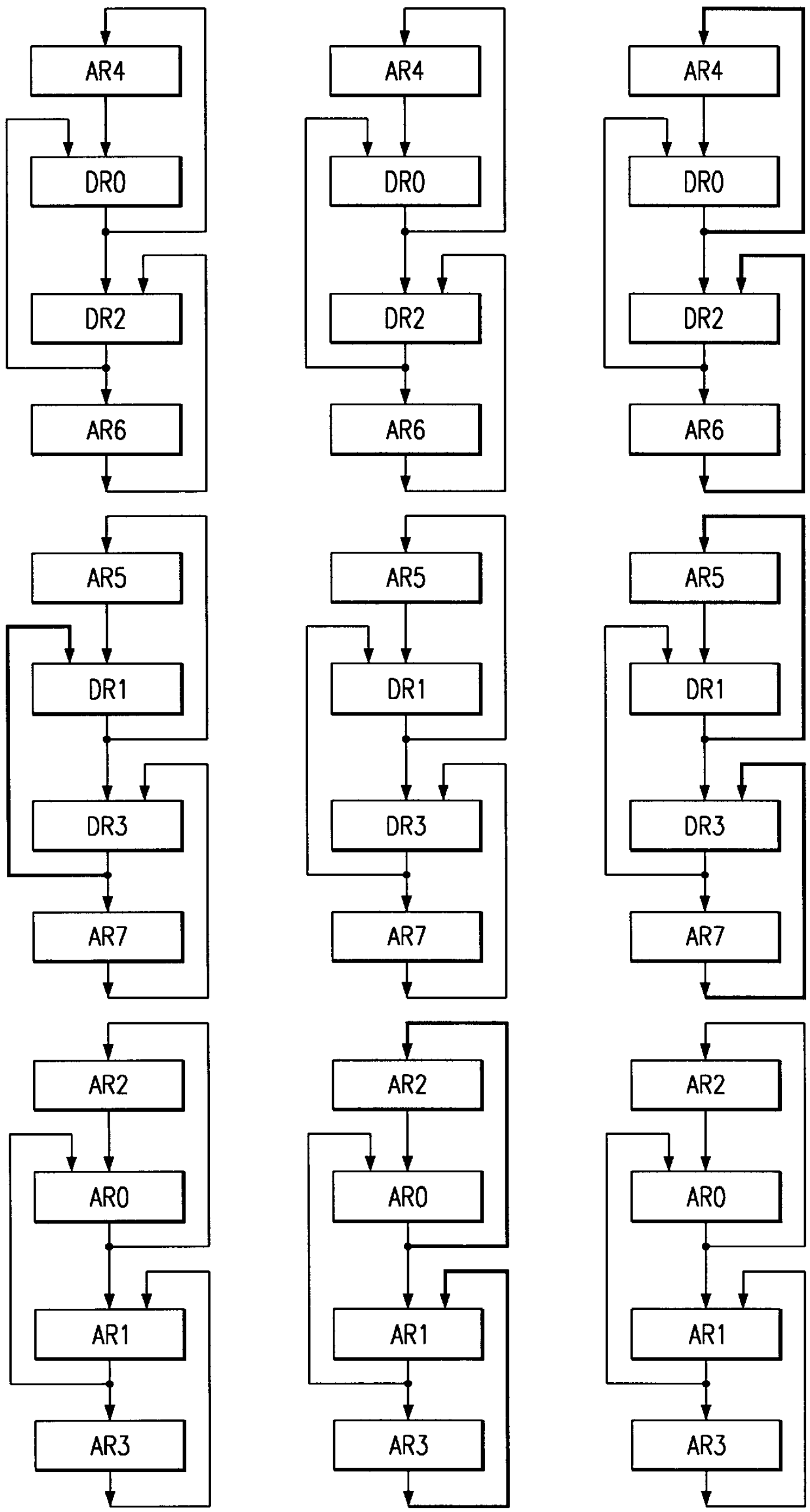
FIG. 43 illustrates how register exchanges can be performed in parallel with a minimum number of data-path tracks.

The A unit floor plan has to be analyzed carefully in order to support the registers re-naming features with an optimized buses routing. FIG. 43 illustrates how register exchanges can be performed in parallel with a minimum number of data-path tracks. In FIG. 43, the following registers are exchanged in parallel:

swap (DR1,DR3) swap (pair(AR0),pair(AR2)

swap(block(AR4),block(DR0))

The swap( ) instruction argument is encoded as a 6 bit field as defined in Table 29B.

TABLE 29B swap() instruction argument encoding

| Pipeline stage | swap argument msb → lsb register | | swap operation | algebraic syntax |
|---|---|---|---|---|
| ADDRESS | 00 | 1000 | AR0 ←→ AR2 | swap (AR0, AR2) |
| | 01 | | AR0 ←→ AR2, AR1 ←→ AR3 | swap (pair(AR0), pair(AR2)) |
| | 11 | | AR0 ←→ AR1 | swap (AR0, AR1) |
| | 00 | 1001 | AR1 ←→ AR3 | swap (AR1, AR3) |
| | 00 | 1100 | AR4 ←→ DR0 | swap (AR4, DR0) |
| | 01 | | AR4 ←→ DR0, AR5 ←→ DR1 | swap (pair(AR4), pair(DR0)) |
| | 10 | | AR4 ←→ DR0, AR5 ←→ DR1 AR6 ←→ DR2, AR7 ←→ DR3 | swap (block(AR4), block(DR0)) |
| | 00 | 1101 | AR5 ←→ DR1 | swap (AR5, DR1) |
| | 00 | 1110 | AR6 ←→ DR2 | swap (AR6, DR2) |
| | 01 | | AR6 ←→ DR2, AR7 ←→ DR3 | swap (pair(AR6), pair(DR2)) |
| | 00 | 1111 | AR7 ← → DR3 | swap (AR7, DR3) |
| | 00 | 0100 | DR0 ← → DR2 | swap (DR0, DR2) |
| | 01 | | DR0 ← → DR2, DR1 ← → DR3 | swap (pair(DR0), pair(DR2)) |
| | 00 | 0101 | DR1 ← → DR3 | swap (DR1, DR3) |
| EXEC | 00 | 0000 | AC0 ← → AC2 | swap (AC0, AC2) |
| | 01 | | AC0 ← → AC2, AC1 ← → AC3 | swap (pair(AC0), pair(AC2)) |
| | 00 | 0001 | AC1 ← → AC3 | swap (AC1, AC3) |

4.12 Transition Registers (TRN0,TRN1)

The 16 registers hold the transition decision for the path to new metrics in VITERBI algorithm implemention. The max_diff( ), min_diff( ) instructions update the TRN[0–1] registers based on the comparison of two accumulators. Within the same cycle TRN0 is updated based on the comparison of the high words, TRN1 is updated based on the comparison of the low words. The max_diff_dbl( ), min_diff_dbl( ) instructions update a user defined TRNx register based on the comparison of two accumulators.

4.13 Circular Buffer Size Registers (BK03,BK47, BKC)

The 16 bit circular buffer size registers BK03,BK47,BKC are used by the DAGEN in circular addressing to specify the data block size. BK03 is associated to AR[0–3], BK47 is associated to AR[4–7], BKC is associated to CDP. The buffer size is defined as number of words.

In FAMILY mode the circular buffer size register BK03 is associated to AR[0–7] and BK47 register access is disabled.

4.14 Pointers Offset Registers (BOF01,BOF23, BOF45,BOF67,BOFC)

The five 16-bit BOFxx buffer offset registers are used in A-unit's Data Address Generators unit (DAGEN). As it will be detailed in a later section, indirect circular addressing using ARx and CDP pointer registers are done relative to a buffer offset register content (circular buffer management activity flag are located in ST2 register). Therefore, BOFxx register will permit to:

Define a circular buffer anywhere in the data space with a buffer start address unbounded to any alignment constraint.

Two adjacent address register share the same Buffer offset register while CDP pointer is associated to BOFC buffer offset register:

AR0 and AR1 are associated to BOF01,

AR2 and AR3 are associated to BOF23,

AR4 and AR5 are associated to BOF45,

AR5 and AR7 are associated to BOF67,

CDP is associated to BOFC.

4.15 Data and System Stack Pointer Registers (SP, SSP)

As was discussed earlier, the processor manages the processor stack:

With 2 stack pointers: a 16-bit system stack pointer (SSP) and a 16-bit data stack pointer (SP). This feature is driven from FAMILY compatibility requirement.

Within main data page 0 (64 Kword). This feature is derived from the processor segmented data space feature.

Both stack pointers contain the address of the last element pushed into the data stack, the processor architecture provides a 32-bit path to the stack which allows to speed up context saving. The stack is manipulated by:

Interrupts and intr( ), trap( ), and call( ) instructions which push data both in the system and the data stack (SP and SSP are both pre-decremented before storing elements to the stack).

push( ) instructions which pushes data only in the data stack (SP is pre-decremented before storing elements to the stack).

return( ) instructions which pop data both from the system and the data stack (SP and SSP are both post-incremented after stack elements are loaded).

pop( ) instructions which pop data only from the data stack (SP is post-incremented after stack elements are loaded).

The data stack pointer (SP) is also used to access the single data memory operands in direct mode (when CPL status bit set).

4.15.1 Stack Pointer (SP)

The 16 bit stack pointer register (SP) contains the address of the last element pushed into the stack. The stack is manipulated by the interrupts, traps, calls, returns and the push/pop instructions class. A push instruction pre-decrement the stack pointer, a pop instruction post-increment the stack pointer. The stack management is mainly driven by the FAMILY compatibility requirement to keep an earlier family processor and the processor stack pointers in sync along code translation in order to support properly parameters passing through the stack. The stack architecture takes advantage of the 2×16 bit memory read/write buses and dual read/write access to speed up context save. For instance a 32 bit accumulator or two independent registers are saved as a sequence of two 16 bit memory write. The context save routine can mix single and double push( )/pop( ) instructions. The table below summarizes the push/pop instructions family supported by the processor instructions set.

| | | | |
|---|---|---|---|
| EB request<br>@ SP-1 | Stack access | | |
| (1) push(DAX) | — | DAx[15-0] | single write |
| (2) push(ACX) | — | ACx[15-0] | single write |
| (3) push(Smem) | — | Smem | single write |
| @ SP-2 | FB request<br>@ SP-1 | EB request | Stack access |
| (2) dbl(push(ACx)) | ACx[31-16] | ACx[15-0] | dual write |
| (3) push(dbl(Lmem)) | Lmem[31-16] | Lmem[15-0] | dual write |
| (4) push(src,Smem) | src | Smem | dual write |
| (5) push(src1,src2) | src1 | src2 | dual write |
| @ SP | | DB request | Stack access |
| (1) DAx = pop() | — | DAx[15-0] | single read |
| (2) ACx = pop() | — | ACx[15-0] | single read |
| (3) Smem = pop() | — | Smem | single read |
| | CB request<br>@ SP | DB request<br>@ SP+1 | Stack access |
| (2) ACx = dbl(pop()) | ACx[31-16] | ACx[15-0] | dual read |
| (3) dbl(Lmem) = pop() | Lmem[31-16] | Lmem[15-0] | dual read |
| (4) dst,Smem = pop() | dst | Smem | dual read |
| (5) dst1, dst2 = pop() | dst1 | dst2 | dual read |

The byte format is not supported by the push/pop instructions class.

To get the best performance on context save the stack has to be mapped into dual access memory instances.

Applications which require pretty large stack can implement it on two single access memory instances with a special mapping (odd/even bank) to get rid of the conflict between E and F requests.

4.15.2 System Stack Pointer (SSP)

With a classical stack architecture the an earlier family processor Stack pointer and the processor stack pointer would diverge along the code translation process due to 24 bit program counter instead of 16 bit. Keeping the stack pointers in sync is a key translation requirement to support properly parameter passing through the stack.

Figure 44:
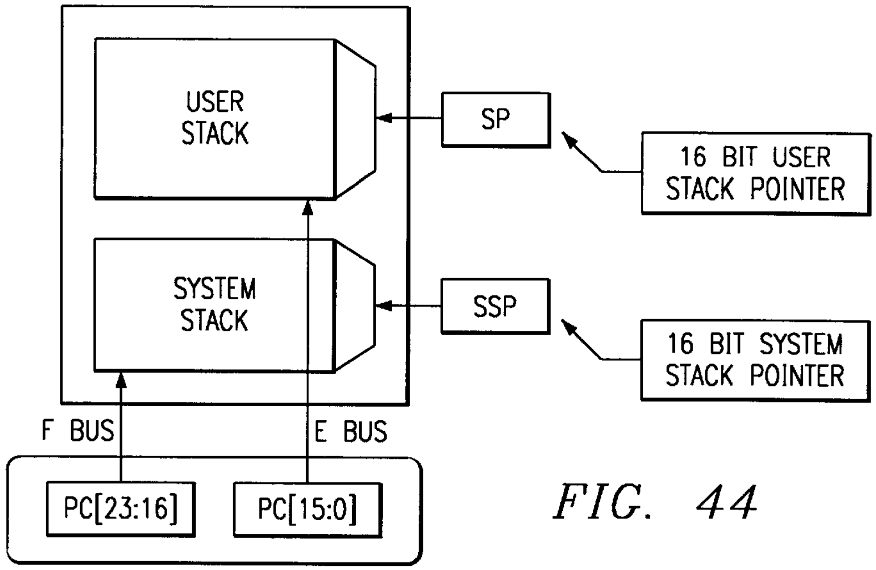
FIG. 44 illustrates how the processor stack is managed from two independent pointers: SP and SSP (system stack pointer)
Figure 45:
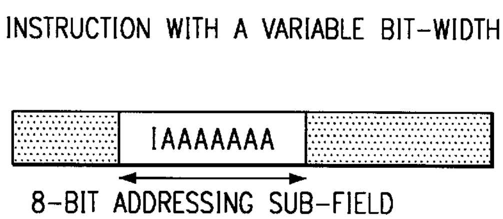
FIG. 45 illustrates a single data memory operand instruction format.

To address above requirement the processor stack is managed from two independent pointers: SP and SSP (system stack pointer), as illustrated in FIG. 44. The user should never handle the system stack pointer except for mapping.

In context save driven by the program flow (calls, interrupts), the program counter is split into two fields PC[23:16], PC[15:0] and saved as a dual write access. The field PC[15:0] is saved into the stack at the location pointed by SP through the EB/EAB buses, the field PC[23:16] is saved into the stack at the location pointed by SSP through the FB/FAB buses.

| | FB request<br>@ SSP-1 | EB request<br>@ SP-1 | Stack access |
|---|---|---|---|

-continued

| | | | |
|---|---|---|---|
| call P24 | PC[23-16]<br>CB request<br>@ SSP | PC[15-0]<br>DB request<br>@ SP | dual write<br>Stack access |
| return | PC[23-16] | PC[15-0] | dual read |

Depending on the original of program code for an earlier processor from the family of the present processor, the translator may have to deal with "far calls" (24 bit address). The processor instruction set supports a unique class of call/return instructions all based on the dual read/dual write scheme. The translated code will execute on top of the call an SP=SP+K8 instruction to end up with the same SP post modification.

There is a limited number of cases where the translation process implies extra CPU resources. If an interrupt is taken within such macro and if the interrupt routine includes similar macros then the translated context save sequence will requires extra push( ) instructions. That means the an earlier family processor and the processor stack pointers are no more in synch during the ISR execution window. Provided that all the context save is performed at the beginning of the ISR, any parameter passing through the stack within the interrupt task is preserved. Upon return from interrupt the an earlier family processor and the processor stack pointers are back in sync.

4.16 Block Repeat Registers (BRC0–1, BRS1, RSA0–1, REA0–1)

These registers are used to define a block of instructions to be repeated. Two nested block repeat can be defined:

BRC0, RSA0, REA0 are the block repeat registers used for the outer block repeat (loop level 0), BRC1, RSA1, REA1 and BRS1 are the block repeat registers used for the inner block repeat (loop level 1).

The two 16-bit block repeat counter registers (BRCx) specify the number of times a block repeat is to be repeated when a blockrepeat( ) or localrepeat( ) instruction is performed. The two 24-bit block repeat start address registers (RSAx) and the two 24-bit block repeat end address registers (REAx) contain the starting and ending addresses of the block of instructions to be repeated.

The 16-bit Block repeat counter save register (BRS1) saves the content of BRC1 register each time BRC1 is initialized. Its content is untouched during the execution of the inner block repeat; and each time, within a loop level 0, a blockrepeat( ) or localrepeat( ) instruction is executed (therefore triggering a loop level 1), BRC1 register is initialized back with BRS1. This feature enables to have the initialization of the loop counter of loop level 1 (BRC1) being done out of loop level 0.

Se other sections for more details on the block repeat mechanism.

4.17 Repeat Single Registers (RPTC, CSR)

These registers are used to trigger a repeat single mechanism, that is to say an iteration on a single cycle instruction or 2 single cycle instructions which are paralleled.

The 16-bit Computed Single Repeat register (CSR) specifies the number of times one instruction or two paralleled instruction needs to be repeated when the repeat(CSR) instruction is executed. The 16-bit Repeat Counter register (RPTC) contains the counter that tracks the number of times one instruction or two paralleled instructions still needs to be repeated when a repeat single mechanism is running. This register is initialized either with CSR content or an instruction immediate value when the repeat( ) instruction is executed.

See other sections for more details on the single repeat mechanism.

4.18 Interrupt Registers (IMR0–1, IFR0–1, IVPD–H)

See Interrupts section.

4.19 CPU Registers Encoding

Registers source and destination are encoded as a four bit field respectively called 'FSSS' or 'FDDD' according to table 30. Generic instructions can select either an ACx, DRx or ARx register. In case of DSP specific instructions registers selection is restricted to ACx and encoded as a two bit field called 'SS', 'DD'.

TABLE 30

FSSS endcoding

| FSSS | | CPU REGISTER |
|---|---|---|
| 0000 | AC0 | |
| 0001 | AC1 | |
| 0010 | AC2 | 40 BIT DATA REGISTERS (ACC) |
| 0011 | AC3 | |
| 0100 | DR0 | |
| 0101 | DR1 | |
| 0110 | DR2 | 16 BIT GENERIC REGISTERS |
| 0111 | DR3 | |
| 1000 | AR0 | |
| 1001 | AR1 | |
| 1010 | AR2 | 16 BIT POINTERS |
| 1011 | AR3 | (GENERIC REG) |
| 1100 | AR4 | |
| 1101 | AR5 | |
| 1110 | AR6 | |
| 1111 | AR7 | |

5. Addressing

5.1 Processor Data Types

The processor instruction set handles the following data types:

bytes: 8-bit data words: 16-bit data long words: 32-bit data

These data types are designated in the processor instruction set as follows:

bytes: low_byte(Smem), high_byte(Smem)

words: Smem, Xmem, Ymem, coeff long words: Lmem, dbl(Lmem)

5.2 Word Addressable I/O and Data Memory Spaces

As described in a later section, the processor CPU core addresses 8 M words of word addressable data memory and 64 K words of word addressable I/O memory. These memory spaces are addressed by the Data Address Generation Unit (DAGEN) with 23-bit word addresses for the data memory or 16-bit word address for the I/O memory. The 23-bit word addresses are converted to 24-bit byte addresses when they are exported to the data memory address buses (BAB, CAB, DAB, EAB, FAB). The extra least significant bit (LSB) can be set by the dedicated instructions listed in Table 31. The 16-bit word addresses are converted to 17-bit byte addresses when they are exported to the RHEA bridge via DAB and EAD address buses. The extra LSB can be set by the dedicated instructions listed in Table 31.

This word addressing granularity implies that in the Data Address Generation Unit (DAGEN), the instructions which handle byte data types (listed in Table 31), are treated as instructions which handle word data types (Smem accesses).

TABLE 31

| Instructions handling byte data types |
|---|
| dst = uns(high_byte(Smem)) |
| dst = uns(low_byte(Smem)) |
| ACx = high_byte(Smem) << SHIFTW |
| ACx = low_byte(Smem) << SHIFTW |
| high_byte(Smem) = src |
| low_byte(Smem) = src |

5.3 Addressing Modes

5.3.1 Data Memory Addressing Modes

The main functionality of the A unit Data Address Generation Unit (DAGEN) is to compute the addresses of the data memory operands. processor has three data memory addressing modes:

(Direct, indirect, absolute) single data memory addressing (Smem, dbl(Lmem))

Indirect dual data memory addressing (Xmem, Ymem)

Coefficient data memory addressing (coeff)

5.3.2 Register Bit Addressing Modes

A second usage of the A unit Data Address Generation Unit is to generate a bit position address used to manipulate bits within the processor CPU registers. In this case, no memory operand is accessed. This type of addressing is designated as (Direct, indirect) Register bit addressing (Baddr, pair(Baddr)).

5.3.3 Memory Mapped Register (MMR) Addressing Modes

As described in an earlier section, the processor CPU registers are memory mapped. Therefore, a third usage of the A unit Data Address Generation Unit is to compute the data memory addresses of these CPU registers. This type of addressing is designated as (Direct, indirect, absolute) MMR addressing.

5.3.4 I/O Memory Addressing Modes

A fourth usage of the A unit Data Address Generation Unit is to compute the addresses of the I/O memory operands (peripheral registers or ASIC domain hardware). This type of addressing is designated as (Direct, indirect, absolute) single I/O memory addressing.

5.3.5 Stack Addressing Modes

The last usage of the A unit Data Address Generation Unit is to compute the addresses of the data memory stack operands. This type of addressing is designated as single stack addressing and dual stack addressing.

5.4 Single Data Memory Operand Addressing: Smem, dbl(Lmem)

5.4.1 Single Data Memory Operand Instructions

Direct, indirect and absolute addressing can be used in instructions having a single data memory operand. According to the type of the accessed data, the single data memory addressing is designated in instructions as follows:

Byte memory operands are designated as: high_byte (Smem), low_byte(Smem)

Word memory operand are designated as: Smem

Long word memory operand are designated as: dbl (Lmem) or Lmem

In following examples, examples 1 and 2 illustrate instructions that load a byte (respectively a word) in the accumulator, data or address registers. Example 3 shows the instruction that loads a long word in an accumulator register. The last example is the instruction that loads two adjacent data and address registers with two 16-bit values extracted from the long word memory operand.

1. dst=low_byte(Bmem)
2. dst=Smem
3. ACx=dbl(Lmem)
4. pair(DAx)=Lmem

Single data memory operand instructions have an instruction format embedding an 8-bit sub-field used by the Data Address Generation Unit (DAGEN) to generate the data memory address.

5.4.2 Bus Usage

Byte memory operands and word memory operands of the single data memory operand instructions (see Table 32) are accessed through:

DB bus for read memory operands

EB bus for write memory operands when no preliminary shift occurs within the D-unit shifter FB bus for write memory operands when a preliminary shift occurs within the D-unit shifter

TABLE 32 the processor instructions making a shift, rounding and saturation before storing to memory

| | |
|---|---|
| Smem = HI(rnd(ACx)) | Smem = LO(ACx << DRx) |
| Smem = HI(saturate(rnd(ACx))) | Smem = LO(ACx << SHIFTW) |
| Smem = HI(rnd(ACx << DRx)) | Smem = HI(ACx << SHIFTW) |
| Smem = HI(saturate(rnd(ACx << DRx))) | Smem = HI(rnd(ACx << SHIFTW)) |
| | Smem = HI(saturate(rnd(ACx << SHIFTW))) |

Long word memory operands are accessed through:

CB (for most significant word—MSW) and DB (for least significant word—LSW) buses for read memory operands FB (for MSW) and EB (for LSW) bus for write memory operands 5.5 Direct Memory Addressing Mode (dma)

Direct memory addressing (dma) mode allows a direct memory access relative either to the local data page pointer (DP) or to the data stack pointer (SP) registers. The type of relative addressing is controlled by the CPL status bit. When CPL=0, direct memory addressing is relative to DP. When CPL=1, direct memory addressing is relative to SP.

As shown in Table 33, the computation of the 23-bit word address does not depend on the type of the accessed memory operand. For byte, word or long word memory accesses:

1. A 7-bit positive offset (called dma) is added to the 16 bits of DP or SP.
2. The 16-bit result of the addition is concatenated to:
   1) If CPL=0, the 7-bit main data page pointer MDP
   2) If CPL=1, a 7-bit field cleared to 0 (the stack must be implemented in main data page 0)

TABLE 33

Smem, dbl(Lmem) direct memory addressing (dma)

| Assembly syntax | Generated address | Comments |
|---|---|---|
| @ dma | MDP • (DP + dma) | Smem, Lmem accesses in application mode (CPL = 0) |
| *SP (dma) | MDP • (SP + dma) | Smem, Lmem accesses in compiler mode (CPL = 1) |

note: this symbol indicates concatenation operation between a 7-bit field and a 16-bit field: •

Figure 46:
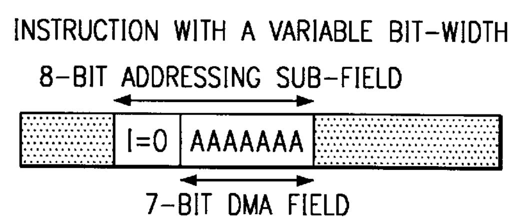
FIG. 46 illustrates an addresses field for a 7-bit positive offset dma address in the addressing field of the instruction.

The 7-bit positive offset dma ranges within [0, 128] interval and it is encoded within a 7-bit field in the addressing field of the instruction (see FIG. 46).

As a result, the dma mode allows access to byte, words and long words included in a 128-word DP or SP frame.

Compatibility with earlier processors in the same family as the present processor is ensured. However, it is important to point out that on other family processor devices, the DP register should be aligned on a 128 word boundary. On the present processor devices, this boundary restriction does not exist. A local data page can be defined anywhere within a selected 64 K word main data page.

5.6 Indirect Memory Addressing Mode

Indirect memory addressing mode allows the computation of the addresses of the data memory operands from the content of the eight address registers AR[0–7] or from the content of the coefficient data pointer CDP.

Whenever such memory access is performed, the selected pointer register can be modified before or after the address has been generated. Pre-modifiers will modify the content of the register before generating the memory operand address. Post-modifiers will modify the content of the register after generating the memory operand address.

The set of modifiers applied to the pointer register depends on the ARMS status bit. When ARMS=0, a set of modifiers enabling efficient execution of DSP intensive applications are available for indirect memory accesses. This set of modifiers is called 'DSP mode' modifiers. When ARMS=1, a set of modifiers enabling optimized code size of control code is available for indirect memory accesses. This set of modifiers is called 'Control mode' modifiers.

The modifiers applied to the selected pointer register can be controlled by a circular management mechanism to implement circular buffers in data memory. The circular management mechanism is controlled by following resources:

The status register ST2, where each pointer register can be configured in circular or in linear mode The three 16-bit buffer size registers BK03, BK47, and BKC where the size of the circular buffers to implement can be determined The five 16-bit buffer offset registers BOF01, BOF23, BOF45, BOF67 and BOFC which allow circular buffer start addresses unbounded to any alignment constraints In all cases, whether circular addressing is activated or not, the 23-bit generated address is computed as follows:

1. A pre-modification is performed on the 16-bit selected pointer (ARx or CDP)
2. This 16-bit result is concatenated with the 7-bit main data page pointer:
   1) MDP05, when indirect memory addressing is done with AR0, AR1, AR2, AR3, AR4 or AR5 address registers.

2) MDP67, when indirect memory addressing is done with AR6 or AR7.

3) MDP, when indirect memory addressing is done with CDP.

5.6.1.1 Indirect Memory Addressing in DSP Mode

Table 34 summarizes the modifier options supported by the processor architecture for indirect single memory accesses in DSP mode and in enhanced mode (FAMILY status bit set to 0). It is a cross reference table between:

The assembly syntax of indirect addressing modes: Smem. dbl(Lmem)

The corresponding generated memory address computed by the DAGEN: note that the 16-bit addition of the buffer offset register BOFyy is submitted to activation of circular modification (see a later section for more details)

The corresponding pointer modification computed by the DAGEN

Note that both pointer register modification and address generation are either linear or circular according to the pointer configuration setting in the ST2 status register (see a later section for more details).

When FAMILY=1, the modifiers *(ARn+DR0), *(ARn−DR0), *ARn(DR0), *(ARn+DR0B), and *(ARn−DR0B) are not available. Instructions making a memory access with the *ARn(#K16), *+ARn(#K16), *CDP(#K16), *+CDP(#K16) indirect memory addressing modes have a two byte extension and can not be paralleled.

In Table 34, note that all addition/subtraction operation are done modulo 64 K. Cross data page addressing is not possible without changing the values of the main data page registers MDP, MDP05 and MDP67.

When the processor operates in DSP mode and in compatible mode (FAMILY=1), the indirect memory addressing modes summarized in Table 34 are valid except the following five indirect addressing modes: *ARn(DR0), *(ARn+DR0), *(ARn−DR0) *(ARn+DR0B) and *(ARn−DR0B). Instead, the following five modifiers are available (see Table 35): *ARn(AR0), *(ARn+AR0), *(ARn−AR0) *(ARn+AR0B) and *(ARn−AR0B).

TABLE 34

Smem, dbl(Lmem) indirect single data memory addressing modifiers when ARMS = 0.

| Assembly syntax | Generated address | Pointer register modification | access type |
|---|---|---|---|
| *ARn | MDPxx • ( [BOFyy +] ARn) | No modification | |
| *ARn+ | MDPxx • ( [BOFyy +] ARn) | ARn = ARn + 1 | Smem |
| | | ARn = ARn + 2 | dbl(Lmem) |
| *ARn− | MDPxx • ( [BOFyy +] ARn) | ARn = ARn − 1 | Smem |
| | | ARn = ARn − 2 | dbl(Lmem) |
| *(ARn+DR0) | MDPxx • ( [BOFyy +] ARn) | ARn = ARn + DR0 | |
| *(ARn−DR0) | MDPxx • ( [BOFyy +] ARn) | ARn = ARn − DR0 | |
| *ARn(DR0) | MDPxx • ( [BOFyy +] ARn + DR0) | No modification | |
| *(ARn+DR1) | MDPxx • ( [BOFyy +] ARn) | ARn = ARn + DR1 | |
| *(ARn−DR1) | MDPxx • ( [BOFyy +] ARn) | ARn = ARn − DR1 | |
| *ARn(DR1) | MDPxx • ( [BOFyy +] ARn + DR1) | No modification | |
| *+ARn | MDPxx • ( [BOFyy +] ARn + 1) | ARn = ARn + 1 | Smem |
| | MDPxx • ( [BOFyy +] ARn + 2) | ARn = ARn + 2 | dbl(Lmem) |
| *−ARn | MDPxx • ( [BOFyy +] ARn − 1) | ARn = ARn − 1 | Smem |
| | MDPxx • ( [BOFyy +] ARn − 2) | ARn = ARn − 2 | dbl(Lmem) |
| *(ARn+DR0B) | MDPxx • ARn | ARn = ARn + DR0B DR0 index post increment with reverse carry propagation. | Circular modification is not allowed for this modifier. |
| *(ARn−DR0B) | MDPxx • ARn | ARn = ARn − DR0B DR0 index post decrement with reverse carry propagation. | Circular modification is not allowed for this modifier. |
| *ARn(#K16) | MDPxx • ( [BOFyy +] ARn + K16) | No modification | |
| *+ARn(#K16) | MDPxx • ( [BOFyy +] ARn + K16) | ARn = ARn + #K16 | |
| *CDP | MDP • ( [BOFC +] CDP) | No modification | |
| *CDP+ | MDP • ( [BOFC +] CDP) | CDP = CDP + 1 | Smem |
| | | CDP = CDP + 2 | dbl(Lmem) |
| *CDP− | MDP • ( [BOFC +] CDP) | CDP = CDP − 1 | Smem |
| | | CDP = CDP − 2 | dbl(Lmem) |
| *CDP(#K16) | MDP • ( [BOFC +] CDP + K16) | No modification | |
| *+CDP(#K16) | MDP • ( [BOFC +] CDP + K16) | CDP = CDP − #K16 | |

note: this symbol indicates a concatenation operation between a 7-bit field and a 16-bit field: •
note: Buffer offset BOFyy is only added when circular addressing mode is activated.

TABLE 35

Smem, dbl(Lmem) indirect single data memory addressing modifiers only available when ARMS = 0 and FAMILY = 1 (to be added to those listed in Table 34)

| Assembly syntax | Generated address | Address register modification | access type |
|---|---|---|---|
| *(ARn+AR0) | MDPxx • ( [BOFyy + ] ARn) | Arn = ARn + AR0 | |
| *(ARn−AR0) | MDPxx • ( [BOFyy + ] ARn) | Arn = ARn − AR0 | |
| *ARn(AR0) | MDPxx • ( [BOFyy + ] ARn + AR0) | No modification | |
| *(ARn+AR0B) | MDPxx • ARn | Arn = ARn + AR0B AR0 index post increment with reverse carry propagation. | Circular modification is not allowed for this modifier. |
| *(ARn−AR0B) | MDPxx • ARn | Arn = ARn − AR0B AR0 index post decrement with reverse carry propagation. | Circular modification is not allowed for this modifier. |

Note: This symbol indicates a concatenation operation between a 7-bit field and a 16-bit field: •
Note: Buffer offset BOFyy is only added when circular addressing mode is activated.

5.6.1.2 Indirect Memory Addressing in Control Mode

Table 36 summarizes the modifier options for indirect single memory accesses in control mode and in enhanced mode (FAMILY status bit set to 0) supported by the processor architecture. As in DSP mode, instructions making a memory access with the *ARn(#K16), *+ARn(#K16), *CDP(#K16), and *+CDP(#K16) indirect memory addressing modes have a two byte extension and can not be paralleled.

Instructions using the *ARn(short(#K3)) indirect memory addressing mode do not follow this rule since those instructions do not have a byte extension for the short constant encoding and can therefore be paralleled. The *ARn(short (#K3)) addressing mode accesses bytes, words and long words included in a 8 word ARn frame.

When the processor operates in Control mode and in compatible mode (FAMILY=1), the indirect memory addressing modes summarized in Table 36 are valid with the exception of these three indirect addressing modes: *ARn (DR0), *(ARn+DR0) and *(ARn−DR0). Instead, the following three modifiers are available (see Table 37): *ARn (AR0), *(ARn+AR0) and *(ARn−AR0).

TABLE 36

Smem, dbl(Lmem) indirect single data memory addressing modifiers only available when ARMS = 1. When FAMILY = 1, the modifiers *(ARn+DR0), *(ARn−DR0) and *ARn(DR0) are not available.

| Assembly syntax | Generated address | Pointer register modification | access type |
|---|---|---|---|
| *ARn | MDPxx • ( [BOFyy +] ARn) | No modification | |
| *ARn+ | MDPxx • ( [BOFyy +] ARn) | ARn = ARn + 1 | Smem |
| | | ARn = ARn + 2 | dbl(Lmem) |
| *ARn− | MDPxx • ( [BOFyy +] ARn) | ARn = ARn − 1 | Smem |
| | | ARn = ARn − 2 | dbl(Lmem) |
| *(ARn+DR0) | MDPxx • ( [BOFyy +] ARn) | ARn = ARn + DR0 | |
| *(ARn−DR0) | MDPxx • ( [BOFyy +] ARn) | ARn = ARn − DR0 | |
| *ARn(DR0) | MDPxx • ( [BOFyy +] ARn + DR0) | No modification | |
| *ARn(short(#K3)) | MDPxx • ( [BOFyy +] ARn + K3) | No modification | |
| *ARn(#K16) | MDPxx • ( [BOFyy +] ARn + K16) | No modification | |
| *+ARn(#K16) | MDPxx • ( [BOFyy +] ARn + K16) | ARn = ARn + #K16 | |
| *CDP | MDP • ( [BOFC +] CDP) | No modification | |
| *CDP+ | MDP • ( [BOFC +] CDP) | CDP = CDP + 1 | Smem |
| | | CDP = CDP + 2 | dbl(Lmem) |
| *CDP− | MDP • ( [BOFC +] CDP) | CDP = CDP − 1 | Smem |
| | | CDP = CDP − 2 | dbl(Lmem) |
| *CDP(#K16) | MDP • ( [BOFC + CDP + K16) | No modification | |
| *+CDP(#K16) | MDP • ( [BOFC + CDP + K16) | CDP = CDP + #K16 | |

Note: This symbol indicates a concatenation operation between a 7-bit field and a 16-bit field: •
Note: Buffer offset BOFyy is only added when circular addressing mode is activated.

TABLE 37

Smem, dbl(Lmem) indirect single data memory addressing modifiers only available when ARMS = 1 and FAMILY = 1 (to be added to those listed in Table 36)

| Assembly syntax | Generated address | Address register modification | access type |
|---|---|---|---|
| *(ARn+AR0) | MDPxx • ( [BOFyy +] ARn) | ARn = ARn + AR0 | |
| *(ARn−AR0) | MDPxx • ( [BOFyy +] ARn) | ARn = ARn − AR0 | |
| *ARn(AR0) | MDPxx • ( [BOFyy +] ARn + AR0) | No modification | |

Note: this symbol indicates a concatenation operation between a 7-bit field and a 16-bit field: •

Note: Buffer offset BOFyy is only added when circular addressing mode is activated.

5.6.2 Absolute Data Memory Addressing Modes *abs 16(#k) and *(#k)

Two absolute memory addressing mode exists on the processor (see Table 38). The first absolute addressing mode is MDP referenced addressing: a 16-bit constant representing a word address is concatenated to the 7-bit main data page pointer MDP to generate a 23-bit word memory address. This address is passed by the instruction through a two byte extension added to the instruction. The second absolute addressing mode allows addressing of the entire 8 M word of data memory with a constant representing a 23-bit word address. This address is passed by the instruction through a three byte extension added to the instruction (the most significant bits of this three byte extension are discarded). Instructions using these addressing modes can not be paralleled.

The execution of following instructions takes one extra cycle when the *(#k23) absolute addressing mode is selected to access the memory operand Smem:

Smem=K16

TCx=(Smem==K16)

TCx=Smem and k16

Smem=Smem and k16

Smem=Smem|k16

Smem=Smem^k16

Smem=Smem+K16

ACx=rnd(Smem*K8) [, DR3=Smem]

ACx=rnd(ACx+(Smem*K8)) [, DR3=Smem]

ACx=ACx+(uns(Smem)<<SHIFTW)

ACx=ACx−(uns(Smem)<<SHIFTW)

ACx=uns(Smem)<<SHIFTW

Smem=HI(rnd( ACx<<SHIFTW))

Smem=HI(saturate(rnd(ACx<<SHIFTW)))

TABLE 38

Smem, dbl(Lmem) absolute data memory addressing modes

| Assembly syntax | Generated address | Comments |
|---|---|---|
| *abs16(#k16) | MDP • k16 | Smem, dbl(Lmem) access |
| *(#k23) | k23 | Smem, dbl(Lmem) access |

Note: This symbol indicates a concatenation operation between a 7-bit field and a 16-bit field:•

5.7 Indirect Dual data Memory Addressing (Xmem, Ymem)

Indirect dual data memory addressing mode allows two memory accesses through the 8 AR[0–7] address registers. This addressing mode may be used when executing an instruction making two 16-bit memory accesses or when executing two instructions in parallel. In the former case, the two data memory operands are designated in instructions with the Xmem and Ymem keywords. In the latter case, each instruction must use an indirect single data memory address (Smem. dbl(Lmem)) and both of them must use the addressing mode defined in Table 39. The first instruction's data memory operand is treated as the Xmem operand, and the second instruction's data memory operand is treated as the Ymem operand. These type of dual accesses are designated 'software' indirect dual accesses.

Example 1 below demonstrates the instruction to add two 16-bit memory operands and store the result in a designated accumulator register. Example 2 shows two single data memory addressing instructions which may be paralleled if the above rules are respected.

1. ACx=(Xmem<<#16)+(Ymem<<#16)

2. dst=Smem || dst=src and Smem

Xmem operands are accessed through the DB bus for read memory operands and the EB bus for write memory operands. Ymem operands are accessed through the CB bus for read memory operands and the FB bus for write memory operands.

Indirect dual data memory addressing modes have the same properties as indirect single data memory addressing modes (see previous section). Indirect memory addressing accesses through the ARx address registers are performed within the main data pages selected by MDP05 and MPD67 registers. Indirect memory addressing accesses through the ARx address registers can address circular memory buffers when the buffer offset registers BOFxx, the buffer size register BKxx, and the pointer configuration register ST2 are appropriately initialized (see previous section). However, the ARMS status bit does not configure the set of modifiers available for the indirect dual data memory addressing modes.

Table 39 summarizes the modifier options supported by the processor architecture for indirect dual data memory accesses in enhanced mode (FAMILY status bit set to 0). Any of these modifiers and any of the ARx registers can be selected for the Xmem operand as well as for the Ymem operand.

The assembler will reject code where two addressing modes use the same ARn address register with two different address register modifications except when *ARn or *ARn (DR0) is used as one of the indirect memory addressing modes In this case, the ARn address register will be modified according to the other addressing mode.

TABLE 39

Xmem, Ymem indirect dual data memory addressing modifiers

| Assembly syntax | Generated address | Pointer register modification | access type |
|---|---|---|---|
| *ARn | MDPxx • ( [BOFyy +] ARn) | No modification | |
| *ARn+ | MDPxx • ( [BOFyy +] ARn) | ARn = ARn + 1 | X/Ymem |
| | | ARn = ARn + 2 | dbl(X/Ymem) |
| *ARn− | MDPxx • ( [BOFyy +] ARn) | ARn = ARn − 1 | Smem |
| | | ARn = ARn − 2 | dbt(X/Ymem) |
| *(ARn+DR0) | MDPxx • ( [BOFyy +] ARn) | ARn = ARn + DR0 | |
| *(ARn−DR0) | MDPxx • ( [BPFyy +] ARn) | ARn = ARn − DR0 | |
| *ARn(DR0) | MDPxx • ( [BOFyy +] ARn + DR0) | No modification | |
| *(ARn+DR1) | MDPxx • ( [BOFyy +] ARn) | ARn = ARn + DR1 | |
| *(ARn−DR1) | MDPxx • ( [BOFyy +] ARn) | ARn = ARn − DR1 | |

Note: This symbol indicates a concatenation operation between a 7-bit field and a 16-bit field: •

Note: Buffer offset BOFyy is only added when circular addressing mode is activated.

When FAMILY=1, the modifiers *(ARn+DR0), *(ARn−DR0) and *ARn(DR0) are not available. When the processor operates in compatible mode (FAMILY=1), the indirect dual data memory addressing modes summarized in Table 39 are valid except for the following three indirect addressing modes: *ARn(DR0), *(ARn+DR0) and *(ARn−DR0). Instead, the following three modifiers are available (see Table 40): *ARn(AR0), *(ARn+AR0) and *(ARn−AR0).

TABLE 40

Xmem, Ymem indirect dual data memory addressing modifiers only available when FAMILY = 1 (to be added to those listed in Table 39)

| Assembly syntax | Generated address | Address register modification | access type |
|---|---|---|---|
| *(ARn+AR0) | MDPxx • ( [BOFyy +] ARn) | ARn = ARn + AR0 | |
| *(ARn−AR0) | MDPxx • ( [BOFyy +] ARn) | ARn = ARn − AR0 | |
| ARn(AR0) | MDPxx • ( [BOFyy +] ARn + AR0) | No modification | |

Note: This symbol indicates a concatenation operation between a 7-bit field and a 16-bit field: •

Note: Buffer offset BOFyy is only added when circular addressing mode is activated.

family processor compatibility—AR0 index

| | access/Mode | present processor | other family processor |
|---|---|---|---|
| (1) | Byte access | +/−1 | — |
| | Word access | +/−1 | +/−1 |
| | Double access | +/−2 | +/−2 |

Table 41 summarizes the modifier options subset available for dual access memory instructions. The pointer modification is interpreted either as linear or circular according to the pointer configuration defined by the MSB field [15–14] of the associated Buffer Offset Register. See the section on circular buffer management for more details.

TABLE 41

Modifier options

| Mod | Notation | Operation |
|---|---|---|
| 000 | *ARn | No modification |
| 001 | *ARn+ | Post increment |
| 010 | *ARn− | Post decrement |
| 011 | *(ARn+DR0) | DR0 index post increment |
| 100 | *(ARn+DR1) | DR1 index post increment |
| 101 | *(ARn−DR0) | DR0 index post decrement |
| 110 | *(ARn−DR1) | DR1 index post decrement |
| 111 | *ARn(DR0) | DR0 signed offset with no modify |

-continued

| | access/Mode | present processor | other family processor |
|---|---|---|---|
| (2) | When FAMILY mode is set the DAGEN hardware selects AR0 register as index or offset register instead of DR0 | | |

Xmem/Ymem modifiers conflict

Two different post modifications associated to same pointer are rejected by the assembler. Such dual memory instruction should not appear in the code. When a post modify is used in conjunction with a no modify then the post modification is performed.

5.7.1 Coefficients Pointer

The processor architecture supports a class of instructions similar to dual MAC operands which involve the fetch of three memory operands per cycle. Two of these operands can be addressed as dual memory access; the third one is usually the coefficient and resides on a separate physical memory bank. A specific pointer is dedicated to coefficients addressing. Table 42 summarizes the CDP modifiers supported by the address generation unit.

TABLE 42

| CDP Modifiers | | |
|---|---|---|
| Mod | Notation | Operation |
| 00 | coef(*CDP) | No modification |
| 01 | coef(*CDP+) | Post increment |
| 10 | coef(*CDP−) | Post decrement |
| 11 | coef(*CDP+DR0) | DR0 index post increment |

family processor compatibility—AR0 index

When FAMILY mode is set, the DAGEN hardware selects the AR0 register as the index or offset register instead of DR0. (Global DR0/AR0 re-mapping from FAMILY mode).

5.7.2 Soft Dual Memory Access

The parallelism supported by the processor architecture allows two single memory access instructions to be executed on same cycle. The instruction pair is encoded as a dual of replacing two Smem by an Xmem. Ymem we free up enough bits to insert the "soft dual" tag. The soft dual tag designates the pair of instructions as memory instructions. Since the instruction set mapping encodes memory instructions within in the range [80-FF], we can get rid of the opcode #1 MSB along soft dual fields encoding.

Each instruction within the instruction set is qualified by a 'DAGEN' tag which defines the address generator resources and the type of memory accesses involved to support the instruction, as summarized in Table 43. The feasibility of merging two standalone memory instructions into a soft dual instruction is determined by analysis of the DAGEN variables and by checking for operators and buses conflicts.

TABLE 43

| Standalone memory instructions classification | | | | | | | |
|---|---|---|---|---|---|---|---|
| DAG code | DAGEN tag | X | Y | C | SP | Definition | |
| 01 | DAG_X | x | — | — | — | Pointer modification without memory access | |
| 02 | DAG_Y | — | x | — | — | Pointer modification without memory access | |
| 03 | P_MOD | — | x | — | — | Bit pointer/Conditional branch with post-modify | |
| 08 | Smem_R | x | — | — | — | Single memory operand read | |
| 09 | Smem_W | — | x | — | — | Single memory operand write | |
| 10 | Lmem_R | x | — | — | — | Long memory operand read | |
| 11 | Lmem_W | — | x | — | — | Long memory write (E request) | |
| 12 | Smem_RW | x | — | — | — | Single memory operand read/modify/write (2 cycles) | |
| 13 | Smem_WF | — | x | — | — | Single memory operand write with shift (F request) | |
| 14 | Lmem_WF | — | x | — | — | Long memory write with shift (F request) | |
| 15 | Smem_RDW | x | x | — | — | Memory to memory | @src ← *CDP |
| 16 | Smem_RWD | x | x | — | — | Memory to memory | @dest ← *CDP |
| 17 | Lmem_RDW | x | x | — | — | Memory to memory (dbl) | @src ← *CDP |
| 18 | Lmem_RWD | x | x | — | — | Memory to memory (dbl) | @dst ← *CDP |
| 19 | Dual_WW | x | x | — | — | Dual memory write | |
| 20 | Dual_RR | x | x | — | — | Dual memory read | |
| 21 | Dual_RW | x | x | — | — | Dual memory read/write | D/E requests |
| 22 | Dual_RWF | x | x | — | — | Dual memory read/write (shift) | C/F requests |
| 23 | Delay | x | x | — | — | Memory to memory (next address) | |
| 24 | Stack_R | — | — | — | x | User stack read | |
| 25 | Stack_W | — | — | — | x | User stack write | |
| 26 | Stack_RR | — | — | — | x | User stack read (dbl)/User and System stack dual read | |
| 27 | Stack_WW | — | — | — | x | User stack write (dbl)/User and System stack dual write | |
| 28 | Smem_R_Stack_W | x | — | — | x | Memory read/User stack write | |
| 29 | Stack_R_Smem_W | — | x | — | x | User stack read/Memory write | |
| 30 | Smem_R_Stack_WW | x | — | — | x | Memory read/User stack write (dbl) | |
| 31 | Stack_RR_Smem_W | — | x | — | x | User stack read (dbl)/Memory write | |
| 32 | Lmem_R_Stack_WW | x | — | — | x | Memory read (dbl)/(User stack write (dbl) | |
| 33 | Stack_RR_Lmem_W | — | x | — | x | User stack read (dbl)/Memory write (dbl) | |
| 34 | NO_DAG | — | — | — | — | No DAGEN operation | |
| 35 | EMUL | — | — | — | — | No DAGEN operation/Emulation support | |

instruction and restricted to indirect addressing and dual modifier options.

Figure 47:
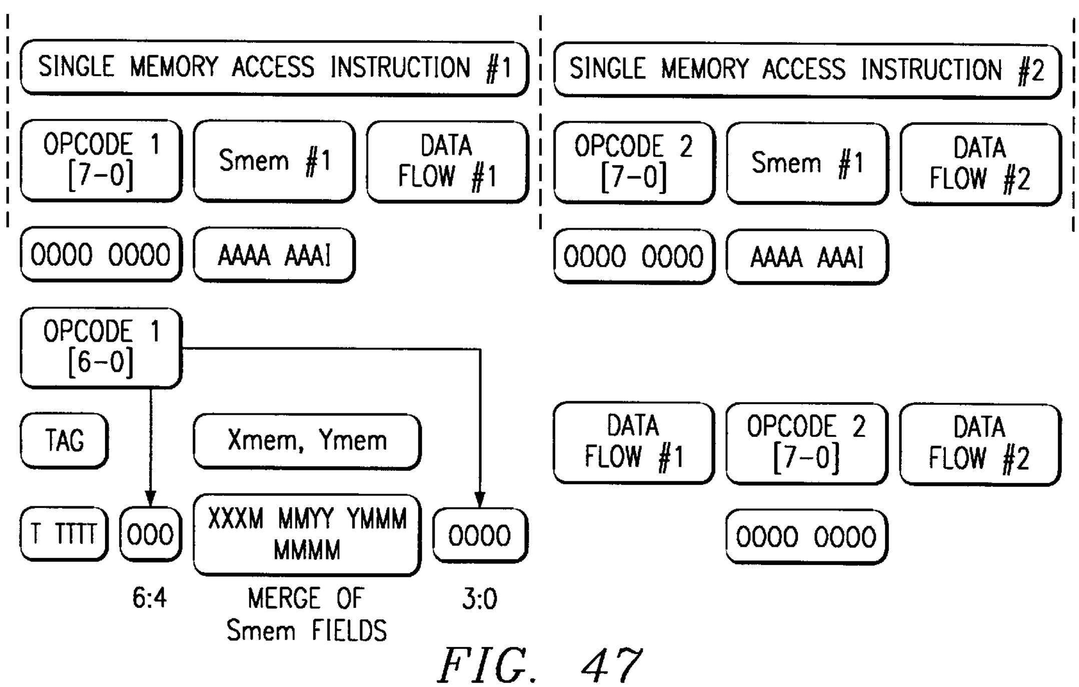
FIG. 47 illustrates the "soft dual" class is qualified by a 5 bit tag and individual instructions fields are reorganized.

To optimize address computation speed, the instruction fields which control the address unit have the same position as for a dual instruction and are independent of the formats of the instruction pair. The "soft dual" class is qualified by a 5-bit tag and individual instruction fields are reorganized as illustrated in FIG. 47. There is no code size penalty. By Table 44 defines the 'soft dual instruction' DAGEN variables resulting from the two standalone DAGEN input variables. They can be split into two groups:

1 The resulting DAGEN variable matches a generic standalone DAGEN variable.

2. The resulting DAGEN variable doesn't match a generic standalone DAGEN variable.

TABLE 44

Soft dual DAGEN class definition from standalone DAGEN tags

| DAGEN #1 | DAGEN #2 | Soft dual DAGEN | Existing DAGEN Class | Feature PHASE #1/#2 | swap from asm |
|---|---|---|---|---|---|
| Smem_R | Smem_W | Dual_RW | yes | 1 | — |
| Smem_W | Smem_R | Dual_RW | yes | 1 | ← |
| Smem_R | Smem_R | Dual_RR | yes | 1 | — |
| Smem_W | Smem_W | Dual_WW | yes | 1 | — |
| Smem_R | Smem_WF | Dual_RWF | yes | 1 | — |
| Smem_WF | Smem_R | Dual_RWF | yes | 1 | ← |
| Smem_W | Smem_WF | Dual_WW | yes | 1 | — |
| Smem_WF | Smem_W | Dual_WW | yes | 1 | ← |
| Lmem_R | Lmem_W | Dual_RW | yes | 1 | — |
| Lmem_W | Lmem_R | Dual_RW | yes | 1 | ← |
| Lmem_R | Lmem_WF | Dual_RWF | yes | 2 | — |
| Lmem_WF | Lmem_R | Dual_RWF | yes | 2 | ← |
| Smem_R | P_MOD | I_Dual_RPM | no | 2 | — |
| P_MOD | Smem_R | I_Dual_RPM | no | 2 | ← |
| Smem_W | P_MOD | I_Dual_WPM | no | 2 | — |
| P_MOD | Smem_W | I_Dual_WPM | no | 2 | ← |
| Lmem_R | P_MOD | I_Dual_LRPM | no | 2 | — |
| P_MOD | Lmem_R | I_Dual_LRPM | no | 2 | ← |
| Lmem_W | P_MOD | I_Dual_LWPM | no | 2 | — |
| P_MOD | Lmem_W | I_Dual_LWPM | no | 2 | ← |
| Smem_RW | P_MOD | I_Dual_RPM_W2c | no | 2 | — |
| P_MOD | Smem_RW | I_Dual_RPM_W2c | no | 2 | ← |
| Smem_WF | P_MOD | I_Dual_WFPM | no | 2 | — |
| P_MOD | Smem_WF | I_Dual_WFPM | no | 2 | ← |
| Smem_RW | Smem_R | I_Dual_RR_W2c | no | 2 | — |
| Smem_R | Smem_RW | I_Dual_RR_W2c | no | 2 | ← |
| Smem_RW | Smem_W | I_Dual_RW_W2c | no | 2 | — |
| Smem_W | Smem_RW | I_Dual_RW_W2c | no | 2 | ← |
| Smem_RW | Smem_WF | I_Dual_RWF_W2c | no | 2 | — |
| Smem_WF | Smem_RW | I_Dual_RWF_W2c | no | 2 | ← |
| Smem_R | Lmem_W | I_Dual_RLW | no | 2 | — |
| Lmem_W | Smem_R | I_Dual_RLW | no | 2 | ← |
| Smem_R | Lmem_WF | I_Dual_RLWF | no | 2 | — |
| Lmem_WF | Smem_R | I_Dual_RLWF | no | 2 | ← |
| Lmem_R | Smem_W | I_Dual_LRW | no | 2 | — |
| Smem_W | Lmem_R | I_Dual_LRW | no | 2 | ← |
| Lmem_R | Smem_WF | I_Dual_LRWF | no | 2 | — |
| Smem_WF | Lmem_R | I_Dual_LRWF | no | 2 | ← |

Note: The last column flags the DAGEN combinations where the assembler has to swap the instructions along the soft dual encoding in order to minimize the number of cases and to simplify decoding. The mar(Smem) instruction is classified as Smem_R.

5.7.3 Parallel Instructions Arbitration (Global Scheme)

Each control field (operand selection/operator configuration/update ) has an associated flag that qualifies the control field as valid or default. The parallelism of two instructions is based on the arbitration

5.7.3 Parallel Instructions Arbitration (Global Scheme)

Each control field (operand selection/operator configuration/update ) has an associated flag that qualifies the control field as valid or default. The parallelism of two instructions is based on the arbitration of these two flags and the arbitration outcome from the other fields. This scheme insures that regardless of the checks performed by the assembler, the hardware will execute the two instructions in parallel only if none of the valid control fields are in conflict. If one or more control fields conflict, instruction #1 is discarded and only instruction #2 is executed, as indicated in Table 45. The daisy chained EXEC flags arbitration takes place in the READ pipeline phase.

TABLE 45

Conflict resolution

| Conflict Input | Flag #1 Default → 0 Valid → 1 | Flag #2 Default → 0 Valid → 1 | Conflict Output | Instruction executed |
|---|---|---|---|---|
| 0 | 0 | 0 | 0 | #2 |
| 0 | 0 | 1 | 0 | #2 |
| 0 | 1 | 0 | 0 | #1 |
| 0 | 1 | 1 | 1 | #2 |
| 1 | x | x | 1 | #2 |

Figure 48:
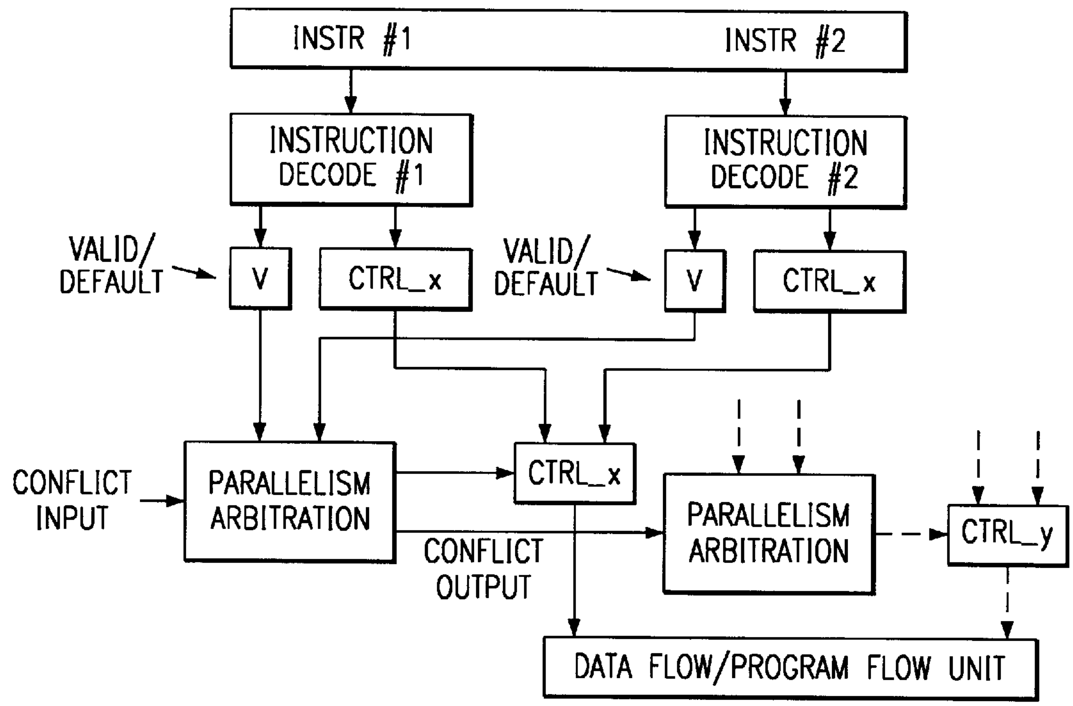
FIG. 48 is a block diagram which illustrates global conflict resolution.

FIG. 48 is a block diagram illustrating global conflict resolution.

5.7.4 Parallel Instructions Arbitration (DAGEN Class)

Figure 49:
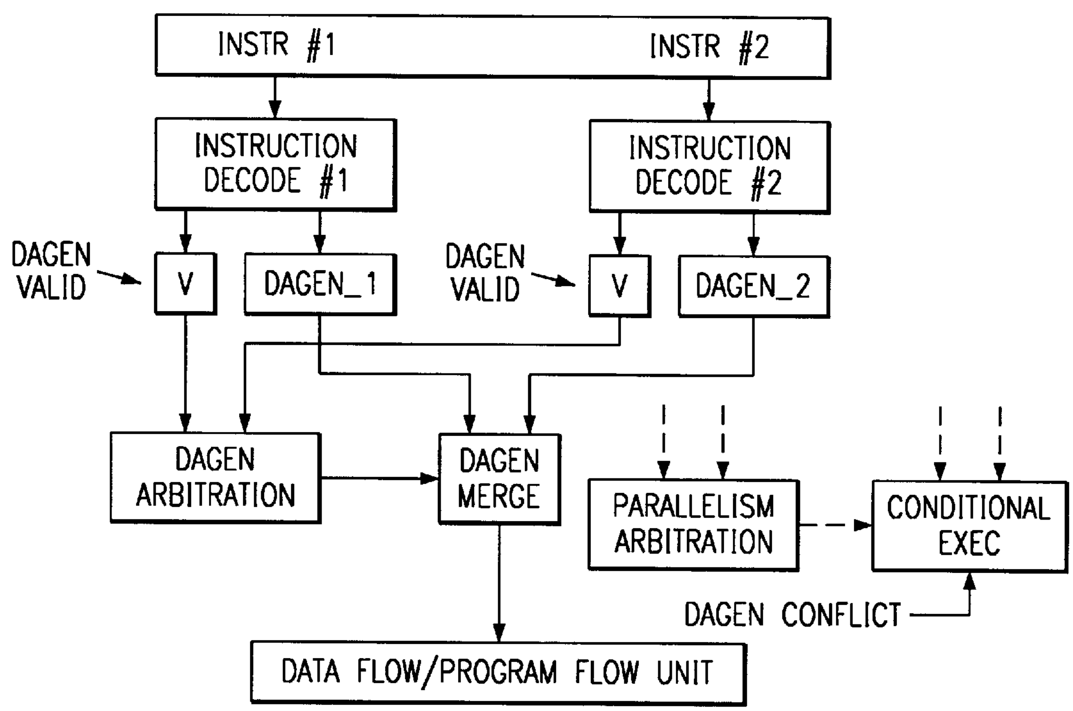
FIG. 49 illustrates the Instruction Decode hardware tracks the DAGEN class of both instructions and determines if they fall on the group supported by the soft dual scheme.

The Instruction Decode hardware tracks the DAGEN class of both instructions and determines if they are in the group supported by the soft dual scheme, as shown in FIG. 49. If $(DAGEN_1) and $(DAGEN_2) are in the subset supported by the soft dual scheme then $(DAGEN_12) is computed in order to define the DAGEN class of the soft dual instruction and the two original instructions are executed in parallel. If \$(DAGEN_1) or \$(DAGEN_2) are not in the subset supported by the soft dual scheme then \$(DAGEN_12)←NO_DAG. No post-modification is performed on the X and Y pointers. The instructions pair is discarded and the conditional execution control hardware can be reused by forcing a false condition.

5.7.5 Soft Dual—Memory Buses Interfacing

Figure 50:
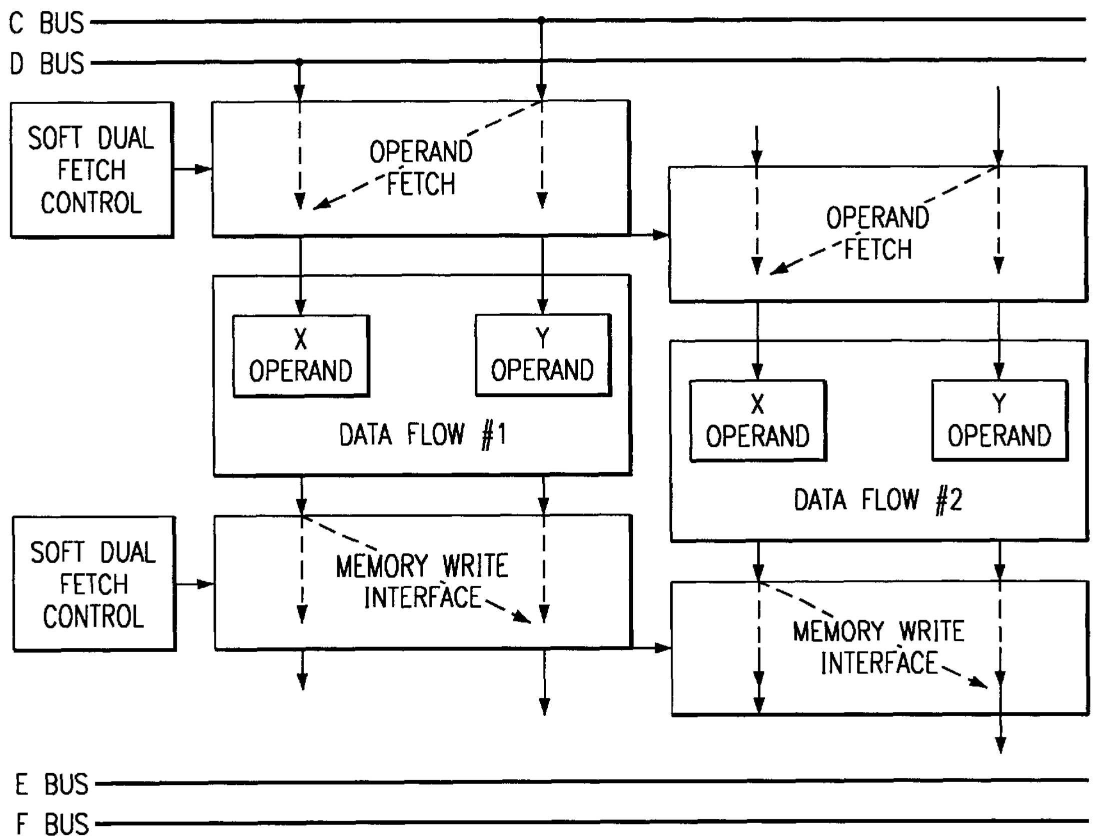
FIG. 50 is a block diagram illustrating data flow which occurs during soft dual memory accesses.

FIG. 50 is a block diagram illustrating the data flow that occurs during soft dual memory accesses.

Table 46 summarizes the operand fetch control required to handle 'soft dual instructions'. The global data flow is the same as in standalone execution; only the operand shadow register load path in the READ phase is affected by the soft dual scheme.

TABLE 47

Memory write interface control

| DAGEN #1 | DAGEN #2 | Soft dual DAGEN | Instruction #1 standalone write bus | Instruction #2 standalone write bus | Instruction #1 soft dual write bus | Instruction #2 soft dual write bus |
|---|---|---|---|---|---|---|
| Smem_R | Smem_W | Dual_RW | — | EB | — | EB |
| Smem_W | Smem_W | Dual_WW | EB | EB | EB | FB |
| Smem_W | Smem_WF | Dual_WW | EB | FB | EB | FB |
| Smem_R | Smem_WF | Dual_RWF | — | FB | — | FB |
| Lmem_R | Lmem_W | Dual_RW | CB, DB | EB, FB | CB, DB | EB, FB |
| Lmem_R | Lmem_WF | Dual_RWF | CB, DB | EB, FB | CB, DB | EB, FB |

5.8 Coefficient Data Memory Addressing (Coeff)

Coefficient data memory addressing allows memory read accesses through the coefficient data pointer register CDP. This mode has the same properties as indirect single data memory addressing mode.

Indirect memory addressing accesses through the CDP pointer register are performed within the main data page selected by MDP register.

Indirect memory addressing accesses through the CDP address registers can address circular memory buffers.

Instructions using the coefficient memory addressing mode to access a memory operand are mainly perform operations with three memory operands per cycle (see Dual MACs instructions, firs( ) instruction). Two of these operands, Xmem and Ymem, can be accessed with the indirect dual data memory addressing modes. The third operand is accessed with the coefficient data memory addressing mode. This mode is designated in the instruction with the 'coeff' keyword.

The following instruction example illustrates this addressing scheme. In one cycle, two multiplications can be performed in parallel in the D-unit dual MAC operator. One memory operand is common to both multipliers (coeff), while indirect dual data memory addressing accesses the two other data (Xmem and Ymem).

ACx=sat40(rnd(uns(Xmem)*uns(coeff))), sat40(rnd(uns (Ymem)*uns(coeff)))

Coeff operands are accessed through the BB bus. To access three read memory operands (as in the above example) in one cycle, the coeff operand should be located in a different memory bank than the Xmem and Ymem operands.

Table 48 summarizes the modifier options supported by the processor architecture for coefficient memory accesses in enhanced mode (FAMILY status bit set to 0). The ARMS status bit does not configure the set of modifiers available for the coefficient addressing mode.

TABLE 48 coeff coefficient data memory addressing modifiers.

| Assembly Syntax | Generated Address | Pointer Register Modification | Access Type |
|---|---|---|---|
| coef(*CDP) | MDP • ( [BOFC +] CDP) | No modification | |
| coef(*CDP+) | MDP • ( [BOFC +] CDP) | CDP = CDP + 1 | Coeff |
| | | CDP = CDP + 2 | Dbl(coeff) |
| coef(*CDP−) | MDP • ( [BOFC +] CDP) | CDP = CDP − 1 | Coeff |
| | | CDP = CDP − 2 | Dbl(coeff) |
| coef(*(CDP+DR0)) | MDP • ( [BOFC +] CDP) | CDP = CDP + DR0 | |

Note: This symbol indicates a concatenation operation between a 7-bit field and a 16-bit field: •

Note: Buffer offset BOFC is only added when circular addressing mode is activated.

When FAMILY=1, the modifier *(CDP+DR0) is not available. When the processor operates in compatible mode (FAMILY=1), the indirect dual data memory addressing modes summarized in Table 49 are valid except for the following indirect addressing mode: *coef(CDP+DR0). Instead, the following modifier is available (see Table 49): *coef(CDP+AR0).

TABLE 49

| Coeff coefficient memory data addressing modifiers when FAMILY = 1 (to be added to those listed in Table 48) | | | |
|---|---|---|---|
| Assembly Syntax | Generated Address | Address Register Modification | Access Type |
| coef(*(CDP+AR0)) | MDP • ( [BOFC +] CDP) | CDP = CDP + AR0 | |

Note: This symbol indicates a concatenation operation between a 7-bit field and a 16-bit field: •

Note: Buffer offset BOFC is only added when circular addressing mode is activated.

5.9 Register Bit Addressing: Baddr

The processor CPU core takes advantage of the Data Address Generation Unit (DAGEN) features to provide an efficient means to address a bit within a CPU register. In this case, no memory access is performed. Direct and indirect register bit addressing mode can be used in instructions performing bit manipulation on the processor core CPU address, data and accumulator registers. Register bit addressing will be designated in instructions with the 'Baddr' keyword. Five bit manipulation instructions, shown in the examples below, use this addressing mode. The last instruction example causes a single register bit address to be generated by the DAGEN unit while two consecutive bits are tested within the 'src' register (for more details see each instruction description):

TCx=bit(src, Baddr)
cbit(src, Baddr)
bit(src, Baddr)=#0
bit(src, Baddr)=#1
bit(src, pair(Baddr))

5.9.1 Direct Bit Addressing Mode (dba)

Direct bit addressing mode allows direct bit access to the processor CPU registers. The bit address is specified within:

[0 . . . 23] range when addressing a bit within the ARx address registers or the DRx data registers,

[0 . . . 39] range when addressing a bit within the ACx accumulator registers.

[0 . . . 22] range when addressing two consecutive bits within tne ARx address registers or the DRx data registers,

[0 . . . 38] range when addressing two consecutive bits within the ACx accumulator registers.

Out of range values can cause unpredictable results. The assembly syntax of the direct register bit addressing mode is shown in Table 50.

TABLE 50

| Baddr, pair(Baddr) direct bit addressing (dba) | | |
|---|---|---|
| Assembly syntax | Generated Bit address | Comments |
| @dba | dba | Baddr register bit addressing mode |

5.9.2 Indirect Register Bit Addressing Mode

Indirect register bit addressing mode computes a bit position within a CPU register from the contents of the eight address registers AR[0–7] or from the contents of the coefficient data pointer CDP. Whenever such CPU register bit access is performed, the selected pointer register can be modified before of after the bit position has been generated. Pre-modifiers will modify the content of the pointer register before generating the register bit position. Post-modifiers will modify the content of the pointer register after generating the register bit position.

The sets of the modifiers applied to the pointer register depends on ARMS status bit. When ARMS=0, the 'DSP mode' modifiers are used for indirect register bit accesses. When ARMS=1, the 'Control mode' modifiers are used.

The modifiers applied to the selected pointer register can be controlled by a circular management mechanism in order to implement circular bit arrays in CPU registers. The circular management mechanism is controlled by following resources:

The status register ST2, where each pointer register can be configured in circular or in linear mode.

The three 16-bit buffer size registers BK03, BK47, and BKC where the size of the circular bit arrays to implement can be determined.

The five 16-bit buffer offset registers BOF01, BOF23, BOF45, BOF67 and BOFC which allow implementation of circular bit arrays starting at any bit position in the CPU registers.

5.9.2.1 Indirect Register Bit Addressing in DSP Mode

Table 51 summarizes the modifier options supported by the processor architecture for indirect register bit accesses in DSP mode and in enhanced mode (FAMILY status bit set to 0). Instructions making a CPU register bit access with the *ARn(#K16), *+ARn(#K16). *CDP(#K16), or *+CDP (#K16) indirect register bit addressing modes have a two byte extension and can not be paralleled. When the processor operates in DSP mode and in compatible mode (FAMILY=1), the indirect register bit addressing modes summarized in Table 51 are valid except the following five indirect addressing modes: *ARn(DR0), *(ARn+DR0), *(ARn−DR0) *(ARn+DR0B) and *(ARn−DR0B). Instead, the following five modifiers are available (see Table 52): *ARn(AR0), *(ARn+AR0), *(ARn−AR0) *(ARn+AR0B) and *(ARn−AR0B).

TABLE 51

Baddr, pair(Baddr) indirect register bit addressing modifiers when ARMS = 0. When FAMILY = 1, the modifiers *(ARn+DR0), *(ARn−DR0), *ARn(DR0), *(ARn+DR0B) and *(ARn−DR0B) are not available.

| Assembly Syntax | Generated Address | Pointer Register Modification | Access Type |
|---|---|---|---|
| *ARn | [BOFyy +] ARn | No modification | |
| *ARn+ | [BOFyy +] ARn | ARn = ARn + 1 | Baddr |
| | | ARn = ARn + 2 | Pair(Baddr) |
| *ARn− | [BOFyy +] ARn | ARn = ARn − 1 | Baddr |
| | | ARn = ARn − 2 | Pair(Baddr) |
| *(ARn+DR0) | [BOFyy +] ARn | ARn = ARn + DR0 | |
| *(ARn−DR0) | [BOFyy +] ARn | ARn = ARn − DR0 | |
| *ARn(DR0) | [BOFyy +] ARn + DR0 | No modification | |
| *(ARn+DR1) | [BOFyy +] ARn | ARn = ARn + DR1 | |
| *(ARn−DR1) | [BOFyy +] ARn | ARn = ARn − DR1 | |
| *ARn(DR1) | [BOFyy +] ARn + DR1 | No modification | |
| *+ARn | [BOFyy +] ARn + 1 | ARn = ARn + 1 | Baddr |
| | [BOFyy +] ARn + 2 | ARn = ARn + 2 | Pair(Baddr) |
| *−ARn | [BOFyy +] ARn − 1 | ARn = ARn − 1 | Baddr |
| | [BOFyy +] ARn − 2 | ARn = ARn − 2 | Pair(Baddr) |
| *(ARn+DR0B) | ARn | ARn = ARn + DR0B DR0 index post increment with reverse carry propagation. | Circular modification is not allowed for this modifier. |
| *(ARn−DR0B) | ARn | ARn = ARn − DR0B DR0 index post decrement with reverse carry propagation. | Circular modification is not allowed for this modifier. |
| *ARn(#K16) | [BOFyy +] ARn + K16 | No modification | |
| *+ARn(#K16) | [BOFyy +] ARn + K16 | ARn = ARn + #K16 | |
| *CDP | [BOFC +] CDP | No modification | |
| *CDP+ | [BOFC +] CDP | CDP = CDP + 1 | |
| *CDP− | [BOFC +] CDP | CDP = CDP − 1 | |
| *CDP(#K16) | [BOFC +] CDP + K16 | No modification | |
| *+CDP(#K16) | [BOFC +] CDP + K16 | CDP = CDP + #K16 | |

Note: Buffer offset BOFyy is only added when circular addressing mode is activated.

TABLE 52

Baddr, pair(Baddr) indirect register bit addressing modifiers only available when ARMS = 0 and FAMILY = 1 (to be added to those listed in Table 51)

| Assembly Syntax | Generated Address | Address Register Modification | Access Type |
|---|---|---|---|
| *(ARn+AR0) | [BOFyy +] ARn | ARn = ARn + AR0 | |
| *(ARn−AR0) | [BOFyy +] ARn | ARn = ARn − AR0 | |
| *ARn(AR0) | [BOFyy +] ARn + AR0 | No modification | |
| *(ARn+AR0B) | ARn | ARn = ARn + AR0B AR0 index post increment with reverse carry propagation. | Circular modification is not allowed for this modifier. |
| *(ARn−AR0B) | ARn | ARn = ARn − AR0B AR0 index post decrement with reverse carry propagation. | Circular modification is not allowed for this modifier. |

Note: Buffer offset BOFyy is only added when circular addressing mode is activated.

5.9.2.2 Indirect Register Bit Addressing in Control Mode

Table 53 summarizes the modifier options supported by the processor architecture for indirect register bit accesses in control mode and in enhanced mode (FAMILY status bit set to 0). Identically to DSP mode, instructions making a bit manipulation with the *ARn(#K16), *+ARn(#K16), *CDP (#K16), or *+CDP(#K16) indirect register bit addressing modes have a two byte extension and can not be paralleled.

Instructions using the *ARn(short(#K3)) indirect register bit addressing mode do not follow this rule since these instructions do not have any byte extension for short constant encoding. The *ARn(short(#K3)) addressing mode permits access to bits included in an 8-bit ARn frame.

When the processor operates in Control mode and in compatible mode (FAMILY=1), the indirect register bit addressing modes summarized in Table 53 are valid except the following three indirect addressing modes: *ARn(DR0), *(ARn+DR0) and *(ARn−DR0). Instead, the following three modifiers are available (see Table 54): *ARn(AR0), (ARn+AR0) and *(ARn−AR0).

TABLE 53

Baddr, pair(Baddr) indirect register bit addressing modifiers when ARMS = 1. When FAMILY = 1, the modifiers *(ARn + DR0), *(ARn − DR0) and *ARn(DR0) are not available.

| Assembly Syntax | Generated Address | Pointer Register Modification | Access Type |
|---|---|---|---|
| *ARn | [BOFyy+]ARn | No modification | |
| *ARn+ | [BOFyy+]ARn | ARn = ARn + 1 | Baddr |
| | | ARn = ARn + 2 | Pair(Baddr) |
| *ARn− | [BOFyy+]ARn | ARn = ARn − 1 | Baddr |
| | | ARn = ARn − 2 | Pair(Baddr) |
| *(ARn + DR0) | [BOFyy+]ARn | ARn = ARn + DR0 | |
| *(ARn − DR0) | [BOFyy+]ARn | ARn = ARn − DR0 | |
| *ARn(DR0) | [BOFyy+]ARn + DR0 | No modification | |
| *ARn(short (#K3)) | [BOFyy+]ARn + K3 | No modification | |
| *ARn(#K16) | [BOFyy+]ARn + K16 | No modification | |
| *+ARn(#K16) | [BOFyy+]ARn + K16 | ARn = ARn + #K16 | |
| *CDP | [BOFC+]CDP | No modification | |
| *CDP+ | [BOFC+]CDP | CDP = CDP + 1 | Baddr |
| | | CDP = CDP + 2 | Pair(Baddr) |
| *CDP− | [BOFC+]CDP | CDP = CDP − 1 | Baddr |
| | | CDP = CDP − 2 | Pair(Baddr) |
| *CDP(#K16) | [BOFC+]CDP + K16 | No modification | |
| *+CDP(#K16) | [BOFC+]CDP + K16 | CDP = CDP + #K16 | |

Note: Buffer offset BOFyy is only added when circular addressing moce is activated.

TABLE 54

Baddr, pair(Baddr) indirect register bit addressing modifiers (to be added to those listed in Table 53)

| Assembly Syntax | Generated Address | Address Register Modification | Access Type |
|---|---|---|---|
| *(ARn + AR0) | [BOFyy+]ARn | ARn = ARn + AR0 | |
| *(ARn − AR0) | [BOFyy+]ARn | ARn = ARn − AR0 | |
| *ARn(AR0) | [BOFyy+]ARn + AR0 | No modification | |

Note: Buffer offset BOFyy is only added when circular addressing moce is activated.

5.9.3 Remark on 'Goto on Address Register N Only Available when ARMS=1 and FAMILY=1 to Equal Zero' Instruction the processor provides following control flow operation instructions which perform a 'goto on address register not equal zero':

if(ARn[mod]!=#0) goto L16 if(ARn[mod]!=#0) dgoto L16

These instructions use the indirect bit addressing modifiers shown in the previous tables to:

- pre-modify the contents of the ARn address register before testing it and branching to the target address.
- post-modify the contents of the ARn address register after testing it and branching to the target address.

Identically to the register bit addressing modes described earlier, the DAGEN unit computes and tests the value of the ARn register. These instructions may be used to implement counters in address registers.

5.10 Circular Buffer Management

Circular addressing can be used for:

- Indirect single data memory access ( Smem, dbl(Lmem))
- Indirect register bit access (Baddr)
- Indirect dual data memory access (Xmem, Ymem) including software indirect dual data memory accesses
- Coefficient data memory addressing (coeff)

The ARx address registers and the CDP address registers can be used as pointers within a circular buffer. In the processor architecture, circular memory buffer start addresses are not bounded by any alignment constraints.

Basic Circular Buffer Algorithm

```
if (step >= 0)
    if ((ARx + step − start − size) > 0)      /* out of buffer */
        ARx = ARx + step − size;
    else
        ARx = ARx + step;                     /* in buffer */
if (step < 0)
    if ((ARx + step − start) > 0)             /* in buffer */
        ARx = ARx + step;
    else
        ARx = ARx + step + size;              /* out of buffer */
```

The circular buffer management hardware assumes that the following programming rules are followed:

- Stepping defined by the value stored in the DR0 and DR1 registers is lower than or equal to the buffer size
- The address stored into ARx points within the virtual circular buffer when the buffer is accessed for the first time.
- When BKx is zero, the circular modifier results in no circular address modification.

Figure 51:
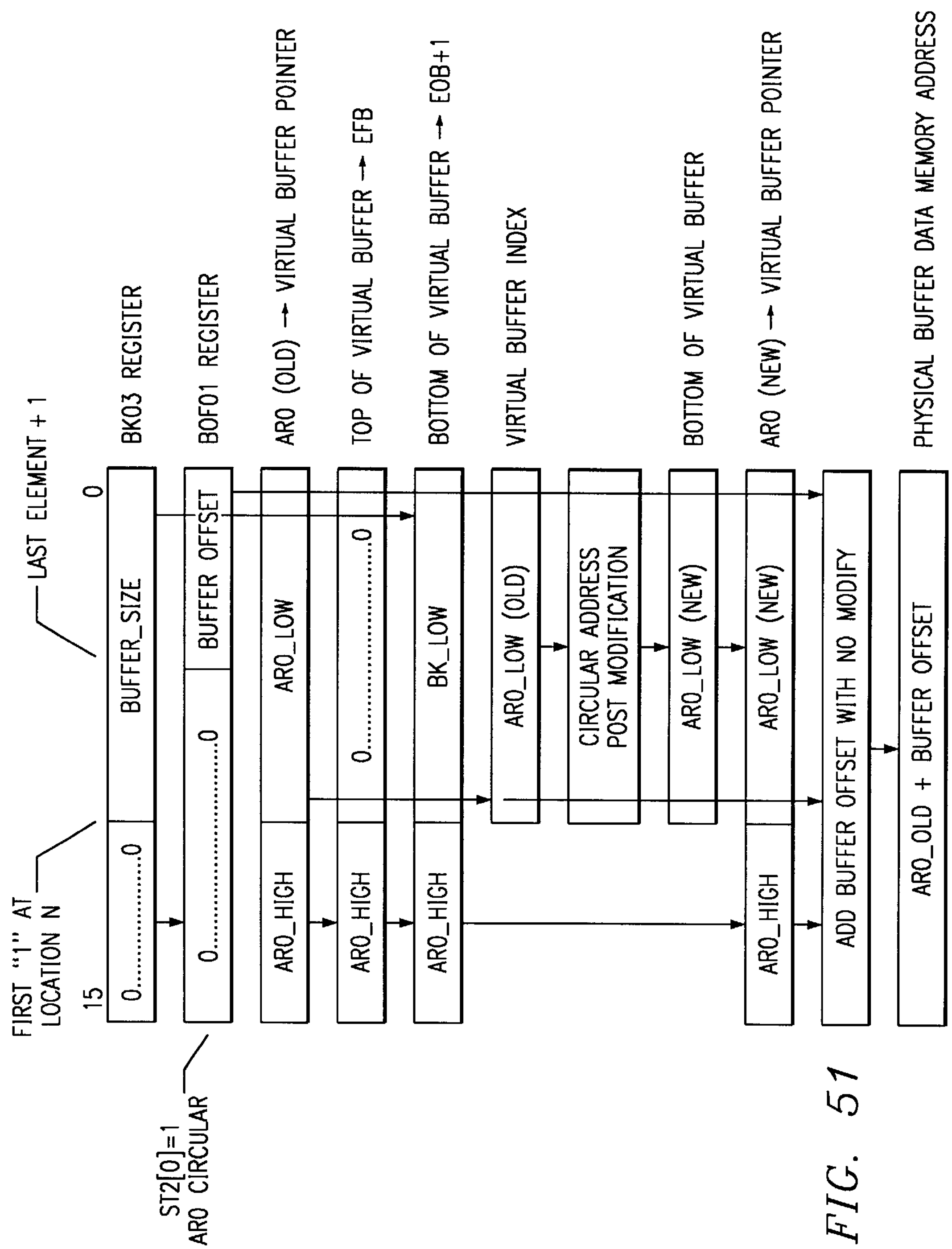
FIG. 51 illustrates the circular buffer address generation flow involving the BK, BOF and ARx registers, the bottom and top address of the circular buffer, the circular buffer index, the virtual buffer address and the physical buffer address.

FIG. 51 illustrates the circular buffer address generation flow involving the BK, BOF and ARx registers, the bottom and top address of the circular buffer, the circular buffer index, the virtual buffer address and the physical buffer address.

5.10.1 Architecture Detail

Figure 52:
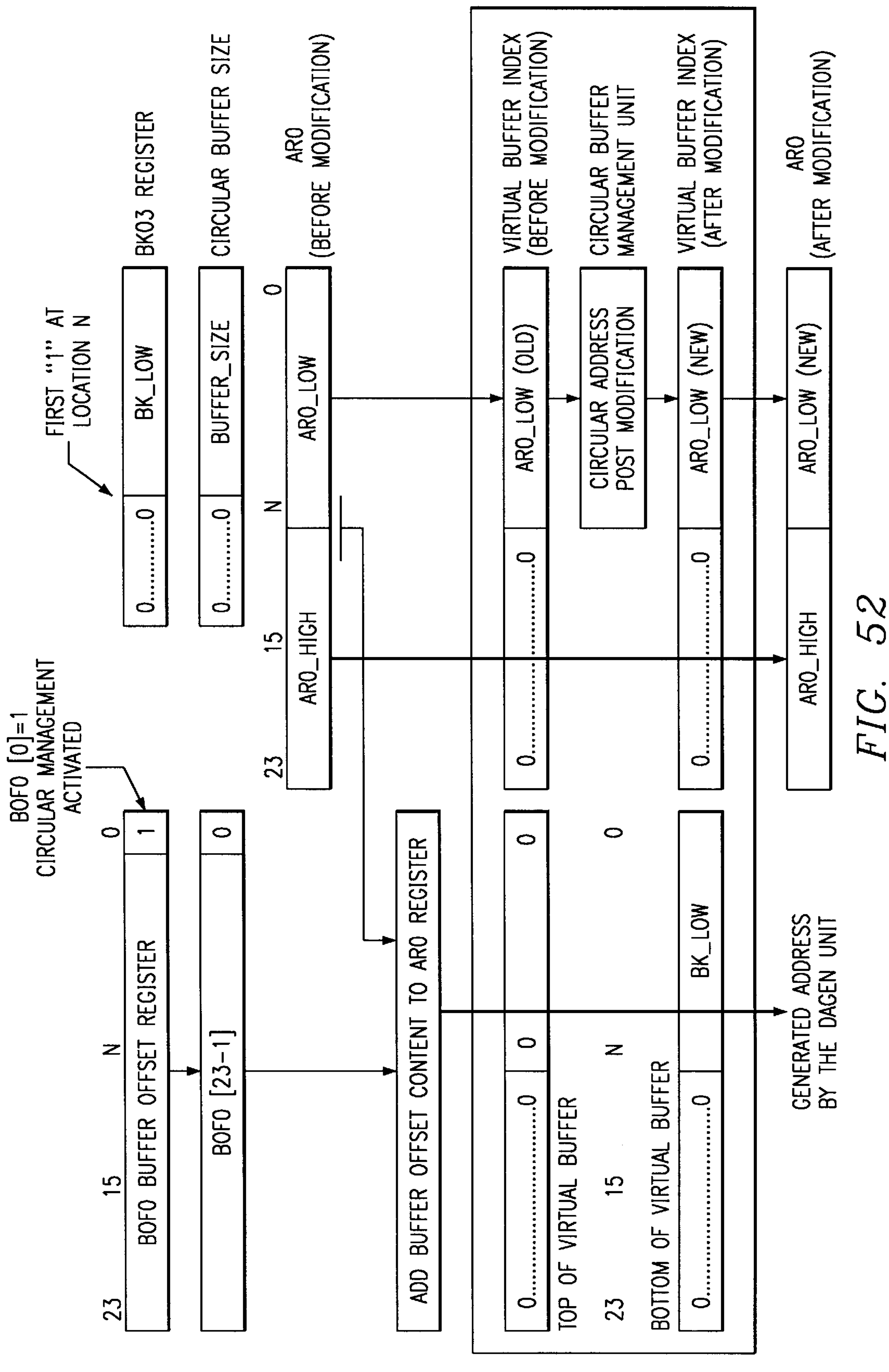
FIG. 52 illustrates the circular buffer management.

FIG. 52 illustrates circular buffer management. The AR0 and BOF01 registers are being used to address a circular buffer. BK0 is initialized to the size of the buffer and ST2 bit 0 is set to 1 in indicate circular addressing modification of the AR0 register.

Note that the address generated by the DAGEN unit uses a main data page pointer register to build a 23-bit word address only for data memory addressing. Concatenation with main data page pointers does not occur in register bit addressing.

Each of the eight address registers ARx and the coefficient data pointer CDP can be independently configured to be linearly of circularly modified through the indirect addressing performed with these pointer registers. This configuration is indicated within ST2 status bit register (see Table 54).

The circular buffer size is defined by the buffer size registers. The processor architecture supports three 16-bit buffer size registers (BK03, BK47 and BKC). Table 54 defines which buffer size register is used when circular addressing is performed.

The circular buffer start address is defined by the buffer offset register combined with the corresponding ARx address register or CDP coefficient data pointer register. The processor architecture supports five 16-bit buffer offset registers (BOF01, BOF23, BOF45, BOF67 and BOFC). Table 54 defines which buffer offset register is used when circular addressing is performed.

TABLE 54

ST2, BOFxx, BKxx, registers configuring circular modification of ARx and CDP registers.

| Pointer Register | Circular Modification Configuration Bit | Main Data Page Pointer (for data memory addressing only) | Buffer Offset Register | Buffer Size Register |
|---|---|---|---|---|
| AR0 | ST2[0] | MDP05 | BOF01[15:0] | |
| AR1 | ST2[1] | MDP05 | BOF01[15:0] | |
| | | | | BK03 |
| AR2 | ST2[2] | MDP05 | BOF23[15:0] | |
| AR3 | ST2[3] | MDP05 | BOF23[15:0] | |
| AR4 | ST2[4] | MDP05 | BOF45[15:0] | |
| AR5 | ST2[5] | MDP05 | BOF45[15:0] | |
| | | | | BK47 |
| AR6 | ST2[6] | MDP67 | BOF67[15:0] | |
| AR7 | ST2[7] | MDP67 | BOF67[15:0] | |
| CDP | ST2[8] | MDP | BOFC[15:0] | BKC |

5.10.2 Circular Addressing Algorithm

A virtual buffer is defined from the buffer size BKxx registers and the circular buffer management unit maintains an index within the virtual buffer address boundaries. The top of the virtual buffer is address 0H and the bottom address is determined by the BKxx contents. The location of the first '1' in the BKxx register (say bit N) is used to determine an index within the virtual buffer. This index is the ARx or CDP register N lowest bit zero extended to 16-bits. The circular buffer management unit performs arithmetic operations on this index. An addition or a subtraction of the BKxx register contents is performed according to the value of the index in relation to the top and bottom of the virtual buffer. The ARx (or CDP) new value is then built from the new contents of the index and the high (23-N) bits of the old contents of the ARx or CDP registers.

According to the selected indirect addressing mode, the DAGEN generates a 23-bit word address as follows:

For addressing modes requiring pre-modification of pointer registers, a 16-bit addition of the BOFxx register and the new contents of the ARn or the CDP register is performed followed by a concatenation with the corresponding 7-bit main data page pointer register MDPxx. (When register bit addressing is performed, this concatenation does not occur.)

For addressing modes requiring post-modification of pointer registers, a 16-bit addition of the BOFxx register and the old content of the ARn or the CDP register is performed followed by a concatenation with the corresponding 7-bit main data page pointer register MDPxx. (When register bit addressing is performed, this concatenation does not occur.)

As a summary, here is the circular addressing algorithm performed by the circular buffer management unit. It takes into account that a pre-modification of pointer register may modify ARx or CDP register by a step value (ex: *+ARx (#K16) addressing mode):

```
if (step >=0)
it ( (index + step − BKxx) >= 0)          /*out of buffer*/
new index = index + step − BKxx;
else
```

-continued

```
new index = index + step;                 /*in buffer*/
if (step < 0)
if ((index + step) >= 0)                  /*in buffer*/
new index = index + step;
else
new index = index + step + BKxx;          /*out of buffer*/
```

5.10.3 Circular Buffer Implementation

The processor architecture implements circular buffers as follows:

Initialize the appropriate bit of the ST2 pointer configuration register to indicate circular activity for the selected pointer Initialize the appropriate MDPxx main data page pointer to select the 64 K page where the circular buffer is implemented Initialize the appropriate BOFxx buffer offset register to the start address of the circular buffer Initialize the appropriate ARx or CDP register as the index within the circular buffer Initialize the MDPxx, BOFxx and ARx such that before any pointer modification occurs on the selected pointer register, the following 23-bit address points within the circular buffer: MDPxx (BOFx+ARx)

Initialize the DR0 and DR1 step registers so that they are less than or equal to the buffer size in the BKxx register.

Example of code sequence:

Bit(ST2, #0)=#1 ; AR0 is configured to be modified circularly

MDP05=#01H ; circular buffer is implemented in main data page 1

BOF01=#0A02H ; circular buffer start address is 010A02h

BK03=#6 ; circular buffer size is 6 words.

AR0=#2 ; index is equal to 2.

AC0=*AR0+ ; AC0 loads content of 010A04H and AR0=4

AC0=*AR0+ ; AC0 loads content of 010A06H and AR0=0

AC0=*AR0+ ; AC0 loads content of 010A02H and AR0=2

5.10.4 Compatibility

In compatible mode(FAMILY status bit set to 1), the circular buffer size register BK03 is associated to AR[0–7] and BK47 register access is disabled. The processor architecture emulates FAMILY circular buffer management if the programming rules below are followed:

Initialize the appropriate bit of the ST2 pointer configuration register to indicate circular activity for the selected pointer Initialize the appropriate MDPxx main data page pointer to select the 64 K page where the circular buffer is implemented (translator output code assumes main data page 0)

Initialize the appropriate BOFxx buffer offset register to 0 (translator output code assumes that all BOFxx registers are set to 0)

Initialize the appropriate ARx or CDP register before using any circular addressing. The selected register should point within the circular buffer.

Initialize the AR0 and DR1 step registers so that they are less than or equal to the buffer size in the BKxx register.

Example of code sequence emulating a prior processor in the family's circular buffer:

Bit(ST2, #0)=#1 ; AR0 is configured to be modified circularly

MDP05=#0H ; circular buffer is implemented in main data page 0

BOF01=#0H

BK03=#6 ; circular buffer size is 6 words.

AR0=#00A02h ; circular buffer start address is 000A00h.

AC0=*AR0+ ; AC0 loads content of 010A02H and AR0=4

AC0=*AR0+ ; AC0 loads content of 010A04H and AR0=0

AC0=*AR0+ ; AC0 loads content of 010A00H and AR0=2

This circular buffer implementation requires the alignment of the circular buffer on a 2^3 word address boundary. To remove this constraint, initialize the BOF01 register with an offset to disalign the circular buffer implementation:

Bit(ST2, #0)=#1 ; AR0 is configured to be modified circularly

MDP05=#0H ; circular buffer is implemented in main data page 0

BOF01=#2H ; generate an offset of 2 words to the buffer start ; address

BK03=#6 ; circular buffer size is 6 bytes

AR0=#00A02h ; circular buffer start address is 000A02h.

AC0=*AR0+ ; AC0 loads content of 010A04H and AR0=4

AC0=*AR0+ ; AC0 loads content of 010A06H and AR0=0

AC0=*AR0+ ; AC0 loads content of 010A02H and AR0=2

5.11 Memory Mapped Register (MMR) Addressing Modes

5.11.1 Using Single Data Memory addressing modes

As described in an earlier section, the processor CPU registers are memory mapped at the beginning of each 64 K main data page between addresses 0h and 05Fh. This means that any single data memory addressing mode (Smem, dbl(Lmem)) can be used to access the processor MMR registers.

Direct data memory addressing (dma) can be used. In this case, the user must ensure that processor is in application mode (CPL status bit is set 0) and the local data page pointer register is reset to 0. Then, the user can use the MMR register symbol to define the dma field of single data memory operand instructions to access these registers.

Example

DP=#0 ; set DP to 0

.DP 0 ; assembler directive to indicate DP value 0 bit(ST1, #CPL)=#0 set CPL to 0

AC1=uns( @AC0__L) ; make a dma access to address AC0__L MMR register.

Indirect data memory addressing can be used. In this case, the user must ensure that the pointer register used is appropriately initialized to point to the selected MMR register. The addresses of these MMR registers are given in Table 13. The ARMS, the FAMILY status bits and the ST2, BOFxx, BKxx, MDPxx, and DRx registers should be initialized for an indirect single data memory access (Smem, dbl(Lmem)).

Example

AR1=#AC0__L ; initialize AR1 so that it points to AC0__L

AC1=uns(*AR1) ; make an indirect access to address of AC0__L MMR register.

Absolute data memory addressing can be used. In this case, the addresses of the MMR registers (see Table 13) can be used to access the selected MMR.

Example

AC1=*(#AC0__L) ; make an absolute access to address of AC0__L MMR register.

5.11.2 Using mmap( ) Qualifier Instruction

The first scheme has the disadvantage if forcing the user to reset the local data page pointer and the CPL to 0 before making the MMR access. The third scheme has the disadvantage of extending the single data memory operand instruction with a two byte extension word.

The generic MMR addressing mode uses the mmap( ) instruction qualifier in parallel with instructions making a direct memory address (dma). The mmap( ) qualifier configures the DAGEN unit such that for the execution of the paralleled instructions the following occurs:

CPL is masked to 0.

DP is masked to 0.

MDP is masked to 0.

Example

AC1=*@(AC0__L) || mmap( ) ; make an MMR access to AC0__L register.

These settings will enable access to the 60 first words of the 8 M words of data memory which correspond to the MMR registers.

5.11.3 MMR Addressing Restrictions

Some restrictions apply to all of the MMR addressing modes described in other sections. Instructions loading or storing bytes and instructions making a shift operation before storing to memory cannot access the MMRs (see Table 55).

TABLE 55

| processor instructions which do not allow MMR accesses | |
|---|---|
| dst = uns(high__byte(Smem)) | high__byte(Smem) = src |
| dst = uns(low__byte(Smem)) | low__byte(Smem) = src |
| ACx = high__byte(Smem) << SHIFTW | |
| ACx = low__byte(Smem) << SHIFTW | |
| Smem = HI(rnd(ACx)) | Smem = LO(ACx << DRx) |
| Smem = HI(saturate(rnd(ACx))) | Smem = LO(ACx << SHIFTW) |
| Smem = HI(rnd(ACx << DRx)) | Smem = HI(ACx << SHIFTW) |
| Smem = HI(saturate(rnd(ACx << DRx))) | Smem = HI(rnd(ACx << SHIFTW)) |
| | Smem = HI(saturate(rnd(ACx << SHIFTW))) |

5.12 I/O Memory Addressing Modes

As described in a previous section, peripheral registers or ASIC domain hardware are memory mapped in a 64 K word I/O memory space. The efficient DAGEN unit operators can be used to address this memory space. All instructions having a single data memory operand (Smem) can be used to access the RHEA bridge through the DAB and EAB buses.

The user can use an instruction qualifier in parallel with the single data memory operand instruction to re-direct the memory access from the data space to the I/O space. This re-direction can be done with the readport( ) or writeport( ) instruction qualifier.

When the readport( ) qualifier is used, all Smem read operands of instructions will be re-directed to the I/O space. The first example below illustrates a word data memory read access. The second example demonstrates a word I/O memory read access.

dst=Smem dst=Smem || readport( )

It is illegal to apply this qualifier to instructions with an Smem write operand.

When the writeport( ) qualifier is used, all Smem write operands of instructions will be re-directed to the I/O space. The first example below illustrates a word data memory write access. The second example demonstrates a word I/O memory write access.

Smem=dst

Smem=dst || writeport( )

It is illegal to apply this qualifier to instructions with an Smem read operand.

5.12.1 Direct I/O Memory Addressing Mode

As has been explained in an earlier section, single data memory addressing can be direct data memory addressing (dma). This data memory addressing mode, if modified by the paralleled readport( )/writeport( ) qualifier, becomes a direct I/O memory addressing mode. The 7-bit positive offset dma encoded within the addressing field of the instruction is concatenated to the 9-bit peripheral data page pointer PDP. The resulting 16-bit word address is used to address the I/O space. This addressing mode allows definition of 128-word peripheral data pages within the I/O memory space. The data page start addresses are aligned on a 128-bit word boundary. Also, 512-word peripheral data pages can be defined within the I/O memory space. It is important to note that byte operand read and write can be handled through this mechanism and the CPL status bit does not impact this addressing mode.

5.12.2 Indirect I/O Memory Addressing Mode

As has been explained in a previous section, single data memory addressing can be indirect data memory addressing. This data memory addressing mode, if modified by the paralleled readport( )/writeport( ) qualifier, becomes an indirect I/O memory addressing mode. The indirect data memory address generated by the address generation unit is used to address the I/O space. Note that since the peripheral space is limited to a 64 K word space, the DAGEN unit computes only a 16-bit word address; concatenation with MDPxx registers does not occur. In this case, the user must ensure that the pointer registers ARx and CDP used to for the addressing are appropriately initialized to point to the selected I/O memory location. For any of these accesses, the ARMS, the FAMILY status bits, and ST2, BOFxx, BKxx, and DRx registers should be initialized for indirect single data memory access. It is important to note that byte operand read and write can be handled through this mechanism and MDPxx register contents do not impact this addressing mode.

5.12.3 Absolute I/O Memory Addressing Mode

The I/O memory space can also be addressed with an absolute I/O addressing mode (see Table 56). Single data memory addressing Smem operand instructions may use this mode to address the entire 64 K words of I/O memory. The 16-bit word address is a constant passed by the instruction through a two byte extension added to the instruction. Instructions using these addressing mode to access I/O memory operand can not be paralleled.

TABLE 56

Absolute I/O memory addressing modes

| Assembly Syntax | Generated Address | Comments |
|---|---|---|
| *port(#k16) | k16 | Smem.access |

5.12.4 I/O Memory Addressing Restrictions

Some restrictions apply to all of the I/O memory addressing modes described in previous sections. Instructions making a shift operation before storing to memory cannot access the I/O memory space locations (see Table 57).

TABLE 57 processor instructions which do not allow I/O accesses

| | |
|---|---|
| Smem = HI(rnd(ACx)) | Smem = LO(ACx << DRx) |
| Smem = HI(saturate(rnd(ACx))) | Smem = LO(ACx << SHIFTW) |
| Smem = HI(rnd(ACx << DRx)) | Smem = HI(ACx << SHIFTW) |
| Smem = HI(saturate(rnd(ACx << DRx))) | Smem = HI(rnd(ACx << SHIFTW)) |
| | Smem = HI(saturate(md(ACx << SHIFTW))) |

5.13 Stack Addressing Modes

5.13.1 Data Stack Pointer Register (SP)

The 16-bit stack pointer register (SP) contains the address of the last element pushed onto the stack. The stack is manipulated by the interrupts, traps, calls, returns and the push/pop instructions family. A push instruction pre-decrements the stack pointer; a pop instruction post-increments the stack pointer. Stack management is mainly driven by the FAMILY compatibility requirement to keep an earlier family processor and the processor stack pointers in synchronization to properly support parameter passing through the stack. The stack architecture takes advantage of the 2×16-bit memory read/write buses and dual read/write access to speed up context saves. For example, a 32-bit accumulator or two independent registers are saved as a sequence of two 16-bit memory writes. The context save routine can mix single and double push( )/pop( ) instructions. The byte format is not supported by the push/pop instructions family.

To get the best performance during context save, the stack has to be mapped into dual access memory instances. Applications which require a large stack can implement it with two single access memory instances with a special mapping (odd/even bank) to get rid of the conflict between E and F requests.

Stack instructions are summarized in Table 58.

TABLE 58

| Stack referencing instructions | | | |
|---|---|---|---|
| Instructions | | EB Request @ SP − 1 | Stack Access |
| push(DAx) | — | DAx[15–0] | single write |
| push(ACx) | — | ACx[15–0] | single write |
| push(Smem) | — | Smem | single write |
| Instructions | FB Request @ SP − 2 | EB Request @ SP − 1 | Stack Access |
| dbl(push(ACx)) | ACx[31–16] | ACx[15–0] | dual write |
| push(dbl(Lmem) | Lmem[31–16] | Lmem[15–0] | dual write |
| push(src,Smem) | src | Smem | dual write |
| push(src1,src2) | src1 | src2 | dual write |
| Instructions | | DB Request @ SP | Stack Access |
| (1) DAx = pop( ) | — | DAx[15–0] | single read |
| ACx = pop( ) | — | ACx[15–0] | single read |
| Smem = pop( ) | — | Smem | single read |
| Instructions | CB Request @ SP | DB Request @ SP + 1 | Stack Access |
| ACx = dbl(pop( )) | ACx[31–16] | ACx[15–0] | dual read |
| dbl(Lmem) = pop( ) | Lmem[31–16] | Lmem[15–0] | dual read |
| dst.Smem = pop( ) | dst | Smem | dual read |
| dst1,dst2 = pop( ) | dst1 | dst2 | dual read |

5.13.2 System Stack Pointer (SSP)

5.13.3 Compatibility—Parameter Passing Through The Stack

Figure 53:
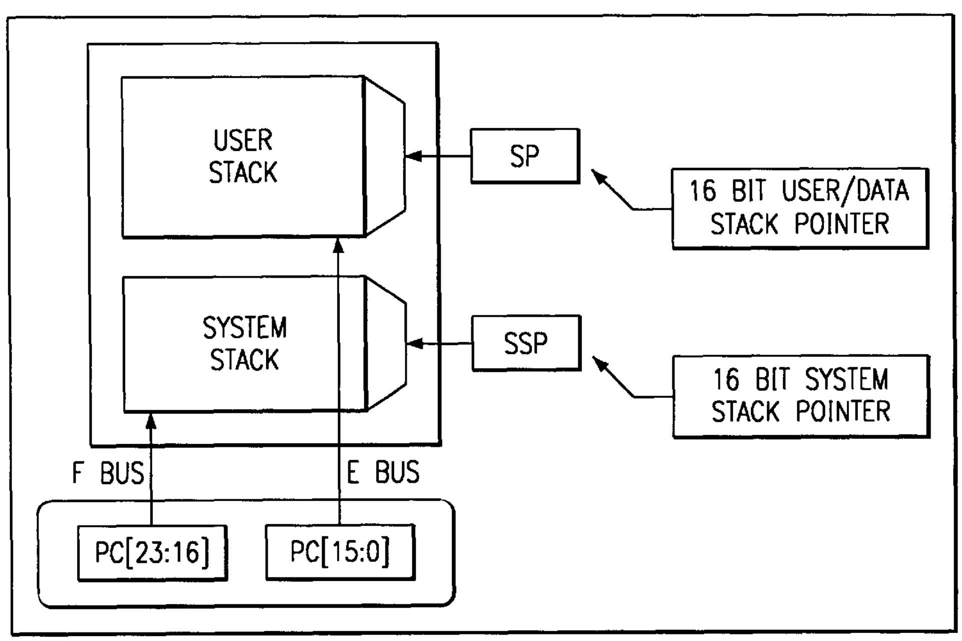
FIG. 53 illustrates keeping an earlier generation processor stack pointer and the processor of FIG. 1 stack pointers in synchronization in order to permit software program translation between different generation processors in a family.

Keeping the earlier family processor stack pointers and the processor stack pointers in synchronization is a key translation requirement to support parameter passing through the stack. To address this requirement, the processor stack is managed from two independent pointers, the data stack pointer SP and the system stack pointer SSP. The user should only handle the system stack pointer for initial system stack mapping and for implementation of context switches. See FIG. 53.

In a context save driven by the program flow (calls, interrupts), the program counter is split into two fields PC[23:16], PC[15:0] and saved as a dual write access. The field PC[15:0] is saved on the data stack at the location pointed to by SP through the EB/EAB buses. The field PC[23:16] is saved on the stack at the location pointed to by SSP through the FB/FAB buses. Table 59 summarizes the Call and Return instructions.

TABLE 59

| Call and Return Instructions | | | |
|---|---|---|---|
| Instructions | | | Stack Access |
| | FB Request @ SSP − 1 | EB Request @ SP − 1 | |
| call P24 | PC[23-16] | PC[15-0] | dual write |
| | CB Request @ SSP | DB request @ SP + 1 | |
| return | PC[23-16] | PC[15-0] | dual read |

5.13.4 Family Compatibility—Far calls

Depending on the C54x device original code, the translator may have to deal with "far calls" (24 bit address). The processor instruction set supports a unique class of call/return instructions based on the dual read/dual write scheme. The translated code will execute an SP=SP+K8 instruction in addition to the call to end up with the same SP post modification.

5.13.5 Compatibility—Interrupts

There is a limited number of cases where the translation process implies extra CPU resources. If an interrupt is taken within such a macro and if the interrupt routine includes similar macros, then the translated context save sequence will require extra push( ) instructions. That means an earlier family processor and the present processor stack pointers are no longer in synchronization during the ISR execution window. Provided that all the context save is performed at the beginning of the ISR, any parameter passing through the stack within the interrupt task is preserved. Upon return from interrupt, the earlier family processor and the present processor stack pointers are back in synchronization 5.13.6 Family Compatibility As has been described, the FAMILY status bits configure the DAGEN such that in compatible mode (FAMILY status bit set to 1), some modifiers using the DR0 register for address computation purposes are replaced by similar modifiers and the circular buffer size register BK03 association to AR[0–7] and BK47 register access is disabled.

6. Bus Error Tracking

Three types of 'bus error tracking' are supported by the processor architecture to optimize software development effort by simplifying real time system debug: static mapping errors, bus time-out errors, and software restrictions violations (restrictions from the hardware implementation and parallelism rules).

All bus errors from the various memories and peripherals in the system are gated together and sent to the CPU to be merged with the CPU internal errors. A ready signal is returned to the CPU to allow completion of the access. This global 'bus error' event sets the IBERR flag in the IFR1 register. If enabled from the IEBERR mask bit (IMR1 register), a high priority interrupt is generated. The user must define the appropriate actions within the bus error ISR (Software reset, breakpoint, alert to the Host . . . ). The bus error tracking scheme is implemented to never hang the processor on an illegal access for any type of error.

6.1.1 Static Mapping Errors

A static mapping error occurs when a request (read or write) is generated in the program or data bus, and the address associated with the request is not in the memory map of the processor core based system. The static mapping error has to be tracked for:

- Access to memories implemented within the megacell or sub-chip
- Access to on-chip memories implemented within the 'custom gates domain'
- Access to external memories (External mapping has to be managed in the User gates; the megacell/sub-chip must support external bus errors inputs)

For buses internal to the sub-chip, like the 'BB coefficient bus', the static mapping error is tracked at the MIF level (Memory interface). For the buses which are exported to the 'User domain', the static mapping error has to be tracked in user gates and then returned to the CPU. No mechanism is supported by the external bus bridge for static mapping error tracking. Hence the external bus bridge will respond to a static peripheral mapping error via a bus time-out error (see next section).

6.1.2 Bus Time-Out Errors

A bus time-out error is generated by a timer that monitors the bus activity and returns a bus error and a ready signal when the peripheral does not acknowledge a request. A specific timer is usually implemented in each subsystem to support different protocols. Time-out applies to both read and write accesses. The bus error is managed from a single timer resource since reads and write cannot happen on top of each other for both external bus and external transactions.

For example, a typical system may include three bus time-out generators:

External interface time-out→MMI

Peripheral interface time-out→EXTERNAL BUS

DMA time-out→DMA

These time-outs are programmable and can be enabled/disabled by software. If the request is originated from the DMA, the bus error is returned to the DMA which will then return the bus error to the CPU without any action on the READY line.

(byte/word) versus the physical implementation of the selected peripheral. In case of mismatch, a bus error is returned.

6.1.3.3 Peripheral Access Qualification Mismatch

Any memory write instruction qualified by the readport( ) statement generates a bus error. Any memory read instruction qualified by the writeport( ) statement generates a bus error.

6.1.3.4 Dual Access/F Request To MMR's Bank

The internal CPU buses to access the memory mapped registers do not support a dual access transaction or F request. This type of error is tracked at CPU level.

6.1.3.5 Power Down Configuration

If the power down configuration defined by the user does not satisfy the clock domain's hierarchy and a hardware override is required, the error is signaled via the bus error scheme. See power down section for more details.

Table 60 summarizes the various Bus Error sources.

TABLE 60

Bus error summary

| Bus Error Type | Access Type | Bus Error Tracking |
|---|---|---|
| Static mapping | Coefficient access (BB) | MIF |
| | Reserved location for emulation and test | ? |
| | Program access | User gates |
| | Read/Write data access from the CPU | User gates |
| | Read/Write data access from the DMA | User gates |
| Bus error time-out | Peripheral access from the CPU | EXTERNAL BUS |
| | Peripheral access from the DMA | DMA |
| | External access from the CPU | MMI |
| | External access from the DMA | DMA |
| Software restrictions | DSP access to APIRAM in HOM mode | MIF |
| | DSP access to peripherals in HOM mode | EXTERNAL BUS |
| | Long access (32 bit) to peripheral | CPU |
| | Dual access to MMR's bank | CPU |
| | F request (memory write + shift) to MMR's | CPU |
| | Byte access to a peripheral word location | EXTERNAL BUS |
| | Word access to a peripheral byte location | EXTERNAL BUS |
| | Peripheral access qualification mismatch | CPU |
| | Dual access to a peripheral | CPU |
| | Power down configuration | EXTERNAL BUS |

The emulator has the capability to override the time-out function ("abort ready" signal generated from ICEMaker).

Figure 54:
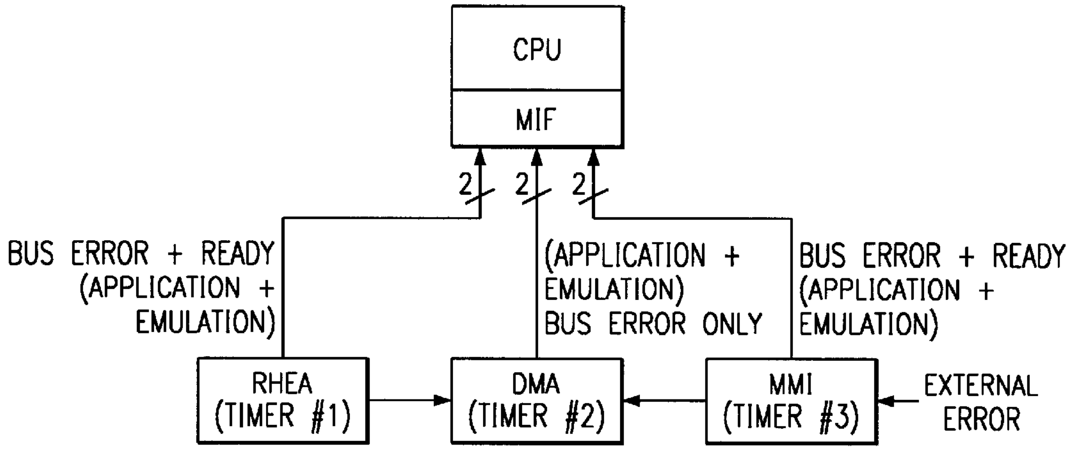
FIG. 54 is a block diagram which illustrates a combination of bus error timers.

FIG. 54 is a block diagram illustrating a combination of bus error timers.

6.1.3 Software Restrictions Violations

6.1.3.1 DSP access when in HOM Mode

If the DSP is requesting an access to the API_RAM or to a peripheral when the 'Host Only Mode' has been selected, a bus error is generated and a ready signal is returned to the CPU to allow access completion.

6.1.3.2 Format Mismatch

The external bus bridge interfaces only the D and E buses; 32-bit access is not supported. This type of error is tracked at CPU level ( i.e.: dbl(*AR5+)=AC2 || writeport( )). The external bus protocol supports a format mismatch tacking scheme which compares the format associated to the request

6.1.4 Emulation/Debug

The emulation accesses managed through the DT-DMA should cause a bus error but not generate a bus error interrupt. This is managed through two independent bus error signals, one dedicated to applications which can trigger an interrupt and one dedicated to emulation which is only latched in ICEMaker. If the user ISR generates a bus error while emulation is doing an access, the error will not be reported to the ICEMaker. The emulation should not clear a user error indication. For software development, a good practice is to set a SWBP at the beginning of the bus error ISR. Since such an interrupt gets the highest priority after the NMI channel, a bus error event will stop execution. The user can then analyze the root cause by checking the last instructions executed before the breakpoint. The User software can identify the source (MMI, EXTERNAL BUS, DMA, CPU) of the bus error by reading the 'bus error flags'.

7. Program Control 7.1 Instruction Buffer Unit (IBU)

Figure 55:
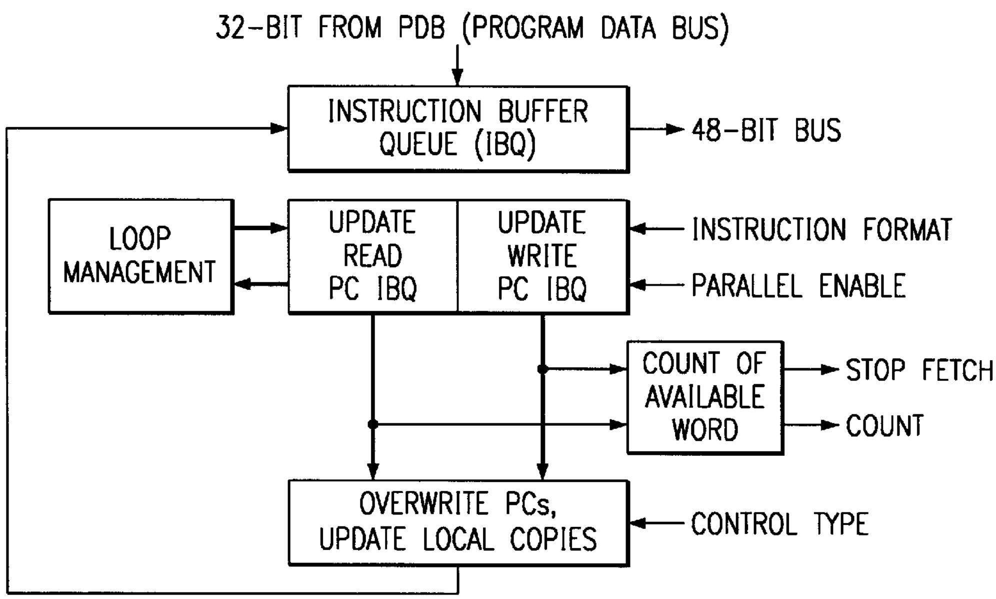
FIG. 55 is a block diagram which illustrates the functional components of the instruction buffer unit.

FIG. 55 is a block diagram which illustrates the functional components of the instruction buffer unit. The Instruction Buffer Unit is composed of: an Instruction Buffer Queue which is a 32×16-bit word Register File, Control Logic which manages read/write accesses to this Register File, and Control Logic which manages the filling of the Instruction Buffer Queue.

To store 2×16-bit bus data coming from the memory, it is necessary to have an instruction buffer queue. Its length has been fixed according to performance criteria (power consumption, parallelism possibility).

Figure 56:
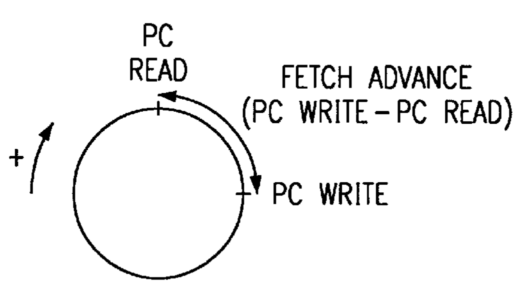
FIG. 56 illustrates how the instruction buffer is managed as a Circular Buffer, using a Local Read Pointer & Local Write pointer.

This instruction buffer is managed as a Circular Buffer, using a Local Read Pointer and Local Write, as illustrated in FIG. 56.

A maximum and minimum fetch advance of twelve words and respectively (format1+1byte) is defined between the Read and Write Pointers. Two words are the minimum requirement to provide at least one instruction of 32-bits.

The Instruction Buffer Queue supports the following features:

- management of variable format, 8, 16, 24, 32
- support internal repeat block of less than thirty words (save power)
- support speculative execution (improve performance)
- two levels of repeat (repeat block, or repeat single) (improve performance)
- support parallel instruction 16-bit//16-bit, 16-bit//24-bit, 24-bit//16bit, 32bit//16bit, 16bit//32bit, 24bit//24bit (improve performance)
- call scenario (improve performance)
- relative jump inside the buffer (improve performance and power)

To provide the easiest management of program Fetch, the IBQ supports a word write access, and to provide the full forty-eight bits usable for instructions, it supports a byte read access (due to variable format of instruction, 8/16/24/32-bit).

Figure 57:
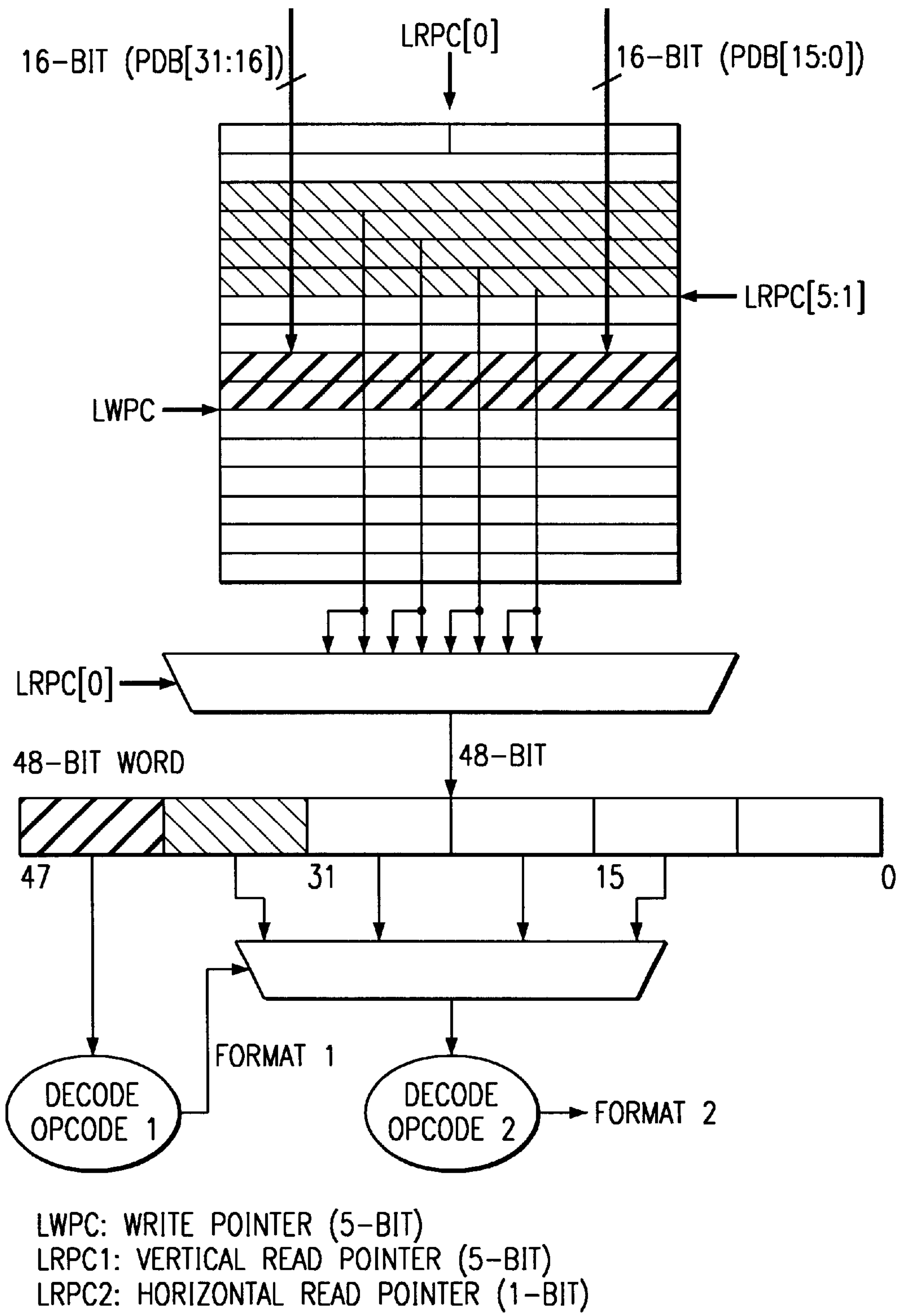
FIG. 57 is a block diagram which illustrates Management of a Local Read/Write Pointer.
Figure 58:
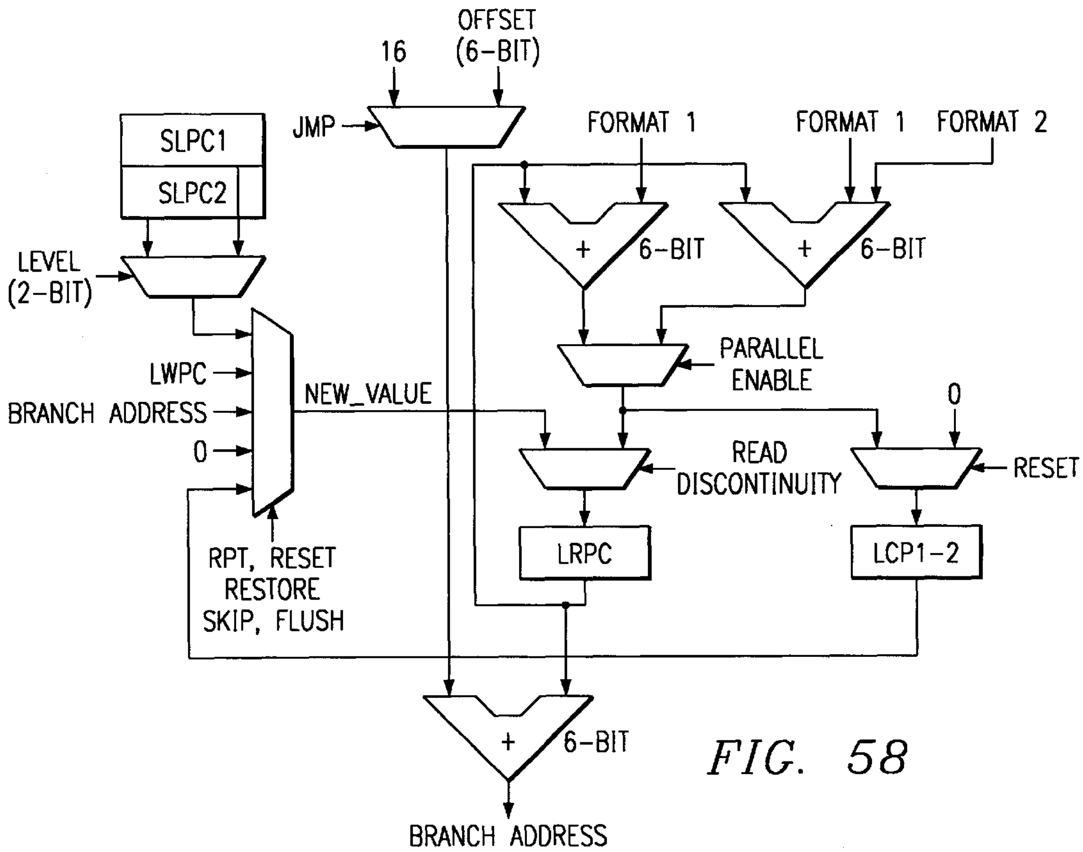
FIG. 58 is a block diagram illustrating how the read pointers are updated.

FIG. 57 is a block diagram illustrating management of the local read/write pointer. To address the Instruction Buffer Queue, three pointers are defined: the local write pointer (LWPC) (5-bit), the local horizontal read pointer (LRPC2), and the local vertical read pointer (LRPC1) (LRPC=(LRPC1, LRPC2)) (6-bit). FIG. 58 is a block diagram illustrating how the read pointers are updated.

New value input is used when a specific value has to be set into the local pointer. It can be a start loop (SLPC1/SLPC2), a restored value (LCP1–2), a branch address, a value of LWPC (flush of fetch advance), and 0 (reset value). A new value is set up by the Program Control Unit.

Figure 59:
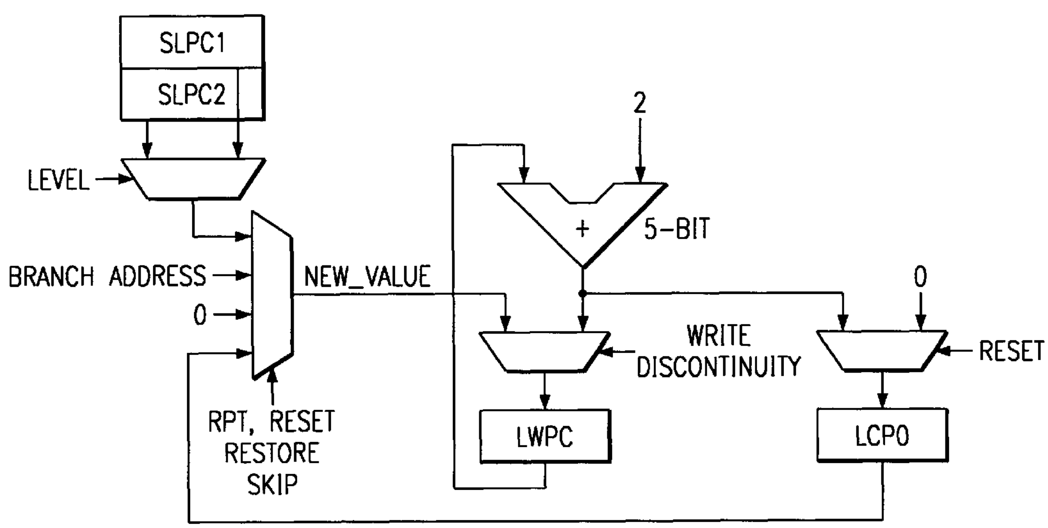
FIG. 59 shows how the write pointer is updated.

Format1 is provided by the decoding of the first byte, and Format2 by the decoding of the second byte (where positioning depends on Format1). Read PC defines the local read address byte into the Instruction Buffer Queue. When a short jump occurs, the jump address can already been inside the buffer, so that value is checked, and if needed, the Read Pointer is set to this value. This is done using the offset input (provided by decoding of instruction1 or instruction2). FIG. 59 shows how the write pointer is updated.

As for the read pointer update, there is the possibility to force a new value to the write pointer, when there is a loop (Repeat Block), a discontinuity (call, . . . ), or a restore from the local copy.

Figures 60, 61:
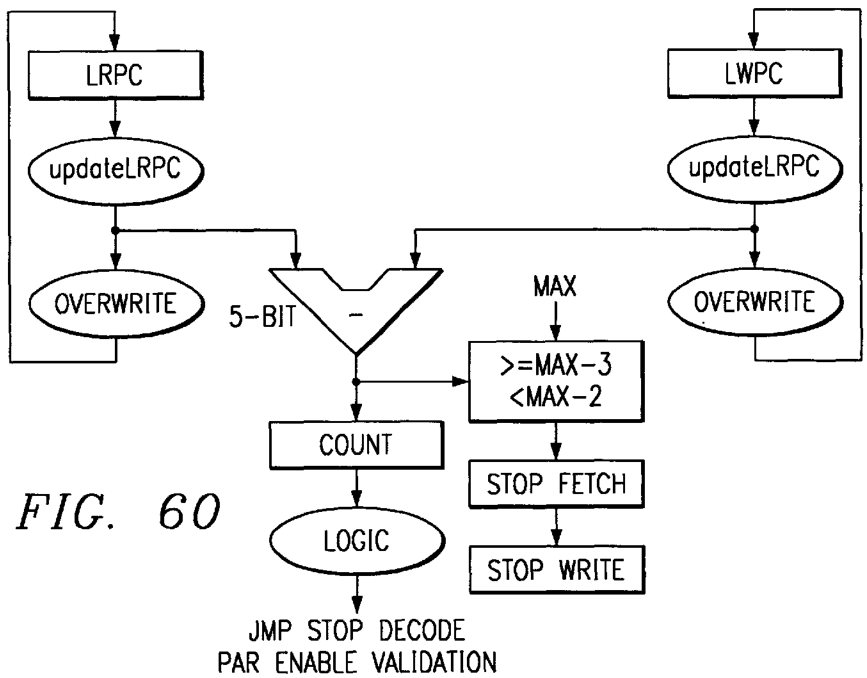
FIG. 60 is a block diagram of circuitry for generation of control logic for stop decode, stop fetch, jump, parallel enable, and stop write during management of fetch Advance.
FIG. 61 is a timing diagram illustrating Delayed Instructions.

FIG. 60 is a block diagram of circuitry for generation of control logic for stop decode, stop fetch, jump, parallel enable, and stop write during management of fetch advance.

To perform the decode or fetch operation, the number of words available inside the Instruction Buffer Queue must be determined. This is done by looking at the Read/Write Pointer values. In FIG. 60, the Max input controls the generation of Program request. Its value, depending on the context (local repeat block, or normal context), can be either twelve words or thirty-one words.

7.2 Program Control Flow Description

The Program Control Flow manages all possibilities of discontinuity in the (24-bit) Program Counters.

Several control flows are supported:

- branch instruction(s)
- call instruction(s)
- return instruction(s)
- conditional branch instruction(s)
- conditional call instruction(s)
- conditional return instruction(s)

These control flows support both delayed and undelayed flow:

- repeat instruction(s) (including repeat block and repeat single).
- interrupt management Key features:

- Support speculative (thanks to IBQ) or support conditional flow for conditional control instruction
- Take advantage of IBQ to support internal branch
- Take advantage of IBQ to perform repeat block flow locally (local repeat block instruction)
- Implement a pipeline stack access to improve performance of return (from call/from interrupt) instruction (s)
- Prefetch and Fetch are decorrelated from Data Conflict FIG. 61 is a timing diagram illustrating Delayed Instructions.

There are two kinds of Delayed Instructions: delayed slots with no restrictions and delayed slots with restrictions. All control instructions where the branch address is computed using relative offset have no restriction on the delayed slot. And, all instructions where the branch address is defined by an absolute address will have restrictions on the delayed slot.

7.2.1 Speculative and Conditional Execution

The minimum latency for conditional discontinuity is obtained by executing a fetch advance when decoding both scenarios (condition true or false). Execution is then speculative. For JMP and CALL instructions, the conditions are known at the read cycle (at least) of the instruction. If these instructions are delayed, both scenarios do not have to be performed. Execution is conditional.

Figure 62:
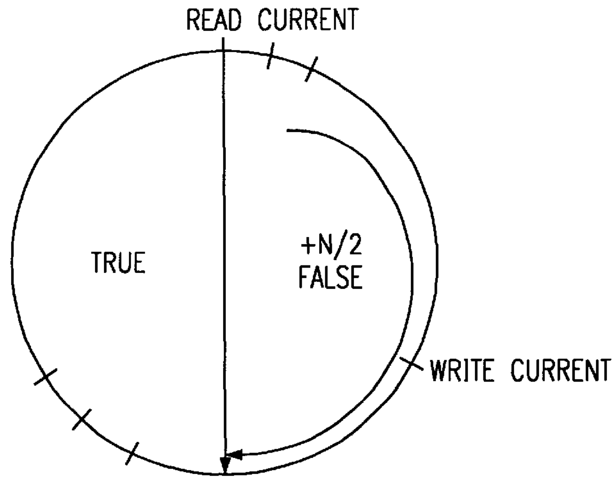
FIG. 62 illustrates the operation of Speculative Execution.

FIG. 62 illustrates the operation of Speculative Execution.

In the speculative scenario, we take advantage of the fetch advance to provide both scenarios. This kind of execution can be used when the condition is not known at the decoding stage of the conditional instruction.

To non-overlap valid data inside the buffer, the next Write Pointer for the true condition is computed by adding sixteen and rounding the result to an even address inside the IBQ from the current Read Pointer.

This guarantees that the write address inside the IBQ is always even.

When the condition is true, then context return in a normal way, but if condition is false, all information stored into local registers must be restored as if it was a "fast" return.

7.3 Conditional Operations

7.3.1 Parallelism Rules For Conditional Statements

Figure 63:
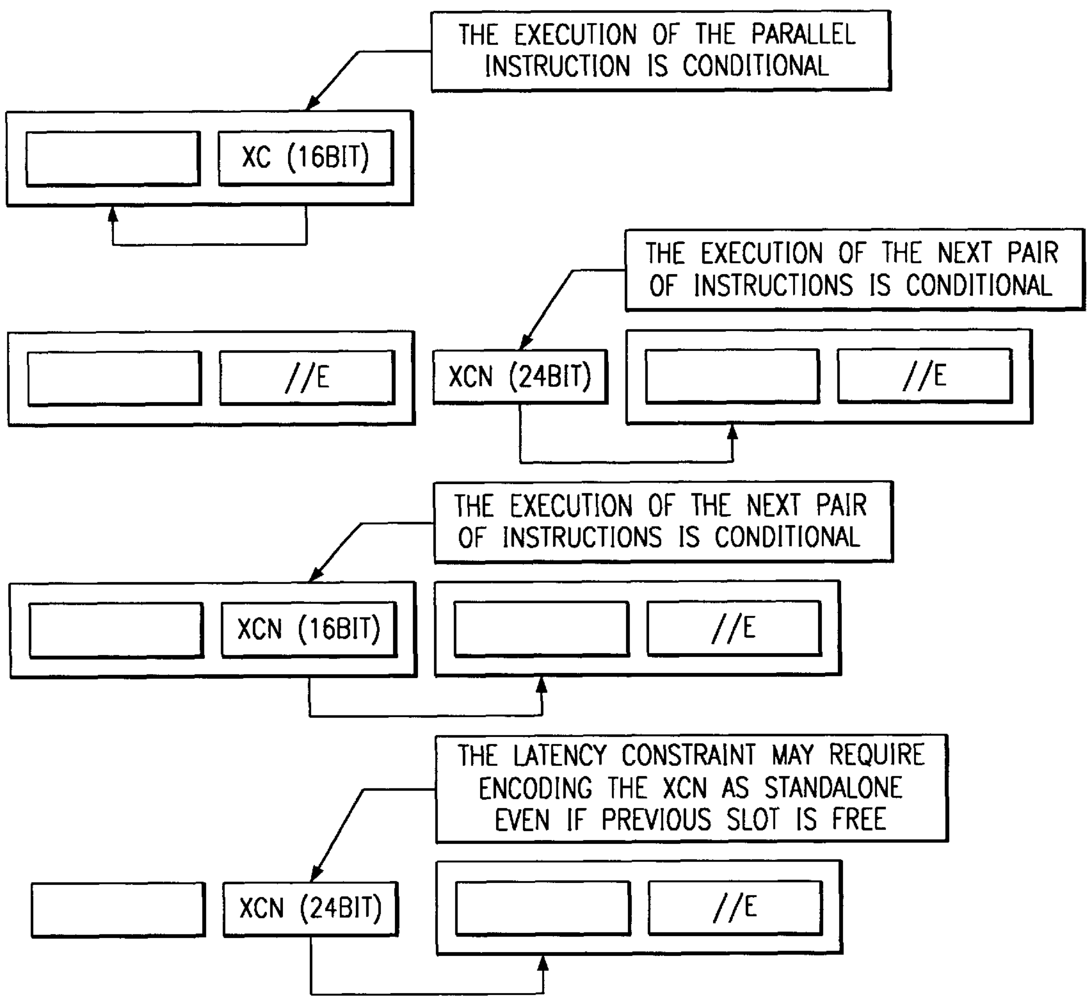
FIG. 63 illustrates how Two XC options are provided in order to reduce constraint on condition set up.

The processor supports a full set of conditional branches, calls and repeats. Using these built in conditional instructions, the user can build a 'soft conditional instruction' by executing an XC instruction in parallel. Two XC options are provided to reduce constraints on condition set up, as illustrated in FIG. 63. The top sequence in the figure illustrates an instruction execution that affects only the execute cycle. It can be used for register operations or if the algorithm requires unconditional post modification of the pointer. The second sequence illustrates an instruction execution that affects access, read, and execute cycles. It must be used when both pointer post modification and the operation performed in the execute cycle are conditional.

Conditional execution may apply to an instructions pair. In this case, the XC instruction must be executed in previous cycle. If the algorithm allows, XC can be executed on top of the previous instruction.

7.3.2 Condition Field Encoding

The instruction set supports a set of XC instructions to handle conditional execution according to context. The execution of these instructions is based on the conditions listed in Table 61. Note: If the condition code is undefined, the conditional instruction assumes the condition is true.

Note: Accumulators sign/zero detection depends on the M40 status bit.

TABLE 62

Compare options

| "cc" Field msb → lsb | Compare Option (RELOP) |
|---|---|
| 00 | == |
| 01 | < |
| 10 | >= |
| 11 | != |

7.3.3. Conditional Memory Write

Figure 64:
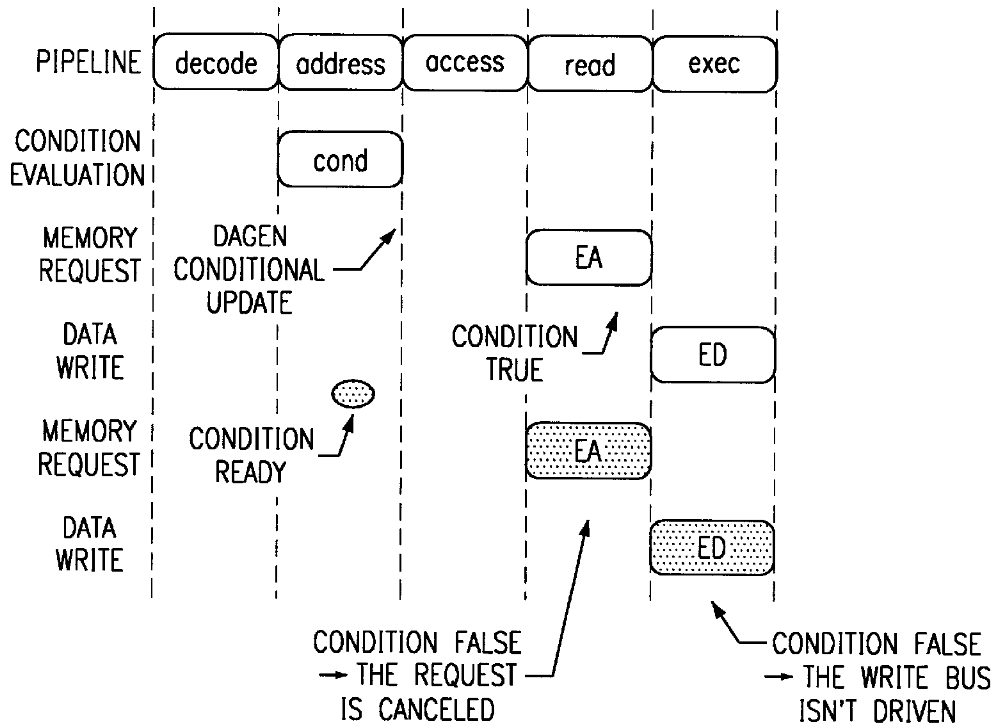
FIG. 64 is a timing diagram illustrating a first case of a conditional memory write.

Different cases of conditional memory writes are illustrated in the FIGS. 64–67.FIG. 64 is a timing diagram illustrating:

if (cond) exec (AD_unit) || *AR4+=AC2

Figure 65:
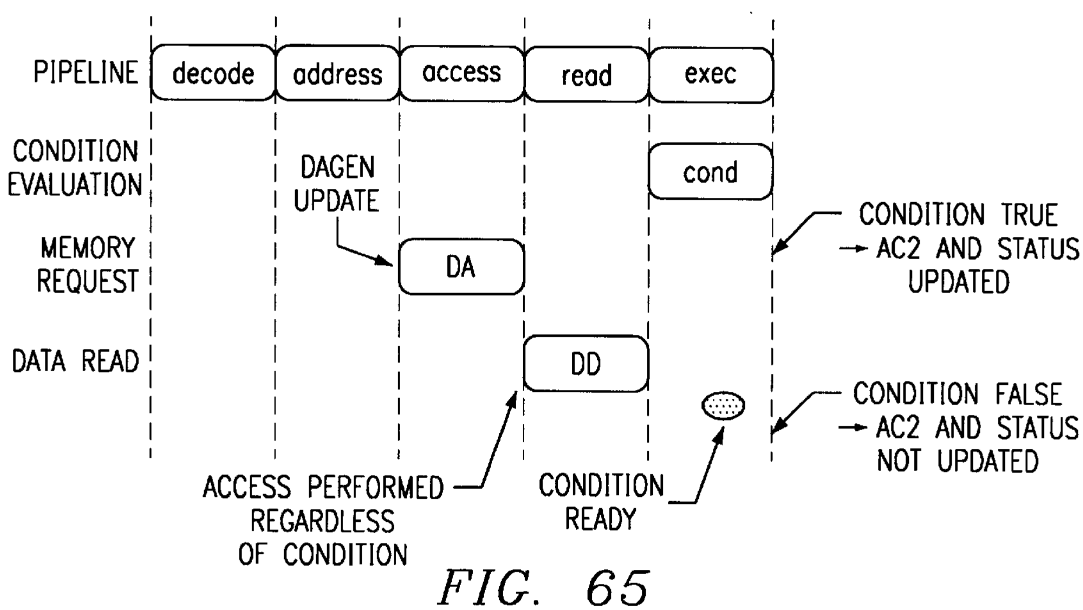
FIG. 65 is a timing diagram illustrating a second case of a conditional memory write.

FIG. 65 is a timing diagram illustrating:

if (cond) exec (D_unit) || AC2=*AR3+

Figure 66:
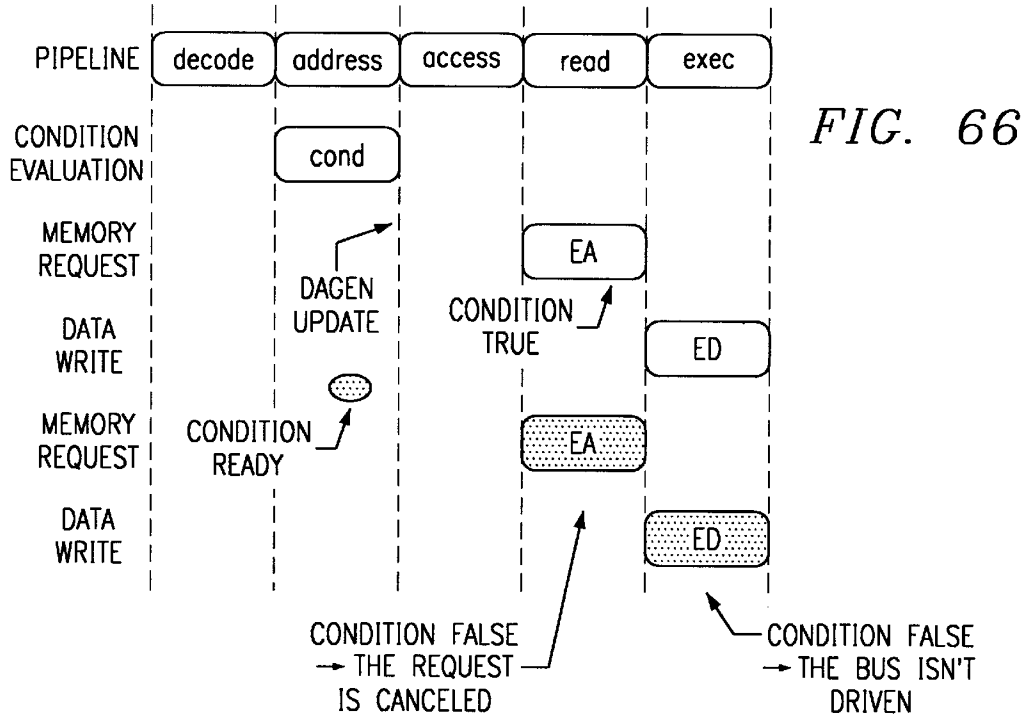
FIG. 66 is timing diagram illustrating a third case of a conditional memory write.

FIG. 66 is a timing diagram illustrating:

if (cond) exec (D_unit) || *AR3+=DR0

Figure 67:
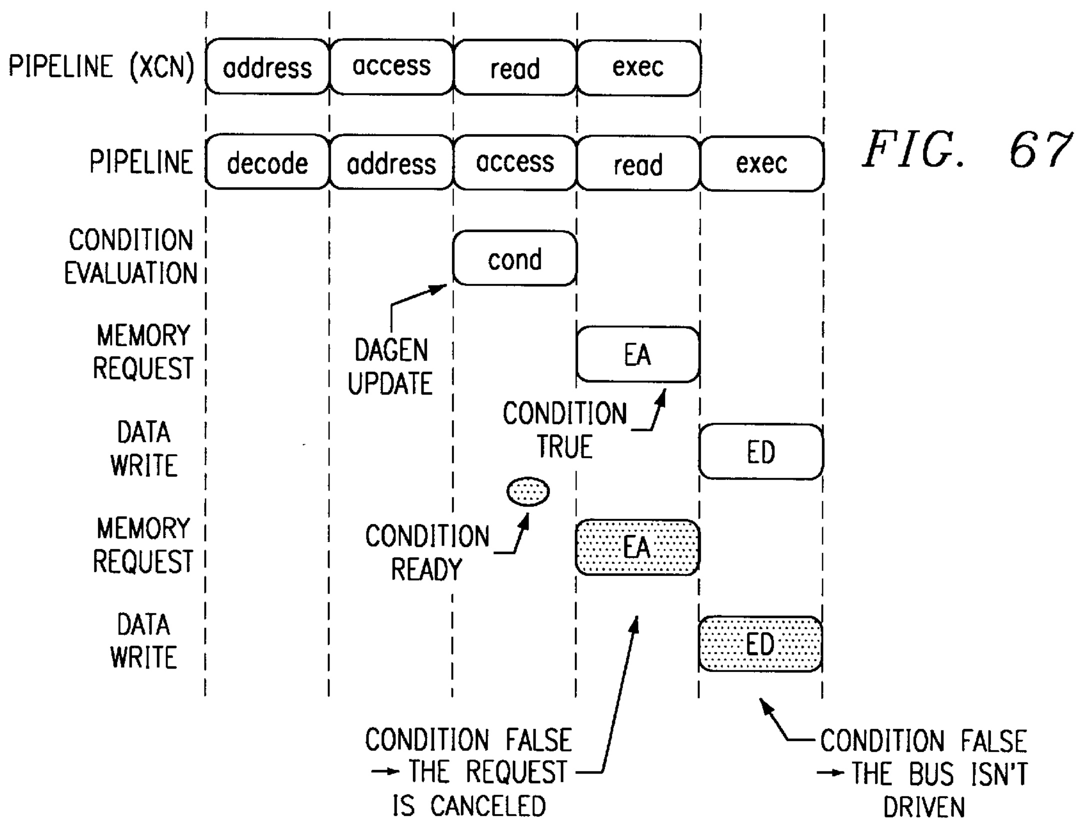
FIG. 67 is a timing diagram illustrating a fourth case of a conditional memory write.

FIG. 67 is a timing diagram illustrating:

DR3=DR0+#5 || if (cond) exec (D_unit)

*AR5+=AC2 || AC3=rnd (*AR3+*AC1)

Table 63 shows the pipeline phase in which the condition is evaluated. In the case of a memory write instruction, the

TABLE 61

Condition filed encoding

| Condition Field | Register Field | Condition | Register | Description |
|---|---|---|---|---|
| 000 | 0000→1111 | src == #0 | ACx,DRx,ARx | Register equal to zero |
| 001 | — | src != #0 | — | Register not equal to zero |
| 010 | — | src < #0 | — | Register less than zero |
| 011 | — | src <= #0 | — | Register less than or equal to zero |
| 100 | — | src > #0 | — | Register greater than zero |
| 101 | — | src >= #0 | — | Register greater than or equal to zero |
| 110 | 0000→0011 | overflow(ACx) | ACx | Accumulator overflow detected |
| 111 | — | !overflow(ACx) | — | No accumulator overflow detected |
| 110 | 0100 | TC1 | STATUS | Test/Control flag TC1 set to 1 |
| — | 0101 | TC2 | — | Test/Control flag TC2 set to 1 |
| — | 0110 | Carry | — | Carry set to 1 |
| 111 | 0100 | !TC1 | — | Test/Control flag TC1 cleared to 0 |
| — | 0101 | !TC2 | — | Test/Control flag TC2 cleared to 0 |
| — | 0110 | !Carry | — | Carry cleared to 0 |
| 110 | 1000 | TC1 and TC2 | — | Test/Control flags logical AND |
| — | 1001 | TC1 and !TC2 | — | — |
| — | 1010 | !TC1 and TC2 | — | — |
| — | 1011 | !TC1 and !TC2 | — | — |
| 111 | 1000 | TC1 \| TC2 | — | Test/Control flags logical OR |
| — | 1001 | TC1 \| !TC2 | — | — |
| — | 1010 | !TC1 \| TC2 | — | — |
| — | 1011 | !TC1 \| !TC2 | — | — |
| 111 | 1100 | TC1 ^ TC2 | — | Test/Control flags logical XOR |
| — | 1101 | TC1 ^ !TC2 | — | — |
| — | 1110 | !TC1 ^ TC2 | — | — |
| — | 1111 | !TC1 ^ !TC2 | — | — |

TCx can be updated from a 16/24/32/40 bit register compare. Four compare options are supported which are encoded as shown in Table 62. The same options apply to conditional branches based on register/constant comparison.

condition evaluation has to be performed in the 'Address' pipeline slot (even if the option specified by the user is 'D_unit') in order to cancel the memory request. The DAGEN update is unconditional.

TABLE 63

Summary of condition evaluation

| DAGEN Tag | If (cond) exec (AD_unit) address | exec | If (cond) exec (D_unit) address | exec | Comment |
|---|---|---|---|---|---|
| DAG_Y | X | — | X | — | Assembler error if (D_unit) option |
| P_MOD | X | — | X | — | Assembler error if (D_unit) option |
| Smem_R | X | — | X | — | |
| Smem_W | X | — | — | X | |
| Lmem_R | X | — | X | — | |
| Lmem_W | X | — | — | X | |
| Smem_RW | X | — | — | X | |
| Smem_WF | X | — | — | X | |
| Lmem_WF | X | — | — | X | |
| Smem_RDW | X | — | — | X | |
| Smem_RWD | X | — | — | X | |
| Lmem_RDW | X | — | — | X | |
| Lmem_RWD | X | — | — | X | |
| Dual_WW | X | — | — | X | |
| Dual_RR | X | — | X | — | |
| Dual_RW | X | — | — | X | |
| Dual_RWF | X | — | — | X | |
| Delay | X | — | — | X | |
| Stack_R | X | — | X | — | |
| Stack_W | X | — | — | X | |
| Stack_RR | X | — | X | — | |
| Stack_WW | X | — | — | X | |
| Smem_R_Stack_W | X | — | — | X | |
| Stack_R_Smem_W | X | — | — | X | |
| Smem_R_Stack_WW | X | — | — | X | |
| Stack_RR_Smem_W | X | — | — | X | |
| Lmem_R_Stack_WW | X | — | — | X | |
| Stack_RR_Lmem_W | X | — | — | X | |
| NO_DAG | X | — | X | — | |
| EMUL | N/A | N/A | N/A | N/A | SWBP are not conditional |

Figure 68:
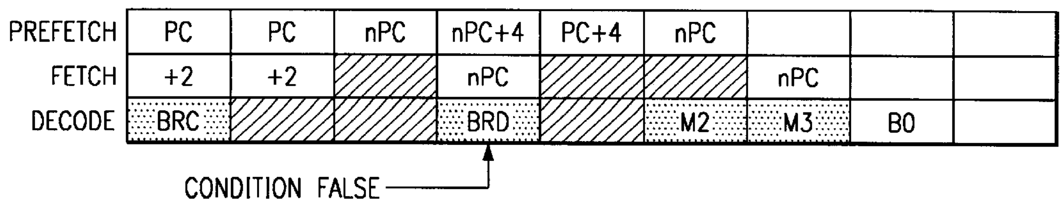
FIG. 68 is a timing diagram illustrating a Conditional Instruction Followed by Delayed Instruction.

FIG. 68 is a timing diagram illustrating a conditional instruction followed by a delayed instruction. A hardware NOP is added when a conditional instruction (Condition false) is followed by delayed instruction if there is not sufficient fetch advance to guarantee the successful execution of B0.

According to FIG. 68, to guarantee a 32-bit delayed instruction after the control instruction, at least two words must be available. This means that the minimum condition for continuing without inserting an hardware NOP is four words.

Generally, the user should not use parallelism inside a delayed slot. This will help avoid lost cycles and the resulting loss of performance.

Figure 69:
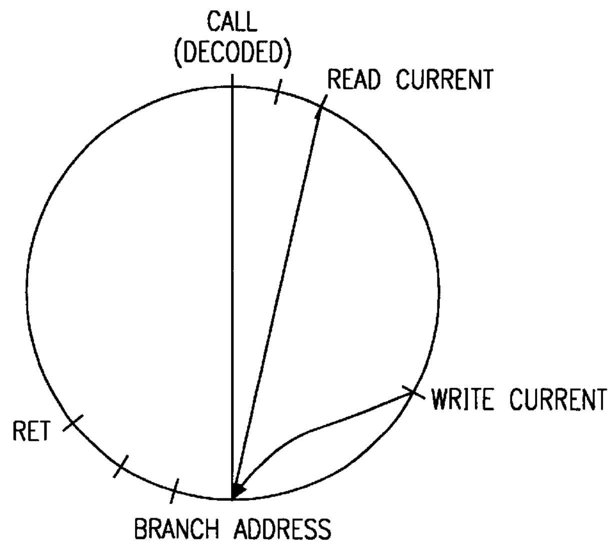
FIG. 69 is a diagram illustrating a Call non speculative.

FIG. 69 is a diagram illustrating a nonspeculative Call. When a call occurs, the next PC write inside the buffer is computed from the current position of the Read Pointer plus sixteen. This permits a general scheme for evaluating branch addresses inside the buffer (speculative or not speculative).

Figure 70:
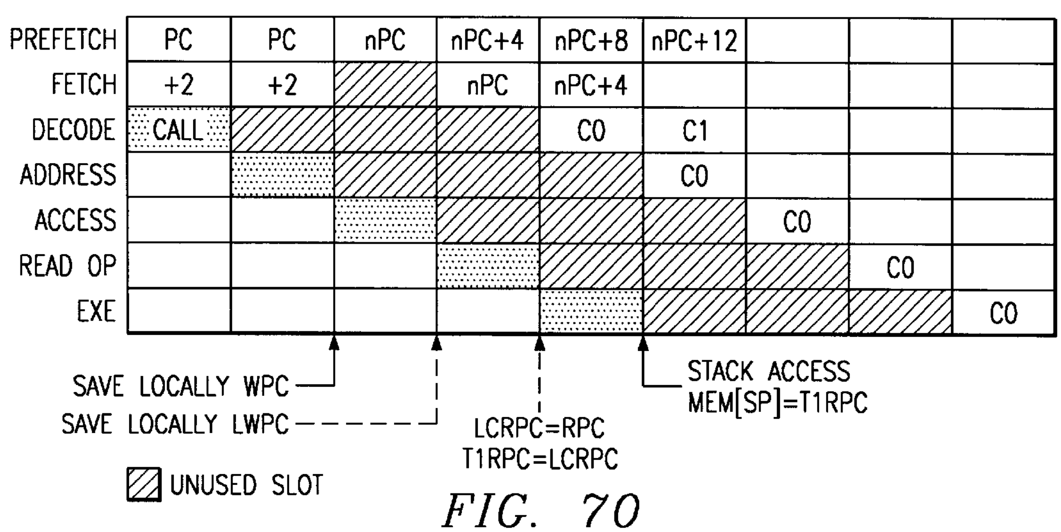
FIG. 70 illustrates a "short" CALL which computes its called address using an offset and its current read address.
Figure 71:
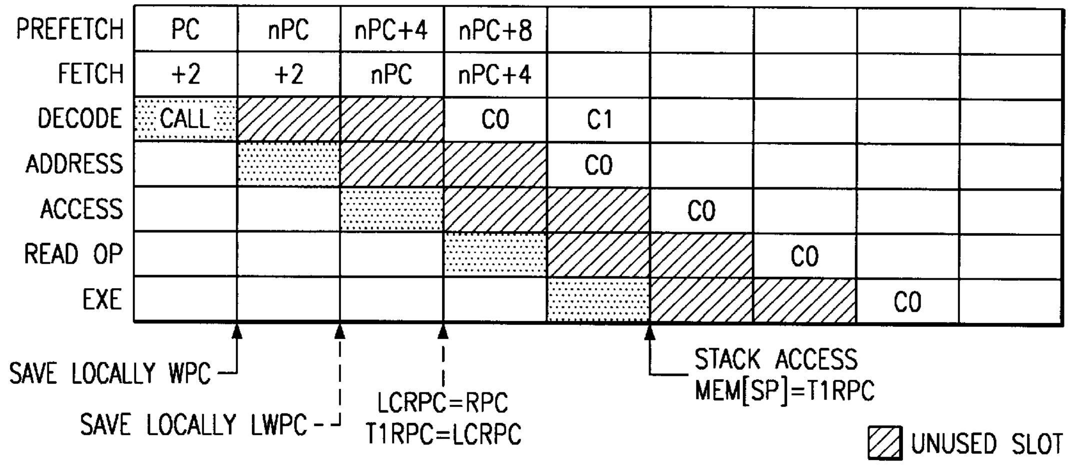
FIG. 71 illustrates a "long" CALL which provides the CALL address through the instruction.

There are two kinds of CALL: the "short" CALL which computes its called address using an offset and its current read address (illustrated in FIG. 70), and the "long" CALL which provides the CALL address through the instruction (illustrated in FIG. 71) The long call uses three cycles since the 24-bit adder is not used and the short call uses four cycles. All CALL instructions have a delayed and undelayed version.

The return instruction can be delayed but there is no notion of fast and slow return. A delayed return takes only one cycle. After a return instruction, four words are available during two cycles. A write to the memory stack is always performed to save the local copy of the Read Pointer. On the first CALL, a stack access is performed to save the LCRPC, which can contain uninitialized information. The user must set this register if he wants to set up an error address in memory.

Figure 72:
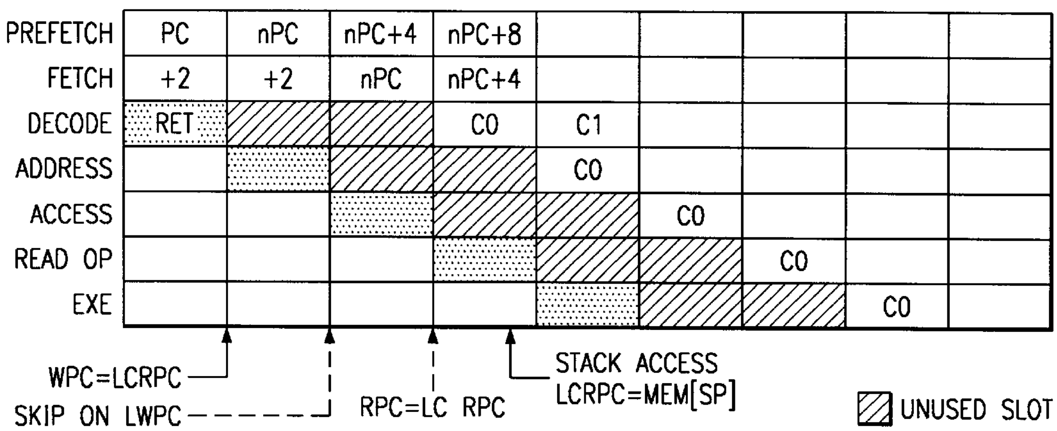
FIG. 72 is a timing diagram illustrating an Unconditional Return.

FIG. 72 is a timing diagram illustrating an Unconditional Return. The return address is already inside the LCRPC so no stack access is needed to set up the return address and no operation has to be done before reading it. This illustrates why performance of the Return instruction is 3-cycles (undelayed) and 1-cycle (delayed version). For the Delayed Return, there are restrictions on the delayed slot because we guarantee up to 64-bits available on two cycles.

Figure 73:
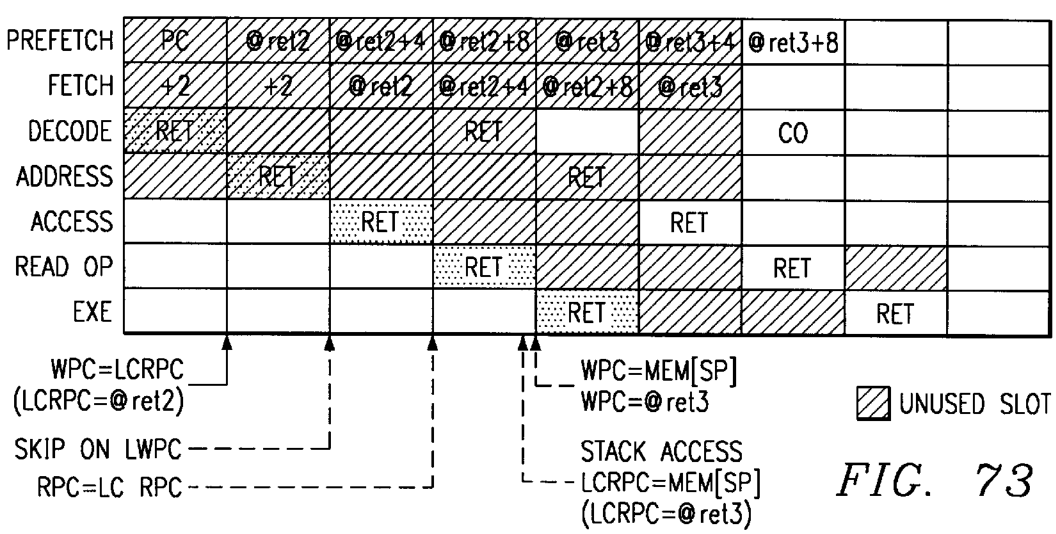
FIG. 73 is a timing diagram illustrating Return Following by Return.

FIG. 73 is a timing diagram illustrating a Return Followed by a Return. In this case, we don't want to impact the dispatch of the next return instruction. Thus, to optimize performance, a bypass is implemented around LCRPC register, as illustrated in FIG. 74.

Conditional Return

As for conditional call or goto, the conditional return is done using a speculative procedure. And, as for the call instruction, the Stack Pointer is incremented speculatively on the READ phase of the Return instruction.

Repeat Block

When BRC==n, it means that n+1 iterations will be done. The size of the repeat block is given in number of bytes from next RPC. The end address of the loop is computed by the address pipeline, as illustrated in FIG. 75. This creates a loop body where the minimum number of cycles to be executed is two. In the case where the number of cycles is less than two, the user must use a repeated single instruction. There are two kinds of repeat blocks, internal and external. Internal means that all instructions of the loop body can be put into the Instruction Buffer. Thus, the fetch of these instructions is done only on the first iteration. External means that the loop body size is greater than the Instruction Buffer size. In this case, the same instruction could be fetched more than one time.

In the case of an imbedded loop, the set-up of BRC1 can be done either before the outer loop or inside the outer loop. A shadow register BRS1 is used to store the value of BRC1 when set up of BRC1 is performed.

FIG. 76 is a timing diagram illustrating BRC access during a loop. The Repeat Counter Value is decremented at the end of every iteration on the address stage. This value is in a Memory Map Register (MMR) which means that access to this register can be performed during a repeat block. In this case, we need to respect the minimum latency from the end of the iteration (4-cycles).

FIG. 77 illustrates an Internal Repeat Block. When an internal repeat block occurs, the maximum number of useful words inside the instruction buffer is allowed to be the maximum size of the instruction buffer minus 2 words. When all the loop code is loaded inside the instruction buffer, it disallows fetching until after the last iteration of the loop. This allows the process to finish the loop with a buffer full, so that there is no loss of performance on end loop management. This repeat block is useful to save power, because instructions in the loop will be fetched only one time.

Figures 78, 79:
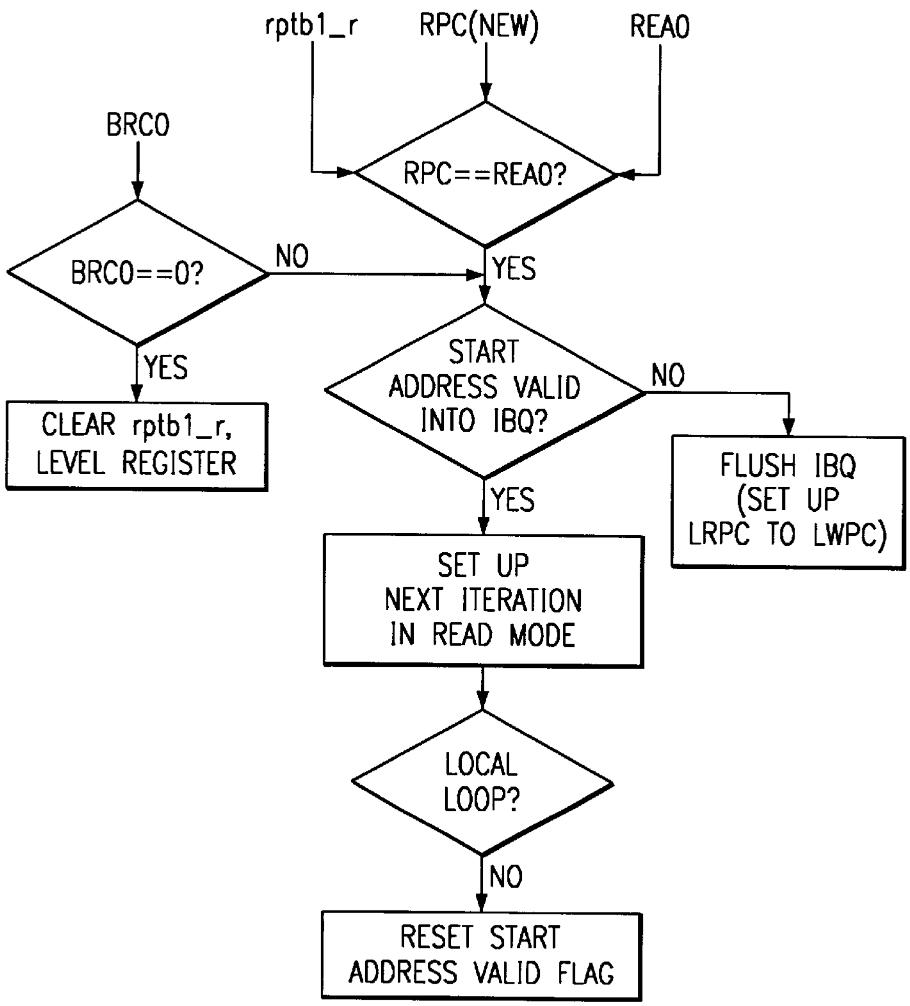
FIG. 78 illustrates that when a JMP occurs inside a loop, there are 2 possible cases.
FIG. 79 is a block diagram for Repeat block logic using read pointer comparison.

FIG. 78 illustrates an External Repeat Block. The start address inside the instruction buffer is refreshed at every iteration. When the PC memory write address is greater than or equal to the end address of the repeat block, a flag (corresponding to the loop) is set, and the Program Control Unit stops fetching. This flag will be reset when the memory read address is equal to the start address value of the loop. This avoids overwrite of start address inside instruction buffer. When a JMP occurs inside a loop, there are two possible cases, as illustrated in FIG. 78. In both cases, the repeat block is terminated, and the BRC value is frozen. A function can be called from an external repeat block. In this case, the context of repeat block is stored into local resources (or a memory stack). Comparators are de-activated until the end of the function call since the call is a delayed instruction.

Repeat Block Management

The following resources are required by every repeat block:

RSA0/RSA1: 24-bit registers which represent the start address of a loop.

REA0/REA1: 24-bit registers which represent the end address of a loop.

These registers are set up on the address phase of the repeat block (local) instruction. Since the fetch and dispatch are two independent stages, there are two different types of loop comparison logic for write mode and read mode. The repeat block active in write and read mode flags are set up in the address phase of the repeat block (local) instruction. To count the number of active repeat blocks, there is also a control register which indicates the level of loop (level=0: no loop, level=1: outer loop, level=2: nested loop). Finally, since a repeat block can be internal or external, this information is also set up in the address phase of a repeat block instruction (internal).

FIG. 79 is a block diagram illustrating repeat block logic for a read pointer comparison with an outer loop (level=1).

Figure 80:
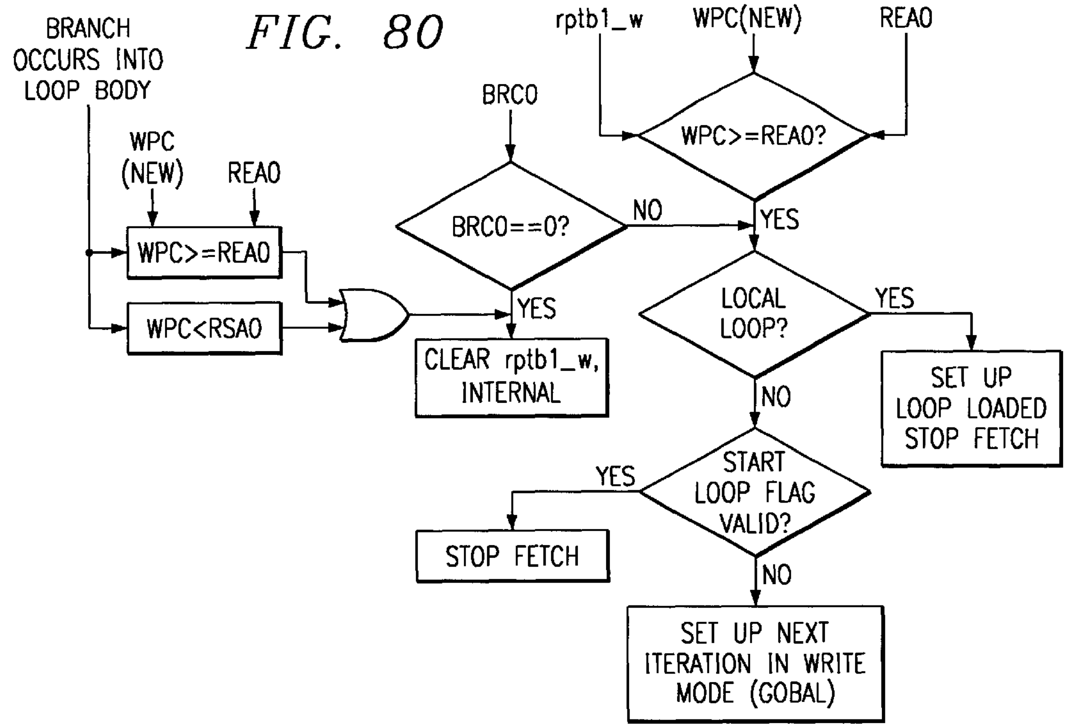
FIG. 80 is a Block diagram for Repeat block logic using write pointer comparison.

FIG. 80 is a block diagram illustrating repeat block logic for a write pointer comparison with an outer loop (level=1).

Figure 81:
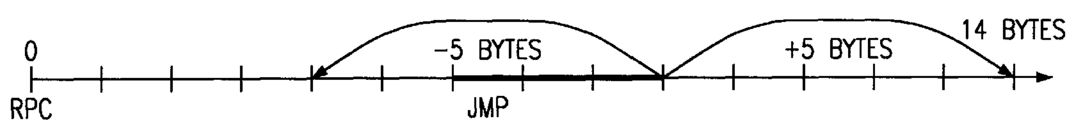
FIG. 81 illustrates a Short Jump.

FIG. 81 illustrates a Short Jump. The Jump destination address is computed from the next Read PC (identical for long Jump). When the Jump address is already inside the instruction buffer, the Jump is classified as a short jump. In this case, the processor takes advantage of the fetch advance, and the Jump is done inside the instruction buffer.

Figure 82:
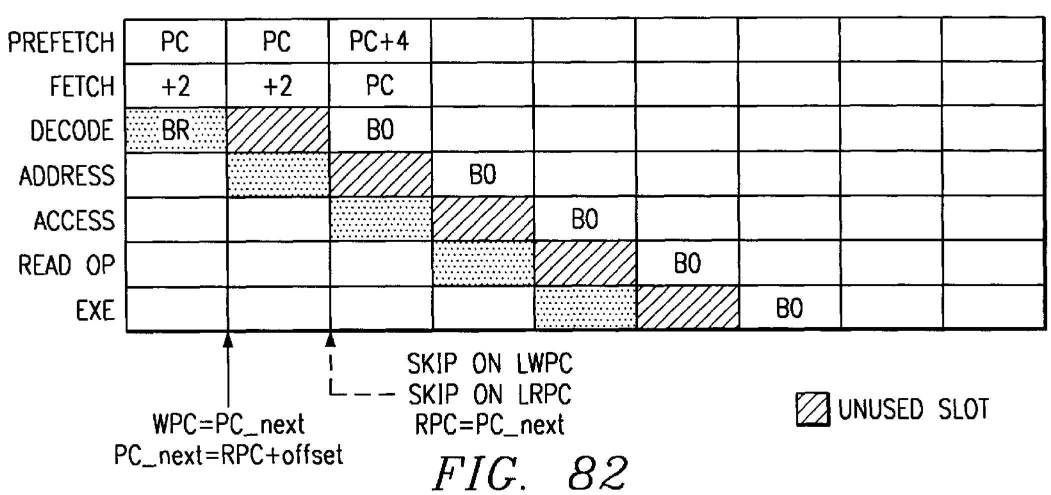
FIG. 82 is a timing diagram illustrating a case when the offset is small enough and jump address is already inside the IBO.

FIG. 82 is a timing diagram illustrating a case when the offset is small enough and the jump address is already inside the IBQ. In this case, the jump will take only two cycles, and the jump address is computed inside the IBQ.

When the offset is greater than the number of available words inside the IBQ, there are two possibilities: the Jump instruction is not inside an internal loop and the jump will take up to four cycles; or, the Jump instruction is inside an internal loop and all the code of the loop must be loaded inside the IBQ. In the latter case, the jump can take more than four cycles in the first iteration and only two cycles for the following.

There are two possible cases of short jump: delayed or not delayed.

Figure 83:
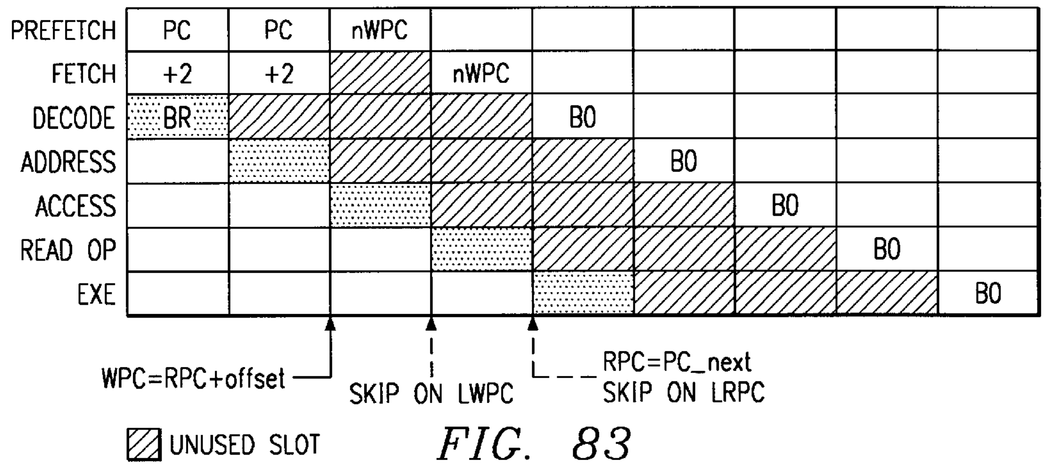
FIG. 83 is a timing diagram illustrating a Long Jump using relative offset.

FIG. 83 is a timing diagram illustrating a Long Jump using a relative offset. When the Jump is done from an absolute address, its performance is one cycle less, as for the Absolute Call. In this case, we don't need to use the address pipestage to compute the branch address.

Jump on label (SWT): This Special Jump is used to implement a switch case statement. The argument of the Jump is a register which contains an index to a value 0<=n<16. This value indicates which case is selected. For example:

JMPX DR0(DR0=3)

label0 label1 label2 label3: <<<===selected label label4 label5

Using the selected label, a traditional Jump is performed. This mechanism provides efficient case statement execution.

There are two possible ways to use this JMPX instruction:

1. By setting value of a register using the FXT instruction. In this case, the number of labels is limited to eight.
2. By using the value of a repeat single counter setting using the RPTX instruction (repeat until condition is true). In this case, the number of labels is limited to 16.

Single Repeat (RPT)

When RPTC==n, it means that n+1 iterations will be done. The repeat counter will be decremented at every valid cycle (in the address stage). It is also possible to perform a repeat single of a parallel instruction. In this case, if parallelism is not possible in the first iteration, one cycle is added. During a Repeat Single Instruction, updates of the read pointer are frozen, but the fetch continues working. Therefore, it is possible to fill the buffer and have a maximum fetch advance at the end of the loop.

Figure 84:
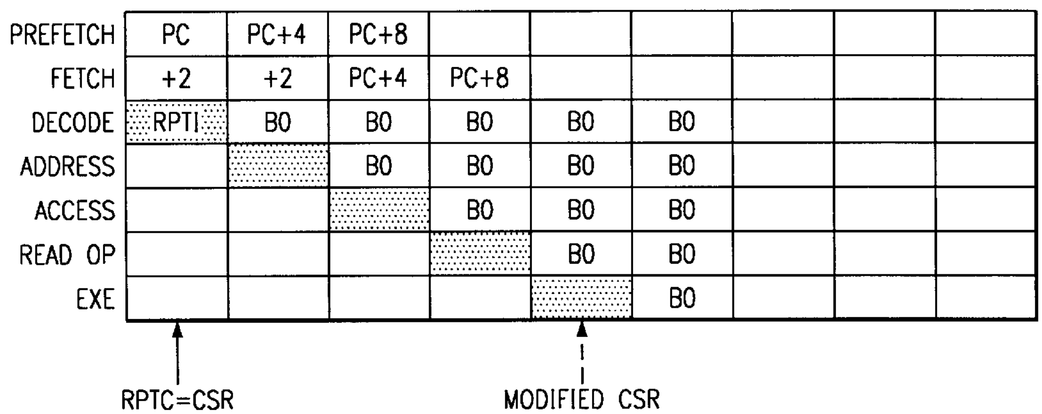
FIG. 84 is a timing diagram illustrating a Repeat Single where count is defined by CSR register.

FIG. 84 is a timing diagram illustrating a Repeat Single where the count is defined by the CSR register. the processor allows the Repeat Single Counter to be preloaded by accessing a "Computed Single Counter" CSR. Thus, operations may be performed on it. In this case, the Repeat Single instruction will indicate which operation should be performed on CSR, and the Iteration Count will be taken from the current CSR. As shown in FIG. 84, distances between RPTI instructions should be at least five cycles. If a normal Repeat Single is used after a RPTI, there is no restriction on latency.

Figure 85:
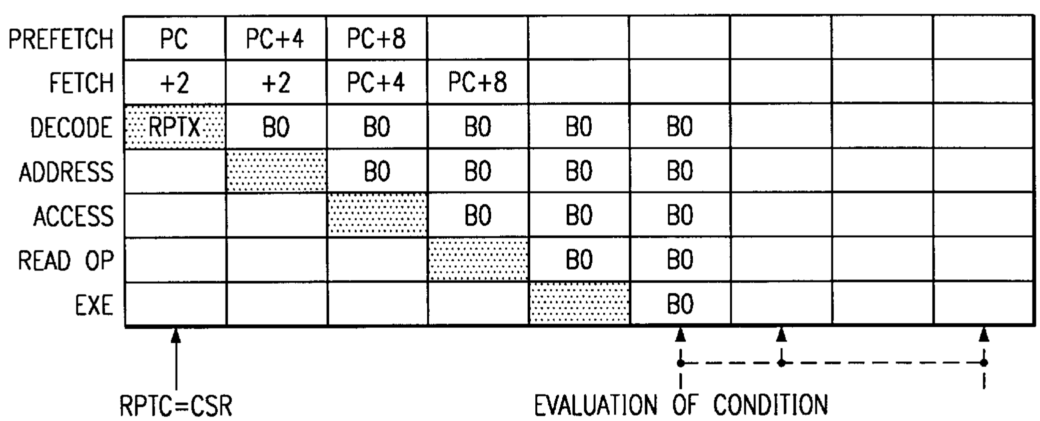
FIG. 85 is a timing diagram illustrating a Single Repeat Conditional (RPTX)

FIG. 85 is a timing diagram illustrating a Single Repeat Conditional (RPTX). The repeat counter is decremented at every valid cycle until the condition is true. A copy of the four LSB of the repeat counter is propagated through the pipeline until the execute stage. When the condition is true, this copy is used as a relative offset for a jump to a label (JMPX). The condition is evaluated at every execute stage of the repeated instruction. The minimum number of cycles to reach the condition is four. If the iteration count is less than 3, the condition is evaluated after the end of the loop. Latency between the RPTX and the switch instruction is four cycles. Because up to sixteen labels can be used, the maximum advance is set to sixteen words (the maximum capacity of the IBQ). This means that the RPTX instruction can not be used inside an internal repeat block.

7.3.4 Conditional Execution Using XC

The XC instruction has no impact on instruction dispatches.

FIG. 86 illustrates a Long Offset Instruction. An instruction using a long offset (if it is a 16-bit long offset) is treated as a large instruction with no parallelism. (format up to 48-bit, this can be guaranteed by the way the Instruction Buffer Queue is managed). A parallel instruction has been replaced by either 16-bit long offset, or by 24-bit long offset (when instruction format is less than 32-bit) . . . This means that before reading it, the processor has to check if there are enough words available inside instruction buffer queue. (At least 3 if aligned, otherwise more than 3)

FIG. 87 illustrates the case of an instruction with a 24-bit long offset. In 32-bit instruction format, the 24-bit long offset is read sequentially.

Interrupt

An interrupt can be handled as a nondelayed call function from the instruction buffer point of view, as illustrated by FIG. 88. In this case, the branch mechanism is very similar to the context switch control flow. The major differences are:

- Program data is transferred directly from the PDB to the WPC without writing into the IBQ
- The constant is a 32-bit constant, where the first twenty-four bits indicate ISRvect2 and the following eight bits denote which register to save during low interrupt flow
- One instruction is executed in the delayed slot FIG. 89 is a timing diagram illustrating an interrupt in a regular flow. When an interrupt occurs, M3 and M4 are not decoded. They will be executed on return from the interrupt. ST1 is saved in the interrupt debug register (IDB). During this flow, the ISRO will not have a coherent RPC. This means that the instruction cannot be a control instruction using a relative offset. The format of ISR0 is limited to four bytes.

Interrupt Context

There are two context registers. One is used in a manner similar to that of the call instruction. It will contain information listed below:

Internal Repeat Block: When an interrupt occurs during an internal repeat block, the current position of read pointer is saved locally, control associated with the internal repeat block is with the Status Register, and the maximum fetch advance is returned to its normal size (similar to when a branch outside the loop occurs). The repeat block counter is not saved so this must be done in the interrupt handling software if required.

Repeat Single: When an interrupt occurs during a repeat single, it treated like a call function. The current pointers are saved locally. The repeat block counter is not saved so this must be done in the interrupt handling software if required.

Repeat Single Conditional: When an interrupt occurs during a repeat single conditional, the interrupt will be performed at the last iteration where the condition is known. This insures that the index for the JMPX is known. (if not we need to save also its conditional field).

Execute Conditional: When an interrupt occurs during an execute conditional, the information relative to the condition's evaluation must be saved. Two bits are needed to encode whether the condition is on the execute or address phase and whether the condition is true or false.

Context

During the interrupt instruction or hardware interrupt, three cycles are required to switch to the interrupt routine. These cycles are used to save the following internal information on the memory stack:

- status of loop (internal, active)
- status of repeat single (active or not).
- local copy of the read pointer (24-bits)
- delayed slot used
- local copy of target address (24-bits)

Using only a 32-bit access to memory, it is possible to save this basic information in two cycles. Also, part of the status register ST0, and all of the status register ST1 are saved in parallel with the interrupt debug register (16-bit).

Figure 90:
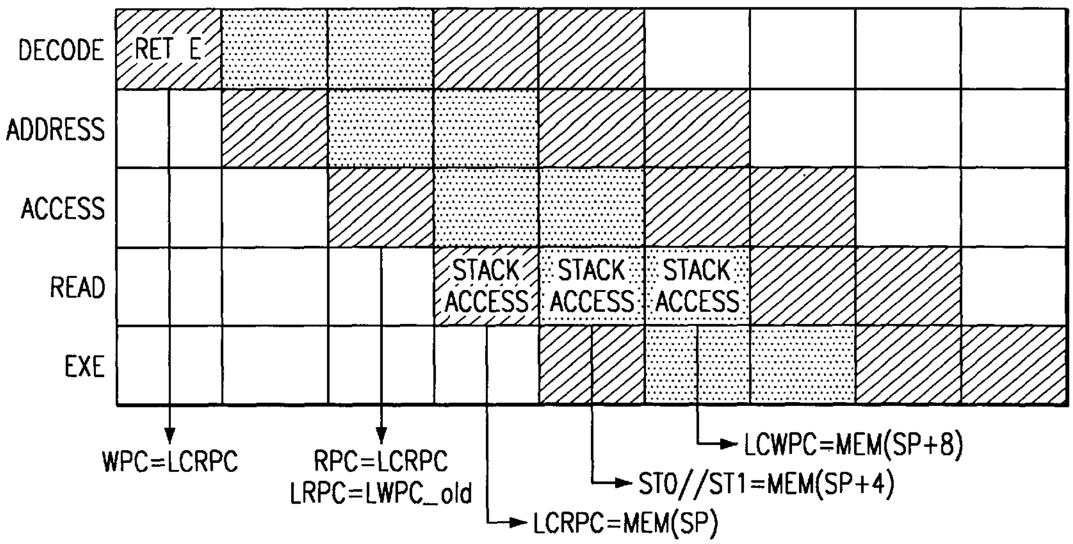
FIG. 90 is a timing diagram illustrating a Return from Interrupt (general case)

FIG. 90 is a timing diagram illustrating a return from interrupt (general case). The status register is restored just before the return from interrupt. This return is a normal return which can be delayed by two cycles. During the return phase, the memory stack will be accessed to re-load the context of the process executing before the interrupt. This context consists of the following:

- status of loop (internal, active, level)
- status of repeat single (active or not).
- level of call (inner call or not)
- local copy of memory read pointer (24-bits)
- local copy of memory write pointer (24-bits)

Part of the data flow is also restored in the ST0/ST1/IDB status registers.

Restore to Internal Repeat Block

At the next iteration following the restore, the instructions of the internal repeat block must be reloaded.

Interrupt and Control Flow

This section describes the processing sequence when an interrupt occurs during a control flow.

Figure 91:
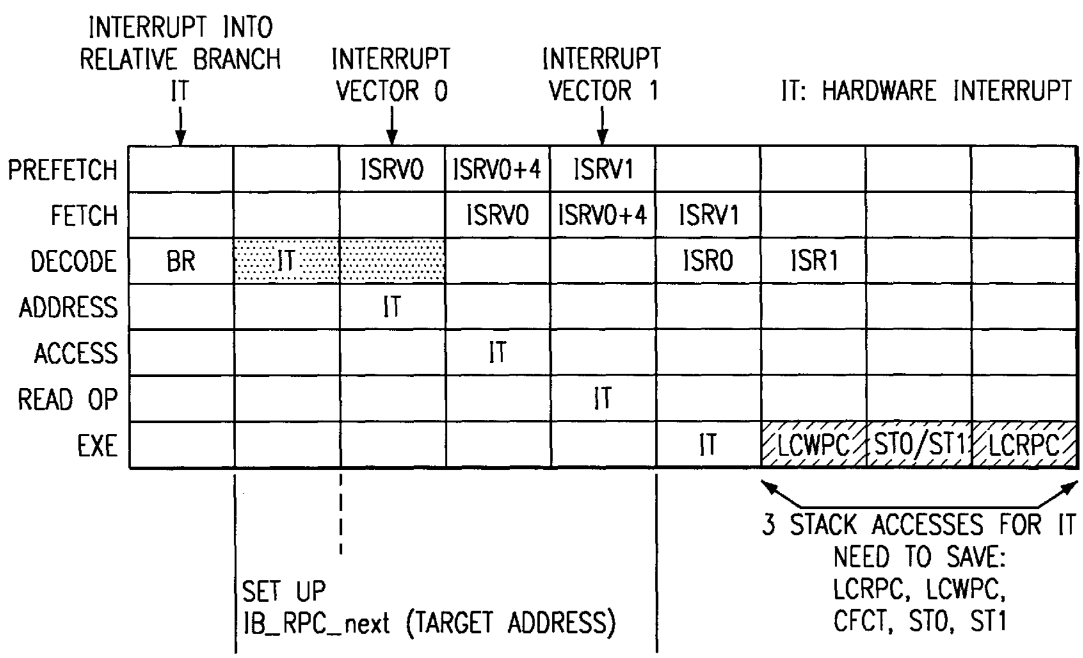
FIG. 91 is a timing diagram illustrating an Interrupt into an undelayed unconditional control instruction.

FIG. 91 is a timing diagram illustrating an interrupt during an undelayed unconditional control instruction. When an interrupt occurs during an undelayed unconditional control instruction (e.g., goto or call), it is taken before the end of control flow. When an interrupt occurs during a branch instruction, the branch control flow is not stopped. The target address of the branch (computed on the address phase for relative branch, or decode phase for absolute branch) is saved locally in the LCWPC. The value of the LCRPC is also set to the target address.

Figure 92:
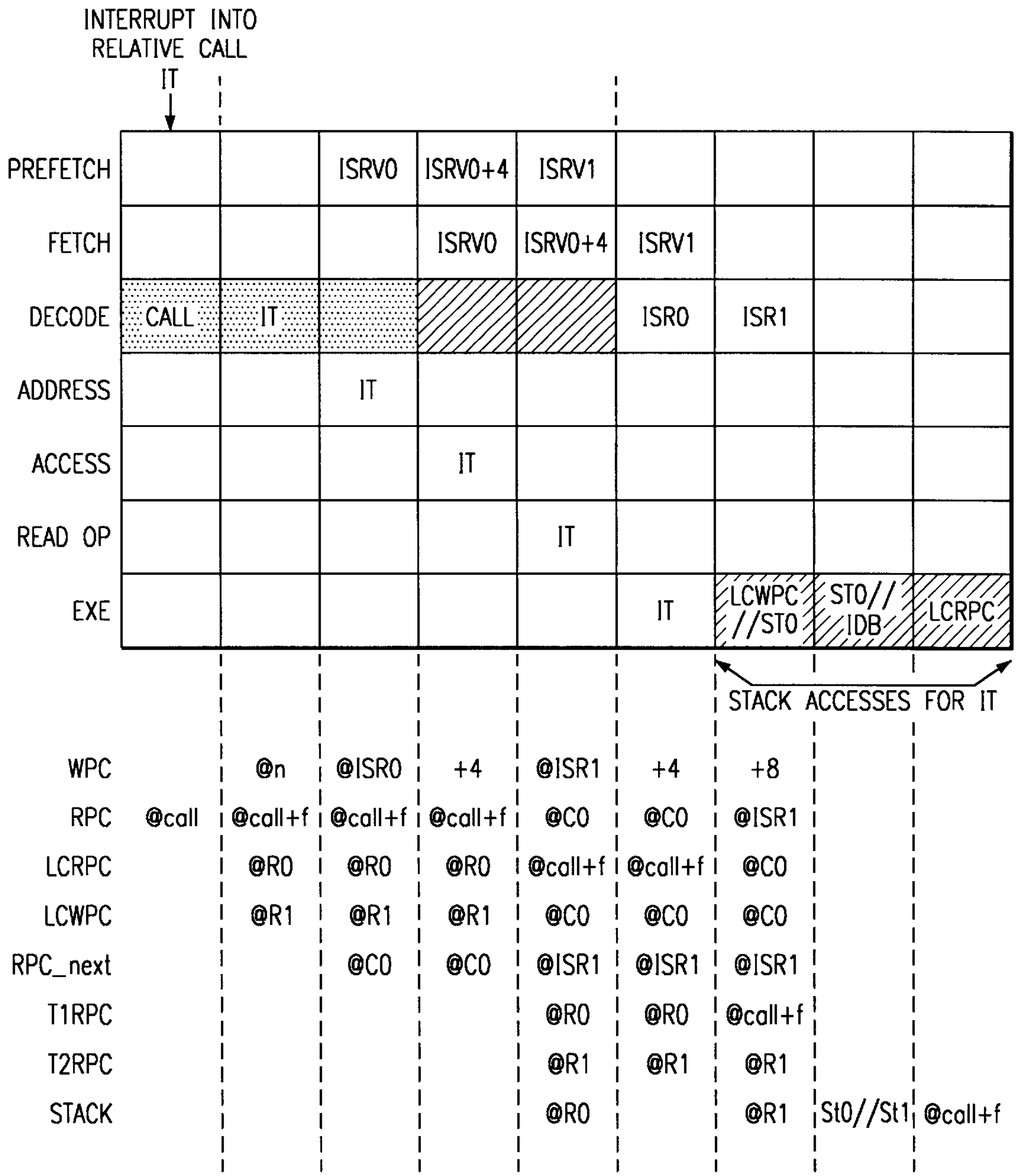
FIG. 92 is a timing diagram illustrating an Interrupt during a call instruction.

FIG. 92 is a timing diagram illustrating an interrupt during a call instruction. In terms of resources consumed, this case condition the number of register needed to support minimum latency when interrupt comes into a control flow.

As for interrupt into undelayed branch control flow, at return from interrupt instruction flow returns into the beginning of the subroutine. This means that LCRPC/LCWPC will be set to the target address by IT management, and there is also a need to save a return address from function call into LCRPC (first).

Figure 93:
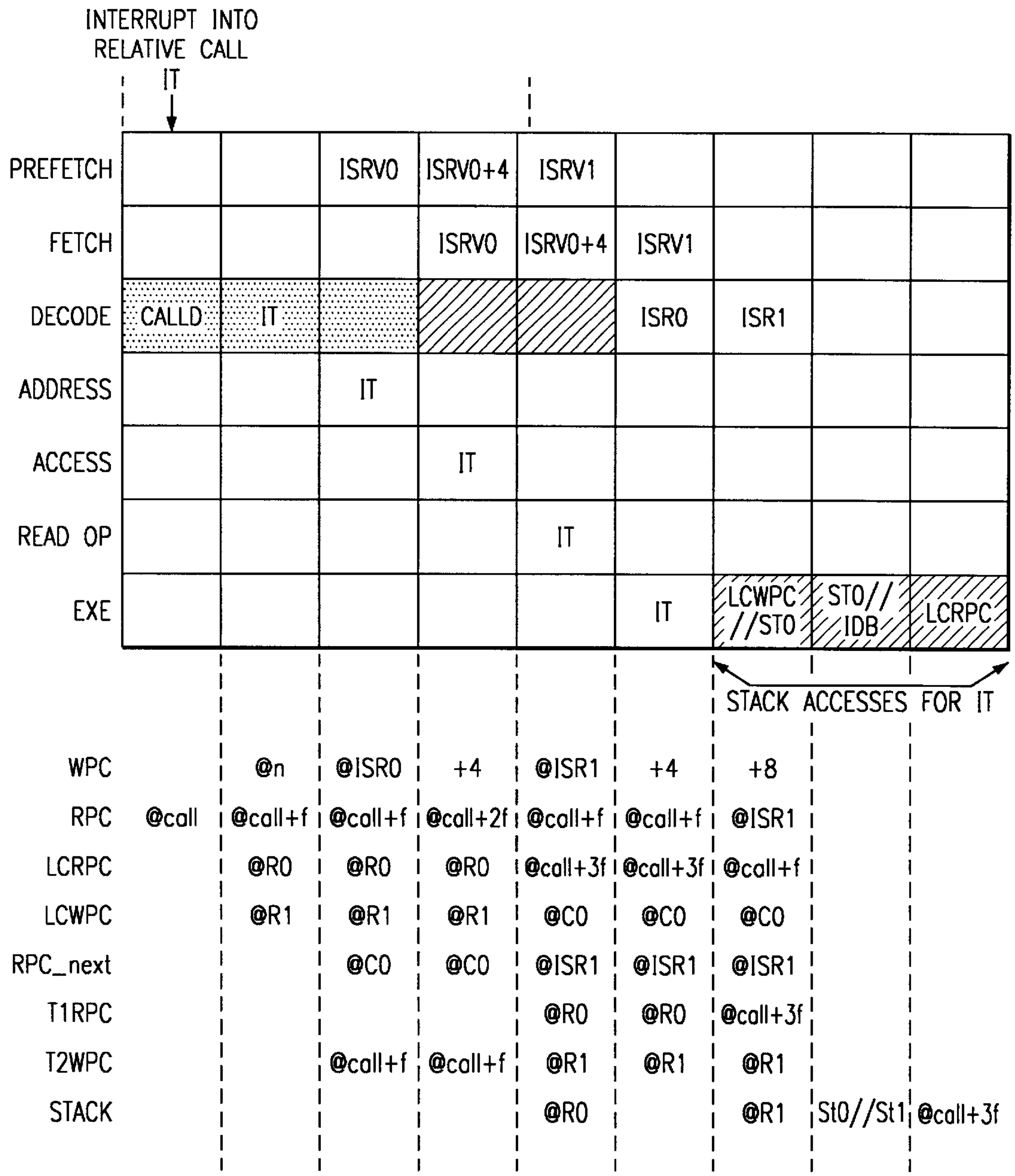
FIG. 93 is a timing diagram illustrating an interrupt into a delayed unconditional call instruction.

FIG. 93 is a timing diagram illustrating an interrupt during a delayed unconditional call instruction. For emulation purpose, we need to be able to interrupt the delayed slot of delayed instructions. Two bit of information are added to the interrupt "context" register to indicate if interrupt was during a delayed slot (and which slot) or not. If interrupt arbitration is done between the decode of the delayed instruction and before the decode of the second delayed slot, the interrupt will return to the first delayed slot. Otherwise, the return will be to the second delayed slot. When the interrupt occurs, the current RPC is saved into the LCRPC and the target address is saved on the memory stack.

Return from interrupt during a delayed slot.

Because the format of the delayed instruction is not known, the maximum availability of the slot must be guaranteed. Thus, a 48-bit slot, is required.

Figure 94:
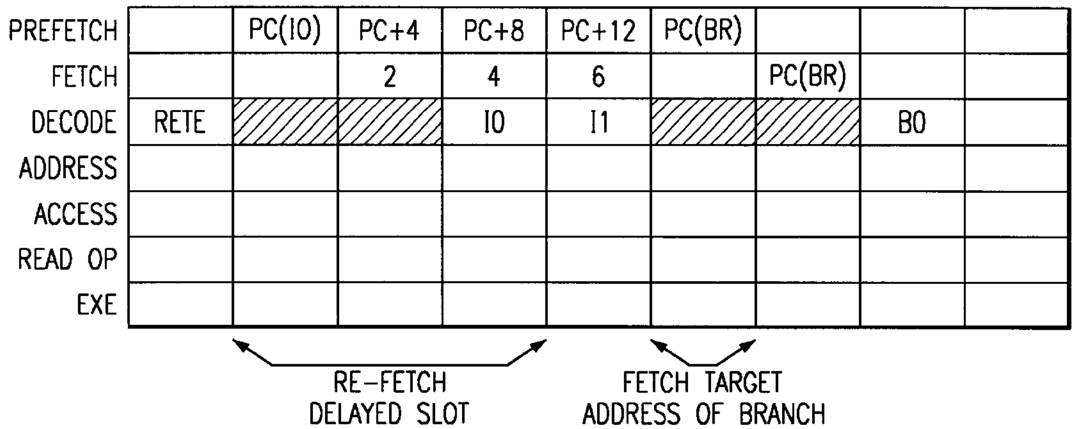
FIG. 94 is a timing diagram illustrating a Return from Interrupt into relative delayed branch, where the interrupt occurred in the first delayed slot.

FIG. 94 is a timing diagram illustrating a return from interrupt during a relative delayed branch (del=1) (interrupt during the first delayed slot).

Figure 95:
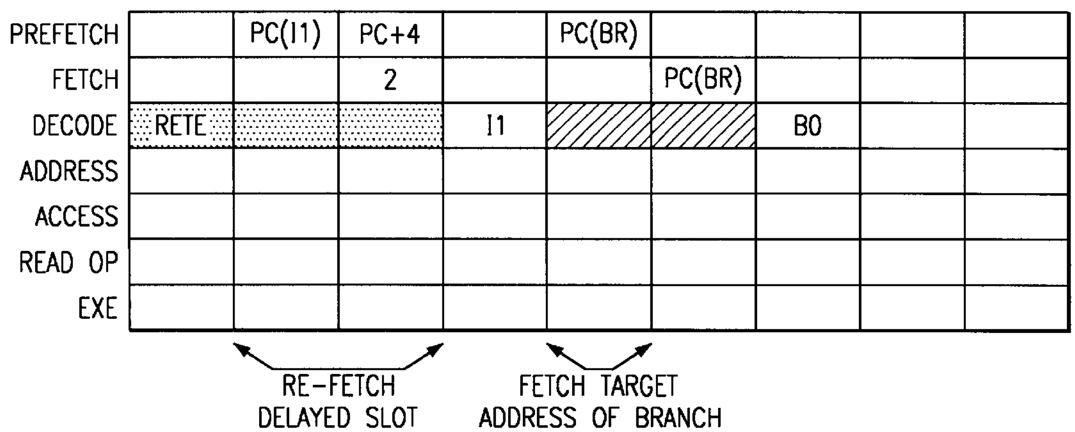
FIG. 95 is a timing diagram illustrating a Return from Interrupt into relative delayed branch wherein the interrupt was into the second delayed slot.

FIG. 95 is a timing diagram illustrating a return from interrupt during a relative delayed branch (interrupt during the second delayed slot) (del=2).

Figure 96:
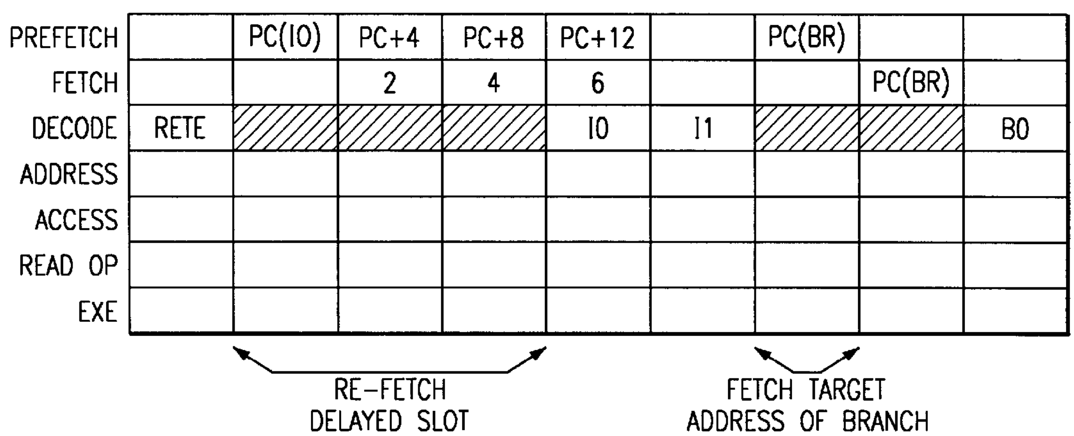
FIG. 96 is a timing diagram illustrating a Return from Interrupt into relative delayed branch wherein the interrupt was into the first delayed slot)

FIG. 96 is a timing diagram illustrating a return from interrupt during a relative delayed branch (del=1) (interrupt during the first delayed slot).

Figure 97:
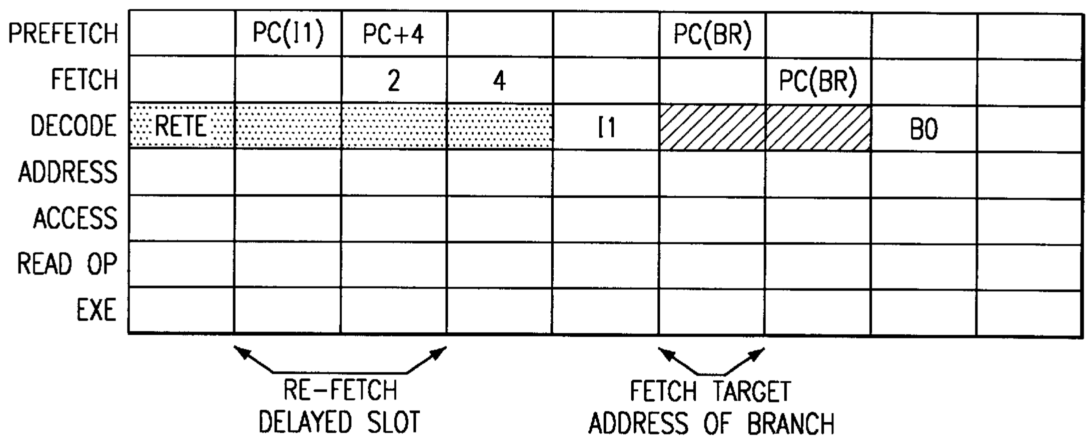
FIG. 97 is a timing diagram illustrating a Return from Interrupt into relative delayed branch wherein the interrupt was into the second delayed slot.

FIG. 97 is a timing diagram illustrating a return from interrupt during a relative delayed branch (interrupt during the second delayed slot) (del=2). To guarantee the availability of the IBQ to dispatch the delayed instruction after return from an interrupt, the branch address is set up when all delayed slots are dispatched. If a miss occurs during the re-fetch of the delayed slot, the set up of WPC to the target address is delayed, thus there is a need to delay the restore of WPC.

7.4 Stack Access

Figure 98:
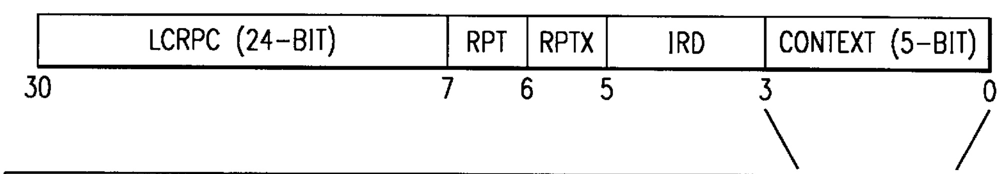
FIG. 98 illustrates the Format of the 32-bit data saved into the Stack.

FIG. 98 illustrates the format of the 32-bit data saved on the stack. The definitions below explain the fields in this figure:

IRD:

0==>Delayed Instruction

1==>Delayed slot 2

2==>Delayed slot 1

LEVEL:

0==>No Repeat Block

1==>One Level Of Repeat Block is Active

2==>Two Level Of Repeat Block are Active

RPTB1:

0==>Repeat Block of Level 1 is not Active

1==>Repeat Block Of Level 1 is Active

RPTB2:

0==>Repeat Block of Level 2 is not Active

1==>Repeat Block Of Level 2 is Active

LOC1:

0==>Repeat Block of Level 1 is External

1==>Repeat Block of Level 1 is Internal

LOC2:

0==>Repeat Block of Level 2 is External

1==>Repeat Block of Level 2 is Internal

RPT:

0==>Repeat Single is not Active

1==>Repeat Single is Active

RPTX:

0==>RPTX Instruction is not active

1==>RPTX is Active

LCPRC: Local Copy of Program Pointer which has to be saved.

Figures 99, 100, 103:
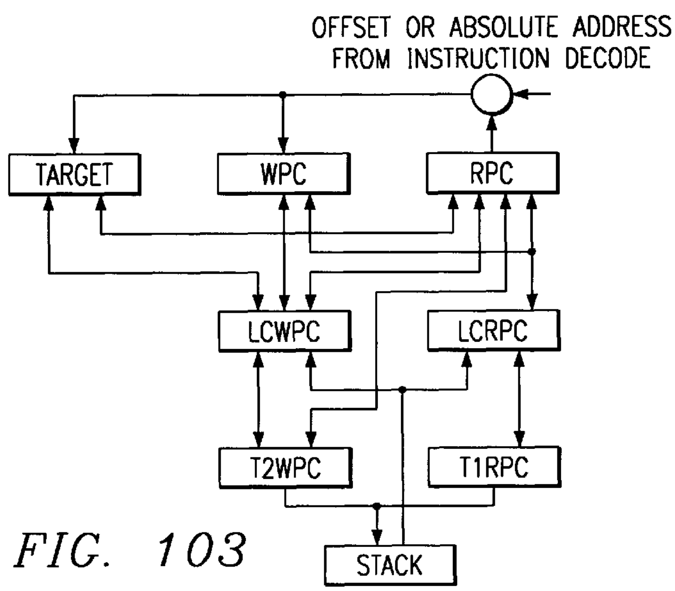
FIG. 99 is a timing diagram illustrating a Program Control And Pipeline Conflict.
FIG. 100 illustrates a Program conflict, it should not impact the Data flow before some latency which is dependant on fetch advance into IBQ.
FIG. 103 is a block diagram which is a simplified view of the program flow resources organization required to manage context save.

FIG. 99 is a timing diagram illustrating a program control and pipeline conflict. One of the key features of program flow is that its is almost independent from data flow. This means that the processor can perform a control instruction, and the time for a branch can be mask by data conflict. Thus, when the conflict is solved, the control flow is already branched. In the above case the program fetch will stop automatically when the IBQ is full. (read maximum fetch advance)

If there is a program conflict, it should not impact the data flow before some latency which is determined by the fetch advance into the IBQ, as illustrated in FIG. 100. For some of the control types (e.g., conditional flow), information from the data flow is needed (e.g., result of the condition test). For these flows, there is an impact if a data conflict occurs. The dispatch will stop when the IBQ is empty.

8. Interrupts

Interrupts are hardware or software-driven signals that cause the processor CPU to suspend its main program and execute another task, an interrupt service routine (ISR).

A software interrupt is requested by a program instruction ( e.g., intr(k5), trap(k5), reset)

A hardware interrupt is requested by a signal from a physical device.

Hardware interrupts may be triggered from many different events families:

1. Device pin events
2. Internal system errors
3. Megacell generic peripheral events
4. ASIC domain (user's gates) events
5. HOST processor
6. Emulation events When multiple hardware interrupts are triggered concurrently, the processor services them according to a set priority ranking in which level 0 is the highest priority. See the interrupt table in a previous section. Each of the processor interrupts, whether hardware or software, falls in one of the following categories:

Low Priority Maskable Interrupts

These are hardware or software interrupts that can be blocked or enabled by software. The processor supports up to twenty-two user-maskable interrupts (INT23–INT2). These interrupts are blocked when in debug mode and if the device is halted.

Debug Interrupts

These are hardware interrupts that can be blocked or enabled by software. When in debug mode, even if the device is halted, the interrupt subroutine is processed as a high priority event and then returns to halt mode. The debug interrupts ignore the global interrupt mask INTM when the CPU is at a debug STOP. Whenever the CPU is executing code, the INTM is honored. The processor supports up to twenty-two high debug user-maskable interrupts (INT23–INT2). Note that software interrupts are not sensitive to DBIMR0 and DBIMR1.

Non-maskable Interrupts

These interrupts cannot be blocked. The CPU always acknowledges this type of interrupt and branches from the main program to the associated ISR. The processor non-maskable interrupts include all software interrupts and two external hardware interrupts: RESET and NMI. Interrupts are globally disabled when NMI is asserted. The main difference between RESET and NMI is that RESET affects all the processor operating modes. Note that RESET and NMI can also be asserted by software.

Dedicated Emulation Interrupts

Two channels are dedicated to real time emulation support. These emulation events are maskable and can be programmed as debug interrupts. They get the lowest priority (see the interrupts priority table).

RTOS→Real time operating system

DLOG→Data logging

Bus Error Interrupt

This interrupt is generated when the computed address is pointing to a location in memory space where no physical memory or register resides. This interrupt is maskable and can be programmed as a debug interrupt (i.e., DMA operating when execution is halted and pointing to wrong memory location). This bus error event gets the highest priority after RESET and NMI.

Traps (instructions tagged in the Instruction buffer from HWBP logic) don't set the IFR bit.

The three main steps involved in interrupt processing are:

1. Receive interrupt request: Suspension of the main program is requested via software or hardware. If the interrupt source is requesting a maskable interrupt, the corresponding bit in the interrupt flag register (IFR) is set when the interrupt is received.
2. Acknowledge interrupt: The CPU must acknowledge the interrupt request. If the interrupt is maskable, predetermined conditions must be met in order for the CPU to acknowledge it. For non-maskable interrupts and for software interrupts, acknowledgment is immediate.
3. Execute interrupt service routine: Once the interrupt is acknowledged, depending on level of priority, the CPU executes the code starting at the vector location or branches to the ISR address stored at the vector location and executes in the 'delayed slot' the instruction following the ISR address.

8.1 Interrupt Flag Register (IFR0,IFR1)

IFR0 and IFR1 are memory-mapped CPU registers that identify and clear active interrupts. An interrupt sets its corresponding interrupt flag in IFR0 and IFR1 until the interrupt is taken. Tables 64 and 65 show the bit assignments. The interrupt flag is cleared from below events:

System reset

Interrupt trap taken

Software clear ('1' written to the appropriate bit in IFR)

intr(k5) execution with appropriate vector

A '1' in any IFRx bit indicates a pending interrupt. Any pending interrupt can be cleared by software by writing a '1' to the appropriate bit in the IFRx. The user software can't set the IFRx's flags.

The emulator software can set/clear IFRx's flags from a DT-DMA transaction:

IFR0 flag set from DT-DMA→bit 0='1' and write a '1' to the appropriate bit in IFR0

IFR0 flag clear from Dt-DMA→bit 0='0' and write a '1' to the appropriate bit in IFR0

IFR1 flag set from DT-DMA→bit 15='1' and write a '1' to the appropriate bit in IFR1

IFR1 flag clear from Dt-DMA→bit 15='0' and write a '1' to the appropriate bit in IFR1

There is no IFRx register bit associated with the EMU set/clear indicator.

TABLE 64

IFR0 register bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| I | I | I | I | I | I | I | I | I | I | I | I | I | I | — | E |
| F | F | F | F | F | F | F | F | F | F | F | F | F | F | | M |
| G | G | G | G | G | G | G | G | G | G | G | G | G | G | | U |
| 1 | 1 | 1 | 1 | 1 | 1 | 0 | 0 | 0 | 0 | 0 | 0 | 0 | 0 | | set |
| 5 | 4 | 3 | 2 | 1 | 0 | 9 | 8 | 7 | 6 | 5 | 4 | 3 | 2 | | ctr |

TABLE 65

IFR1 register bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| E | | | | | I | I | I | I | I | I | I | I | I | I | I |
| M | | | | | R | D | B | F | F | F | F | F | F | F | F |
| U | | | | | T | L | E | G | G | G | G | G | G | G | G |
| set | | | | | O | O | R | 2 | 2 | 2 | 2 | 1 | 1 | 1 | 1 |
| clr | | | | | S | G | R | 3 | 2 | 1 | 0 | 9 | 8 | 7 | 6 |

8.2 Interrupt Mask Register (IMR0,IMR1)

Tables 66 and 67 show the bit assignments of the interrupt mask registers. If the global interrupts mask bit INTM stored into status register ST1 is cleared, a '1' in one of the IENxx bits enables the corresponding interrupt. Neither NMI or RESET is included in the IMR. The IEBERR bit enables a memory or peripheral bus error to trigger an interrupt. A dedicated high priority channel is assigned to bus error interrupt. When the software is under development, the user has the capability to break on a bus error by setting a breakpoint within the 'Bus error ISR'. RTOS and DLOG interrupts are taken regardless of DBGM.

TABLE 66

IMR0 register bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| I | I | I | I | I | I | I | I | I | I | I | I | I | I | — | — |
| E | E | E | E | E | E | E | E | E | E | E | E | E | E | | |
| N | N | N | N | N | N | N | N | N | N | N | N | N | N | | |
| 1 | 1 | 1 | 1 | 1 | 1 | 0 | 0 | 0 | 0 | 0 | 0 | 0 | 0 | | |
| 5 | 4 | 3 | 2 | 1 | 0 | 9 | 8 | 7 | 6 | 5 | 4 | 3 | 2 | | |

TABLE 67

IMR1 register bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | I | I | I | I | I | I | I | I | I | I | I |
| | | | | | E | E | E | E | E | E | E | E | E | E | E |
| | | | | | R | D | B | N | N | N | N | N | N | N | N |
| | | | | | T | L | E | 2 | 2 | 2 | 2 | 1 | 1 | 1 | 1 |
| | | | | | O | O | R | 3 | 2 | 1 | 0 | 9 | 8 | 7 | 6 |
| | | | | | S | G | R | | | | | | | | |

8.3 Debug Interrupt Register (DBIMR0,DBIMR1)

Tables 68 and 69 show the bit assignments for the debug interrupt registers. When the device is in debug mode, if the IDBxx bit is set then a debug interrupt (INT2 to INT23) will be taken even if the device has previously entered the HALT mode. Once the ISR execution is completed, the device returns back to HALT. The IDBxx bits have no effect when debug is disabled. The debug interrupts ignore the global INTM status bit when the CPU is at debug STOP. DBIMR0 and DBIMR1 are cleared from hardware reset and are not affected by software reset. RESET and NMI don't appear in the DBIMR1 register. In stop mode, NMI and RESET have no effect until the clocks reapply from a RUN or STEP directive. In real time mode, NMI and RESET are always taken.

TABLE 68

DBIMR0 register bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| IDB15 | IDB14 | IDB13 | IDB12 | IDB11 | IDB10 | IDB09 | IDB08 | IDB07 | IDB06 | IDB05 | IDB04 | IDB03 | IDB02 | — | — |

TABLE 69

DBIMR1 register bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | IDBRTOS | IDBDLOG | IDBERR | IDB23 | IDB22 | IDB21 | IDB20 | IDB19 | IDB18 | IDB17 | IDB16 |

8.4 Interrupt Request

An interrupt is requested by a hardware device or by a software instruction. When an interrupt request occurs, the corresponding IFGxx flag is activated in the interrupt flag register IFR0 or IFR1. This flag is activated whether or not the interrupt is later acknowledged by the processor. The flag is automatically cleared when its corresponding interrupt is taken.

8.4.1 Hardware Interrupt Requests

On the processor core boundary, there is no difference between hardware interrupt requests generated from device pins, standard peripheral internal requests, ASIC domain logic requests, HOST CPU requests or internal requests like system errors. Internal interrupt sources like bus error or emulation have their own internal channel. There is no associated request pin at the CPU boundary. The priority of internal interrupts is fixed.

The processor supports a total of 24 interrupt requests lines which are split into a first set of 16 lines, usually dedicated to DSP, and a second set of 8 lines which can be either assigned to the DSP or the HOST in a dual processor system. The vectors re-mapping of these two sets of interrupts is independent. This scheme allows the HOST to define the task number associated to the request by updating the interrupt vector in the communication RAM (API__RAM).

Two internal interrupt requests (DLOG, RTOS) are assigned to real time emulation for data logging and real time operating system support.

One full cycle is allowed to propagate the interrupt request from the source (user gates, peripheral, synchronous external event, HOST interface) to the interrupt flag within the CPU.

All the processor core interrupt requests inputs are assumed synchronous with the system clock. The interrupt request pins are edge sensitive. The IFGxx interrupt flag is set upon a high to low pin transition.

If an application requires merging a group of low priority events through a single channel then an interrupt handler is required to interface these peripherals and the CPU. The external bus bridge doesn't provide any support for interrupt requests merging; such hardware has to be implemented in 'User gates'.

8.4.2 Software Interrupt Requests

The "intr(k5)" instruction permits execution of any interrupt service routine. The instruction operand k5 indicates which interrupt vector location the CPU branches to. When the software interrupt is acknowledged, the global interrupts mask INTM is set to disable maskable interrupts.

The "trap(k5)" instruction performs the same function as the intr(k5) instruction without setting the INTM bit.

The "reset" instruction performs a non-maskable software reset that can be used any time to put the processor in a known state. The reset instruction affects ST0, ST1, ST2, IFR0, and IFR1 but doesn't affect ST3 or the interrupt vectors pointer (IVPD, IVPH). When the reset instruction is acknowledged, the INTM is set to "1" to disable maskable interrupts. All pending interrupts in IFR0,IFR1 are cleared. The initialization of the system control register, the interrupt vectors pointer, and the peripheral registers is different from the initialization done by a hardware reset.

8.5 Interrupt Acknowledge

After an interrupt has been requested by hardware or software, the CPU must decide whether to acknowledge the request. Software interrupts and non-maskable interrupts are acknowledged immediately. Maskable hardware interrupts are acknowledged only if the priority is highest, the global interrupts mask INTM in ST1 register is cleared, and the associated interrupt enable bit IENxx in the IMR0 or IMR1 register is set. Each of the maskable interrupts has its own enable bit.

If the CPU acknowledges a maskable hardware interrupt, the PC is loaded with the appropriate address and fetches the software vector. During the vector fetch cycle, the CPU generates an acknowledge signal IACK, which clears the appropriate interrupt flag bit. The vector fetch cycle is qualified by the IACK signal and may be used to provide external visibility on interrupts when the vectors table resides in internal memory.

The interrupt arbitration is performed on top of the last main program instruction decode pipeline cycle.

8.6 Interrupt Subroutine Execution

The emulation requirement for processor is to support breakpoints and traps within delayed slots of instructions (egl, dgoto, dall) and save the contents of the debug status register when an interrupt is taken. This drives the interrupt context save scheme.

After acknowledging the interrupt, the CPU:

Stores the 24-bit program counter (PC__exec) which is the return address on the top of the stack in data memory in parallel with a byte of internal variables required to manage the instruction buffer and the program flow. This is transparent to the software programmer.

Loads the PC with the address of the interrupt vector.

Stores the 24-bit target address of a potential dgoto/dcall instruction in parallel with the seven most significant bits of the ST0 status register (ACOV3, . . . , ACOV0, C, TC2, TC1) and the single bit delayed slot number.

Stores the debug status register DBGSTAT which is physically implemented within the ICEMaker module in parallel with the status register ST1. This includes the DBGM, EALLOW and INTM bits as per emulation requirement.

Fetches the 24-bit absolute ISR start address at the vector address.

Branches to the interrupt subroutine.

Executes the instruction stored immediately after the interrupt vector. The maximum allowed format is thirty-two bits. If the programmer wants to branch directly to the ISR, a "NOP" instruction is inserted between the two consecutive vectors.

Executes the ISR until a "return" instruction is encountered.

Pops from the top of the stack the return address and load it into the PC__fetch.

Refills the instruction buffer from the return address regardless of fetch advance and aligns PC__exec with PC__fetch.

Continues executing the main program.

8.7 Interrupt Context Save

When an interrupt service routine is executed, certain registers must be saved on the stack, as shown in Table 70. When the program returns from the ISR by a "[d]return__ enable, if (cond) [d]return", the software must restore the content of these registers. The stack is also used for subroutine calls. The processor supports calls within the ISR.

TABLE 70

CPU registers automatically saved in interrupt context switch

| | User Stack | System Stack | Comment |
|---|---|---|---|
| 1st slot | Branch/Call target [15:0] | Branch/Call target [23:16] ST0[15:9] | ST0 includes: ACOV3, ACOV2, ACOV1, ACOV0, C, TC2, TC1 Extra bit available |
| 2nd slot | ST1 (16 bit) | Debug Status Register (16 bit) | ST1 includes: DBGM, EALLOW, ABORTI, INTM, Conditional execution context (2 bit) |
| 3rd slot | PC__exec [15:0] | PC__exec [23:16] CFCT register (context = 8 bit) | CFCT includes: Delayed slot context (2 bit) CFCT is transparent for the user. |

CPU registers are saved and restored by the following instructions:

| | |
|---|---|
| ● push(ACx) | ACx = pop() |
| ● push(DAx) | DAx = pop() |
| ● push(src1,src2) | dst1,dst2 = pop() |
| ● push(src,Smem) | dst,Smem = pop() |
| ● dbl(push(ACx)) | dbl(ACx) = pop() |

Because the CPU registers and peripheral registers are memory mapped, the following instructions can be used to transfer these registers to and from the stack:

| | |
|---|---|
| ● Direct access | |
| push(Smem) II mmap() | Smem = pop() II mmap() |
| push(dbl(Lmem)) II mmap() | dbl(Lmem) = pop() II mmap() |
| push(src,Smem) II mmap() | dst,Smem = pop() II mmap() |
| push(Smem) II readport() | Smem = pop() II writeport() |
| push(src,Smem) II readport() | dst,Smem = pop() II writeport() |
| ● Indirect access | |
| push(Smem) | Smem = pop() |
| push(dbl(Lmem) | dbl(Lmem) = pop() |
| push(src,Smem) | dst,Smem = pop() |
| push(Smem) II readport() | Smem = pop() II writeport() |
| push(src,Smem) II readport() | dst,Smem = pop() II writeport() |

The following instructions can be used to transfer data memory values to and from the stack:

| | |
|---|---|
| ● push(Smem) | Smem = pop() I |
| ● push(dbl(Lmem)) | dbl(Lmem) = pop() |
| ● push(src,Smem) | dst,Smem = pop() |

There are a number of special considerations that the software programmer must follow when doing context saves and restores:

The context must be restored in the exact reverse order of the save.

The context restore must take into account the implicit saves performed during the switch (ST0, ST1).

BRC/BRAF 8.8 Interrupt Boundary Conditions 8.8.1 Interrupt Taken within Delayed Slot An interrupt can be taken within a delayed slot (dgoto, dcall, dreturn . . . ). This requires that the target address be saved locally upon decoding of a delayed instruction regardless of interrupt arbitration to allow for an interrupt within the delayed slot. If an interrupt occurs within the delayed slot, the context to be saves includes:

instruction (n−1)

dgoto L16 ←Interrupt case A delayed_1 ←Interrupt case B delayed_2 ←Interrupt case C 1. The 24-bit target address.
2. The 24-bit program return address within the delayed slot.
3. The 'delayed slot context' and the remaining number of delayed slots cycles to be executed after return from interrupt (one or two) which is encoded within the CFCT 8-bit register.

Taking into account other emulation requirements, the context switch can be performed through three cycles.

Conditional delayed instructions are not considered as a special case since the target will be computed according to condition evaluation and then saved into the stack. The generic flow still applies.

8.8.2 Interrupt Taken within Conditional Execution

The processor instruction set supports conditional execution. If the user wants to make a pair of instructions conditional, depending on parallelism, he has the capability to manage his code as follows:

| | |
|---|---|
| instruction (n − 1) | II if (cond) execute (AD_Unit) ← Interrupt taken |
| instruction (n + 1) | II instruction (n + 2) |

where the condition evaluated in the first step affects the execution of next pair of instructions (either only data flow or both address and data flow). Then if an interrupt occurs during the first step, it stops the conditional execution and the condition evaluation outcome has to be saved as part of the context. This is done through the 2-bit field 'XCNA, XCND' of the ST1 register, as shown in Table 71.

TABLE 71

| XCNA | XCND | Execution Option | Condition True/False | Context Definition |
|---|---|---|---|---|
| 0 | 0 | AD_unit | false | Next instruction is conditional |
| 0 | 1 | N/A | N/A | This configuration should happen and be processed as a default '11' |
| 1 | 0 | D_unit | false | Next instruction is conditional |
| 1 | 1 | — | — | Default |
| | | AD_Unit | true | Next instruction is conditional |
| | | D_unit | true | Next instruction is conditional |

Since delayed slots and conditional execution contexts are managed independently, the architecture can support context like:

| | | |
|---|---|---|
| dgoto L6 | II if (cond) execute (AD_Unit) | ← Interrupt taken |
| delayed 1_1 | II delayed 1_2 | ← Interrupt taken |
| delayed 2_1 | II delayed 2_2 | ← Interrupt taken |

Only one condition can be evaluated per cycle. Instructions pairs involving two conditional statements are rejected by the assembler.

If (cond) dgoto L8 || if (cond) execute(D_unit) ←Not supported

8.8.3 Interrupt Taken when Updating the Global Interrupt Mask INTM

If within the arbitration cycle there is an update pending on the global interrupt mask INTM from the decode of an instruction bit (ST1,INTM)=#0 or bit(ST1,INTM)=#1, the context switch and the pipeline protection hardware will ensure that no INTM update from the main program occurs after the INTM is set during the interrupt context switch. This insures the completion of the current ISR before the next event process and prevents stack overflow.

To avoid impacting interrupt latency mainly in case of NMI, the dependency tracking is managed through an interrupt disable window generated from the bits (ST1,INTM)=#0, [#1] instruction and a local INTM flag.

Figure 101:
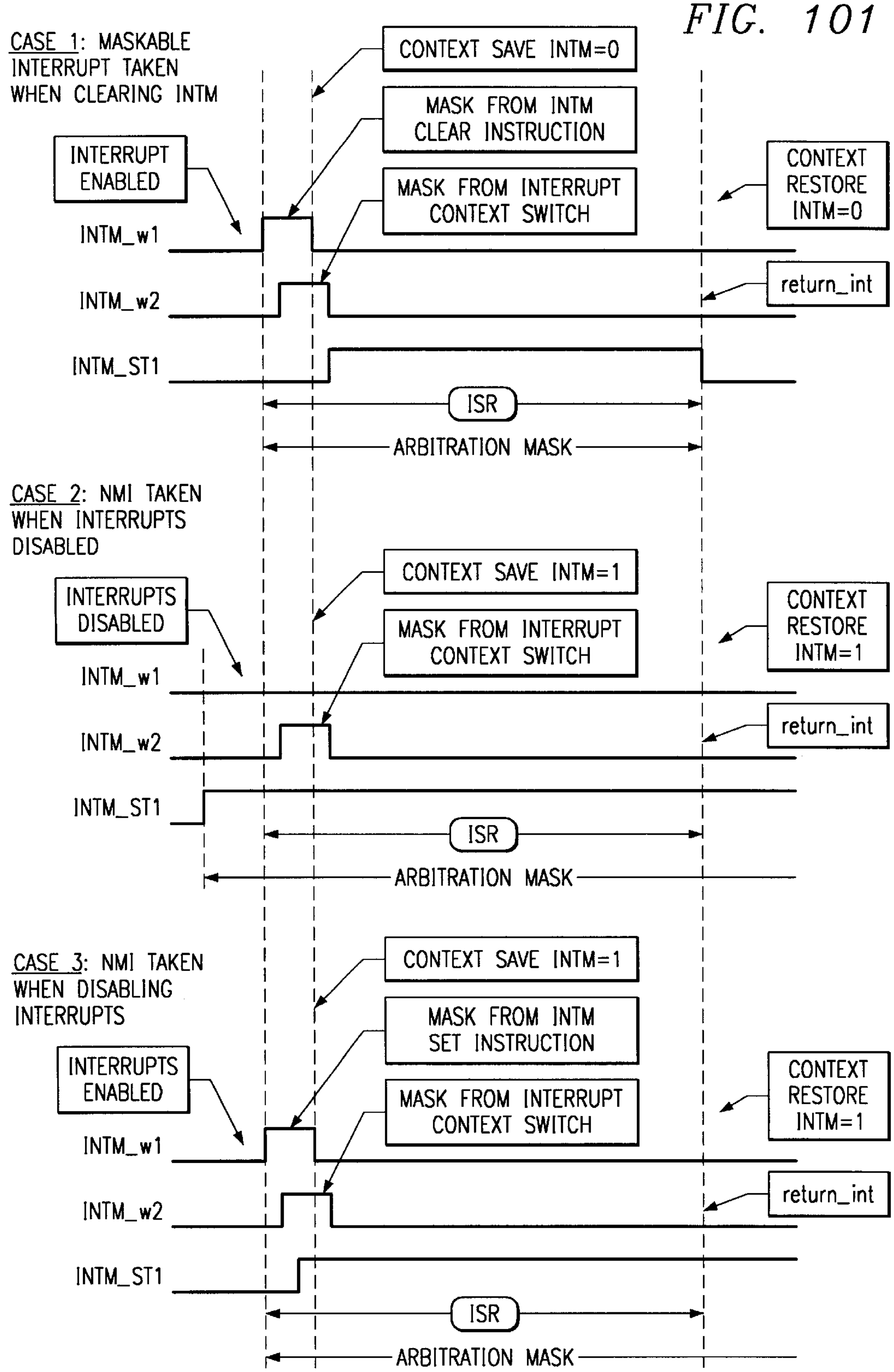
FIGS. 101 and 102 are timing diagrams which illustrate various cases of interrupts during updating of the global interrupt mask.
Figure 102:
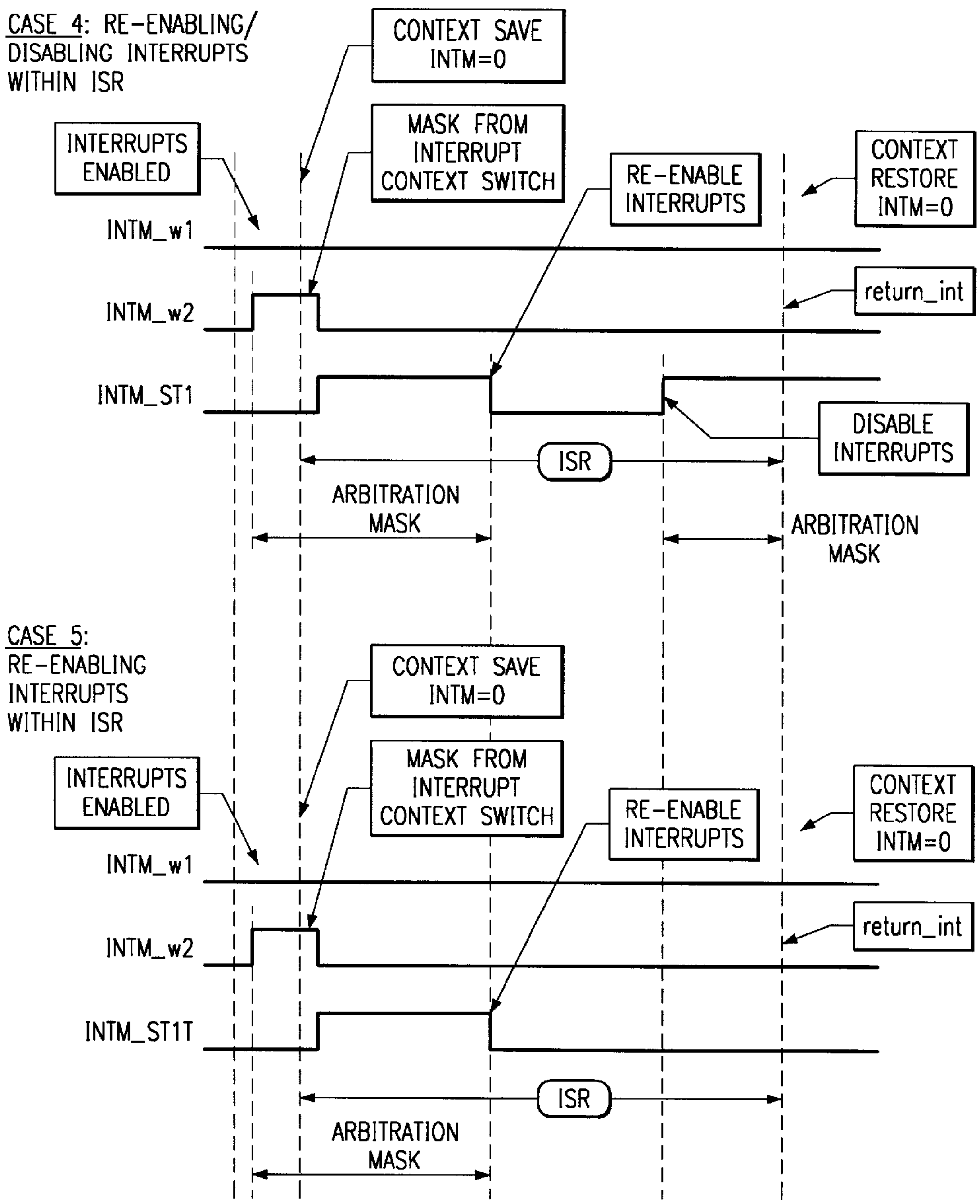

FIGS. 101 and 102 are timing diagrams illustrating various cases of interrupts during the update of the global interrupt mask:

Case 1: Maskable interrupt taken when clearing INTM.

Case 2: NMI taken when interrupts are disabled.

Case 3: NMI taken when disabling interrupts.

Case 4: Re-enabling/disabling interrupts within ISR.

Case 5: Re-enabling interrupts within ISR.

8.9 Interrupt Latency

Various aspects which affect interrupt latency are listed in this section. The processor completes all the DATA flow instructions in the pipeline before executing an interrupt.

One full system clock cycle is usually allocated to export the interrupt request from a "system clock domain peripheral" driven by the peripheral clock network, to the edge of the CPU core. A half cycle is used from the peripheral to the RHEA bridge and a half cycle from RHEA bridge to the CPU core.

The interrupt arbitration is performed on top of the decode cycle of the last executed instruction from the main program.

To allow for external events, the interrupt request synchronization has to be implemented outside of the core. The number of cycles required by the synchronization must be taken into account to determine the interrupt latency. This synchronization can be implemented in the RHEA bridge.

Instructions that are extended by wait states for slow memory access require extra time to process an interrupt.

The pipeline protection hardware has to suppress cycle insertion in case of dependency when an interrupt is taken in between two instructions.

Repeat instructions are interruptible and do not introduce extra cycle latency.

Memory long accesses (24-bit and 32-bit) introduce one cycle of latency when the address is not aligned.

Read/modify/write instructions introduce one cycle of latency.

Interrupts are taken within the delayed slot of instructions like dgoto or dcall.

The hold feature has precedence over interrupts.

Interrupts cannot be processed between "bit(ST1,INTM)=#0" and the next instruction. If an interrupt occurs during the decode phase of "bit(ST1,INTM)=#0", the CPU always completes the execution of "bit(ST1,INTM)=#0" as well as the following instruction before the pending interrupt is processed. Waiting for these instructions to complete ensures that a return can be executed in an ISR before the next interrupt is processed to protect against stack overflow.

If an ISR ends with a “return_enable” instruction, the “bit(ST1,INTM)=#0” is unnecessary.

Similar flow applies when disabling interrupts; the “bit (ST1,INTM)=#1” instruction and the instruction that follows it cannot be interrupted.

Re-mapping the interrupt vectors table to the API_RAM (HOST/DSP interface) may introduce extra latency depending on HOST/DSP priority due to arbitration of memory requests.

8.10 Re-Mapping Interrupt Vector Addresses

The interrupt vectors can be re-mapped to the beginning of any 256-byte page in program memory. They are split into two groups in order to provide the capability to define the task associated to the request to the host processor and to keep DSP interrupt vectors in non-shared DSP memory.

| | | | |
|---|---|---|---|
| ● INT01 to INT15 → IVPD | DSP | (1) |
| ● INT16 to INT23 → IVPH | HOST | (2) |

Each group of vectors may be re-mapped independently. The DSP and host interrupt priorities are interleaved to provide more flexibility to dual processor systems (see Table 71).

TABLE 71

System Priority

| System Priority | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| DSP (1) | 00 | 01 | | 02 | | 03 | 04 | 05 | | 06 | 07 | 08 | | 09 | 10 | 11 | | 12 | 13 | | | 14 | 15 | | | | |
| HOST (2) | | | | | 16 | | | | 17 | | | | 18 | | | | 19 | | | 20 | 21 | | | 22 | 23 | | |
| DEBUG | | | 24 | | | | | | | | | | | | | | | | | | | | | | | 25 | 26 |

The interrupt star/vector address re-mapping is built from three fields which are described in Table 72.

TABLE 72

Interrupt start/vector address re-mapping fields

| Class | Address [23–8] | Address [7–3] | Address [2–0] |
|---|---|---|---|
| INT01 to INT15 | IVPD [23–8] | Interrupt Number | 000 |
| INT16 to INT23 | IVPH [23–8] | Interrupt Number | 000 |
| INT24 to INT26 | IVPD [23–8] | Interrupt Number | 000 |

Emulation interrupt vectors are kept independent from host processor vectors. This insures that during debug there is no risk that the host processor will change the RTOS/DLOG vectors since these emulation vectors are not mapped into APIRAM.

At reset, all the IVPx bits are set to ‘1’. Therefore, the reset vector for hardware reset always resides at location FFFF00h.

Table 73 shows the bit assignments for the interrupt vector pointer for DSP interrupts (IVPD). The IVPD[23–08] field points to the 256-byte program page where the DSP interrupt vectors reside.

TABLE 73

IVPD register bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| IVPD23 | IVPD22 | IVPD21 | IVPD20 | IVPD19 | IVPD18 | IVPD17 | IVPD16 | IVPD15 | IVPD14 | IVPD13 | IVPD12 | IVPD11 | IVPD10 | IVPD09 | IVPD08 |

Table 74 shows the bit assignments for the interrupt vector pointer for host interrupts (IVPH). The IVPH[23–08] field points to the 256-byte program page where the host interrupt vectors reside. These vectors are usually re-mapped in the communication RAM. The HOST then has the capability to define the task number associated to the request. Keeping DSP vectors separate improves system integrity and may avoid extra cycles latency due to communication RAM arbitration.

TABLE 74

IVPH register bit assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| IVPH23 | IVPH22 | IVPH21 | IVPH20 | IVPH19 | IVPH18 | IVPH17 | IVPH16 | IVPH15 | IVPH14 | IVPH13 | IVPH12 | IVPH11 | IVPH10 | IVPH09 | IVPH08 |

8.10.1 Interrupt Table

Table 75 shows the interrupt trap number, priority, and location.

TABLE 75

Interrupt trap number, priority, and location

| TRAP/ INTR Number (K) | Priority | Hard interrupt | Soft interrupt | Location (Hexa/bytes) | Function |
|---|---|---|---|---|---|
| 0 | 0 | RESET | SINT0 | 0 | Reset (hardware and software) |
| 1 | 1 | NMI | SINT1 | 8 | Non-maskable interrupt |
| 2 | 3 | INT2 | SINT2 | 10 | Peripheral/User interrupt #2 |
| 3 | 5 | INT3 | SINT3 | 18 | Peripheral/User interrupt #3 |
| 4 | 6 | INT4 | SINT4 | 20 | Peripheral/User interrupt #4 |
| 5 | 7 | INT5 | SINT5 | 28 | Peripheral/User interrupt #5 |
| 6 | 9 | INT6 | SINT6 | 30 | Peripheral/User interrupt #6 |
| 7 | 10 | INT7 | SINT7 | 38 | Peripheral/User interrupt #7 |
| 8 | 11 | INT8 | SINT8 | 40 | Peripheral/User interrupt #8 |
| 9 | 13 | INT9 | SINT9 | 48 | Peripheral/User interrupt #9 |
| 10 | 14 | INT10 | SINT10 | 50 | Peripheral/User interrupt #10 |
| 11 | 15 | INT11 | SINT11 | 58 | Peripheral/User interrupt #11 |
| 12 | 17 | INT12 | SINT12 | 60 | Peripheral/User interrupt #12 |
| 13 | 18 | INT13 | SINT13 | 68 | Peripheral/User interrupt #13 |
| 14 | 21 | INT14 | SINT14 | 70 | Peripheral/User interrupt #14 |
| 15 | 22 | INT15 | SINT15 | 78 | Peripheral/User interrupt #15 |
| 16 | 04 | INT16 | SINT16 | 80 | Host interrupt #16 |
| 17 | 08 | INT17 | SINT17 | 88 | Host interrupt #17 |
| 18 | 12 | INT18 | SINT18 | 90 | Host interrupt #18 |
| 19 | 16 | INT19 | SINT19 | 98 | Host interrupt #19 |
| 20 | 19 | INT20 | SINT20 | A0 | Host interrupt #20 |
| 21 | 20 | INT21 | SINT21 | A8 | Host interrupt #21 |
| 22 | 23 | INT22 | SINT22 | B0 | Host interrupt #22 |
| 23 | 24 | INT23 | SINT23 | B8 | Host interrupt #23 |
| 24 | 2 | INT24 | SINT24 | C0 | Bus error interrupt #24 BERR |
| 25 | 25 | INT25 | SINT25 | C8 | Emulation interrupt #25 DLOG |
| 26 | 26 | INT26 | SINT26 | D0 | Emulation interrupt #26 RTOS |
| 27 | — | — | SINT27 | D8 | Software interrupt #27 |
| 28 | — | — | SINT28 | E0 | Software interrupt #28 |
| 29 | — | — | SINT29 | E8 | Software interrupt #29 |
| 30 | — | — | SINT30 | F0 | Software interrupt #30 |
| 31 | — | — | SINT31 | F8 | Software interrupt #31 |

8.11 CPU Resources Involved In Context Save

FIG. 103 is a block diagram presenting a simplified view of the program flow resources organization required to manage a context save. It is provided to aid in the understanding of the pipeline diagrams that detail the interrupt context save.

Figure 104:
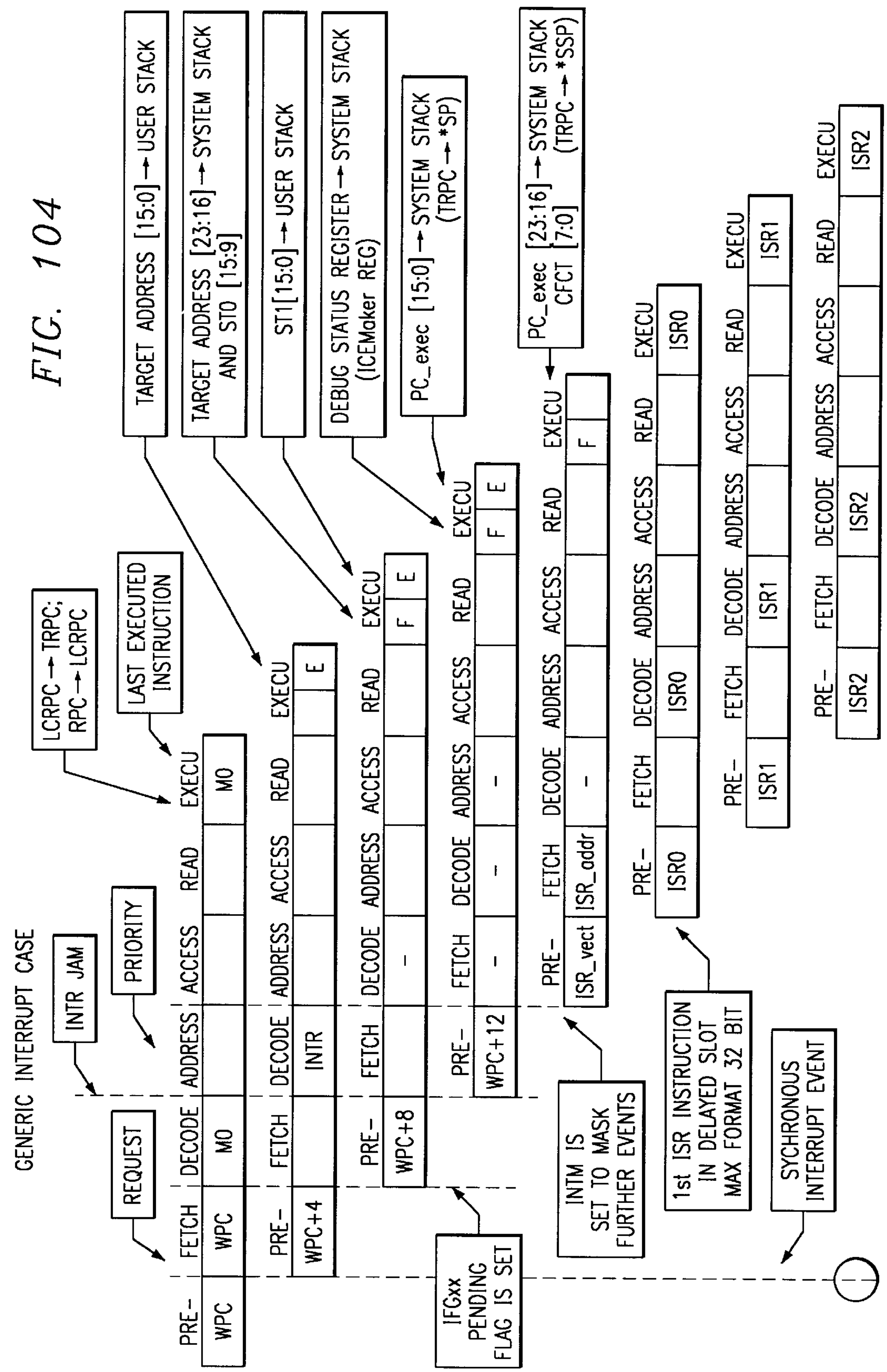
FIG. 104 is a timing diagram illustrating the generic case of Interrupts within the pipeline.

FIG. 104 is a timing diagram illustrating the generic case of interrupts within the pipeline.

Figure 105:
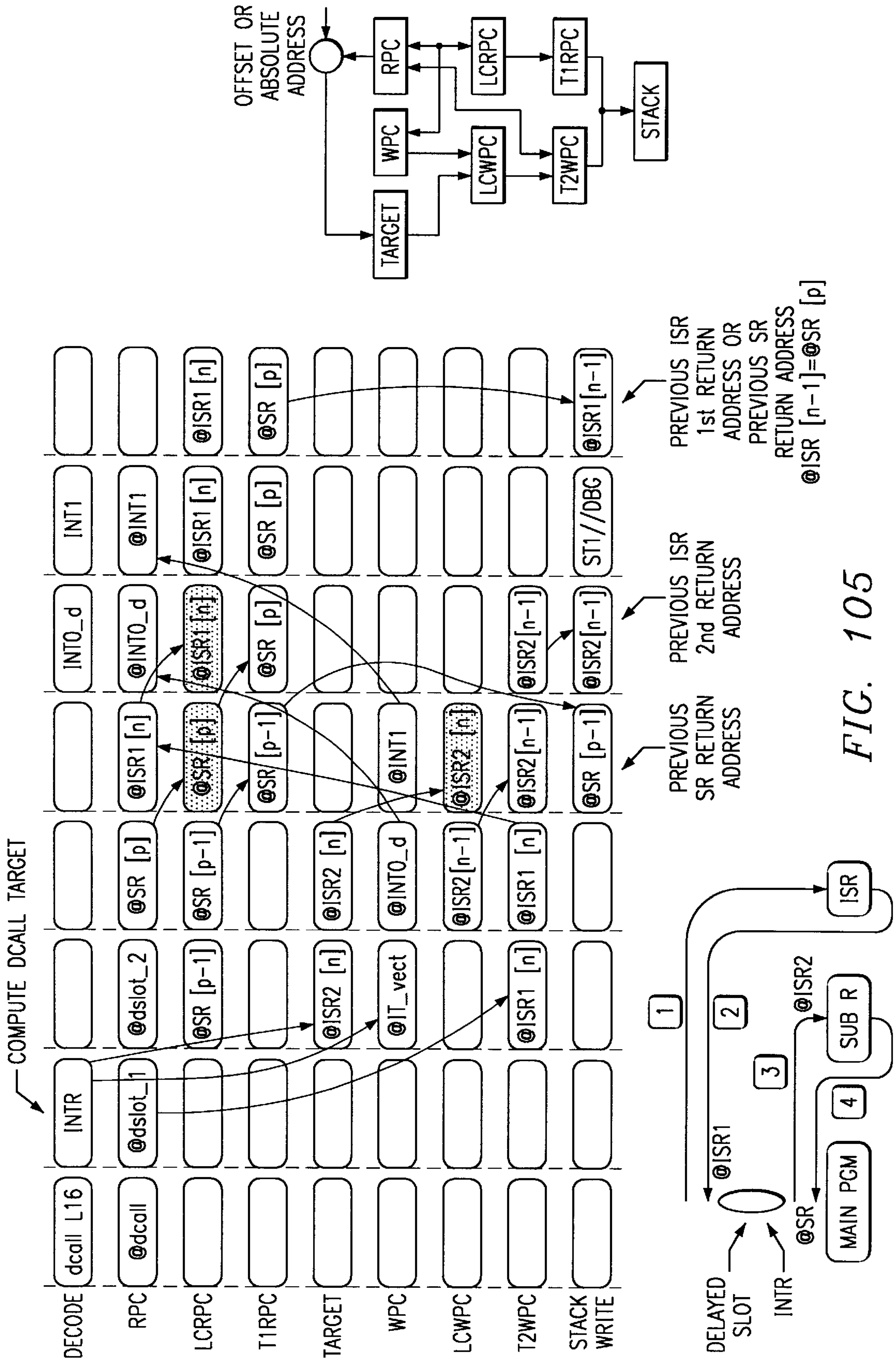
FIG. 105 is a timing diagram illustrating an Interrupt in a delayed slot_1 with a relative call.

FIG. 105 is a timing diagram illustrating an interrupt in a delayed slot_1 with a relative call.

Figure 106:
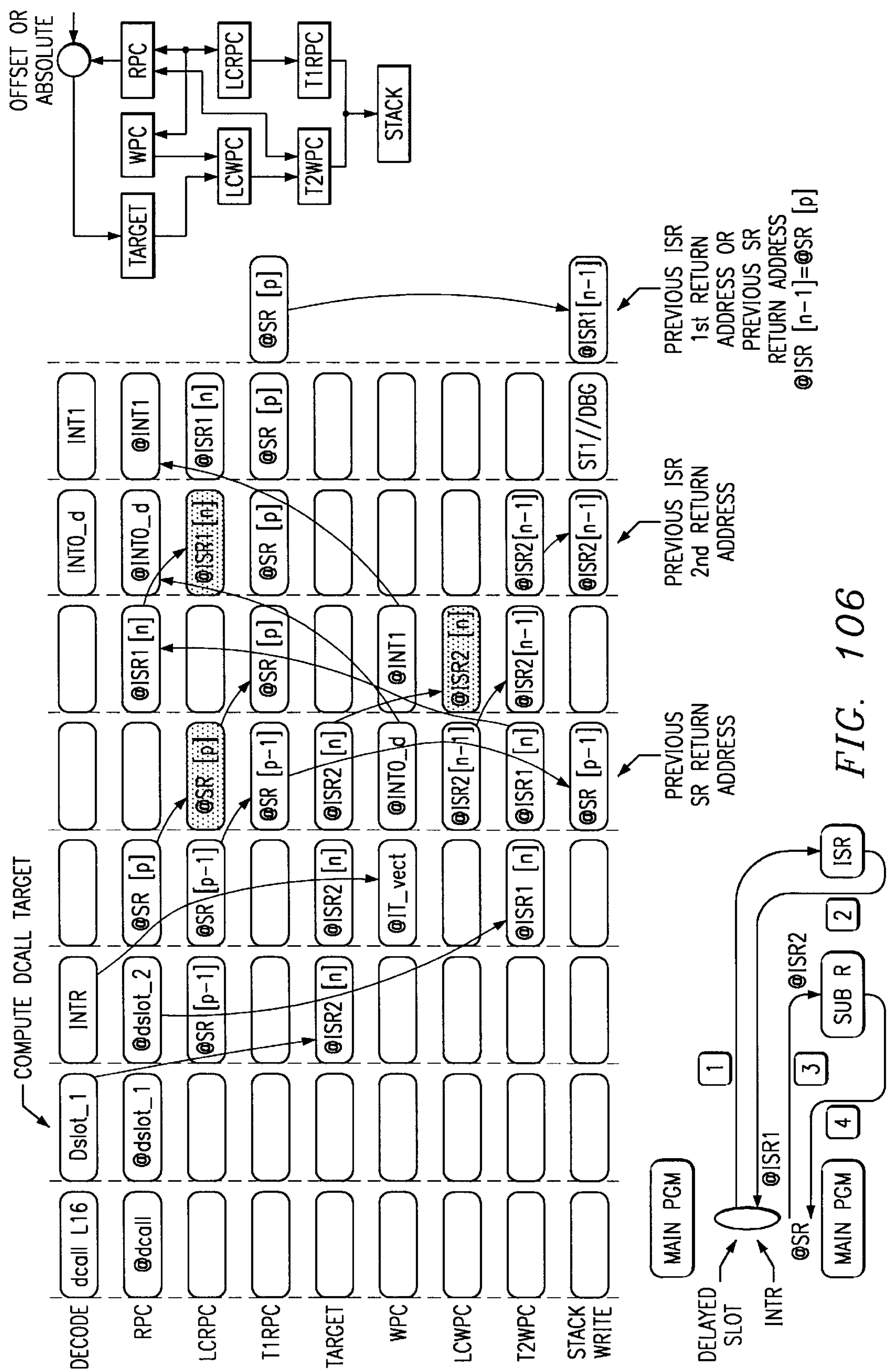
FIG. 106 is a timing diagram illustrating an Interrupt in a delayed slot_2 with a relative call.

FIG. 106 is a timing diagram illustrating an interrupt in a delayed slot_2 with a relative call.

Figure 107:
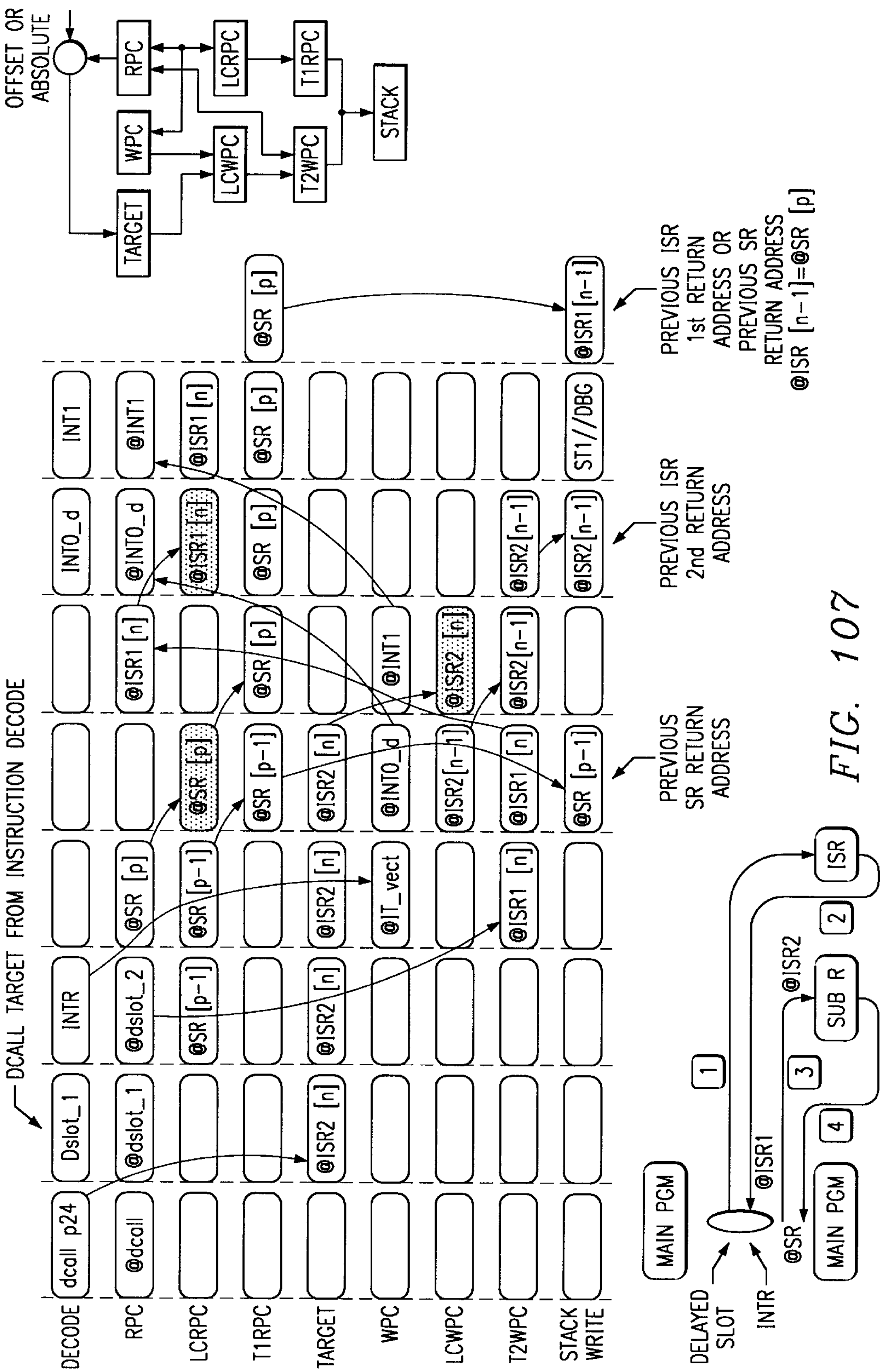
FIG. 107 is a timing diagram illustrating an Interrupt in a delayed slot_2 with an absolute call.

FIG. 107 is a timing diagram illustrating an interrupt in a delayed slot_2 with an absolute call.

Figure 108:
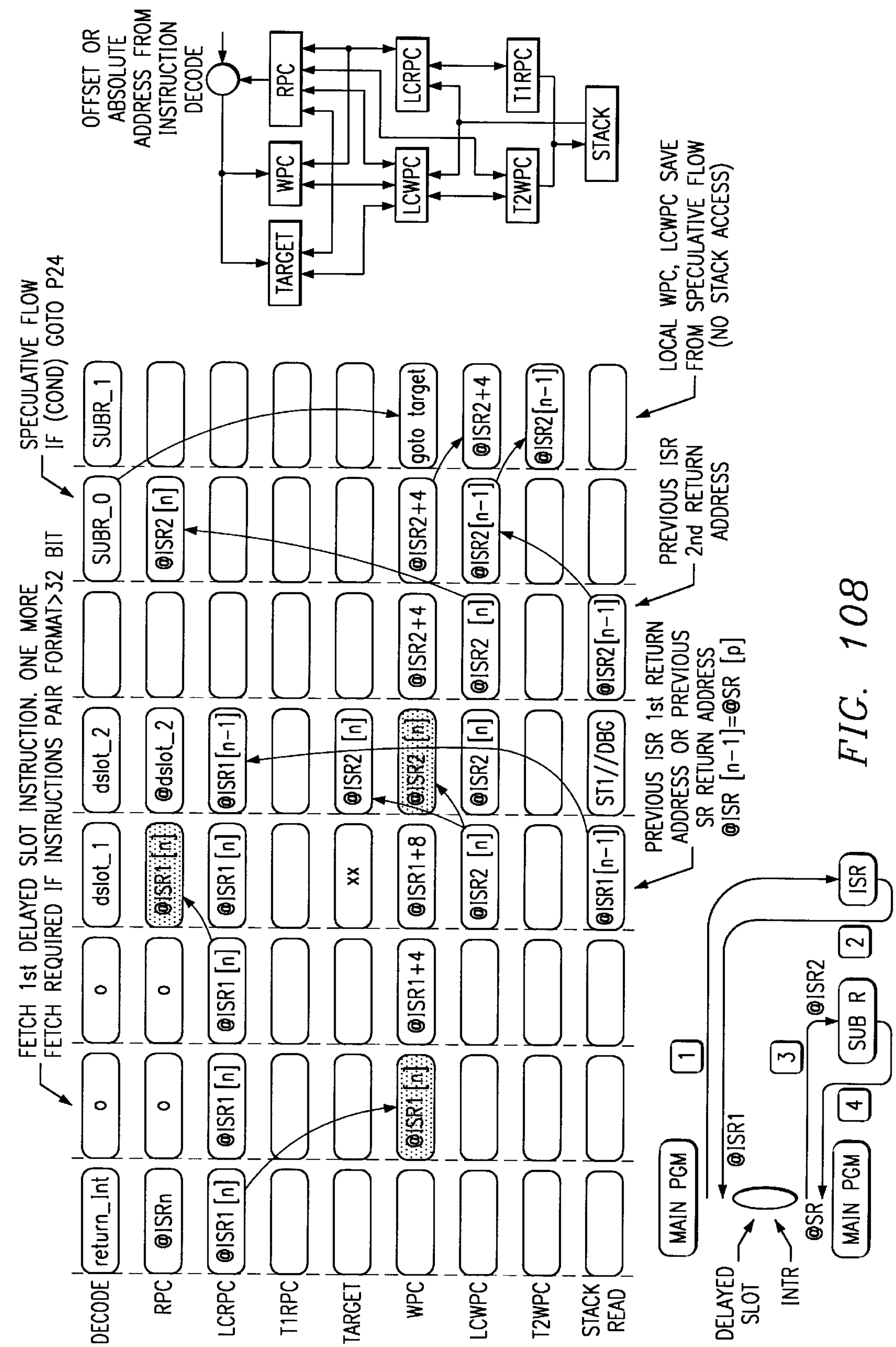
FIG. 108 is a timing diagram illustrating a return from Interrupt into a delayed slot.

FIG. 108 is a timing diagram illustrating a return from an interrupt into a delayed slot.

Figure 109:
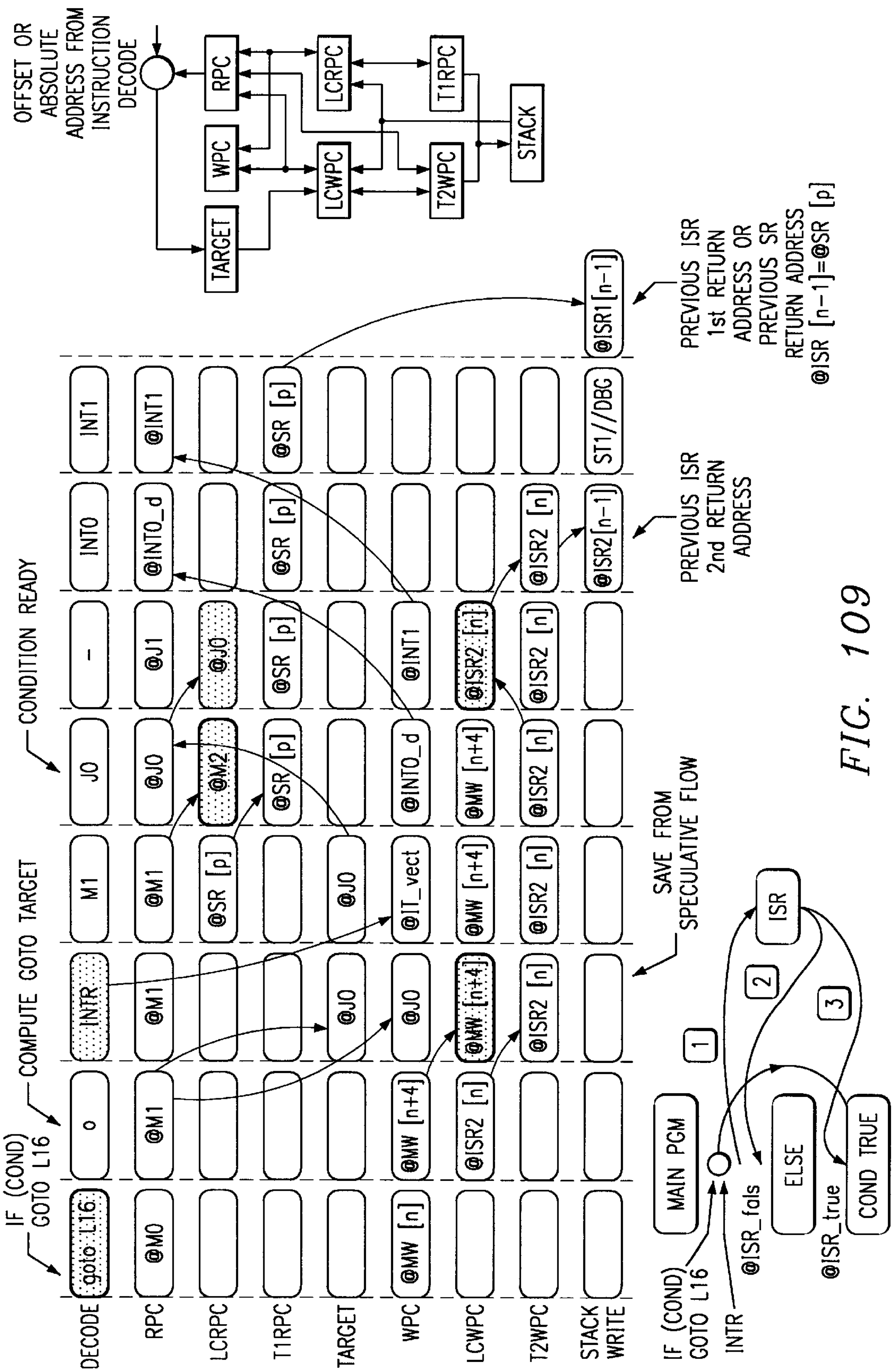
FIG. 109 is a timing diagram illustrating an interrupt during speculative flow of "if (cond) goto L16", when the condition is true.

FIG. 109 is a timing diagram illustrating an interrupt during speculative flow of "if (cond) goto L16" when the condition is true.

Figure 110:
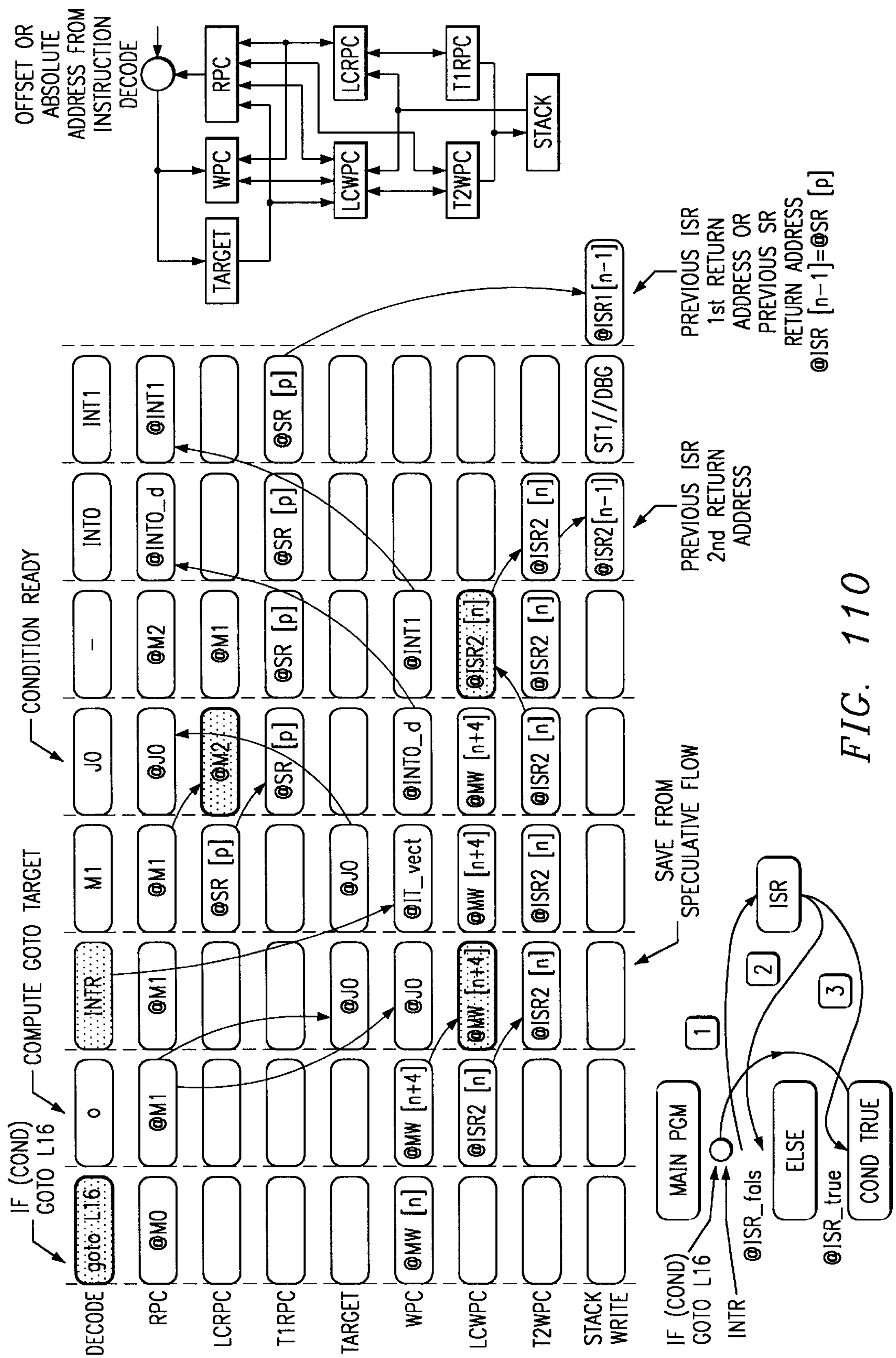
FIG. 110 is a timing diagram illustrating an interrupt during speculative flow of "if (cond) goto L16", when the condition is false.

FIG. 110 is a timing diagram illustrating an interrupt during speculative flow of "if (cond) goto L16" when the condition is false.

FIG. 111 is a timing diagram illustrating an interrupt during delayed slot speculative flow of "if (cond) dcall L16" when the condition is true.

FIG. 112 is a timing diagram illustrating an interrupt during delayed slot speculative flow of "if (cond) dcall L16" when the condition is false.

Figure 113:
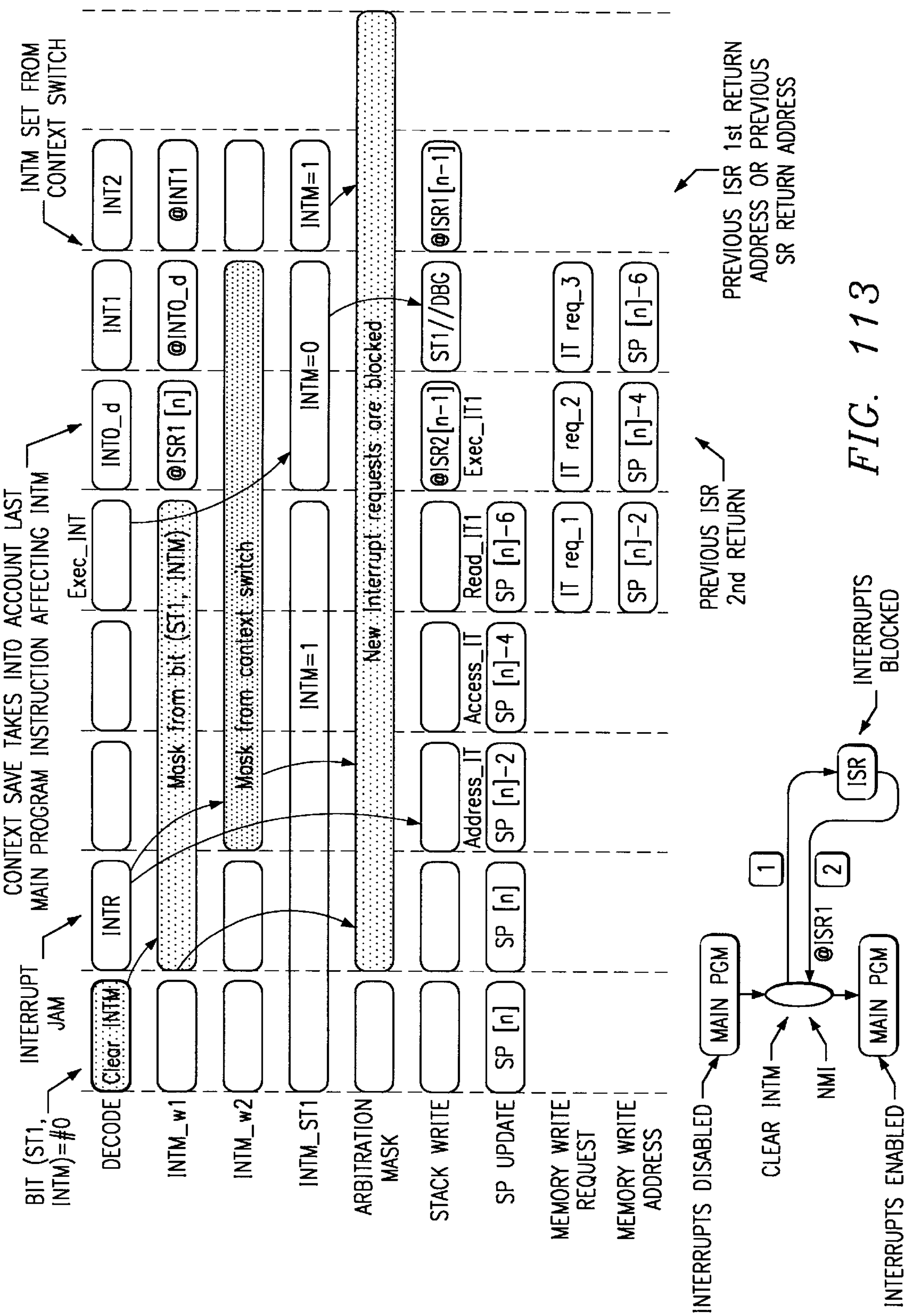
FIG. 113 is a timing diagram illustrating an interrupt during a CLEAR of the INTM register.

FIG. 113 is a timing diagram illustrating an interrupt during a clear of the INTM register.

8.12 Reset

Reset is a non-maskable interrupt that can be used at any time to place the processor into a known state. For correct operation after power up the processor core reset pin must be asserted low for at least five clock cycles to insure proper reset propagation through the CPU logic. The reset input signal can be asynchronous; a synchronization stage is implemented within the processor core. When reset is asserted, all the core and megacell boundaries must be clean (all pins must be under a defined state). This implies a direct asynchronous path from the reset logic to the core I/O's control logic. The internal reset control must insure no internal or external bus contention. Power must be minimized when reset is asserted. The CPU clock's network is inactive until the reset pin is released. Then the internal reset is extended by a few cycles and the clock's network is enabled to insure the reset propagation though the CPU logic. After reset is released, the processor fetches the program start address at FFF00h, executes the instruction immediately after the reset vector, and begins executing code.

The processor core exports a synchronized reset delayed from internal CPU reset. All the strobes at the edge of the core must be under control from reset assertion.

The initialization process from hardware is as follows:

1. IVPD→FFFFh
2. IVPH→FFFFh
3. MP/NMC in IMR0 register is set to the value of the MC/NMC pin.
4. PC is set to FFFF00h 5. INTM is set to 1 to disable all the maskable interrupts.

6. IFR0,IFR1 are cleared to clear all the interrupt flags.

7. ACOV[3–2]→0

8. C→1

9. TC1, TC2→1

10. DP÷0

The initialization process from software is:

1. User Stack pointer (SP)

2. System Stack pointer(SSP)

9. Power-Down

9.1 Power Down Scheme

The processor instruction set provides a unique and generic "idle" instruction. Different power down modes can be invoked from the same "idle" instruction. This power down control is implemented out of the CPU core to provide the maximum flexibility to the ASIC or sub-chip designer to manage the activity of each clock domain according to the specific application requirements.

The power down control register is implemented within the RHEA bridge module. This provides visibility to the host or DSP domain activity.

Before executing the "idle" instruction, the "power down control register" has to be loaded with a bit pattern defining the activity of each domain once the CPU enters the power down mode.

As an example, a typical system can split its clock network into domains as listed in Table 76 to keep only the minimum hardware operating according to processing needs.

mode (asynchronous). The host domain (APIRAM module) is directly managed from the HOM mode. This insures that a communication with an host processor in shared mode can remain active even if most of the DSP resources have been switched off.

Any violation of power down configuration rules as defined above will generate a 'bus error' which can be used to trigger an interrupt or a SWBP.

The RHEA bridge hardware always remains active even if all the peripherals are in power down unless the global domain is turned off. This supports interrupt synchronization and maintains the host visibility to the DSP power down status register.

The peripherals power down control is hierarchical; each peripheral module has its own power down control bit. When the peripheral domain is active, all the peripherals are active; when the peripheral domain is switched off, only the selected peripherals power down.

9.2 IDLE Instruction Flow

The "idle" instruction decode generates an idle signal at the edge of the CPU boundary within the execution phase. This signal is used in the RHEA bridge to transfer the power down configuration register to the power down request register. Each module will receive a clock gating signal according to the domain's pre-selection.

Figure 114:
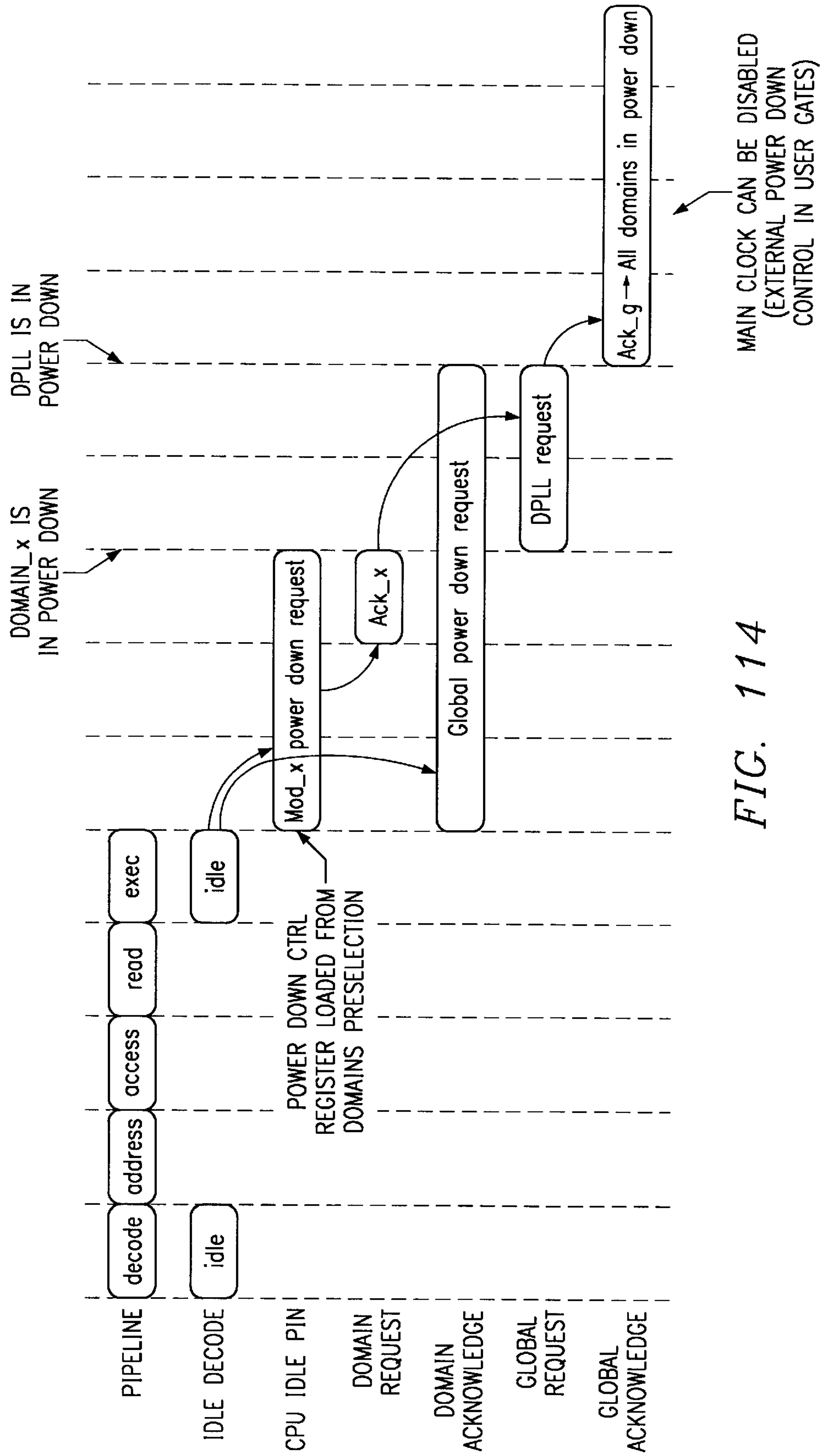
FIG. 114 is a timing diagram illustrating a typical power down sequence wherein the power down sequence is to be hierarchical to take into account on going local transaction in order to turn-off the clock on a clean boundary.
Figures 1, 114:
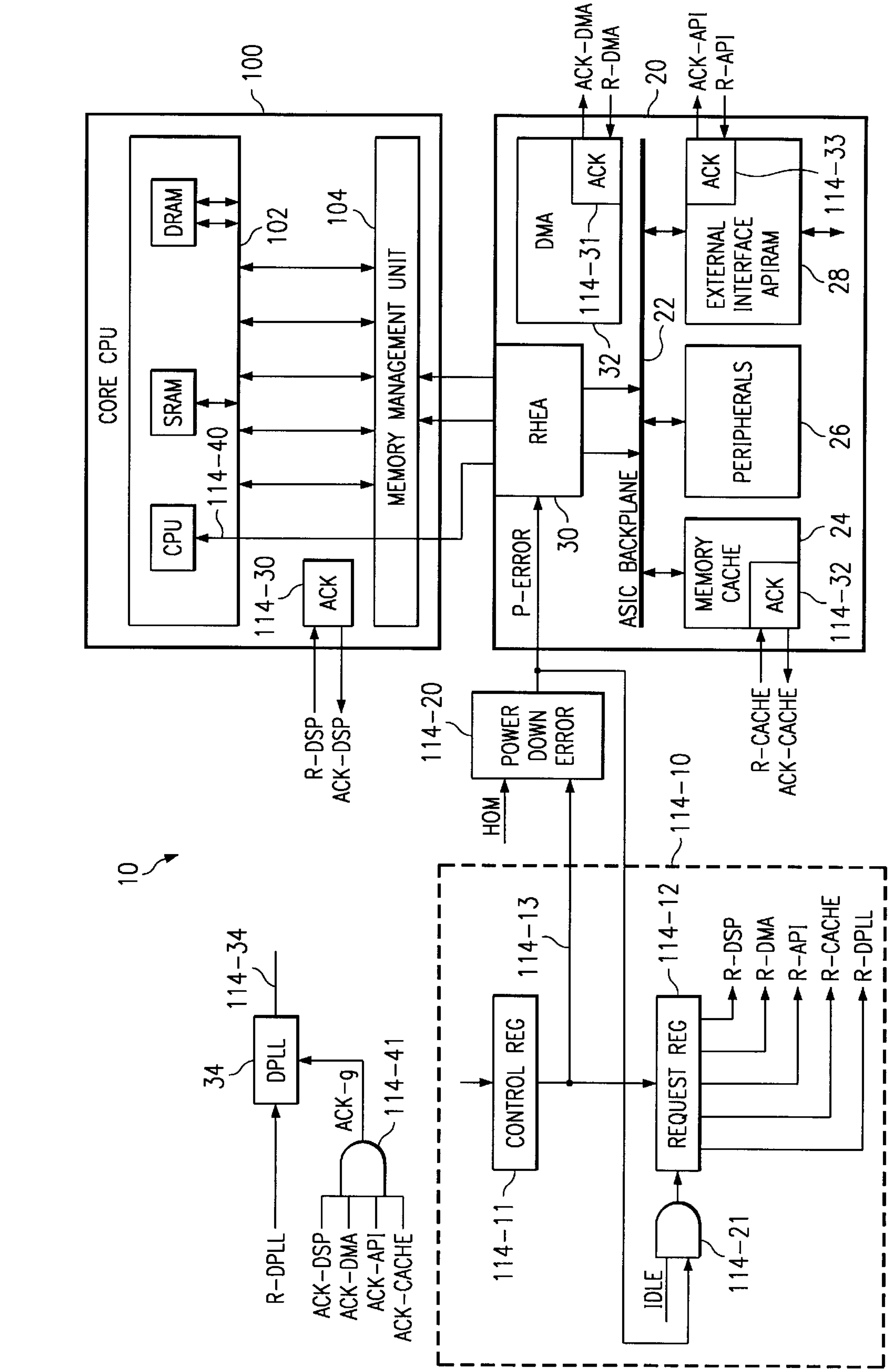

FIG. 114 is a timing diagram illustrating a typical power down sequence. The power down sequence has to be hierarchical to take into account on-going local transactions and to allow the clock to be turned off on clean boundary. When the user wants to power down all the domains, the hardware insures that each domain has returned its power down acknowledge before switching off the global clock.

TABLE 76

Clock Domains

| | SYSTEM MODULES → | | | | | | | | | |
|---|---|---|---|---|---|---|---|---|---|---|
| CLOCK DOMAIN | CPU | MMI | SARAM | DARAM | APIRAM | CACHE | RHEA | PERIPH | DMA | DPLL |
| DSP_domain | X | X | X | X | | | | | | |
| DMA_domain | | X | X | | | | | | X | |
| CACHE_domain | | | | | | X | | | | |
| PERIPH_domain | | | | | | | | X | | |
| GLOBAL_domain | | | | | | | | | | X |
| SYSTEM_domain | | | | | | | X | | | X |
| HOST_domain | | | | | X | | | | | |

The local system module clock can be switched off only if all the clock domains involving this module have switched to power down mode.

Some robustness is built in the power down scheme to prevent software errors. The system domain cannot be switched off if any domain using the global system clock is kept active. If power down configuration is incorrect, the transfer to the clock domain control register is disabled by power down error circuitry 114–20 via gate 114–21 and the clock domain remains in the same state even if execution stops. A 'bus error' is signaled in parallel to the CPU via interrupt signal 114–40 in response to error signal terror from error circuitry 114–20. The CPU domain 100 has to remain active in order to propagate the bus error and to process the associated ISR. Peripherals may use different clocks.

The global domain cannot be switched off if the communication RAM and peripherals have not been set in host only The dma protocol may require entering the power down state only after block transfer completion.

The external interface (MMI) protocol may require entering the power down state only after burst access completion.

The RHEA protocol does not require that peripherals return a power down acknowledge since they operate from an independent clock. The sub-chip global generator returns its own acknowledge which can be used to enable the switch-off of the main input clock within the user gates.

The power down status register read interface has to check all of the clock domains' power down acknowledgements in order to provide to the host processor a status reflecting the real clock's activity.

9.3 Typical Power Down Sequence

Figure 115:
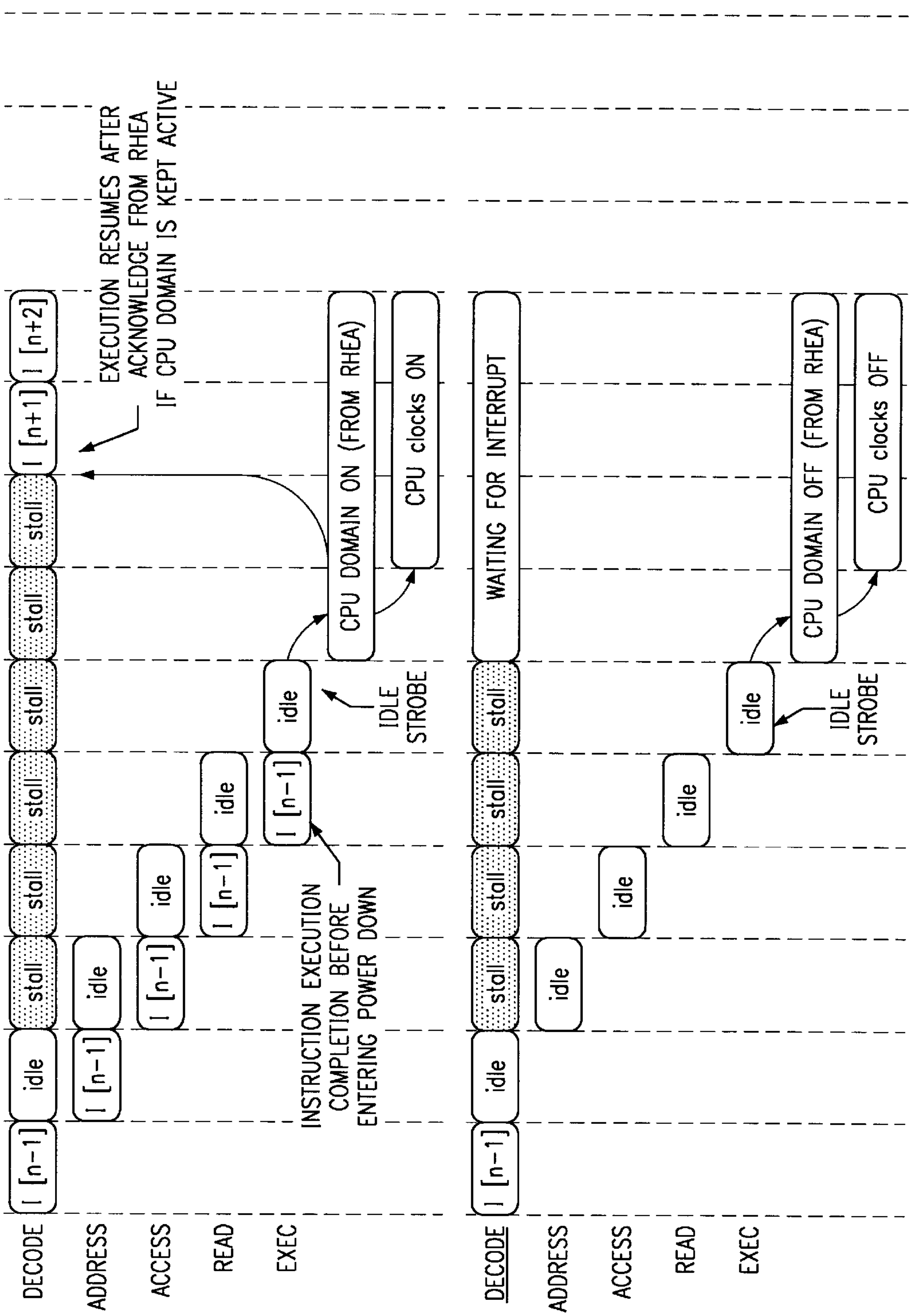
FIG. 115 is a timing diagram illustrating Pipeline management when switching to power down.

FIG. 115 is a timing diagram illustrating pipeline management when switching to power down.

9.4 Wake Up

If the DSP domain and global domain are active, the power down configuration has to be updated first. An "idle" instruction is executed to transfer the new configuration to all the modules' clock interfaces.

If the DSP domain is powered down and the global domain is active, the DSP may exit the power down state from a wake-up interrupt or a reset. If INTM=0 once the DSP domain clock has been re-enabled, it enters the ISR. Upon return from ISR, it executes the instruction subsequent to "idle". The system can return to idle from a goto pointing back to the "idle". Only interrupt requests that have their enable bit in IMR0 or IMR1 set can wake up the processor. User software must program the IMR0 or IMR1 registers before execution of idle to select the wake up sources.

If INTM=1 once the DSP domain clock has been re-enabled, it directly executes the instruction subsequent to "idle". Only interrupt requests that have their enable bit in IMR0 or IMR1 set can wake up the processor. User software must program the IMR0 or IMR1 registers before execution of idle to select the wake up sources.

Reset and NMI inputs can wake up the processor regardless of IMR0 and IMR1 content.

After wake up, the DSP domain control bit in the power down request register is cleared and the CPU domain clock is active. Note that except for reset, the wake up does not affect the power down configuration register. This allows the user software to directly re-enter the same power down mode by directly executing an "idle" instruction without any setup.

All domains are active upon reset. It is up to the CPU software to selectively turn off the domains as soon it has the visibility required for the on-going process to be executed.

If the DSP domain and the global domain are both powered down, the wake up process is similar to the previous case. The hardware implementation must insure an asynchronous wake-up path for the global clock domain. After wake up, both the global and DSP domains' control bit in the power down request register will be cleared and the power down configuration register remains unchanged. This allows direct reentry of the same power down mode by executing an "idle" instruction.

Figure 116:
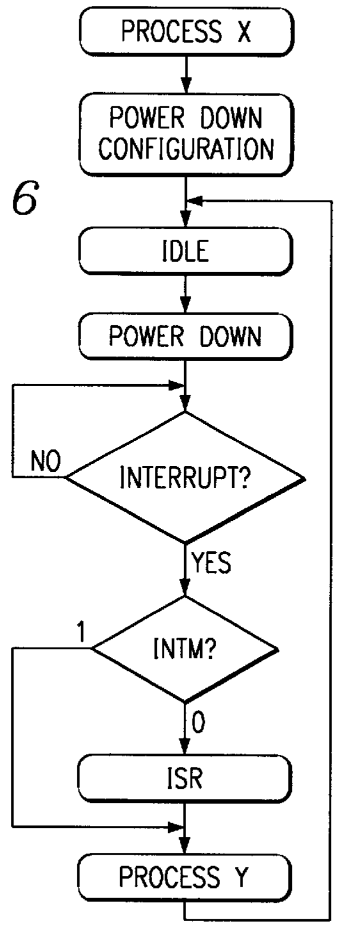
FIG. 116 is a flow chart illustrating Power down/wake up flow.

FIG. 116 is a flow chart illustrating power down/wake up flow.

10. Pipeline

The general operation of the pipeline was described in earlier sections with respect to the instruction buffer. Additional features will now be described in detail.

10.1 Bypass Mechanism

The bypass feature avoids cycle insertion when the memory read and write accesses fall within the same cycle and are performed at the same address. The instruction operand is fetched from the CPU write path instead of from memory. This scheme is only possible when the read and write addresses match and if the write format is larger than the read format. When the read format is larger than the write format, the field for which there is read/write overlap can be fetched from the bypass path. The field for which there is no overlap is fetched from the memory read bus.

The bypass scheme in the processor architecture has been defined to minimize multiplexing hardware and bypass control logic and eliminate extra cycles required by slow memory access in most cases. A stall request is generate for memory write/memory read sequences where a memory variable dependency is detected but for which there is no hardware support from bypass multiplexing.

For external accesses, the CPU bypass support in conjunction with the 'posted write' feature supported by the MMI (Megacell interface) hides both external memory writes and external memory reads from a CPU execution flow standpoint.

No bypass mechanism is supported for access of memory mapped registers or peripherals (readport( ), writeport( ) qualification).

Figure 117:
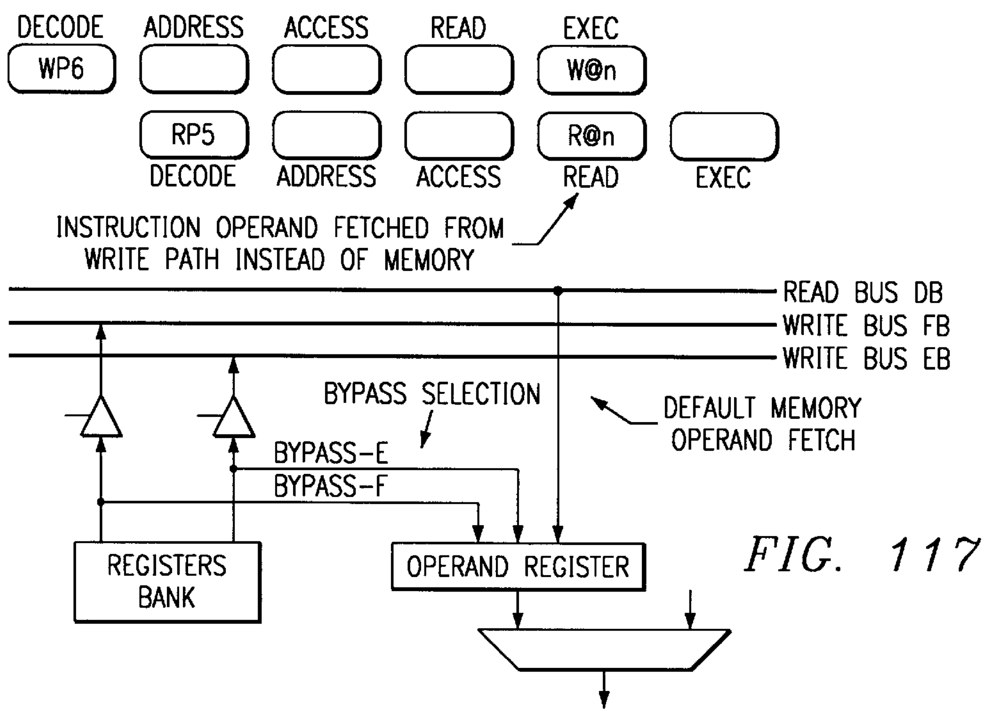
FIG. 117 is block diagram of the Bypass scheme.

FIG. 117 is a block diagram of the bypass scheme.

Table 77 summarizes the memory address bus comparison to be performed versus the access sequence and the operand fetch path selection.

TABLE 77

Memory address bus comparison

| Write Class | Write Size | Read Class | Read Size | Busses Compare | Bypass/ Stall | Operand Fetch Path |
|---|---|---|---|---|---|---|
| Single write | byte | Single read | byte | EA == DA | bypass | Bmem from bypass_E |
| Single write | byte | Single read | word | EA == OA | stall | Smem from DB |
| Single write | byte | Double read | dbl | EA == DA | stall | MSW from CB<br>LSW from DB |
| | | | | EA-1 == DA | stall | MSW from CB<br>LSW from DB |
| Single write | byte | Dual read | word | EA == DA<br>EA == CA | stall | Xmem from CB<br>Ymem from DB |
| Single write | word | Single read | word | EA == DA | bypass | Smem from bypass_E |
| Single write | word | Double read | dbl | EA == DA | bypass_h | MSW from bypass_E<br>LSW from DB |
| | | | | EA-1 == DA | bypass_i | MSW from CB<br>LSW from bypass_E |
| Single write | word | Dual read | word | EA == DA | bypass | Xmem from bypass_E<br>Ymem from CB |
| | | | | EA == CA | bypass | Xmem from DB<br>Ymem from bypass_E |
| Double write | dbl | Single read | word | EA == DA<br>EA == DA-1 | bypass | Smem from bypass_F<br>Smem from bypass_E |

TABLE 77-continued

Memory address bus comparison

| Write Class | Write Size | Read Class | Read Size | Busses Compare | Bypass/ Stall | Operand Fetch Path |
|---|---|---|---|---|---|---|
| Double write | dbl | Double read | dbl | EA == DA | bypass | MSW from bypass_F<br>LSW from bypass_E |
| | | | | EA-1 == DA | bypass | MSW from bypass_E<br>LSW from bypass_F |
| Double write | dbl | Dual read | word | EA == DA | bypass_x | Xmem from bypass_F<br>Ymem from CB |
| | | | | EA == DA-1 | bypass_x | Xmem from bypass_E<br>Ymem from CB |
| | | | | EA == CA | bypass_y | Xmem from DB<br>Ymem from bypass_F |
| | | | | EA == CA-1 | bypass_y | Xmem from DB<br>Ymem from bypass_E |
| Dual write | word | Single read | word | EA == DA<br>FA == DA | bypass<br>bypass | Smem from bypass_E<br>Smem from bypass_F |
| Dual write | word | Double read | dbl | EA == DA | bypass_h | MSW from bypass_E<br>LSW from DB |
| | | | | EA-1 == DA | bypass_l | MSW from CB<br>LSW from bypass_E |
| | | | | FA == DA | bypass_h | MSW from bypass_F<br>LSW from DB |
| | | | | FA-1 == DA | bypass_l | MSW from CB<br>LSW from bypass_F |
| Dual write | word | Dual read | word | EA == DA | bypass | Xmem from bypass_E<br>Ymem from CB |
| | | | | EA == CA | bypass | Xmem from DB<br>Ymem from bypass_E |
| | | | | FA == DA | bypass | Xmem from bypass_F<br>Ymem from CB |
| | | | | FA == CA | bypass | Xmem from DB<br>Ymem from bypass_F |

Table 78 summarizes the memory address bus comparison to be performed versus the access sequence and the operand fetch path selection.

TABLE 78

Memory address bus comparison

| Write Class | Write Size | Read Class | Read Size | Busses Compare | Bypass/ Stall | Operand Fetch Path |
|---|---|---|---|---|---|---|
| Single write (shift) | word | Single read | word | FA == DA | bypass | Smem from bypass_F |
| Single write (shift) | word | Double read | dbl | FA == DA | bypass_h | MSW from bypass_F<br>LSW from DB |
| | | | | FA-1 == DA | bypass_l | MSW from CB<br>LSW from bypass_F |
| Single write (shift) | word | Dual read | word | FA == DA | bypass | Xmem from bypass_F<br>Ymem from CB |
| | | | | FA == CA | bypass | Xmem from DB<br>Ymem from bypass_F |
| Double write (shift) | dbl | Single read | word | FA == DA<br>FA == DA-1 | bypass | Smem from bypass_F<br>Smem from bypass_E |
| Double write (shift) | dbl | Double read | dbl | FA == DA | bypass | MSW from bypass_F<br>LSW from bypass_E |
| | | | | FA-1 == DA | bypass | MSW from bypass_E<br>LSW from bypass_F |
| Double write (shift) | dbl | Dual read | word | FA == DA | bypass_x | Xmem from bypass_F<br>Ymem from CB |
| | | | | FA == DA-1 | bypass_x | Xmem from bypass_E<br>Ymem from CB |
| | | | | FA == CA | bypass_y | Xmem from DB<br>Ymem from bypass_F |
| | | | | FA == CA-1 | bypass_y | Xmem from DB<br>Ymem from bypass_E |
| Single write | byte | Coeff read | word | EA == BA | stall | Coeff from BB |
| Single write | word | Coeff read | word | EA == BA | bypass | Coeff from bypass_E |
| Single write (shift) | word | Coeff read | word | FA == BA | bypass | Coeff from bypass_F |

TABLE 78-continued

| Memory address bus comparison | | | | | | |
|---|---|---|---|---|---|---|
| Write Class | Write Size | Read Class | Read Size | Busses Compare | Bypass/ Stall | Operand Fetch Path |
| Double write | dbl | Coeff read | word | EA == BA | bypass | Coeff from bypass_F |
| | | | | EA == BA-1 | | Coeff from bypass_E |
| Double write (shift) | dbl | Coeff read | word | FA == BA | bypass | Coeff from bypass_F |
| | | | | FA == BA-1 | | Coeff from bypass_E |
| Dual write | word | Coeff read | word | EA == BA | bypass | Coeff from bypass_E |
| | | | | FA == BA | bypass | Coeff from bypass_F |

Figure 118:
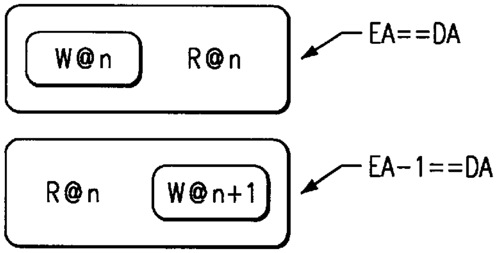

FIG. 118 illustrates the two cases of single write/double read address overlap where the operand fetch involves the bypass path and the direct memory path. In this case, the memory read request must be kept active.

Figure 119:
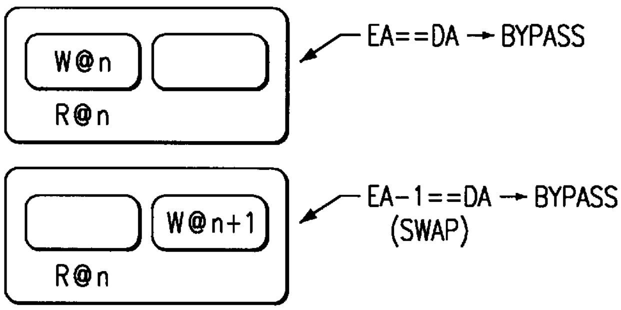

FIG. 119 illustrates the two cases of double write/double read where memory locations overlap due to the 'address LSB toggle' scheme implemented in memory wrappers.

10.1.1 Memory Interface Timing

Figure 120:
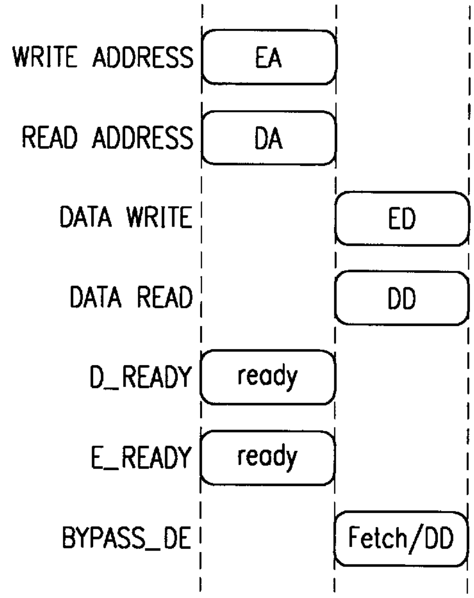

FIG. 120 is a stick chart illustrating dual access memory without bypass.

Figure 121:
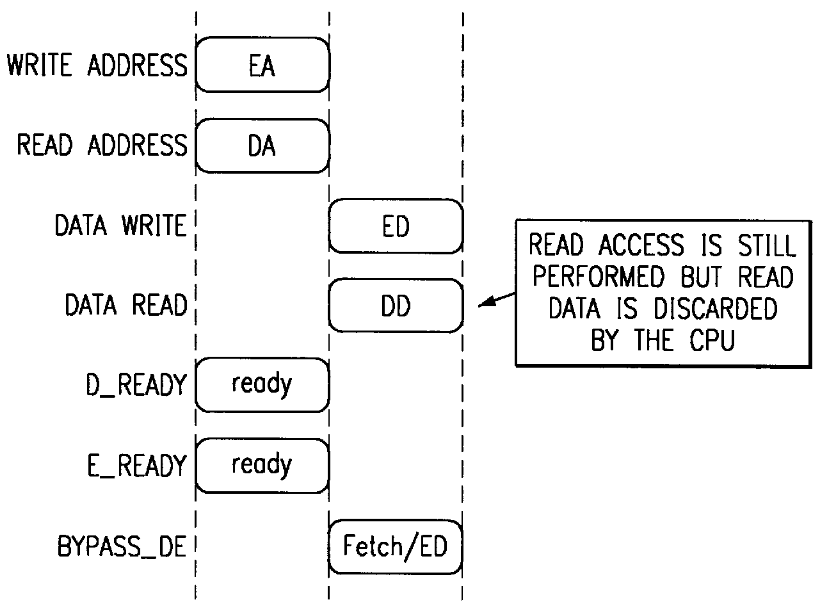

FIG. 121 is a stick chart illustrating dual access memory with bypass.

Figure 122:
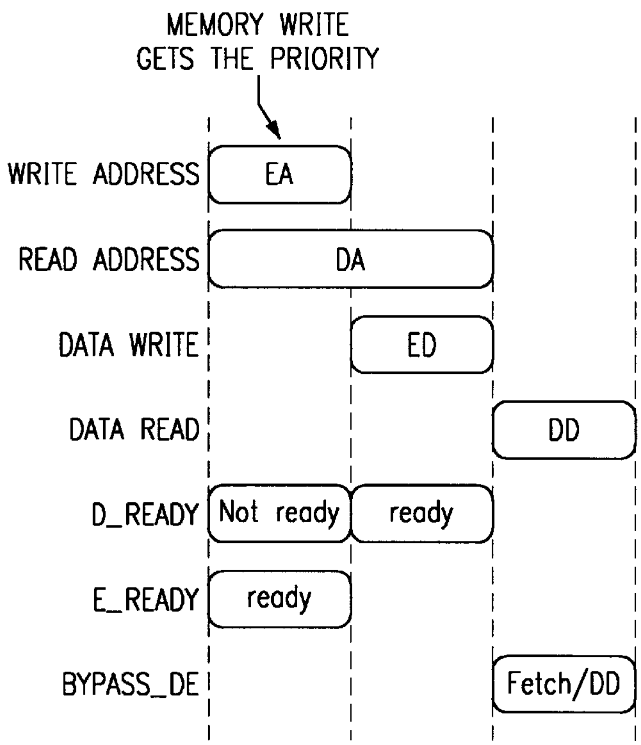

FIG. 122 is a stick chart illustrating single access memory without bypass.

Figure 123:
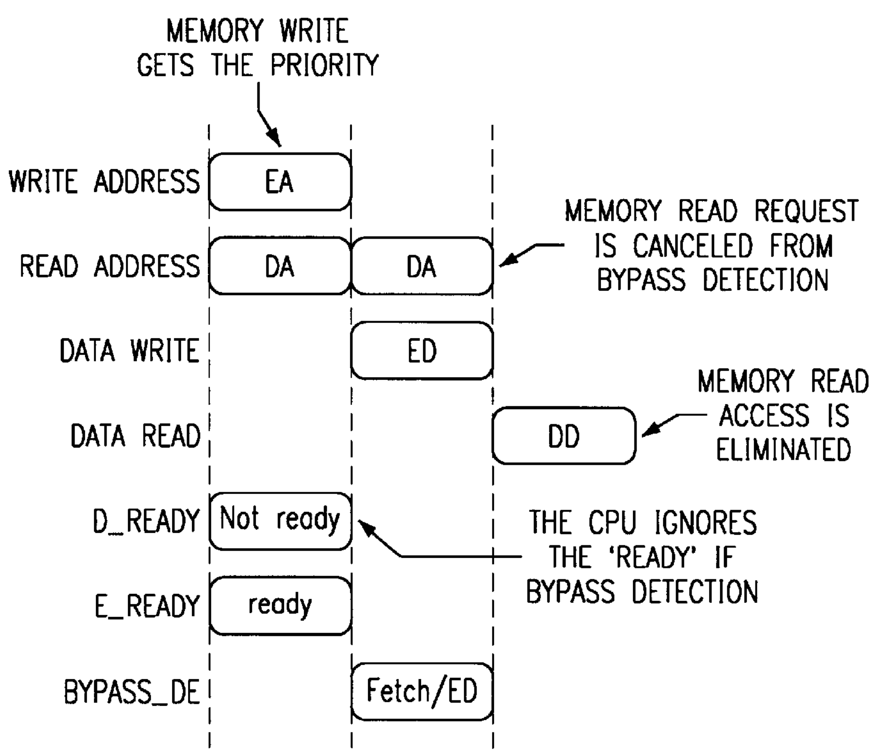

FIG. 123 is a stick chart illustrating single access memory with bypass.

Figure 124:
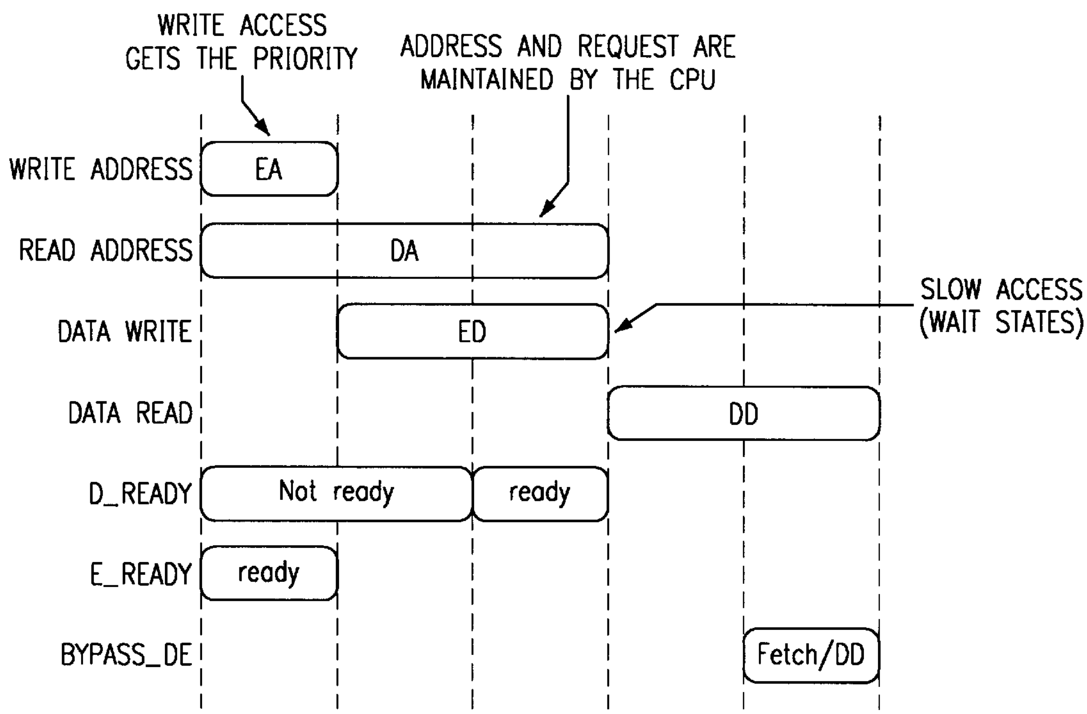

FIG. 124 is a stick chart illustrating slow access memory without bypass.

Figure 125:
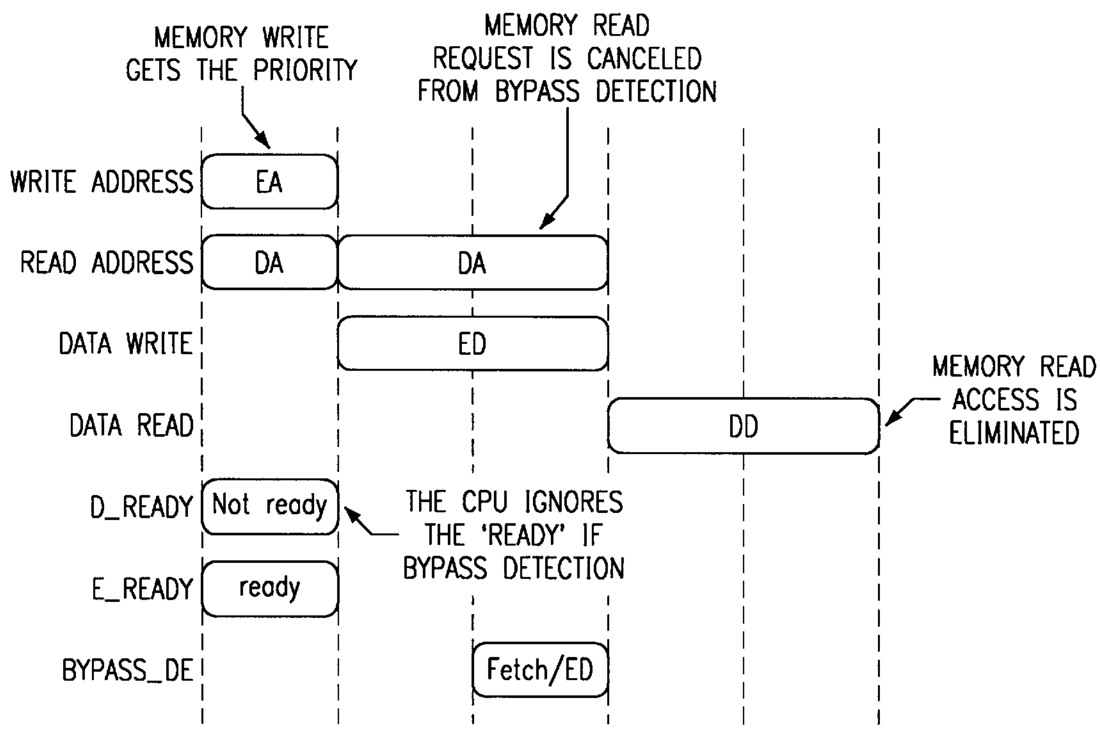

FIG. 125 is a stick chart illustrating slow access memory with bypass.

10.1.2 Bypass Management On MMI (Megacell Interface)

Memory requests are managed within the MMI module as in internal memories wrappers. The scheme described above applies also to bypass contexts where the access is external and both read and write addresses match. There is no need for an abort signal upon bypass detection. The bypass detection is performed at the CPU level.

The external interface bandwidth is significantly improved for the requests and format contexts where bypass is supported (see table in previous section). This includes D/E, D/F, C/E, and C/F simultaneous requests with address and format match.

10.2 Pipeline Protection

Figure 126:
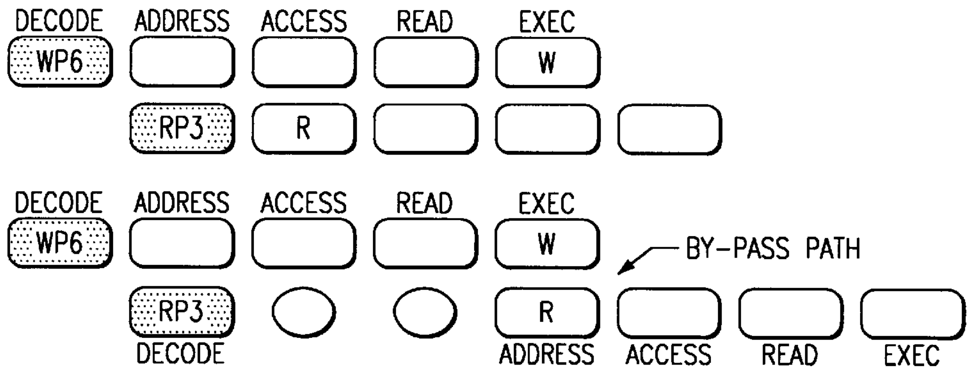

The pipeline protection hardware must preserve the read/write sequence scheduled at the decode stage regardless of the pipeline stage on which the update takes place to eliminate write conflicts. FIG. 126 is a timing diagram of the pipeline illustrating the case where the current instruction reads a CPU resource updated by the previous one. The read and write pipeline stages are not consistent and a by-pass path exists for this context.

Figure 127:
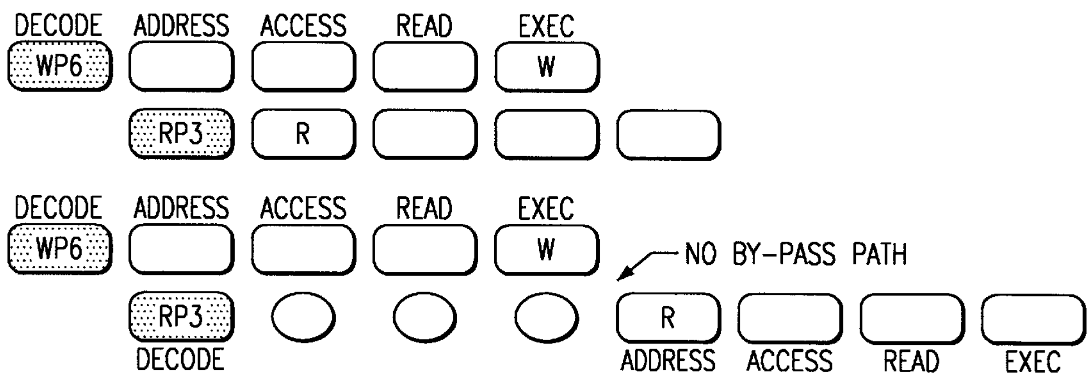

FIG. 127 is a timing diagram of the pipeline the case where the current instruction reads a CPU resource updated by the previous one. The read and write pipeline stages are not consistent and no by-pass path exists for this context.

Figure 128:
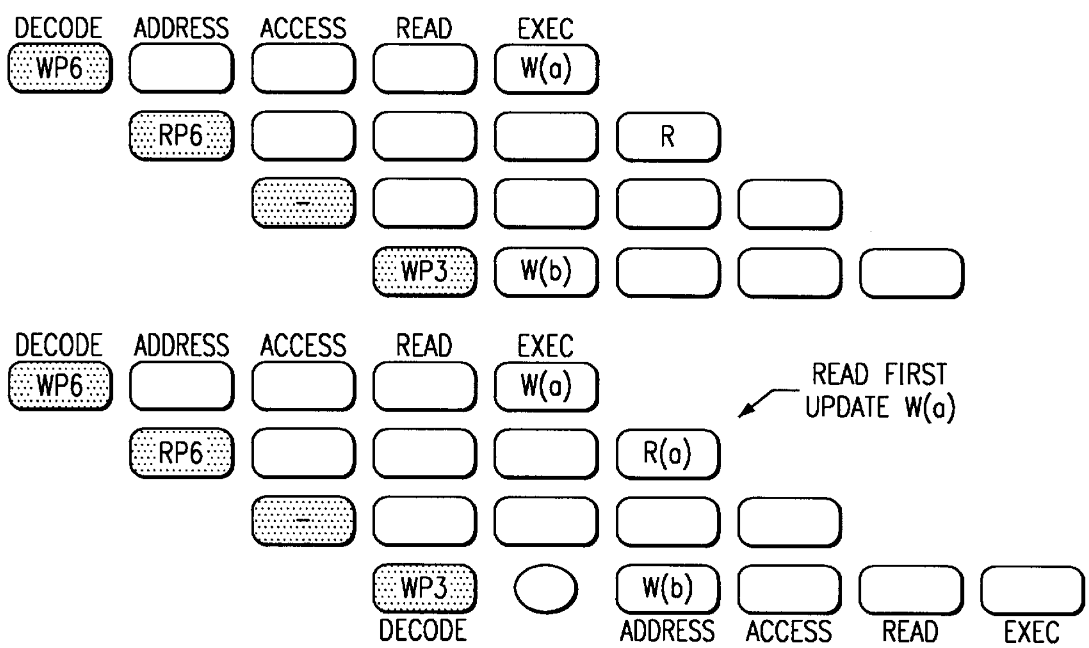

FIG. 128 is a timing diagram of the pipeline illustrating the case where the current instruction schedules a CPU resource update conflicting with an update scheduled by earlier instruction.

Figure 129:
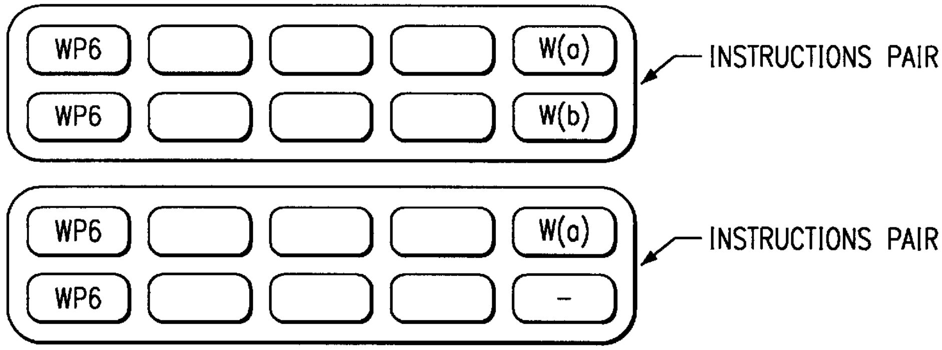

FIG. 129 is a timing diagram of the pipeline illustrating the case where two parallel instructions update the same resource in same cycle. Only the write associated to instruction #1 will be performed.

Table 79 is a summary of the write classifications

TABLE 79

| Write classifications | | | |
|---|---|---|---|
| Update Class WD[9–6] | Address WD[5–3] | Status Update WD[2] | Update Cycle WD[1–0] |
| No update | — | — | — |
| AR | [0–7] | yes/no | P[3–6] |
| CDP | — | — | — |
| DR | [0–3] | yes/no | P[3–6] |
| AC | [0–3] | yes/no | P[3–6] |
| Status Register Write | ST0,ST1 | — | P[3–6] |
| Circular Buffer Offset | BOF[0–7] BOFC | - | P[3–6] |
| Circular Buffer size | BK[03–47] BKC | — | P[3–6] |
| DP | — | — | P[3–6] |
| SP | — | — | P[3–6] |
| BRC | BRC[0–1] | — | P[3–6] |
| CSR | — | — | P[3–6] |
| TRN | TRN[0–1] | — | P[3–6] |

Table 80 summarizes the read classifications for pipeline protection.

TABLE 80

Read classifications

| READ CLASS RD 24–22 | X Point P3 RD 21–19 | Y Point P3 RD 18–16 | Coeff Point P3 RD 15 | Circ Buff P3 RD 14 | DR Offset P3 RD 13 | BRC read P2 RD 12 | DR Index P3 RD 11 | SP mod P3 RD 10 | DR shift P5 RD 9 | Status Ctrl P5 RD 8 | Cond — RD 7–6 | Reg addr — RD 5–2 | Cond read cycle Px RD 1–0 |
|---|---|---|---|---|---|---|---|---|---|---|---|---|---|
| No latency | — | — | — | — | — | — | — | — | — | — | | | — |
| Dma | DP<br>SP | — | — | — | — | — | — | — | X | X | _<br><br>status | DR shift<br>TCx | <br><br>P3-6 |
| Indirect | [0–7] | — | — | X | X | — | X | — | X | X | _<br><br>status | DR shift<br>TCx | <br><br>P3-6 |
| Dual | [0–7] | [0–7] | CDP | X | X | — | X | — | X | X | — | DR shift | — |
| Register | — | — | — | — | — | — | — | X | X | X | _<br><br>status | DR shift<br>TCx | _<br><br>P3-6 |
| Control | — | — | — | — | — | X | — | X | — | — | status<br><br>reg | TCx<br>AC<br>DR<br>AR | P3-6<br>P3-6 |

Table 81 summarizes the instruction dependencies

TABLE 81

Instruction dependencies

| READ Instruction Class | READ Instruction Subclass | UPDATE Instruction Class | ADDRESS Match |
|---|---|---|---|
| Dma | — | DP | — |
| | | SP | — |
| | DR shift | DR write | Same address |
| | Status control | Status register write | — |
| | Cond/Status | Status update | TCx |
| | | Status register write | — |
| Indirect | — | AR write | Same address |
| | DR shift | DR write | Same address |
| | Status control | Status register write | — |
| | DR index | DR write | Same address |
| | DR offset | DR write | Same address |
| | Circular buffer | Buffer offset register write | — |
| | | Buffer size register write | |
| | Cond/Status | Status update | TCx |
| | | Status register write | — |
| Dual | — | AR write | Same address Xmem or Ymem |
| | CDP | CDP write | — |
| | DR shift | DR write | Same address |
| | Status control | Status register write | — |
| | DR index | DR write | Same address Xmem, Ymem or CDP |
| | DR offset | DR write | Same address Xmem or Ymem |
| | Circular buffer | Buffer offset register write | — |
| | | Buffer size register write | |
| Register | SP modify | SP update | — |
| | DR shift | DR write | Same address |
| | Status control | Status register write | — |
| | Cond/Status | Status update | TCx |
| | | Status register write | — |

TABLE 81-continued

Instruction dependencies

| READ Instruction Class | READ Instruction Subclass | UPDATE Instruction Class | ADDRESS Match |
|---|---|---|---|
| Control | End of block BRC decrement | BRC read | BRC0,BRC1 |
| | SP modify | SP update | — |
| | Cond/Status | Status update | TCx, C |
| | Cond/Register | AC write | Same address |
| | | DR write | Same address |
| | | AR write | Same address |

FIG. 130 is block diagram of the pipeline protection circuitry.

11. Emulation

11.1 Software Breakpoint Management

The emulation software computes the user instruction format taking into account the parallelism and soft dual scheme before SWBP substitution. This is required to manage the SWBP within goto/cal delayed slots where the user instruction format has to be preserved to compute the return address. The instruction set supports two instruction formats and two NOP instruction formats:

| | |
|---|---|
| estop() | 8 bit |
| estop_32() | 32 bit |
| nop | 8 bit |
| nop_16 | 16 bit |

Table 82 defines SWBP substitution encoding versus the user instruction context.

TABLE 82

SWBP substitution encoding

| Total User Instruction Format | SWBP encoding |
|---|---|
| 8 | estop() |
| 16 | estop() II nop |
| 24 | estop() II nop__16 |
| 32 | estop__32() |
| 40 | estop__32() II nop |
| 48 | estop__32() II nop__16 |

11.2 IDLE Instruction

The "idle" instruction has to be executed standalone to allow the emulator software to easily identify the program counter address pointing to "idle". The assembler will track this parallelism rule. For robustness, the hardware disables the parallel enable field of the second instruction if the opcode of the first instruction is "idle".

11.3 Generic Trace Interface

THe CPU exports the program counter address (decode pipeline stage) and a set of signals from the instruction decode and condition evaluation logic to support tracing of user program execution. This can be achieved in two ways: by bringing these signals at the edge of the device through the MMI if acceptable from a pin count and performance standpoint; or by implementing a 'trace FIFO' within the user gates. The latter approach allows racing of the last program address values and the last program address discontinuities with a tag attached to them for efficient debug. This scheme does not require extra device pins and supports full speed tracing.

Table 83 summarizes the signals exported by the CPU that are required to interface with the trace FIFO module.

TABLE 83

CPU Signals required to interface to the trace FIFO module

| Name | Size | Description |
|---|---|---|
| PC | 24 bits | Decode PC Value |
| PCDIST | 1 bit | PC Discontinuity Signal |
| PCINT | 1 bit | Discontinuity due to Interrupt/Instruction format bit[2] |
| PCINTR | 1 bit | Discontinuity due to Return from ISR/ Instruction format bit[1] |
| PCSTRB | 1 bit | PC Signal fields are valid (only active when the instruction is executed) |
| COND | 1 bit | The instruction is a conditional instruction |
| EXECOND | 1 bit | Execute conditional true/false |
| EXESTRB | 1 bit | EXE Signal fields are valid |
| RPTS | 1 bit | Repeat Single active |
| RPTB1 | 1 bit | Block repeat active |
| RPTB2 | 1 bit | Block repeat (nested) active |
| INSTF | 1 bit | Instruction format bit[0] |
| EXT__QUAL | 1 bit | External Qualifier from break point active |
| CLOCK | 1 bit | CLOCK signal |
| RESET | 1 bit | Reset signal |

12. Processor Parallelism Rules

This section describes the rules a user must follow when paralleling two instructions. The assembler tool checks these parallelism rules.

12.1 Rule 0

Parallelism between two instructions and only two instructions is allowed if all the rules are respected. The execution of a forbidden paralleled pair is not guaranteed although the processor device is designed to execute a 'No OPeration' instruction instead.

12.2 Rule 1: Instruction Length Lower than Six Bytes

Two instructions can be put in parallel if the added length of the instructions does not exceed forty-eight bits (six bytes).

12.3 Rule 2: Instruction Set Support for Parallelism

Two instructions can be put in parallel:

- if one of the two instructions is provided with a parallel enable bit. The hardware support for such type of parallelism is called the parallel enable mechanism.
- if both of the instructions make single data memory accesses (Smem, or dbl(lmem)) in indirect mode as it is specified previous sections. The hardware support for such type of parallelism is called the soft dual mechanism.

12.4 Rule 3: Bus Bandwidth

Two instructions can be paralleled if the memory bus, cross unit bus and constant bus bandwidth are respected as per previous sections.

12.5 Rule 4: Parallelism between the A-Unit, the D-Unit and the P-Unit

Parallelism between the three main computation units of the processor device is allowed without restriction. An operation executed within a single unit can be paralleled with a second operation executed in one of the two other computation units.

12.6 Rule 5: Parallelism within the P-Unit processor authorizes any parallelism between following sub-units: the P-Unit load path, the P-Unit store path, and the P-Unit control operators.

In addition to the above parallelism combinations, the processor authorizes two load operations and two store operations in parallel with the P-unit.

Table 84 gives examples of each allowed parallel pair.

TABLE 84

Examples of parallelism within the P-unit

| Instruction 1 | | Instruction 2 | |
|---|---|---|---|
| Instruction Type | Allowed Examples | Allowed Examples | Instruction Type |
| P-Unit load | BRC1 = #4 | BRC0 = DR1 | P-Unit load |
| P-Unit load | BRC1 = #3 | DR1 = BRC0 | P-Unit store |
| P-Unit load | BRC1 = @variable | if(AC0 >= #0) goto #label | P-Unit control operator |
| P-Unit store | *AR3 = BRC0 | *AR5 = BRC1 | P-Unit store |
| P-Unit store | DR1 = BRC1 | repeat(#5) | P-Unit control operator |

12.7 Rule 6: Parallelism within The D-Unit the processor authorizes any parallelism between following sub-units: the D-Unit load path, the D-Unit store path, the D-Unit swap operator, the D-Unit ALU, and the D-Unit shift and store path.

In addition to the above parallelism combinations, the processor authorizes two load operations and two store operations in parallel with the D-unit.

D-Unit shift and store operations are not allowed in parallel with other instructions using the D-unit shifter and a maximum of two accumulators can be selected as source operands of the instructions to be executed in parallel within the D-unit.

Table 85 gives examples of each allowed parallel pair.

12.8 Rule 7: Parallelism within the A-Unit (Excluding the Data Address GENeration Unit)

Excluding X, Y, C and SP data address generation unit operators, the processor authorizes any parallelism between following sub-units: the A-Unit load path, the A-Unit store path, the A-Unit Swap operator, and the A-Unit ALU operator.

In addition to the above parallelism combinations, the processor authorizes two load operations and two store operations in parallel with the A-unit.

Table 86 gives examples of each allowed parallel pair.

TABLE 85

Examples of parallelism within the D-unit

| Instruction 1 | | Instruction 2 | |
|---|---|---|---|
| Instruction Type | Allowed Examples | Allowed Examples | Instruction Type |
| D-Unit load | AC1 = *AR3 | AC2 = *AR4 <<#16 | D-Unit load |
| D-Unit load | AC1 = #3 | dbl(*AR4) = AC2 | D-Unit store |
| D-Unit load | AC1 = @variable | swap(AC0, AC2) | D-Unit swap |
| D-Unit load | AC1 = @variable <<#16<br>AC1 = #3 <<#16<br>AC1 = @variable | AC3 = AC1<br>AC3 = AC3 * DR1<br>AC3 = AC1 <<#2 | D-Unit ALU/MAC/Shifter |
| D-Unit load | AC1 = *AR1 | *AR1 = hi(AC1 <<#3) | D-Unit shift and store |
| D-Unit store | *AR2 = AC1 | *AR4 = AC2 | D-Unit store |
| D-Unit store | @variable = AC1 | swap(pair(AC0), pair(AC2)) | D-Unit swap |
| D-Unit store | @variable = hi(AC1)<br>@variable = pair(hi(AC0))<br>@variable = AC1 | AC3 = AC1<br>AC3 = AC3 * DR1<br>AC3 = AC1 << DR2 | D-Unit ALU/MAC/Shifter |
| D-Unit store | *AR2 = AC1 | *AR1 = hi(AC1 <<#3) | D-Unit shift and store |
| D-Unit swap | swap(AC0, AC2)<br>swap(AC0, AC2)<br>swap(AC1, AC3) | AC3 = AC1<br>AC3 = AC3 * DR1<br>AC2 = AC1 <<#2 | D-Unit ALU/MAC/Shifter |
| D-Unit swap | swap(pair(AC0), pair(AC2)) | *AR1 = hi(AC1 << DR2) | D-Unit shift and store |
| D-Unit ALU/MAC | AC3 = AC1 and *AR2<br>AC3 = AC3 * DR1 | *AR1 = hi(AC1 << DR2)<br>*AR1 = hi(rnd(AC1 << #3)) | D-Unit shift and store |

TABLE 86

Examples of parallelism within the A-unit

| Instruction 1 | | Instruction 2 | |
|---|---|---|---|
| Instruction Type | Allowed Examples | Allowed Examples | Instruction Type |
| A-Unit load | AR1 = *AR3 | AR2 = *AR4 | A-Unit load |
| A-Unit load | AR1 = #3 | *AR4 = AR2 | A-Unit store |
| A-Unit load | AR1 = @variable AR1 = #3 | AR3 = AC1 AR3 = AR3 + AR1 | A-Unit ALU |
| A-Unit load | AR1 = @variable | swap(pair(DR0), pair(DR2)) | A-Unit swap |
| A-Unit store | *AR3 = AR1 | *AR4 = AR2 | A-Unit store |
| A-Unit store | @variable = AR1 | AR3 = AR3 + AC1 | A-Unit ALU |
| A-Unit store | @variable = AR1 | swap(pair(DR0), pair(DR2)) | A-Unit swap |
| A-Unit ALU | AR3 = AR2 and *AR2 | swap(block(AR4), block(DR0)) | A-Unit swap |

12.9 Rule 8: Parallelism within the A-unit Data Address GENeration Unit

The processor Data Address GENeration unit DAGEN contains four operators: DAGEN X, DAGEN Y, DAGEN C, and DAGEN SP. DAGEN X and DAGEN Y are the most generic of the operators as they permit generation of any of the processor addressing modes:

Single data memory addressing Smem, dbl(Lmem),

Indirect dual data memory addressing (Xmem, Ymem),

Coefficient data memory addressing (coeff),

Register bit addressing Baddr, pair(Baddr).

DAGEN X and Y operators are also used to perform pointer modification with the mar( ) instructions. DAGEN C is a dedicated operator used for coefficient data memory addressing (coeff). DAGEN SP is a dedicated operator used to address the data and system stacks.

The processor device allows two instructions to be paralleled when each uses the address generation units to generate data memory or register bit addresses. This allows the utilization of the full memory bandwidth and gives flexibility to the memory based instruction set.

12.10 Instructions with Smem Operands

Instructions having Smem single data memory operands can be paralleled if both instructions indirectly address their memory operands and if the values used to modify the pointers are those allowed for indirect dual data memory addressing (Xmem, Ymem).

The hardware support for this type of parallelism is called the soft dual mechanism. The following two instructions cannot be paralleled using this mechanism:

delay(Smem)

ACx=rnd(ACx+Smem*coeff), [DR3=Smem], delay (Smem)

12.11 Instructions with dbl(Lmem) Operands

Instructions having dbl(Lmem) single data memory operands can be paralleled if both instructions use indirect addressing to access their memory operands and if the modifiers used to modify the pointers are those allowed for indirect dual data memory addressing (Xmem, Ymem). The hardware support for such type of parallelism is called the soft dual mechanism.

12.11.1 Mar( ) Instructions

The following ‘Modify ARx address register’ instructions can be paralleled:

Mar(DAy+DAx)

Mar(DAy−DAx)

Mar(DAy=DAx)

Mar(DAy+k8)

Mar(DAy−k8)

Mar(DAy=k8)

These instructions can also be executed in parallel with instructions using the following addressing modes:

Single data memory addressing Smem, dbl(Lmem)

Register bit addressing Baddr, pair(Baddr) p1 Data and System Stack addressing instructions 12.11.2 Instructions with Xmem, Ymem and Coeff Operands Instructions having following data memory operands can not be paralleled with instructions using any of the four DAGEN operators:

Indirect dual data memory addressing (Xmem, Ymem)

Coefficient data memory addressing (coeff) in some cases.

12.11.3 Instructions Addressing the Data or System Stack

Instructions addressing the data or system stack can not be paralleled. These instructions include:

all push( ) to the top of stack instructions all pop( ) top of stack instructions all conditional and unconditional subroutine call( ) instructions all conditional and unconditional return( ) from subroutine instructions trap(, intr( )return_enable( ) instructions Instructions addressing the data or system stack can be paralleled with instructions using other DAGEN operators.

12.12 Rule 9: Modifier Limitations

When the following addressing modifiers are used within one instruction, this instruction can not be put in parallel with another instruction:

*ARn(k16)

*+ARn(k16)

*CDP(k16)

*+CDP(k16)

*abs16(#k16)

*(#k23)

*port(#k16)

This limitation applies for both single data memory addressing Smem, dbl(Lmem), and register bit addressing Baddr, pair(Baddr).

12.13 Rule 10: Instruction Priority

If the two paralleled instructions have conflicting destination resources, the instruction encoded at the higher address (the second instruction) will update the destination resources.

13. External Bus Memory Interface Controller

FIG. 131 is a block diagram illustrating a memory interface for processor 100. The MegaCell Memory Interface (MMI) comprises separate Program and Data bus controllers and a Trace/Emulation Output port. The data and program bus controllers are separate but the configuration block will be shared. Therefore fetches on the external data and program busses will run concurrently. The Trace/Emulation interface comprises both Generic Trace and Address Visibility (AVIS). The MMT bus is used to output the trace information from the internal Megacell Trace/Emulation block. The AVIS output is multiplexed onto the MMP Program address bus.

The MMI Program and Data bus controllers interface the Lead3 MegaCell Internal busses to the external Program MMP and Data MMD busses. The External Busses comprise a 32 bit MMP Bus and a 16 bit MMD Bus. For optimal performance the external busses both support one level of address and write data pipelining, a burst mode interface and write posting. The MMP Bus supports 32 bit reads and 32 bit burst reads. The MMD Bus supports 16 bit reads and 8/16 bit writes and 16 bit burst reads and writes.

Address and write data piplining on the external busses boosts performance as external accesses can be overlapped to give some degree of concurrency. When piplining is disabled a new address, and any associated write data, is only output after the current access has been acknowledged. When piplining is enabled a new address, and associated write data, may be output before the current access has been acknowledged. This means that if the addresses pending on the bus are for different devices (or address different banks within a single device) then the accesses are able to run concurrently.

Therefore when pipelining is enabled the external devices will require registers with which to capture one pipelined address and one write data as they will not be persisted to the end of the access. Piplining may be enabled/disabled via the MMI configuration registers. The address and write data is only pipelined to one level.

The MMI is always a MMP/D external bus master and never a slave. Therefore all of the transfers will be initiated from the internal busses as the only the cpu, Cache Controller or the DMA Controller can be internal bus masters. Any internal bus 'requests' are prioritized by the MMI and then run on the external busses.

The internal and external MMP/D busses are non-multiplexed and are synchronous to the System Clock DSP_CLK. The MMI uses both the rising and falling edges of DSP_CLK. The external write data is driven from the rising edge of DSP_CLK and the rest of the outputs are driven from the falling edge of DSP_CLK. Similarly the external write data is sampled on the rising edge of DSP_CLK and the rest of the inputs are sampled on the falling edge of DSP_CLK.

A maximum speed zero waitstate internal bus read or write takes two DSP_CLK periods to complete and the associated external access takes one DSP_CLK period to complete. Therefore as the internal bus masters drive and sample the internal busses to the rising edge of DSP_CLK the internal busses have half of one DSP_CLK period to propagate in each direction except for the internal write data which has one DSP_CLK period to propagate.

The external MMP/D bus interface supports both 'fast' and 'slow' external devices. Fast devices are synchronous to DSP_CLK and the Slow devices are synchronous to the STROBE clock signal which is generated by the MMI. The frequency of STROBE is programmable within the MMI configuration registers, NB. Address Piplining is not supported for slow devices.

The 16 MByte external address space is divided into 4 hard 4 MByte regions. The external bus interfaces are set dynamically from the A(23:22) address value to support fast/slow devices, address pipelining, handshaked/internally timed accesses etc. The configuration for each region is shared for the external program and data bus interfaces.

The MMI may be programmed, via configuration registers, to either time the external MMP/D bus accesses within the MMI or to wait for an external READY handshake signal. The handshake interface allows for variable length external accesses which could arise from external conflicts such as busy external devices. If the MMI is guaranteed exclusive access to an external device then the access time to that device will be always be the same and may therefore be timed internally by the MMI. The MMI also incorporates Bus Error timers on both the external MMP/D busses to signal a bus error if a handshaked access is not acknowledged with a READY within a timeout period.

The 32 bit Trace/Emulation Interface outputs the current 24 bit execution address and the 8 Generic Trace control signals at each program discontinuity. This information will allow an external post processor to reconstruct the program flow. As only the discontinuities are output the average data rate will be a fraction of the DSP_CLK rate.

13.1.1 Internal Bus Interfaces

Internal buses carry program information, or data, as described earlier and summarized in Table 85

TABLE 85

Internal Data Port Bus Protocols

| Internal Port | | Internal Bus Protocol |
|---|---|---|
| P Program Bus | P | Program |
| Cache Bus | — | Program |
| DMA Bus | — | Program |
| C Data Bus | C | Data |
| D Data Bus | D | Data |
| E Data Bus | E | Data |
| F Data Bus | F | Data |
| Generic Trace | GT | No Protocol (The MMI just registers and buffers these signals) |

A full speed Data or Program bus zero waitstate access will take two clocks to complete but as the next address can be output early (address pipelining for program busses and a one clock overlap for data busses) data can then be transferred on every clock for subsequent accesses.

The MMI interfaces to the processor Data and DMA internal busses; as shown in FIG. 131. All of these busses are synchronous to the rising edge of DSP_CLK but the internal Program and Data bus READY signals require to returned at different times; as shown in FIG. 132. FIG. 132 is a timing diagram that illustrates a Summary of Internal Program and Data Bus timings (Zero Waitstate) The internal data bus ready signal must be returned one clock in advance of the read data or the write data being sampled. The internal program bus ready signal must be returned with the read data.

13.2 Internal Bus to External Bus Timing

FIG. 133 is a timing diagram illustrating external access position within internal fetch. The external access is run between the falling edges of the internal access as shown below in FIG. 133. This allows the internal busses half of one $DSP_{13}$ CLK period to propagate in each direction but the internal write data has one DSP__CLK period to propagate.

FIG. 134 is a timing diagram illustrating MMI External Bus Zero Waitstate Handshaked Accesses The internal Data busses require the READY to be returned one clock earlier than for the Program or DMA Data busses as shown above in Figure. This gives a loss of performance when executing Data reads when they are externally handshaked and not internally timed by the MMI. This is because the internal READY__N cannot be asserted until the external READY__N has been asserted. As the Data bus transfers actually finish on the internal Data busses one DSP__CLK after the READY__N is asserted then handshaked Data Reads always take one extra clock to execute, as shown in FIG. 134.

13.3 External Address Decoding and Address Regions

The external memory 16 MByte address space is divided into 4 hard address regions of 4 MByte each. The regions are selected by the most significant address lines A23 . . . 22 as tabulated below in Table 86A.

TABLE 86A

Region Addressing

| A23..22 | Region |
|---|---|
| 00 | Region 0 |
| 01 | Region 1 |
| 10 | Region 2 |
| 11 | Region 3 |

The MegaCell master address decoding is performed by externally to the MMI by the Memory Interface Module (MIF). The MMI will only receive a request from an internal bus when the address should be run externally.

When the MMI runs an external access the 'access parameters' will be dynamically set. The parameters which can be independently set for each address region are tabulated below in Table 86B. The region configuration is shared between the external Program and Data bus controllers.

TABLE 86B

| Address Region Parameters |
|---|
| Fast/Slow external device support. |
| Enable External Bus Aborts. (If this is disabled then the MMI will run dummy external cycles following an abort from an internal bus). |
| Enable External Bus Pipelining. (If address pipeling is disabled then the external device wrapper design will be simplified). |
| External Access timing Internal or Handshaked |

TABLE 86B-continued

| Address Region Parameters |
|---|
| External access synchronous to DSP__CLK or STROBE clock. |
| STROBE clock frequency for slow accesses. |
| Length of internally timed accesses. |
| Bus Error Timeout in DSP__CLK/STROBE periods (handshaked accesses only as meaningless in timed). |

13.4 Interface to Fast and Slow Devices

FIG. 135 is a block diagram illustrating the MMI External Bus Configuration (Only key signals shown)

The MMI supports a dual interface to accommodate both fast and slow devices as shown in FIG. 135. Fast devices are synchronous to DSP__CLK and slow devices are synchronous to the STROBE clock signal which allows both device types to remain synchronous. The STROBE clock is not free running and only runs for the duration of the slow access.

Slow devices may not be fast enough to accept the DSP__CLK because they are intrinsically not fast enough or because the external busses are too heavily loaded to propagate in one DSP__CLK period. External devices may also be connected to STROBE in order to conserve power.

The MMI supports the following external access types, which may be handshaked or timed internally by the MMI, as tabulated below in Table 87.

TABLE 87

External Access Types

| Access Type | Device Type |
|---|---|
| sync to DSP__CLK and handshaked by READY | Fast Device |
| sync to STROBE and handshaked by READY | Slow Device |
| sync to DSP__CLK and timed internally by MMI | Fast Device |
| sync to STROBE and timed internally by MMI | Slow Device |

Each external address region supports only one access type as detailed in paragraph 13.3 'External Address Decoding and Address Regions'. As there are 4 regions all access types may be supported. The region mechanism dynamically selects a fast or slow device interface on each external access.

The STROBE frequency is also dynamically set by the region mechanism. The STROBE frequency is set independently for each slow device region to be an integer division of the DSP__CLK frequency where the highest frequency will be DSP__CLK/2.

If the divisor is odd then the STROBE high time will be one DSP__CLK period longer than the low time. The MMI will also ensure that if two slow accesses are run back to back the STROBE clock high time between these accesses will be the programmed STROBE clock high time for the second access ie the STROBE will not have a narrow high time.

13.5 STROBE Timing for Slow Devices

FIG. 136 is a timing diagram illustrating Strobe Timing. When interfacing to a slow device the external bus signals should be interpreted, and any inputs setup to, the rising edge of the STROBE clock signal. All of the MMI external bus outputs, except for any write data, is driven from the falling edge of DSP__CLK. The external write data is driven out 1.5 DSP__CLK periods after the associated address from the rising edge of DSP__CLK.

The skew between the other outputs and the falling edge of the STROBE is not controlled and will be dependent on bus loading. The MMI will be designed such that the other outputs will only change when STROBE switches low as shown below in Figure. This gives a nominal setup and hold time of the other outputs to the of half a STROBE period. This setup and hold time is also respected when Address Visibility (AVIS) is enabled as detailed in paragraph 13.18 'AVIS Output within Slow External Device Interface'.

13.6 Address Pipelining

On accesses to fast devices the MMI is capable of pipelining the addresses and write data to one level. Address pipelining may be enabled via the 'MMI Control Register (MMI__CR). It is therefore not mandatory for the external wrappers to support address pipelining. To support address pipelining each of the external fast device wrappers may require address and write data registers to persist an address throughout the whole access. These registers may not be required if it is inherent within the SRAM technology, for example.

FIG. 137 is a timing diagram illustrating External pipelined Accesses. Address and write data piplining on the external busses boosts performance as external accesses can be overlapped to give some degree of concurrency. When piplining is disabled a new address, and any associated write data, is only output after the current access has been acknowledged. When piplining is enabled a new address, and associated write data, may be output before the current access has been acknowledged. This means that if the addresses pending on the bus are for different devices (or address different banks within a single device) then the accesses are able to run concurrently.

The external addresses will never be pipelined to a slow device as it is impracticable for a Slow device to manage the address pipeline. Pipeline management requires that each external device monitors the request acknowledge handshake on all of the other external devices to avoid serialization errors. As a slow device has no knowledge of DSP__CLK it would be unable to do this. If an access to an external slow device follows a series of pipelined accesses to an external fast device then the MMI will not issue the new address to the slow device until all the fast accesses have run to completion.

Synchronous SARAM usually requires the address to be set up during one clock and the read data is output during the next clock. Therefore the basic access time is 2 clocks. If address piplining is used then for a series of accesses data can be delivered on every clock which give a performance boost of 100%. Therefore while multiple internal requests are pending the MMI will be able to interleave them onto the associated external bus to sustain this performance boost.

A series of pipelined external reads with a write is shown in FIG. 137.

13.7 Address Pipeline Management and Serialization Errors

Address pipelining must be properly managed to avoid data serialization errors. For example, if two back to back reads were run, with address pipelining, and the first read was to a 10 clock latency externally device and the second read was to a 2 clock latency externally device then the second device must wait for the first device to return the data first to avoid the data being returned in the wrong order.

To manage the address pipeline each of the external bus 'fast interface' devices must monitor the READY signals from all the other external fast devices which are mapped to a address region where piplining will be enabled. Therefore to support pipelining all of the external fast devices must output a READY signal even if the MMI times the access internally and actually ignores this signal.

The MMI external busses operate in handshaked or timed mode which is programmable. When in timed mode the MMI uses counters to time the external accesses with which to generate the internal ready signals. When in pipeline mode the MMI will have to manage the external data serialization via these counters if all of the external devices are not using a handshaked interface.

If, for example, there are 2 external devices A and B and address A is output followed by address B pipelined on the next clock in timed mode then the data serialization must be managed according to the device latency, as summarized in Table 88.

TABLE 88

| latency example | |
|---|---|
| Latency A = Latency B | The counters timing the A and B accesses assert the associated internal ready as they elapse. |
| Latency A < Latency B | The counters timing the A and B accesses assert the associated internal ready as they elapse. |
| Latency A > Latency B | The counter timing the A access asserts the associated internal ready as it elapses as normal. The counter timing the B access must wait for the A counter to elapse and then assert the associated internal ready on the next clock. |

13.8 Burst Accesses

For optimum efficiency the DMA and Cache controllers may access the external devices in bursts. In the limit this will allow the MMI to transfer data on every clock. An external burst access is merely a number of normal back to back accesses except that the first address of the burst will is identified by the BST outputs set to a burst code. This will allow an external burst device to capture the first address and then to sequence the burst addresses remotely. The data can then be transferred in a high speed burst where the burst device can ignore the burst addresses. The burst address sequences will be programmable within the Cache and DMA controllers and the MMI will pass these addresses straight through. However; when bursts are indivisible the MMI will use these signals to determine the burst length so that competing devices may be excluded for the duration of the burst.

Burst accesses may be run to fast (synchronous to DSP__CLK) or slow (synchronous to STROBE) devices. If the burst is irregular (which is typical) e.g. 3-1-1-1 then the burst must be timed using an external READY handshake. However; if the burst is regular e.g. 3-3-3-3 then the burst may be timed using an external READY handshake or the MMI may time it internally. Burst accesses can be run to fast devices with or without address pipelining enabled. (Accesses to Slow devices are never pipelined).

FIG. 138 is a timing diagram illustrating a 3-1-1-1 External Burst Program Read sync to DSP__CLK with address pipelining disabled. A 3-1-1-1 burst read to an external fast device, with address pipelining disabled, is shown in FIG. 138.

The Cache and DMA Controller internal busses also have BST signals with which to signal the beginning of a burst to the MMI. Bursting cannot be disabled within the MMI and if bursting is required to be disabled the Cache and DMA Controllers must ensure that the BST signals are always driven to a non-burst code.

The BST encoding for the MMP Program Bus are tabulated in table 89.

TABLE 89

External Program Bus Burst Length Encoding

| CACHE_BST[1:0] (internal signal) | PBST[1:0] (external signal) | Access Type |
|---|---|---|
| 00 | 00 | 32 Bit Non-Burst |
| 01 | 01 | Reserved |
| 10 | 10 | 2 × 32 Bit Burst |
| 11 | 11 | 4 × 32 Bit Burst |

The BST encoding for the MMD Data Bus are tabulated in Table 90.

TABLE 90

External Data Bus Burst Length Encoding

| DMA_BST[1:0] (internal signal) | DBST[1:0] (external signal) | Access Type |
|---|---|---|
| 00 | 00 | 16 Bit Non-Burst |
| Not Used (Not DMA Mode) | 01 | 8 Bit Non-Burst |
| 10 | 10 | 4 × 16 Bit Burst |
| 11 | 11 | 8 × 16 Bit Burst |

The BST outputs will have the same timing as the external MMP/D request outputs.

13.9 Burst Interleave Mode

Burst acesses on the external busses are normally indivisible which simplifies the design of the external burst devices. This means that all the burst accesses will be run back to back and accesses from a competing internal busses will not be scheduled. In 'burst interleave mode' each internal request will be scheduled as normal as detailed in paragraph 13.11 'Bus Arbitration'.

Burst interleave mode is programmed via the MMI control register. When the MMI is not in 'burst interleave mode' the MMI is able to exclude the competing devices as the burst length is known as it is signaled at the beginning of each burst by the Cache and DMA Controllers via the gl_pburst_tr(1:0) and gl_bstmode_tr(1:0) signals respectively.

When in burst interleave mode the external device wrappers must support aborts.

13.10 Aborts

Various internal busses will signal aborts to abandon unwanted requests which arise from speculative program fetches along a false path etc. This will increase external bus bandwidth by freeing available slots.

The internal busses will signal aborts as tabulated in Table 91:

TABLE 91

Internal Bus Abort Signals

| Internal Bus | Abort Signal |
|---|---|
| P Bus | gl_pdismiss_tr |
| Cache Bus | gl_pabortcache_nr |

Aborts may be enabled/disabled for each region via the MMI External Address Region Access Control Registers. It is therefore not mandatory for the external wrappers to support Aborts unless burst interleave mode is enabled. Burst Interleave Mode is detailed in paragraph 13.9.

If an internal bus signals an abort to the MMI, but the external abort functionality is disabled, then the MMI will release the internal bus immediately but will run external dummy cycles to complete the burst. These dummy cycles will not emulate the real burst exactly as they will all be run at the same address. This address will be a repeat of the address which is currently on the external address bus as the MMI will not have an address incrementor. Similarly; any write data will be repeated as well. All dummy read data will be discarded. Clearly dummy cycles cannot be run while in burst interleave mode as the current address and any write data may be associated with another internal bus.

When an internal or external bus signals an abort it may or may not issue a request with a new address.

FIG. 139 is a timing diagram illustrating Abort Signaling to External Buses

13.11 Bus Arbitration

As the MMI is the only MMP/D external bus master and never a slave it only arbitrates between the internal busses. Therefore as there are no other bus masters competing for the external busses these bus arbiters amount to simple schedulers. As the external busses support one level of address pipelining the MMI is able to interleave internal bus requests for optimal performance.

All priorities are fixed as tabulated below for both the external program and data buses in Table 92 and Table 93 respectively:

TABLE 92

Internal Program Bus Priorities

| Priority | Internal Bus |
|---|---|
| 1 (highest) | P Bus |
| 2 | Cache |

TABLE 93

Internal Data Bus Priorities

| Priority | Internal Bus |
|---|---|
| 1 (highest) | E Bus |
| 2 | F Bus |
| 3 | D Bus |
| 4 | C Bus |
| 5 | DMA |

The priority is evaluated on each time the external bus is free to output another address. This supports the Bypass functionality as detailed earlier. This means that not all internal devices are guaranteed external bandwidth and the DMA for example will always be a background task.

Burst accesses on the external busses are normally indivisible but are divisible in 'burst interleave mode' as detailed in paragraph 13.9 'Burst Interleave Mode'. When bursts are indivisible the whole burst will run to completion before a competing bus is allowed back onto the external busses which will artificially raise the priority of the Cache and DMA controllers The previous arbitration scheme where the requests are in the order which they appear to guarantee all internal devices external bandwidth has been abandoned.

13.12 External Program and Data Bus Merging

If the MMP/D busses are required to be merged by external circuitry then the SRC output signals may be used to determine any priorities. The SRC outputs identify which internal bus is currently accessing an external bus.

The SRC encoding for the MMP Program Bus are tabulated in Table 94.

TABLE 94

External Program Bus Source SRC signal Encoding

| Internal Bus | Status | PSRC |
|---|---|---|
| cpu | Read | 0 |
| Cache | Read | 1 |

The SRC encoding for the MMD Data Bus are tabulated in Table 95.

TABLE 95

External Data Bus Source SRC signal Encoding

| Internal Bus | Status | DSRC[2..0] |
|---|---|---|
| Data Bus C | Read | 000 |
| Data Bus D | Read | 001 |
| Data Bus E | Write | 010 |
| Data Bus F | Write | 011 |
| DMA | Read/Write | 100 |
| — | Reserved | 101–111 |

The SRC outputs will have the same timing as the external MMP/D address outputs.

13.13 Tristate Multiplexing

As the external bus read data and READY signals will be driven by multiple wrappers/devices then multiplexers/gates will be required to select between these devices. If tristate multiplexers are used then synchronous tristate controls will require careful design to avoid momentary bus contentions. This is because when reading from zero waitstate fast devices, or from one waitstate fast devices with address pipelining, new data can be delivered on every clock. Bus Keepers should be considered to guarantee the state of all tristate signals at all times.

In this embodiment of processor 100, the internal busses will not use tristate multiplexers and the MMI will not have any tristate outputs. However, other embodiments may use tristate devices.

13.14 Write Posting

FIG. 140 is a timing diagram illustrating Slow External writes with write posting from Ebus sync to DSP_CLK with READY. The MMI has two write post registers which may be freely associated with E and F bus writes (DMA writes will not be posted). The write post registers are used to store the write address and data such that the cpu may be acknowledged in zero waitstate. The cpu is then free to carry on with the next access and the posted writes will be run externally as slots become available. If the next access is not for the MMI and is for an internal device then that access will be able to run concurrently with a slow external write etc.

As the write post registers may be freely associated (ie. not dedicated to a particular internal bus) a patch of code which just comprises, for example, E bus writes will benefit from two levels of write posting.

Two write post registers will always be available regardless of what accesses are pending on the external data bus. For example if two writes are pending externally which, will require an output address and data register, two additional address and data registers will still be available for write posting.

The write post registers are allocated on a first requested first served basis where the E bus always has priority.

Write posting may be disabled via the MMI Control register. This may be useful during debug to disable write posting. When write posting has been disabled the internal write bus will be acknowledged as the write is driven onto the external bus by the MMI output registers.

13.15 Bus Errors

The MMI is fitted with two programmable bus timers with which to independently detect illegal addresses on the external program and data buses. Therefore if the MMI attempts an access to a non-existent device then a bus timer will elapse before a READY is received. The MMI also has a Bus Error input pin on each external bus so that external faults, such as address errors, can be signaled to the Megacell.

FIG. 141 is a block diagram illustrating circuitry for Bus Error Operation (emulation bus error not shown). The bus error timers may be programmed between 1 and 255 ticks of the clk or STROBE for fast and slow devices respectively for each region via the MMI External Address Region Access Control Registers. A timeout value of zero will disable the bus timer function.

When a bus error is signaled to the Megacell a status bit will also be set in the Bus Error Status Register. This register has one status bit for each internal and external bus. Any Bus Error Status bits which is read by the application as a 1 will be automatically cleared to 0 by the hardware. Emulation reads will not clear these status bits.

When a bus timer elapses or external bus error is signaled the internal bus will be acknowledged in the same cycle as the bus error is signaled. Bus error is signaled to the CPU as shown in FIG. 142:

13.16 Emulation and Generic Trace

The Generic Trace timing is shown in FIG. 143. The MMI outputs the Generic Trace signals directly from the Generic Trace Block within the Megacell. The Generic Trace outputs comprise the 24 bit execution address and a 12 control signals.

The execution address is only output at each program discontinuity where the control signals define the nature of the discontinuity e.g. a jump, interrupt or subprogram call. The address bus is 24 bits wide as the execution address may be misaligned even though the program fetch addresses are always 32 bit aligned.

The Generic Trace data will require post processing to reconstruct the program flow if the data was logged, for example, by using a logic analyzer. A XDS510 emulation system will do this automatically via a 7 pin JTAG interface.

The MMI merely buffers the generic trace signals and drives them externally from the falling edge of clk which is consistent with the MMP and MMD external busses such that any future merging would be straight forward. The Generic Trace block will drive the generic trace outputs from the rising edge of clk such that the internal bus will only have half of one DSP_CLK period to propagate. However this bus should not dominate the floor plan tradeoffs as is point to point ie. lightly loaded and requires no address decoding etc. The External Trace Bus could be equally driven from the rising edge of the DSP_CLK to make it floor plan non-critical which can be simply inverted in the vhdl. The generic trace block will be a separate entity in the vhdl hierarchy such that it may be easily detached.

The Generic Trace output is not handshaked and any rate adaptation FIFO must be placed externally to the Megacell. Statistics vary but if a discontinuity occurs once in every 4 instructions then the average Generic Trace output data rate will be 25% of the instruction execution rate.

The generic trace control outputs may be logically ORed together and connected to the SHIFT_IN input of an external synchronous FIFO which is clocked by DSP_CLK. Two alternative topologies may be considered for the external FIFO:

a One small to medium sized FIFO. This FIFO must operate at the full speed of the DSP_CLK.

b One small rate adaptation FIFO and a large bulk storage FIFO. The small FIFO would be connected between the mmi and the large FIFO. The small FIFO must operate at the full speed of DSP_CLK and be sized to buffer the data peak rates where discontinuities are close together. The large FIFO may then be optimized for area and then only needs to operate at the average rate which discontinuities are encountered. To conserve chip area his large FIFO could be constructed using external on chip SRAM which would revert to application SRAM when Generic Trace was disabled.

13.17 Address Visibility (AVIS)

When the gl_avis_tr input is asserted the MMI enters AVIS mode where every CPU fetch address which is output on the internal Pbus will also be output on the external program address bus. During normal operation the addresses for internal devices will not be output on the external bus in order to conserve power. Normally when in AVIS mode the cache controller will be disabled to guarantee that external program bus slots are always available.

Each new AVIS address will be signaled on the external program bus via the external mmi_validavis_nf pin which may be used as a clock enable signal on a FIFO which is clocked by DSP_CLK.

Therefore, with the Cache Controller and AVIS disabled only the external device addresses are driven externally as shown in FIG. 144. FIG. 144 is a timing diagram illustrating a Zero Waitstate Pbus fetches with Cache and AVIS disabled However, with the Cache Controller disabled and AVIS enabled both the internal and external device addresses are driven externally as shown below in FIG. 145. FIG. 145 is a timing diagram illustrating a Zero Waitstate Pbus fetches with Cache disabled and AVIS enabled The internal Pbus topology is shown in FIG. 146, which is a block diagram of the Pbus Topology.

The Cache Controller is usually disabled during AVIS mode so that the external bus is always available to output the AVIS addresses. Similarly if the Cache Controller is enabled and the Pbus addresses are for SARAM or DARAM or are hitting Cache the external bus is always available to output the AVIS addresses.

When the Pbus addresses are hitting cache the external address should always be available as long as the external devices are able to support aborts. An example of this is shown in FIG. 147. FIG. 147 is a timing diagram illustrating AVIS with the Cache Controller enabled and aborts supported If the Cache Controller is enabled when AVIS is also enabled then both the Cache Controller and the internal Pbus will be competing for the external Pbus. If the Pbus fetches to an external cachable address which results in a cache miss then the cache controller will start a burst fill to the MMI. The MMI will then put these addresses out externally and if the external device has a long latency then the data will not be returned for some time. If during this time the cpu abandons the Pbus fetch by asserting gl_pdismiss_nr and starts fetching from internal SARAM then it will be impossible for the MMI to output the internal AVIS addresses unless the external device supports aborts Therefore if the external devices do not support aborts then avis slots will be missed as the cache burst will be indivisible. This means that the resulting emulation trace will not be complete. However the system performance will be higher as cache fills will be able to run concurrently with fetches from internal devices.

The AVIS address output is not handshaked and any rate adaptation FIFO must be placed externally to the MMI. As every fetch address is output a new AVIS address could be output on every DSP_CLK cycle. AVIS may be enabled via the MMI Control Register. When AVIS is enabled the power consumption will increase at the external address lines will be driven during every cpu internal program accesses.

13.18 AVIS Output within Slow External Device Interface

AVIS addresses will be embedded within accesses to slow devices as shown below in FIG. 148. The Slow Peripheral Address and request are still valid for the whole access. Therefore AVIS is always intrusive when embedded in fetches to slow devices. FIG. 148 is a timing diagram illustrating AVIS Output Inserted into Slow External Device Access

14. Cache for Processor 100

For the purpose of this specification the following definitions will be used. If they differ from the industry standard then accept that they are historically how the processor has used them.

Cache word—the processor defines a word as a 16 bit entity.

Cache Line—The Cache memory is organised as 32 bits wide. Hence one of these 32 bit entities contains two words, and is referred to as a Cache line.

Cache Block—A Cache block is the 4*32 bit area of memory (i.e. 4 lines) that has one tag and 4 validity bits (one validity bit per Cache line) associated with it.

The high performance required for by a DSP processor requires a highly optimised data and program flow for high data and instruction throughput. The foundation of this is the memory hierarchy. To reap the full potential of the DSP's processing units, the memory hierarchy must read and write data, and read instructions fast enough to keep the relevant CPU units busy.

To satisfy the application requirements, the DSP processor memory hierarchy must satisfy the conflicting goals of low cost, adaptability and high performance.

FIG. 149 is a block diagram of a digital system with a cache according to aspects of the present invention. One of the key features of the processor is that it can be interfaced with slow program memory, such as Flash memory, however, DSP execution requires a high bandwidth for instruction fetching. It is possible to execute DSP code from the internal memory, but this requires the downloading of the full software prior to it's execution. Thus, a Cache memory, which is an auxiliary fast memory between the processor and it's main memory, where a copy of the most recently used instructions (and/or data) are written to be (re)accessed faster, sitting on the DSP program bus is the best trade-off for speed of program access and re-fill management.

14.1 Processor Cache Architecture

A Cache will improve the overall performance of a system because of the program locality or locality of reference principle. No Cache will work if the program accesses memory in a completely random fashion. To evaluate the architecture of a Cache, it is necessary to do statistical optimisations. A Cache architecture may be very good for a given program, but very bad for a different program. Hence it is very important to perform simulations and measure the performance on the actual prototypes.

Caches generally give very efficient typical memory accesses times, but they do increase the maximum memory access time. This may be a problem in real-time operations. Therefore it may be important to optimise the number of lost clock periods on miss memory accesses. The performance of a general Cache architecture is determined by the following:

Cache Memory Speed

Main Memory Speed

Cache Size

Cache Block Size

Cache Organisation

Cache Replacement Algorithm

Cache Fetch Policy

Cache Read Policy

Cache Write Policy

Cache Coherence Policy

As the present processor Cache is a "read only" instruction Cache, the latter two points can be ignored. However, other embodiments of the processor may have other types of caches, according to aspects of the present invention.

Several analyses performed on pieces of DSP software for wireless telephone applications showed that a relatively small Cache size combined with a simple architecture is efficient. Thus, the following features have been defined:

Cache size: 2 K words of 16 bits.

- 8 words per block (8×16 bits).
- 4 validity bits per block (one per Cache line).

Cache type: Direct-mapped.

- Look-through read policy.

The Cache consist of a Memory Core and a Controller. As the program space is addressable as 4 bytes (2 words) aligned to the 4 byte boundary in the processor, and as 4 bytes (2 words) are fetched per cycle, the program memory core can be organised in banks of 32-bit words for all read and write accesses.

FIG. 150 is a block diagram illustrating Cache Interfaces, according to aspects of the present invention. The Controller has to interface, on one side, to the CPU of the processor and, on the other side, to the MMI. A control and test interface port is provided by the External bus interface (not shown below).

The Cache detects if any requests for an instruction from the CPU can be served by the Cache or if a new block of instructions needs to be filled from external memory. In order to do this, the Cache Controller manages a buffer memory of address tags associated with flags to indicate that the Cache content is valid or not.

FIG. 151 is a block diagram of the Cache The following is a brief explanation of the instruction flow for a direct mapped Cache. The processor has a six stage pipeline with the first four stages, pre-fetch, fetch, decode and address stages, relevant to the Cache design. For a Pre-fetch cycle the IBU generates an address and a Request signal. The address is decoded in the MIF block and the relevant module requests are derived and sent to their respective modules. When the Cache receives a request from the MIF block it latches the address (value of the Program Counter) generated by the CPU. It then uses the lsbs of the address as an address to its Data RAM and its Address RAM (containing the Tag value and the Validity bits) in parallel. If the msbs of the address received from the CPU matches those read from the relevant location in the Address RAM and the validity bit is set, then a hit is signified to the Processor by the return of an ready signal in the fetch cycle along with the appropriate data read from the Data RAM.

If the msbs of the address received from the IBU do not match those read from the relevant location in the Address RAM or the validity bit is not set, then a miss is signified to the Processor by keeping the ready inactive in the fetch-cycle and an external request and the requested address are sent to the MMI interface for reading external program memory.

When the MMI returns and ready along with the data requested, the data can be latched into the Cache Data memory and the msbs of the requested address latched into the Address memory along with setting of the relevant validity bit in the same memory area. In the same cycle the data can also be sent back to the CPU along with an ready.

FIG. 152 shows a more detailed block diagram for a direct-mapped Cache using a word by word fetch policy to highlight the instruction flow through the Cache, but not showing the test and control interface port.

14.2 The Cache Controller—Functionality

As stated at the start of the previous section, there are several factors in the Cache architecture that determine the performance of the Cache. They will be examined in more depth in this section. The main problem to be addressed is system performance, the instruction flow to the processor must be maintained at a high level, whenever possible, allowing it to run freely as often as possible (i.e. with a minimum of stalls). This means the fetching of redundant data into the Cache should be minimised and the penalty for external fetches should also kept to a minimum.

The cost of FLASH memory is sufficiently high at present to justify that code size is one of the most important criteria when choosing a DSP processor for uses such as GSM. Hence the processor is optimised for code size and many architectural decisions have been made so that the code size for a typical application was smaller than an industry standard processor. To this end variable length instructions are used and the code is compacted, so that there is no alignment of instructions. This non-alignment also applies to calls and branches, where the code is not aligned to any boundary, whereas a x86 processor aligns calls/branch code to Cache block boundaries. This means that whenever a call/branch occurs the processor may access code from the middle of a Cache block. These conditions mainly affect the fetch policy of the Cache (see later).

The 2 K word size of the Cache was set because analysis of DSP code from typical user applications indicated that most code routines would fit within 1 k words of program memory.

For control code we can expect a branch every 4 instructions (a typical industry figure) and for DSP code we can expect a call or branch every 8 cycles (Note: this is for code generated by a 'C' compiler—for hand assembled code, branches/calls will appear less often). Hence from this and from some initial analysis, the size of a block in the Cache was set to 8 Cache words (16 bytes). This is a compromise figure between access to external memory such as FLASH, arbitration for access to such devices at the external interface and the desire to reduce the number of redundant fetches of instructions that will not be used, due to calls and branches within the code.

The Cache is designed to be transparent to the user. Therefore to locate an item in the Cache, it is necessary to have some function which maps the main memory address into a Cache location. For uniformity of reference, both Cache and main memory are divided into equal-sized units, called blocks. The placement policy determines the mapping function from the main memory address to the Cache location.

There were several possible placement policies for a Cache architecture that were modelled for the processor: the final choice was between 2-way set-associative and direct mapped architectures. Other potential organisations that were investigated, such as four-way set-associative, and fully associative, were discarded as the improvement they gave in hit ratio was very small, and the hardware complexity increase was significant, especially in the case of a fully associative Cache. Also the speed requirements of the memory were significantly increased, due to the requirement to implement a Least Recently Used (or similar) replacement algorithm.

14.3 Memory Structure

FIG. 153 is a diagram illustrating Cache Memory Structure shows the memory structure for a direct mapped memory. Each Cache line consists of 4 bytes (32 bits). Each Cache block contains four line (16 bytes, 8 words). Each line within a block has it's own validity bit, hence four validity bits per block, and each block has a tag (consisting of the msbs of the address field).

Direct Mapping

This is the simplest of all Cache organisations. In this scheme, block i (block-address) of the main memory maps into the block i modulo 256 (the number of blocks in the Cache) of the Cache. The memory address consists of four fields: the tag, block, word and byte field. Each block has a specific tag associated with it. When a block of memory exists in a Cache block, the tag associated with that block contains the high-order 12 bits of the main memory address of that block. When a physical memory address is generated for a memory reference the 8-bit block address field is used to address the corresponding Cache block. The 12-bit tag address filed is compared with the tag in the Cache block. If there is a match, the instruction in the Cache block is accessed by using the 2-bit word address field.

Table 96 summarizes a 2 k word direct-mapped Cache as implemented—i.e. 4 k byte of instructions can be held:

TABLE 96

2k word direct-mapped Cache

| Bit No. | 23–12 | 11–4 | 3–2 | 1–0 |
|---|---|---|---|---|
| Function | Tag of the Cache Block (12 msbs of program address | Index of the Cache (block index-256 blocks) | Cache line in block (4 lines) | Byte in Cache line (4 bytes) |
| No. of Bits | 12 | 8 | 2 | 2 |

FIG. 154 is a block diagram illustrating an embodiment of a Direct Mapped Cache Organisation. A disadvantage of the direct-mapped Cache when associated with a processor is that the Cache hit ratio drops sharply if two or more blocks, used alternatively, happen to map onto the same block in Cache. This causes a phenomenon known as "trashing", where two (or more) blocks continuously replace each other within the Cache, with the subsequent loss in performance. The possibility of this is relatively low in a uni-processor system if such blocks are relatively far apart in the processor address space. The problem can usually be relatively easily overcome on the processor design when assembler coding is manually performed.

The architecture of the Cache Controller will be parallel access to improve the throughput. This means that the address tags and the data will be accessed at the same time and then enabled onto the bus only if the address tag matches that stored in memory and the validity bits are validated, rather than using the address tag as an enable to the data RAMs.

14.4 Replacement Algorithm

The direct mapped Cache has the advantage of a trivial replacement algorithm by avoiding the overhead of record keeping associated with a replacement rule. Of all the blocks that can map into a Cache block only one can actually be in the Cache at a time. Hence if a block causes a miss, the controller simply determines the Cache block this block maps onto and replaces the block in that Cache block. This occurs even when the Cache is not full.

14.5 Fetch Policy

There are many options that could be evaluated for the Cache fetch policy:

- Block (4×32-bit lines) fill from the first address in the block (word 0).
- Block fill from the requested address and wrap (word n to word n−1).
- Half block (2×32-bit lines) fill from the first address in the half-block (word 0 or word 2).
- Fill only the increment (e.g. words 1, 2, 3 or words 2, 3 or word 3).
- Line by line (32-bit by 32-bit).

The policy is affected by the choice of external memory, the processor is currently aimed at using slow external memory such as FLASH, and we have limited our view point to three potential types of FLASH—asynchronous, synchronous with fixed burst length—accessible on a 64 bit boundary, or synchronous with undefined burst length.

However the first thing to note is the fact that although the program bus external to the Megacell is 32-bits wide, the expected primary end-users external interface is 16-bits wide. Hence the design calculations of timings are strongly biased to this 16 bit interface, although a 32-bit interface was also considered.

The option of filling only the increment of the address in a block offers little advantage with respect to the specification of these memories, that could not be achieved with other modes.

The decision whether to use burst mode or whether to access the external memory on a word by word basis can only be answered taking into consideration the type and speed of the external memory and the type of interface that has been deigned to connect it to the Cache design. Assuming the use of a synchronous FLASH with access 150 ns −25 ns −25 ns −25 ns access and a 16 bit wide external interface, this means for the external interface will take 225 ns (23 clocks) to capture 8 bytes of data, and 325 ns (33 clocks) to capture 16 bytes of data. (These figure are the first source of problems—if they are changed the very nature of the following results could be changed). Fetching two bytes individually will be 14 clocks, and three bytes individually will be 21 clocks.

A second problem is how often when a complete block is fetched will the complete block be required. For example if a mis-aligned request is received, the fetch should start in second word, then fetching a block is quicker than to fetch three words individually, But if the fetch started in the third word, then it would be marginally slower to fetch the entire block than fetching two individual words, hence it could be considered to be a reasonable to fetch the entire block.

In a conventional Cache an entire block is fetched, for example, in the Pentium blocks are passed to the pre-fetch queue and burst read from external memory into the Cache. This requires one tag and one validity bit per Cache block. A more complex system would allow half block fetches and require two tags per block. The fetching of a complete block is achieved by the fact that most processors (e.g. Intel) align their calls to block boundaries. Other processors may align to word boundary hence the need to fetch a word from a specific address within the block. However they normally wrap to complete the block fill. This is useful for data Caches, where access is random, for instruction Caches, usually data is linear and there is no need to wrap, but for consistency in combined data and instruction Caches wrapping takes place.

As the processor has a pure instruction Cache and no alignment on calls, we can start a call at any address within a block, the only gain we have from taking a full block is if we use burst Flash memories, which require less time to access the 2/3/4 data words as they are pipelined. However we are in danger of taking instructions that are not used by the processor at that time.

The question arises as to how often it is necessary to fetch the entire block in one fetch, and if we don't, are the unused words later used as part of another part of the same code (i.e. is it part of an if-then-else statement). This needs to be verified with the actual code and the fetch policy optimised on a case by case basis.

In the light of the above arguments, the supported fetch policies for the processor Cache are:

Block (4×32-bit lines) fill from the first address in the block (word 0).

Half block (2×32-bit lines) fill from the first address in the half-block (words 0 or word 2).

Line by line (32-bit by 32-bit).

14.6 Ready Timing

There are two possible ways of implementing the ready back to the processor for it to continue processing:

Ready when the block is returned from main memory, i.e. wait until the entire fetch is complete.

Ready when the Cache-line (32 bits) is returned from main memory, i.e. release CPU as soon as the required data is available.

The pipelined nature of the processor means that there is no advantage in either scenario, so for the simplest implementation the Cache will return an ready back to the CPU when the entire fetch (block) is completed.

However the current system design requires that all external program accesses, including those that result from Cache misses, return the relevant instruction to the Cache, and the Cache ready the processor. Due to the fact that both the Cache and the MMI work off the falling edge of the clock and the limited time to respond to the processor, an extra clock cycle delay is added to the return path since the data will be latch internally in the Cache before it is returned in the next cycle to the processor. This allows the updating of the Data, and Tag and Validity memories to happen in the same cycle as the instruction, from the Cache miss, is returned to the processor.

This method reduces one of the system timing problems, of trying to return the instruction to the processor, in the same half cycle that it is received from the MMI. It may cause a clock cycle delay when successive accesses from the CPU are to the Cache (which has a Cache miss) followed by an access to the internal memory (SARAM, DARAM etc.). However this is a relatively rare occurrence in most DSP applications, it may occur, for example, when changing from a DSP routine to an interrupt, where the loss of one DSP clock cycle can be deemed non critical.

14.7 Read Policy

To safeguard against unwanted requests externally to the Megacell we will only access external memory from the Cache when it has been ascertained that there is a Cache miss. A parallel read (i.e. perform a fetch every memory reference) of External Memory and the Cache could improve the speed of execution of the Cache, but may have performance limitations on the design externally to the Megacell, i.e. extra external fetches would be initiated which would later need aborting. This could cause problems with priorities, hence slow down the access to the external memory, via the external interface.

14.8 Data Consistency

The External memory is mapped onto the Cache memory. The internal SARAM is mapped above the External Memory and is not cacheable. Code, for example interrupt routines, can be DMAed from the External memory into the internal SARAM and the vector table rebuilt so that there is no problem of consistency.

Since the Cache is solely an instruction Cache, with no self modifying code we should have no problem with consistency of data within the Cache to that in the external memory.

14.9 Write Policy

No data on the External Memory or the Internal Memory is cacheable, nor are there any self modifying instructions. Hence no write policy is needed as there is no need to write back to the Cache.

14.9.1.1 CPU Control Signals

The CPU Status Register contains three bits to control the Cache: gl__cacheenable (Cache enable), gl__cachefreeze (Cache freeze) and gl__cachecir (Cache clear). They are described below.

Cache enable (gl__cacheenable). The Cache enable is not sent to the Cache block, but it is only sent to the Internal Memory Interface (MIF) module, where it is used as a switch off mechanism for the Cache.

When it is active, program fetches will either occur from the Cache, from the internal memory system, or from the direct path to external memory, via the MMI, depending on the program address decoding performed in the MIF block.

When it is inactive, the Cache Controller will never receive a program request, hence all program requests will be handled either by the internal memory system or the external memories via the MMI depending on the address decoding.

The Cache flushing is controlled by the gl__cacheenable signal which is set in one of the CPU's status registers. It is set there as it's behaviour is required to be atomic with the main processor. This is because when you disable/enable the Cache, the contents of the pre-fetch queue in the CPU must be flushed, so that there is no fetch advance, i.e. no instructions in the pipeline after the instruction being decoded (the Cache enable instruction). Otherwise the correct behaviour of the processor cannot be guaranteed.

The Cache enable functionality is honoured by the emulation hardware. Hence when the Cache is disabled, if the external memory entry to be overwritten is present in the Cache, the relevant Cache line is not flushed.

Cache clear (gl__cachecir). The requirement is for Cache be able to be cleared (all blocks are invalid) with an external command. The signal gl__cachecir is provided for this purpose. This Cache clearing (or flushing) should be completed in a minimum of clock cycles. However this is dependant on the final memory architecture and the technology used.

For a 2 k word Cache, with a validity bit for every 32 bits, this means 1024 validity bits. Since the Cache architecture has one tag/validity memory (organised as a memory with one tag associated with 4 validity bits at the same index), this means for a direct-mapped Cache the validity bits can be flushed in 256 cycles.

FIG. 155 is a timing diagram illustrating a Cache clear sequence. The Cache flushing is controlled by the gl__cachecir signal which is set in one of the CPU's status registers. It is set here as it's behaviour is required to be atomic with the main processor. This is because when you flush the Cache, the contents of the prefetch queue in the CPU must be flushed, so that there is no fetch advance, i.e. no instructions in the pipeline after the instruction being decoded (the "Cache__enable" instruction). Otherwise the correct behaviour of the processor cannot be guaranteed.

The gl__cachecir signal is set active by the CPU and only reset by the cache__endcir signal (one clk cycle wide) which is generated by the Cache once all the validity bits have been cleared.

The gl__cachecir signal is also sent to the MIF block, where it is gated with the gl__cacheenable signal and the program request signal. If a program request is received by the MIF for a cacheable region of memory and the Cache is enabled, but it is in the process of clearing (i.e. the gl__cachecir signal is active), then the program request will be sent directly to the MMI, bypassing the Cache.

Cache Freeze (gl__cachefreeze). The Cache Freeze provides a mechanism whereby the Cache can be locked, so that it's contents are not updated on a Cache miss, but it's contents are still available for Cache hits. This means that a block within a "frozen" Cache is never chosen as a victim of the replacement algorithm; its contents remain undisturbed until the gl__cachefreeze status is changed.

This means that any code loop that was outside of the Cache when it was "frozen" will remain outside the Cache, and hence there will be the cycle loss associated with a Cache miss, every time the code is called. Hence this feature should be used with caution, so as not to impact the performance of the processor.

The Cache freeze functionality is honoured by the emulation hardware. Hence when the Cache is frozen, if the external memory entry to be overwritten is present in the Cache, the relevant Cache line is not flushed.

14.10 Interface to the Instruction Buffer

Program fetching from the processor core is under control of the CPU—Instruction Buffer Unit (IBU), which uses the signals tabulated in Tables 97 and 98.

TABLE 97

Processor Core Interface Signals

| Function | Signal Name | Type | Comments |
|---|---|---|---|
| MISC | clk | I/P | System clock. |
| | gl__reset__nr | I/P | System reset. |
| CPu | gl__pabus__tr [23..2] | I/P | Program Address bus for program reads connected to the WPC from the Instruction Buffer. |
| | cache__pdbus__tf [31..0] | O/P | Program Data bus. |
| | gl__dismiss__tr | I/P | Disable Miss - used to avoid fetching lines of code when not strictly necessary - i.e. in false path exploration. |
| | gl__cachefreeze__tr | I/P | Cache Freeze - this locks the Cache by allowing it to be read by the processor, but not written to from the main memory. |
| | gl__cacheclr__tr | I/P | Flush the contents of the Cache (in-fact it flushes only the validation bits. The time taken to complete the action is equal to the number of lines in the Cache). Set by software n the CPU, reset by the cache__endclr__tr signal. |
| | cache__endclr__tr | O/P | End Cache Clear - this signal, one clock cycle wide is used to reset the Cache clear signal in the CPU. |

TABLE 98

| MIF Interface Signals | | | |
|---|---|---|---|
| Function | Signal | Type | Notes |
| MIF Interface | gl__preq__nr | I/P | Request to start Program Access generated by the MIF from the Master request and the address decode. |
| | cache__preadymif__nf | O/P | Acknowledge that Program access has completed. |
| | gl__preqmaster__nr | I/P | Master Program Request from the CPU Core that is monitored in order to avoid serialisation errors. |
| | gl__preadymaster__nf | I/P | Master Program Acknowledge that is generated by the MIF by gating together all the different program acknowledges all the relevant peripherals. It is monitored to avoid serialisation problems. |

14.11 A Quick Review of the CPU IBU

A detailed description of the CPU Instruction Buffer Unit/Program Control Unit was provided in earlier sections. The following is a quick summary of the main features.

The purpose of the IBU is to fetch 32-bit program words at each cycle and to reorder fetched bytes as 48-bits pair of instructions for decoding. In order to do so, it manages a buffer of 32 words of 16 bits which is byte addressable. 32-bit program words are stored in pairs of 16-bit registers of the buffer, like in a FIFO. Meanwhile, according to program execution discontinuities (jumps, branches, calls, . . . ) instructions are scanned by a 48-bit port and dispatched to decoding. Local loops, for instance, can be executed from the buffer if they fit into it. This "FIFO" is considered empty when the difference in the number of valid program words available in the buffer between the <<write>> process and the <<read>> one is lower than two. In this case, the decode is stopped and the machine pipeline is drained.

Thus the Cache has only to deal with the "write" process by delivering or not the program words. The IBU will handle processor stall. The buffer allows to give some speculative behaviour to the Controller by fetching in advance the next instruction block in the Cache while the CPU is executing a loop or by stopping any block fetched during speculative execution in a conditional branch if the true path is finally selected.

Program Request/Ready Timing (gl__preq/cache__readmif). The program request signal (gl__preq) will be active low and only active in the first cycle that the address is valid on the program bus, no matter how long it the modules take to return data. This is different to the specification of the data request signal. A master program request is generated in the CPU and sent to the MIF, where it is decoded along with the program address and the relevant program requests are generated and sent to each module.

The program ready signal (cache__readymif) will be active low and only active in the same cycle that data is returned to the CPU via the MIF. It will need to meet the set-up and hold requirements, to the rising edge of the clock, for the processor CPU.

Disable Miss feature (gl__pdismiss). The biggest source of miss in the Cache comes from discontinuities in the code (handled by calls, branches, . . . ). It can be even worse in the case of conditional branches where two scenarios exist. The CPU organisation allows to put in place mechanism for speculative exploration of these two possible scenarios and the final branch is taken at the time the condition is ready. This type of management may generate 2 sets of miss, one per branch explored. For a full explanation of this problem see the "Instruction Buffer and Control Flow Documentation". There is no interaction with the MIF block for this action.

Another hidden source of miss in the Cache comes from the fetch advance from the "write" process to the "read" one.

In order to limit the impact of the speculative exploration and the fetch advance to the miss ratio, the signal gl__pdismiss is defined to stop any on-going block fetch from the External memory. When it is active, the access is stopped and the current block being fetched is made invalid. gl__pdismiss is active in cases listed in Table 99.

TABLE 99

| Disable Miss Feature | | |
|---|---|---|
| jump and calls | undelayed | Active when a fetch advance of 2 words is achieved (outside the buffer). |
| jump and calls | delayed | Active when a fetch advance of 2 words is achieved (outside the buffer). |
| conditional branch | any | Active if there is a miss on the false path exploration and the final condition is true (false path block scrapped) or if the fetch advance of 2 words is achieved. |

14.12 Control Flow

The Cache will mainly impact two classes of control flow:

Speculative dispatch (conditional call and branch—relative and absolute addressing).

Non Speculative discontinuity.

Table 100 below explains the Unconditional Control—Relative Address case, in the pipeline:

TABLE 100

| Unconditional Control Flow - Relative Addressing | | | | | | |
|---|---|---|---|---|---|---|
| Prefetch | PC(*) | PC + 4(**) | | nWPC(***) | (****) | |
| Fetch | Fbr | Fn | | | | |
| Decode | | BR | | | | BO |
| Address | | | nWPC | | | |

TABLE 100-continued

| Unconditional Control Flow - Relative Addressing | | | | | |
|---|---|---|---|---|---|
| Prefetch | PC(*) | PC + 4(**) | | nWPC(***) | (****) |
| Access | | | | | |
| Read OP | | | | | |
| Exe | | | | | |
| | | Control instruction branch is being decoded | WPC + RPC + offset | Disable current miss and send out new WPC and program request | |

*A fetch advance of two is achieved,

**During the decode cycle of the branch instruction, no program ready signal is returned from the Cache during the generates a miss (wrong).

***Fetch of the new PC is generated and the gl__pdismiss signal can be activated with the new PC because the fetch advance is sufficient.

****The gl__pdismiss returns to inactive state.

Table 101 below explains the Unconditional Control—Absolute Address case, in the pipeline:

TABLE 1

| Unconditional Control Flow - Absolute Addressing | | | | | |
|---|---|---|---|---|---|
| Prefetch | PC(*) | PC + 4(**) | nWPC (****) | (****) | |
| Fetch | Fbr | Fn | | | |
| Decode | | BR | | | BO |
| Address | | | | | |
| Access | | | | | |
| Read OP | | | | | |
| Exe | | | | | |
| | | Control instruction branch is being decoded | Disable current miss and send out new WPC and program request | | |

*A fetch advance of two is achieved,

**During the decode cycle of the branch instruction, no program ready signal is returned from the Cache during the generates a miss (wrong).

***Fetch of the new PC is generated and the gl__pdismiss signal can be activated with the new PC because the fetch advance is sufficient.

****The gl__pdismiss returns to inactive state.

Table 102 below explains Speculative case one, when a miss is found before or until the decode stage of the conditional branch, in the pipeline:

TABLE 102

| Control Flow - Speculative Scenario #1 | | | | | | | |
|---|---|---|---|---|---|---|---|
| Prefetch | PC(*) | PC + 4(**) | | | nWPC (***) | (****) | |
| Fetch | Fbr | Fn | | | | | |
| Decode | | BR | | | | | BO |
| Address | | | | | | | |
| Access | | | | | | | |
| Read OP | | | | | | | |
| Exe | | | | | | | |
| | | Control instruction branch is being decoded | WPC + RPC + offset | Look at the condition | If (condition is true) disable current miss | | |

*A fetch advance of two is achieved,

**During the decode cycle of the branch instruction, no program ready signal is returned from the Cache during the generates a miss (wrong).

***Fetch of the new PC is generated and the gl__dismiss signal can be activated with the new PC because the fetch advance is sufficient.

****The gl__pdismiss returns to inactive state.

In this case if a miss is detected at the decode stage of the speculative instruction, the CPU needs to wait until the condition is evaluated before deciding to enable the scrapping of the current access. Thus gl__pdismiss will be set when the condition is true.

Table 103 below explains Speculative case two, when a miss is found during the decode stage of the conditional branch, in the pipeline:

TABLE 103

| Control Flow - Speculative Scenario #2 | | | | |
|---|---|---|---|---|
| Prefetch | PC(#) | PC + 4(**) | nWPC (***) | nWPC + 4 |
| Fetch | Fbr | Fn | | |
| Decode | | BR | | CO |

TABLE 103-continued

Control Flow - Speculative Scenario #2

| Prefetch | PC(#) | PC + 4(**) | | nWPC (***) | nWPC + 4 | |
|---|---|---|---|---|---|---|
| Address | | | | | | |
| Access | | | | | | |
| Read OP | | | | | | |
| Exe | | | | | | |
| | | Control instruction branch is being decoded | WPC + RPC + offset | | Look at the condition | If (condition is false) disable current miss |

*A fetch advance of two is achieved,
**During the decode cycle of the branch instruction, no program ready signal is returned from the Cache during the generates a miss (wrong).
***Fetch of the new PC is generated and the gl_dismiss signal can be activated with the new PC because the fetch advance is sufficient.
****The gl_pdismiss returns to inactive state.
In this case if the true branch is aborted we don't need to solve the miss in the Cache, thus gl_pdismiss will be set when the condition is false.

14.13 Internal Bus Interfaces

FIG. 156 is a timing diagram illustrating the CPU—Cache Interface when a Cache Hit occurs.

FIG. 157 is a timing diagram illustrating the CPU—Cache—MMI Interface when a Cache Miss occurs.

14.14 Serialization Errors

FIG. 158 is a timing diagram illustrating a Serialization Error. The problem of serialisation errors arises when a series of two program bus requests are made, the first to a "slow" memory device which adds several wait states before returning the data, and the second a "fast memory" device which can serve the access immediately.

To avoid both modules responding at the same time, or the fast device responding before the slow, it is necessary for all memory modules to monitor the bus, and wait until the slow module has asserted ready to the request, before sending its own data on the bus.

The program bus request signal from the MIF (gl_preqmaster) and the global ready signal (gl_preadymaster) are monitored by the Cache. If a request is pending to another module, the Cache registers the result of the program read and waits until the gl_preadymaster signal goes active indicating that the other module has completed the program request. In the next clock cycle, the Cache has asserted ready to the read request and drives the data on the program data bus.

Other bus accesses can proceed as normal in the interval while the Cache is awaiting the gl_preadymaster signal.

14.15 Megacell Memory Interface

The MMI Interface comprises of the following signals:

TABLE 104

MMI Interface Signals

| Function | Signal Name | Type | Comments |
|---|---|---|---|
| MMI | cache_pabus_tr [23..2] | O/P | Program Address bus for data reads. |
| | gl_pdbus_tr [31..0] | I/P | Program Data bus. |
| | cache_preq_nr | O/P | Program Address Valid indicates that the address on the bus is valid. |
| | gl_pready_nr | I/P | Program Acknowledge, valid for each word returned during a burst. |
| | cache_pabort_nf | O/P | Abort signal to abort a burst already in progress. |
| | cache_pburst_tr [1..0] | O/P | Program Burst, used to indicate whether the access is part of an block access and is indivisible from it's partners. |

The external bus interface has a 16 bit access to Flash and RAM memories, but may in the future be connected to a 32 bit bus. To support this the interface to the External Memory Interface supports 64 or 128 bit burst accesses (half-block and full-block accesses). The program burst from the Cache controller is either 2 or 4×32 bits accesses. All transfers to the Cache from the External Memory Interface are assumed burst transfers and are synchronised to, and performed at, the internal system clock. Any asynchronous behaviour from the external memory system will be handled outside of the processor design.

The length of the burst 64 byte or 128 byte is configurable via the burst_length bit in the burst configuration register. This information will be sent to Megacell Memory Interface (MMI) via the mmi_burst(1:0) signals.

The mmi_preq_n signal is used to validate each address within a burst to the External memory. An acknowledge signal mmi_pack_n is expected from the MMI for each data word returned within that burst.

FIG. 159 is a timing diagram illustrating the Cache—MMI Interface Dismiss Mechanism

14.16 Why the Cache Is Not the Output of the Megacell

The decision that the MMI acts as the interface from the processor CPU to the external world is taken mainly for reason that the Lead3 CPU may be used in several configurations using different peripherals, and some of these may not include an instruction Cache. Hence to avoid changing the interface to the external world some version of the MMI will always be present.

The addition of the MMI in the program path, does generate some problems including an additional clock cycle when fetching externally. If the external fetch path needs to be optimised at a later date (for an application with a lower hit ratio then we currently achieve—i.e. a more control orientated application), this area may need to be revisited.

14.17 External Bus Interface

All of the Cache configuration registers are accessed via the External Bus configuration port.

The Cache external bus interface will only support 16 bit reads and 16 bit writes via 16 bit external data busses. The Cache external bus interface will not perform any access size checking and will therefore not use the gl_permas signals. During a Cache access the Cache Controller will drive the cache_pepmas signal to a logical high value to signal a 16 Bit peripheral.

The 16 bit external bus data will be interpreted as 'big endian' where the most significant byte of a 16 bit data value will be transferred on bits 7:0 and the least significant byte of a 16 bit data value will be transferred on bits 15:8.

The Cache Configuration Registers will occupy 4 k Byte of address space on the external Bus. The address lines gl_peabus[10:0] will be used to index the registers within this 4 k Byte space. The Cache is chip selected via the external Bus gl_pecs[4:0] signals which are analogous to the address lines gl_peabus[16:12]. During each external bus access the value of the gl_slot[4:0] input signals will be compared with the value of the external Bus gl_pecs[4:0] chip select signals to enable the Cache external Bus interface.

The gl_slot[4:0] signals may be hard coded by wire connections.

To simplify the address decoding the Reserved locations within the register space may alias actual registers. Therefore Reserved locations should never be accessed. In addition any access to registers, and Reserved locations, within this 4 k Byte of address space will be acknowledged by the Cache.

The internal registers accessible by the external bus are as follows:

Burst configuration register: This contains a two bit number burst_len to select whether we do line, half block, or whole block accesses to the MMI. It also contains the abort_on signal, which is used to enable the abort mechanism, used when bursting from external memory, to reduce the number of redundant fetches.

Test registers: These are 4 registers that can be used to access the Cache data, tag, validity and FIFO bits used mainly for functional debug mode.

Emulation register: The Cache Emulation Register allows the emulation hardware to interrogate the Cache hardware and understand the size and organisation of the Cache.

14.18 External Bus Synchronous/Asynchronous operation

All the external bus signals which are sampled by the Cache Controller will be assumed to be asynchronous to the clk. This will make the floorplanning of the external Bus non-critical such that the external Bus propagation delays may exceed the clk period.

14.19 Reset and Idle Mode Operation

The Cache configuration, status and test registers, accessible via the external interface, can not be accessed when the Cache is either idled or held reset.

14.20 Reset Conditions

FIG. 160 is a timing diagram illustrating Reset Timing. The processor CPU exports a synchronized reset (gl_reset$_{13}$ nr) delayed from internal CPU reset. It is kept activated for a minimum of 4 clock cycles to make sure that internal CPU reset propagation is achieved.

14.21 Idle Mode

The Cache has it's own domain with respect to the Idle mode. The gl_idlecache signal from the external bus Bridge is used to locally control the idle status of the Cache. This signal is used to disable the clocks going to the Cache (i.e. clk) only when the current external access by the Cache have been completed (i.e. after any on-going Cache miss has been served). When gl_idlecache=0, the Idle mode for the Cache is not active. When gl_idlecache=1, the Idle mode for the Cache is active and all the clocks (i.e. clk) are to be disabled.

The Cache will indicate to the external bus Bridge using the cache_idleready signal that it has entered the Idle state. This signal will be used by the external bus Bridge to updated a register, readable by the CPU, used to indicate the Idle state of all the peripherals.

The Cache will be available for program fetches one clock cycle after the idle mode becomes inactive. This feature can be used to save power when the cache is not in use. Note: The Cache ignores the glidleperh bit on the external bus.

Note: The Cache accesses are disabled automatically in the MIF (using the gl_cacheidle signal) when it is put in Idle mode. Hence all cacheable accesses will be then routed externally, directly via the MMI. This is to avoid any program requests that are cacheable being sent to the Cache by the MIF when the Cache is Idled and locking the processor.

14.22 Idle Control Signals from the External Bus Bridge

The idle control signals from the external bus Bridge are tabulated in Table 105.

TABLE 105

External bus Bridge Control Signals

| Function | Signal | Type | Notes | Value of Output at Reset |
|---|---|---|---|---|
| external bus Bridge (Direct Control) | gl__idlecache__tr | I/P | Cache idle mode input. This input is used to idle the Cache when the current external access has been completed. The resultant flag is gated with the dsp__clock input, which then disables the clock to the Cache controller. | 1 |
| | cache__idleready__tf | O/P | This output flag indicates that the Cache has completed it's current external access and has entered the idle phase in response to a gl__idlecache__tr request. It is output to the external bus Bridge, so that the CPU can read it's status along with those of the other idle regions. | 0 |
| MISC | gl__slotcs__ta (4:0) | I/P | Slot location of the Cache. Hard-wired | |

14.23 Emulation Features

The design of the Cache is based on the fact of it being an instruction only Cache with no self modifying instructions. Thus Cache coherency is a non existent task as the Cache needs to be read only, and no bus snooping mechanisms need to exist.

However, for emulation purposes, we need to think about coherency due to break point insertion.

The two most common scenarios for handling breakpoints with an Instruction Cache are to either:

Turn off the Cache.

Flush the entire Cache

However these are not applicable to the processor Cache design as they do not allow for the debug of real-time code. It is presumed that the time impediment for turning the Cache off would be too high, especially if debugging from external Flash memory. Also the time required to flush the Cache and then reload it with existing loops (for example) may be too great.

Various solutions for the processor are as follows:

- Implement a write-through Cache, but this was considered to be very heavy in terms of hardware for only a small gain.
- Implement an invalidate bus cycle type for use by emulation or in general.
- Limit "DSP" thread program breakpoints to HW breakpoints only (no instruction replacement).
- Limit "DSP" thread so that it does not support real-time mode and provide memory-mapped access to Cache line entries.

The solution chosen for the processor is to only flush the relevant Cache line. This could be performed in two ways. Firstly the relevant bus could be snooped, however this would mean that for every write on the bus, even for data writes, there would need to be a read of the Cache tag memories and then to evaluate a hit/miss. This would severely impact the performance of the Cache. To this end it was decided to add a emulation flag to the breakpoint writes. Thus the Cache only responds to writes on the E-bus flagged as emulation by the gl__dmapw__tr signal. For a breakpoint estop( ) writes are byte writes, but other emulation writes could be the same as any data write on the E (and F buses—for 32 bit writes). Hence 8/16/32 bit emulation writes must all be supported.

Coherency must be maintained with the IBU i.e. the Cache flushing must be atomic. For this the IBU should be flushed (i.e. it's pointers must be reset) at the same time as the Cache line is flushed. The following aspects should be noted:

- There are two breakpoint instructions available for the processor design—two types of EST0P instruction, one which halts the PC counter and the other which doesn't, these are sixteen bit instructions.
- If the code run from Flash, the user cannot modify the instructions in the Flash in debug mode, there fore only has the two HW BP available. NB Two more HWBPs may be available via the Emulation module.

14.24 Emulation Reads

The Cache also supports emulation program reads. These will be performed on the program bus, and will be flagged by the gl__dmapr__tr signal. The Cache will respond to this by reading from the relevant address. However if the relevant location is not present in the Cache, the Cache will fetch externally, but not update the Cache contents when the required program data is returned. Thus it works in the same mode as for Cache freeze.

14.25 Emulation Miss Counter

This is a counter for debug and code profiling purposes. It will form part of the emulation hardware. The only interaction with the Cache is that the Cache provides a cache__miss__nf signal to indicate that there was a miss on the Cache program read. Aspects of the miss counter are as follows:

- The count register is a 24 bit register that maintains a count of the Cache misses, since the last reset of the register. The first 23 bits contain the count, whilst the msb is an overflow bit to show if the counter has overflowed.
- The count register is automatically reset on reading.
- 24 bit cycle counter to enable a count value to be established for every n clock cycles. This cycle counter is to be loadable via the external bus.

When the cycle counter reaches it's termination value, the current value of the miss counter will be transferred to a status register to be read by the CPU. The CPU will be flagged to indicate that the value has been updated.

Miss counter to be cleared on reading the value and on the cycle counter reaching it's termination value.

The miss counter will start to count on a hardware breakpoint that is flagged to it. This highlights a small problem (probably ignorable) that the hardware breakpoint will be evaluated in the decode section of the IBU, hence the fetch advance (difference between the PC fetch and PC execute values) will have already passed through the Cache. This may cause an error in the statistics—however it is presumed that all tests will take over a significant number of instructions that this error is not statistically relevant.

14.26 Cache Status Register

A status register is to added to the Cache so that the emulation hardware can interrogate it and find out the size and organisation of the Cache. This allows the emulation functions to be generic, since the emulation team do not wish to generate new versions of the emulation tools for every new version of the processor.

The register will be 5 bits wide and accessible via the external bus. The following define the register contents, they should be sufficient for all foreseeable versions of the processor processor. Bit encodings are listed in Table 106 and 107.

TABLE 106

| | |
|---|---|
| 00 | Direct-mapped |
| 01 | 2-way set-associative |
| 10 | 4-way set-associative |
| 11 | 8-way set-associative |

TABLE 107

| | |
|---|---|
| 000 | 1k word |
| 001 | 2k word |
| 010 | 4k word |
| 011 | 8k word |
| 100 | 16k word |
| 101 | 32k word |
| 110 | 64k word |
| 111 | 128k word |

14.27 Cache Freeze and Cache Enable

The functionality of both the Cache freeze and the Cache enable are not honoured by the emulation hardware. Hence when the Cache is frozen or disabled, if the external memory entry to be overwritten is present in the Cache, the relevant Cache line is flushed.

14.28 Emulation Signals

Emulation signals are tabulated in Table 108

TABLE 2

Emulation Signals

| Function | Signal | Type | Notes |
|---|---|---|---|
| Emulation module | gl_dmapw_tr | I/P | This signifies that the write on the e-bus is an emulation write. Hence the Cache must monitor the address and flush the relevant line if it is in the Cache. |
| | gl_dmapr_tr | I/P | This signifies that the read on the program bus is an emulation read. Hence the Cache must respond if the data is within the Cache and fetch externally if the data is not in the Cache and return the fetched data to the CPU. However in the latter case the Cache contents will not be updated, i.e. it acts as if the Cache was in Cache freeze mode. |
| | cache_dmapr_tr | O/P | |
| | cache_miss_nf | O/P | This flag is used to indicate to the emulation miss counter in the emulation hardware that |

14.29 Cache Register Summary

All of the configuration registers are shown as 16 bit. These registers are accessed via the external bus control port as defined in section 'external Bus Configuration Interface'.

Since the Cache external bus registers are mapped on a word basis and are only accessible in word accesses from the external Bus, the following Cache Controller Memory Map tabulates the word offset from the Cache base address for each of the Cache registers. Table 109 lists the cache register memory map.

TABLE 109

Cache Memory Map

| Area | Word offset from Cache base (hex) | Access | Register |
|---|---|---|---|
| Global | 00 | None | Reserved |
| Control | 01 | 2 bit W/R | Burst Configuration |
| Test | 08 | 16 bit W/R | Cache Test Control Register |
| Registers | 09 | 16 bit W/R | Cache Test Data Register |
| | 0A | 12 bit W/R | Cache Test Tag Register |
| | 0B | 4 bit W/R | Cache Test Status Register |
| Emulation | 10 | 5 bit R | Cache Emulation Register |

Reserved locations may alias actual registers and should therefore never be accessed.

14.30 Cache Configuration Registers

The cache configuration registers are tabulated in Tables 110–115

TABLE 110

Burst Configuration (CAH_BRST)

| Bit | Name | Function | Value at Reset |
|---|---|---|---|
| 1:0 | BURST_LEN | 00 => 32 bit access (line by line)<br>01 => Not used - Reserved<br>10 => 64 bit burst (half block)<br>11 => 128 bit burst (full block) | 00 |
| 15:2 | | Unused | |

The burst_len[1:0] register define the length of the burst. It will not normally be dynamically set, but set at initialisation of the device, depending on the type of the external memory. A continuous burst can be used with a slow external memory to facilitate a burst mode that works on a line by line basis. This can only be used with memories that can handle variable length bursts.

The 32-bit access is envisaged for use by asynchronous devices and the 64-bit and 128-bit burst modes are envisage to be used by conventional burst devices.

To modify the contents of this register it is first necessary to disable the Cache. The new fetch policy will then be active when the Cache is re-enabled.

The Cache Test Registers allow for the Cache memories to be read and written to by the processor CPU for functional testing, emulation and debug purposes.

If any test accesses are to be performed on the Cache, it is necessary to disable the Cache before any accesses take place. In this manner there will be no contention for memory accesses—consistent with normal program execution, and all the memory contents will be static However all the Test registers can be read whilst the Cache is enabled

TABLE 111

Cache Test Control Register (CAH_TCR) (Write/Read)

| Bit | Name | Function | Value at Reset |
|---|---|---|---|
| 15:8 | BLOCK_SEL | Select 1 of 256 blocks in the Cache. | 0x00 |
| 7 | | Unused | |
| 6:4 | LOCATION | Select 1 of 8 locations for data | 000 |
| 3 | | Unused | |
| 2 | DATA_SEL | 0 => Don't select Data Memory for writing/reading<br>1 => Select Data Memory for writing/reading | 0 |
| 1 | TAG_SEL | 0 => Don't select Tag Memory for writing/reading<br>1 => Select Data Memory for writing/reading | 0 |
| 0 | READ_WRITE | 0 => Cache Read<br>1 => Cache Write | 0 |

This register contains the control signals for the Cache Memory Test features. Bits 16:8 are used to select which of the 256 blocks of RAM are to be read/written. Bits 6:4 select which of the 8 16-bit words in the block are to be read/written. Bits 2:1 are used to select whether to write to the Data, or the Tag memories, or to both, when in write mode. Bit 0 defines whether a read or a write is to be performed.

The Data and Tag Memory selection is mutually exclusive i.e. only one of either the Tag memory or the Data memory can be read or written in any access.

TABLE 112

Cache Test Data Register (CAH_TDR) (Read/Write)

| Bit | Name | Function | Value at Reset |
|---|---|---|---|
| 15:0 | CACHE_DATA | Data value read from/written to Cache | 0 × 0000 |

The Data Register is used to read or write a value into the Data RAM at the location defined by the BLOCK_SEL in the Cache Test Control Register.

TABLE 113

Cache Test Tag Register (CAH_TTR) (Read/Write)

| Bit | Name | Function | Value at Reset |
|---|---|---|---|
| 11:0 | CACHE_TAG | Tag value read from/written to the Cache | 0 × 0000 |
| 15:12 | | Unused | |

The Tag Register is used to read or write a value into the Tag RAM at the location defined by the BLOCK_SEL in the Cache Test Control Register.

TABLE 114

Cache Test Status Register (CAH_TSR) (Write/Read)

| Bit | Name | Function | Value at Reset |
|---|---|---|---|
| 3:0 | VALIDITY | Value of the Validity bits in the Cache line | 0 |
| 15:4 | | Unused | |

The Test Status register is used to read or write a value into the Validity bits (3:0) at the location defined by the BLOCK_SEL in the Cache Test Control Register.

The Cache Emulation Register allows the emulation hardware to interrogate the Cache hardware and understand the size and organisation of the Cache.

TABLE 115

Cache Emulation register (CAH_EMU) (Read)

| Bit | Name | Function | Value at Reset |
|---|---|---|---|
| 1:0 | ORG_CODE | Organisation Code bits<br>00 - Direct-mapped<br>01 - 2-way set-associative<br>10 - 4-way set-associative<br>11 - 8-way set-associative | 00 |
| 4:2 | SIZ_CODE | Size Code bits<br>000 - 1k word<br>001 - 2k word<br>010 - 4k word<br>011 - 8k word<br>100 - 16k word<br>101 - 32k word<br>110 - 64k word<br>111 - 128k word | 001 |
| 15:5 | | Unused | |

14.31 Interface Signals Summary

The bus signals for the Cache interface to the processor MegaCell Program Bus and control signals are tabulated in Table 116:

TABLE 116

Processor CPU Interface Signals

| Function | Signal Name | Type | Notes | Value of Output at Reset |
|---|---|---|---|---|
| MISC | clk | I/P | System Clock. | |
| | gl__reset__nr | I/P | System reset. | |
| CPU | gl__pabus__tr [23..2] | I/P | Program Address bus for program reads connected to the WPC from the Instruction Buffer. | |
| | cache__pdbus__tf [31..0] | O/P | Program Data bus. | 0x0000 0000 |
| | gl__dismiss__tr | I/P | Disable Miss - used to avoid fetching lines of code when not strictly necessary - i.e. in false path exploration. | |
| | gl__cachefreeze__tr | I/P | Cache Freeze - this locks the Cache by allowing it to be read by the processor, but not written to from the main memory. | |
| | gl__cacheclr__tr | I/P | Flush the contents of the Cache (in-fact it flushes only the validation bits. The time taken to complete the action is equal to the number of lines in the Cache). Set by software n the CPU, reset by the cache__endclr__tr signal. | |
| | cache__endclr__tr | O/P | End Cache Clear - this signal, one clock cycle wide is used to reset the Cache clear signal in the CPU. | 0 |

The bus signals for the Cache interface to the MIF are tabulated in Table 117:

TABLE 117

MIF Interface Signals

| Function | Signal | Type | Notes | Value of Output at Reset |
|---|---|---|---|---|
| MIF | gl__preq__nr | I/P | Request to start Program Access generated by the MIF from the Master request and the address decode. | |
| | cache__preadymif__nf | O/P | Acknowledge that Program access has completed. | 1 |
| | gl__preqmaster__nr | I/P | Master Program Request from the CPU Core that is monitored in order to avoid serialisation errors. | |
| | gl__readymaster__nf | I/P | Master Program Acknowledge that is generated by the MIF by gating together all the different program acknowledges all the relevant peripherals. It is monitored to avoid serialisation problems. | |

The bus signals for the Cache interface to the MMI are tabulated in Table 118:

TABLE 118

MMI Interface Bus Signals

| Function | Signal | Type | Notes | Value of Output at Reset |
|---|---|---|---|---|
| MMI | cache__pabus__tr [23..2] | O/P | Program Address bus for data reads. | 0x0000 |
| | gl__pdbus__tf [31..0] | I/P | Program Data bus. | |

TABLE 118-continued

MMI Interface Bus Signals

| Function | Signal | Type | Notes | Value of Output at Reset |
|---|---|---|---|---|
| | cache__preq__nr | O/P | Program Address Valid indicates that the address on the bus is valid. | 1 |
| | gl__pready__nf | I/P | Program Acknowledge, valid for each word returned during a burst. | |
| | cache__pburst__tr [1..0] | O/P | Program Burst, used to indicate whether the access is part of an block access and is indivisible from it's partners. | 00 |

The bus signals for the Cache interface to the Processor MegaCell E Data Bus are tabulated in Table 119. The E bus from the processor is monitored solely for Cache coherency reasons during emulation. All emulation writes, whether updates to program areas or setting of breakpoints will take place on the e-bus and be flagged by the gl__dmapw signal.

TABLE 119

E Data Bus Signals

| Function | Signal | Type | Notes | Value of Output at Reset |
|---|---|---|---|---|
| CPU (E bus interface) | gl__eabus__tr [23..2] | I/P | E Data Bus Address | |
| (8/16/32 bit writes) | gl__ereqmmi__nr | I/P | E bus request to qualify the address. We use the request to the MMI as the Cache only maps external memory. | |
| | gl__dmapw__tr | I/P | This signifies that the write on the e-bus is an emulation write. Hence the Cache must monitor the address and flush the relevant line if it is in the Cache. | |
| | gl__dmapr__tr | | This signifies that the read on the program bus is an emulation read. Hence the Cache must respond if the data is within the Cache and fetch externally if the data is not in the Cache and return the fetched data to the CPU. However in the latter case the Cache contents will not be updated, i.e. it acts as if the Cache was in Cache freeze mode. | |
| | cache__miss__nf | O/P | Indicates that the last access from the CPU to the Cache was a miss. Used by the emulation hardware to count the number of misses, which is necessary for code profiling | |
| | cache__dmapr__tr | O/P | This signifies that the read on the Cache program address bus is an emulation read and that the MMI should react appropriately. | |

The external bus signals for the configuration port are tabulated in Table 120.

TABLE 120

External Bus Signals

| Function | Signal | Type | Notes | Value of Output at Reset |
|---|---|---|---|---|
| external bus Bridge (external | gl__peabus__tf [10:0] ext.bus__ad[10:0] | I/P | Address Bus used to index the 4k Byte address space which is allocated to each external Bus peripheral. | |
| Bus | gl__pecs__tf [4:0] | I/P | Chip Selects (Each Chip Select region | |

TABLE 120-continued

External Bus Signals

| Function | Signal | Type | Notes | Value of Output at Reset |
|---|---|---|---|---|
| signals) | ext.bus__cs[4:0] | | selects a 4k Byte block which is analogous to A[16:12]) | |
| | gl__pedbuso__tf [15:0] ext.bus__do[15:0] | I/P | external Output data bus driven by external bus master | |
| | cache__pedbusi__tf [15:0] ext.bus__di[15:0] | O/P | external Input data bus driven by Cache Controller. | Hi-Z |
| | gl__pernw__tf ext.bus__mw | I/P | Read not Write Signal | |
| | cache__peready__nf ext.bus__nrdy | O/P | Data Transfer Acknowledge signal | 1 |
| | gl__pestrobe__nf ext.bus__nstrb | I/P | external Bus Peripheral Clock signal | |
| | gl__permas__tf ext.bus__rmas | I/P | external data bus width (Driven high to signal a 16 Bit peripheral) | |
| | cache__pepmas__tf ext.bus__pmas | O/P | Peripheral data bus width (Will only ever be driven high to signal a 16 Bit peripheral) | 1 |

The idle control signals from the External bus Bridge are tabulated in Table 121.

TABLE 121

External bus Bridge Control Signals

| Function | Signal | Type | Notes | Value of Output at Reset |
|---|---|---|---|---|
| External bus Bridge (Direct Control) | gl__idlecache__tr | I/P | Cache idle mode input. This input is used to idle the Cache when the current external access has been completed. The resultant flag is gated with the dsp__clock input, which then disables the clock to the Cache controller. | 1 |
| | cache__idleready__tf | O/P | This output flag indicates that the Cache has completed it's current external access and has entered the idle phase in response to a gl__idlecache__n request. It is output to the External bus Bridge, so that the CPU can read it's status. | 0 |
| MISC | gl__slotcs__ta [4:0] | I/P | Slot location of the Cache. Hard-wired | |

15. Packaging

FIG. 161 is a schematic representation of an integrated circuit incorporating the invention. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

16. Digital System Embodiment

Referring now to FIG. 162, an example of an electronic computing system constructed according to the preferred embodiment of the present invention will now be described in detail. Specifically, FIG. 162 illustrates the construction of a wireless communications system, namely a digital cellular telephone handset 200 constructed according to the preferred embodiment of the invention. It is contemplated, of course, that many other types of communications systems and computer systems may also benefit from the present invention, particularly those relying on battery power. Examples of such other computer systems include personal digital assistants (PDAs), portable computers, and the like. As power dissipation is also of concern in desktop and line-powered computer systems and microcontroller applications, particularly from a reliability standpoint, it is also contemplated that the present invention may also provide benefits to such line-powered systems.

Handset 226 includes microphone M for receiving audio input, and speaker S for outputting audible output, in the conventional manner. Microphone M and speaker S are connected to audio interface 228 which, in this example, converts received signals into digital form and vice versa. In this example, audio input received at microphone M is processed by filter 230 and analog-to-digital converter (ADC) 232. On the output side, digital signals are processed by digital-to-analog converter (DAC) 234 and filter 236, with the results applied to amplifier 238 for output at speaker S.

The output of ADC 232 and the input of DAC 234 in audio interface 228 are in communication with digital interface 240. Digital interface 240 is connected to microcontroller 242 and to digital signal processor (DSP) 190. Alternatively, DSP 100 of FIG. 1 could be used in lieu of DSP 190, connected to microcontroller 242 and to digital interface 240 by way of separate buses as in the example of FIG. 6.

Microcontroller 242 controls the general operation of handset 226 in response to input/output devices 244, examples of which include a keypad or keyboard, a user display, and add-on cards such as a SIM card. Microcontroller 242 also manages other functions such as connection, radio resources, power source monitoring, and the like. In this regard, circuitry used in general operation of handset 226, such as voltage regulators, power sources, operational amplifiers, clock and timing circuitry, switches and the like are not illustrated in FIF. 16 for clarity; it is contemplated that those of ordinary skill in the art will readily understand the architecture of handset 226 from this description.

In handset 226 according to the preferred embodiment of the invention, DSP 190 is connected on one side to interface 240 for communication of signals to and from audio interface 228 (and thus microphone M and speaker S), and on another side to radio frequency (RF) circuitry 246, which transmits and receives radio signals via antenna A. Conventional signal processing performed by DSP 190 may include speech coding and decoding, error correction, channel coding and decoding, equalization, demodulation, encryption, voice dialing, echo cancellation, and other similar functions to be performed by handset 190.

RF circuitry 246 bidirectionally communicates signals between antenna A and DSP 190. For transmission, RF circuitry 246 includes codec 248 which codes the digital signals into the appropriate form for application to modulator 250. Modulator 250, in combination with synthesizer circuitry (not shown), generates modulated signals corresponding to the coded digital audio signals; driver 252 amplifies the modulated signals and transmits the same via antenna A. Receipt of signals from antenna A is effected by receiver 254, which applies the received signals to codec 248 for decoding into digital form, application to DSP 190, and eventual communication, via audio interface 228, to speaker S.

17. Instruction Set

Table 122 contains a summary of the instruction set of processor 100.

Table 123 contains a detailed description of representative instruction included in the instruction set of processor 100. Various embodiments of processor 100 may include more or fewer instruction than shown in Tables 122 and 123, and still include various aspects of the present invention.

TABLE 122

| Syntax: | | / /: | sz: | cl: | pp: |
|---|---|---|---|---|---|
| | Arithmetical Operations executed in A/D unit ALU | | | | |
| Absolute Value | \| \|operator | | | | |
| dst = \|src\| | | y | 2 | 1 | X |
| Memory Comparison | == operators | | | | |
| TC1 = (Smem == K16) | | n | 4 | 1 | X |
| TC2 = (Smem == K16) | | n | 4 | 1 | X |
| Register Comparison | ==, <, >=, != operators | | | | |
| TCx = uns(src RELOP dst) {==, <,>=, !=} | | y | 3 | 1 | X |
| TCx = TCy & uns(src RELOP dst) {==,<,>=, !=} | | y | 3 | 1 | X |
| TCx = !TCy & uns(src RELOP dst) {==,<,>=,!=} | | y | 3 | 1 | X |
| TCx = TCy \| uns(src RELOP dst) {==,<,>=,!=} | | y | 3 | 1 | X |
| TCx = !TCy \| uns(src RELOP dst) {==,<,>=,!=} | | y | 3 | 1 | X |
| Maximum, Minimum | max( ) / min( ) | | | | |
| dst = max(src,dst) | | y | 2 | 1 | X |
| dst = min(src,dst) | | y | 2 | 1 | X |
| Compare and Select Extremum | max_diff( ) / min_diff( ) | | | | |
| max_diff(ACx,ACy,ACz,ACw) | | y | 3 | 1 | X |
| max_diff_dbl(ACx,ACy,ACz,ACw,TRNx) | | y | 3 | 1 | X |
| min_diff(ACx,ACy,ACz,ACw) | | y | 3 | 1 | X |
| min_diff_dbl(ACx,ACy,ACz,ACw,TRNx) | | y | 3 | 1 | X |
| Round and Saturate | rnd( ) / saturate( ) | | | | |
| ACy = saturate(rnd(ACx)) | | y | 2 | 1 | X |
| ACy = rnd(ACx) | | y | 2 | 1 | X |
| Conditional Subtract | subc ( ) | | | | |
| subc (Smem,ACx,ACy) | | n | 3 | 1 | X |
| | Arithmetical Operations executed in A/D unit ALU (and Shifter) | | | | |
| Addition | + operator | | | | |
| dst = dst + src | | y | 2 | 1 | X |
| dst = dst + k4 | | y | 2 | 1 | X |
| dst = src + K16 | | n | 4 | 1 | X |
| dst = src + Smem | | n | 3 | 1 | X |
| ACy = ACy + (ACx << DRx) | | y | 2 | 1 | X |
| ACy = ACy + (ACx << SHIFTW) | | y | 3 | 1 | X |
| ACy = ACx + (K16 << #16) | | n | 4 | 1 | X |
| ACy = ACx + (K16 << SHFT) | | n | 4 | 1 | X |
| ACy = ACx + (Smem << DRx) | | n | 3 | 1 | X |
| ACy = ACx + (Smem << #16) | | n | 3 | 1 | X |
| ACy = ACx + uns(Smem) + Carry | | n | 3 | 1 | X |
| ACy = ACx + uns(Smem) | | n | 3 | 1 | X |
| ACy = ACx + (uns(Smem) << SHIFTW) | | n | 4 | 1 | X |
| ACy = ACx + dbl(Lmem) | | n | 3 | 1 | X |
| ACx = (Xmem << #16) + (Ymem << #16) | | n | 3 | 1 | X |
| Smem = Smem + K16 | | n | 4 | 2 | X |
| Conditional Addition/Subtraction | adsc( ) | | | | |
| ACy = adsc(Smem,ACx,TC1) | | n | 3 | 1 | X |

TABLE 122-continued

| | | | | |
|---|---|---|---|---|
| ACy = adsc(Smem,ACx,TC2) | n | 3 | 1 | X |
| ACy = adsc(Smem,ACx,TC1,TC2) | n | 3 | 1 | X |
| ACy = ads2c(Smem,ACx,DRx,TC1,TC2) | n | 3 | 1 | X |
| Dual 16-bit Arithmetic     , operator | | | | |
| HI(ACx) = Smem + DRx , LO(ACx) = Smem − DRx | n | 3 | 1 | X |
| HI(ACx) = Smem − DRx , LO(ACx) = Smem − DRx | n | 3 | 1 | X |
| HI(ACy) = HI(Lmem) + HI(ACx) , LO(ACy) = LO(Lmem) + LO(ACx) | n | 3 | 1 | X |
| HI(ACy) = HI(ACx) − HI(Lmem) , LO(ACy) = LO(ACx) − LO(Lmem) | n | 3 | 1 | X |
| HI(ACy) = HI(Lmem) − HI(ACx) , LO(ACy) = LO(Lmem) − LO(ACx) | n | 3 | 1 | X |
| HI(ACx) = DRx − HI(Lmem) , LO(ACx) = DRx − LO(Lmem) | n | 3 | 1 | X |
| HI(ACx) = HI(Lmem) + DRx , LO(ACx) = LO(Lmem) + DRx | n | 3 | 1 | X |
| HI(ACx) = HI(Lmem) − DRx , LO(ACx) = LO(Lmem) − DRx | n | 3 | 1 | X |
| HI(ACx) = HI(Lmem) + DRx , LO(ACx) = LO(Lmem) − DRx | n | 3 | 1 | X |
| HI(ACx) = HI(Lmem) − DRx , LO(ACx) = LO(Lmem) + DRx | n | 3 | 1 | X |
| HI(Lmem) = HI(ACx) <<#1 , LO(Lmem) = LO(ACx) >>#1 | n | 3 | 1 | X |
| Xmem = LO(ACx) , Ymem = HI(ACx) | n | 3 | 1 | X |
| LO(ACx) = Xmem , HI(ACx) = Ymem | n | 3 | 1 | X |
| Subtract     − operator | | | | |
| dst = dst − src | y | 2 | 1 | X |
| dst = −src | y | 2 | 1 | X |
| dst = dst − k4 | y | 2 | 1 | X |
| dst = src − K16 | n | 4 | 1 | X |
| dst = src − Smem | n | 3 | 1 | X |
| dst = Smem − src | n | 3 | 1 | X |
| ACy = ACy − (ACx << DRx) | y | 2 | 1 | X |
| ACy = ACy − (ACx << SHIFTW) | y | 3 | 1 | X |
| ACy = ACx − (K16 << #16) | n | 4 | 1 | X |
| ACy = ACx − (K16 << SHFT) | n | 4 | 1 | X |
| ACy = ACx − (Smem << DRx) | n | 3 | 1 | X |
| ACy = ACx − (Smem << #16) | n | 3 | 1 | X |
| ACy = ACx − (Smem << #16) − ACx | n | 3 | 1 | X |
| ACy = ACx − uns(Smem) − Borrow | n | 3 | 1 | X |
| ACy = ACx − uns(Smem) | n | 3 | 1 | X |
| ACy = ACx − (uns(Smem) << SHIFTW) | n | 4 | 1 | X |
| ACy = ACx − dbl(Lmem) | n | 3 | 1 | X |
| ACy = dbl(Lmem) − ACx | n | 3 | 1 | X |
| ACx = (Xmem << #16) − (Ymem << #16) | n | 3 | 1 | X |
| Arithmetical Operations executed in D unit MAC | | | | |
| Multiply and Accumulate (MAC)     * and + operators | | | | |
| ACy = rnd(ACy + (ACx * ACx)) | y | 2 | 1 | X |
| ACy = rnd(ACy + \|ACx\|) | y | 2 | 1 | X |
| ACy = rnd(ACy + (ACx * DRx)) | y | 2 | 1 | X |
| ACy = rnd((ACy * DRx) + ACx) | y | 2 | 1 | X |
| ACy = rnd(ACx + (DRx * K8)) | y | 3 | 1 | X |
| ACy = rnd(ACx + (DRx * K16)) | n | 4 | 1 | X |
| ACx = rnd(ACx + (Smem * coeff)) [,DR3 = Smem] | n | 3 | 1 | X |
| ACx = rnd(ACx + (Smem * coeff)) [,DR3 = Smem], delay(Smem) | n | 3 | 1 | X |
| ACy = rnd(ACx + (Smem * Smem)) [,DR3 = Smem] | n | 3 | 1 | X |
| ACy = rnd(ACy + (Smem * ACx)) [,DR3 = Smem] | n | 3 | 1 | X |
| ACy = rnd(ACx + (DRx * Smem)) [,DR3 = Smem] | n | 3 | 1 | X |
| ACy = rnd(ACx + (Smem * K8)) [,DR3 = Smem] | n | 4 | 1 | X |
| ACy = M40(rnd(ACx + (uns(Xmem) * uns(Ymem)))) [,DR3 = Xmem] | n | 4 | 1 | X |
| ACy = M40(rnd((ACx << #16) + (uns(Xmem) * uns(Ymem)))) [,DR3 = Xmem] | n | 4 | 1 | X |
| Multiply and Subtract (MAS)     * and − operators | | | | |
| ACy = rnd(ACy − (ACx * ACx)) | y | 2 | 1 | X |
| ACy = rnd(ACy − (ACx * DRx)) | y | 2 | 1 | X |
| ACx = rnd(ACx − (Smem * coeff)) [,DR3 = Smem] | n | 3 | 1 | X |
| ACy = rnd(ACx − (Smem * Smem)) [,DR3 = Smem] | n | 3 | 1 | X |
| ACy = rnd(ACy − (Smem * ACx)) [,DR3 = Smem] | n | 3 | 1 | X |
| ACy = rnd(ACx − (DRx * Smem)) [,DR3 = | n | 3 | 1 | X |

TABLE 122-continued

| | | | | | |
|---|---|---|---|---|---|
| Smem] | | | | | |
| ACy = M40(rnd(ACx − (uns(Xmem) * uns(Ymem)))) [,DR3 = Xmem] | | n | 4 | 1 | X |
| Multiply | * operator | | | | |
| ACy = rnd(ACx * ACx) | | y | 2 | 1 | X |
| ACy = rnd(ACy * ACx) | | y | 2 | 1 | X |
| ACy = rnd(ACx * DRx) | | y | 2 | 1 | X |
| ACy = rnd(ACx * K8) | | y | 3 | 1 | X |
| ACy = rnd(ACx * K16) | | n | 4 | 1 | X |
| ACx = rnd(Smem * coeff) [,DR3 = Smem] | | n | 3 | 1 | X |
| ACx = rnd(Smem * Smem) [,DR3 = Smem] | | n | 3 | 1 | X |
| ACy = rnd(Smem * ACx) [,DR3 = Smem] | | n | 3 | 1 | X |
| ACx = rnd(Smem * K8) [,DR3 = Smem] | | n | 4 | 1 | X |
| ACx = M40(rnd(uns(Xmem) * uns(Ymem))) [,DR3 = Xmem] | | n | 4 | 1 | X |
| ACy = rnd(uns(DRx * Smem)) [,DR3 = Smem] | | n | 3 | 1 | X |
| Arithmetical Operations executed in D unit MAC (, ALU and Shifter) | | | | | |
| Absolute Distance | abdst( ) | | | | |
| abdst (Xmem,Ymem,ACx,ACy) | | n | 4 | 1 | X |
| (Anti)Symmetrical Finite Impulse Response Filter | firs( ) / firsn( ) | | | | |
| firs(Xmem,Ymem,coeff,ACx,ACy) | | n | 4 | 1 | X |
| firsn(Xmem,Ymem,coeff,ACx,ACy) | | n | 4 | 1 | X |
| Least Mean Square | lms ( ) | | | | |
| 1ms (Xmem,Ymem,ACx,ACy) | | n | 4 | 1 | X |
| Square Distance | sqdst( ) | | | | |
| sqdst (Xmem,Ymem,ACx,ACy) | | n | 4 | 1 | X |
| Implied Paralleled | , operator | | | | |
| ACy = rnd(DRx * Xmem) , Ymem = HI(ACx << DR2) [,DR3 = Xmem] | | n | 4 | 1 | X |
| ACy = rnd(ACy + (DRx * Xmem)) , Ymem = HI(ACx << DR2) [,DR3 = Xmem] | | n | 4 | 1 | X |
| ACy = rnd(ACy − (DRx * Xmem)) , Ymem = HI(ACx << DR2) [,DR3 = Xmem] | | n | 4 | 1 | X |
| ACy = ACx + (Xmem << #16) , Ymem = HI(ACy << DR2) | | n | 4 | 1 | X |
| ACy = (Xmem << #16) − ACx , Ymem = HI(ACy << DR2) | | n | 4 | 1 | X |
| ACy = Xmem << #16) , Ymem = HI(ACx << DR2) | | n | 4 | 1 | X |
| ACx = rnd(ACx + (DRx * Xmem)) , ACy = Ymem << #16 [,DR3 = Xmem] | | n | 4 | 1 | X |
| ACx = rnd(ACx - (DRx * Xmem)) , ACy = Ymem << #16 [,DR3 = Xmem] | | n | 4 | 1 | X |
| Arithmetical Operations executed in D unit DMAC | | | | | |
| Dual Multiply, [Accumulate / Subtract] | , operator | | | | |
| ACx = M40(rnd(uns(Xmem) * uns(coeff))) , ACy = M40(rnd(uns(Ymem) * uns(coeff))) | | n | 4 | 1 | X |
| ACx = M40(rnd(ACx + (uns(Xmem) * uns(coeff)))) , ACy = M40(rnd(uns(Ymem) * uns(coeff))) | | n | 4 | 1 | X |
| ACx = M40(rnd(ACx - (uns(Xmem) * uns(coeff)))) , ACy = M40(rnd(uns(Ymem) * uns(coeff))) | | n | 4 | 1 | X |
| mar(Xmem) , ACx = M40(rnd(uns(Ymem) * uns(coeff))) | | n | 4 | 1 | X |
| ACx = M40(rnd(ACx + (uns(Xmem) * uns(coeff)))) , Acy = M40(rnd(ACy + (uns(Ymem) * uns(coeff)))) | | n | 4 | 1 | X |
| ACx = M40(rnd(ACx - (uns(Xmem) * uns(coeff)))) , ACy = M40(rnd(ACy + (uns(Ymem) * uns(coeff)))) | | n | 4 | 1 | X |
| mar(xmem) , ACx = M40(rnd(ACx + (uns(Ymem) * uns(coeff)))) | | n | 4 | 1 | X |
| ACx = M40(rnd(ACx - (uns(Xmem) * uns(coeff)))) , ACy = M40(rnd(ACy - (uns(Ymem) * uns(coeff)))) | | rn | 4 | 1 | X |
| mar(Xmem) , ACx = M40(rnd(ACx − (uns(Ymem) * uns(coeff)))) | | n | 4 | 1 | X |
| ACx = M40(rnd((ACx >> #16) + (uns(Xmem) * uns(coeff)))) , ACy = M40(rnd(ACy + (uns(Ymem) * uns(coeff)))) | | n | 4 | 1 | X |
| ACx = M40(rnd(uns(Xmem) * uns(coeff))) , ACy = M40(rnd((ACy >> #16) + (uns(Ymem) * uns(coeff)))) | | n | 4 | 1 | X |
| ACx = M40(rnd((ACx >> #16) + (uns(Xmem) * uns(coeff)))) , ACy = M40(rnd((ACy >> #16) + (uns(Ymem) uns(coeff)))) | | n | 4 | 1 | X |

TABLE 122-continued

| | | | | | |
|---|---|---|---|---|---|
| ACx = M40(rnd(ACx − (uns(xmem) * uns(coeff)))) , ACy = M40(rnd((ACy >> #16) + (uns(Ymem) * uns(coeff)))) | | n | 4 | 1 | X |
| mar(Xmem) , ACx = M40(rnd((ACx >> #16) + (uns(Ymem) * uns(coeff)))) | | n | 4 | 1 | X |
| mar(Xmem) , mar(Ymem) , mar(coeff) | | n | 4 | 1 | X |
| Arithmetical Operations executed in D unit A/D unit Shifter | | | | | |
| Normalization | exp( ) / mant( ) | | | | |
| ACy = mant(ACx) , DRx = exp(ACx) | | y | 3 | 1 | X |
| DRx = exp(ACx) | | y | 3 | 1 | X |
| Arithmetical Shift | >> and <<[C] operator | | | | |
| dst = dst >> #1 | | y | 2 | 1 | X |
| dst = dst << #1 | | y | 2 | 1 | X |
| ACy = ACx << DRx | | y | 2 | 1 | X |
| ACy = ACx <<C DRx | | y | 2 | 1 | X |
| ACy = ACx << SHIFTW | | y | 3 | 1 | X |
| ACy = ACx <<C SHIFTW | | y | 3 | 1 | X |
| Conditional Shift | sftc ( ) | | | | |
| ACx = sftc(ACx,TCx) | | y | 2 | 1 | X |
| Bit Manipulation Operations executed in A/D unit ALU | | | | | |
| Register Bit test, Reset, Set, and Complement | bit( ) / cbit( ) | | | | |
| TCx = bit(src,Baddr) | | n | 3 | 1 | X |
| cbit (src,Baddr) | | n | 3 | 1 | X |
| bit(src,Baddr) = #0 | | n | 3 | 1 | X |
| bit(src,Baddr) = #1 | | n | 3 | 1 | X |
| bit(src,pair(Baddr)) | | n | 3 | 1 | X |
| Bit Field Comparison | & operator | | | | |
| TC1 = Smem & k16 | | n | 4 | 1 | X |
| TC2 = Smem & k16 | | n | 4 | 1 | X |
| Memory Bit test, Reset, Set, and Complement | bit( ) / cbit( ) | | | | |
| TCx = bit(Smem,src) | | n | 3 | 1 | X |
| cbit (Smem,src) | | n | 3 | 2 | X |
| bit(Smem,src) = #0 | | n | 3 | 2 | X |
| bit(Smem,src) = #1 | | n | 3 | 2 | X |
| TC1 = bit(Smem,k4) , bit(Smem,k4) = #1 | | n | 3 | 2 | X |
| TC2 = bit(Smem,k4) , bit(Smem,k4) = #1 | | n | 3 | 2 | X |
| TC1 = bit(Smem,k4) , bit(Smem,k4) = #0 | | n | 3 | 2 | X |
| TC2 = bit(Smem,k4) , bit(Smem,k4) = #0 | | n | 3 | 2 | X |
| TC1 = bit(Smem,k4) , cbit(Smem,k4) | | n | 3 | 2 | X |
| TC2 = bit(Smem,k4) , cbit(Smem,k4) | | n | 3 | 2 | X |
| TC1 = bit(Smem,k4) | | n | 3 | 1 | X |
| TC2 = bit(Smem,k4) | | n | 3 | 1 | X |
| Status Bit Reset, Set | bit ( ) | | | | |
| bit(ST0,k4) = #0 | | y | 2 | 1 | X |
| bit(ST0,k4) = #1 | | y | 2 | 1 | X |
| bit(ST1,k4) = #0 | | y | 2 | 1 | X |
| bjt(ST1,k4) = #1 | | y | 2 | 1 | X |
| bit(ST2,k4) = #0 | | y | 2 | 1 | X |
| bit(ST2,k4) = #1 | | y | 2 | 1 | X |
| bit(ST3,k4) = #0 | | y | 2 | 1 | X |
| bit(ST3,k4) = #1 | | y | 2 | 1 | X |
| Bit Manipulation Operation executed in D unit Shifter and A-unit ALU | | | | | |
| Bit Field Extract and Bit Field Expand | field__extract( ) / | | | | |
| dst = field__extract(ACx,k16) | field__expand( ) | n | 4 | 1 | X |
| dst = field__expand(ACx,k16) | | n | 4 | 1 | X |
| Control Operations | | | | | |
| Goto on Address Register not Zero | if( ) goto | | | | |
| if (ARn__mod != #0) goto L16 | | n | 4 | 4/3 | AD |
| if (ARn__mod != #0) dgoto L16 | | n | 4 | 2/2 | AD |
| Unconditional Goto | goto | | | | |
| goto ACx | | y | 2 | 7 | X |
| goto L6 | | y | 2 | 4* | AD |
| goto L16 | | y | 3 | 4* | AD |
| goto P24 | | n | 4 | 3 | D |
| dgoto ACx | | y | 2 | 5 | X |
| dgoto L6 | | y | 2 | 2 | AD |
| dgoto L16 | | y | 3 | 2 | AD |
| dgoto P24 | | n | 4 | 1 | D |
| Conditional Goto | if( ) goto | | | | |
| if (cond) goto 14 | | n | 2 | 4/3 | R |
| if (cond) goto L8 | | y | 3 | 4/3 | R |
| if (cond) goto L16 | | n | 4 | 4/3 | R |
| if (cond) goto P24 | | y | 6 | 4/3 | R |
| if (cond) dgoto L8 | | y | 3 | 2/2 | R |
| if (cond) dgoto L16 | | n | 4 | 2/2 | R |
| if (cond) dgoto P24 | | y | 6 | 2/2 | R |
| Compare and Goto | if( ) goto | | | | |
| compare (uns(src RELOP K8)) goto L8 {==,<,>=, | | n | 4 | 5/4 | X |

TABLE 122-continued

| | | | | | |
|---|---|---|---|---|---|
| !=} | | | | | |
| Unconditional Call | call ( ) | | | | |
| call ACx | | y | 2 | 7 | X |
| call L16 | | y | 3 | 4 | AD |
| call P24 | | n | 4 | 3 | D |
| dcall ACx | | y | 2 | S | X |
| dcall L16 | | y | 3 | 2 | AD |
| dcall P24 | | n | 4 | 1 | D |
| Conditional Call | if( ) call( ) | | | | |
| if (cond) call L16 | | n | 4 | 4/3 | R |
| if (cond) call P24 | | y | 6 | 4/3 | R |
| if (cond) dcall L16 | | n | 4 | 2/2 | R |
| if (cond) dcall P24 | | y | 6 | 2/2 | R |
| Software Interrupt | intr( ) | | | | |
| intr(k5) | | y | 3 | 3 | D |
| Unconditional Return | return | | | | |
| return | | y | 2 | 3 | D |
| dreturn | y | 2 | 1 | D | |
| Conditional Return | if( ) return | | | | |
| if (cond) return | | y | 3 | 4/3 | R |
| if (cond) dreturn | | y | 3 | 2/2 | R |
| Return form Interrupt | return__int | | | | |
| return__int | | y | 2 | 3 | D |
| dreturn__int | | y | 2 | 1 | D |
| Repeat Single | repeat( ) | | | | |
| repeat (CSR) | | y | 2 | 1 | AD |
| repeat (CSR) , CSR += DAx | | y | 2 | 1 | X |
| repeat (k8) | | y | 2 | 1 | AD |
| repeat (CSR) , CSR += k4 | | y | 2 | 1 | AD |
| repeat (CSR) , CSR −= k4 | | y | 2 | 1 | AD |
| repeat (k16) | | y | 3 | 1 | AD |
| Block Repeat | blockrepeat{ }/ localrepeat{ } | | | | |
| localrepeat( ) | | y | 2 | 1 | AD |
| blockrepeat( ) | | y | 3 | 1 | AD |
| Conditional Repeat Single | while( ) repeat | | | | |
| while (cond && (RPTC < k8)) repeat | | y | 3 | 1 | AD |
| Switch | switch( ) | | | | |
| switch(RPTC) {18,18,18} | | y | 2 | 6 | X |
| switch(DAx) {18,18,18} | | y | 2 | 3 | X |
| Software Interrupt | trap ( ) | | | | |
| trap(k5) | | y | 3 | ? | D |
| Conditional Execution | if( ) execute( ) | | | | |
| if (cond) execute(AD__Unit) | | n | 2 | 1 | X |
| if (cond) execute(D__Unit) | | n | 2 | 1 | X |
| if (cond) execute(AD__Unit) | | n | 2 | 1 | X |
| if (cond) execute(D__Unit) | | n | 2 | 1 | X |
| if (cond) execute(AD__Unit) | | y | 3 | 1 | X |
| if (cond) execute(D__Unit) | | y | 3 | 1 | X |
| Logical Operations executed in A/D unit ALU | | | | | |
| Bitwise Complement | ~ operator | | | | |
| dst = ~src | | y | 2 | 1 | X |
| Logical Operations executed in A/D unit ALU (and Shifter) | | | | | |
| Bitwise AND | & operator | | | | |
| dst = dst & src | | y | 2 | 1 | X |
| dst = src & k8 | | y | 3 | 1 | X |
| dst = src & k16 | | n | 4 | 1 | X |
| dst = src & Smem | | n | 3 | 1 | X |
| ACy = ACy & (ACx <<< SHIFTW) | | y | 3 | 1 | X |
| ACy = ACx & (k16 <<< #16) | | n | 4 | 1 | X |
| ACy = ACx & (k16 <<< SHFT) | | n | 4 | 1 | X |
| Smem = Smem & k16 | | n | 4 | 2 | X |
| Bitwise OR | \| operator | | | | |
| dst = dst \| src | | y | 2 | 1 | X |
| dst = src \| k8 | | y | 3 | 1 | X |
| dst = src \| k16 | | n | 4 | 1 | X |
| dst = src \| Smem | | n | 3 | 1 | X |
| ACy = ACy \| (ACx <<< SHIFTW) | | y | 3 | 1 | X |
| ACy = ACx \| (k16 <<< #16) | | n | 4 | 1 | X |
| ACy = ACx \| (k16 <<< SHFT) | | n | 4 | 1 | X |
| Smem = Smem \| k16 | | n | 4 | 2 | X |
| Bitwise XOR | ˆ operator | | | | |
| dst = dst ˆ src | | y | 2 | 1 | X |
| dst = src ˆ k8 | | y | 3 | 1 | X |
| dst = src ˆ k16 | | n | 4 | 1 | X |
| dst = src ˆ Smem | | n | 3 | 1 | X |
| ACy = ACy ˆ (ACx <<< SHIFTW) | | y | 3 | 1 | X |
| ACy = ACx ˆ (k16 <<< #16) | | n | 4 | 1 | X |
| ACy = ACx ˆ (k16 <<< SHFT) | | n | 4 | 1 | X |
| Smem = Smem ˆ k16 | | n | 4 | 2 | X |

TABLE 122-continued

| | | | | | |
|---|---|---|---|---|---|
| Logical Operations executed in A/D unit Shifter | | | | | |
| Bit Field Counting | count ( ) | | | | |
| DRx = count(ACx,ACy,TCx) | | y | 3 | 1 | X |
| Rotate Left / Right | †† and // operator | | | | |
| dst = TCw †† src †† TCz | | y | 3 | 1 | X |
| dst = TCz // src // TCw | | y | 3 | 1 | X |
| Logical Shift | >>> / <<< operator | | | | |
| dst = dst <<< #1 | | y | 2 | 1 | X |
| dst = dst >>> #1 | | y | 2 | 1 | X |
| ACy = ACx <<< DRx | | y | 2 | 1 | X |
| ACy = ACx <<< SHIFTW | | y | 3 | 1 | X |
| Move Operations executed in A/D unit Register files (and Shifter) | | | | | |
| Memory Delay | delay( ) | | | | |
| delay (Smem) | | n | 2 | 1 | X |
| Address, Data and Accumulator Register Load | = operator | | | | |
| dst = k4 | | y | 2 | 1 | X |
| dst = −k4 | | y | 2 | 1 | X |
| dst = K16 | | n | 4 | 1 | X |
| dst = Smem | | n | 2 | 1 | X |
| dst = uns(high_byte(Smem)) | | n | 3 | 1 | X |
| dst = uns(low_byte(Smem)) | | n | 3 | 1 | X |
| ACx = K16 << #16 | | n | 4 | 1 | X |
| ACx = K16 << SHFT | | n | 4 | 1 | X |
| ACx = rnd(Smem << DRx ) | | n | 3 | 1 | X |
| ACx = low_byte(Smem) << SHIFTW | | n | 3 | 1 | X |
| ACx = high_byte(Smem) << SHIFTW | | n | 3 | 1 | X |
| ACx = Smem << #16 | | n | 2 | 1 | X |
| ACx = uns(Smem) | | n | 3 | 1 | X |
| ACx = uns(Smem) << SHIFTW | | n | 4 | 1 | X |
| ACx = M40(dbl(Lmem)) | | n | 3 | 1 | X |
| pair(HI(ACx)) = Lmem | | n | 3 | 1 | X |
| pair(LO(ACx)) = Lmem | | n | 3 | 1 | X |
| pair(DAX) = Lmem | | n | 3 | 1 | X |
| Specific CPU Register Load | = operator | | | | |
| MDP05 = P7 | | y | 3 | 1 | AD |
| BK03 = k12 | | y | 3 | 1 | AD |
| BK47 = k12 | | y | 3 | 1 | AD |
| BKC = k12 | | y | 3 | 1 | AD |
| BRC0 = k12 | | y | 3 | 1 | AD |
| BRC1 = k12 | | y | 3 | 1 | AD |
| CSR = k12 | | y | 3 | 1 | AD |
| PDP = P9 | | y | 3 | 1 | AD |
| MDP = P7 | | y | 3 | 1 | AD |
| MDP67 = P7 | | y | 3 | 1 | AD |
| mar(DAx = P16) | | n | 4 | 1 | AD |
| DP = P16 | | n | 4 | 1 | AD |
| CDP = P16 | | n | 4 | 1 | AD |
| BOF01 = P16 | | n | 4 | 1 | AD |
| BOF23 = P16 | | n | 4 | 1 | AD |
| BOF45 = P16 | | n | 4 | 1 | AD |
| BOF67 = P16 | | n | 4 | 1 | AD |
| BOFC = P16 | | n | 4 | 1 | AD |
| SP = P16 | | n | 4 | 1 | AD |
| SSP = P16 | | n | 4 | 1 | AD |
| DP = Smem | | n | 3 | 1 | X |
| CDP = Smem | | n | 3 | 1 | X |
| BOF01 = Smem | | n | 3 | 1 | X |
| BOF23 = Smem | | n | 3 | 1 | X |
| BOF45 = Smem | | n | 3 | 1 | X |
| BOF67 = Smem | | n | 3 | 1 | X |
| BOFC = Smem | | n | 3 | 1 | X |
| SP = Smem | | n | 3 | 1 | X |
| SSP = Smem | | n | 3 | 1 | X |
| TRN0 = Smem | | n | 3 | 1 | X |
| TRN1 = Smem | | n | 3 | 1 | X |
| BK03 = Smem | | n | 3 | 1 | X |
| BKC = Smem | | n | 3 | 1 | X |
| BRC0 = Smem | | n | 3 | 1 | X |
| BRC1 = Smem | | n | 3 | 1 | X |
| CSR = Smem | | n | 3 | 1 | X |
| MDP = Smem | | n | 3 | 1 | X |
| MDP05 = Smem | | n | 3 | 1 | X |
| PDP = Smem | | n | 3 | 1 | X |
| BK47 = Smem | | n | 3 | 1 | X |
| MDP67 = Smem | | n | 3 | 1 | X |
| LCRPC = dbl(Lmem) | | n | 3 | 1 | X |
| Specific CPU Register Store | = operator | | | | |
| Smem = DP | | n | 3 | 1 | X |
| Smem = CDP | | n | 3 | 1 | X |

TABLE 122-continued

| | | | | | |
|---|---|---|---|---|---|
| Smem = BOF01 | | n | 3 | 1 | X |
| Smem = BOF23 | | n | 3 | 1 | X |
| Smem = BOF45 | | n | 3 | 1 | X |
| Smem = BOF67 | | n | 3 | 1 | X |
| Smem = BOFC | | n | 3 | 1 | X |
| Smem = SP | | n | 3 | 1 | X |
| Smem = SSP | | n | 3 | 1 | X |
| Smem = TRN0 | | n | 3 | 1 | X |
| Smem = TRH1 | | n | 3 | 1 | X |
| Smem = BK03 | | n | 3 | 1 | X |
| Smem = BKC | | n | 3 | 1 | X |
| Smem = BRC0 | | n | 3 | 1 | X |
| Smem = BRC1 | | n | 3 | 1 | X |
| Smem = CSR | | n | 3 | 1 | X |
| Smem = MDP | | n | 3 | 1 | X |
| Smem = MDP05 | | n | 3 | 1 | X |
| Smem = PDP | | n | 3 | 1 | X |
| Smem = BK47 | | n | 3 | 1 | X |
| Smem = MDP67 | | n | 3 | 1 | X |
| dbl(Lmem) = LCRPC | | n | 3 | 1 | X |
| Move to Memory / Memory Initialization | = operator | | | | |
| Smem = coeff | | n | 3 | 1 | X |
| coeff = Smem | | n | 3 | 1 | X |
| Smem = K8 | | n | 3 | 1 | X |
| Smem = K16 | | n | 4 | 1 | X |
| Lmem = dbl(coeff) | | n | 3 | 1 | X |
| dbl(coeff) = Lmem | | n | 3 | 1 | X |
| dbl(Ymem) = dbl(Xmem) | | n | 3 | 1 | X |
| Ymem = Xmem | | n | 3 | 1 | X |
| Pop Top of Stack | pop( ) | | | | |
| dst1,dst2 = pop( ) | | y | 2 | 1 | X |
| dst = pop( ) | | y | 2 | 1 | X |
| dst,Smem = pop( ) | | n | 3 | 1 | X |
| ACx = dbl(pop( )) | | y | 2 | 1 | X |
| Smem = pop( ) | | n | 2 | 1 | X |
| dbl(Lmem) = pop( ) | | n | 2 | 1 | X |
| Push Onto Stack | push( ) | | | | |
| push (src1 , src2) | | y | 2 | i | X |
| push(src) | | y | 2 | 1 | X |
| push(src, Smem) | | n | 3 | 1 | X |
| dbl(push(ACx)) | | y | 2 | 1 | X |
| push (Smem) | | n | 2 | 1 | X |
| push(dbl(Lmem)) | | n | 2 | 1 | X |
| Address, Data and Accumulator Register Store | = operator | | | | |
| Smem = src | | *n | 2 | 1 | X |
| high_byte(Smem) = src | | n | 3 | 1 | X |
| low_byte(Smem) = src | | n | 3 | 1 | X |
| Smem = HI(ACx) | | n | 2 | 1 | X |
| Smem = HI(rnd(ACx)) | | n | 3 | 1 | X |
| Smem = LO(ACx << DRx) | | n | 3 | 1 | X |
| Smem = HI(rnd(ACx << DRx)) | | n | 3 | 1 | X |
| Smem = LO(ACx << SHIFTW) | | n | 3 | 1 | X |
| Smem = HI(ACx << SHIFTW) | | n | 3 | 1 | X |
| Smem = HI(rnd(ACx << SHIFTW)) | | n | 4 | 1 | X |
| Smem = HI(saturate(uns(rnd(ACx)))) | | n | 3 | 1 | X |
| Smem = HI(saturate(uns(rnd(ACx << DRx)))) | | n | 3 | 1 | X |
| Smem = HI(saturate(uns(rnd(ACx << SHIFTW)))) | | n | 4 | 1 | X |
| dbl(Lmem) = ACx | | n | 3 | 1 | X |
| dbl(Lmem) = saturate(uns(ACx)) | | n | 3 | 1 | X |
| Lmem = pair(HI(ACx)) | | n | 3 | 1 | X |
| Lmem = pair(LO(ACx)) | | n | 3 | 1 | X |
| Lmem = pair(DAx) | | n | 3 | 1 | X |
| Register Content Swap | swap ( ) | | | | |
| swap (scode) | | y | 2 | 1 | AD/X |
| Move Operations executed in A/D unit ALU | | | | | |
| Specific CPU Register Move | = operator | | | | |
| DAx = CDP | | y | 2 | 1 | X |
| DAx = BRC0 | | y | 2 | 1 | X |
| DAx = BRC1 | | y | 2 | 1 | X |
| DAx = RPTC | | y | 2 | 1 | X |
| CDP = DAx | | y | 2 | 1 | X |
| CSR = DAx | | y | 2 | 1 | X |
| BRC1 = DAx | | y | 2 | 1 | X |
| BRC0 = DAx | | y | 2 | 1 | X |
| DAx = SP | | y | 2 | 1 | X |
| DAx = SSP | | y | 2 | 1 | X |
| SP = DAx | | y | 2 | 1 | X |
| SSP = DAx | | y | 2 | 1 | X |
| Address, Data and Accumulator Register Move | = operator | | | | |

TABLE 122-continued

| | | | | | |
|---|---|---|---|---|---|
| dst = src | | y | 2 | 1 | X |
| DAx = HI(ACx) | | y | 2 | 1 | X |
| HI(ACx) = DAx | | y | 2 | 1 | X |
| Miscellaneous Operations independent of A/D unit Operators | | | | | |
| Co-Processor Hardware Invocation | copr( ) | | | | |
| copr ( ) | | n | 1 | 1 | D |
| Idle Until Interrupt | idle | | | | |
| idle | | y | 2 | ? | D |
| Linear / Circular Addressing | circular( ) / linear( ) | | | | |
| linear ( ) | | n | 1 | 1 | AD |
| circular ( ) | | n | 1 | 1 | AD |
| Memory Map Register Access | mmap( ) | | | | |
| mmap ( ) | | n | 1 | 1 | D |
| No Operation | nop | | | | |
| nop | | y | 1 | 1 | D |
| nop_16 | | y | 2 | 1 | D |
| Peripheral Port Register Access | readport( ) / writeport( ) | | | | |
| readport ( ) | | n | 1 | 1 | D |
| writeport ( ) | | n | 1 | 1 | D |
| Reset | reset | | | | |
| reset | | y | 2 | ? | D |
| Miscellaneous Operations executed in A unit ALU | | | | | |
| Data Stack Pointer Modify | + operator | | | | |
| SP = SP + K8 | | y | 2 | 1 | X |
| Miscellaneous Operations executed in A unit DAGENs | | | | | |
| Modify Address Register | mar ( ) | | | | |
| mar(DAy + DAx) | | y | 3 | 1 | AD |
| mar(DAy + DAx) | | y | 3 | 1 | AD |
| mar(DAy − DAx) | | y | 3 | 1 | AD |
| mar(DAy − DAx) | | y | 3 | 1 | AD |
| mar(DAy = DAx) | | y | 3 | 1 | AD |
| mar(DAy = DAx) | | y | 3 | 1 | AD |
| mar(DAx + k8) | | y | 3 | 1 | AD |
| mar(DAx + k8) | | y | 3 | 1 | AD |
| mar(DAx − k8) | | y | 3 | 1 | AD |
| mar(DAx − k8) | | y | 3 | 1 | AD |
| mar(DAx = k8) | | y | 3 | 1 | AD |
| mar(DAx = k8) | | y | 3 | 1 | AD |
| mar (Smem) | | n | 2 | 1 | AD |

| Operand designation : Description | |
|---|---|
| ACx, ACy, ACz, ACw | : Accumulator AC[0..3] |
| ARx, ARy | : Address register AR[0..7] |
| DRx, DRy | : Data register DR[0..3] |
| DAx, DAy | : Address register AR[0..7]<br>or data register DR[0..3] |
| src, dst | : Accumulator AC(0..3]<br>or address register AR[0..7]<br>or data register DR[0..3] |
| Smem | : Word single data memory access (16-bit data access) |
| Lmem | : Long word single data memory access (32-bit data access)<br>Smem, Lmem direct memory addressing modes:<br>@dma (under .CPL_off directives ; CPL = 0)<br>*SP(dma) (under .CPL_off directives ; CPL = 0)<br>Smem, Lmem indirect memory addressing modes:<br>(under .ARMS_off directives ; ARMS = 0)<br>*ARn, *ARn+, *ARn−, *(ARn+DR0), *(ARn−DR0), *ARn(DR0),<br>*CDP, *CDP+, *CDP−, *(ARn+DR1), *(ARn−DR1), *ARn(DR1),<br>*(ARn+DR0B), *ARn(#K16), *+ARn(#K16), *+ARn,<br>*(ARn−DR0B), *CDP(#K16), *+CDP(#K16), *−ARn,<br>(under .ARMS_on directives ; ARMS = 1)<br>*ARn, *ARn+, *ARn−, *(ARn+DR0), *(ARn−DR0), *ARn(DR0),<br>*CDP, *CDP+, *CDP−, *ARn(short(*K3)),<br>*ARn(#K16), *+ARn(#K16)<br>*CDP(#K16), *+CDP(#K16)<br>Smem, Lmem absolute memory addressing modes:<br>* abs16(#k16), *(#k23) |
| Xmem, Ymem | : Indirect dual data memory access (two data accesses)<br>*ARn, *ARn+, *ARn−, *(ARn+DR0), *(ARn−DR0), *ARn(DR0)<br>*(ARn+DR1), *(ARn−DR1) |
| coeff | : Coefficient memory access (16-bit or 32-bit data access)<br>coef(*CDP), coef(*CDP+), coef (*CDP−), coef(*(CDP+DR0)) |

TABLE 122-continued

Baddr : Register bit address
Baddr direct register addressing modes:
@dba
Baddr indirect register addressing modes:
(under .ARMS_off directives ; ARMS = 0)
*ARn, *ARn+, *ARn−, *(ARn+DR0), *(ARn−DR0), *ARn(DR0),
*CDP, *CDP+, *CDP−, *(ARn+DR1), *(ARn−DR1), *ARn(DR1),
*(ARn+DR0B) , *ARn(#K16), *+ARn(*K16), *+ARn,
*(ARn−DR0B), *CDP(#K16), *+CDP(#K16), *−ARn,
(under .ARMs_on directives ; ARMS = 1)
*ARn, *ARn+, *ARn−, *(ARn+DR0), *(ARn−DR0), *ARn(DR0),
*CDP, *CDP+, *CDP−, *ARn(short(#K3)),
*ARn(#K16) , *+ARn(#K16)
*CDP(#K16), *+CDP(#K16)

kx : Unsigned constant coded on x bits

Kx : Signed constant coded on x bits

SHFT : [0..15] immediate shift value

SHIFTW : [−32..+31] immediate shift value lx : Program address label (unsigned offset relative
to program counter register (PC) coded on x bits)

Lx : Program address label (signed offset relative
to program counter register (PC) coded on x bits)

Px : Program or data address label
(absolute address coded on x bits)

Borrow : Logical complement of Carry status bit

TCx, TCy : Test control flag 1 or 2 cond : Condition based on accumulator value depend on M40
and LEAD status bits:
ACx == #0, ACx < #0, ACx <= #0, overflow(ACx),
ACx != #0, ACx > #0, ACx >= #0, !overflow(ACx).
Condition on address or data register DAx:
DAx == #0, DAx < #0, DAx <= #0,
DAx != #0, DAx > #0, DAx >= #0.
Condition on test control flags, or on Carry status bit:
[!]C,
[!]TCx,
[!]TC1 & [!]TC2,
[!]TC1 | [!]TC2,
[!]TC1 ^ [!]TC2.

| Pointer Register | Circular Modification Configuration bit | Main Data Page Pointer (not for Baddr addressing mode) | Buffer Offset Register | Buffer Size Register |
|---|---|---|---|---|
| AR0 | ST2[0] | MDP05 | BOF01[15:0] | |
| AR1 | ST2[1] | MDP05 | BOF01[15:0] | BK03 |
| AR2 | ST2[2] | MDP05 | BOF23[15:0] | |
| AR3 | ST2[3] | MDP05 | BOF23[15:0] | |
| AR4 | ST2[4] | MDP05 | BOF45[15:0] | |
| AR5 | ST2[5] | MDP05 | B0F45[15:0] | BK47 |
| AR6 | ST2[6] | MDP67 | B0F67[15:0] | |
| AR7 | ST2[7] | MDP67 | B0F67[15:0] | |
| CDP | ST2[8] | MDP | BOFC[15:0] | BKC |

ST0

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| AC0V3 | AC0V2 | AC0V1 | AC0V0 | C | TC2 | TC1 | DP15 | DP14 | DP13 | DP12 | DP11 | DP10 | DP09 | DP08 | DP07 |

TABLE 122-continued

ST1

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | INTM | ARMS | CPL | LEAD | SATA | GSM | RDM | FRCT | M40 | SATD | SXMD |

ST2

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | | CDPLC | AR7LC | AR6LC | AR5LC | AR4LC | AR3LC | AR2LC | AR1LC | AR0LC |

ST3

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CAFRZ | CAEN | CACLR | AVIS | MPNMC | PBERR | MBER | HM | | | | | SAMY | SAMX | SAMR | SAMP |

TABLE 123

Index Table of Instructions for Processor 100

| Index Table<br>Example Page of User Guide Instruction Description | |
|---|---|
| Arithmetical Operations | |
| Absolute Value | \|\| operator |
| Memory Comparison | == operator |
| Register Comparison | ==, <, >=, != operators |
| Maximum, Minimum | max() / min() |
| Compare and Select Extremum | max_diff() / min_diff() |
| Round and Saturate | rnd() / saturate() |
| Conditional Subtract | subc() |
| Addition | + operator |
| Conditional Addition / Subtraction | adsc() |
| Dual 16-bit Arithmetic | , operator |
| Subtract | − operator |
| Multiply and Accumulate (MAC) | * and + operators |
| Multiply and Subtract (MAS) | * and − operators |
| Multiply | * operator |
| Absolute Distance | abdst() |
| (Anti)Symmetrical Finite Impulse Response Filter | firs() / firsn() |
| Least Mean Square | lms() |
| Square Distance | sqdst() |
| Implied Paralleled | , operator |
| Dual Multiply, [Accumulate / Subtract] | , operator |
| Normalization | exp() / mant() |
| Arithmetical Shift | >> and <<[C] operator |
| Conditional Shift | sftc() |
| Bit Manipulation Operations | |
| Register Bit test, Reset, Set, and Complement | bit() / cbit() |
| Bit Field Comparison | & operator |

TABLE 123-continued

| | |
|---|---|
| Memory Bit test, Reset, Set, and Complement | bit() / cbit() |
| Status Bit Reset, Set | bit() |
| Bit Field Extract and Bit Field Expand | field__extract() / field__expand() |
| Control Operations | |
| Goto on Address Register not Zero | if() goto |
| Unconditional Goto | goto |
| Conditional Goto | if() goto |
| Compare and Goto | if() goto |
| Unconditional Call | call() |
| Conditional Call | if() call() |
| Software Interrupt | intr() |
| Unconditional Return | return |
| Conditional Return | if() return |
| Return form Interrupt | return__int |
| Repeat Single | repeat() |
| Block Repeat | blockrepeat{} / localrepeat{} |
| Conditional Repeat Single | while() repeat |
| Switch | switch() |
| Software Interrupt | trap() |
| Conditional Execution | if() execute() |
| Logical Operations | |
| Bitwise Complement | ~ operator |
| Bitwise AND | & operator |
| Bitwise OR | \| operator |
| Bitwise XOR | ˆ operator |
| Bit Field Counting | count() |
| Rotate Left / Right | \\ and // operator |
| Logical Shift | >>> / <<< operator |
| Move Operations | |
| Memory Delay | delay() |
| Address, Data and Accumulator Register Load | = operator |
| Specific CPU Register Load | = operator |
| Specific CPU Register Store | = operator |
| Move to Memory / Memory Initialization | = operator |
| Pop Top of Stack | pop() |
| Push Onto Stack | push() |
| Address, Data and Accumulator Register Store | = operator |
| Register Content Swap | swap() |
| Specific CPU Register Move | = operator |
| Address, Data and Accumulator Register Move | = operator |
| Miscellaneous Operations | |
| Co-Processor Hardware Invocation | copr() |
| Idle Until Interrupt | idle |
| Linear / Circular Addressing | circular() / linear() |
| Memory Map Register Access | mmap() |
| No Operation | nop |
| Peripheral Port Register Access | readport() / writeport() |
| Reset | reset |
| Data Stack Pointer Modify | + operator |
| Modify Address Register | mar() |

TABLE 123-continued

The Example page on the next page illustrates how the following sheets of Instruction Description are to be interpreted.

Instruction operator symbol(s) : Instructions designation name

+ operator : Addition instruction

```
------------------------------------------------------------------ -----------------------------------------

no:  Syntax:                                          ||: sz: cl: pp:
---  ---------
 1:  dst = dst + src                                   y   2   1   x
 2:  dst = dst + k4                                    y   2   1   x
 3:  dst = src + K16
 4:  dst = src + Smem
 5:  . . .
 6:  . . .
 7:  . . .
 8:  . . .
 9:  . . .
10:  . . .
11:  . . .
```

Instruction number : Instruction Syntax

Limiting execution pipeline phase :
D : Decode
AD : Address
R : Read
X : Execute Execution in cycles:
For conditional instruction x/y field means :
x cycle, if the condition is true.
y cycle, if the condition is false.

```
Operands:
------------
ACx, ACy        : Accumulator AC[0 . . 3].
DRx             : Data register DR[0 . . 3].
src, dst        : Accumulator AC[0 . . 3].
                  or address register AR[0 . . 7]
                  or data register DR[0 . . 3].
Smem            : Word memory access (16-bit data access).
. . .
. . .
```

Operands used in the instructions.

Instruction Size in bytes

Instruction contains a parallel enable bit? y(es) or n(no)

```
Status bit :
-------------
Affected by : SXMD, M40, SATD, SATA, LEAD
Affects     : C, ACxOV, ACyOV
```

List of status bits affecting the instruction execution. List of status bits affected by the instruction. By default a status bit does not affect or is not affected by the instruction.

Description :
---------------
These instructions perform an addition :

1 - in the D-unit ALU, if the destination operand is an accumulat or register :
- Input operands are sign extended to 40 bit according to SX MD.
If the optional 'uns' keyword applies to the input o perand, it is zero extended to 40 bit.
Note that if an address or data register is source operand of the instruction, the 16 lsb of the address or data register are sign extended a ccording to SXMD.

- Instructions 05, 06, 07, 08, 09, 10, 13 and 15 have an op erand requiring to be shifted by an immediate value or by the content of data register DRx.
- This shift operation is identical to the arithmetical s hift instructions.
- Therefore, an overflow detection, report and saturation is done after the shifting operation.
- However, the D-unit shifter is only used for instructio ns having a shift range operand other than the immediate 16 bit left shift : i. e. instructions 05, 06, 08, 09 and 13.

TABLE 123-continued

- The addition operation is performed on 40 bits in the D-u nit ALU.

- . . .

- . . .

> Description of the operattion flow triggered at execution of the instruc tion. The description depends on the listed status bits. This description supposes LEAD status bit set to 0.

2 - in the A-unit ALU, if the destination operand is an address or data register :

- if an accumulator is source operand of the instruction, t he 16 lsb of the register are used to perform the operation.

- The operation is performed on 16 bits in the A-unit ALU.

- . . .

> Impact of LEAD status bit on the operation flow triggered at execution o f the instruction. Compatibility versus C54x devices requires setting LEAD status bit to 1 and configure other registers to predefined values (example : M40 should be set by th e user to 0).

3 - . . .

Compatibility with C54x devices (LEAD = 1) :
-----------------------------------------------------------
When these instructions are executed with M40 set to 0, compatib ility is ensured.

Note that when LEAD is 1, Instructions 05, 06, 07, 08, 09, 10, 13 , 15 do not have any overflow detection, report and saturation after the shifting oper ation.

Arithmetical Operations

Absolute Value || operator

| no: Syntax: | \|\|: | sz: | cl: | pp: |
|---|---|---|---|---|
| 1: dst = \|src\| | y | 2 | 1 | X |

Operands:

src, dst : Accumulator AC[0..3]
or address register AR[0..7]
or data register DR[0..3].

Status bit :

Affected by : SXMD, M40, SATD, SATA, LEAD
Affects : Carry, dstOV

Description :

This instruction computes the absolute value of a register :
1 - In the D-unit ALU, if the destination operand is an accumulator register :
- If an address or data register is source operand of the instruction, the 16 lsb of the address or data register are sign extended to 40 bit according to SXMD.
- The operation is performed on 40 bits in the D-unit ALU. The operation flow is described in pseudo C language.

If M40 is 0,
- The sign of source register src is extracted at bit position 31. According to this sign bit, the source register is either negated (as per subtract instruction no 02), or moved to the destination accumulator (as per move instruction no 01) : overflow detection, report and saturation are perfomed as defined for these instructions.
- The Carry status bit is updated as follows : If the result of the operation stored in the destination register dst(31–0) is zero, the carry bit is set.

```
step1:  if( src(31) == 1)
step2:      dst(39–0) = −src(39–0)
        else
step3:      dst(39–0) = src(39–0)
step4:  if( dst(31–0) == 0)
step5:      Carry = 1
        else
step6:      Carry = 0
```

If M40 is 1,
- The sign of source register src is extracted at bit position 39. According to this sign bit, the source register is either negated (as per subtract instruction no 02), or moved to the destination accumulator (as per move instruction no 01) : overflow detection, report and saturation are perfomed as defined for these instructions.
- The Carry status bit is updated as follows : If the result of the operation TABLE 123-continued stored
in the destination register dst(39–0) is zero, the carry bit is set.

```
step1:  if( src(39) == 1)
step2:      dst(39–0) = −src(39–0)
        else
step3:      dst(39–0) = src(39–0)
step4:  if( dst(39–0) == 0)
step5:      Carry = 1
        else
step6:      Carry = 0
```

2 - In the A-unit ALU, if the destination operand is an address or data register :
- If an accumulator is source operand of the instruction, the 16 lsb of the accumulator is used to perform the operation.
- The operation is performed on 16 bits in the A-unit ALU. The operation flow is described in pseudo C language.
  The sign of source register src is extracted at bit position 15. According to this sign bit, the source register is either negated (as per subtract instruction no 02), or moved to the destination register (as per move instruction no 01) : overflow detection and saturation are perfomed as defined for these instructions.

```
step1:  if( src(15) == 1)
step2:      dst = −src
        else
step3:      dst = src
```

Compatibility with C54x devices (LEAD = 1) :

When LEAD status bit is set to 1,
- This instruction is executed as if M40 status bit was locally set to 1.
- However, to ensure compatibility versus overflow detection and saturation of destination accumulator, this instruction must be executed with M40 set to 0.

Memory Comparison == operator

| no: Syntax: | ‖: | sz: | cl: | pp: |
|---|---|---|---|---|
| 1: TC1 = (Smem == K16) | n | 4 | 1 | X |
| 2: TC2 = (Smem == K16) | n | 4 | 1 | X |

Operands:

Smem : Word single data memory access (16-bit data access).
Kx : Signed constant coded on x bits.

Status bit :

Affects : TCx

Description :

These instructions perform comparisons in the A-unit ALU.
The data memory operand is compared to the immediate constant. If they are equal, the selected TCx status bit is set to 1. Otherwise, it is set to 0.

Register Comparison ==, <, >=, != operators

| no: Syntax: | ‖: | sz: | cl: | pp: |
|---|---|---|---|---|
| 1: TCx = uns(src RELOP dst) {==,<,>=,!=} | y | 3 | 1 | X |
| 2: TCx = TCy & uns(src RELOP dst) {==,<,>=,!=} | y | 3 | 1 | X |
| 3: TCx = !TCy & uns(src RELOP dst) {==,<,>=,!=} | y | 3 | 1 | X |
| 4: TCx = TCy \| uns(src RELOP dst) {==,<,>=,!=} | y | 3 | 1 | X |
| 5: TCx = !TCy \| uns(src RELOP dst) {==,<,>=,!=} | y | 3 | 1 | X |

Operands:

src, dst : Accumulator AC[0..3]
or address register AR[0..7]
or data register DR[0..3].
TCx, TCy : Test control flag 1 or 2

Status bit :

Affected by : M40, LEAD, TCy
Affects : TCx

Description :

These instructions perform comparisons in the D-unit ALU or in the A-unit ALU.
2 accumulator, address and data register contents can be compared. If the comparison is true, the selected TCx status bit is set to 1. Otherwise, it is set to 0.
The comparison depends on the optional 'uns' keywords and on M40 status bit for accumulator comparisons. As the below table shows it, the 'uns' keyword specifies an unsigned comparison ; the M40 status bit defines the comparison bit width for accumulator comparisons.

TABLE 123-continued

With instruction 01, the result of the comparison is stored in the selected TCx status bit.
With instructions 02, 03, 04 and 05, the result of the comparison is ANDed (or ORed) with the selected TCy status bit (or its complement). TCx is updated with this logical combination.

'uns' impact on instruction functionality

| uns | src | dst | comparison type |
|---|---|---|---|
| 0 | DAx | DAy | 16 bit signed comparison in A-unit ALU |
| 0 | DAx | ACy | 16 bit signed comparison in A-unit ALU |
| 0 | ACx | DAy | 16 bit signed comparison in A-unit ALU |
| 0 | ACx | ACy | if M40 is 0, 32 bit signed comparison in D-unit ALU<br>if M40 is 1, 40 bit signed comparison in D-unit ALU |
| 1 | DAx | DAy | 16 bit unsigned comparison in A-unit ALU |
| 1 | DAx | ACy | 16 bit unsigned comparison in A-unit ALU |
| 1 | ACx | DAy | 16 bit unsigned comparison in A-unit ALU |
| 1 | ACx | ACy | if M40 is 0, 32 bit unsigned comparison in D-unit ALU<br>if M40 is 1, 40 bit unsigned comparison in D-unit ALU |

Note that when an accumulator ACx is compared with an address or data register DAx, the 16 lowest bits of the ACx are compared with the DAx register in the A-unit ALU.

Compatibility with C54x devices (LEAD = 1) :

Contrary to the corresponding LEAD instruction, the LEAD3 register comparison instruction is performed in execute phase of the pipeline.
When LEAD status bit is 1, the conditions testing accumulators content are all performed as if M40 was set to 1.

Maximum, Minimum max() / min()

| no: Syntax: | \|\|: | sz: | cl: | pp: |
|---|---|---|---|---|
| 1: dst = max(src,dst) | y | 2 | 1 | X |
| 2: dst = min(src,dst) | y | 2 | 1 | X |

Operands:

src, dst : Accumulator AC[0..3]
or address register AR[0..7]
or data register DR[0..3].

Status bit :

Affected by : SXMD, M40, LEAD
Affects : C

Description :

These instructions perform extremum selection (instruction 01 performs a maximum search ; instruction 02 performs a minimum search). The operations are performed :

1 - In the D-unit ALU, if the destination operand is an accumulator register :
- If an address or data register is source operand of the instruction, the 16 lsb of the address or data register are sign extended to 40 bit according to SXMD.
- The operation is performed on 40 bits in the D-unit ALU. the operation flow is described in pseudo C language.
  If M40 is 0,
  source register src(31–0) content is compared to destination register dst(31–0) content. The extremum value is stored in the destination register. If the extremum value is strictly the source register, the carry bit is set to 0. Otherwise it is set to 1.

```
        /* with 'op' being '>' when maximum is searched with instruction 01 */
        /* and 'op' being '<' when mininum is searched with instruction 02 */
step1:  if( src(31–0) op dst(31–0))
step2:      { Carry = 0 ; dst(39–0) = src(39–0) }
        else
step3:      Carry = 1
```

If M40 is 1,
  source register src(39–0) content is compared to destination register dst(39–0) content. The extremum value is stored in the destination register. If the extremum value is strictly the source register, the carry bit is set to 0. Otherwise it is set to 1.

```
        /* with 'op' being '>' when maximum is searched with instruction 01 */
        /* and 'op' being '<' when mininum is searched with instruction 02 */
step1:  if( src(39–0) op dst(39–0))
step2:      { Carry = 0 ; dst(39–0) = src(39–0) }
        else
step3:      Carry = 1
```

- There is no overflow detection, overflow report and no saturation performed for these instructions.

TABLE 123-continued

2 - In the A-unit ALU, if the destination operand is an address or data register :

- If an accumulator is source operand of the instruction, the 16 lsb of the accumulator is used to perform the operation.
- The operation is performed on 16 bits in the A-unit ALU. the operation flow is described in pseudo C language.
  The source register src(15–0) content is compared to destination register dst(15–0) content. The extremum value is stored in the destination register.

```
        /* with 'op' being '>' when maximum is searched with instruction 01 */
        /* and 'op' being '<' when mininum is searched with instruction 02 */
step1:  if( src(15–0) op dst(15–0))
step2:      dst = src
```

- There is no overflow detection and no saturation performed for these instructions.

Compatibility with C54x devices (LEAD = 1) :

When LEAD status bit is set to 1,

- These instructions are executed as if M40 status bit was locally set to 1.

Compare and Select Extremum max_diff() / min_diff()

| no: | Syntax: | \|\|: | sz: | cl: | pp: |
|---|---|---|---|---|---|
| 1: | max_diff(ACx,ACy,ACz,ACw) | y | 3 | 1 | X |
| 2: | max_diff_dbl(ACx,ACy,ACz,ACw,TRNx) | y | 3 | 1 | X |
| 3: | min_diff(ACx,ACy,ACz,ACw) | y | 3 | 1 | X |
| 4: | min_diff_dbl(ACx,ACy,ACz,ACw,TRNx) | y | 3 | 1 | X |

Operands:

ACx, ACy, ACz, ACw: Accumulator AC[0..3].

Status bit :

Affected by : M40, SATD, LEAD
Affects : Carry, ACwOV

Description :

Instruction 02 and 04 perform an extremum selection in the D-unit ALU.
Instruction 02 performs a maximum search. Instruction 04 performs a mininum search.

- ACx and ACy are the two source accumulators.
- The difference between the source accumulators is stored in accumulator ACw. The subtraction computation is identical to subtract instruction no 01 (including, borrow report in Carry status bit, overflow detection, overflow report and saturation).
- The extremum between the source accumulators is stored in accumulator ACz. The extremum computation is similar to max() / min() instruction. However, the carry status bit is not updated by the extremum search but by the subtract instruction described above.
- According to the extremum found, a decision bit is shifted in the selected TRNx register from the msb's to the lsb's. If the extremum value is strictly ACx register, the decision bit is 0. Otherwise it is 1.
- If M40 is 0, the pseudo C code of the operation flow is :

```
        /* with 'op' being '>' when maximum is searched with instruction 02 */
        /* and 'op' being '<' when mininum is searched with instruction 04 */
step1:  TRNx = TRNx >> #1
step2:  ACw(39–0) = ACy(39–0) – ACx(39–0)
step3:  if( ACx(31–0) op ACy(31–0))
step4:      { bit(TRNx, 15) = #0 ; ACz(39–0) = ACx(39–0) }
        else
step5:      { bit(TRNx, 15) = #1 ; ACz(39–0) = ACy(39–0) }
```

- If M40 is 1, the pseudo C code of the operation flow is :

```
        /* with 'op' being '>' when maximum is searched with instruction 02 */
        /* and 'op' being '<' when mininum is searched with instruction 04 */
step1:  TRNx = TRNx >> #1
step2:  ACw(39–0) = ACy(39–0) – ACx(39–0)
step3:  if( ACx(39–0) op ACy(39–0))
step4:      { bit(TRNx, 15) = #0 ; ACz(39–0) = ACx(39–0) }
        else
step5:      { bit(TRNx, 15) = #1 ; ACz(39–0) = ACy(39–0) }
```

Instruction 01 and 03 perform a dual extremum selection in the D-unit ALU.
Instruction 01 performs a dual maximum search. Instruction 03 performs a dual minimum search.

- These two operations are executed in the 40-bit D-unit ALU which is configured locally in dual 16-bit mode. The 16 lowest bits of both the ALU and the accumulators are separated from their higher 24 bits : the 8 guard bits are attached to the high bits.
- For each data-path (high and low):
  - ACx and ACy are the source accumulators.
  - The differences are stored in accumulator ACw.
    The subtraction computation is equivalent to dual 16-bit arithmetic operation instruction (including, borrow report in Carry status bit, dual overflow detections, overflow report and saturations).

TABLE 123-continued

- The extremum is stored in accumulator ACz.
  The extremum is searched considering the selected bit width of the accumulators :
  - for the lower 16-bit data path, the sign bit is extracted at bit position 15,
  - for the higher 24-bit data-path, the sign bit is extracted at bit position 31.
- According to the extremum found, a decision bit is shifted in TRNx register from the msb's to the lsb's :
  - TRN0 tracks the decision for the high part data-path,
  - TRN1 tracks the decision for the low part data-path.
  If the extremum value is strictly ACx register high or low part, the decision bit is 0. Otherwise it is 1.
- The pseudo C code of the operation flow is :

```
        /* with 'op' being '>' when maximum is searched with instruction 01 */
        /* and 'op' being '<' when mininum is searched with instruction 03 */
step0:  TRN0 = TRN0 >> #1
step1:  TRN1 = TRN1 >> #1
step2:  ACw(39–16) = ACy(39–16) – ACx(39–16)
step3:  ACw(15–0) = ACy(15–0) – ACx(15–0)
step4:  if( ACx(31–16) op ACy(31–16))
step5:       { bit(TRN0, 15) = #0 ; ACz(39–16) = ACx(39–16) }
        else
step6:       { bit(TRN0, 15) = #1 ; ACz(39–16) = ACy(39–16) }
step7:  if( ACx(15–0) op ACy(15–0))
step8:       { bit(TRN1, 15) = #0 ; ACz(15–0) = ACx(15–0) }
        else
step9:       { bit(TRN1, 15) = #1 ; ACz(15–0) = ACy(15–0) }
```

Compatibility with C54x devices (LEAD = 1) :

When LEAD status bit is set to 1,
- Instructions 02 and 04 are executed as if M40 status bit was locally set to 1. However, to ensure compatibility versus overflow detection and saturation of destination accumulator, this instruction must be executed with M40 set to 0.
- Instruction 01 and 03 are executed as if SATD status bit was locally set to 0. And overflow is only detected and reported for the computation performed in the higher 24-bit data-path (overflow is detected at bit position 31).

Round and Saturate rnd() / saturate()

| no: | Syntax: | ‖: | sz: | cl: | pp: |
|---|---|---|---|---|---|
| 1: | ACy = saturate(rnd(ACx)) | y | 2 | 1 | X |
| 2: | ACy = rnd(ACx) | y | 2 | 1 | X |

Operands:

ACx, ACy : Accumulator AC[0..3].

Status bit :

Affected by : RDM, SATD, M40, LEAD
Affects : ACyOV

Description :

These instructions are performed in the D-unit ALU :
Instruction 02 performs a rounding if the optional 'rnd' keyword is applied to the instruction :
1 - The rounding operation depends on RDM status bit value :
  - When RDM is 0, the biased rounding to the infinite is performed. 2^15 is added to the 40-bit source accumulator.
  - When RDM is 1, the unbiased rounding to the nearest is performed. According to the value of the 17 lsb of the 40-bit source accumulator, 2^15 is added as following pseudo C code describes it :

```
step1:  if( 2^15 < bit(15–0) < 2^16)
step2:       add 2^15 to the 40-bit source accumulator.
step3:  else if( bit(15–0) == 2^15)
step4:            if( bit(16) == 1)
step5:                 add 2^15 to the 40-bit source accumulator.
```

2 - Addition overflow detection depends on M40 status bit :
  - When M40 is 0, overflow is detected at bit position 31,
  - When M40 is 1, overflow is detected at bit position 39.
3 - No Addition carry report is stored in Carry status bit.
4 - If an overflow is detected, the destination accumulator overflow status bit is set.
5 - If SATD is 1, when an overflow is detected, the destination register is saturated.
  - When M40 is 0, saturation values are 00.7FFF.FFFFh or FF.8000.0000h
  - When M40 is 1, saturation values are 7F.FFFF.FFFFh or 80.0000.0000h
6 - If a rounding has been applied to the instruction, the 16 lowest bit of the destination accumulator are cleared.

Instruction 01 performs a saturation of the source accumulator to the 32 bit width frame.
A rounding is performed if the optional 'rnd' keyword is applied to the instruction :
1 - The rounding operation depends on RDM status bit value as it is described in step 1 of instruction 02.
2 - An overflow is detected at bit position 31.

TABLE 123-continued

3 - No Addition carry report is stored in Carry status bit.
4 - If an overflow is detected, the destination accumulator overflow status bit is set.
5 - When an overflow is detected, the destination register is saturated. Saturation values are 00.7FFF.FFFFh or FF.8000.0000h
6 - If a rounding has been applied to the instruction, the 16 lowest bit of the destination accumulator are cleared.

Compatibility with C54x devices (LEAD = 1) :

When these instructions are executed with M40 set to 0, compatibility is ensured.
When LEAD status bit is set to 1,
- The rounding is performed without clearing accumulator ACx lsb.

| Conditional Subtract | subc() |
|---|---|

| no: Syntax: | \|\|: | sz: | cl: | pp: |
|---|---|---|---|---|
| 1: subc(Smem,ACx,ACy) | n | 3 | 1 | X |

Operands:

| | | |
|---|---|---|
| ACx, ACy | : | Accumulator AC[0..3]. |
| Smem | : | Word single data memory access (16-bit data access). |

Status bit :

| | | |
|---|---|---|
| Affected by | : | SXMD |
| Affects | : | Carry, ACyOV |

Description :

This instruction performs a conditional subtraction in the D-unit ALU. The D-unit shifter is not used to perform the memory operand shift. The operation flow is described in pseudo C language.

step 1 : The 16-bit data memory operand Smem is sign extended to 40 bit according to SXMD, 15-bit shifted to the msb's and subtracted from the content of the source accumulator. This subtraction is identical to other subtraction instruction (including borrow generation, overflow detection and overflow report) : however,
- Overflow and carry bit are always detected at bit position 31,
- And even if an overflow is detected and reported in ACyOV accumulator overflow bit, no saturation is performed on the result of the operation.

step 2 : If the result of the subtraction is greater than zero (bit 39 equals 0), it is shifted to the msb's and added to 1. The result is then stored in the destination accumulator.

step 3 : Otherwise, the source accumulator is shifted by 1 bit to the msb's and stored in the destination accumulator.

```
step 1:  if ((ACx - (Smem << #15)) >= 0)
step 2:      ACy = (ACx - (Smem << #15)) << #1 + 1;
         else
step 3:      ACy = ACx << #1;
```

This instruction is used to make a 16 step 16-bit by 16-bit division. The divisor and the dividend are both assumed to be positive in this instruction. The SXMD bit affects this operation :
- If SXMD is 1, the divisor must have a 0 value in the most significant bit.
- If SXMD is 0, any 16-bit divisor value produces the expected result.

The dividend, which is in the source accumulator ACx must be positive (bit 31 must be set to 0) during the computation.

| Addition | + operator |
|---|---|

| no: Syntax: | \|\|: | sz: | cl: | pp: |
|---|---|---|---|---|
| 1: dst = dst + src | y | 2 | 1 | X |
| 2: dst = dst + k4 | y | 2 | 1 | X |
| 3: dst = src + K16 | n | 4 | 1 | X |
| 4: dst = src + Smem | n | 3 | 1 | X |
| 5: ACy = ACy + (ACx << DRx) | y | 2 | 1 | X |
| 6: ACy = ACy + (ACx << SHIFTW) | y | 3 | 1 | X |
| 7: ACy = ACx + (K16 << #16) | n | 4 | 1 | X |
| 8: ACy = ACx + (K16 << SHFT) | n | 4 | 1 | X |
| 9: ACy = ACx + (Smem << DRx) | n | 3 | 1 | X |
| 10: ACy = ACx + (Smem << #16) | n | 3 | 1 | X |
| 11: ACy = ACx + uns(Smem) + Carry | n | 3 | 1 | X |
| 12: ACy = ACx + uns(Smem) | n | 3 | 1 | X |
| 13: ACy = ACx + (uns(Smem) << SHIFTW) | n | 4 | 1 | X |
| 14: ACy = ACx + dbl(Lmem) | n | 3 | 1 | X |
| 15: ACx = (Xmem << #16) + (Ymem << #16) | n | 3 | 1 | X |
| 16: Smem = Smem + K16 | n | 4 | 2 | X |

Operands:

| | | |
|---|---|---|
| ACx, ACy | : | Accumulator AC[0..3]. |
| DRx | : | Data register DR[0..3]. |

TABLE 123-continued

| | | |
|---|---|---|
| src, dst | : | Accumulator AC[0..3]<br>or address register AR[0..7]<br>or data register DR[0..3]. |
| Smem | : | Word single data memory access (16-bit data access). |
| Lmem | : | Long word single data memory access (32-bit data access). |
| Xmem, Ymem | : | Indirect dual data memory access (two data accesses). |
| kx | : | Unsigned constant coded on x bits. |
| Kx | : | Signed constant coded on x bits. |
| SHFT | : | [0..15] immediate shift value. |
| SHIFTW | : | [−32..+31] immediate shift value. |

Status bit :

| | | |
|---|---|---|
| Affected by | : | SXMD, M40, SATD, SATA, LEAD, Carry |
| Affects | : | Carry, ACxOV, ACyOV, dstOV |

Description :

These instructions perform an addition :

1 - In the D-unit ALU, if the destination operand is an accumulator register :
- Input operands are sign extended to 40 bit according to SXMD.
  If the optional 'uns' keyword applies to the input operand, it is zero extended to 40 bit.
  Note that if an address or data register is source operand of the instruction, the 16 lsb of the address or data register are sign extended according to SXMD.
- Instructions 05, 06, 07, 08, 09, 10, 13 and 15 have an operand requiring to be shifted by an immediate value or by the content of data register DRx.
  - This shift operation is identical to the arithmetical shift instructions.
  - Therefore, an overflow detection, report and saturation is done after the shifting operation.
  - However, the D-unit shifter is only used for instructions having a shift quantity operand other than the immediate 16 bit shift to the msb's : i.e. instructions 05, 06, 08, 09 and 13.
- The addition operation is performed on 40 bits in the D-unit ALU.
- Addition overflow detection depends on M40 status bit :
  - When M40 is 0, overflow is detected at bit position 31,
  - When M40 is 1, overflow is detected at bit position 39.
- Addition carry report in Carry status bit depends on M40 status bit :
  - When M40 is 0, the carry is extracted at bit position 31,
  - When M40 is 1, the carry is extracted at bit position 39.
- If an overflow resulting from the shift or the addition is detected, the destination accumulator overflow status bit is set.
- If SATD is 1, when an overflow is detected, the destination register is saturated.
  - When M40 is 0, saturation values are 00.7FFF.FFFFh or FF.8000.0000h
  - When M40 is 1, saturation values are 7F.FFFF.FFFFh or 80.0000.0000h
- Note : For instruction 10, if the result of the addition generates a carry, the Carry status bit is set, otherwise it is not affected.

2 - In the A-unit ALU, if the destination operand is an address or data register :
- If an accumulator is source operand of the instruction, the 16 lsb of the register are used to perform the operation.
- The operation is performed on 16 bits in the A-unit ALU.
- Addition overflow detection is done at bit position 15.
- If SATA is 1, when an overflow is detected, the destination register is saturated. Saturation values are 7FFFh or 8000h 3 - In the D-unit ALU, if the destination operand is the memory :
- Input operands are sign extended to 40 bit according to SXMD and shifted by 16 bit to the msb's before being added.
- Addition overflow is always detected at bit position 31,
- Addition carry report in Carry status bit is always extracted at bit position 31.
- If an overflow is detected, accumulator 0 overflow status bit is set (AC0OV).
- If SATD is 1, when an overflow is detected, the result is saturated before being stored in memory. Saturation values are 7FFFh or 8000h.

Compatibility with C54x devices (LEAD = 1) :

When these instructions are executed with M40 set to 0, compatibility is ensured.
Note that when LEAD is 1,
- Instructions 05, 06, 07, 08, 09, 10, 13, 15 perform the intermediary shift operation as if M40 status bit was locally set to 1 and no overflow is detected, reported and saturated after the shifting operation.
- Instructions 05 and 09 use only the 6 lsb's of DRx data register to determine the shift quantity of the intermediary shift operation. The 6 lsb's of DRx define a shift quantity within [−32,+31] interval ; when the value is in [−32,−17] interval, a modulo 16 operation transforms the shift quantity to fit within [−16,−1] interval.

| Conditional Addition / Subtraction | adsc() | | | | |
|---|---|---|---|---|---|
| **no: Syntax:** | | **‖:** | **sz:** | **cl:** | **pp:** |
| 1: ACy = adsc(Smem,ACx,TC1) | | n | 3 | 1 | X |
| 2: ACy = adsc(Smem,ACx,TC2) | | n | 3 | 1 | X |

TABLE 123-continued

| | | | | |
|---|---|---|---|---|
| 3: ACy = adsc(Smem,ACx,TC1,TC2) | n | 3 | 1 | X |
| 4: ACy = ads2c(Smem,ACx,DRx,TC1,TC2) | n | 3 | 1 | X |

Operands:

ACx, ACy : Accumulator AC[0..3].
DRx : Data register DR[0..3].
Smem : Word single data memory access (16-bit data access).

Status bit :

Affected by : SXMD, M40, SATD, TCx, LEAD
Affects : Carry, ACyOV

Description :

These instructions evaluate the selected TCx status bits and based on the result of the test, they perform a conditional operation in the D-unit ALU : either an addition, or a subtraction. Evaluation of the condition on TCx status bit is performed on the execute phase of the instruction.

The operation flow is identical to :
- The addition instructions 09 and 10 :
  note that Carry status bit update is always performed as addition instruction 09.
- The subtraction instructions 11 and 12 :
  note that Carry status bit update is always performed as subtract instruction 11.

Instructions 01 and 02 execute :

```
        if( TCx == 1)          ACy = ACx + (Smem << #16)
    else                ACy = ACx − (Smem << #16)
```

Instruction 03 executes :

```
        if( TC2 == 1)          ACy = ACx
    if (TC2 == 0)
            if( TC1 == 1)      ACy = ACx + (Smem << #16)
                               ACy = ACx − (Smem << #16)
```

Instruction 04 executes :

```
        if( TC2 == 1)
            if( TC1 == 1)      ACy = ACx + (Smem << #16)
            else               ACy = ACx − (Smem << #16)
        if( TC2 == 0)
            if( TC1 == 1)      ACy = ACx + (Smem << DRx)
            else               ACy = ACx − (Smem << DRx)
```

Instruction 4 uses the D-unit shifter to make an arithmetic shift of the memory operand. Depending on TC2 value, the memory operand is shifted to the msb's by 16-bit or by DRx content.

Compatibility with C54x devices (LEAD = 1) :

When this instruction is executed with M40 set to 0, compatibility is ensured.
Note that when LEAD is 1,
- The subtract and addition operations perform the intermediary shift operation as if M40 status bit was locally set to 1 and no overflow is detected, reported and saturated after the shifting operation.
- Instruction 04 uses only the 6 lsb's of DRx data register to determine the shift quantity of the intermediary shift operation. The 6 lsb's of DRx define a shift quantity within [−32,+31] interval ; when the value is in [−32,−17] interval, a modulo 16 operation transforms the shift quantity to fit within [−16,−1] interval.

Dual 16-bit Arithmetic , operator

| no: Syntax: | ‖: | sz: | cl: | pp: |
|---|---|---|---|---|
| 1: HI(ACx) = Smem + DRx , LO(ACx) = Smem − DRx | n | 3 | 1 | X |
| 2: HI(ACx) = Smem − DRx , LO(ACx) = Smem + DRx | n | 3 | 1 | X |
| 3: HI(ACy) = HI(Lmem) + HI(ACx) , LO(ACy) = LO(Lmem) + LO(ACx) | n | 3 | 1 | X |
| 4: HI(ACy) = HI(ACx) − HI(Lmem) , LO(ACy) = LO(ACx) − LO(Lmem) | n | 3 | 1 | X |
| 5: HI(ACy) = HI(Lmem) − HI(ACx) , LO(ACy) = LO(Lmem) − LO(ACx) | n | 3 | 1 | X |
| 6: HI(ACx) = DRx − HI(Lmem) , LO(ACx) = DRx − LO(Lmem) | n | 3 | 1 | X |
| 7: HI(ACx) = HI(Lmem) + DRx , LO(ACx) = LO(Lmem) + DRx | n | 3 | 1 | X |
| 8: HI(ACx) = HI(Lmem) − DRx , LO(ACx) = LO(Lmem) − DRx | n | 3 | 1 | X |
| 9: HI(ACx) = HI(Lmem) + DRx , LO(ACx) = LO(Lmem) − DRx | n | 3 | 1 | X |
| 10: HI(ACx) = HI(Lmem) − DRx , LO(ACx) = LO(Lmem) + DRx | n | 3 | 1 | X |
| 11: HI(Lmem) = HI(ACx) >> #1 , LO(Lmem) = LO(ACx) >> #1 | n | 3 | 1 | X |
| 12: Xmem = LO(ACx) , Ymem = HI(ACx) | n | 3 | 1 | X |
| 13: LO(ACx) = Xmem , HI(ACx) = Ymem | n | 3 | 1 | X |

Operands:

ACx, ACy : Accumulator AC[0..3].
DRx : Data register DR[0..3].
Smem : Word single data memory access (16-bit data access).
Lmem : Long word single data memory access (32-bit data access).
Xmem, Ymem : Indirect dual data memory access (two data accesses).

TABLE 123-continued

Status bit :

Affected by : SATD, SXMD, LEAD
Affects : ACxOV, ACyOV, C
Description :

Instructions 01, 02, 03, 04, 05, 06, 07, 08, 09 and 10 perform 2 paralleled operations in one cycle.
- The operations are executed in the 40-bit D-unit ALU which is configured locally in dual 16-bit mode. The 16 lowest bits of both the ALU and the accumulators are separated from their higher 24 bits : the 8 guard bits are attached to the higher 16 bit datapath.
- For instructions 01 and 02, the data memory operand Smem :
  - Is used as one of the 16-bit operand of the low part of the ALU.
  - Is duplicated and, according to SXMD, sign extended to 24-bit in order to be used in the higher part of the D-unit ALU.
- For instructions 01, 02, 06, 07, 08, 09 and 10 the data register DRx :
  - Is used as one of the 16-bit operand of the low part of the ALU.
  - Is duplicated and, according to SXMD, sign extended to 24-bit in order to be used in the higher part of the D-unit ALU.
- For instructions 03, 04, 05, 06, 07, 08, 09 and 10 the data memory operand dbl(Lmem) is split into two 16 bit entities :
  - The lower part is used as one of the 16-bit operand of the low part of the ALU.
  - The higher part is sign extended to 24-bit according to SXMD and used in the higher part of the D-unit ALU.
- For each of the 2 computations performed in the ALU, an overflow detection is made. If an overflow is detected on any of the data paths, the destination accumulator overflow status bit is set.
  - For the operations performed in the lower part of the ALU, overflow is detected at bit position 15.
  - For the operations performed in the higher part of the ALU, overflow is detected at bit position 31.
- For all instructions, the carry of the operation performed in the higher part of the ALU is reported in Carry status bit. The carry bit is always extracted at bit position 31,
- Independently, on each data path, if SATD is 1, when an overflow is detected on the data path, a saturation is performed :
  - For the operations performed in the lower part of the ALU, saturation values are 7FFFh and 8000h.
  - For the operations performed in the higher part of the ALU, saturation values are 00.7FFFh and FF.8000h.

Instruction 11 is executed in the D-unit shifter :
- The 16 high bits of source accumulator ACx are shifted by 1 bit to the lsb's (bit 31 is extended according to SXMD).
- The 16 low bits of source accumulator ACx are shifted by a 1-bit to the lsb's (bit 15 is extended according to SXMD).
- The shifted values are concatenated and stored at the memory location Lmem.

Instruction 13 performs a dual 16-bit load of accumulator high and low parts.
- The operation is executed in dual 16-bit mode, however it is independant of the 40-bit D-unit ALU : the 16 lowest bits of the accumulators are separated from their higher 24 bits : the 8 guard bits are attached to the higher 16 bit datapath.
- The data memory operand Xmem is loaded as a 16-bit operand to the destination accumulator low part. And, according to SXMD, the data memory operand Ymem is sign extended to 24-bit in order to be loaded in the higher part of the destination accumulator.
- For the load operations in higher accumulator bits, an overflow detection is performed at bit position 31. If an overflow is detected, the destination accumulator overflow status bit is set.
- If SATD is 1, when an overflow is detected on higher data path, a saturation is performed : saturation values are 00.7FFFh and FF.8000h.

Instruction 12 performs a dual 16-bit store of accumulator high and low parts.

Compatibility with C54x devices (LEAD = 1) :

When LEAD status bit is set to 1,
- This instruction is executed as if SATD status bit was locally set to 0.
- Overflow is only detected and reported for the computation performed in the higher 24-bit data-path (overflow is detected at bit position 31).

| Subtract | – operator | | | | |
|---|---|---|---|---|---|
| no: | Syntax: | \|\|: | sz: | cl: | pp: |
| 1: | dst = dst − src | y | 2 | 1 | X |
| 2: | dst = −src | y | 2 | 1 | X |
| 3: | dst = dst − k4 | y | 2 | 1 | X |
| 4: | dst = src − K16 | n | 4 | 1 | X |
| 5: | dst = src − Smem | n | 3 | 1 | X |
| 6: | dst = Smem − src | n | 3 | 1 | X |

TABLE 123-continued

| | | | | |
|---|---|---|---|---|
| 7: ACy = ACy − (ACx << DRx) | y | 2 | 1 | X |
| 8: ACy = ACy − (ACx << SHIFTW) | y | 3 | 1 | X |
| 9: ACy = ACx − (K16 << #16) | n | 4 | 1 | X |
| 10: ACy = ACx − (K16 << SHFT) | n | 4 | 1 | X |
| 11: ACy = ACx − (Smem << DRx) | n | 3 | 1 | X |
| 12: ACy = ACx − (Smem << #16) | n | 3 | 1 | X |
| 13: ACy = (Smem << #16) − ACx | n | 3 | 1 | X |
| 14: ACy = ACx − uns(Smem) − Borrow | n | 3 | 1 | X |
| 15: ACy = ACx − uns(Smem) | n | 3 | 1 | X |
| 16: ACy = ACx − (uns(Smem) << SHIFTW) | n | 4 | 1 | X |
| 17: ACy = ACx − dbl(Lmem) | n | 3 | 1 | X |
| 18: ACy = dbl(Lmem) − ACx | n | 3 | 1 | X |
| 19: ACx = (Xmem << #16) − (Ymem << #16) | n | 3 | 1 | X |

Operands:

| | | |
|---|---|---|
| ACx, ACy | : | Accumulator AC[0..3]. |
| DRx | : | Data register DR[0..3]. |
| src, dst | : | Accumulator AC[0..3]<br>or address register AR[0..7]<br>or data register DR[0..3]. |
| Smem | : | Word single data memory access (16-bit data access). |
| Lmem | : | Long word single data memory access (32-bit data access). |
| Xmem, Ymem | : | Indirect dual data memory access (two data accesses). |
| kx | : | Unsigned constant coded on x bits. |
| Kx | : | Signed constant coded on x bits. |
| SHFT | : | [0..15] immediate shift value. |
| SHIFTW | : | [−32..+31] immediate shift value. |
| Borrow | : | Logical complement of Carry status bit. |

Status bit :

| | | |
|---|---|---|
| Affected by | : | SXMD, M40, SATD, SATA, LEAD |
| Affects | : | Carry, ACxOV, ACyOV |

Description :

These instructions perform a subtraction :

1 - In the D-unit ALU, if the destination operand is an accumulator register :
- The operation flow is identical to the Addition instruction.
- Note 1 :
  The D-unit shifter is used for instructions having a shifting operand other than the immediate 16 bit shift to the msb's : i.e. instructions 07, 08, 10, 11, 16.
  This intermediary operation is detailed in arithmetical shift instruction section.
- Note 2:
  For instructions 07, 08, 09, 10, 11, 12, 13, 16 and 19, an intermediary overflow detection, overflow report and saturation is performed after the shift operation (see arithmetical shifting instructions).
- Note 3 :
  Subtraction borrow bit is reported in Carry status bit : it is the logical complement of the Carry status bit.
  For instruction 12, if the result of the subtraction generates a borrow, the Carry status bit is reset, otherwise it is not affected.

2 - In the A-unit ALU, if the destination operand is an address or data register :
The operation flow is identical to the Addition instruction.

Compatibility with C54x devices (LEAD = 1) :

When these instructions are executed with M40 set to 0, compatibility is ensured.
Note that when LEAD is 1,
  Instructions 07, 08, 09, 10, 11, 12, 13, 16 and 19 perform the intermediary shift operation as if M40 status bit was locally set to 1 and no overflow is detected, reported and saturated after the shifting operation.
- Instructions 07 and 11 use only the 6 lsb's of DRx data register to determine the shift quantity of the intermediary shift operation. The 6 lsb's of DRx define a shift quantity within [−32,+31] interval ; when the value is in [−32,−17] interval, a modulo 16 operation transforms the shift quantity to fit within [−16,−1].

Multiply and Accumulate (MAC) * and + operators

| no: Syntax: | ‖: | sz: | cl: | pp: |
|---|---|---|---|---|
| 1: ACy = rnd(ACy + (ACx * ACx)) | y | 2 | 1 | X |
| 2: ACy = rnd(ACy + \|ACx\|) | y | 2 | 1 | X |
| 3: ACy = rnd(ACy + (ACx * DRx)) | y | 2 | 1 | X |
| 4: ACy = rnd((ACy * DRx) + ACx) | y | 2 | 1 | X |
| 5: ACy = rnd(ACx + (DRx * K8)) | y | 3 | 1 | X |
| 6: ACy = rnd(ACx + (DRx * K16)) | n | 4 | 1 | X |
| 7: ACx = rnd(ACx + (Smem * coeff)) [,DR3 = Smem] | n | 3 | 1 | X |
| 8: ACx = rnd(ACx + (Smem * coeff)) [,DR3 = Smem] , delay(Smem) | n | 3 | 1 | X |
| 9: ACy = rnd(ACx + (Smem * Smem)) [,DR3 = Smem] | n | 3 | 1 | X |
| 10: ACy = rnd(ACy + (Smem * ACx)) [,DR3 = Smem] | n | 3 | 1 | X |
| 11: ACy = rnd(ACx + (DRx * Smem)) [,DR3 = Smem] | n | 3 | 1 | X |

TABLE 123-continued

| | | | | |
|---|---|---|---|---|
| 12: ACy = rnd(ACx + (Smem * K8)) [,DR3 = Smem ] | n | 4 | 1 | X |
| 13: ACy = M40(rnd(ACx + (uns(Xmem) * uns(Ymem)))) [,DR3 = Xmem] | n | 4 | 1 | X |
| 14: ACy = M40(rnd((ACx >> #16) + (uns(Xmem) * uns(Ymem)))) [,DR3 = Xmem] | n | 4 | 1 | X |

Operands:

| | | |
|---|---|---|
| ACx, ACy | : | Accumulator AC[0..3]. |
| DRx | : | Data register DR[0..3]. |
| Smem | : | Word single data memory access (16-bit data access). |
| Xmem, Ymem | : | Indirect dual data memory access (two data accesses). |
| coeff | : | Coefficient memory access (16-bit or 32-bit data access). |
| Kx | : | Signed constant coded on x bits. |

Status bit :

| | | |
|---|---|---|
| Affected by | : | M40, SATD, FRCT, RDM, GSM |
| Affects | : | ACxOV, ACyOV |

Description :

These instructions perform a multiplication and an accumulation in the D-unit MAC :

1 - The 17-bit input operands of the multiplier can be :
- Bit 32 to 16 of a source accumulator.
- A data register which content has been sign extended to 17-bits.
- A constant which has been sign extended to 17-bit.
- A memory operand which has been sign extended to 17-bit.

Note that for instructions 13 and 14, if the optional ‘uns’ keyword is applied to the operands of the multiplier, then these operands are zero extended to 17 bits.

2 - The multiplication is performed on 17 bits in the D-unit MAC. If FRCT is 1, the output of the multiplier is shifted to the msb’s by one bit position.

3 - Multiplication overflow detection depends on GSM, FRCT, SATD status bit : If those status bits are set to 1, the multiplication of 1.8000h by 1.8000h is saturated to 00.7FFF.FFFFh.

4 - The 35 bit result of the multiplication is sign extended to 40 bits and added to to the source accumulator.

5 - If the optional ‘rnd’ keyword is applied to the instruction, then a rounding is performed according to RDM status bit :
- When RDM is 0, the biased rounding to the infinite is performed. 2^15 is added to the 40-bit result of the accumulation.
- When RDM is 1, the unbiased rounding to the nearest is performed. According to the value of the 17 lsb of the 40-bit result of accumulation, 2^15 is added as following pseudo C code describes it :

```
step1:   if( 2^15 < bit(15–0) < 2^16)
step2:        add 2^15 to the 40-bit result of the accumulation.
step3:   else if( bit(15–0) == 2^15)
step4:             if( bit(16) == 1)
step5:                  add 2^15 to the 40-bit result of the accumulation.
```

6 - Addition overflow detection depends on M40 status bit :
- When M40 is 0, overflow is detected at bit position 31,
- When M40 is 1, overflow is detected at bit position 39.

7 - If an overflow is detected, the according destination accumulator overflow status bit is set.

8 - If SATD is 1, when an overflow is detected, the destination register is saturated.
- When M40 is 0, saturation values are 00.7FFF.FFFFh or FF.8000.0000h
- When M40 is 1, saturation values are 7F.FFFF.FFFFh or 80.0000.0000h 9 - If a rounding has been applied to the instruction, the 16 lowest bit of the destination accumulator are cleared.

Note that :

1 - All instructions using a memory operand provide the option to store the 16 bit data memory operand Smem or Xmem in DR3 data register.

2 - Instructions 13 and 14 provide the option to locally set M40 status bit to 1 for the execution of the instruction. This is done when the ‘M40’ keyword is applied to the instruction.

3 - Instruction 14 have a different 4th step : the result of the multiplication is sign extended to 40 bits and added to the 16 bit right shifted source accumulator. The shifting operation is done with a sign extension of source accumulator bit 39.

4 - For instruction 08, a multiply and accumulate operation is performed in parallel with the delay memory instruction.

Instruction 02 is also performed in the D-unit MAC :
- It accumulates in the destination accumulator the absolute value of accumulator ACx which is computed by multiplying ACx(32–16) to 0.0001h or 1.FFFFh according to bit 32 of the source accumulator ACx.
- If FRCT is set, then the absolute value is multiplied by 2.
- Rounding, addition overflow detection, ACyOV overflow report and saturation are performed as they are described in above step 5 to 9 of multiply and accumulate instructions.
- Warning : The result of the absolute value of the higher part of the source accumulator will be found in lower part of the destination accumulator.

TABLE 123-continued

Compatibility with C54x devices (LEAD = 1) :

When this instruction is executed with M40 set to 0, compatibility is ensured.

Multiply and Subtract (MAS) * and − operators

| no: Syntax: | ‖: | sz: | cl: | pp: |
|---|---|---|---|---|
| 1: ACy = rnd(ACy − (ACx * ACx)) | y | 2 | 1 | X |
| 2: ACy = rnd(ACy − (ACx * DRx)) | y | 2 | 1 | X |
| 3: ACx = rnd(ACx − (Smem * coeff)) [,DR3 = Smem] | n | 3 | 1 | X |
| 4: ACy = rnd(ACx − (Smem * Smem)) [,DR3 = Smem] | n | 3 | 1 | X |
| 5: ACy = rnd(ACy − (Smem * ACx)) [,DR3 = Smem] | n | 3 | 1 | X |
| 6: ACy = rnd(ACx − (DRx * Smem)) [,DR3 = Smem] | n | 3 | 1 | X |
| 7: ACy = M40(rnd(ACx − (uns(Xmem) * uns(Ymem)))) [,DR3 = Xmem] | n | 4 | 1 | X |

Operands:

ACx, ACy : Accumulator AC[0..3].
DRx : Data register DR[0..3].
Smem : Word single data memory access (16-bit data access).
Xmem, Ymem : Indirect dual data memory access (two data accesses).
coeff : Coefficient memory access (16-bit or 32-bit data access).

Status bit :

Affected by : M40, SATD, FRCT, RDM, GSM
Affects : ACxOV, ACyOV

Description :

These instructions perform a multiplication and a subtraction in the D-unit MAC :
- The operation flow is identical to the Multiplication and Accumulation instruction : except for step 4, where the result of the multiplication is sign extended to 40 bits and subtracted to the source accumulator.

Note that :
1 - All instructions using a memory operand provide the option to store the 16 bit data memory operand Smem or Xmem in DR3 data register.
2 - Instruction 07 provides the option to locally set M40 status bit to 1 for the execution of the instruction. This is done when the ‘M40’ keyword is applied to the instruction.

Compatibility with C54x devices (LEAD = 1) :

When this instruction is executed with M40 set to 0, compatibility is ensured.

Multiply * operator

| no: Syntax: | ‖: | sz: | cl: | pp: |
|---|---|---|---|---|
| 1: ACy = rnd(ACx * ACx) | y | 2 | 1 | X |
| 2: ACy = rnd(ACy * ACx) | y | 2 | 1 | X |
| 3: ACy = rnd(ACx * DRx) | y | 2 | 1 | X |
| 4: ACy = rnd(ACx * K8) | y | 3 | 1 | X |
| 5: ACy = rnd(ACx * K16) | n | 4 | 1 | X |
| 6: ACx = rnd(Smem * coeff) [,DR3 = Smem] | n | 3 | 1 | X |
| 7: ACx = rnd(Smem * Smem) [,DR3 = Smem] | n | 3 | 1 | X |
| 8: ACy = rnd(Smem * ACx) [,DR3 = Smem] | n | 3 | 1 | X |
| 9: ACx = rnd(Smem * K8) [,DR3 = Smem] | n | 4 | 1 | X |
| 10: ACx = M40(rnd(uns(Xmem) * uns(Ymem))) [,DR3 = Xmem] | n | 4 | 1 | X |
| 11: ACy = rnd(uns(DRx * Smem)) [,DR3 = Smem] | n | 3 | 1 | X |

Operands:

ACx, ACy : Accumulator AC[0..3].
DRx : Data register DR[0..3].
Smem : Word single data memory access (16-bit data access).
Xmem, Ymem : Indirect dual data memory access (two data accesses).
coeff : Coefficient memory access (16-bit or 32-bit data access).
Kx : Signed constant coded on x bits.

Status bit :

Affected by : M40, SATD, FRCT, RDM, GSM
Affects : ACxOV, ACyOV

Description :

These instructions perform a multiplication in the D-unit MAC :
- The operation flow is identical to the Multiplication and Accumulation instruction : except for step 4, where the result of the multiplication is only sign extended to 40 bits.

Note that :
1 - All instructions using a memory operand provide the option to store the 16 bit data memory operand Smem or Xmem in DR3 data register.

TABLE 123-continued

2 - Instruction 10 provides the option to locally set M40 status bit to 1 for the execution of the instruction. This is done when the 'M40' keyword is applied to the instruction.

Compatibility with C54x devices (LEAD = 1) :

When this instruction is executed with M40 set to 0, compatibility is ensured.

Absolute Distance abdst()

| no: Syntax: | ‖: | sz: | cl: | pp: |
|---|---|---|---|---|
| 1: abdst(Xmem,Ymem,ACx,ACy) | n | 4 | 1 | X |

Operands:

| | | |
|---|---|---|
| ACx, ACy | : | Accumulator AC[0..3]. |
| Xmem, Ymem | : | Indirect dual data memory access (two data accesses). |

Status bit :

| | | |
|---|---|---|
| Affected by | : | SXMD, M40, SATD, FRCT, LEAD |
| Affects | : | Carry, ACxOV, ACyOV |

Description :

This instruction executes 2 operations in parallel ; one in the D-unit MAC, one in the D-unit ALU :

ACy = ACy + | HI(ACx) | ,
ACx = (Xmem << #16) − (Ymem << #16)

The absolute value of accumulator ACx is computed and added to accumulator ACy through the D-unit MAC. The operation flow is identical to the MAC instruction 02 (including Addition overflow detection, ACyOV overflow report and saturation).
The subtraction is performed in the D-unit ALU and it is identical to the one performed by subtract instruction no 19 (including overflow detection, borrow generation, ACxOV overflow report and saturation).

Compatibility with C54x devices (LEAD = 1) :

When this instruction is executed with M40 set to 0, compatibility is ensured.
Note that when LEAD is 1, the subtract operation does not have any overflow detection, report and saturation after the shifting operation.

(Anti)Symmetrical Finite Impulse Response Filter firs() firsn()

| no: Syntax: | ‖: | sz: | cl: | pp: |
|---|---|---|---|---|
| 1: firs(Xmem,Ymem,coeff,ACx,ACy) | n | 4 | 1 | X |
| 2: firsn(Xmem,Ymem,coeff,ACx,ACy) | n | 4 | 1 | X |

Operands:

| | | |
|---|---|---|
| ACx, ACy | : | Accumulator AC[0..3]. |
| Xmem, Ymem | : | Indirect dual data memory access (two data accesses). |
| coeff | : | Coefficient memory access (16-bit or 32-bit data access). |

Status bit :

| | | |
|---|---|---|
| Affected by | : | SXMD, M40, SATD, FRCT, GSM, LEAD |
| Affects | : | Carry, ACxOV, ACyOV |

Description :

These instructions perform 2 operations in parallel. The operations are executed in the D-unit MAC and the D-unit ALU :

The firs() operation flow is described in pseudo C language.

The data memory operand addressed by the CDP register is multiplied to accumulator ACx(32–16) and added to accumulator ACy. Step 1 operation flow is identical to other multiply and accumulate instructions (including overflow detection, ACyOV overflow report and saturation).
The addition performed in the D-unit ALU (step 2) is identical to the one performed by addition instruction no 15 (including overflow detection, carry generation, ACxOV overflow report and saturation).
step 1: ACy = ACy + (ACx*coeff)
step 2: ACx = (Xmem << #16) + (Ymem << #16)

The firsn() operation flow is described in pseudo C language.

The data memory operand addressed by the CDP register is multiplied to accumulator ACx(32–16) and added to accumulator ACy. Step 1 operation flow is identical to other multiply and accumulate instructions (including overflow detection, ACyOV overflow report and saturation).
The subtraction performed in the D-unit ALU (step 2) is identical to the one performed by subtract instruction no 19 (including overflow detection, borrow generation, ACxOV overflow report and saturation).
step 1: ACy = ACy + (ACx*coeff)
step 2: ACx = (Xmem << #16) − (Ymem << #16)

TABLE 123-continued

Compatibility with C54x devices (LEAD = 1) :

When this instruction is executed with M40 set to 0, compatibility is ensured.
Note that when LEAD is 1, the subtract and addition operations do not have any overflow detection, report and saturation after the shifting operation.

| Least Mean Square | lms() | | | | |
|---|---|---|---|---|---|
| no: Syntax: | | ‖: | sz: | cl: | pp: |
| 1: lms(Xmem,Ymem,ACx,ACy) | | n | 4 | 1 | X |

Operands:

ACx, ACy : Accumulator AC[0..3].
Xmem, Ymem : Indirect dual data memory access (two data accesses).

Status bit :

Affected by : SXMD, M40, SATD, FRCT, RDM, GSM, LEAD
Affects : ACyOV, ACxOV, C

Description :

This instructions perform 2 paralleled operations in one cycle. The operations are executed in the D-unit MAC and the D-unit ALU :
The operation flow is described in pseudo C language.

step 1: ACy = ACy + (Xmem * Ymem) ,
step 2: ACx = rnd( ACx + (Xmem << #16))

The 2 data memory operands Xmem and Ymem are multiplied and the result is added to accumulator ACy. Step 1 operation flow is identical to other multiply and accumulate instructions (including overflow detection, ACyOV overflow report and saturation).
Step 2 operation flow is similar to other addition instructions. A rounding is performed after the addition :

- The data memory operand Xmem is sign extended to 40 bit according to SXMD and shifted to the msb's by 16-bit (the D-unit shifter is not used for the operation).
  - This shift operation is identical to the arithmetical shift instructions.
  - Therefore, an overflow detection, report and saturation is done after the shifting operation.
- The addition operation is performed on 40 bits in the D-unit ALU.
- A rounding is performed on the result of the addition. The rounding operation depends on RDM status bit value :
  - When RDM is 0, the biased rounding to the infinite is performed. 2^15 is added to the 40-bit result of the accumulation.
  - When RDM is 1, the unbiased rounding to the nearest is performed. According to the value of the 17 lsb of the 40-bit result of accumulation, 2^15 is added as following pseudo C code describes it :

```
step1:  if( 2^15 < bit(15-0) < 2^16)
step2:       add 2^15 to the 40-bit result of the accumulation.
step3:  else if( bit(15-0) == 2^15)
step4:            if( bit(16) == 1)
step5:                 add 2^15 to the 40-bit result of the accumulation.
```

- Addition and rounding overflow detection depends on M40 status bit :
  - When M40 is 0, overflow is detected at bit position 31,
  - When M40 is 1, overflow is detected at bit position 39.
- Addition carry report in Carry status bit depends on M40 status bit :
  - When M40 is 0, the carry is extracted at bit position 31,
  - When M40 is 1, the carry is extracted at bit position 39.
- If an overflow resulting from the shift, the addition or the rounding is detected, the destination accumulator overflow status bit is set.
- If SATD is 1, when an overflow is detected, the destination register is saturated.
  - When M40 is 0, saturation values are 00.7FFF.FFFFh or FF.8000.0000h
  - When M40 is 1, saturation values are 7F.FFFF.FFFFh or 80.0000.0000h
- If a rounding has been applied to the instruction, the 16 lowest bit of the destination accumulator are cleared.

Compatibility with C54x devices (LEAD = 1) :

When this instruction is executed with M40 set to 0, compatibility is ensured.
When LEAD status bit is set to 1,

- The rounding is performed without clearing accumulator ACx lsb.
- The addition operations do not have any overflow detection, report and saturation after the shifting operation.

| Square Distance | sqdst() | | | | |
|---|---|---|---|---|---|
| no: Syntax: | | ‖: | sz: | cl: | pp: |
| 1: sqdst(Xmem,Ymem,ACx,ACy) | | n | 4 | 1 | X |

Operands:

ACx, ACy : Accumulator AC[0..3].

TABLE 123-continued

| | | |
|---|---|---|
| dst | : | Accumulator AC[0..3]<br>or address register AR[0..7]<br>or data register DR[0..3]. |
| Xmem, Ymem | : | Indirect dual data memory access (two data accesses). |

Status bit :

| | | |
|---|---|---|
| Affected by | : | SXMD, M40, SATD, FRCT, GSM, LEAD |
| Affects | : | Carry, ACxOV, ACyOV |

Description :

This instruction executes 2 operations in parallel ; one in the D-unit MAC, one in the D-unit ALU :

ACy = ACy + (ACx * ACx) ,
ACx = (Xmem << #16) − (Ymem << #16)

The square value of accumulator ACx(32–16) is added to accumulator ACy through D-unit MAC. The operation flow is identical to the Multiplication and Accumulation instruction (including ACyOV overflow detection, overflow report and saturation).
The subtraction performed in the D-unit ALU is identical to the one performed by subtract instruction no 19 (including overflow detection, borrow generation, ACxOV overflow report and saturation).

Compatibility with C54x devices (LEAD = 1) :

When this instruction is executed with M40 set to 0, compatibility is ensured.
Note that when LEAD is 1, the subtract operation does not have any overflow detection, report and saturation after the shifting operation.

Implied Paralleled , operator

| no: | Syntax: | \|\|: | sz: | cl: | pp: |
|---|---|---|---|---|---|
| 1: | ACy = rnd(DRx * Xmem) , Ymem = HI(ACx << DR2) [,DR3 = Xmem] | n | 4 | 1 | X |
| 2: | ACy = rnd(ACy + (DRx * Xmem)) , Ymem = HI(ACx << DR2) [,DR3 = Xmem] | n | 4 | 1 | X |
| 3: | ACy = rnd(ACy − (DRx * Xmem)) , Ymem = HI(ACx << DR2) [,DR3 = Xmem] | n | 4 | 1 | X |
| 4: | ACy = ACx + (Xmem << #16) , Ymem = HI(ACy << DR2) | n | 4 | 1 | X |
| 5: | ACy = (Xmem << #16) − ACx , Ymem = HI(ACy << DR2) | n | 4 | 1 | X |
| 6: | ACy = Xmem << #16 , Ymem = HI(ACx << DR2) | n | 4 | 1 | X |
| 7: | ACx = rnd(ACx + (DRx * Xmem)) , ACy = Ymem << #16 [,DR3 = Xmem] | n | 4 | 1 | X |
| 8: | ACx = rnd(ACx − (DRx * Xmem)) , ACy = Ymem << #16 [,DR3 = Xmem] | n | 4 | 1 | X |

Operands:

| | | |
|---|---|---|
| ACx, ACy | : | Accumulator AC[0..3]. |
| DRx | : | Data register DR[0..3]. |
| Xmem, Ymem | : | Indirect dual data memory access (two data accesses). |

Status bit :

| | | |
|---|---|---|
| Affected by | : | SXMD, M40, SATD, FRCT, RDM, GSM, LEAD |
| Affects | : | Carry, ACxOV, ACyOV |

Description :

These instructions perform 2 operations in parallel. According to the instruction, the operations will be executed in :

- The D-unit MAC,
- The D-unit ALU,
- The D-unit Shifter,
- The dedicated D-unit register load path.

The execution flow of each operation is identical to one of the following instruction :

- The multiply instruction (for instruction 01),
- The multiply and accumulate instruction (for instructions 02, 07),
- The multiply and subtract instruction (for instructions 03, 08),
- The addition instruction (for instruction 04),
  - Note that Carry status bit is updated as for addition instruction 01.
- The subtraction instruction (for instruction 05),
- The load instruction (for instructions 06, 07, and 08),
- The store instruction (for instructions 01, 02, 03, 04, 05, 06).

Compatibility with C54x devices (LEAD = 1) :

When this instruction is executed with M40 set to 0, compatibility is ensured.
Note that when LEAD is 1,

- for instructions 04 and 05, the subtract and addition operations do not have any overflow detection, report and saturation after the shifting operation.
- Instructions 01, 02, 03, 04, 05 and 06 use only the 6 lsb's of DR2 data register to determine the shift quantity of the intermediary shift operation. The 6 lsb's of DRx define a shift quantity within [−32,+31] interval ; when the value is in [−32,−17] interval, a modulo 16 operation transforms the shift quantity to fit within [−16,−1] interval.

TABLE 123-continued

Dual Multiply, [Accumulate / Subtract] , operator

| no: | Syntax: | ‖: | sz: | cl: | pp: |
|---|---|---|---|---|---|
| 1: | ACx = M40(rnd(uns(Xmem) * uns(coeff))) , ACy = M40(rnd(uns(Ymem) * uns(coeff))) | n | 4 | 1 | X |
| 2: | ACx = M40(rnd(ACx + (uns(Xmem) * uns(coeff)))) , ACy = M40(rnd(uns(Ymem) * uns(coeff))) | n | 4 | 1 | X |
| 3: | ACx = M40(rnd(ACx − (uns(Xmem) * uns(coeff)))) , ACy = M40(rnd(uns(Ymem) * uns(coeff))) | n | 4 | 1 | X |
| 4: | mar(Xmem) , ACx = M40(rnd(uns(Ymem) * uns(coeff))) | n | 4 | 1 | X |
| 5: | ACx = M40(rnd(ACx + (uns(Xmem) * uns(coeff)))) , ACy = M40(rnd(ACy + (uns(Ymem) * uns(coeff)))) | n | 4 | 1 | X |
| 6: | ACx = M40(rnd(ACx − (uns(Xmem) * uns(coeff)))) , ACy = M40(rnd(ACy + (uns(Ymem) * uns(coeff)))) | n | 4 | 1 | X |
| 7: | mar(Xmem) , ACx = M40(rnd(ACx + (uns(Ymem) * uns(coeff)))) | n | 4 | 1 | X |
| 8: | ACx = M40(rnd(ACx − (uns(Xmem) * uns(coeff)))) , ACy = M40(rnd(ACy − (uns(Ymem) * uns(coeff)))) | n | 4 | 1 | X |
| 9: | mar(Xmem) , ACx = M40(rnd(ACx − (uns(Ymem) * uns(coeff)))) | n | 4 | 1 | X |
| 10: | ACx = M40(rnd((ACx >> #16) + (uns(Xmem) * uns(coeff)))) , ACy = M40(rnd(ACy + (uns(Ymem) * uns(coeff)))) | n | 4 | 1 | X |
| 11: | ACx = M40(rnd(uns(Xmem) * uns(coeff))) , ACy = M40(rnd((ACy >> #16) + (uns(Ymem) * uns(coeff)))) | n | 4 | 1 | X |
| 12: | ACx = M40(rnd((ACx >> #16) + (uns(Xmem) * uns(coeff)))) , ACy = M40(rnd((ACy >> #16) + (uns(Ymem) * uns(coeff)))) | n | 4 | 1 | X |
| 13: | ACx = M40(rnd(ACx − (uns(Xmem) * uns(coeff)))) , ACy = M40(rnd((ACy >> #16) + (uns(Ymem) * uns(coeff)))) | n | 4 | 1 | X |
| 14: | mar(Xmem) , ACx = M40(rnd((ACx >> #16) + (uns(Ymem) * uns(coeff)))) | n | 4 | 1 | X |
| 15: | mar(Xmem) , mar(Ymem) , mar(coeff) | n | 4 | 1 | X |

Operands:

ACx, ACy : Accumulator AC[0..3].
Xmem, Ymem : Indirect dual data memory access (two data accesses).
coeff : Coefficient memory access (16-bit or 32-bit data access).

Status bit :

Affected by : M40, SATD, FRCT, RDM, GSM
Affects : ACxOV, ACyOV

Description :

These instructions perform 2 paralleled operations in one cycle. The operations are executed in the 2 D-unit MACs :
For each operations, the execution flow is identical to one of the following instruction :
- The multiply instruction,
- The multiply and accumulate instruction,
- The multiply and subtract instruction.

Note that :

1 - All instructions provide the option to disable sign extension of data memory operands Xmem, Ymem and coeff. This is done with the prefix ‘uns’ applied to the memory operand.
When Xmem memory operand is defined as unsigned, Ymem should also be defined as unsigned (and reciprocally).

2 - All instructions provide the option to locally set M40 status bit to 1 for the execution of the instruction. This is done when the ‘M40’ keyword is applied to the instruction.

3 - Each data flow, can also disable the usage of the corresponding MAC unit, while allowing the modification of address registers in the 3 address generation units through the following instructions:
- mar(Xmem)
- mar(Ymem)
- mar(coeff)

Normalization exp() / mant()

| no: | Syntax: | ‖: | sz: | cl: | pp: |
|---|---|---|---|---|---|
| 1: | ACy = mant(ACx) , DRx = exp(ACx) | y | 3 | 1 | X |
| 2: | DRx = exp(ACx) | y | 3 | 1 | X |

Operands:

ACx, ACy : Accumulator AC[0..3].
DRx : Data register DR[0..3].

Description :

The exp() instruction computes the exponent of the source accumulator ACx in the D-unit shifter. The result of the operation is stored in the selected DRx data register. The TABLE 123-continued A-unit ALU is used to make the move operation.
  This exponent is a signed 2s-complement value in the [−8..31] range. It is stored in the destination data register DRx.
  The exponent is computed by calculating the number of leading bit in ACx and subtracting 8 from this value. The number of leading bit is the number of shifts to the msb's needed to align the accumulator content on a signed 40 bit representation.
  ACx accumulator is not modified after the execution of the instruction.
  If source accumulator is equal to 0, DRx is loaded with 0.
The mant(), exp() instruction computes the exponent and mantissa of accumulator ACx in the D-unit shifter. The exponent is stored in the selected DRx data register. The A-unit ALU is used to make this move operation.
  This exponent is a signed 2s-complement value in the [−31..8] range. It is stored in the destination data register DRx.
  The exponent is computed by subtracting 8 to the number of leading bit in accumulator ACx. The number of leading bit is the number of shifts to the msb's needed to align the accumulator content on a signed 40 bit representation.
  The mantissa is obtained by aligning accumulator ACx content on a signed 32 bit representation. The mantissa is stored in accumulator register ACy.
- The shift operation is performed on 40 bit.
  - When shifting to the lsb's, bit 39 of accumulator ACx is extended to bit 31.
  - When shifting to the msb's, 0 is inserted at bit position 0.
- If source accumulator is equal to 0, DRx is loaded with 8000H value.

Arithmetical Shift >> and <<[C] operator

| no: Syntax: | ‖: | sz: | cl: | pp: |
|---|---|---|---|---|
| 1: dst = dst >> #1 | y | 2 | 1 | X |
| 2: dst = dst << #1 | y | 2 | 1 | X |
| 3: ACy = ACx << DRx | y | 2 | 1 | X |
| 4: ACy = ACx <<C DRx | y | 2 | 1 | X |
| 5: ACy = ACx << SHIFTW | y | 3 | 1 | X |
| 6: ACy = ACx <<C SHIFTW | y | 3 | 1 | X |

Operands:

| | | |
|---|---|---|
| ACx, ACy | : | Accumulator AC[0..3]. |
| DRx | : | Data register DR[0..3]. |
| dst | : | Accumulator AC[0..3] or address register AR[0..7] or data register DR[0..3]. |
| SHIFTW | : | [−32..+31] immediate shift value. |

Status bit :

| | | |
|---|---|---|
| Affected by | : | SXMD, M40, SATD, SATA, LEAD |
| Affects | : | Carry, ACyOV, dstOV |

Description :

These instructions perform a signed shift by :
- An immediate value (instructions 01, 02, 05 and 06),
- Or by the content of data register DRx (instructions 03 and 04).
  In this case, if the 16-bit value contained in DRx is out of [−32..+31] interval, the shift is saturated to −32 or +31, an overflow is reported to the destination accumulator overflow bit and the shift operation is performed with this value.

For instructions 04 and 06, Carry status bit contains the shifted out bit.
The operation is performed :
1 - In the D-unit Shifter, if the destination operand is an accumulator register :
- When M40 is 0,
  - If SXMD is 1, bit 31 of the input operand is copied in the guard bits (39–32).
  - If SXMD is 0, zero is copied in the guard bits (39–32).
- When shifting to the msb's, the sign position of the operand is compared to the shift quantity. This comparison depends on M40 status bit :
    - When M40 is 0, comparison is performed versus bit 31.
    - When M40 is 1, comparison is performed versus bit 39.
  An overflow is generated accordingly.
- The operation is performed on 40 bits in the D-unit Shifter.
  - When shifting to the lsb's :
    - Bit 39 is extended according to SXMD
    - The shifted out bit is extracted at bit position 0.
  - When shifting to the msb's :
    - 0 is inserted at bit position 0.
    - If M40 is 0, the shifted out bit is extracted at bit position 31.
    - If M40 is 1, the shifted out bit is extracted at bit position 39.
- If an overflow is detected, the destination accumulator overflow status bit is set.
- If SATD is 1, when an overflow is detected, the destination register is saturated.
  - When M40 is 0, saturation values are 00.7FFF.FFFFh or FF.8000.0000h
  - When M40 is 1, saturation values are 7F.FFFF.FFFFh or 80.0000.0000h TABLE 123-continued 2 - In the A-unit ALU, if the destination operand is an address or data register :
- The operation is performed on 16 bits in the A-unit ALU.
  - When shifting to the lsb's :
    - Bit 15 is sign extended.
  - When shifting to the msb's :
    - 0 is inserted at bit position 0.
- Overflow detection is done at bit position 15.
- If SATA is 1, when an overflow is detected, the destination register is saturated. Saturation values are 7FFFh or 8000h Compatibility with C54x devices (LEAD = 1) :

When LEAD status bit is set to 1,
- These instructions are executed as if M40 status bit was locally set to 1.
- There is no overflow detection, overflow report and no saturation performed by the D-unit shifter.
- When the shift quantity is determined by the content of a data register DRx, the 6 lsb's of the data register are used to determine the shift quantity. The 6 lsb's of DRx define a shift quantity within [−32,+31] interval ; when the value is in [−32,−17] interval, a modulo 16 operation transforms the shift quantity to fit within
  [−16,−1] interval.

Conditional Shift sftc()

| no: Syntax: | ‖: | sz: | cl: | pp: |
|---|---|---|---|---|
| 1: ACx = sftc(ACx,TCx) | y | 2 | 1 | X |

Operands:

ACx : Accumulator AC[0..3].
TCx : Test control flag 1 or 2

Status bit :

Affects : TCx

Description :

If the source accumulator ACx(31–0) has 2 sign bits, this instruction shifts the 32 bit accumulator ACx by 1 bit to the msb's.
If there are 2 sign bits, the selected status bit TCx is set to 0 ; otherwise it is set to 1.
Note that sign bits are extracted at bit position 31 and 30.

Bit Manipulation Operations

Register Bit test, Reset, Set, and Complement bit() / cbit()

| no: Syntax: | ‖: | sz: | cl: | pp: |
|---|---|---|---|---|
| 1: TCx = bit(src,Baddr) | n | 3 | 1 | X |
| 2: cbit(src,Baddr) | n | 3 | 1 | X |
| 3: bit(src,Baddr) = #0 | n | 3 | 1 | X |
| 4: bit(src,Baddr) = #1 | n | 3 | 1 | X |
| 5: bit(src,pair(Baddr)) | n | 3 | 1 | X |

Operands:

src : Accumulator AC[0..3]
or address register AR[0..7]
or data register DR[0..3].
Baddr : Register bit address.
TCx : Test control flag 1 or 2

Status bit :

Affects : TCx

Description :

These instructions perform bit manipulations :
- In the D-unit ALU, if the register operand is an accumulator register.
- In the A-unit ALU, if the register operand is an address or data register.

These instructions permits to :
- Test a single bit of a register (instruction no 01).
  The tested bit is copied in the selected TCx status bit.
- complement a single bit of a register (instruction no 02).
- reset a single bit of a register (instruction no 03).
- set a single bit of a register (instruction no 04).
- Test 2 consecutive bits of a register (instruction no 05).
  The tested bits are copied in TC1 and TC2 status bits :
  - TC1 tests the bit which is accessed by 'Baddr' addressing field.
  - TC2 tests the bit which is at the following bit address (Baddr+1).

TABLE 123-continued

The register bit is selected with the Bit addressing mode Baddr which enables to address the bit with :
- An immediate value
- Or an indirect access.

For more detail on 'Baddr' addressing mode see addressing mode section of the User Guide.

Note 1:

For instructions 01, 02, 03 and 04, the generated bit address must be within :
- [0..39] range when accessing accumulator bits (only the 6 lsb's of the generated bit address are taken into account to determine the bit position),
  If the generated bit address is not within range,
  - for instruction no 01, 0 will be stored in TCx.
  - for instructions no 02, 03 and 04, the register bit value won't change.
- [0..15] range when accessing address or data register bits (only the 4 lsb's of the generated address are taken into account to determine the bit position).

Note 2 :

For instructions 05 the generated bit address must be within :
- [0..38] range when accessing accumulator bits (only the 6 lsb's of the generated bit address are taken into account to determine the bit position),
- [0..14] range when accessing address or data register bits (only the 4 lsb's of the generated address are taken into account to determine the bit position).

If the generated bit address is not within range,
- When accessing accumulator bits,
  - If the generated bit address is 39, bit 39 of the register will be stored in TC1 and 0 will be stored in TC2.
  - In other cases, 0 will be stored in TC1 and TC2.
- When accessing address or data register bits,
  - If the generated bit address is 15, bit 15 of the register will be stored in TC1 and 0 will be stored in TC2.
  - In other cases, 0 will be stored in TC1 and TC2.

Bit Field Comparison & operator

| no: | Syntax: | \|\|: | sz: | cl: | pp: |
|---|---|---|---|---|---|
| 1: | TC1 = Smem & k16 | n | 4 | 1 | X |
| 2: | TC2 = Smem & k16 | n | 4 | 1 | X |

Operands:

Smem : Word single data memory access (16-bit data access).
kx : Unsigned constant coded on x bits.

Status bit :

Affects : TCx

Description :

This instruction performs bit field manipulation in the A-unit ALU.
The bitf() operation flow is described in pseudo C language.
The 16 bit field mask k16 is ANDed with the data memory operand Smem.
The result is compared to zero and stored in the specified TCx status bit.

```
step1:  if( ((Smem) AND k16 ) == 0)
step2:      TCx = 0
        else
step3:      TCx = 1
```

Memory Bit test, Reset, Set, and Complement bit() / cbit()

| no: | Syntax: | \|\|: | sz: | cl: | pp: |
|---|---|---|---|---|---|
| 1: | TCx = bit(Smem,src) | n | 3 | 1 | X |
| 2: | cbit(Smem,src) | n | 3 | 2 | X |
| 3: | bit(Smem,src) = #0 | n | 3 | 2 | X |
| 4: | bit(Smem,src) = #1 | n | 3 | 2 | X |
| 5: | TC1 = bit(Smem,k4) , bit(Smem,k4) = #1 | n | 3 | 2 | X |
| 6: | TC2 = bit(Smem,k4) , bit(Smem,k4) = #1 | n | 3 | 2 | X |
| 7: | TC1 = bit(Smem,k4) , bit(Smem,k4) = #0 | n | 3 | 2 | X |
| 8: | TC2 = bit(Smem,k4) , bit(Smem,k4) = #0 | n | 3 | 2 | X |
| 9: | TC1 = bit(Smem,k4) , cbit(Smem,k4) | n | 3 | 2 | X |
| 10: | TC2 = bit(Smem,k4) , cbit(Smem,k4) | n | 3 | 2 | X |
| 11: | TC1 = bit(Smem,k4) | n | 3 | 1 | X |
| 12: | TC2 = bit(Smem,k4) | n | 3 | 1 | X |

Operands:

src : Accumulator AC[0..3]
or address register AR[0..7]
or data register DR[0..3].
Smem : Word single data memory access (16-bit data access).
kx : Unsigned constant coded on x bits.
TCx : Test control flag 1 or 2

TABLE 123-continued

Status bit :

Affects : TCx

Description :

These instructions perform bit manipulations in the A-unit ALU.
These instructions permits to :

- Test a single bit of a data memory operand (instruction no 01, 11 and 12). The tested bit is copied in the selected TCx status bit.
- complement a single bit of a data memory operand (instruction no 02).
- reset a single bit of a data memory operand (instruction no 03).
- set a single bit of a data memory operand (instruction no 04).
- Test and set a single bit of a data memory operand (instruction no 05 and 06). The tested bit is copied in the selected TCx status bit.
- Test and reset a single bit of a data memory operand (instruction 07 and 08). The tested bit is copied in the selected TCx status bit.
- Test and complement a single bit of a data memory operand (instruction no 09 and 10). The tested bit is copied in the selected TCx status bit.

The data memory operand bit can be addressed :

- With an immediate value k4 (instructions 05, 06, 07, 08, 09, 10, 11 and 12).
- Or by an indirect access through accumulators, address or data registers (instructions 01, 02, 03 and 04). In this case, the generated bit address must be within [0..15] range (only the 4 lsb's of the registers are taken into account to determine the bit position).

Note that all instructions are 2 cycle instructions except instructions 01, 11 and 12 which are 1 cycle instructions.

Status Bit Reset, Set bit()

| no: Syntax: | \|\|: | sz: | cl: | pp: |
|---|---|---|---|---|
| 1: bit(ST0,k4) = #0 | y | 2 | 1 | X |
| 2: bit(ST0,k4) = #1 | y | 2 | 1 | X |
| 3: bit(ST1,k4) = #0 | y | 2 | 1 | X |
| 4: bit(ST1,k4) = #1 | y | 2 | 1 | X |
| 5: bit(ST2,k4) = #0 | y | 2 | 1 | X |
| 6: bit(ST2,k4) = #1 | y | 2 | 1 | X |
| 7: bit(ST3,k4) = #0 | y | 2 | 1 | X |
| 8: bit(ST3,k4) = #1 | y | 2 | 1 | X |

Operands:

kx : Unsigned constant coded on x bits.

Status bit :

Affects : Selected status bits

Description :

These instructions manipulate a single bit within the selected status register (ST0, ST1, ST2 or ST3). The operation is performed in the A-unit ALU.
Instructions 01, 03, 05 and 07, set to 0 the bit of the selected status register.
Instructions 02, 04, 06 and 08, set to 1 the bit of the selected status register.

Compatibility with C54x devices (LEAD = 1) :

Note that: LEAD3 Status bit mapping does not correspond to C54x's.

Bit Field Extract and Bit Field Expand field_extract() / field_expand()

| no: Syntax: | \|\|: | sz: | cl: | pp: |
|---|---|---|---|---|
| 1: dst = field_extract(ACx,k16) | n | 4 | 1 | X |
| 2: dst = field_expand(ACx,k16) | n | 4 | 1 | X |

Operands:

ACx : Accumulator AC[0..3].
dst : Accumulator AC[0..3] or address register AR[0..7] or data register DR[0..3].
kx : Unsigned constant coded on x bits.

Description :

These 2 instructions perform bit field manipulations in the D-unit shifter. The result of the operation is stored in the selected DRx data register. The A-unit ALU is used to make the move operation.
The field_extract() operation flow is described as follows :.

The bit mask k16 is scanned from the lsb's to the msb's. According to the bit set to 1 in the bit field mask k16, the corresponding source accumulator bits are extracted and packed towards the lsb's. The result is stored in the destination register.

step 1: Clear the destination register.

TABLE 123-continued

```
step 2:    Reset to 0 the bit index.pointing within destination register : 'index_in_dst'.
step 3:    Reset to 0 the bit index pointing within source accumulator : 'index_in_ACx'.
step 4:    Scan the bit field mask k16 from bit 0 to bit 15.
           {
step 5:         Each bit in the bit field mask is tested.
                If the tested bit is set to 1 :
step 6:         {    The bit pointed by 'index_in_ACx' is copied to
                     the bit pointed by 'index_in_dst'.
step 7:              Increment 'index_in_dst' bit index.
                }
step 8:         Increment 'index_in_ACx' bit index.
           }
```

The field_expand() operation flow is described in pseudo C language.

The bit mask k16 is scanned from the lsb's to the msb's. According to the bit set to 1 in the bit field mask k16, the source accumulator bits are extracted and separated with 0 towards the msb's. The result is stored in the destination register.

```
step 1:    Clear the destination register.
step 2:    Reset to 0 the bit index pointing within destination register : 'index_in_dst'.
step 3:    Reset to 0 the bit index pointing within source accumulator : 'index_in_ACx'.
step 4:    Scan the bit field mask k16 from bit 0 to bit 15.
           {
step 5:         Each bit in the bit field mask is tested.
                If the tested bit is set to 1 :
step 6:         {    The bit pointed by 'index_in_ACx' is copied to
                     the bit pointed by 'index_in_dst'.
step 7:              Increment 'index_in_ACx' bit index.
                }
step 8:         Increment 'index_in_dst' bit index.
           }
```

Control Operations

Goto on Address Register not Zero — if() goto

| no: Syntax: | \|\|: | sz: | cl: | pp: |
|---|---|---|---|---|
| 1: if (ARn_mod != #0) goto L16 | n | 4 | 4/3 | AD |
| 2: if (ARn_mod != #0) dgoto L16 | n | 4 | 2/2 | AD |

Operands:

Lx : Program address label (signed offset relative to program counter register (PC) coded on x bits).

Description :

These instruction perform a conditional branch of the PC register.

1 - The content of the selected address register is pre-modified in the address generation unit. This pre-modification is performed if one of the following modifiers is applied to ARn: *+ARn, *−ARn, *ARn(short(#k3)), *ARn(#k16), *+ARn(k16), *ARn(DR0), *ARn(DR1), *CDP(#k16), *+CDP(#k16).

2 - The (pre-modified) content of ARn is compared to zero and sets the condition in the Address phase of the pipeline.

3 - If the condition is not true, a branch occurs and the instruction is executed in 4 cycles. If the condition is false, the instruction is executed in 3 cycles. When 'd' pre-fixes the 'goto' keyword, the instruction is delayed by 2 cycles. The instruction is then executed in 2 cycles. In the 2 delayed cycle slots, parallelism can be used following the generic rules.

4 - The content of the selected address register is post-modified in the address generation unit. This post-modification is performed if one of the following modifiers is applied to ARn : *ARn+, *ARn−, *(ARn+DR0), *(ARn+DR1), *(ARn−DR0), *(ARn−DR1), *(ARn+DR0B), *(ARn+DR0B), *CDP+, *CDP−.

Note that:

The program branch address is specified as a 16-bit signed offset relative to PC. this instruction can be used to branch within a 64Kbyte window centered on current PC value.

Unconditional Goto — goto

| no: Syntax: | \|\|: | sz: | cl: | pp: |
|---|---|---|---|---|
| 1: goto ACx | y | 2 | 7 | X |
| 2: goto L6 | y | 2 | 4* | AD |
| 3: goto L16 | y | 3 | 4* | AD |
| 4: goto P24 | n | 4 | 3 | D |
| 5: dgoto ACx | y | 2 | 5 | X |
| 6: dgoto L6 | y | 2 | 2 | AD |
| 7: dgoto L16 | y | 3 | 2 | AD |
| 8: dgoto P24 | n | 4 | 1 | D |

TABLE 123-continued

Operands:

| | | |
|---|---|---|
| ACx | : | Accumulator AC[0..3]. |
| Lx | : | Program address label (signed offset relative to program counter register (PC) coded on x bits). |
| Px | : | Program or data address label (absolute address coded on x bits). |

Description :

These instructions branch to a program address.
When 'd' pre-fixes the 'goto' keyword, the instruction is delayed by 2 cycles.
In the 2 delayed cycle slots, parallelism can be used following the generic rules.
The program address can be specified :
1 - By a label (instructions 02, 03, 04, 06, 07 and 08).
2 - By the content of the 24 lowest bits of an accumulator (instructions 01 and 05)
(*) : Instruction 02 is executed in 2 cycles if the addressed instruction is in the Instruction Buffer Unit.

Conditional Goto if() goto

| no: Syntax: | \|\|: | sz: | cl: | pp: |
|---|---|---|---|---|
| 1: if (cond) goto 14 | n | 2 | 4/3 | R |
| 2: if (cond) goto L8 | y | 3 | 4/3 | R |
| 3: if (cond) goto L16 | n | 4 | 4/3 | R |
| 4: if (cond) goto P24 | y | 6 | 4/3 | R |
| 5: if (cond) dgoto L8 | y | 3 | 2/2 | R |
| 6: if (cond) dgoto L16 | n | 4 | 2/2 | R |
| 7: if (cond) dgoto P24 | y | 6 | 2/2 | R |

Operands:

| | | |
|---|---|---|
| lx | : | Program address label (unsigned offset relative to program counter register (PC) coded on x bits). |
| Lx | : | Program address label (signed offset relative to program counter register (PC) coded on x bits). |
| Px | : | Program or data address label (absolute address coded on x bits). |
| cond | : | Condition based on accumulator value, |
| | : | on test control flags, or on Carry status bit. |

Status bit :

| | | |
|---|---|---|
| Affected by | : | TCx, Carry, ACxOV, M40, LEAD |
| Affects | : | ACxOV |

Description :

These instructions evaluate the condition defined by the 'cond' field in the Read phase of the pipeline. If the condition is true, a branch occurs. There is a 1 cycle latency on the condition setting.
When 'd' pre-fixes the 'goto' keyword, the instruction is delayed by 2 cycles.
In the delayed cycle slots, parallelism can be used following the generic rules.
A single condition can be tested. This one is determined through the 'cond' field of the instruction :

- Here are the available conditions testing the accumulator ACx content versus 0 :
  ACx == #0, ACx != #0, ACx < #0, ACx <= #0, ACx > #0, ACx >= #0.
  The comparison versus zero depend on M40 status bit value :
  - If M40 is 0, ACx(31–0) is compared to zero.
  - If M40 is 1, ACx(39–0) is compared to zero.
- Here are the available conditions testing the accumulator ACx overflow status bit ACxOV :
  overflow(ACx), !overflow(ACx).
  When these conditions are used, the corresponding Accumulator overflow bit is cleared.
- Here are the available conditions testing the 16-bit address or data register DAx content versus 0 :
  DAx == #0, DAx != #0, DAx < #0, DAx <= #0, DAx > #0, DAx >= #0.
- Here are the available conditions testing the Carry status bits and test control flags (TC1 and TC2).
  - Each of the bits can be tested independently versus 0 when the optional '!' symbol is used before the bit designation. If not, the bit is tested versus 1.
    [!]TCx, [!]C.
  - TC1 and TC2 can be combined with a AND, OR, XOR logical bit combinations :
    [!]TC1 & [!]TC2,
    [!]TC1 | [!]TC2,
    [!]TC1 ^ [!]TC2.

Note that:
The instruction is selected dependent on the branch offset between current PC value and program branch address specified by the label. The performance depends on the instruction.

TABLE 123-continued

Compatibility with C54x devices (LEAD = 1) :

If LEAD status bit is 1, the comparison to zero of accumulators is performed as if M40 was set to 1.

Compare and Goto if() goto

| no: Syntax: | ||: | sz: | cl: | pp: |
|---|---|---|---|---|
| 1: compare (uns(src RELOP K8)) goto L8 {==,<,>=,!=} | n | 4 | 5/4 | X |

Operands:

src : Accumulator AC[0..3]
or address register AR[0..7]
or data register DR[0..3].
Kx : Signed constant coded on x bits.
Lx : Program address label (signed offset relative to program counter register (PC) coded on x bits).

Status bit :

Affected by : M40, LEAD

Description :

This instruction performs a comparison in the D-unit ALU or in the A-unit ALU. If the result of the comparison is true, a branch occurs. The comparison is performed in the execute phase of the pipeline Note that:
The program branch address is specified as a 8-bit signed offset relative to PC.
this instruction can be used to branch within a 256 byte window centered on current PC value.

The comparison depends on the optional 'uns' keywords and on M40 status bit for accumulator comparisons. As the.below table shows it, the 'uns' keyword specifies an unsigned comparison ; the M40 status bit defines the comparison bit width of accumulator comparisons.

In case of unsigned comparison, the 8 bit constant k8 is zero extended to :
- 16 bit, if the source register is an address or data register,
- 40 bit, if the source register is an accumulator.

In case of signed comparison, the 8 bit constant k8 is sign extended to :
- 16 bit, if the source register is an address or data register,
- 40 bit, if the source register is an accumulator.

'uns' impact on instruction functionality

| uns | src | comparison type |
|---|---|---|
| 0 | DAx | 16 bit signed comparison in A-unit ALU |
| 0 | ACx | if M40 is 0, 32 bit signed comparison in D-unit ALU<br>if M40 is 1, 40 bit signed comparison in D-unit ALU |
| 1 | DAx | 16 bit unsigned comparison in A-unit ALU |
| 1 | ACx | if M40 is 0, 32 bit unsigned comparison in D-unit ALU<br>if M40 is 1, 40 bit unsigned comparison in D-unit ALU |

Compatibility with C54x devices (LEAD = 1) :

When LEAD status bit is 1, the conditions testing accumulator contents are all performed as if M40 was set to 1.

Unconditional Call call()

| no: Syntax: | ||: | sz: | cl: | pp: |
|---|---|---|---|---|
| 1: call ACx | y | 2 | 7 | X |
| 2: call L16 | y | 3 | 4 | AD |
| 3: call P24 | n | 4 | 3 | D |
| 4: dcall ACx | y | 2 | 5 | X |
| 5: dcall L16 | y | 3 | 2 | AD |
| 6: dcall P24 | n | 4 | 1 | D |

Operands:

ACx : Accumulator AC[0..3].
Lx : Program address label (signed offset relative to program counter register (PC) coded on x bits).
Px : Program or data address label (absolute address coded on x bits).

Description :

These instructions pass the control to a specified program subroutine.
- The stack pointer (SP) is decremented by 1 word in the address phase of the pipeline. The 16 lsb's of LCRPC register are pushed to the top of the Data Stack.

TABLE 123-continued

- The System stack pointer (SSP) is decremented by 1 word in the address phase of the pipeline. The 8 msb's of LCRPC register and the loop control management flag register (CFCT) are pushed on to the top of the System Stack.
- The return address of the subroutine is saved in the LCRPC register. The active loop control management flags are saved in CFCT register.
- The program counter (PC) is loaded with the subroutine program address. The active loop control management flags are cleared.

When 'd' pre-fixes the 'call' keyword, the instruction is delayed by 2 cycles.
In the 2 delayed cycle slots, parallelism can be used following the generic rules.
The subroutine program address can be specified :
1 - By a label (instructions 02, 03, 05 and 06).
2 - By the content of the 24 lowest bits of an accumulator (instructions 01 and 04)

Conditional Call if() call()

| no: Syntax: | ‖: | sz: | cl: | pp: |
|---|---|---|---|---|
| 1: if (cond) call L16 | n | 4 | 4/3 | R |
| 2: if (cond) call P24 | y | 6 | 4/3 | R |
| 3: if (cond) dcall L16 | n | 4 | 2/2 | R |
| 4: if (cond) dcall P24 | y | 6 | 2/2 | R |

Operands:

Lx : Program address label (signed offset relative to program counter register (PC) coded on x bits).
Px : Program or data address label (absolute address coded on x bits).
cond : Condition based on accumulator value.
: on test control flags, or on Carry status bit.

Status bit :

Affected by : TCx, Carry, ACxOV, M40, LEAD
Affects : ACxOV

Description :

These instructions evaluate the condition defined by the 'cond' field in the Read phase of the pipeline. If the condition is true, a subroutine call occurs. There is a 1 cycle latency on the condition setting.
If a subroutine call occurs :

- The stack pointer (SP) is decremented by 1 word in the address phase of the pipeline. The 16 lsb's of LCRPC register are pushed to the top of the Data Stack.
- The System stack pointer (SSP) is decremented by 1 word in the address phase of the pipeline. The 8 msb's of LCRPC register and the loop control management flag register (CFCT) are pushed to the top of the System Stack.
- The return address of the subroutine is saved in the LCRPC register. The active loop control management flags are saved in CFCT register.
- The program counter (PC) is loaded with the subroutine program address. The active loop control management flags are cleared.

When 'd' pre-fixes the 'call' keyword, the instruction is delayed by 2 cycles.
In the 2 delayed cycle slots, parallelism can be used following the generic rules.
The conditions ('cond' field) which can be tested are identical to those used by the conditional goto instructions.
Note that:
The instruction is selected dependent on the branch offset between current PC value and program subroutine address specified by the label. The performance depends on the instruction.

Compatibility with C54x devices (LEAD = 1) :

If LEAD status bit is 1, the comparison to zero of accumulators is performed as if M40 was set to 1.

Software Interrupt intr()

| no: Syntax: | ‖: | sz: | cl: | pp: |
|---|---|---|---|---|
| 1: intr(k5) | y | 3 | 3 | D |

Operands:

kx : Unsigned constant coded on x bits.

Status bit :

Affects : INTM, IFR

Description :

This instruction pass the control to a specified interrupt service routine. The corresponding bit in the interrupt flag register (IFR) is cleared and interrupts are globally disabled (INTM is set to 1). The interrupt service routine address is stored at the interrupt vector address defined by the content of an interrupt vector pointer (IVPD or IVPH) combined with the constant K5.

TABLE 123-continued

When the control is passed to the interrupt service routine :
- The stack pointer (SP) is decremented by 1 word in the address phase of the pipeline. The 16 lsb's of a potential target address of a delayed control instruction are pushed to the top of the Data Stack.
- The System stack pointer (SSP) is decremented by 1 word in the address phase of the pipeline. The 8 msb's of a potential target address of a delayed control instruction combined with interrupt delayed slot bit number and the 7 higher bit of status register 0 ST0[15:9] are pushed to the top of the System Stack.
- The stack pointer (SP) is decremented by 1 word in the access phase of the pipeline. The status register ST1 is pushed to the top of the Data Stack.
- The System stack pointer (SSP) is decremented by 1 word in the access phase of the pipeline. The debug status register DBGSTAT is pushed to the top of the System Stack.
- The stack pointer (SP) is decremented by 1 word in the read phase of the pipeline. The 16 lsb's of LCRPC register are pushed to the top of the Data Stack.
- The System stack pointer (SSP) is decremented by 1 word in the read phase of the pipeline. The 8 msb's of LCRPC register and the loop control management flag register (CFCT) are pushed on to the top of the System Stack.
- The return address of the interrupt is saved in the LCRPC register. The active loop control management flags are saved in CFCT register.
- The program counter (PC) is loaded with the interrupt service routine program address. The active loop control management flags are cleared.

Note that this instruction is executed regardless of the value of INTM.

Specification issue notes :

The description of the instruction needs to be checked.

---

Unconditional Return — return

| no: | Syntax: | ‖: | sz: | cl: | pp: |
|---|---|---|---|---|---|
| 1: | return | y | 2 | 3 | D |
| 2: | dreturn | y | 2 | 1 | D |

Description :

These instructions pass back the control to the calling subroutine.
- PC is loaded with LCRPC register content (that is to say the return address of the calling subroutine). The active loop control management flags are updated with CFCT register content.
- The 16 lsb's of LCRPC register are popped from the top of the Data Stack. The stack pointer (SP) is incremented by 1 word in the address phase of the pipeline.
- The 8 msb's of LCRPC register and the loop control management flag register (CFCT) are popped from the top of the System Stack. The System stack pointer (SSP) is incremented by 1 word in the address phase of the pipeline.

When 'd' pre-fixes the 'return' keyword, the instruction is delayed by 2 cycles.
In the delayed cycle slots, parallelism can be used following the generic rules.

---

Conditional Return — if() return

| no: | Syntax: | ‖: | sz: | cl: | pp: |
|---|---|---|---|---|---|
| 1: | if (cond) return | y | 3 | 4/3 | R |
| 2: | if (cond) dreturn | y | 3 | 2/2 | R |

Operands:

cond : Condition based on accumulator value,
: on test control flags, or on Carry status bit.

Status bit :

Affected by : TCx, Carry, ACxOV, M40, LEAD
Affects : ACxOV

Description :

These instructions evaluate the condition defined by the 'cond' field in the Read phase of the pipeline. If the condition is true, a return from subroutine occurs. There is a 1 cycle latency on the condition setting.
When the return from subroutine occurs :
- PC is loaded with LCRPC register content (that is to say the return address of the calling subroutine). The active loop control management flags are updated with CFCT register content.
- The 16 lsb's of LCRPC register are popped from the top of the Data Stack. The stack pointer (SP) is incremented by 1 word in the address phase of the pipeline.
- The 8 msb's of LCRPC register and the loop control management flag register (CFCT) are popped from the top of the System Stack. The System stack pointer (SSP) is incremented by 1 word in the address phase of the pipeline.

When 'd' pre-fixes the 'return' keyword, the instruction is delayed by 2 cycles.
In the delayed cycle slots, parallelism can be used following the generic rules.
The conditions ('cond' field) which can be tested are identical to those used by the conditional goto instructions.

TABLE 123-continued

Compatibility with C54x devices (LEAD = 1) :

If LEAD status bit is 1, the comparison to zero of accumulators is performed as if M40 was set to 1.

Return form Interrupt return__int

| no: | Syntax: | ‖: | sz: | cl: | pp: |
|---|---|---|---|---|---|
| 1: | return__int | y | 2 | 3 | D |
| 2: | dreturn__int | y | 2 | 1 | D |

Description :

These instructions pass back the control to the interrupted task.

- PC is loaded with LCRPC register content (that is to say the return address of the interrupted task). The active loop control management flags are updated with CFCT register content.
- The 16 lsb's of LCRPC register are popped from the top of the Data Stack. The stack pointer (SP) is incremented by 1 word in the address phase of the pipeline.
- The 8 msb's of LCRPC register and the loop control management flag register (CFCT) are popped from the top of the System Stack. The System stack pointer (SSP) is incremented by 1 word in the address phase of the pipeline.
- The status register ST1 is popped from the top of the Data Stack. The stack pointer (SP) is incremented by 1 word in the access phase of the pipeline.
- The debug status register DBGSTAT is popped from the top of the System Stack. The System stack pointer (SSP) is incremented by 1 word in the access phase of the pipeline.
- The 16 lsb's of a potential target address of a delayed control instruction are popped from the top of the Data Stack. The stack pointer (SP) is incremented by 1 word in the read phase of the pipeline.
- The 8 msb's of a potential target address of a delayed control instruction, the interrupt delayed slot bit number and the 7 higher bit of status register 0 ST0[15:9] are popped from the top of the System Stack. The System stack pointer (SSP) is incremented by 1 word in the read phase of the pipeline.

When 'd' pre-fixes the 'return__int' keyword, the instruction is delayed by 2 cycles.
In the delayed cycle slots, parallelism can be used following the generic rules.

Specification issue notes :

The description of the instruction needs to be checked.

Repeat Single repeat()

| no: | Syntax: | ‖: | sz: | cl: | pp: |
|---|---|---|---|---|---|
| 1: | repeat(CSR) | y | 2 | 1 | AD |
| 2: | repeat(CSR) , CSR += DAx | y | 2 | 1 | X |
| 3: | repeat(k8) | y | 2 | 1 | AD |
| 4: | repeat(CSR) , CSR += k4 | y | 2 | 1 | AD |
| 5: | repeat(CSR) , CSR −= k4 | y | 2 | 1 | AD |
| 6: | repeat(k16) | y | 3 | 1 | AD |

Operands:

| | | |
|---|---|---|
| DAx | : | Address register AR[0..7] or data register DR[0..3]. |
| kx | : | Unsigned constant coded on x bits. |

Description :

Theses instructions trigger next instruction's iterating the number of times specified :

- By the immediate constant value plus 1 (instructions 03 and 06),
- By the content of CSR register plus 1 (instructions 01, 02, 04 and 05).

The repeat counter register (RPTC) :

- Is first loaded with the immediate value or CSR content at the address phase of the pipeline.
- Is then decremented by one in the address phase of the repeated instruction.
- And finally contains 0 at the end of the repeat single mechanism.
- must not be accessed when it is decremented in the repeat single mechanism.

Instructions 02, 04 and 05 permit to modify the content of CSR register with the A-unit ALU. CSR modification is performed in the execute phase of the pipeline.

In this case, there is a 3 cycle latency between CSR modification and its usage in the the address phase.

All instructions can be used in a repeat single mechanism except following ones :

'goto', 'call', 'return', 'switch', 'repeat', 'blockrepeat', 'localrepeat', 'intr', 'trap', 'reset', 'idle', 'conditional execute', 'DAx = RPTC'.

The repeat single mechanism triggered by this instruction is interruptible.

TABLE 123-continued

| Block Repeat | blockrepeat{} / localrepeat{} | | | |
|---|---|---|---|---|
| no: Syntax: | ‖: | sz: | cl: | pp: |
| 1: localrepeat{} | y | 2 | 1 | AD |
| 2: blockrepeat{} | y | 3 | 1 | AD |

Description :

Theses instructions triggers loop's iterating the number of times specified :

1 - By the content of BRC0 plus 1, if no loop has already been detected.
And in this case :
- In the address phase of the pipeline, RSA0 is loaded with the program address of the first instruction of the loop.
- The program address of the last instruction of the loop (which may be a 2 parallel instructions) is computed in the address phase of the pipeline and stored in REA0.
- BRC0, is decremented at the address phase of the last instruction of the loop.
- BRC0, contains 0 after the repeat block mechanism has ended.

2 - By the content of BRS1 plus 1, if one level of loop has already been detected.
And in this case :
- BRC1 is loaded with the content of BRS1 in the address phase of the repeat block instruction.
- In the address phase of the pipeline, RSA1 is loaded with the program address of the first instruction of the loop.
- The program address of the last instruction of the loop (which may be 2 parallel instructions) is computed in the address phase of the pipeline and stored in REA1.
- BRC1, is decremented at the address phase of the last instruction of the loop.
- BRC1, contains 0 after the repeat block mechanism has ended.
- BRS1 content is not impacted by the repeat block mechanism.

Loop structures defined by these instructions must have following characteristics :
- The minimum number of cycle executed within one loop iteration is 2 cycles.
- The maximum loop size is 64Kbytes.
- Block repeat can only be deactivated by jumping over the end address of the loop.
- Note that block repeat counter registers BRCx must be read 3 full cycles before the end of the loops in order to extract the correct loop iteration number from these registers.

Loop can be defined as local to the Instruction Buffer Unit (instruction 1) :
- Local loop sizes are limited to 56 bytes.
- Local loop body must not include 'goto', 'call', 'return', 'switch', 'intr', 'trap', 'reset', 'idle' instructions.
- The only 'goto' instructions allowed in a localrepeat structure are the non delayed conditional goto instruction with a target branch address included within the loop body. In this case, the conditional goto instruction is executed in 1 cycle and the condition is evaluated in the address phase of the pipeline (there is a 3 cycle latency on the condition setting).

Specification issue notes :

How can we nest more loops with block repeat mechanism ? How can we save the loop control management flags registers ?

| Conditional Repeat Single | while() repeat | | | |
|---|---|---|---|---|
| no: Syntax: | ‖: | sz: | cl: | pp: |
| 1: while (cond && (RPTC < k8)) repeat | y | 3 | 1 | AD |

Operands:

kx : Unsigned constant coded on x bits.
cond : Condition based on accumulator value,
: on test control flags, or on Carry status bit.

Status bit :

Affected by : TCx, Carry, ACxOV, M40, LEAD
Affects : ACxOV

Description :

This instruction triggers next instruction's iterating the number of times specified by the immediate constant value plus 1.

The repeat counter register (RPTC) :
- Is first loaded with the immediate value at the address phase of the pipeline.
- Is then decremented by one in the address phase of the repeated instruction.
- And finally contains 0 at the end of the repeat single mechanism.

At each step of the iteration, the condition defined by the 'cond' field is tested in the execute phase of the pipeline. When the condition becomes false, the iteration stops. The conditions ('cond' field) which can be tested are identical to those used by the conditional goto instructions.

TABLE 123-continued

All instructions can be used in a conditional repeat single mechanism except following ones :
'goto', 'call', 'return', 'switch', 'repeat', 'blockrepeat', 'localrepeat', 'intr', 'trap', 'reset', 'idle', 'execute'.
The repeat single mechanism triggered by this instruction is interruptible.
Compatibility with C54x devices (LEAD = 1) :

If LEAD status bit is 1, the comparison to zero of accumulators is performed as if M40 was set to 1.

| Switch | switch() |
|---|---|

| no: Syntax: | ‖: | sz: | cl: | pp: |
|---|---|---|---|---|
| 1: switch(RPTC) {18,18,18} | y | 2 | 6 | X |
| 2: switch(DAx) {18,18,18} | y | 2 | 3 | X |

Operands:

DAx : Address register AR[0..7] or data register DR[0..3].
lx : Program address label (unsigned offset relative to program counter register (PC) coded on x bits).

Description :

These instructions perform a multiple branch. Within the instruction, up to 16 labels can be defined from label0 to label15. The program branch address is determined by the content of DAx data or address register (instruction 02) or RPTC register (instruction 01). Only the 4 lsb's of the registers are used to determine the program branch address. Instruction 02 operation flow is described in pseudo C language (instruction 01 operation flow is similar).

The number of labels determines the number of comparison performed by the instruction. If the 4 lsb's of the DAx register is greater equal than the number of labels, then the processor will branch to an erroneously computed target address.

```
  step 1: if( DAx == 0) goto label0;
[ step 2: if( DAx == 1) goto label1; ]
[ step 3: if( DAx == 2) goto label2; ]
[ step 4: if( DAx == 3) goto label3; ]
  . . .
[ step 15: if( DAx == 14) goto label14; ]
[ step 16: if( DAx == 15) goto label15; ]
```

Note that :
- The program branch addresses must be within a 256 byte frame of the switch() instruction.
- The size of the instruction is 2 bytes plus 1 byte per program address label. A dummy byte label terminates the instruction code.
- The execution time varies from 6 to 9 cycles according to the number of labels.

| Software Interrupt | trap() |
|---|---|

| no: Syntax: | ‖: | sz: | cl: | pp: |
|---|---|---|---|---|
| 1: trap(k5) | y | 3 | ? | D |

Operands:

kx : Unsigned constant coded on x bits.

Description :

This instruction pass the control to a specified interrupt service routine. The interrupt service routine address is stored at the interrupt vector address defined by the content of an interrupt vector pointer (IVPD or IVPH) combined with the constant K5.
When the control is passed to the interrupt service routine :
- The stack pointer (SP) is decremented by 1 word in the address phase of the pipeline. The 16 lsb's of a potential target address of a delayed control instruction are pushed to the top of the Data Stack.
- The System stack pointer (SSP) is decremented by 1 word in the address phase of the pipeline. The 8 msb's of a potential target address of a delayed control instruction combined with interrupt delayed slot bit number and the 7 higher bit of status register 0 ST0[15:9] are pushed to the top of the System Stack.
- The stack pointer (SP) is decremented by 1 word in the access phase of the pipeline. The status register ST1 is pushed to the top of the Data Stack.
- The System stack pointer (SSP) is decremented by 1 word in the access phase of the pipeline. The debug status register DBGSTAT is pushed to the top of the System Stack.
- The stack pointer (SP) is decremented by 1 word in the read phase of the pipeline. The 16 lsb's of LCRPC register are pushed to the top of the Data Stack.
- The System stack pointer (SSP) is decremented by 1 word in the read phase of the pipeline. The 8 msb's of LCRPC register and the loop control management flag register (CFCT) are pushed on to the top of the System Stack.
- The return address of the interrupt is saved in the LCRPC register. The active loop TABLE 123-continued control management flags are saved in CFCT register.
- The program counter (PC) is loaded with the interrupt service routine program address. The active loop control management flags are cleared.

Note that this instruction is executed regardless of the value of INTM, it does not affect INTM. It is not maskable.

Specification issue notes :

The description of the instruction needs to be checked.

| Conditional Execution | if() execute() |
|---|---|

| no: | Syntax: | \|\|: | sz: | cl: | pp: |
|---|---|---|---|---|---|
| 1: | if (cond) execute(AD_Unit) | n | 2 | 1 | X |
| 2: | if (cond) execute(D_Unit) | n | 2 | 1 | X |
| 3: | if (cond) execute(AD_Unit) | n | 2 | 1 | X |
| 4: | if (cond) execute(D_Unit) | n | 2 | 1 | X |
| 5: | if (cond) execute(AD_Unit) | y | 3 | 1 | X |
| 6: | if (cond) execute(D_Unit) | y | 3 | 1 | X |

Operands:

cond : Condition based on accumulator value,
: on test control flags, or on Carry status bit.

Status bit :

Affected by : TCx, Carry, ACxOV, M40, LEAD
Affects : ACxOV

Description :

These instructions permits to condition the execution of all operations implied by an instruction or eventually part of them. The conditions which can be tested are defined by the 'cond' field, they are identical to those used by the conditional goto instructions.

1 - The conditional execute instruction can :
  1 - Condition the execution of the instruction with which it is paralleled. The syntax of the instruction is then :
      if(cond) execute([A]D_unit)
      || instruction_to_be_executed_conditionally
  2 - Condition the execution of the instructions executed in the next cycle.
      - Either, the conditional execute instruction may be executed alone. And then, the syntax of the instruction is :
        if(cond) execute([A]D_unit)
        instruction_to_be_executed_conditionally
      - Or, it may be executed with the previous instruction. And then, the syntax of the instruction is :
        previous_instruction
        || if(cond) execute([A]D_unit)
        instruction_to_be_executed_conditionally
      - In these cases, 2 paralleled instructions can be conditionally executed :
        if(cond) execute([A]D_unit)
            instruction_1_to_be_executed_conditionally
        || instruction_2_to_be_executed_conditionally 2 - The conditional execute instruction can :
  1 - Condition the whole execution flow from the address phase to the execute phase of the pipeline :
      - pointer modification in the A-unit address generation units are conditional,
      - computation performed in the A-unit ALU or in the D-unit operators are conditional,
      - register moves, loads and stores are conditional.

In this case, the instruction syntax is :
        if(cond) execute(AD_unit)

The condition is evaluated in the address phase of the pipeline. There is a 3 cycle latency for the condition testing.
  2 - Only condition the execution flow of the execute phase of the pipeline :
      - pointer modification in the A-unit address generation units are UNCONDITIONAL.
      - computation performed in the A-unit ALU or in the D-units are conditional,
      - register moves, loads and stores are conditional.

In this case, the instruction syntax is :
        if(cond) execute (D_unit)

The condition is evaluated in the execute phase of the pipeline. There is a 0 0 cycle latency for the condition testing.

Remark : When the instruction to be executed conditionally is a store to memory instruction, different latencies applies :
        - When the instruction syntax is as explained in paragraph 1.1, there is a 3 cycle latency for the condition setting. Example :
          if( cond) execute(D_unit)
          || Smem = dst
        - When the instruction syntax is as explained in paragraph 1.2, there is a 1 cycle latency for the condition setting. Example :

TABLE 123-continued if( cond) execute(D_unit)
Smem = dst

Note that the conditional execute instruction can not condition the execution of following control instructions :
goto, call, return, switch, repeat, blockrepeat.

Compatibility with C54x devices (LEAD = 1) :

If LEAD status bit is 1, the comparison to zero of accumulators is performed as if M40 was set to 1.

Logical Operations

Bitwise Complement ~ operator

| no: Syntax: | ‖: | sz: | cl: | pp: |
|---|---|---|---|---|
| 1: dst = ~src | y | 2 | 1 | X |

Operands:

src, dst : Accumulator AC[0..3]
or address register AR[0..7]
or data register DR[0..3].

Description :

These instructions perform a bit wise complement operation :

1 - In the D-unit ALU, if the destination operand is an accumulator register :
  - If an address or data register is source operand of the instruction, the 16 lsb of the address or data register are zero extended.
  - The bit inversion is performed on 40 bits in the D-unit ALU and the result is stored in the destination accumulator.

2 - In the A-unit ALU, if the destination operand is an address or data register :
  - If an accumulator is source operand of the instruction, the 16 lsb of the register are used to perform the operation.
  - The bit inversion is performed on 16 bits in the A-unit ALU and the result is stored in the destination address or data register.

Bitwise AND & operator

| no: Syntax: | ‖: | sz: | cl: | pp: |
|---|---|---|---|---|
| 1: dst = dst & src | y | 2 | 1 | X |
| 2: dst = src & k8 | y | 3 | 1 | X |
| 3: dst = src & k16 | n | 4 | 1 | X |
| 4: dst = src & Smem | n | 3 | 1 | X |
| 5: ACy = ACy & (ACx <<< SHIFTW) | y | 3 | 1 | X |
| 6: ACy = ACx & (k16 <<< #16) | n | 4 | 1 | X |
| 7: ACy = ACx & (k16 <<< SHFT) | n | 4 | 1 | X |
| 8: Smem = Smem & k16 | n | 4 | 2 | X |

Operands:

ACx, ACy : Accumulator AC[0..3].
src, dst : Accumulator AC[0..3]
or address register AR[0..7]
or data register DR[0..3].
Smem : Word single data memory access (16-bit data access).
kx : Unsigned constant coded on x bits.
SHFT : [0..15] immediate shift value.
SHIFTW : [−32..+31] immediate shift value.

Status bit :

Affected by : M40, LEAD

Description :

These instructions perform a bit wise AND operation :

1 - In the D-unit ALU, if the destination operand is an accumulator register :
  - Input operands are zero extended to 40 bit.
    Note that, if an address or data register is source operand of the instruction, the 16 lsb of the address or data register are zero extended.
  - Instructions 05, 06 and 07 have an operand requiring to be shifted by an immediate value.
    - This shift operation is identical to the logical shift instructions ; however the Carry status bit is not impacted by the logical shift operation.
    - The D-unit shifter is only used for instructions having a shift quantity operand other than the immediate 16 bit shift to the msb's : i.e. instructions 05 and 08.
  - The operation is performed on 40 bits in the D-unit ALU.

2 - In the A-unit ALU, if the destination operand is an address or data register :
  - If an accumulator is source operand of the instruction, the 16 lsb of the register are used to perform the operation.
  - The operation is performed on 16 bits in the A-unit ALU.

TABLE 123-continued

3 - In the A-unit ALU, if the destination operand is the memory.
- The operation is performed on 16 bits in the A-unit ALU.
- The result is stored in memory.

Compatibility with C54x devices (LEAD = 1) :

When LEAD is 1, for instruction 05, the intermediary logical shift is performed as if M40 is locally set to 1. The 8 upper bits of the 40-bit intermediary result are not cleared.

Bitwise OR | operator

| no: | Syntax: | \|\|: | sz: | cl: | pp: |
|---|---|---|---|---|---|
| 1: | dst = dst \| src | y | 2 | 1 | X |
| 2: | dst = src \| k8 | y | 3 | 1 | X |
| 3: | dst = src \| k16 | n | 4 | 1 | X |
| 4: | dst = src \| Smem | n | 3 | 1 | X |
| 5: | ACy = ACy \| (ACx <<< SHIFTW) | y | 3 | 1 | X |
| 6: | ACy = ACx \| (k16 <<< #16) | n | 4 | 1 | X |
| 7: | ACy = ACx \| (k16 <<< SHFT) | n | 4 | 1 | X |
| 8: | Smem = Smem \| k16 | n | 4 | 2 | X |

Operands:

ACx, ACy : Accumulator AC[0..3].
src, dst : Accumulator AC[0..3]
or address register AR[0..7]
or data register DR[0..3].
Smem : Word single data memory access (16-bit data access).
kx : Unsigned constant coded on x bits.
SHFT : [0..15] immediate shift value.
SHIFTW : [−32..+31] immediate shift value.

Status bit :

Affected by : M40, LEAD

Description :

These instructions perform a bit wise OR operation :
1 - In the D-unit ALU, if the destination operand is an accumulator register :
The operation flow is identical to the AND instruction.
Note that :
Instructions 05, 06 and 07 have an operand requiring to be shifted by an immediate value.
- This shift operation is identical to the logical shift instructions ; however the Carry status bit is not impacted by the logical shift operation.
- The D-unit shifter is only used for instructions having a shift quantity operand other than the immediate 16 bit shift to the msb's : i.e. instructions 05 and 07.
2 - In the A-unit ALU, if the destination operand is an address or data register :
The operation flow is identical to the AND instruction.
3 - In the A-unit ALU, if the destination operand is the memory.
The operation flow is identical to the AND instruction.

Compatibility with C54x devices (LEAD = 1) :

When LEAD is 1, for instruction 05, the intermediary logical shift is performed as if M40 is locally set to 1. The 8 upper bits of the 40-bit intermediary result are not cleared.

Bitwise XOR ^ operator

| no: | Syntax: | \|\|: | sz: | cl: | pp: |
|---|---|---|---|---|---|
| 1: | dst = dst ^ src | y | 2 | 1 | X |
| 2: | dst = src ^ k8 | y | 3 | 1 | X |
| 3: | dst = src ^ k16 | n | 4 | 1 | X |
| 4: | dst = src ^ Smem | n | 3 | 1 | X |
| 5: | ACy = ACy ^ (ACx <<< SHIFTW) | y | 3 | 1 | X |
| 6: | ACy = ACx ^ (k16 <<< #16) | n | 4 | 1 | X |
| 7: | ACy = ACx ^ (k16 <<< SHFT) | n | 4 | 1 | X |
| 8: | Smem = Smem ^ k16 | n | 4 | 2 | X |

Operands:

ACx, ACy : Accumulator AC[0..3].
src, dst : Accumulator AC[0..3]
or address register AR[0..7]
or data register DR[0..3].
Smem : Word single data memory access (16-bit data access).
kx : Unsigned constant coded on x bits.
SHFT : [0..15] immediate shift value.
SHIFTW : [−32..+31] immediate shift value.

TABLE 123-continued

Status bit :

Affected by : M40, LEAD

Description :

These instructions perform a bit wise XOR operation :

1 - In the D-unit ALU, if the destination operand is an accumulator register :
The operation flow is identical to the AND instruction.
Note that :
Instructions 05, 06 and 07 have an operand requiring to be shifted by an immediate value.
 - This shift operation is identical to the logical shift instructions ; however the Carry status bit is not impacted by the logical shift operation.
 - The D-unit shifter is only used for instructions having a shift quantity operand other than the immediate 16 bit shift to the msb's : i.e. instructions 05 and 07.

2 - In the A-unit ALU, if the destination operand is an address or data register :
The operation flow is identical to the AND instruction.

3 - In the A-unit ALU, if the destination operand is the memory.
The operation flow is identical to the AND instruction.

Compatibility with C54x devices (LEAD = 1) :

When LEAD is 1, for instruction 05, the intermediary logical shifts are performed as if M40 is locally set to 1. The 8 upper bits of the 40-bit intermediary result are not cleared.

Bit Field Counting count()

| no: Syntax: | ‖: | sz: | cl: | pp: |
|---|---|---|---|---|
| 1: DRx = count(ACx,ACy,TCx) | y | 3 | 1 | X |

Operands:

ACx, ACy : Accumulator AC[0..3].
DRx : Data register DR[0..3].
TCx : Test control flag 1 or 2

Status bit :

Affects : TCx

Description :

This instruction performs bit field manipulation in the D-unit Shifter. The result of the operation is stored in the selected DRx data register. The A-unit ALU is used to make the move operation.
ACx accumulator is ANDed with ACy accumulator. The number of bit set to '1' in the intermediary result is evaluated and stored in the selected DRx data register.
If the number of bit is even, the selected TCx status bit is set to 0.
If the number of bit is odd, the selected TCx status bit is set to 1.

Rotate Left / Right \\ and , operator

| no: Syntax: | ‖: | sz: | cl: | pp: |
|---|---|---|---|---|
| 1: dst = TCw \\ src \\ TCz | y | 3 | 1 | X |
| 2: dst = TCz // src // TCw | y | 3 | 1 | X |

Operands:

src, dst : Accumulator AC[0..3]
or address register AR[0..7]
or data register DR[0..3].

Status bit :

Affected by : M40, Carry, TC2
Affects : Carry, TC2

Description :

These instructions perform a bit wise Rotation to the lsb's (instruction 01) or to the msb's (instruction 02). Both TC2 and or Carry status bits can be used in order to shift in one bit (TCw) or to store the shifted out bit (TCz).
The operation is performed :

1 - In the D-unit Shifter, if the destination operand is an accumulator register :
 - If an address or data register is source operand of the instruction, the 16 lsb of the register are zero extended to 40 bit.
 - The operation is performed on 40 bits in the D-unit Shifter.
   - When rotating to the lsb's :
     - If M40 is 0, the shifted in bit is inserted at bit position 31.
     - If M40 is 1, the shifted in bit is inserted at bit position 39.
     - The shifted out bit is extracted at bit position 0.
   - When rotating to the msb's :
     - The shifted in bit is inserted at bit position 0.

TABLE 123-continued

- If M40 is 0, the shifted out bit is extracted at bit position 31.
- If M40 is 1, the shifted out bit is extracted at bit position 39.
- When M40 is 0, the guard bits of the destination accumulator are cleared.

2 - In the A-unit ALU, if the destination operand is an address or data register :
- If an accumulator is source operand of the instruction, the 16 lsb of the register are used for the operation.
- The operation is performed on 16 bits in the A-unit ALU.
  - When rotating to the lsb's :
    - The shifted in bit is inserted at bit position 15.
    - The shifted out bit is extracted at bit position 0.
  - When rotating to the msb's :
    - The shifted in bit is inserted at bit position 0.
    - The shifted out bit is extracted at bit position 15.

Compatibility with C54x devices (LEAD = 1) :

When these instructions are executed with M40 set to 0, compatibility is ensured.

Logical Shift >>> / <<< operator

| no: | Syntax: | ‖: | sz: | cl: | pp: |
|---|---|---|---|---|---|
| 1: | dst = dst <<< #1 | y | 2 | 1 | X |
| 2: | dst = dst >>> #1 | y | 2 | 1 | X |
| 3: | ACy = ACx <<< DRx | y | 2 | 1 | X |
| 4: | ACy = ACx <<< SHIFTW | y | 3 | 1 | X |

Operands:

| | | |
|---|---|---|
| ACx, ACy | : | Accumulator AC[0..3]. |
| DRx | : | Data register DR[0..3]. |
| dst | : | Accumulator AC[0..3]<br>or address register AR[0..7]<br>or data register DR[0..3]. |
| SHIFTW | : | [−32..+31] immediate shift value. |

Status bit :

| | | |
|---|---|---|
| Affected by | : | M40, LEAD |
| Affects | : | C |

Description :

These instructions perform an unsigned shift by
- An immediate value (instructions 01, 02 and 04),
- Or by the content of data register DRx (instruction 03).
  In this case, if the 16-bit value contained in DRx is out of [−32..+31] interval, the shift is saturated to −32 or +31 and the shift operation is performed with this value. However, no overflow is reported when such saturation occurs.

Carry status bit always contain the shifted out bit.
The operation is performed :

1 - In the D-unit Shifter, if the destination operand is an accumulator register :
- The operation is performed on 40 bits in the D-unit Shifter.
  - When shifting to the lsb's :
    - If M40 is 0, 0 is inserted at bit position 31.
    - If M40 is 1, 0 is inserted at bit position 39.
    - The shifted out bit is extracted at bit position 0.
  - When shifting to the msb's :
    - 0 is inserted at bit position 0.
    - If M40 is 0, the shifted out bit is extracted at bit position 31.
    - If M40 is 1, the shifted out bit is extracted at bit position 39.
- When M40 is 0, the guard bits of the destination accumulator are cleared.

2 - In the A-unit ALU, if the destination operand is an address or data register :
- The operation is performed on 16 bits in the A-unit ALU.
  - When shifting to the lsb's :
    - 0 is inserted at bit position 15.
    - The shifted out bit is extracted at bit position 0.
  - When shifting to the msb's :
    - 0 is inserted at bit position 0.
    - The shifted out bit is extracted at bit position 15.

Compatibility with C54x devices (LEAD = 1) :

When these instructions are executed with M40 set to 0, compatibility is ensured.
When LEAD status bit is set to 1,
- When the shift quantity is determined by the content of a data register DRx, the 6 lsb's of the data register are used to determine the shift quantity. The 6 lsb's of DRx define a shift quantity within [−32,+31] interval ; when the value is in [−32,−17] interval, a modulo 16 operation transforms the shift quantity to fit within [−16,−1] interval.

TABLE 123-continued

Move Operations

Memory Delay delay()

| no: Syntax: | ‖: | sz: | cl: | pp: |
|---|---|---|---|---|
| 1: delay(Smem) | n | 2 | 1 | X |

Operands:

Smem : Word single data memory access (16-bit data access).

Description :

This instruction copies the content of the data memory location Smem into the next higher address. When the data is copied, the content of the addressed location remains the same. A dedicated datapath is used to make this memory move.
When this instruction is executed, the 2 address register arithmetic unit ARAU X and Y of the A-unit Data Address Generator unit are used to compute the 2 address (Smem) and (Smem+1). Therefore, soft dual memory addressing mode mechanism can not be applied to this instruction.

Address, Data and Accumulator Register Load = operator

| no: Syntax: | ‖: | sz: | cl: | pp: |
|---|---|---|---|---|
| 1: dst = k4 | y | 2 | 1 | X |
| 2: dst = −k4 | y | 2 | 1 | X |
| 3: dst = K16 | n | 4 | 1 | X |
| 4: dst = Smem | n | 2 | 1 | X |
| 5: dst = uns(high_byte(Smem)) | n | 3 | 1 | X |
| 6: dst = uns(low_byte(Smem)) | n | 3 | 1 | X |
| 7: ACx = K16 << #16 | n | 4 | 1 | X |
| 8: ACx = K16 << SHFT | n | 4 | 1 | X |
| 9: ACx = rnd(Smem << DRx ) | n | 3 | 1 | X |
| 10: ACx = low_byte(Smem) << SHIFTW | n | 3 | 1 | X |
| 11: ACx = high_byte(Smem) << SHIFTW | n | 3 | 1 | X |
| 12: ACx = Smem << #16 | n | 2 | 1 | X |
| 13: ACx = uns(Smem) | n | 3 | 1 | X |
| 14: ACx = uns(Smem) << SHIFTW | n | 4 | 1 | X |
| 15: ACx = M40(dbl(Lmem)) | n | 3 | 1 | X |
| 16: pair(HI(ACx)) = Lmem | n | 3 | 1 | X |
| 17: pair(LO(ACx)) = Lmem | n | 3 | 1 | X |
| 18: pair(DAx) = Lmem | n | 3 | 1 | X |

Operands:

| | | |
|---|---|---|
| ACx | : | Accumulator AC[0..3]. |
| DRx | : | Data register DR[0..3]. |
| DAx | : | Address register AR[0..7]<br>or data register DR[0..3]. |
| dst | : | Accumulator AC[0..3]<br>or address register AR[0..7]<br>or data register DR[0..3]. |
| Smem | : | Word single data memory access (16-bit data access). |
| Lmem | : | Long word single data memory access (32-bit data access). |
| kx | : | Unsigned constant coded on x bits. |
| Kx | : | Signed constant coded on x bits. |
| SHFT | : | [0..15] immediate shift value. |
| SHIFTW | : | [−32..+31] immediate shift value. |

Status bit :

Affected by : SXMD, M40, SATD, RDM, LEAD
Affects : ACxOV

Description :

These instructions perform a load :

1 - In one accumulator register (instructions 01, 02, 03, 04, 05, 06, 07, 08, 09, 10, 11, 12, 13, 14 and 15) :
  - Input operands are sign extended to 40 bit according to SXMD.
    note that :
    - If the optional 'uns' keyword applies to the input operand, it is zero extended to 40 bit.
    - For instructions 05, 06, 10 and 11, the high_byte() and low_byte() keywords permit to select the high or low byte of the 16-bit memory operand Smem.
  - Instructions 07, 08, 09, 10, 11, 12 and 14 have an operand requiring to be shifted by an immediate value or by the content of data register DRx.
    - This shift operation is identical to the arithmetical shift instructions.
    - Therefore, an overflow detection, report and saturation is done after the shifting operation.
    - However, the D-unit shifter is only used for instructions having a shift quantity operand other than the immediate 16 bit shift to the msb's : i.e. instructions TABLE 123-continued 08, 09, 10, 11 and 14.
- For instruction 09, If the optional 'rnd' keyword is applied to the instruction, then a rounding is performed in the D-unit shifter. This is done according to RDM status bit :
  - When RDM is 0, the biased rounding to the infinite is performed. 2^15 is added to the 40-bit result of the shift result.
  - When RDM is 1, the unbiased rounding to the nearest is performed. According to the value of the 17 lsb of the 40-bit result of shift result, 2^15 is added as following pseudo C code describes it :

```
step1:    if( 2^15 < bit(15–0) < 2^16)
step2:        add 2^15 to the 40-bit result of the shift
              result.
step3:    else if( bit(15–0) == 2^15)
step4:            if( bit(16) == 1)
step5:                add 2^15 to the 40-bit result of the
                      shift result.
```

- When performing the rounding, an overflow detection is performed :
    - At bit position 31, if M40 is 0.
    - At bit position 39, if M40 is 1.

Destination accumulator overflow bit is updated accordingly.
  - If a rounding has been performed, the 16 lowest bits of the result are cleared.
- Instructions 01, 02, 03, 04, 05, 06, 13 and 15 make a direct load operations in accumulator registers. They use a dedicated path independant of the D-unit ALU, the D-unit shifter and the D-unit MACs.
- Instruction 15 provide the option to locally set M40 status bit to 1 for the execution of the instruction. This is done when the 'M40' keyword is applied to the instruction.

2 - In two consecutive accumulator registers (instructions 16 and 17) :
- For instruction 16, the 16 lowest bit of data memory operand Lmem is loaded in the high part of the destination accumulator ACx just like instruction 12 performs the load of the memory operand Smem in accumulator high parts (including overflow detection, report and saturation).
  And, the 16 highest bit of data memory operand Lmem is loaded in the high part of the destination accumulator AC(x+1) as instruction 12 performs the load of the memory operand Smem in accumulator high parts (including overflow detection, report and saturation).
- For instruction 17, the 16 lowest bit of data memory operand Lmem is loaded in the low part of the destination accumulator ACx as instruction 04 performs the load of the memory operand Smem in accumulator low parts.
  And, the 16 highest bit of data memory operand Lmem is loaded in the low part of the destination accumulator AC(x+1) as instruction 04 performs the load of the memory operand Smem in accumulator low parts.
- These load operations in accumulator registers use a dedicated path independant of the D-unit ALU, the D-unit shifter and the D-unit MACs.
- Note that, valid accumulator designations are AC0 and AC2.

3 - In one address or data register (instructions 01, 02, 03, 04, 05 and 06) :
- Input operands are sign extended to 16 bit and loaded in the destination address or data register.
- Note that :
  - If the optional 'uns' keyword applies to the input operand, it is zero extended to 16 bit.
  - For instructions 05 and 06, the high_byte() / low_byte() keywords permits to select the high / low byte of the 16-bit memory operand Smem.
- These load operations in address or data registers use a dedicated path independant of the A-unit ALU.

4 - In two consecutive address or data registers (instruction 18) :
- The 16 lowest bit of data memory operand Lmem is loaded in the destination address or data register DAx just like instruction 04 performs the load of the memory operand Smem in address or data register.
- And, the 16 highest bit of data memory operand Lmem is loaded in the destination address or data register DA(x+1) as instruction 04 performs the load of the memory operand Smem in address or data register.
- This load operation in address or data registers uses a dedicated path independant of the A-unit ALU.
- Note that, valid address / data register designations are AR0, AR2, AR4, AR6, DR0 and DR2.

Note :
- For instruction 02, the 4 bit constant k4, is zero extended to 16-bit and negated in the I-unit before being prossessed by A-unit or D-unit as a signed K16 constant as for 01 instruction.

Compatibility with C54x devices (LEAD = 1) :

When these instructions are executed with M40 set to 0, compatibility is ensured.
Note that when LEAD is 1,
- Instructions 08, 09, 10, 11 and 14 do not have any overflow detection, report and saturation after the shifting operation (instructions 07, 12 and 16 have one).
- When the shift quantity is determined by the content of a data register DRx, the 6 lsb's of the data register are used to determine the shift quantity. The 6 lsb's of TABLE 123-continued DRx define a shift quantity within [−32,+31] interval ; when the value is in [−32,−17] interval, a modulo 16 operation transforms the shift quantity to fit within [−16,−1] interval.

Specific CPU Register Load = operator

| no: | Syntax: | ‖: | sz: | cl: | pp: |
|---|---|---|---|---|---|
| 1: | MDP05 = P7 | y | 3 | 1 | AD |
| 2: | BK03 = k12 | y | 3 | 1 | AD |
| 3: | BK47 = k12 | y | 3 | 1 | AD |
| 4: | BKC = k12 | y | 3 | 1 | AD |
| 5: | BRC0 = k12 | y | 3 | 1 | AD |
| 6: | BRC1 = k12 | y | 3 | 1 | AD |
| 7: | CSR = k12 | y | 3 | 1 | AD |
| 8: | PDP = P9 | y | 3 | 1 | AD |
| 9: | MDP = P7 | y | 3 | 1 | AD |
| 10: | MDP67 = P7 | y | 3 | 1 | AD |
| 11: | mar(DAx = P16) | n | 4 | 1 | AD |
| 12: | DP = P16 | n | 4 | 1 | AD |
| 13: | CDP = P16 | n | 4 | 1 | AD |
| 14: | BOF01 = P16 | n | 4 | 1 | AD |
| 15: | BOF23 = P16 | n | 4 | 1 | AD |
| 16: | BOF45 = P16 | n | 4 | 1 | AD |
| 17: | BOF67 = P16 | n | 4 | 1 | AD |
| 18: | BOFC = P16 | n | 4 | 1 | AD |
| 19: | SP = P16 | n | 4 | 1 | AD |
| 20: | SSP = P16 | n | 4 | 1 | AD |
| 21: | DP = Smem | n | 3 | 1 | X |
| 22: | CDP = Smem | n | 3 | 1 | X |
| 23: | BOF01 = Smem | n | 3 | 1 | X |
| 24: | BOF23 = Smem | n | 3 | 1 | X |
| 25: | BOF45 = Smem | n | 3 | 1 | X |
| 26: | BOF67 = Smem | n | 3 | 1 | X |
| 27: | BOFC = Smem | n | 3 | 1 | X |
| 28: | SP = Smem | n | 3 | 1 | X |
| 29: | SSP = Smem | n | 3 | 1 | X |
| 30: | TRN0 = Smem | n | 3 | 1 | X |
| 31: | TRN1 = Smem | n | 3 | 1 | X |
| 32: | BK03 = Smem | n | 3 | 1 | X |
| 33: | BKC = Smem | n | 3 | 1 | X |
| 34: | BRC0 = Smem | n | 3 | 1 | X |
| 35: | BRC1 = Smem | n | 3 | 1 | X |
| 36: | CSR = Smem | n | 3 | 1 | X |
| 37: | MDP = Smem | n | 3 | 1 | X |
| 38: | MDP05 = Smem | n | 3 | 1 | X |
| 39: | PDP = Smem | n | 3 | 1 | X |
| 40: | BK47 = Smem | n | 3 | 1 | X |
| 41: | MDP67 = Smem | n | 3 | 1 | X |
| 42: | LCRPC = dbl(Lmem) | n | 3 | 1 | X |

Operands:

| | | |
|---|---|---|
| DAx | : | Address register AR[0..7] or data register DR[0..3]. |
| Smem | : | Word single data memory access (16-bit data access). |
| Lmem | : | Long word single data memory access (32-bit data access). |
| kx | : | Unsigned constant coded on x bits. |
| Kx | : | Signed constant coded on x bits. |
| Px | : | Program or data address label (absolute address coded on x bits). |

Description :

These instructions load within the selected specific CPU register :

- An immediate value,
- A data memory operand.

They use a dedicated datapath independant of the A-unit ALU and the D-unit operators to perform the operation. Input operands are zero extended to the bit-width of the selected register.

The operation is performed :

- In the address phase of the pipeline, if the input operand is a constant.
- In the execute phase of the pipeline, if the input operand is a data memory operand.

In this case, there is a 3 cycle latency between MDP, PDP, DP, SP, SSP, CDP, BOFx, BKx, BRCx, CSR, LCRPC load and their usage in the address phase by the A-unit address generator units or by the P-unit loop control management.

Note that, for instructions 06 and 35, when BRC1 is loaded, the Block Repeat Save register (BRS1) is load with the same value.

TABLE 123-continued

| Specific CPU Register Store | = operator | | | |
|---|---|---|---|---|
| **no: Syntax:** | **‖:** | **sz:** | **cl:** | **pp:** |
| 1: Smem = DP | n | 3 | 1 | X |
| 2: Smem = CDP | n | 3 | 1 | X |
| 3: Smem = BOF01 | n | 3 | 1 | X |
| 4: Smem = BOF23 | n | 3 | 1 | X |
| 5: Smem = BOF45 | n | 3 | 1 | X |
| 6: Smem = BOF67 | n | 3 | 1 | X |
| 7: Smem = BOFC | n | 3 | 1 | X |
| 8: Smem = SP | n | 3 | 1 | X |
| 9: Smem = SSP | n | 3 | 1 | X |
| 10: Smem = TRN0 | n | 3 | 1 | X |
| 11: Smem = TRN1 | n | 3 | 1 | X |
| 12: Smem = BK03 | n | 3 | 1 | X |
| 13: Smem = BKC | n | 3 | 1 | X |
| 14: Smem = BRC0 | n | 3 | 1 | X |
| 15: Smem = BRC1 | n | 3 | 1 | X |
| 16: Smem = CSR | n | 3 | 1 | X |
| 17: Smem = MDP | n | 3 | 1 | X |
| 18: Smem = MDP05 | n | 3 | 1 | X |
| 19: Smem = PDP | n | 3 | 1 | X |
| 20: Smem = BK47 | n | 3 | 1 | X |
| 21: Smem = MDP67 | n | 3 | 1 | X |
| 22: dbl(Lmem) = LCRPC | n | 3 | 1 | X |

Operands:

| | | |
|---|---|---|
| Smem | : | Word single data memory access (16-bit data access). |
| Lmem | : | Long word single data memory access (32-bit data access). |
| Kx | : | Signed constant coded on x bits. |
| Px | : | Program or data address label (absolute address coded on x bits). |

Description :

These instructions stores the selected specific CPU register in the specified data memory location.
Note that, the BRCx register is decremented in the address phase of the last instruction of the loop. Instructions 15 and 14 have a 3 cycle latency requirement versus the last instruction of the loop.

| Move to Memory / Memory Initialization | = operator | | | |
|---|---|---|---|---|
| **no: Syntax:** | **‖:** | **sz:** | **cl:** | **pp:** |
| 1: Smem = coeff | n | 3 | 1 | X |
| 2: coeff = Smem | n | 3 | 1 | X |
| 3: Smem = K8 | n | 3 | 1 | X |
| 4: Smem = K16 | n | 4 | 1 | X |
| 5: Lmem = dbl(coeff) | n | 3 | 1 | X |
| 6: dbl(coeff) = Lmem | n | 3 | 1 | X |
| 7: dbl(Ymem) = dbl(Xmem) | n | 3 | 1 | X |
| 8: Ymem = Xmem | n | 3 | 1 | X |

Operands:

| | | |
|---|---|---|
| Smem | : | Word single data memory access (16-bit data access). |
| Lmem | : | Long word single data memory access (32-bit data access). |
| Xmem, Ymem | : | Indirect dual data memory access (two data accesses). |
| coeff | : | Coefficient memory access (16-bit or 32-bit data access). |
| Kx | : | Signed constant coded on x bits. |

Description :

These instruction initialize data memory locations. They use a dedicated datapath to perform the operation.
Instructions 03 and 04 initialize the data memory location with an immediate value. For instruction 03, the immediate value is always signed extended to 16-bit before being stored in memory.
Instructions 01, 02, 05, 06, 07 and 08 initialize the data memory location with a data memory operand. The data memory locations can be accessed via :

- The dual addressing mode mechanism (instructions 07 and 08).
- The coefficient addressing mode mechanism (instructions 01, 02, 05 and 06).

| Pop Top of Stack | pop() | | | |
|---|---|---|---|---|
| **no: Syntax:** | **‖:** | **sz:** | **cl:** | **pp:** |
| 1: dst1,dst2 = pop() | y | 2 | 1 | X |
| 2: dst = pop() | y | 2 | 1 | X |
| 3: dst,Smem = pop() | n | 3 | 1 | X |

TABLE 123-continued

| | | | | |
|---|---|---|---|---|
| 4: ACx = dbl(pop()) | y | 2 | 1 | X |
| 5: Smem = pop() | n | 2 | 1 | X |
| 6: dbl(Lmem) = pop() | n | 2 | 1 | X |

Operands:

| | | |
|---|---|---|
| ACx | : | Accumulator AC[0..3]. |
| dst | : | Accumulator AC[0..3]<br>or address register AR[0..7]<br>or data register DR[0..3]. |
| Smem | : | Word single data memory access (16-bit data access). |
| Lmem | : | Long word single data memory access (32-bit data access). |

Description :

These instructions move the data memory location addressed by SP to :
- An accumulator, address or data register (instructions 01, 02, 03 and 04),
- A data memory location ( instructions 03, 05 and 06).

Instruction 01 performs following operation flow :
- The content of the 16-bit data memory location pointed by SP is moved to the destination register dst1. And, the content of the 16-bit data memory location pointed by (SP+1) is moved to the destination register dst2.
  Note that :
  When the destination register dst1 (or dst2) is an accumulator register, the content of the 16-bit data memory operand is moved to the destination accumulator dst1 low part (respectively dst2 low part). The 24 higher bits of the accumulator dst1 (respectively dst2) are not modified by this instruction.
- SP is incremented by 2.

Instruction 02 performs following operation flow :
- The content of the 16-bit data memory location pointed by SP is moved to the destination register dst.
  Note that :
  When the destination register dst is an accumulator register, the content of the 16-bit data memory operand is moved to the destination accumulator dst low part. The 24 higher bits of the accumulator dst are not modified by this instruction.
- SP is incremented by 1.

Instruction 03 performs following operation flow :
- The content of the 16-bit data memory location pointed by SP is moved to the destination register dst. And, the content of the 16-bit data memory location pointed by (SP+1) is moved to the data memory location Smem.
  Note that :
  When the destination register dst is an accumulator register, the content of the 16-bit data memory operand is moved to the destination accumulator dst low part. The 24 higher bits of the accumulator dst are not modified by this instruction.
- SP is incremented by 2.

Instruction 04 performs following operation flow :
- The content of the 16-bit data memory location pointed by SP is moved to the destination accumulator register high part ACx(31–16). And, the content of the 16-bit data memory location pointed by (SP+1) is moved to the destination accumulator register low part ACx(15–0).
  Note that :
  The 8 Guard bits of the destination accumulator ACx are not modified by this instruction.
- SP is incremented by 2.

Instruction 05 performs following operation flow :
- The content of the 16-bit data memory location pointed by SP is moved to the data memory location Smem.
- SP is incremented by 1.

Instructions 06 performs following operation flow :
- The content of the 16-bit data memory location pointed by SP is moved to the 16 highest bits of the data memory location Lmem. And, the content of the 16-bit data memory location pointed by (SP+1) is moved to the 16 lowest bits of the data memory location Lmem.
  Note that :
  When Lmem data memory location is at an even address, the 2 16-bit values popped from the stack are stored at Lmem memory location in the same order. When Lmem data memory location is at an odd address, the 2 16-bit values popped from the stack are stored at Lmem memory location in the reverse order (see dbl(Lmem) addressing mode).
- SP is incremented by 2.

The increment operations performed on SP is done by the A-unit address generator dedicated to the stack addressing management.

Push Onto Stack push()

| no: Syntax: | \|\|: | sz: | cl: | pp: |
|---|---|---|---|---|
| 1: push(src1,src2) | y | 2 | 1 | X |
| 2: push(src) | y | 2 | 1 | X |
| 3: push(src,Smem) | n | 3 | 1 | X |
| 4: dbl(push(ACx)) | y | 2 | 1 | X |

TABLE 123-continued

| | | | | |
|---|---|---|---|---|
| 5: push(Smem) | n | 2 | 1 | X |
| 6: push(dbl(Lmem)) | n | 2 | 1 | X |

Operands:

| | | |
|---|---|---|
| ACx | : | Accumulator AC[0..3]. |
| src | : | Accumulator AC[0..3]<br>or address register AR[0..7]<br>or data register DR[0..3]. |
| Smem | : | Word single data memory access (16-bit data access). |
| Lmem | : | Long word single data memory access (32-bit data access). |

Description :

These instructions move one or two operands to the data memory location addressed by SP. the operands may be :
- An accumulator, address or data register (instructions 01, 02, 03 and 04),
- A data memory location ( instructions 03, 05 and 06).

Instruction 01 performs following operation flow :
- SP is decremented by 2.
- The content of the source register src1 is moved to the 16-bit data memory location pointed by SP. And, the content of the source register src2 is moved to the 16-bit data memory location pointed by (SP+1).
  Note that :
  When the source register src1 (or src2) is an accumulator register, the 16-bit low part of the source accumulator src1 (respectively src2) is moved to the the data memory operand.

Instruction 02 performs following operation flow :
- SP is decremented by 1.
- The content of the source register src is moved to the 16-bit data memory location pointed by SP.
  Note that :
  When the source register src is an accumulator register, the 16-bit low part of the source accumulator src is moved to the data memory operand.

Instruction 03 performs following operation flow :
- SP is decremented by 2.
- The content of the source register src is moved to the 16-bit data memory location pointed by SP. And, the content of the 16-bit data memory operand Smem is moved to the 16-bit data memory location pointed by (SP+1)
  Note that :
  When the source register src is an accumulator register, the 16-bit low part of the source accumulator src is moved to the data memory operand.

Instruction 04 performs following operation flow :
- SP is decremented by 2.
- The content of the source accumulator high part ACx(31–16) is moved to the 16-bit data memory location pointed by SP. And, the content of the source accumulator low part ACx(15–0) is moved to the data memory location pointed by (SP+1).

Instruction 05 performs following operation flow :
- SP is decremented by 1.
- The content of the 16-bit data memory operand Smem is moved to the 16-bit data memory location pointed by SP.

Instructions 06 performs following operation flow :
- SP is decremented by 2.
- The 16 highest bits of the data memory operand Lmem are moved to the 16-bit data memory location pointed by SP. And, the 16 lowest bits of the data memory operand Lmem are moved to the 16-bit data memory location pointed by (SP+1)
  Note that :
  When Lmem data memory location is at an even address, the 2 16-bit values pushed onto the stack are stored in the same order as they are in Lmem memory location.
  When Lmem data memory location is at an odd address, the 2 16-bit values pushed onto the stack are stored in the reverse order as they are in Lmem memory location. (see dbl(Lmem) addressing mode).

The decrement operations performed on SP is done by the A-unit address generator dedicated to the stack addressing management.

Address, Data and Accumulator Register Store = operator

| no: Syntax: | \|\|: | sz: | cl: | pp: |
|---|---|---|---|---|
| 1: Smem = src | n | 2 | 1 | X |
| 2: high_byte(Smem) = src | n | 3 | 1 | X |
| 3: low_byte(Smem) = src | n | 3 | 1 | X |
| 4: Smem = HI(ACx) | n | 2 | 1 | X |
| 5: Smem = HI(rnd(ACx)) | n | 3 | 1 | X |
| 6: Smem = LO(ACx << DRx) | n | 3 | 1 | X |
| 7: Smem = HI(rnd(ACx << DRx)) | n | 3 | 1 | X |
| 8: Smem = LO(ACx << SHIFTW) | n | 3 | 1 | X |
| 9: Smem = HI(ACx << SHIFTW) | n | 3 | 1 | X |
| 10: Smem = HI(rnd(ACx << SHIFTW)) | n | 4 | 1 | X |
| 11: Smem = HI(saturate(uns(rnd(ACx)))) | n | 3 | 1 | X |
| 12: Smem = HI(saturate(uns(rnd(ACx << DRx)))) | n | 3 | 1 | X |

TABLE 123-continued

| | | | | |
|---|---|---|---|---|
| 13: Smem = HI(saturate(uns(rnd(ACx << SHIFTW)))) | n | 4 | 1 | X |
| 14: dbl(Lmem) = ACx | n | 3 | 1 | X |
| 15: dbl(Lmem) = saturate(uns(ACx)) | n | 3 | 1 | X |
| 16: Lmem = pair(HI(ACx)) | n | 3 | 1 | X |
| 17: Lmem = pair(LO(ACx)) | n | 3 | 1 | X |
| 18: Lmem = pair(DAx) | n | 3 | 1 | X |

Operands:

| | | |
|---|---|---|
| ACx | : | Accumulator AC[0..3]. |
| DRx | : | Data register DR[0..3]. |
| DAx | : | Address register AR[0..7] or data register DR[0..3]. |
| src | : | Accumulator AC[0..3] or address register AR[0..7] or data register DR[0..3]. |
| Smem | : | Word single data memory access (16-bit data access). |
| Lmem | : | Long word single data memory access (32-bit data access). |
| SHIFTW | : | [−32..+31] immediate shift value. |

Status bit :

Affected by : SXMD, RDM, LEAD

Description :

These instructions perform a store :

1 - Of one accumulator register (instructions 01, 02, 03, 04, 05, 06, 07, 08, 09, 10, 11, 12, 13, 14 and 15) :

- Instructions 05, 06, 07, 08, 09, 10, 11, 12, 13 and 15) perform a store operation through the D-unit shifter.
  - step 1: For instructions 06, 07, 08, 09, 10, 12 and 13), the source accumulator is shifted by an immediate value or the content of data register DRx. In this last case, if the 16-bit value contained in DRx is out of [−32..+31] range, the shift is saturated to −32 or +31, and the shift operation is performed with this value.
    - When shifting to the msb's, the sign position of the input operand is compared to the shift quantity.
      - If 'uns()' keyword is applied to the instruction, this comparison is performed versus bit 32 of the shifted operand which is considered unsigned.
      - If not, this comparison is performed versus bit 31 of the shifted operand which is considered signed (the sign is defined by its bit 39 and SXMD).
      - An overflow is generated accordingly.
    - The shift operation is performed on 40 bits in the D-unit Shifter.
      - When shifting to the lsb's,
        - If 'uns' keyword is applied to the instruction, 0 is extended at bit position 39.
        - If not, bit 39 is extended according to SXMD.
      - When shifting to the msb's, 0 is inserted at bit position 0.
  - step 2: If the optional 'rnd' keyword is applied to the instruction, then a rounding is performed according to RDM status bit :
    - When RDM is 0, the biased rounding to the infinite is performed. 2^15 is added to the 40-bit result of the shift result.
    - When RDM is 1, the unbiased rounding to the nearest is performed. According to the value of the 17 lsb of the 40-bit result of shift result, 2^15 is added as following pseudo C code describes it :

```
step1:  if( 2^15 < bit(15-0) < 2^16)
step2:          add 2^15 to the 40-bit result of the shift result.
step3:  else if( bit(15-0) == 2^15)
step4:                  if( bit(16) == 1)
step5:                          add 2^15 to the 40-bit result of the shift result.
```

When performing the rounding, an overflow detection is performed :
      - At bit position 32, if 'uns' keyword is applied to the instruction.
      - At bit position 31, if not.

An overflow is generated accordingly.
  - step 3: If a shift or rounding overflow is detected, and if 'saturate()' keyword is applied to the instruction, the 40-bit output of the operation is saturated.
    - If 'uns()' keyword is applied to the instruction, saturation value is 00.FFFF.FFFFh.
    - If not, saturation values are 00.7FFF.FFFFh or FF.8000.0000h.
  - step 4: When HI() keyword is used, the bit 31 to 16 of the 40-bit result are stored to the memory.
    When LO() keyword is used, the bit 15 to 0 of the 40-bit result are stored to the memory.
    For instruction 15, the bit 31 to 0 of the 40 bit result are stored to the memory.
- Instructions 01, 02, 03, 04 and 14, perform a store operation through a dedicated store path. This datapath is independant of the D-unit ALU, the D-unit shifter and the D-unit MACs.
  - For instruction 01, accumulator source low part ACx(15–0) is stored to TABLE 123-continued the memory.
- For instruction 02, accumulator source low part ACx(8–0) is stored to the higher byte of the 16-bit data memory operand Smem.
- For instruction 03, accumulator source low part ACx(8–0) is stored to the lower byte of the 16-bit data memory operand Smem.
- For instruction 04, accumulator source high part ACx(31–16) is stored to the memory.
- For instruction 14, accumulator source ACx(31–0) is stored to the memory.

2 - Of two consecutive accumulator registers (instructions 16 and 17) :
- For instruction 16, the high part of the source accumulator ACx are stored in the 16 lowest bits of data memory operand Lmem just like instruction 04 stores accumulator high parts to the memory operand Smem.
  And, the high part of the source accumulator AC(x+1) is stored in the 16 highest bits of data memory operand Lmem just like instruction 04 stores accumulator high parts to the memory operand Smem
- For instruction 17, the low part of the source accumulator ACx is stored in the 16 lowest bits of data memory operand Lmem just like instruction 01 stores accumulator low parts to the memory operand Smem.
  And, the low part of the destination accumulator AC(x+1) is stored to the 16 highest bit of data memory operand Lmem just like instruction 01 stores accumulator low parts to the memory operand Smem.
- These store operations of accumulator registers use a dedicated store path independant of the D-unit ALU, the D-unit shifter and the D-unit MACs.
- Note that, valid accumulator designations are AC0 and AC2.

3 - Of one address or data register (instructions 01, 02 and 03) :
- For instruction 01, address or data register src is stored to the memory.
- For instruction 02, address or data register src(8–0) is stored to the higher byte of the 16-bit data memory operand Smem.
- For instruction 03, address or data register src(8–0) is stored to the lower byte of the 16-bit data memory operand Smem.
- These store operations of address or data registers use a dedicated store path independant of the A-unit ALU.

4 - Of two consecutive address or data registers (instruction 18) :
- The destination address or data register DAx is stored to the 16 lowest bits of data memory operand Lmem just like instruction 01 stores the address or data registers to the memory operand Smem.
- And, the destination address or data register DA(x+1) is stored in the 16 highest bits of data memory operand Lmem just like instruction 01 stores the address or data registers to the memory operand Smem.
- These store operations of address or data registers use a dedicated store path independant of the A-unit ALU.
- Note that, valid address or data register designations are AR0, AR2, AR4, AR6, DR0 and DR2.

Compatibility with C54x devices (LEAD = 1) :

When LEAD status bit is set to 1,
- Overflow detection at the output of the shifter consists in checking if the sign of the input operand is identical to the most significant bits of the 40-bit result of the shift and round operation.
  - If 'uns' is applied to the instruction, then bit 39 to bit 32 of the result are compared to 0.
  - If not, then bit 39 to bit 31 of the result are compared to bit 39 of the input operand and SXMD.
- When the shift quantity is determined by the content of a data register DRx, the 6 lsb's of the data register are used to determine the shift quantity. The 6 lsb's of DRx define a shift quantity within [−32,+31] interval ; when the value is in [−32,−17] interval, a modulo 16 operation transforms the shift quantity to fit within [−16,−1] interval.

Register Content Swap swap()

| no: | Syntax: | \|\|: | sz: | cl: | pp: |
|---|---|---|---|---|---|
| 1: | swap(scode) | y | 2 | 1 | AD/X |

Description :

This instruction performs parallel moves between accumulators, address or data registers. These operations are performed in a dedicated data-path independant of the A-unit operators and D-unit operators.
The allowed swap code (scode) syntax are :
1 - swap(AR4,DR0)
2 - swap(AR5,DR1)
3 - swap(AR6,DR2)
4 - swap(AR7,DR3)
5 - swap(DR0,DR2)
6 - swap(DR1,DR3)
7 - swap(AR0,AR2)

TABLE 123-continued

8 - swap(AR1,AR3)
9 - swap(AR0,AR1)
10- swap(AC0,AC2)
11- swap(AC1,AC3)
This set of instructions permits to move :
The content of the first accumulator, address or data register (src) in the second accumulator, address or data register (dst).
And reciprocally to move :
The content of dst register in src register.
These instructions are one cycle.
12- swap(pair(AR4),pair(DR0))
13- swap(pair(AR6),pair(DR2))
14- swap(pair(DR0),pair(DR2))
15- swap(pair(AR0),pair(AR2))
16- swap(pair(AC0),pair(AC2))
This set of instructions performs in parallel 2 swap instructions.
- Instruction 12 performs instruction 1 and 2 in one cycle.
- Instruction 13 performs instruction 3 and 4 in one cycle.
- Instruction 14 performs instruction 5 and 6 in one cycle.
- Instruction 15 performs instruction 7 and 8 in one cycle.
- Instruction 16 performs instruction 10 and 11 in one cycle.

17 - swap(block(AR4).block(DR0))
This instructions performs in parallel 4 swap instructions.
Instruction 1, 2, 3 and 4 are executed in one cycle.

Note that :
- Address or data register swapping is performed in the address phase of the pipeline (instructions 1 to 9, instructions 12 to 15 and instruction 17).
- Accumulator swapping is performed in the execute phase of the pipeline (instructions 10, 11 and 16).

Specific CPU Register Move = operator

| no: | Syntax: | ‖: | sz: | cl: | pp: |
|---|---|---|---|---|---|
| 1: | DAx = CDP | y | 2 | 1 | X |
| 2: | DAx = BRC0 | y | 2 | 1 | X |
| 3: | DAx = BRC1 | y | 2 | 1 | X |
| 4: | DAx = RPTC | y | 2 | 1 | X |
| 5: | CDP = DAx | y | 2 | 1 | X |
| 6: | CSR = DAx | y | 2 | 1 | X |
| 7: | BRC1 = DAx | y | 2 | 1 | X |
| 8: | BRC0 = DAx | y | 2 | 1 | X |
| 9: | DAx = SP | y | 2 | 1 | X |
| 10: | DAx = SSP | y | 2 | 1 | X |
| 11: | SP = DAx | y | 2 | 1 | X |
| 12: | SSP = DAx | y | 2 | 1 | X |

Operands:

DAx : Address register AR[0..7] or data register DR[0..3].

Description :

These instructions performs a move between the selected CPU register and the selected address or data DAx register. All the move operations are performed in the execute phase of the pipeline and the A-unit ALU is used to transfer the content of the registers.

1 - For Instructions 01, 05, 06, 07, 08, 09, 10, 11 and 12, there is a 3 cycle latency between SP, SSP, CDP, DAx, CSR and BRCx update and their usage in the address phase by the A-unit address generator units or by the P-unit loop control management. For instruction 07, when BRC1 is loaded with DAx content, the Block Repeat Save register (BRS1) is loaded with the same value.

2 - Instructions 02 and 03 read the selected Block Repeat Counter (BRCx) register, to store their content in the selected DAx register. Since BRCx register is decremented in the address phase of the last instruction of a loop, these move instructions have a 3 cycle latency requirement versus the last instruction of a loop.

Address, Data and Accumulator Register Move = operator

| no: | Syntax: | ‖: | sz: | cl: | pp: |
|---|---|---|---|---|---|
| 1: | dst = src | y | 2 | 1 | X |
| 2: | DAx = HI(ACx) | y | 2 | 1 | X |
| 3: | HI(ACx) = DAx | y | 2 | 1 | X |

Operands:

ACx : Accumulator AC[0..3].
DAx : Address register AR[0..7] or data register DR[0..3].

TABLE 123-continued src, dst : Accumulator AC[0..3]
or address register AR[0..7]
or data register DR[0..3].

Status bit :

Affected by : SXMD, M40, SATD
Affects : ACxOV

Description :

These instructions perform a move operation :

1 - In the D-unit ALU, if the destination register is an accumulator register :
- If the source register is an address or data register, the 16 low bits of the source register are sign extended to 40 bit according to SXMD.
- For instruction 03, the source operand is shifted by 16 bit to the msbs. This shifting operation does not use the D-unit shifter.
- During the 40-bit move operation performed in the D-unit ALU, an overflow detection is performed :
  - When M40 is 0, overflow is detected at bit position 31,
  - When M40 is 1, overflow is detected at bit position 39.
- If an overflow is detected, the destination accumulator overflow status bit is set.
- If SATD is 1, when an overflow is detected, the destination register is saturated.
  - When M40 is 0, saturation values are 00.7FFF.FFFFh or FF.8000.0000h
  - When M40 is 1, saturation values are 7F.FFFF.FFFFh or 80.0000.0000h 2 - In the A-unit ALU, if the destination register is an address or data register :
- For instruction 01, if an accumulator is source operand of the instruction, the 16 lsb of the register are used to perform the operation.
  For instruction 02, the 16 msb of the accumulator source are used to perform the operation.
- The 16-bit move operation is performed in the A-unit ALU.

Compatibility with C54x devices (LEAD = 1) :

When these instructions are executed with M40 set to 0, compatibility is ensured.

Miscellaneous Operations

Co-Processor Hardware Invocation copr()

| no: Syntax: | ‖: | sz: | cl: | pp: |
|---|---|---|---|---|
| 1: copr() | n | 1 | 1 | D |

Description :

This instruction is an instruction qualifier. It can be paralleled with custom-defined instructions. It permits to :
- Disable the generic operators.
- Enable the custom operators.
- Keep the same instruction operands that are allowed for Dual Mac instructions. (memory operands -register operands)
- Export the instruction to the hardware accelerator to define the operation to be executed.

Idle Until Interrupt idle

| no: Syntax: | ‖: | sz: | cl: | pp: |
|---|---|---|---|---|
| 1: idle | y | 2 | ? | D |

Status bit :

Affected by : INTM ?

Description :

This instruction needs to specified more precisely.
This instruction forces the program to wait until an interrupt or a reset occurs.
The power down mode in which the processor goes to, depends on a configuration register accessible via the peripheral access mechanism.

Linear / Circular Addressing circular() / linear()

| no: Syntax: | ‖: | sz: | cl: | pp: |
|---|---|---|---|---|
| 1: linear() | n | 1 | 1 | AD |
| 2: circular() | n | 1 | 1 | AD |

Description :

This instruction is an instruction qualifier. It can be paralleled with any instruction making an indirect Smem, Xmem, Ymem, Lmem, Baddr, coeff addressing.
- It can not be executed in parallel with other type of instructions.
- It can not be executed alone.

TABLE 123-continued

When instruction 01 is used in parallel of such instruction, all modification of ARx and CDP pointer registers used in the indirect addressing mode are done linearly (as if ST2 register bit 0 to 8 were cleared to 0).
When instruction 02 is used in parallel of such instruction, all modification of ARx and CDP pointer registers used in the indirect addressing mode are done circularly (as if ST2 register bit 0 to 8 were set to 1).

Memory Map Register Access mmap()

| no: Syntax: | \|\|: | sz: | cl: | pp: |
|---|---|---|---|---|
| 1: mmap() | n | 1 | 1 | D |

Description :

This instruction is an instruction qualifier. It can be paralleled with any instruction making a Smem or Lmem direct memory access (dma).
- It can not be executed in parallel with other type of instructions.
- It can not be executed alone.

This instruction permits to locally prevent the dma access from being relative to SP or DP. It forces the dma access to be relative to the Memory Mapped Register (MMR) data page start address which is 00.0000H.
Note : The MMRs are mapped as 16-bit data entities between address 0H and 5FH.
WARNING : The scratch pad memory which is mapped between addresses 60H and 7FH of each main data pages of 64Kword, can NOT be accessed through this mechanism.

No Operation nop

| no: Syntax: | \|\|: | sz: | cl: | pp: |
|---|---|---|---|---|
| 1: nop | y | 1 | 1 | D |
| 2: nop_16 | y | 2 | 1 | D |

Description :

Instruction 01 increments the program counter register (PC) by 1 byte.
Instruction 02 increments the program counter register (PC) by 2 bytes.

Peripheral Port Register Access readport() / writeport()

| no: Syntax: | \|\|: | sz: | cl: | pp: |
|---|---|---|---|---|
| 1: readport() | n | 1 | 1 | D |
| 2: writeport() | n | 1 | 1 | D |

Description :

These instructions are instruction qualifiers :
- Instruction 01 can be paralleled with any instruction making a Word single data memory access Smem or Xmem used to read a memory operand.
- Instruction 02 can be paralleled with all instruction making a Word single data memory access Smem or Ymem used to write a memory operand. Following type of instructions are forbidden :
  - Instructions storing to memory a shifted accumulator (see accumulator store instructions no 05, 06, 07, 08, 09, 10, 11, 12, 13 and 15).
  - Instructions using 'delay()' keyword.
- They can not be executed in parallel with other type of instructions. However :
  - "Smem = coeff" memory move instruction can also be paralleled with readport() qualifier.
  - "coeff = Smem" memory move instruction can also be paralleled with writeport() qualifier.
- They can not be executed alone.

These instructions permit to locally disable access towards the data memory and enable access to the 64Kword I/O space. The I/O data location is specified by the Smem, Xmem or Ymem fields (for more details see I/O access section XXX).

Data Stack Pointer Modify + operator

| no: Syntax: | \|\|: | sz: | cl: | pp: |
|---|---|---|---|---|
| 1: SP = SP + K8 | y | 2 | 1 | X |

Operands:

Kx : Signed constant coded on x bits.

Description :

This instruction performs an addition in the A-unit ALU in the execute phase of the pipeline. The signed constant Kx is sign extended to 16 bit and added to the data Stack pointer.
The latencies versus any address generation through the data stack pointer is 3 cycle.

TABLE 123-continued

| Modify Address Register | mar() | | | | |
|---|---|---|---|---|---|
| no: Syntax: | | ‖: | sz: | cl: | pp: |
| 1: mar(DAy + DAx) | | y | 3 | 1 | AD |
| 2: mar(DAy + DAx) | | y | 3 | 1 | AD |
| 3: mar(DAy − DAx) | | y | 3 | 1 | AD |
| 4: mar(DAy − DAx) | | y | 3 | 1 | AD |
| 5: mar(DAy = DAx) | | y | 3 | 1 | AD |
| 6: mar(DAy = DAx) | | y | 3 | 1 | AD |
| 7: mar(DAx + k8) | | y | 3 | 1 | AD |
| 8: mar(DAx + k8) | | y | 3 | 1 | AD |
| 9: mar(DAx − k8) | | y | 3 | 1 | AD |
| 10: mar(DAx − k8) | | y | 3 | 1 | AD |
| 11: mar(DAx = k8) | | y | 3 | 1 | AD |
| 12: mar(DAx = k8) | | y | 3 | 1 | AD |
| 13: mar(Smem) | | n | 2 | 1 | AD |

Operands:

| | | |
|---|---|---|
| DAx, DAy | : | Address register AR[0..7] or data register DR[0..3]. |
| Smem | : | Word single data memory access (16-bit data access). |
| kx | : | Unsigned constant coded on x bits. |

Status bit :

Affected by : LEAD

Description :

These instructions perform an addition, a subtraction or a move in the A-unit address generation units. The operation is performed in the address phase of the pipeline. However no data memory access is performed.
Instructions 01 and 02 perform an addition between the 2 address or data registers DAy and DAx and stores the result into DAy register.
Instructions 03 and 04 perform a subtraction between the 2 address or data registers DAy and DAx and stores the result into DAy register.
Instructions 05 and 06 perform a move from the address or data registers DAx to data or address register DAy.
Instructions 07 and 08 perform a addition between the address or data registers DAx and the unsigned constant K8. The result of the operation is stored in DAx register.
Instructions 09 and 10 perform a subtraction between the address or data registers DAx and the unsigned constant K8. The result of the operation is stored in DAx register.
Instructions 13 perform the address register modification specified by Smem as if a Word single data memory operand access was made (cf. Smem addressing for more details).
Note that if the destination register is an address register, and if the corresponding bit in pointer configuration register ST2 is set to 1, the circular buffer management controls the result stored in the destination register (cf. circular buffer management XXX).

Compatibility with C54x devices (LEAD = 1) :

In translated code section, the mar() instruction must be executed with LEAD set to 1 (cf. data addressing compatibility section XXX for more details).

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Thus, there has been described a processor which includes improvements in or relating to microprocessors. The processor is a programmable fixed point digital signal processor with variable instruction length. The processor comprises: an instruction buffer unit, a program flow control unit with a decode mechanism, an address/data flow unit, a data computation unit, dual multiply-accumulate blocks, with multiple interconnecting busses connected there between and to a memory interface unit, the memory interface unit connected in parallel to a data memory and an instruction memory. The instruction buffer is operable to buffer single and compound instructions pending execution thereof. The decode mechanism is operable to decode instructions from the instruction buffer, including compound instructions and soft dual memory instruction. The program flow control unit is operable to conditionally execute an instruction decoded by the decode mechanism or to repeatedly execute an instruction or sequence of instruction decoded by the decode mechanism. The address/data flow unit is operable to perform bit field processing and to perform various addressing modes, including circular buffer addressing. The processor further comprises a multistage execution pipeline connected to the program flow control unit, the execution pipeline having pipeline protection features. An emulation and code debugging facility with support for cache analysis, cache benchmarking, and cache coherence management is connected to the program flow control unit, to the address/data unit, and to the data computation unit. Various functional modules can be separately powered down to conserve power.

In another form of the invention, the processor has a cache connected between the instruction memory and the memory interface unit, with a memory management interface connected to the memory interface unit, the memory management unit operable to provide access to an external bus.

In another form of the invention, the processor has a trace FIFO connected to the program flow control unit.

In another form of the invention, the processor has means for maintaining a processor stack pointer and a separate but related system stack pointer.

In another form of the invention, the execution pipeline is operable to replace an instruction in a delayed slot after a software breakpoint.

In another form of the invention, the decode mechanism is operable to decode instructions having byte qualifiers for accessing memory mapped register or a peripheral device attached to the external bus.

In another form of the invention, the program flow control unit is further operable to respond to interrupt vectors which are mapped in at least two different locations.

In another form of the invention, a cellular telephone comprises the processor and further comprises an integrated keyboard connected to the processor via a keyboard adapter, a display connected to the processor via a display adapter, radio frequency (RF) circuitry connected to the processor; and an aerial connected to the RF circuitry.

In another form of the invention, the processor has a compiler for compiling instructions for execution, the compiler being operable to combine separate programmed memory instructions to form a compound memory instruction.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a programmable processor with variable instruction length, wherein the processor comprises:

an instruction buffer unit, a program flow control unit with a decode mechanism, an address/data flow unit, a data computation unit, dual multiply-accumulate blocks, with multiple interconnecting busses connected there between and to a memory interface unit, the memory interface unit connected in parallel to a data memory and an instruction memory;

wherein the instruction buffer is operable to buffer single and compound instructions pending execution thereof;

wherein the decode mechanism is operable to decode instructions from the instruction buffer, including compound instructions and soft dual memory instruction;

wherein the program flow control unit is operable to conditionally execute an instruction decoded by the decode mechanism or to repeatedly execute an instruction or sequence of instruction decoded by the decode mechanism;

wherein the address/data flow unit is operable to perform bit field processing and to perform various addressing modes, including circular buffer addressing;

wherein the processor further comprises a multistage execution pipeline connected to the program flow control unit, the execution pipeline having pipeline protection features;

an emulation and code debugging facility with support for cache analysis, cache benchmarking, and cache coherence management connected to the program flow control unit, to the address/data unit, and to the data computation unit; and wherein various functional modules can be separately powered down to conserve power.

2. The digital system of claim 1, further comprising:

a cache connected between the instruction memory and the memory interface unit; and a memory management interface connected to the memory interface unit, the memory management unit operable to provide access to an external bus.

3. The digital system of claim 1, further comprising a trace FIFO connected to the program flow control unit.

4. The digital system of claim 1, further comprising means for maintaining a processor stack pointer and a separate but related system stack pointer.

5. The digital system of claim 1, wherein the execution pipeline is operable to replace an instruction in a delayed slot after a software breakpoint.

6. The digital system of claim 1, wherein the decode mechanism is operable to decode instructions having byte qualifiers for accessing memory mapped register or a peripheral device attached to the external bus.

7. The digital system of claim 1, wherein the program flow control unit is further operable to respond to interrupt vectors which are mapped in at least two different locations.

8. The digital system of claim 2, further comprising a trace FIFO connected to the program flow control unit.

9. The digital system of claim 8, further comprising means for maintaining a processor stack pointer and a separate but related system stack pointer.

10. The digital system of claim 9, wherein the execution pipeline is operable to replace an instruction in a delayed slot after a software breakpoint.

11. The digital system of claim 10, wherein the decode mechanism is operable to decode instructions having byte qualifiers for accessing memory mapped register or a peripheral device attached to the external bus.

12. The digital system of claim 11, wherein the program flow control unit is further operable to respond to interrupt vectors which are mapped in at least two different locations.

13. The digital system of claim 1 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

14. The digital system of claim 1, further comprising a compiler for compiling instructions for execution, the compiler being operable to combine separate programmed memory instructions to form a compound memory instruction.

15. A digital system comprising a programmable processor, wherein the processor comprises:

a plurality of clock domains, wherein a least some of the plurality of clock domains are operable to enter into a low power state;

power down control circuitry connected to certain of the plurality of clock domains; the power down control circuitry operable to cause selected ones of the plurality of clock domains to enter a low power state; and error circuitry connected to the power down control circuitry; the error circuitry operable to inhibit at least one of the selected ones of the plurality of clock domains from entering a low power state, wherein the error circuitry is operable to interrupt the processor when the error circuitry inhibits at least one of the selected ones of the plurality of clock domains from entering a low power state.

16. The digital system of claim 15, wherein the error circuitry is operable to cause the processor to execute a software breakpoint when the error circuitry inhibits at least one of the selected ones of the plurality of clock domains from entering a low power state.

17. The digital system of claim 15, further comprising:

an instruction buffer unit, a program flow control unit with a decode mechanism, an address/data flow unit, a data computation unit, dual multiply-accumulate blocks, with multiple interconnecting busses connected there between and to a memory interface unit, the memory interface unit connected in parallel to a data memory and an instruction memory;

wherein the instruction buffer is operable to buffer single and compound instructions pending execution thereof;

wherein the decode mechanism is operable to decode instructions from the instruction buffer, including compound instructions and soft dual memory instruction;

wherein the program flow control unit is operable to conditionally execute an instruction decoded by the decode mechanism or to repeatedly execute an instruction or sequence of instruction decoded by the decode mechanism;

wherein the address/data flow unit is operable to perform bit field processing and to perform various addressing modes, including circular buffer addressing;

wherein the processor further comprises a multistage execution pipeline connected to the program flow control unit, the execution pipeline having pipeline protection features; and an emulation and code debugging facility with support for cache analysis, cache benchmarking, and cache coherence management connected to the program flow control unit, to the address/data unit, and to the data computation unit.

18. The digital system of claim 15 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

19. A digital system comprising a programmable processor, wherein the processor comprises:

a plurality of clock domains, wherein a least some of the plurality of clock domains are operable to enter into a low power state;

power down control circuitry connected to certain of the plurality of clock domains; the power down control circuitry operable to cause selected ones of the plurality of clock domains to enter a low power state, and a plurality of power down acknowledge circuits associated with respective ones of the plurality of clock domains and connected to the power down control circuitry, wherein each power down acknowledge circuit is operable to indicate that the associated clock domain is ready to enter a low power state, wherein the power down control circuitry is operable to be inhibited from causing a first one of the plurality of clock domains to enter a low power state until after a power down acknowledge circuit associated with a second clock domain indicates the second clock domain is ready to enter a low power state.

20. The digital system of claim 19, wherein the power down control circuitry is operable to be inhibited from causing the first one of the plurality of clock domains to enter a low power state until after a power down acknowledge circuit associated with the first clock domain indicates the first clock domain is ready to enter a low power state.

21. The digital system of claim 19, wherein the power down control circuitry is operable to be inhibited from causing one or more of the plurality of clock domains to enter a low power state until after the plurality of power down acknowledge circuits indicate all of the associated clock domain are ready to enter a low power state.

22. A method for powering down a digital system comprising a programmable processor that has a plurality of clock domains, wherein the method comprises the steps of:

selecting a first plurality of the plurality of clock domains to enter a low power state;

enabling the selected first plurality of the plurality of clock domains to enter a low power state;

inhibiting at least one of the first plurality of clock domains from entering a low power state; and processing an error condition in response to the step of inhibiting by interrupting an instruction processor of the digital system.

* * * * *